(12) United States Patent
Dundorf et al.

(10) Patent No.: US 12,265,387 B2
(45) Date of Patent: Apr. 1, 2025

(54) BUILDING ROOFTOP INTELLIGENCE GATHERING AND DECISION-SUPPORT SYSTEM AND METHODS OF AUGMENTED-REALITY SUPPORTED BUILDING INSPECTION

(71) Applicant: 2KR Systems, LLC, Barrington, NH (US)

(72) Inventors: Christopher C. Dundorf, Barrington, NH (US); Patrick Melvin, Lee, NH (US)

(73) Assignee: 2KR SYSTEMS, LLC, Barrington, NH (US)

( * ) Notice: Subject to any disclaimer, the term of this patent is extended or adjusted under 35 U.S.C. 154(b) by 366 days.

(21) Appl. No.: 17/333,516

(22) Filed: May 28, 2021

(65) Prior Publication Data

US 2021/0397182 A1 Dec. 23, 2021

Related U.S. Application Data

(63) Continuation of application No. 15/794,263, filed on Oct. 26, 2017, now Pat. No. 11,086,315.

(51) Int. Cl.
*G05D 1/00* (2006.01)
*B64C 39/02* (2023.01)
(Continued)

(52) U.S. Cl.
CPC ......... *G05D 1/0038* (2013.01); *B64C 39/024* (2013.01); *B64D 47/08* (2013.01);
(Continued)

(58) Field of Classification Search
None
See application file for complete search history.

(56) References Cited

U.S. PATENT DOCUMENTS 2,267,257 A 12/1941 Ruzicka
4,047,042 A 9/1977 Wada
(Continued)

FOREIGN PATENT DOCUMENTS

CA 2573711 7/2008
CA 3022235 4/2019
(Continued)

OTHER PUBLICATIONS

Office Action (Notice of Allowance and Fees Due (PTOL-85)) dated May 30, 2023 for U.S. Appl. No. 17/087,629 (pp. 1-10).
(Continued)

*Primary Examiner* — Todd Melton
*Assistant Examiner* — Jason R Roberson
(74) *Attorney, Agent, or Firm* — THOMAS J. PERKOWSKI, ESQ., PC

(57) ABSTRACT

A building intelligence gathering, assessment and decision-support system including a GPS system deployed about the Earth and supporting a plurality of GPS satellites for transmitting GPS signals to the surface of the Earth. A building data sensor network, including a plurality of GPS-tracked rooftop-mounted sensors, are mounted on the rooftop surface of the building, and adapted for collecting GPS-indexed data specifying conditions on the rooftop surface at particular dates and times of the year. The building rooftop conditions includes one or more conditions selected from the group consisting of snow load conditions, windspeed and direction, and temperature. The system also includes one or more hand-held mobile augmented-reality (AR) based rooftop navigation and inspection devices, each configured for communication with communication servers within a data center over a wireless data communication network. Each hand-held mobile AR-based inspection device is capable displaying digital images of objects and scenery captured in
(Continued)

its field of view (FOV) while the user is moving about the rooftop surface, along with graphical indications of GPS-tracked rooftop-mounted sensors collecting data regarding conditions on the building rooftop surface. By virtue of the present invention, users can now navigate building rooftops, inspect rooftop situations, identify where GPS-tracked rooftop-mounted sensors have been installed, and quickly determine where particular conditions have been automatically detected during rooftop inspections.

23 Claims, 191 Drawing Sheets

(51) Int. Cl.
  B64D 47/08    (2006.01)
  E01H 5/06     (2006.01)
  E01H 5/09     (2006.01)
  E04D 13/10    (2006.01)
  G05D 1/10     (2006.01)
  B64U 10/13    (2023.01)
  B64U 30/20    (2023.01)
  B64U 101/00   (2023.01)

(52) U.S. Cl.
  CPC .............. *E01H 5/06* (2013.01); *E01H 5/098* (2013.01); *E04D 13/106* (2013.01); *G05D 1/0088* (2013.01); *G05D 1/101* (2013.01); *B64U 10/13* (2023.01); *B64U 30/20* (2023.01); *B64U 2101/00* (2023.01); *B64U 2201/20* (2023.01)

(56) References Cited

U.S. PATENT DOCUMENTS

| | | |
|---|---|---|
| 4,843,372 A | 6/1989 | Savino |
| 4,927,232 A | 5/1990 | Griffiths |
| 4,936,060 A | 6/1990 | Gelinas |
| 5,594,250 A | 1/1997 | Condreva |
| 5,850,185 A | 12/1998 | Canty |
| 6,727,841 B1 | 4/2004 | Mitra |
| 6,826,664 B2 | 11/2004 | Hocker, III |
| 6,832,522 B2 | 12/2004 | Schaefer |
| 6,957,166 B1 | 10/2005 | Howie |
| 6,988,661 B2 | 1/2006 | Tsikos |
| 7,139,471 B1 | 11/2006 | Durham |
| 7,516,094 B2 | 4/2009 | Perkowski |
| 7,646,309 B2 | 1/2010 | Visser |
| 8,040,273 B2 | 10/2011 | Tomich |
| 8,467,133 B2 | 6/2013 | Miller |
| 8,552,396 B2 | 10/2013 | Frolik |
| 8,594,936 B1 | 11/2013 | Koval |
| 8,964,298 B2 | 2/2015 | Haddick |
| 8,982,207 B2 | 3/2015 | Jang |
| 9,057,804 B2 | 6/2015 | Christian |
| 9,082,015 B2 | 7/2015 | Christopulos |
| 9,134,534 B2 | 9/2015 | Border |
| 9,139,310 B1 | 9/2015 | Wang |
| 9,262,788 B1 | 2/2016 | Freeman |
| 9,262,789 B1 | 2/2016 | Tofte |
| 9,292,630 B1 | 3/2016 | Freeman |
| 9,346,560 B2 | 5/2016 | Wang |
| 9,420,042 B2 | 8/2016 | Raymond |
| 9,784,887 B1 | 10/2017 | Ulmer |
| 10,539,787 B2 | 1/2020 | Haddick |
| 10,579,028 B1 | 3/2020 | Jacob |
| 10,889,989 B1 | 1/2021 | Olen |
| 11,644,805 B1 | 5/2023 | Jacob |
| 11,698,205 B2 | 7/2023 | Brown |
| 2002/0194922 A1 | 12/2002 | Schaefer |
| 2006/0249622 A1 | 11/2006 | Steele |
| 2007/0135989 A1 | 6/2007 | Hengst |
| 2007/0164874 A1 | 7/2007 | Visser |
| 2008/0087837 A1 | 4/2008 | Desilets |
| 2008/0278311 A1 | 11/2008 | Grange |
| 2009/0120179 A1 | 5/2009 | Nylander |
| 2010/0076624 A1 | 3/2010 | Hinnant, Jr. |
| 2011/0073771 A1 | 3/2011 | Frolik |
| 2011/0115816 A1* | 5/2011 | Brackney .............. G06T 19/006 700/295 |
| 2012/0044106 A1 | 2/2012 | De Lorenzo |
| 2012/0212406 A1 | 8/2012 | Osterhout |
| 2012/0212499 A1 | 8/2012 | Haddick |
| 2012/0235886 A1 | 9/2012 | Border |
| 2013/0173062 A1 | 7/2013 | Koenig-Richardson |
| 2014/0249693 A1 | 9/2014 | Stark |
| 2014/0316614 A1 | 10/2014 | Newman |
| 2014/0366648 A1 | 12/2014 | Christian |
| 2014/0379179 A1 | 12/2014 | Goossen |
| 2015/0120094 A1 | 4/2015 | Kimchi |
| 2015/0219767 A1 | 8/2015 | Humphreys |
| 2015/0236779 A1 | 8/2015 | Jalali |
| 2015/0336667 A1 | 11/2015 | Srivastava |
| 2015/0347854 A1 | 12/2015 | Bare |
| 2016/0001878 A1 | 1/2016 | Lee |
| 2016/0001884 A1 | 1/2016 | Fleck |
| 2016/0004795 A1 | 1/2016 | Novak |
| 2016/0033966 A1 | 2/2016 | Farris |
| 2016/0105233 A1 | 4/2016 | Jalali |
| 2016/0115323 A1 | 4/2016 | Belcher |
| 2016/0144358 A1 | 5/2016 | Patel |
| 2016/0144978 A1 | 5/2016 | Cheron |
| 2016/0159496 A1 | 6/2016 | O'Toole |
| 2016/0179096 A1 | 6/2016 | Bradlow |
| 2016/0327653 A1 | 11/2016 | Humphreys |
| 2017/0180460 A1 | 6/2017 | High |
| 2018/0092295 A1 | 4/2018 | Sugumaran |
| 2019/0107646 A1 | 4/2019 | Trustman |
| 2019/0127985 A1 | 5/2019 | Dundorf |
| 2019/0347860 A1 | 11/2019 | Steiner |
| 2019/0383967 A1 | 12/2019 | Polebitski |
| 2022/0137235 A1 | 5/2022 | Dundorf |
| 2022/0274703 A1 | 9/2022 | Di Cosola |
| 2023/0222610 A1 | 7/2023 | Dawson |

FOREIGN PATENT DOCUMENTS

| | | |
|---|---|---|
| CN | 103093586 | 3/2016 |
| CN | 108398074 A | 8/2018 |
| CN | 111736170 | 10/2020 |
| EP | 1806461 A1 | 7/2007 |
| EP | 2813870 A1 | 12/2014 |
| EP | 2818957 A1 | 12/2014 |
| EP | 3567341 | 11/2019 |
| FR | 3038069 A1 | 12/2016 |
| GB | 191420267 A | 9/1915 |
| GB | 516444 | 1/1940 |
| GB | 946087 | 1/1964 |
| GB | 1112553 A | 5/1968 |
| JP | 2015102529 A | 6/2015 |
| JP | 2018179734 A | 11/2018 |
| JP | 6602176 | 11/2019 |
| WO | 9933272 | 7/1999 |
| WO | 0047966 | 8/2000 |
| WO | 03068537 | 8/2003 |
| WO | 2009129496 | 10/2009 |
| WO | 2010059125 A1 | 5/2010 |
| WO | 2013049248 | 4/2013 |
| WO | 2013186438 A1 | 12/2013 |
| WO | 2014151819 | 9/2014 |
| WO | 2015102706 A2 | 7/2015 |
| WO | 2015123623 A1 | 8/2015 |
| WO | 2016057098 A2 | 4/2016 |
| WO | 2016083897 A2 | 6/2016 |

OTHER PUBLICATIONS

Office Action dated Feb. 28, 2020 for U.S. Appl. No. 15/794,283 (pp. 1-8).

(56) References Cited

OTHER PUBLICATIONS

Office Action dated Jun. 22, 2020 for U.S. Appl. No. 15/794,263 (pp. 1-15).
Pro-Micron, "SnowCheck: Early Warning System for Excessive Roof Loads", Jan. 2015, (pp. 1-3).
Pro-Micron, "SnowCheck: Snow Load Sensor", Sep. 2015, (pp. 1-4).
Product Brochure for ZED-F9P Module—by U-Bloc For High Precision GNSS Module, Document #UBX-17005151, RO6, U-BLOX AG, 2020 (2 Sheets).
Product Specification Sheet for St LPS33HW MEMS Pressure Sensor, STMicroelectronics NV., Doc. # 030522 Rev 1, Jul. 2017, (50 Sheets).
Promicron Inc., "Snow Load Sensor", Jul. 2014, (pp. 1-3).
Robotex Inc., "Avatar II Brochure", Jun. 2012, (pp. 1-7).
Roof Guards GMBH, "Roof Guard and NetBiter", Nov. 2013, (pp. 1-3).
Roof Guards GMBH, "Roof Guards", Jan. 2013, (pp. 1-3).
Ruuki, "Roof Snow Load System", Nov. 2013, (pp. 1).
Ruukki, "Ruukki Smart Roof Now Ready", Jan. 2014, (pp. 1-3).
Ruukki, "Ruukki's Design Toolbox", Jan. 2014, (pp. 1-4).
Ruukki, "Ruukki's Load-Bearing Roof Solution", Jan. 2010, (pp. 1-11).
Ruukki, "Smart Roof Sensor", Nov. 2011, (pp. 1).
Ruukki, "Smart Roof", Jan. 2014, (pp. 1-3).
Safe Roof Systems Inc., "Roof Deflection Monitoring", Jan. 2017, (pp. 1-7).
Sommer Messtechnik, "Snow Scale Screenshots", Jan. 2017, (pp. 1-15).
Sommer Messtechnik, "Snow Scale SSG", Dec. 2014, (pp. 1-4).
Sommer Messtechnik, "Snow Scales SSG", Aug. 2016, (pp. 1-2).
Specification Sheet for DIGI XBEE-PRO 900HP RF Module, DIGI International Inc., 2018, Document #91002310 B5/518, 2018 (3 Sheets).
Specification Sheet for ST VL53L1X Time of Flight Sensor, STMicroelectronics NV, DocID 0311281, Nov. 2018 (35 Sheets).
U-Bloc GNSS Product Overview, Document # UBX-14000426-R14, U-Blox AG, 2021 (4 Pages).
Y.J. Morton et al., Position, Navigation, and Timing Technologies in the 21st Century: Integrated Satellite Navigation, Sensor Systems, and Civil Applications, vol. 2, Wiley-IEEE Press, p. 1713-1733, Jan. 2020 (Year: 2020).
"Advances in GNSS-RTK for Structural Deformation Monitoring in Regions of High Ionospheric Activity", Chris Rizos, Joël van Cranenbroeck and Vincent Lui, Fig Congress 2010, Facing The Challenges—Building the Capacity, Apr. 2010 (13 Sheets).
"Analytical Computation of the Spatial Resolution in GNSS-R and Experimental Validation at L1 and L5" by Adriano Camps, and Joan Francesc Munoz-Martin, Remote Sensing, 2020, vol. 12, No. 3910, MDPI, Nov. 2020 (15 Sheets).
"Automatic Roof Plane Detection and Analysis in Airborne Lidar Point Clouds for Solar Potential Assessment", Andreas Jochem, Bernhard Hofle , Martin Rutzinger and Norbert Pfeifer, Sensors, 2009, vol. 9, Jul. 2019, pp. 5241-5262 (22 Sheets).
"Commercial Roof Drains and Drainage Systems" Guide to Commerical Roof Drains, Siphonic Drains for Flat Roofs, IKO Commerical, published Apr. 15, 2019, at https://www.iko.com/comm/blog/commercial-roof-drains/, captured Dec. 11, 2019 (17 Sheets).
"Deep Learning for Detecting Building Defects Using Convolutional Neural Networks", Husein Perez, Joseph H. Tah and Amir Mosavi, Sensors, 2019, vol. 19, 3556, MDPI, Aug. 2019, (22 Sheets).
"Geomembrane Linear Failure: Modelling of its Influence on Containment Transfer", by V. Nosko and N. Touze-Foltz, EuroGeo 2—2000, Bologna Italy—vol. 2 2000 (4 Sheets).
"GNSS Receiver Architecture for Remote Sensing Applications", Sara J. Hrbek, Phd Thesis, University of Colorado, Department of Aeospace Engineering Sciences, 2019, (164 Sheets).
"GNSS/INS Integration with Integrity Monitoring for UAV No-Fly Zone Management" by Rui Sun, Wenyu Zhang, Jiazhu Zheng, and Washington Yotto Ochieng, Remote Sensing, 2020, vol. 12, No. 524, MDPI, Feb. 2020 (22 Sheets).
"GPS Accuracy" by GPS.Gov, published at https://www.gps.gov/systems/gps/performance/accuracy/, captured Jul. 3, 2020 (3 Sheets).
"GPS Monitoring of Slow-Moving Landslides", Richard Giraud and Greg McDonald, Utah Geological Surey, Survey Notes, vol. 43, No. 1, Jan. 2011 (2 Pages), also published as text at https://geology.utah.gov/map-pub/survey-notes/gps-monitoring-of-slow-moving-landslides/#:~:text.
"Heat Mapping Drones: An Autonomous Computer Vision-based Procedure for Building Envelope Inspection using Unmanned Aerial Systems (UAS ) " Tarek Rakha, Amanda Linberty, Alice Gorodetsky, Burak Kakillioglu, and Senem Velipasalar, Jan. 2, 2018, Technology|Architecture + Design, vol. 2, Issue 1 (41 Sheets).
"Heat Mapping Drones: An Autonomous Computer Vision-based Procedure for Building Envelope Inspection using Unmanned Aerial Systems (UAS ) " Tarek Rakha, Amanda Linberty, Alice Gorodetsky, Burak Kakillioglu, and Senem Velipasalar, Sept. 23-26, 2018, International Building Physics Conference (IBPC) 2018, Proceedings, Syracuse, NY, USA, (7 Sheets).
"Landslide Mapping on the Wasatch Plateau: Comparision of Methods Including High-Resolution LIDAR" by Greg McDoland, Richard Giraud (Utah Geological Survey) and Karl Boyer (Manti-La Sal National Forest), Utah Geological Survey, Digital Mapping Techniques 2015, presented at DNT' 15—May 17-20, 2015, Utah Geological Survey, Salt Lake City, Utah (34 Sheets).
"Methods for Detection of Inapropriate Discharges to Storm Drainage Systems—Background Literature and Summary of Findings", by Robert Pitt, Department of Civil and Environmental Engineering, the University of Alabama, Contract EPA No. X-82907801-0, Nov. 2001, (431 Sheets).
"Permanent, autonomous monitoring of landslide movements with GPS", L. Manetti, M. Frapolli, and A. Knecht, by GEODEV Earth Technologies SA, Manno, Switzerland, published in the book titled Landslides, 1st Edition, Published by Routledge, 2002 (6Sheets).
"Recent Advances of Structures Monitoring and Evaluation Using GPS-Time Series Monitoring Systems: A Review", Mosbeh R. Kaloop, Emad Elbeltagi, Jong Wan Hu, and Ahmed Elrefai, ISPRS, 2017, vol. 6, No. 682, MDPI, Nov. 2017 (17 Sheets).
"Risk Control Bulletin Safe Work Practices on Snow-Covered Roofs," CNA Financial Corporation, 2010 (2 Sheets).
"Risk Control Bulletin: The Snow Loading and Roof Collapse Preparation Guide", CNA Financial Corporation, RC156M RC Roof FL 120915, 2015 (3 Sheets).
"Rooftop Unit Embedded Diagnostics: Automated Fault Detection and Diagnostics (AFDD) Development, Field Testing and Validation", S. Katipamula, W. Kim, R. Lutes, RM Underhill, Prepared for US Department of Energy (DOE), PNNL-2379, Sep. 2015 (126 Sheets).
"Vertical Deformation Monitoring of the Suspension Bridge Tower Using GNSS: A Case Study of the Forth Road Bridge in the UK", Qusen Chen , Weiping Jiang , Xiaolin Meng , Peng Jiang, Kaihua Wang, Yilin Xie, and Jun Ye, Remote Sensing, 2018, vol. 10, No. 365, MDPI, (19 Sheets).
2KR Systems, "Snow Sentry Brochure", Jan. 2017, (pp. 1-9).
ABS Guide for Hull Condition Monitoring Systems, American Bureau of Shipping, Jul. 2020 (31 Sheets).
Alpine Hydromet, "FSP: Fluidless Snow Pillow", Jan. 2017, (pp. 1-2).
Applicant's Response to Written Opinion dated Nov. 19, 2022 filed in PCT Application No. PCT/US2021/67933 (8 Sheets).
Applicant's Response to Written Opinion dated Nov. 21, 2022 filed in PCT Application No. PCT/US2021/67964 (9 Sheets).
Bayern Innovativ, "Snow Patrol", Jan. 2017, (pp. 1-14).
C. Inal et al., The Comparison of KOSAGA and CORS-TR in Real Time Kinematic Positioning, International Refereed Journal of Engineering And Sciences, 17 pages, 2015 (Year: 2015).
Campbell Scientific, "CS725 Instruction Manual", Jan. 2012, (pp. 1-48).
Campbell Scientific, "CS725 Snow Water Equivalent Sensor", Jan. 2017, (pp. 1-2).
CNA, "Risk Control Bulletin: Safe Work Practices on Snow Covered Roofs", Jan. 2010, (pp. 1-2).

(56) References Cited

OTHER PUBLICATIONS

CNA, "Risk Control Bulletin: The Snow Loading and Roof Collapse Preparation Guide", Dec. 2015, (pp. 1-3).
Data Sheet for ADS RainAlert® III Rainfall Monitoring System, Doc # RAIII-Jul. 11, 2022, by ADS LLC, Jul. 2022 (2 Sheets).
Data Sheet for ONSET® RXW-RGF-XXX Sensor—HOBONet Rainfall Sensor, by Onset Computer Corporation, Bourne, MA, 2018 (3 Sheets).
Data Sheet for ZED-F9P Module—by U-Bloc For High Precision GNSS Module, Document # UBX-17051259—R05, U-BLOX AG, 2020 (24 Sheets).
Hydrological Systems, "Snow Load Roof Monitor", Nov. 2013, (pp. 1-2).
Indiegogo, "Weather Flow: Smart Weather Stations", Dec. 2016, (pp. 1-31).
Installation Instructions for Honeywell 24PC Series Pressure Sensors 50047629 (Issue 1), Honeywell Sensing and Control, Honeywell International, Inc. 2009 (4 Sheets).
Intellicom Innovation, "NetBiter Case Study: Snow Load Scales", Jan. 2017, (pp. 1-2).
International Preliminary Report on Patentability (IPRP-Chapter II) dated Jan. 19, 2023 issued in PCT Application No. PCT/US2021/057964 (8 Sheets).
International Preliminary Report on Patentability (IPRP-Chapter II) dated Apr. 28, 2023 issued in PCT Application No. PCT/US2021/057933 (8 Sheets).
International Search Report (ISR) and Written Opinion issued in PCT Application No. PCT/US2021/67933 dated Mar. 7, 2022 (56 Sheets).
International Search Report (ISR) and Written Opinion issued in PCT Application No. PCT/US2021/67964 dated Apr. 22, 2022 (68 Sheets).
J. Yu et al., Global Navigation Satellite System-based positioning technology for structural health monitoring: a review, Struct Control Health Monit. 27 pages, Oct. 2019 (Year: 2019).
Lendzioch et al. "Combined Study of Snow Depth Determination and Winter Leaf Area Index Retrieval by Unmanned Aerial Vehicle Photogrammetry" 19th EGU General Assembly, EGU2017, proceedings from the conference held Apr. 23-28, 2017 in Vienna, Austria., p. 7016 (Year: 2017).
Lockton Inc., Lucas Pfannenstiel, "Extending the Life of Your Company's Roof", Sep. 2018, (pp. 1-4).
Lockton Inc., Lucas Pfannenstiel, "How Well Will Your Property Weather the Winter Weather?", Nov. 2017, (pp. 1-4).
NH Business Review, "N.H. firm may have solution for roof snow loads", Mar. 2015, (pp. 1-7).
Notice of Allowance dated Mar. 3, 2021 for U.S. Appl. No. 15/794,263 (pp. 1-9).
Notice of Allowance dated Sep. 10, 2020 for U.S. Appl. No. 15/794,283 (pp. 1-5).
Office Action (Non-Final Rejection) dated Oct. 31, 2022 for U.S. Appl. No. 17/087,629 (pp. 1-16).

\* cited by examiner

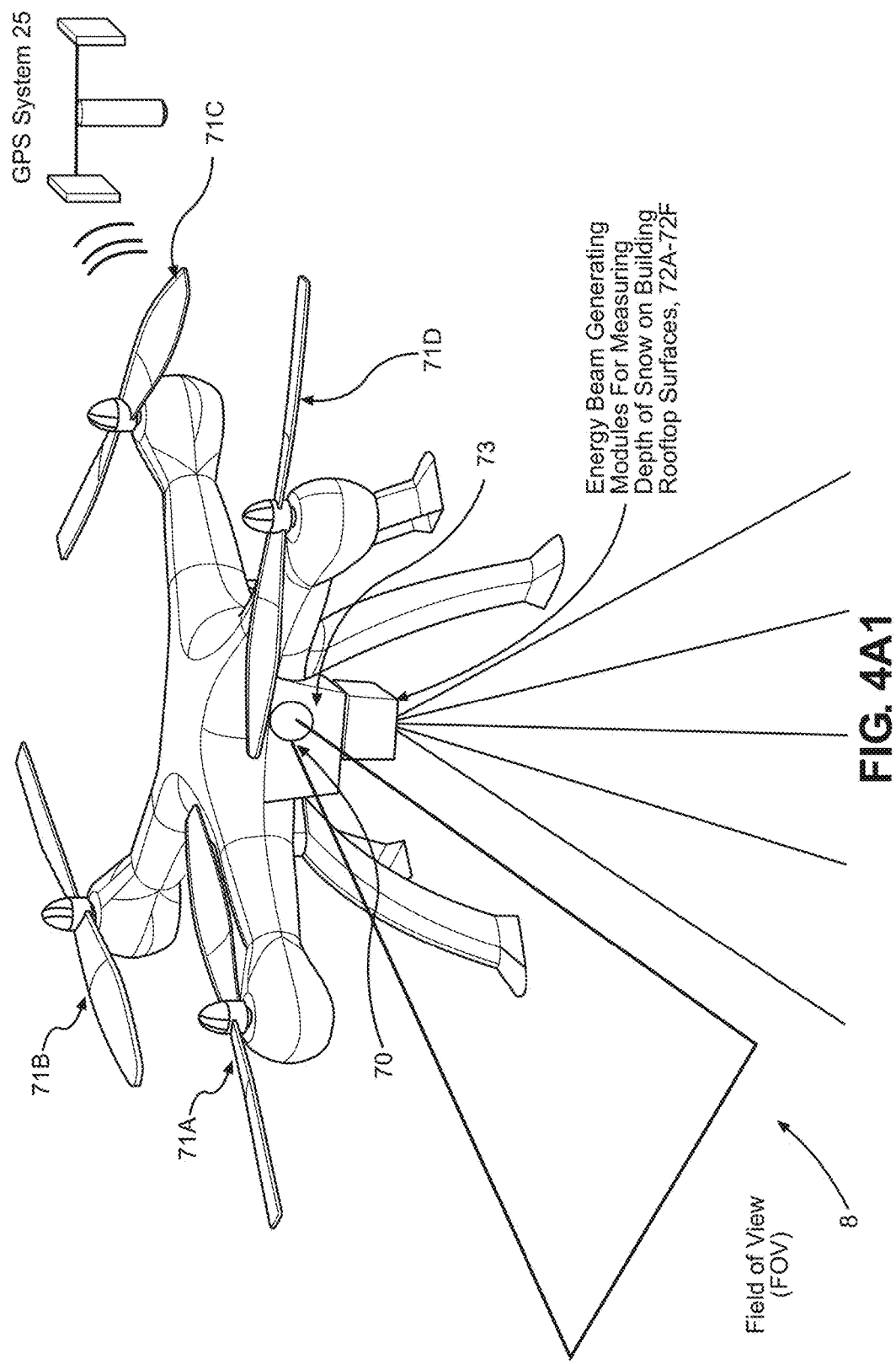

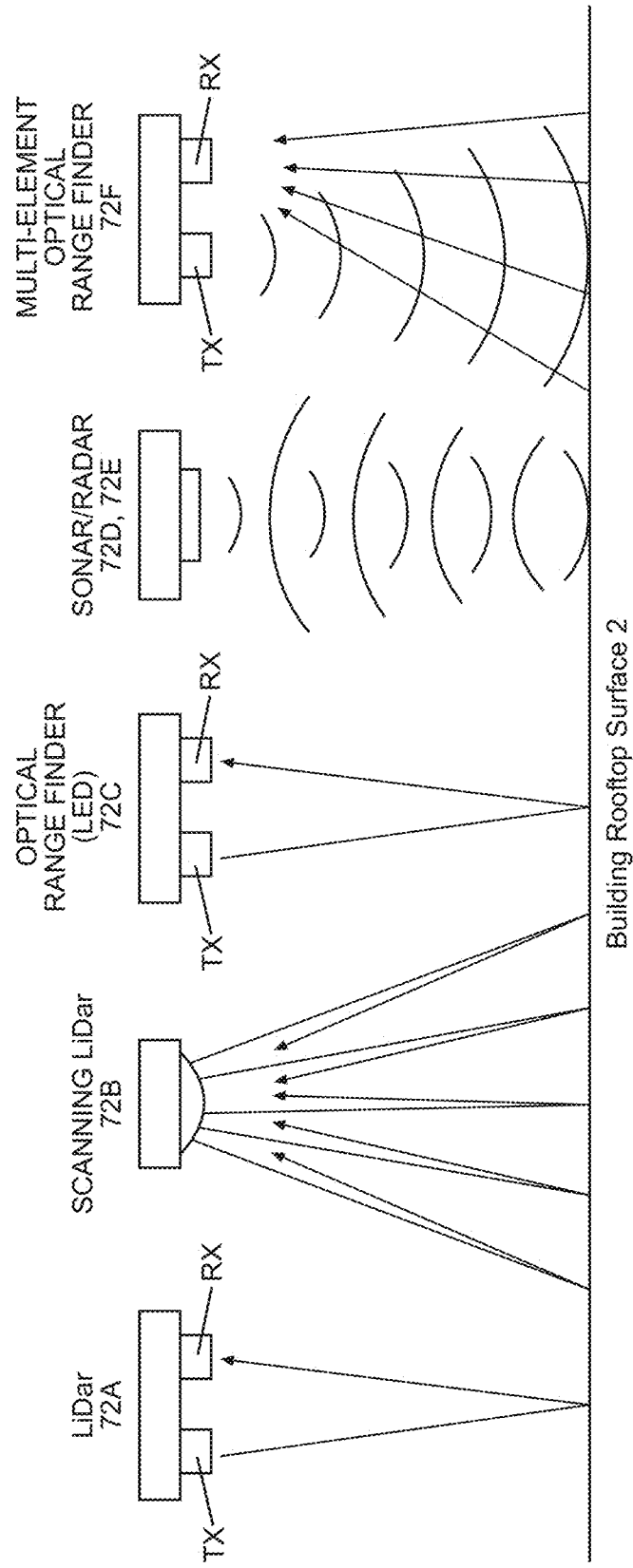
FIG. 4A2

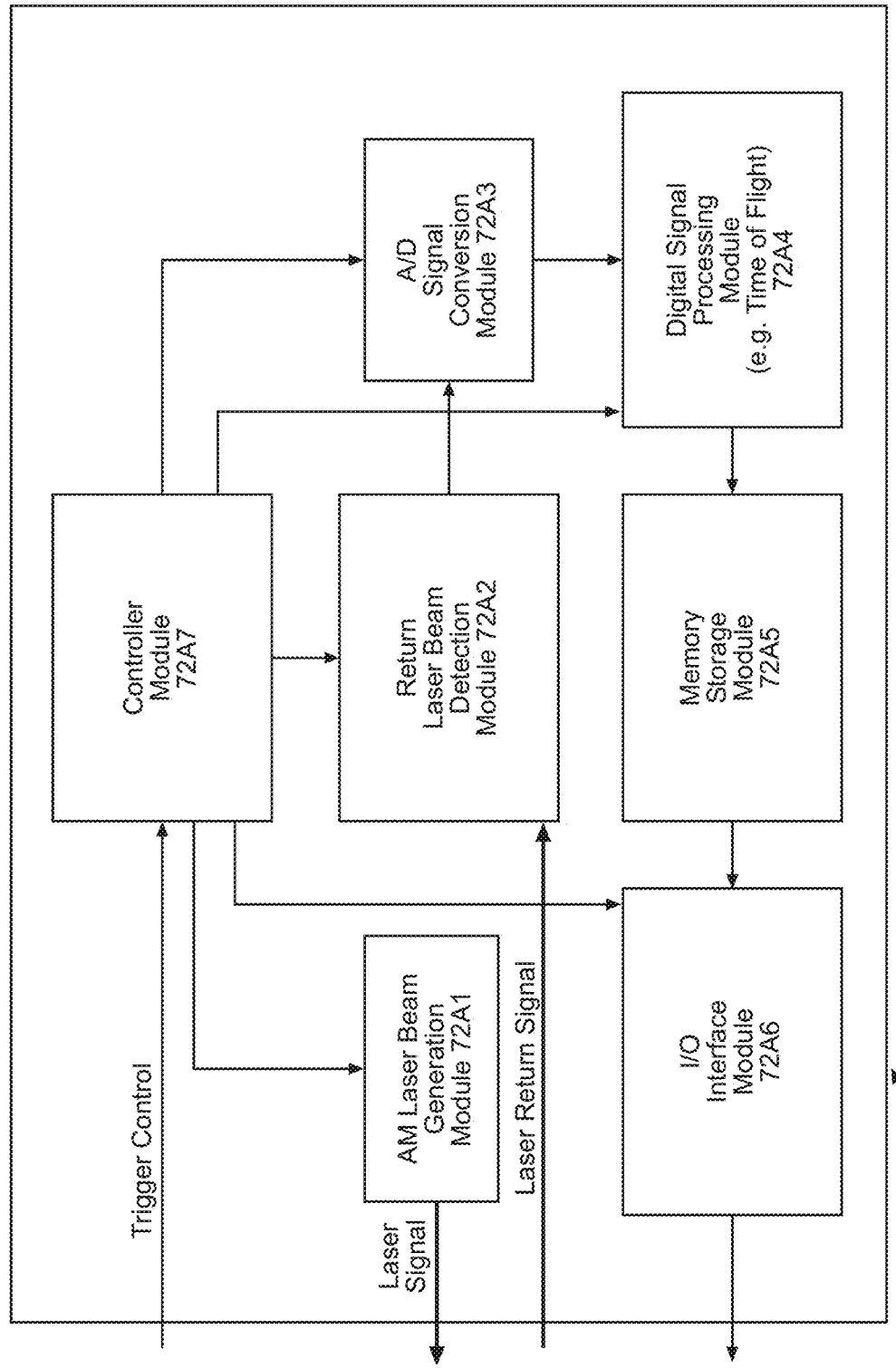
FIG. 4B1

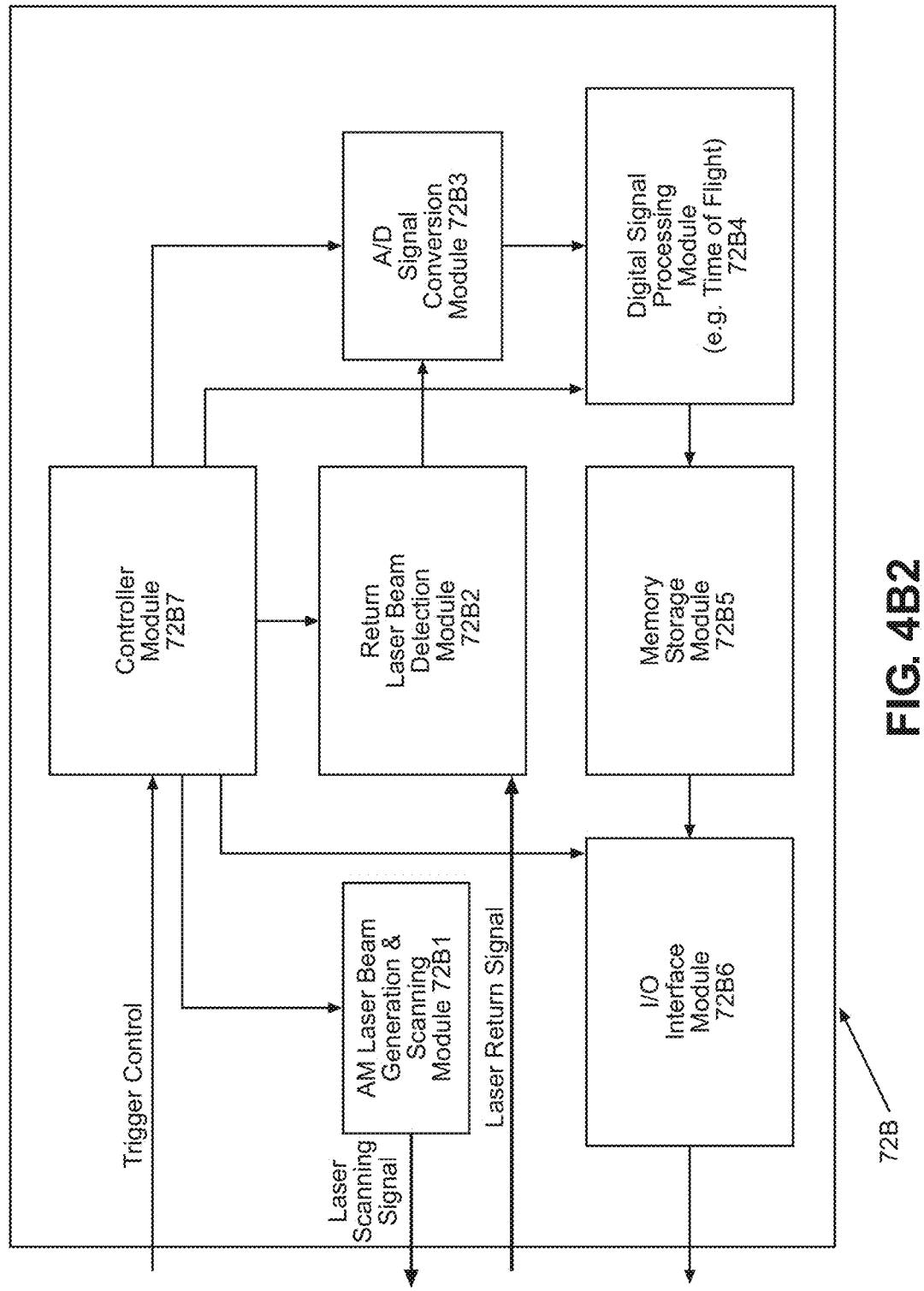
FIG. 4B2

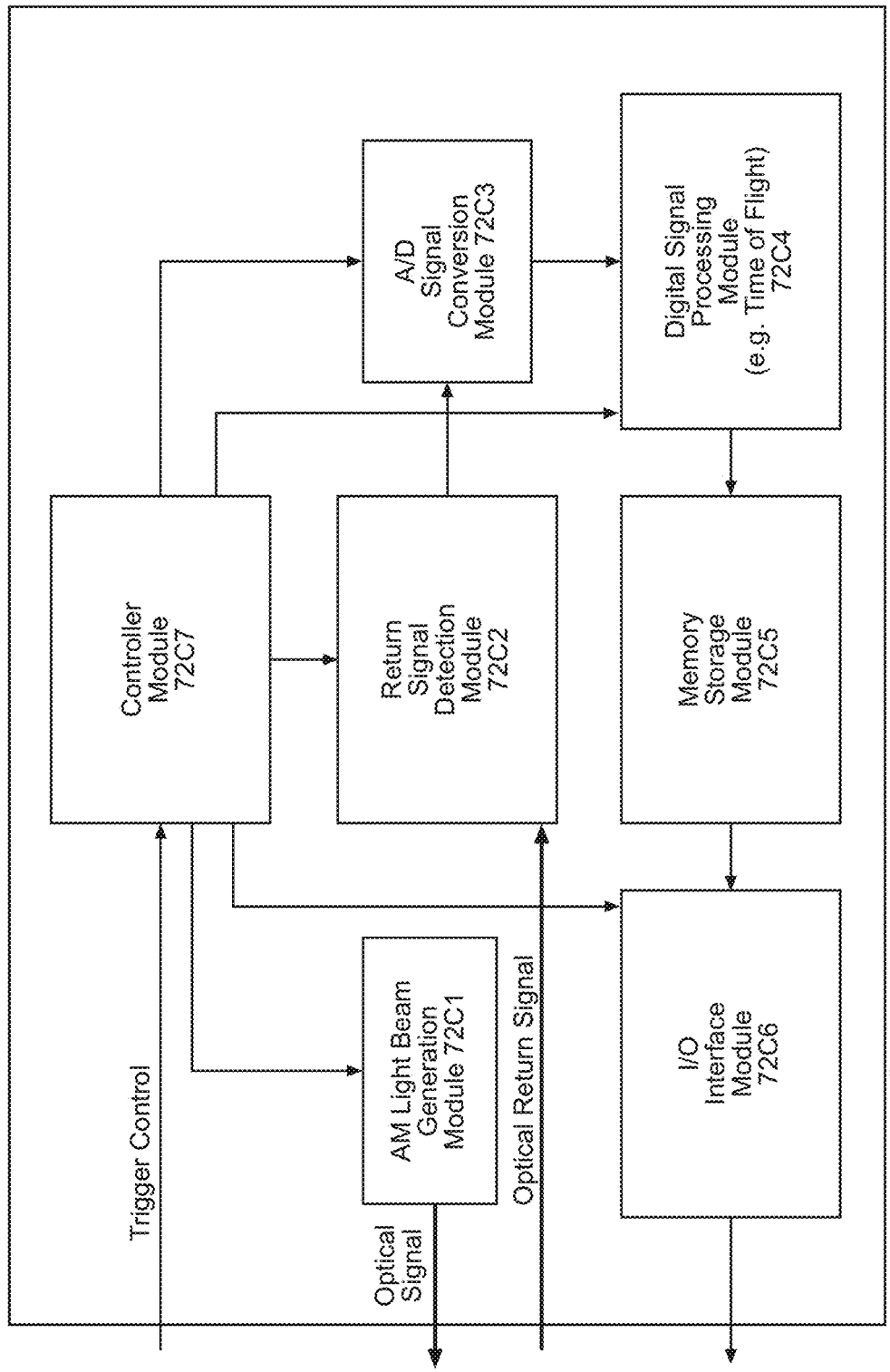
FIG. 4B3

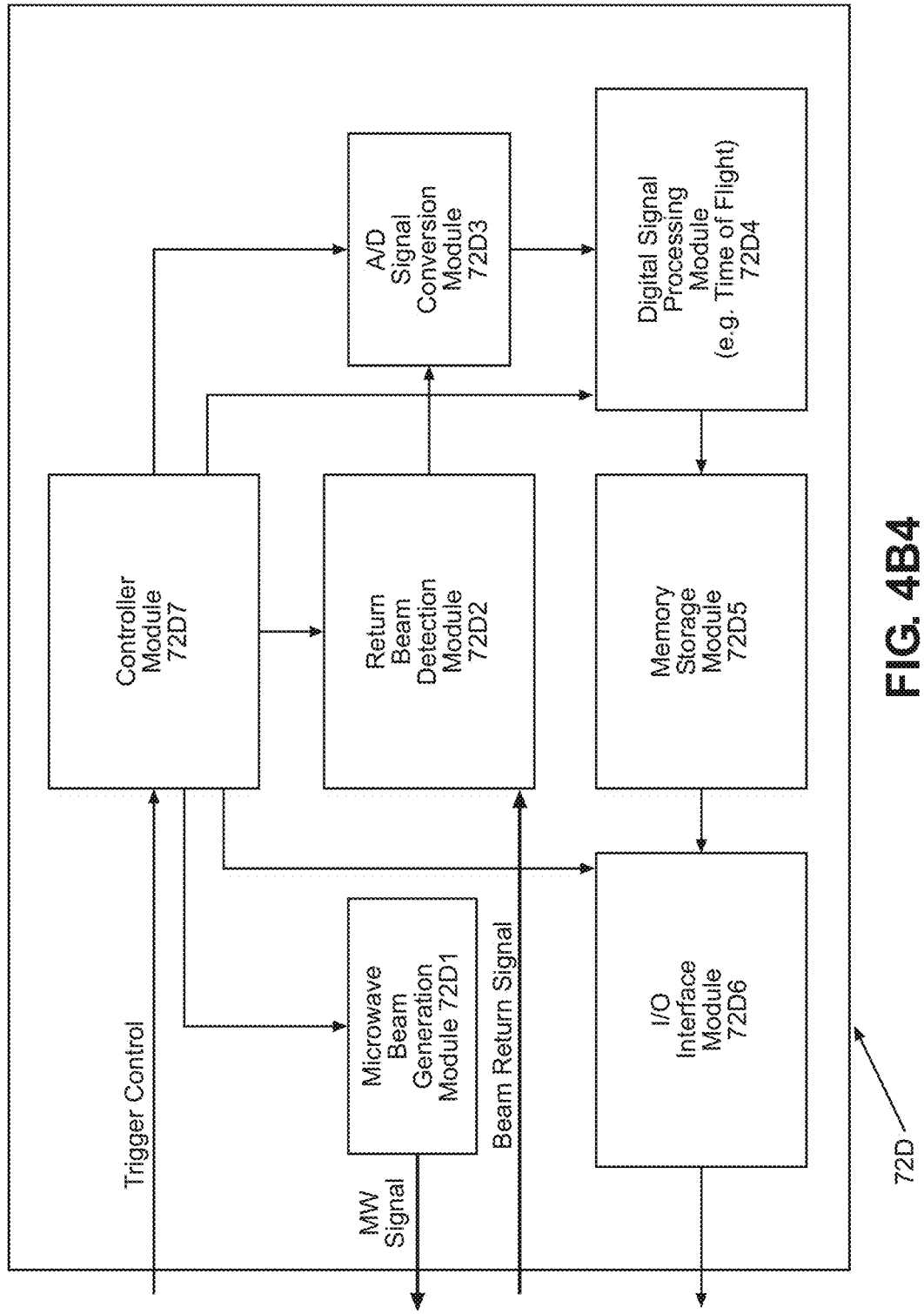
FIG. 4B4

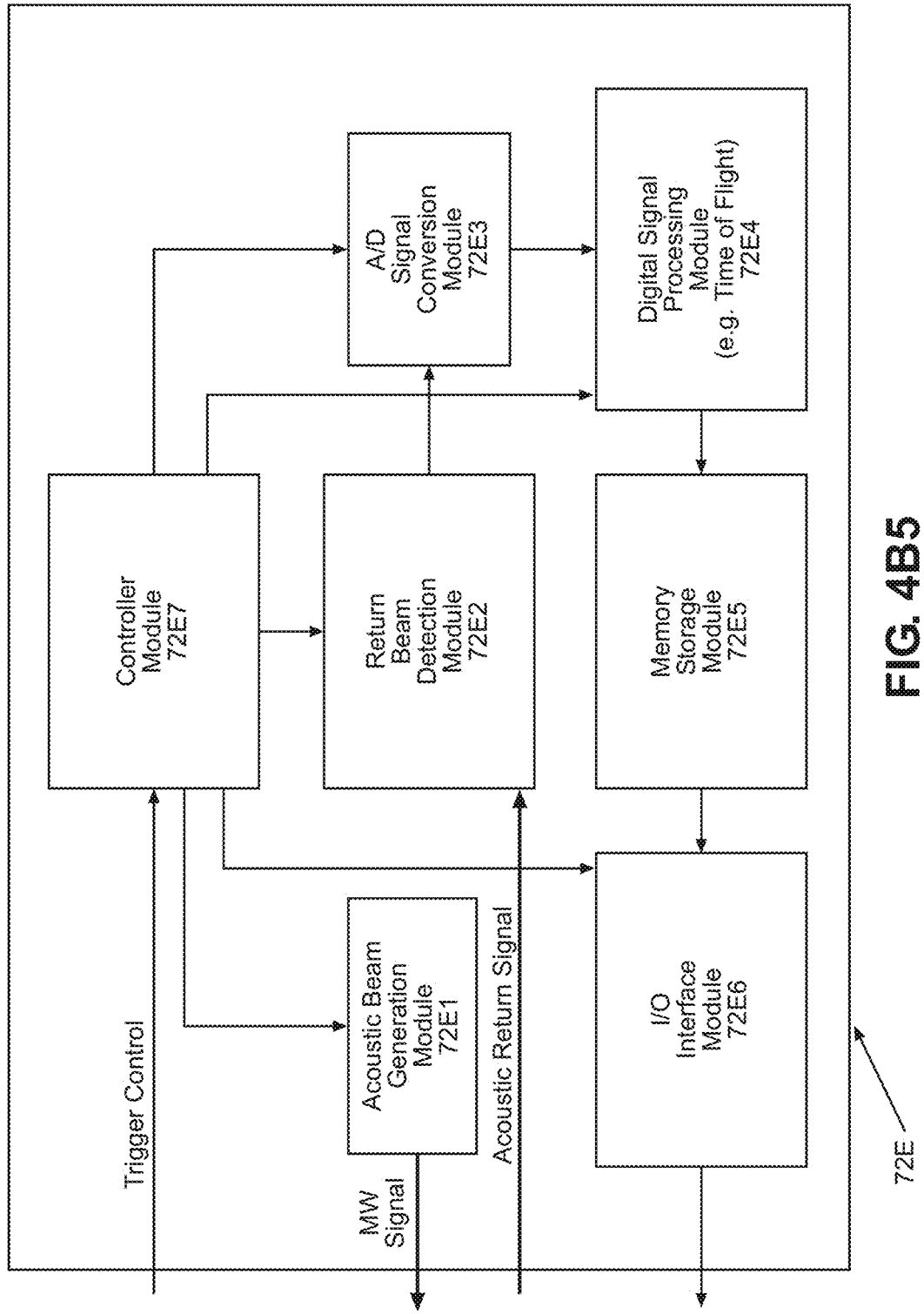
FIG. 4B5

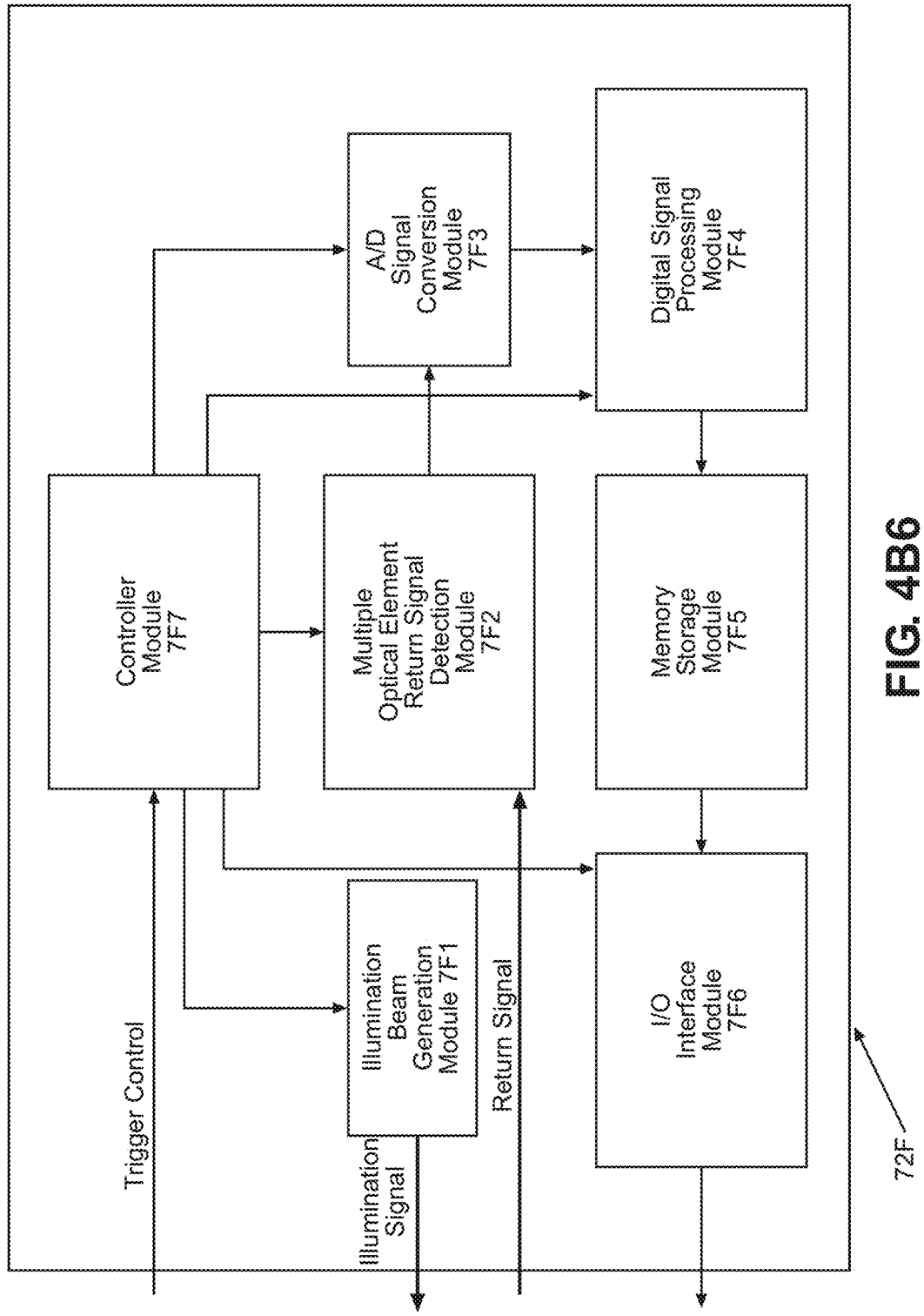
FIG. 4B6

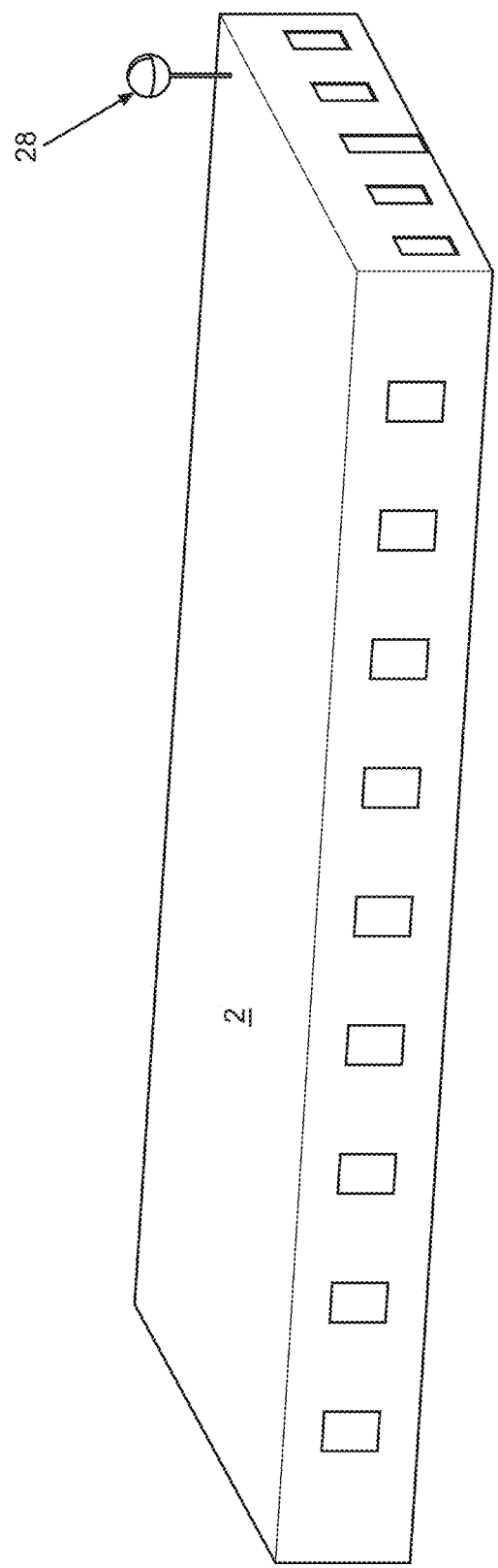
FIG. 4D1

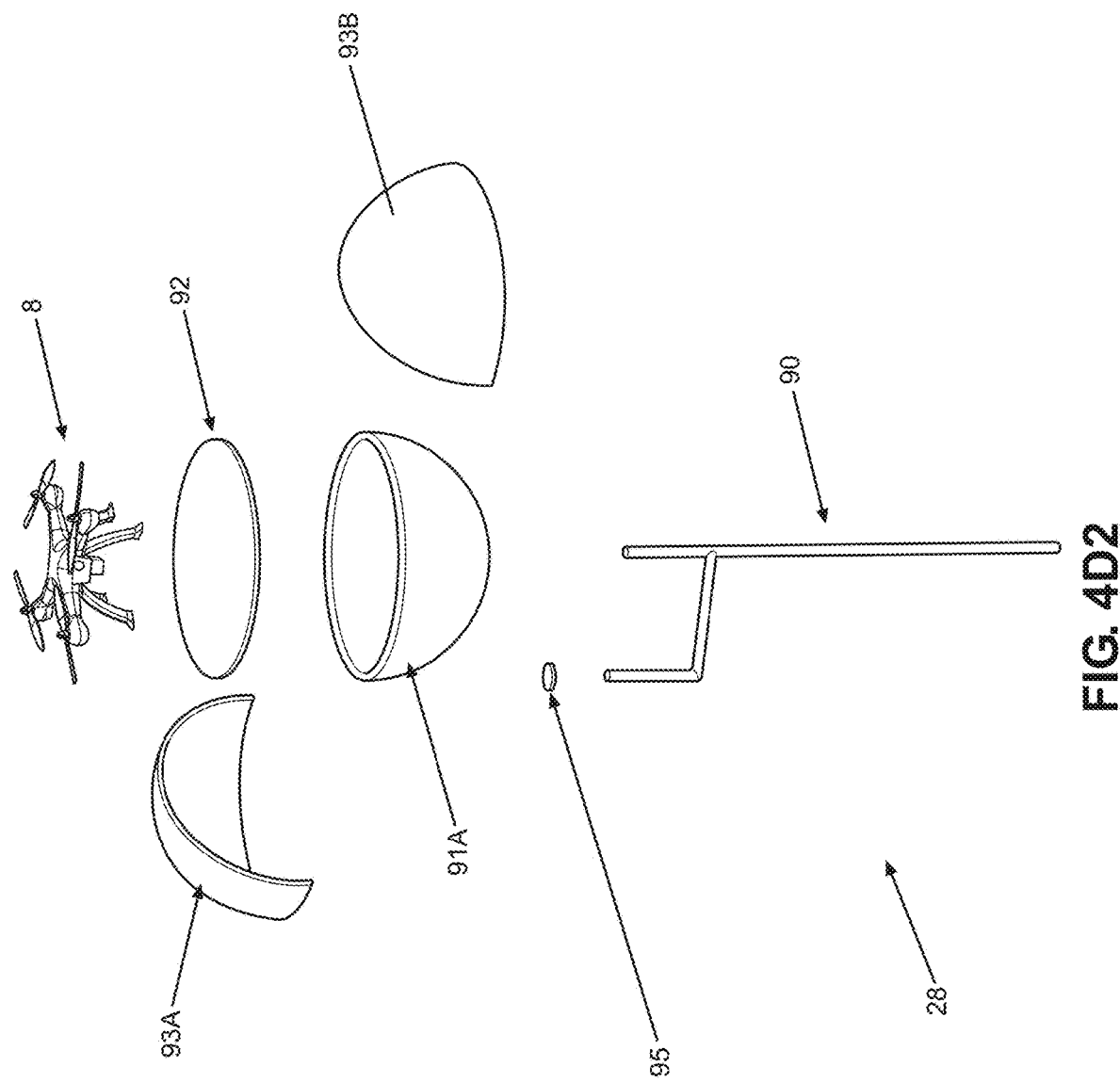
FIG. 4D2

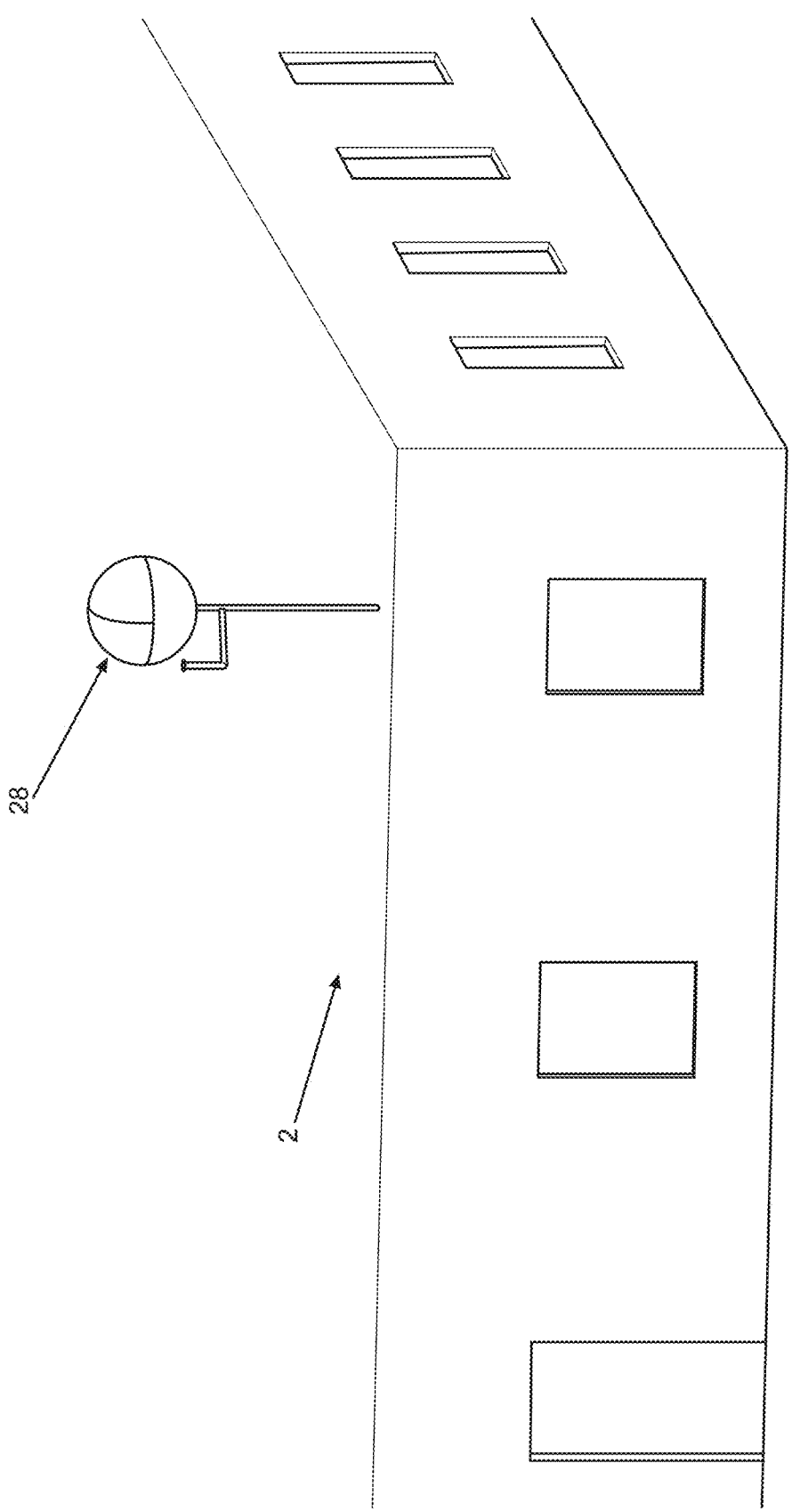
FIG. 4D3

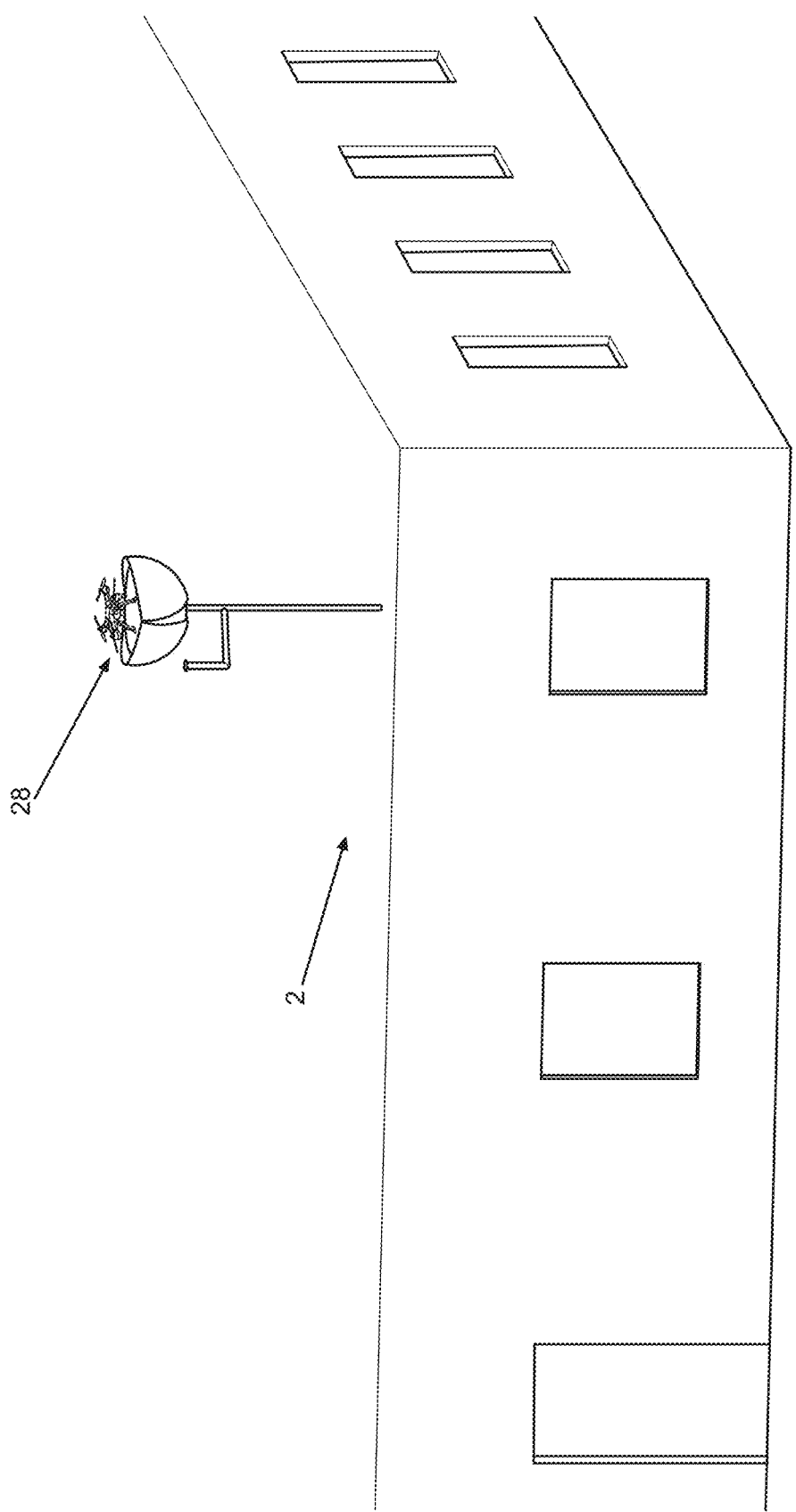
FIG. 4D4

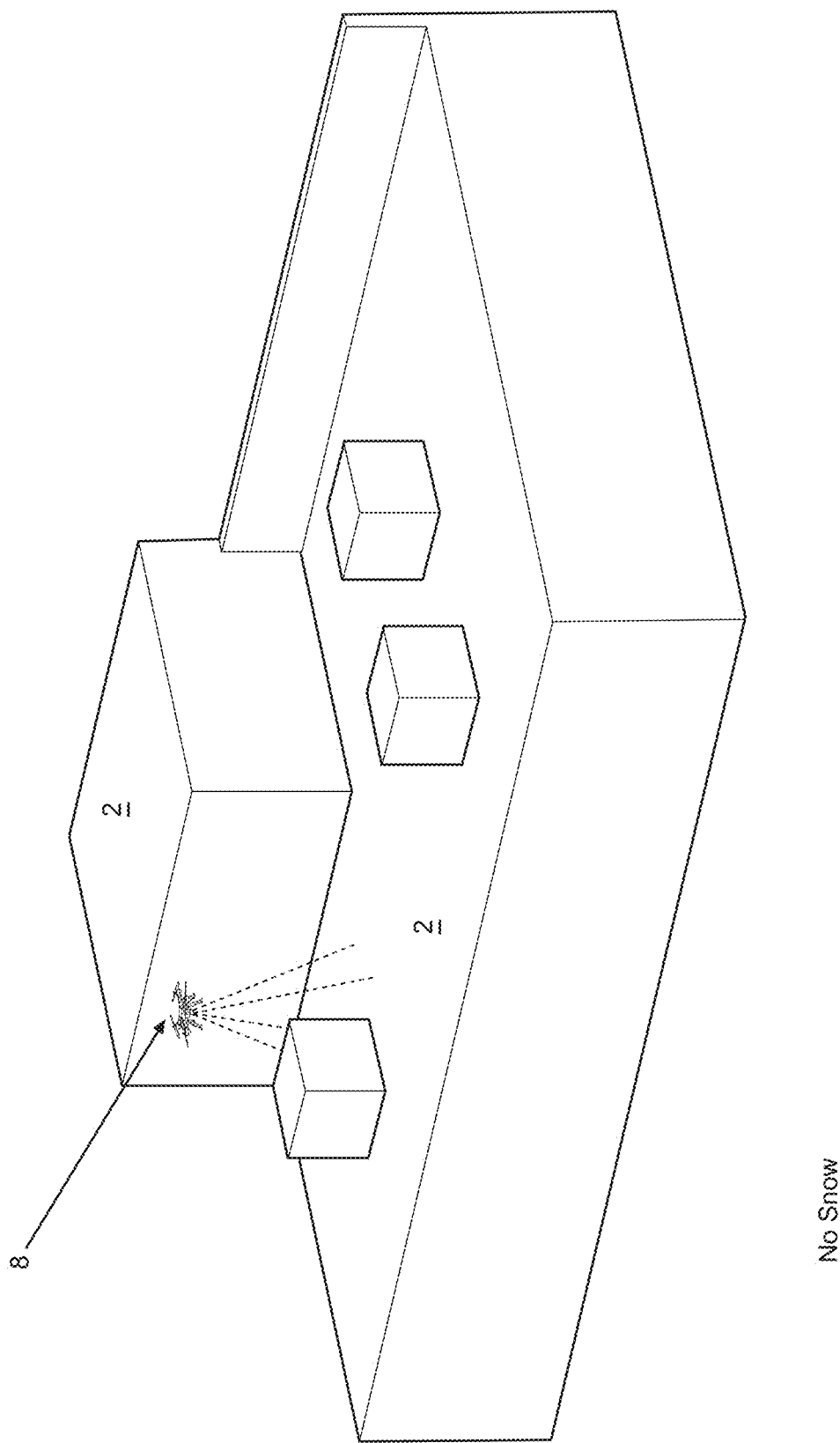
FIG. 4F1
No Snow

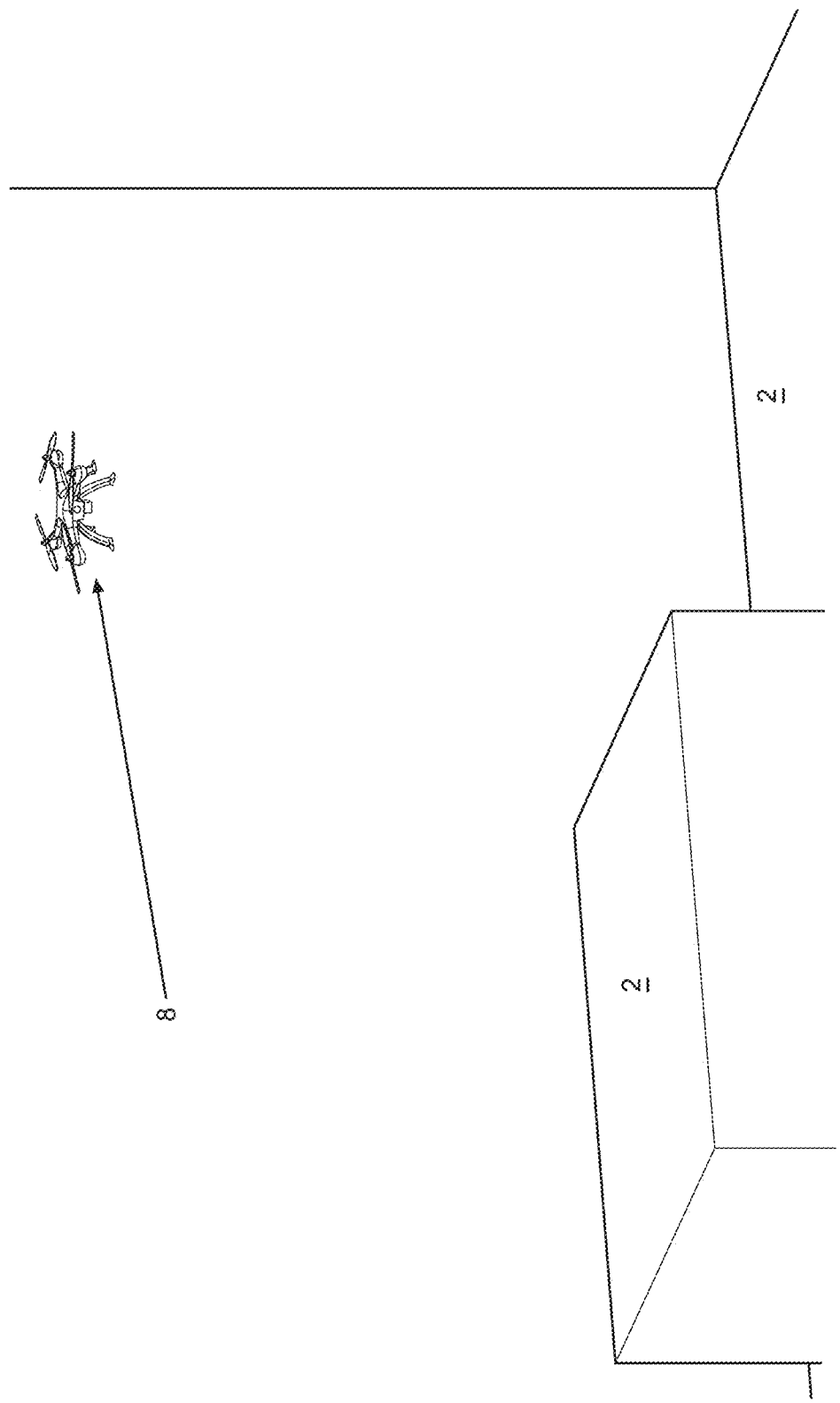
FIG. 4F2

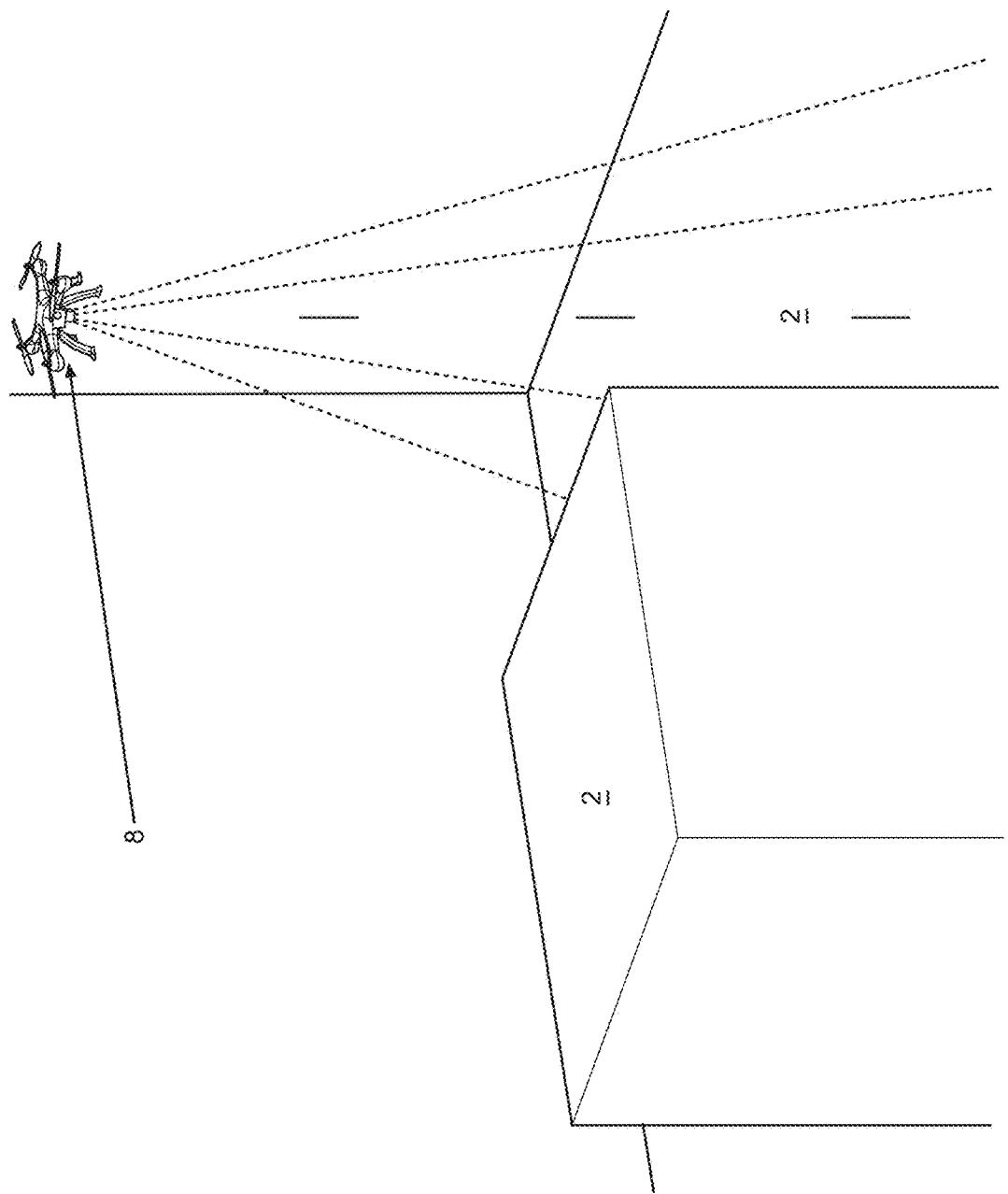
FIG. 4F3

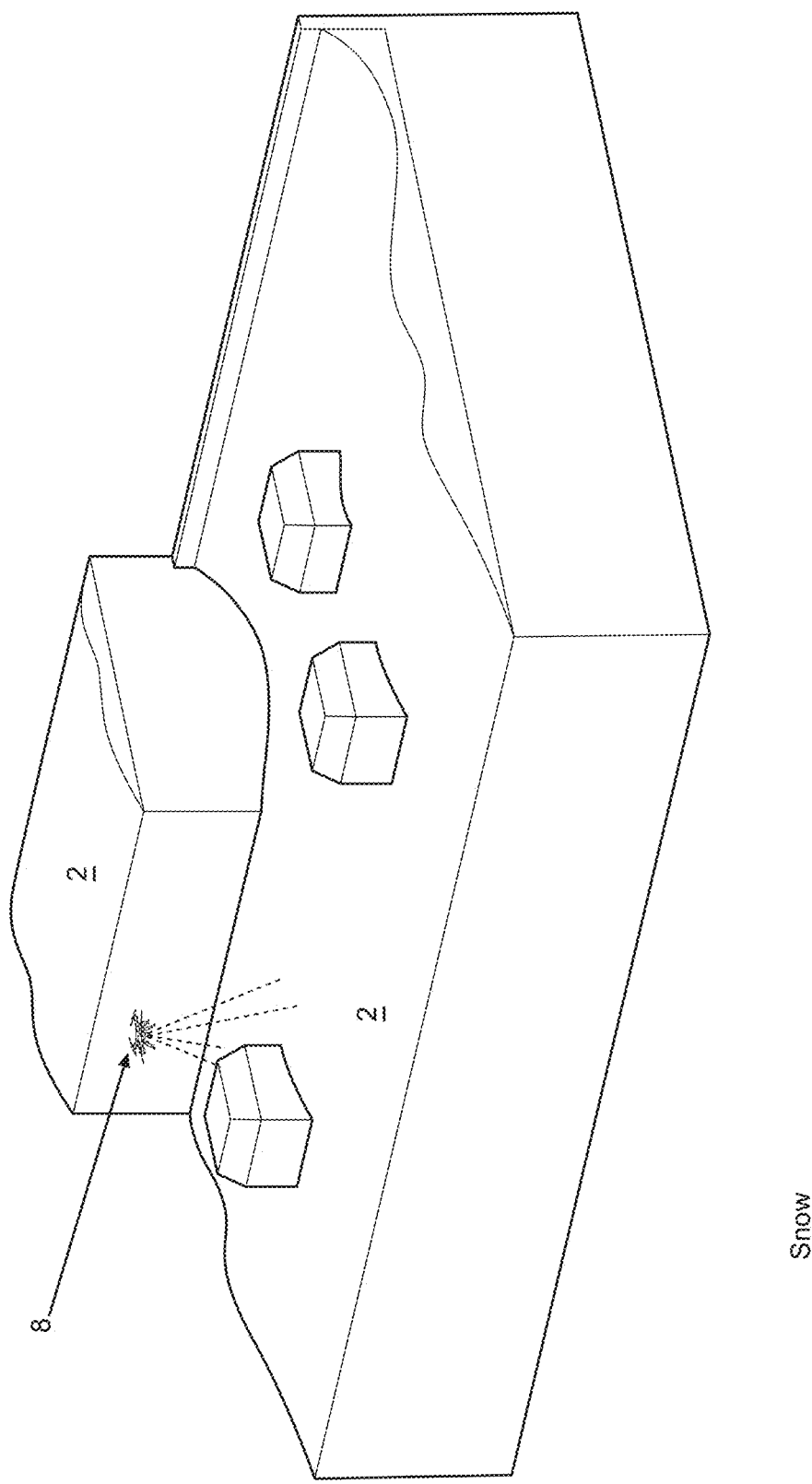
FIG. 4G1

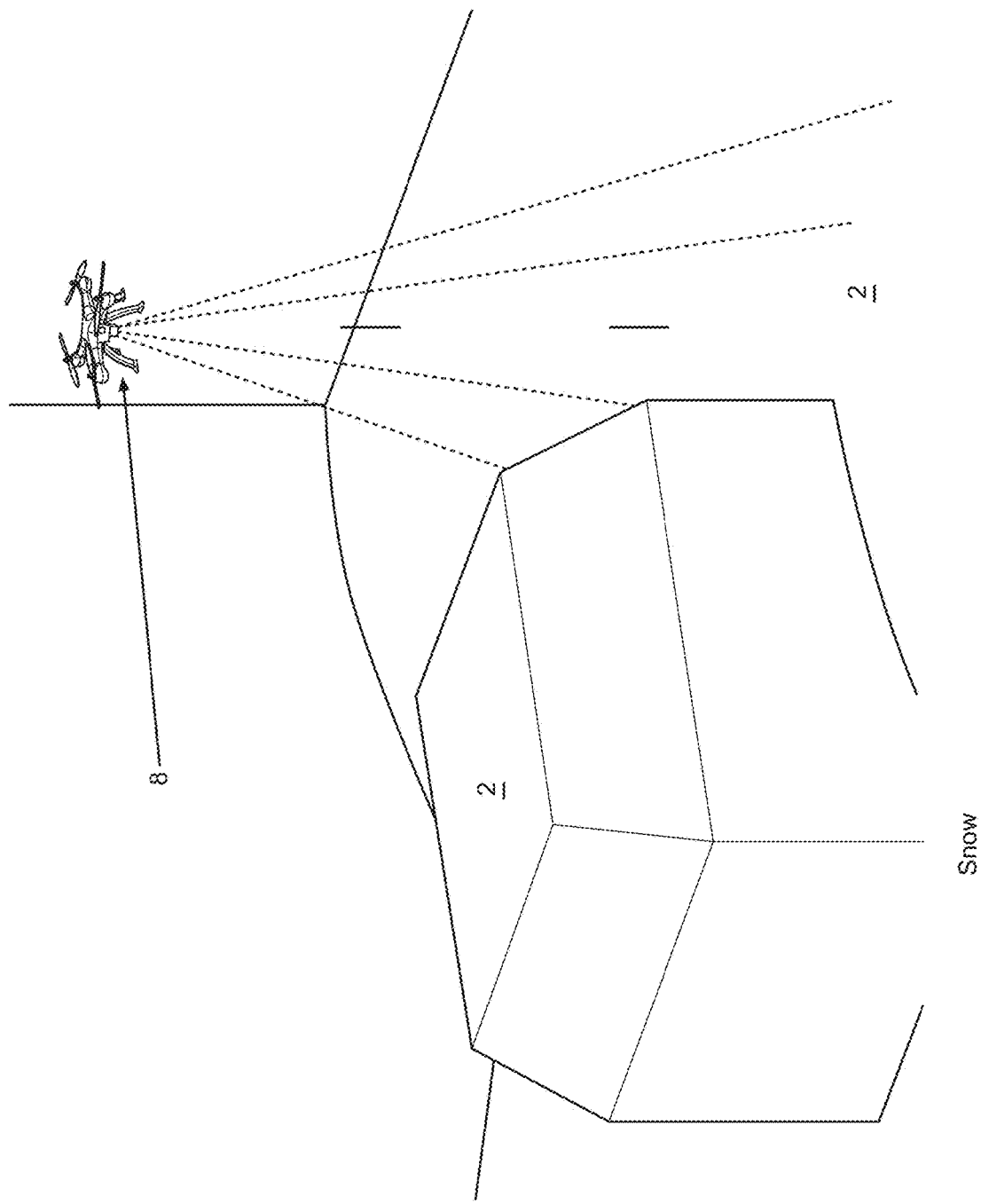
FIG. 4G2

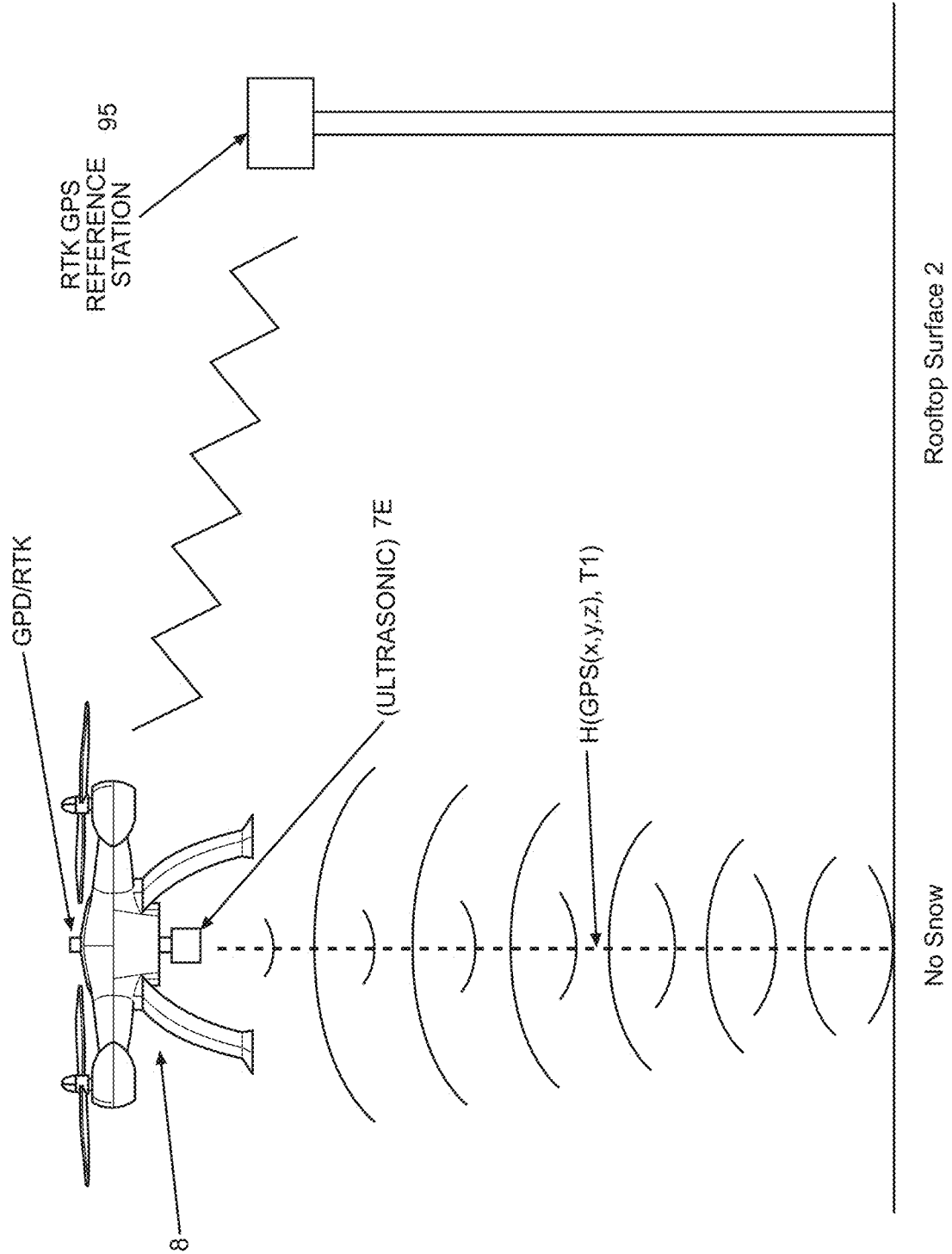
FIG. 4H1

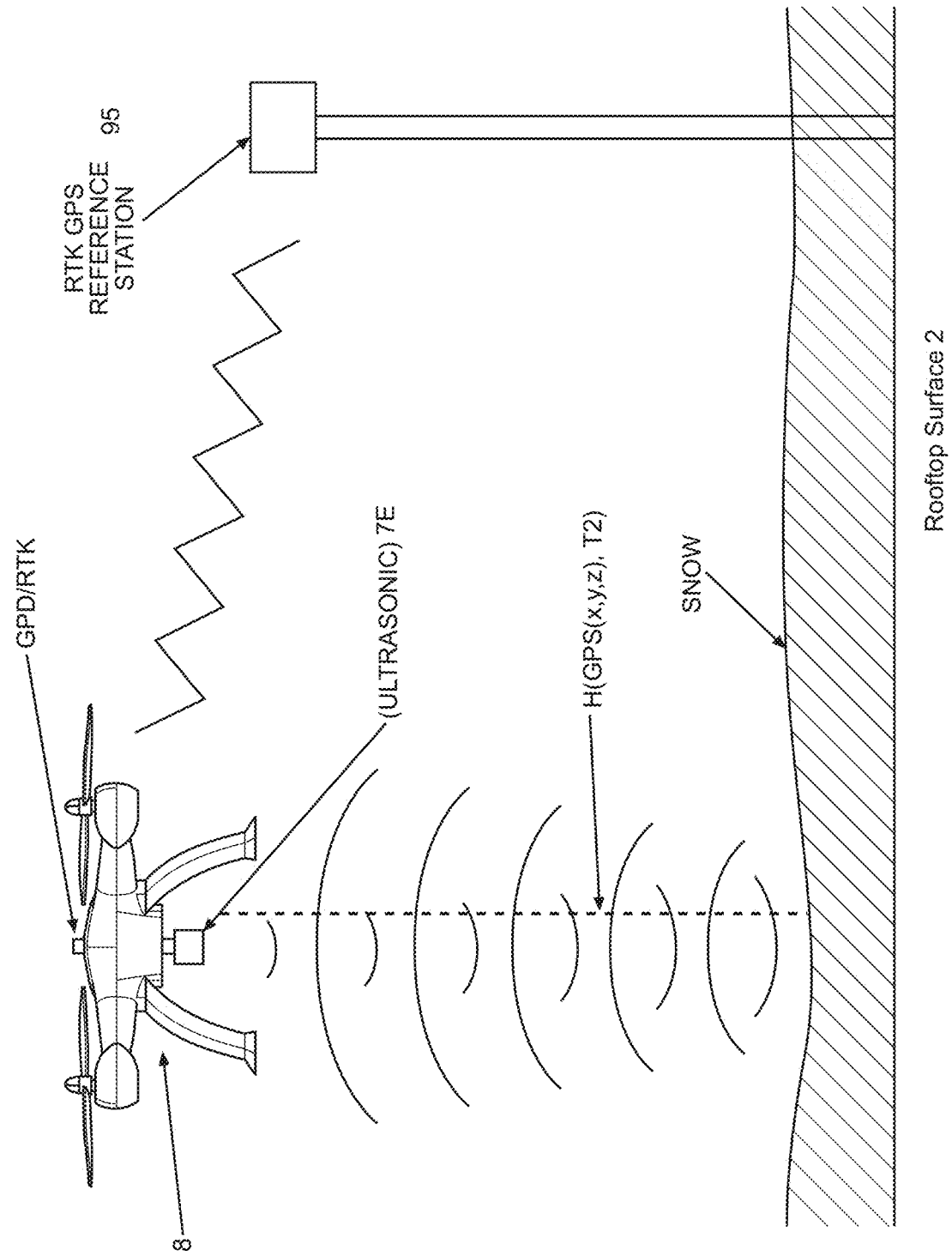
FIG. 4H2

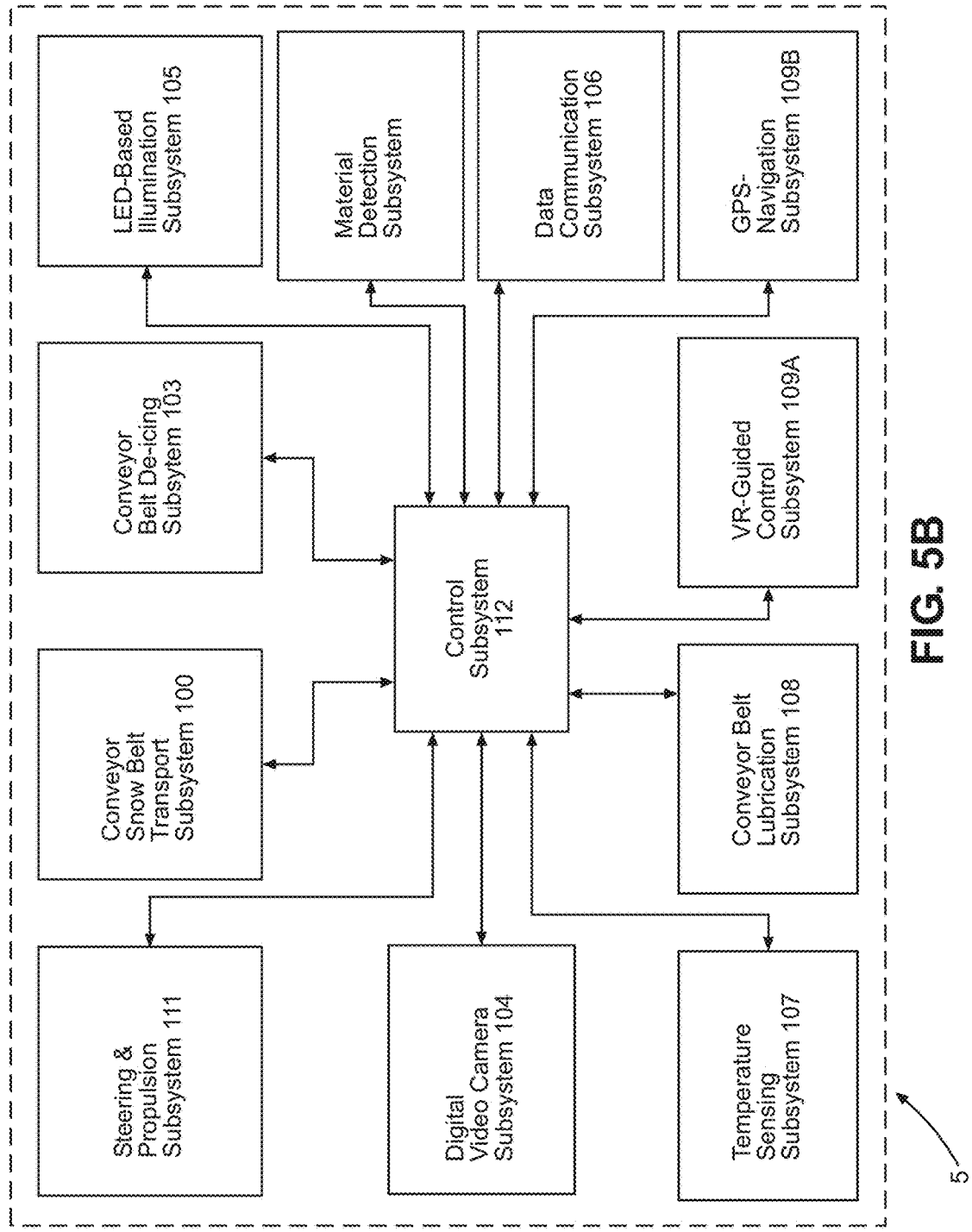

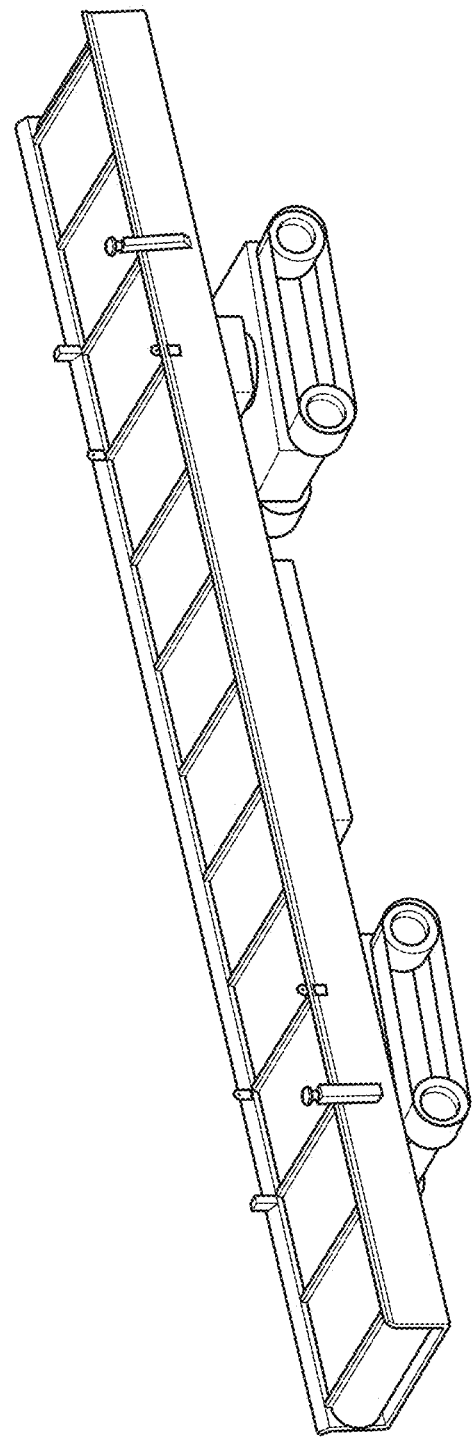
FIG. 5C1A
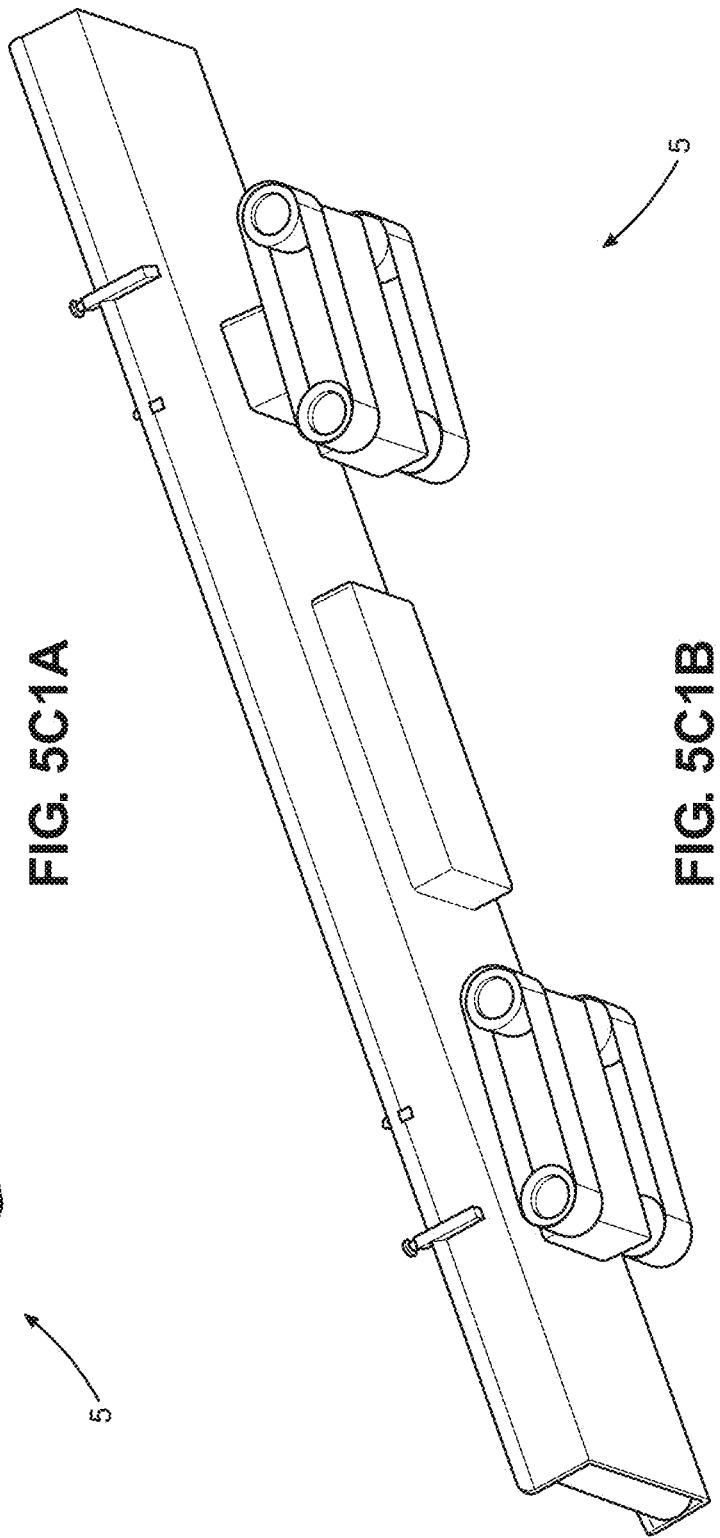
FIG. 5C1B

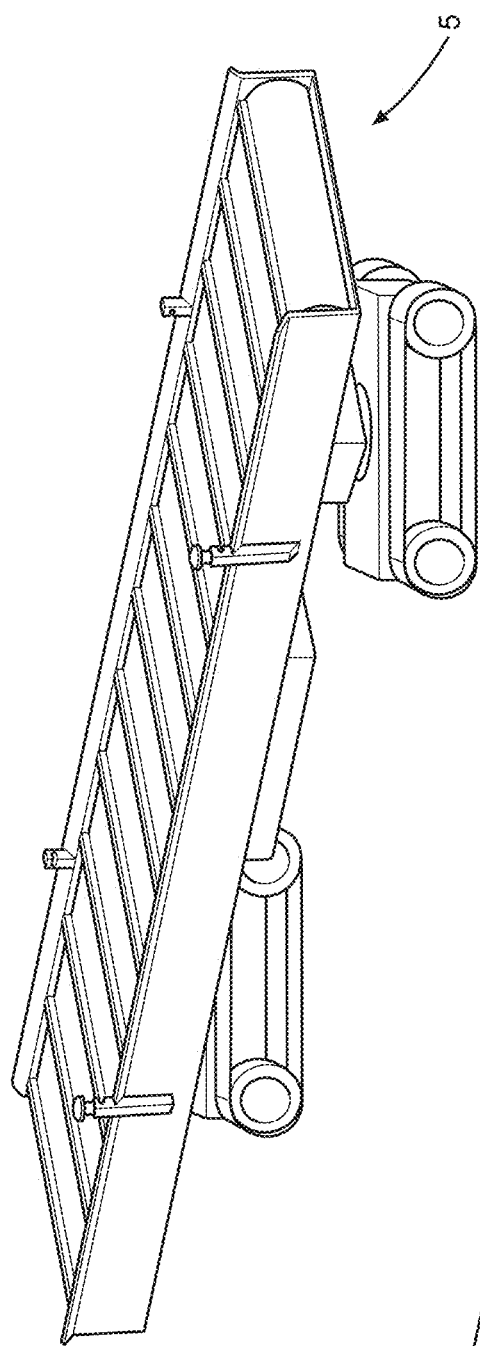
FIG. 5C2A
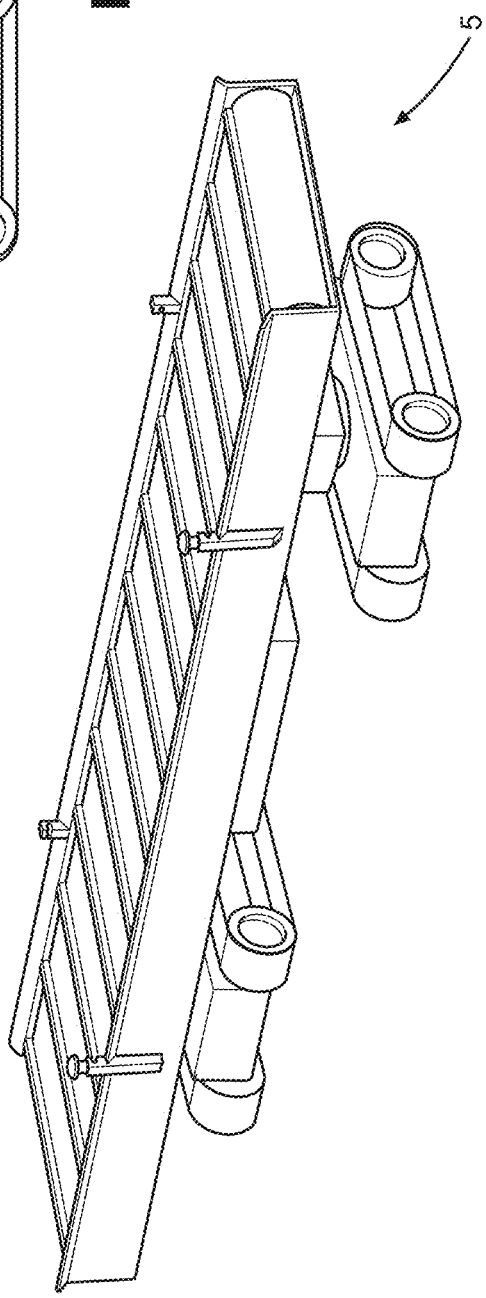
FIG. 5C2B

SYSTEM TURNING ABOUT CENTRAL AXIS
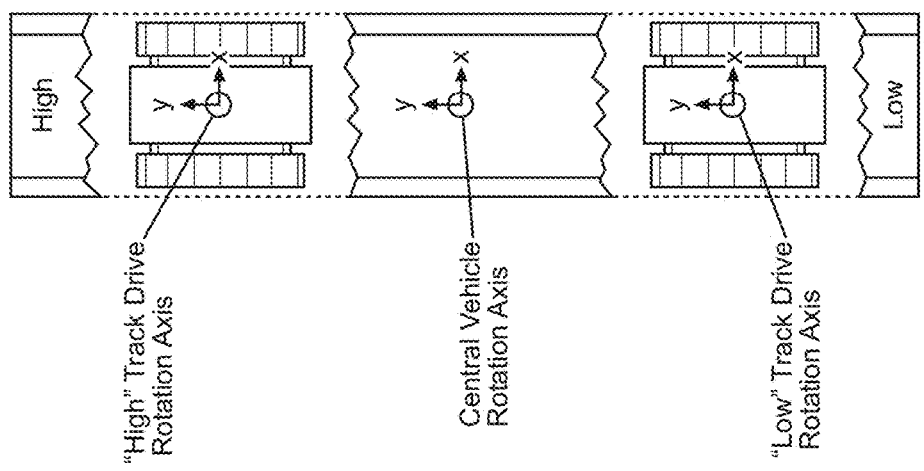
FIG. 5E1    FIG. 5E2    FIG. 5E3

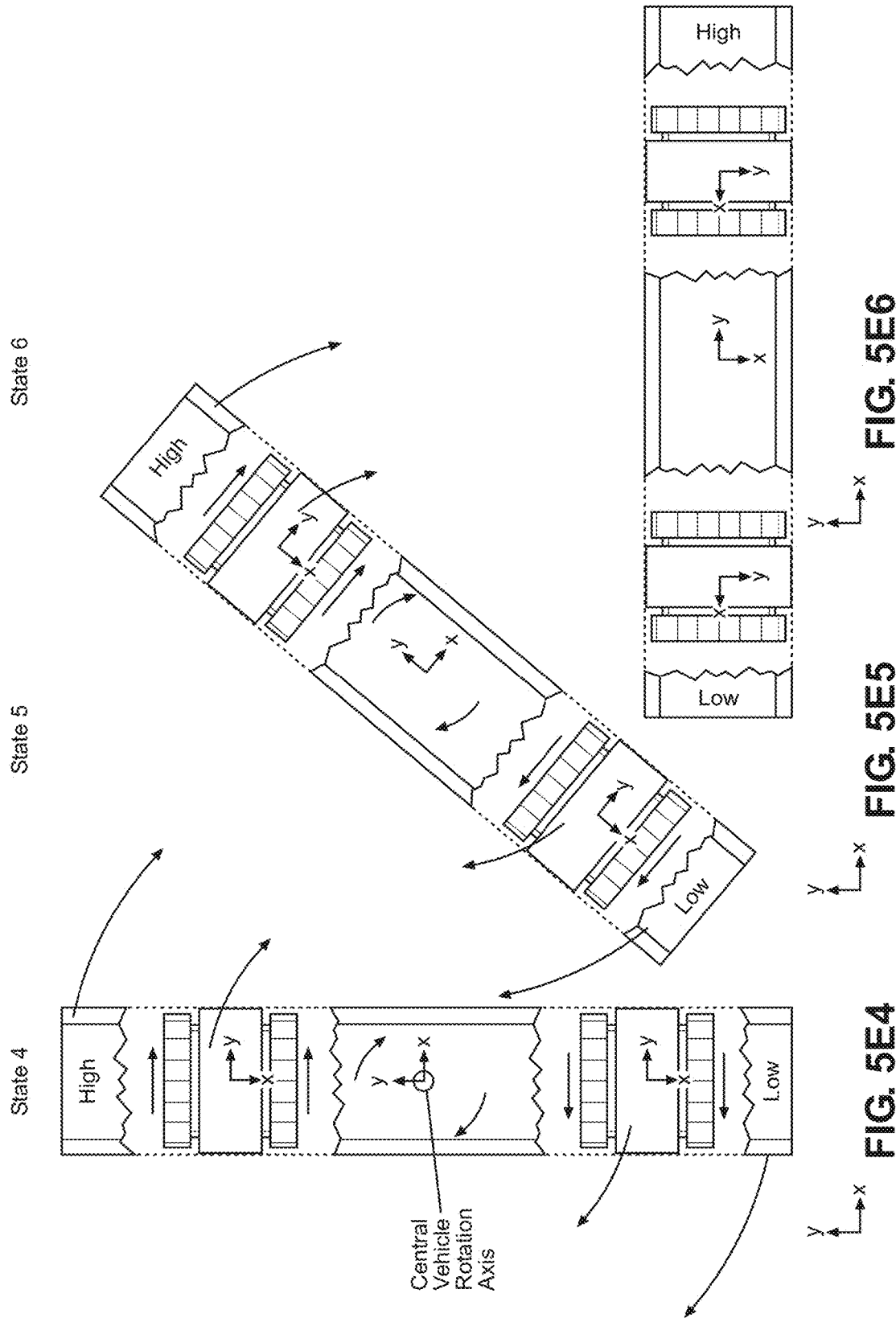

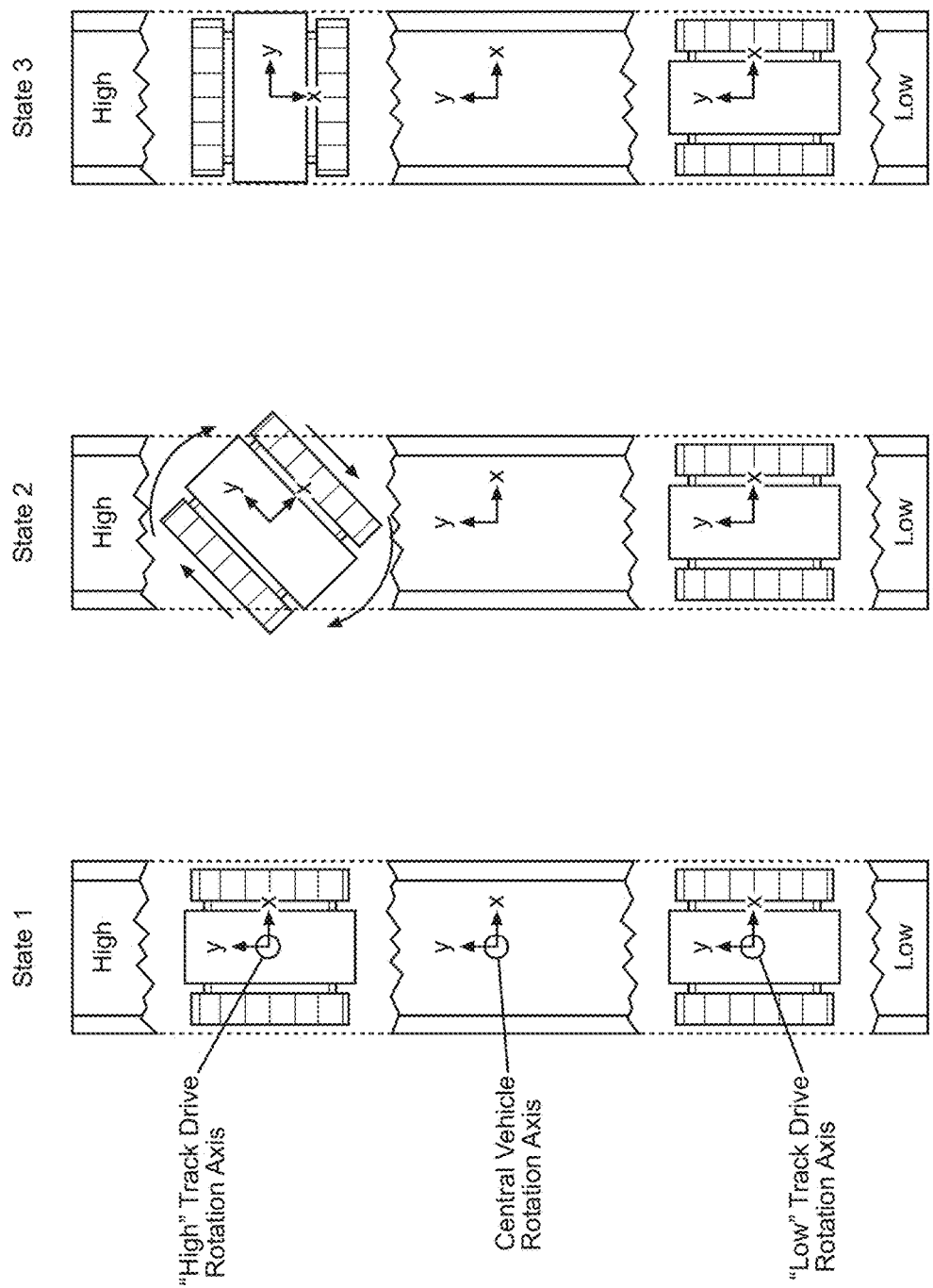
FIG. 5F1, FIG. 5F2, FIG. 5F3

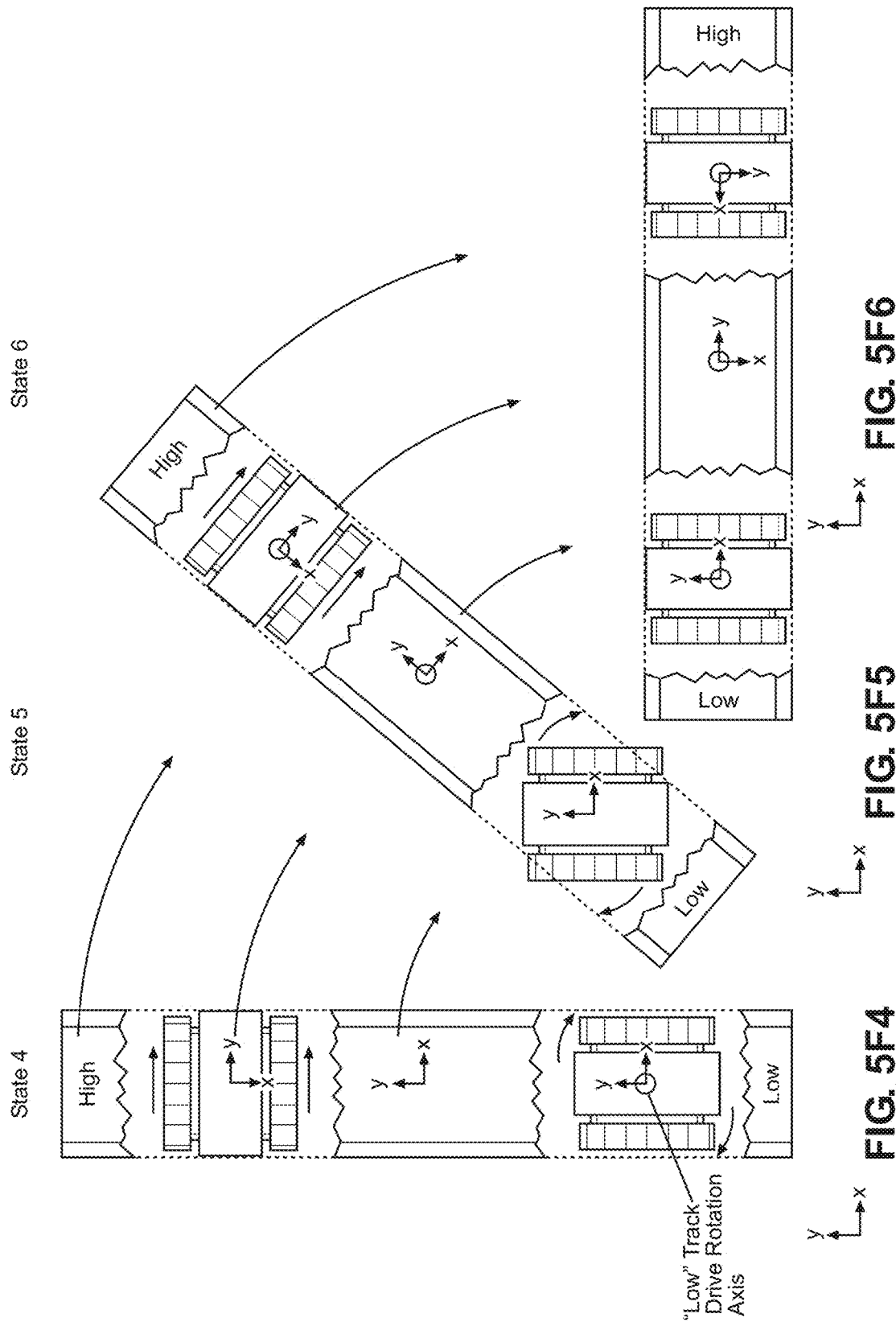

LATERAL TRANSLATION
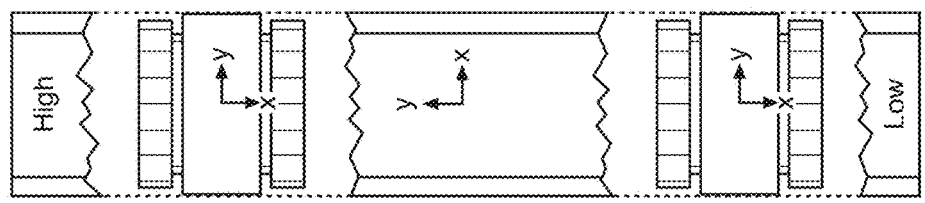
FIG. 5G2
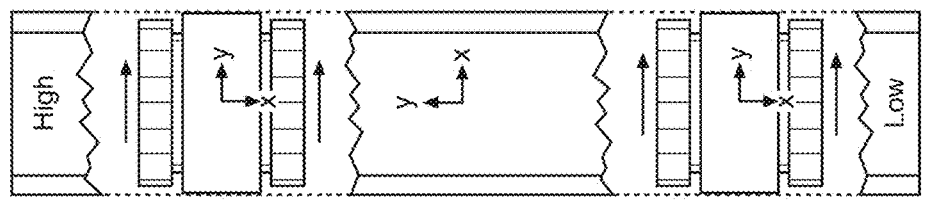
FIG. 5G1

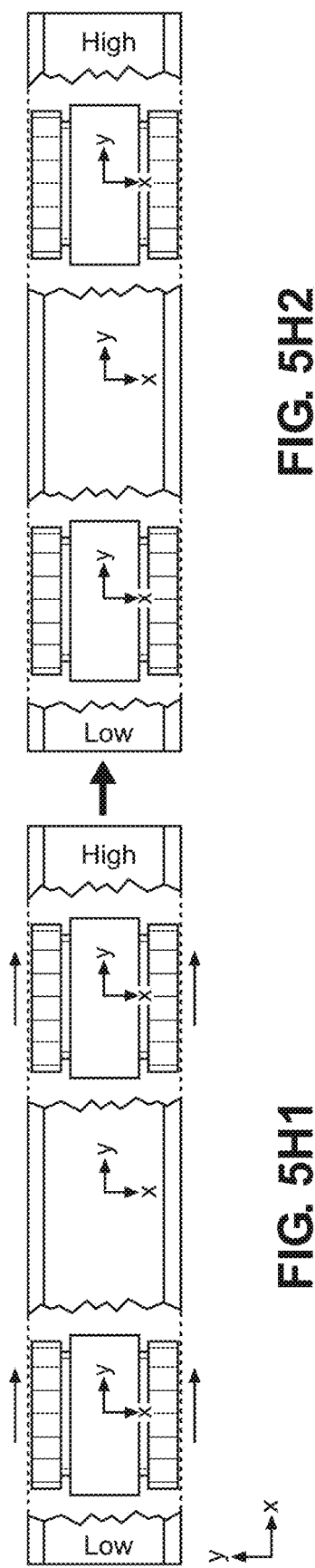

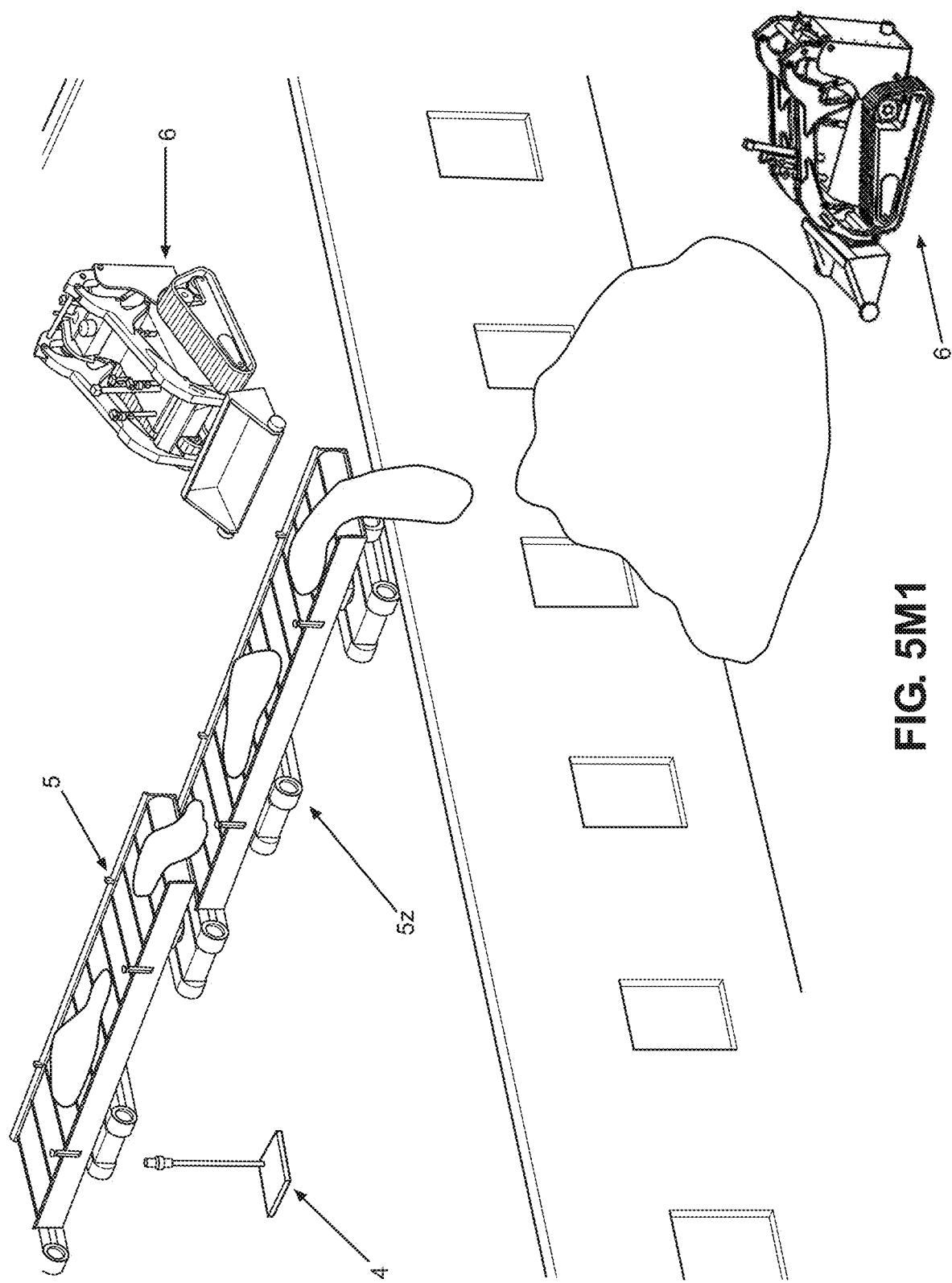
FIG. 5M1

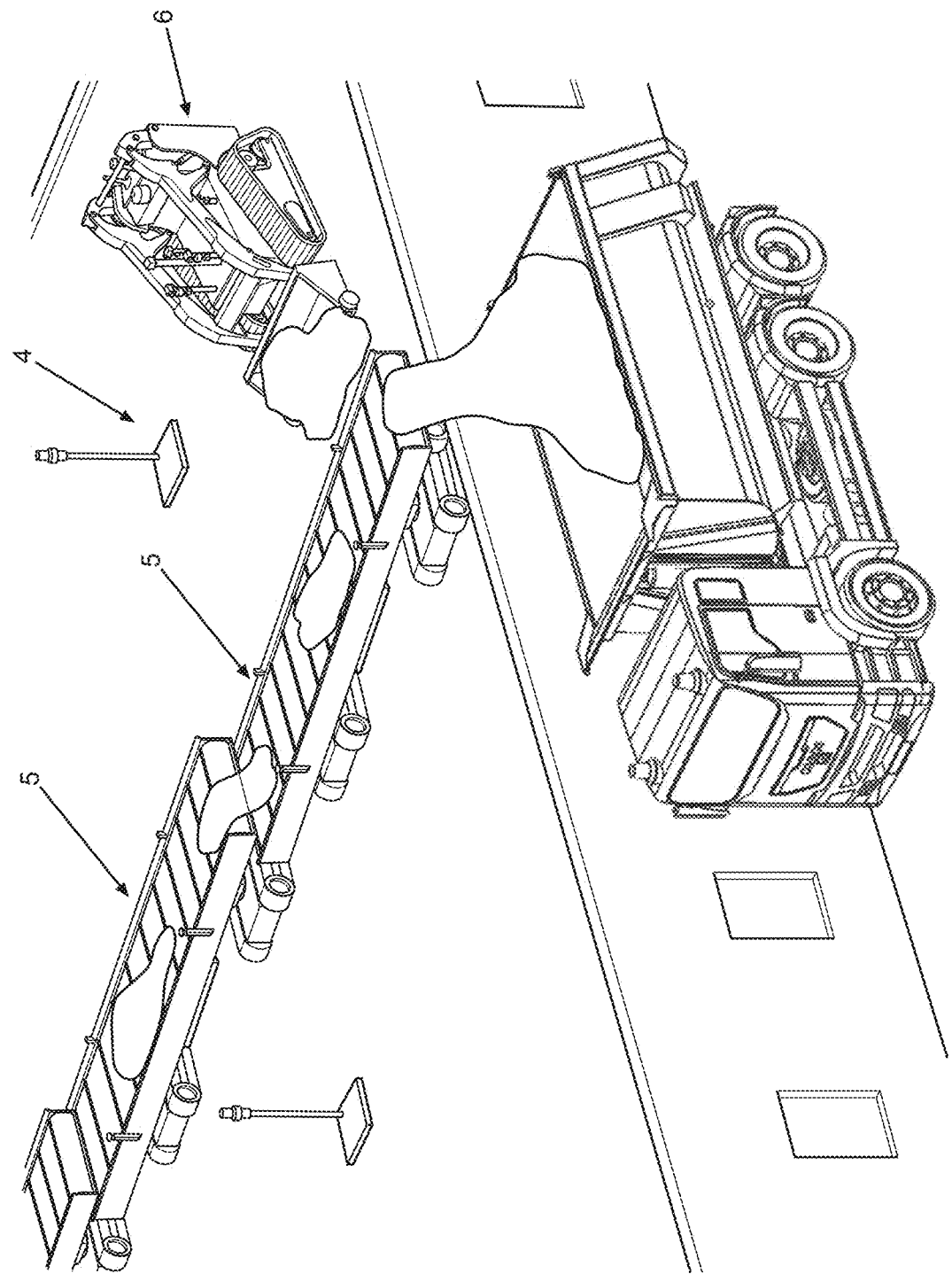
FIG. 5M2

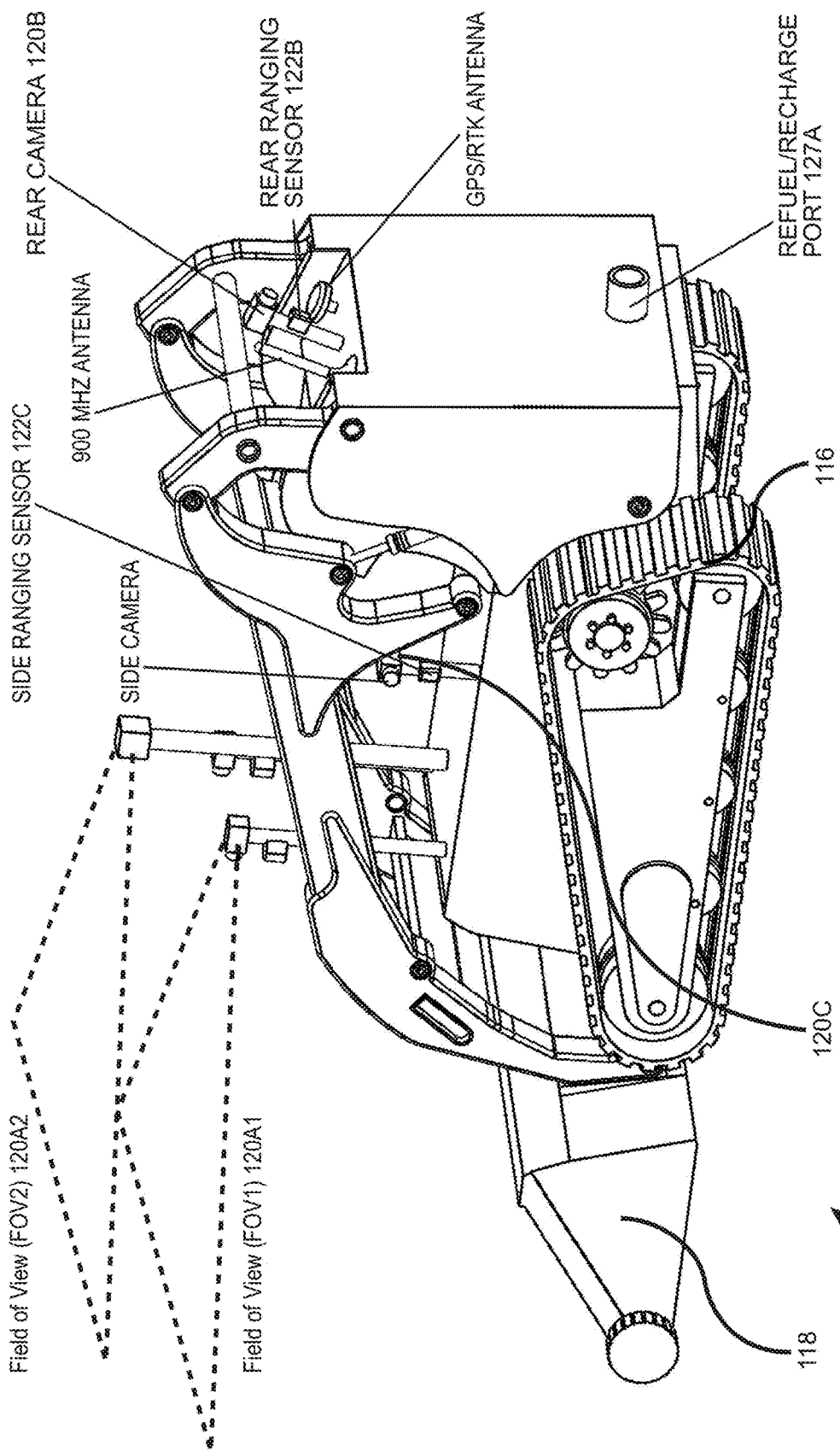
FIG. 5P1

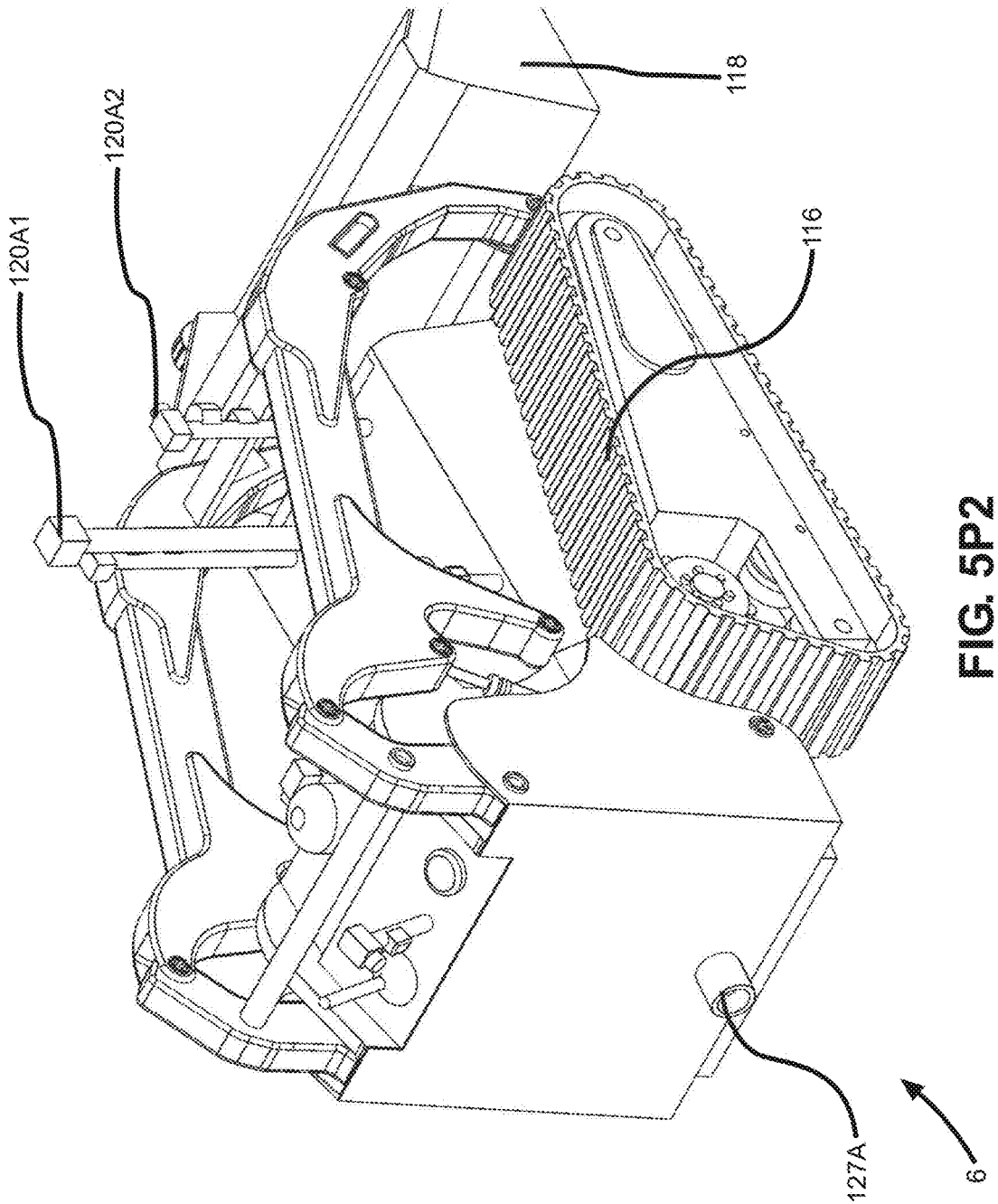
FIG. 5P2

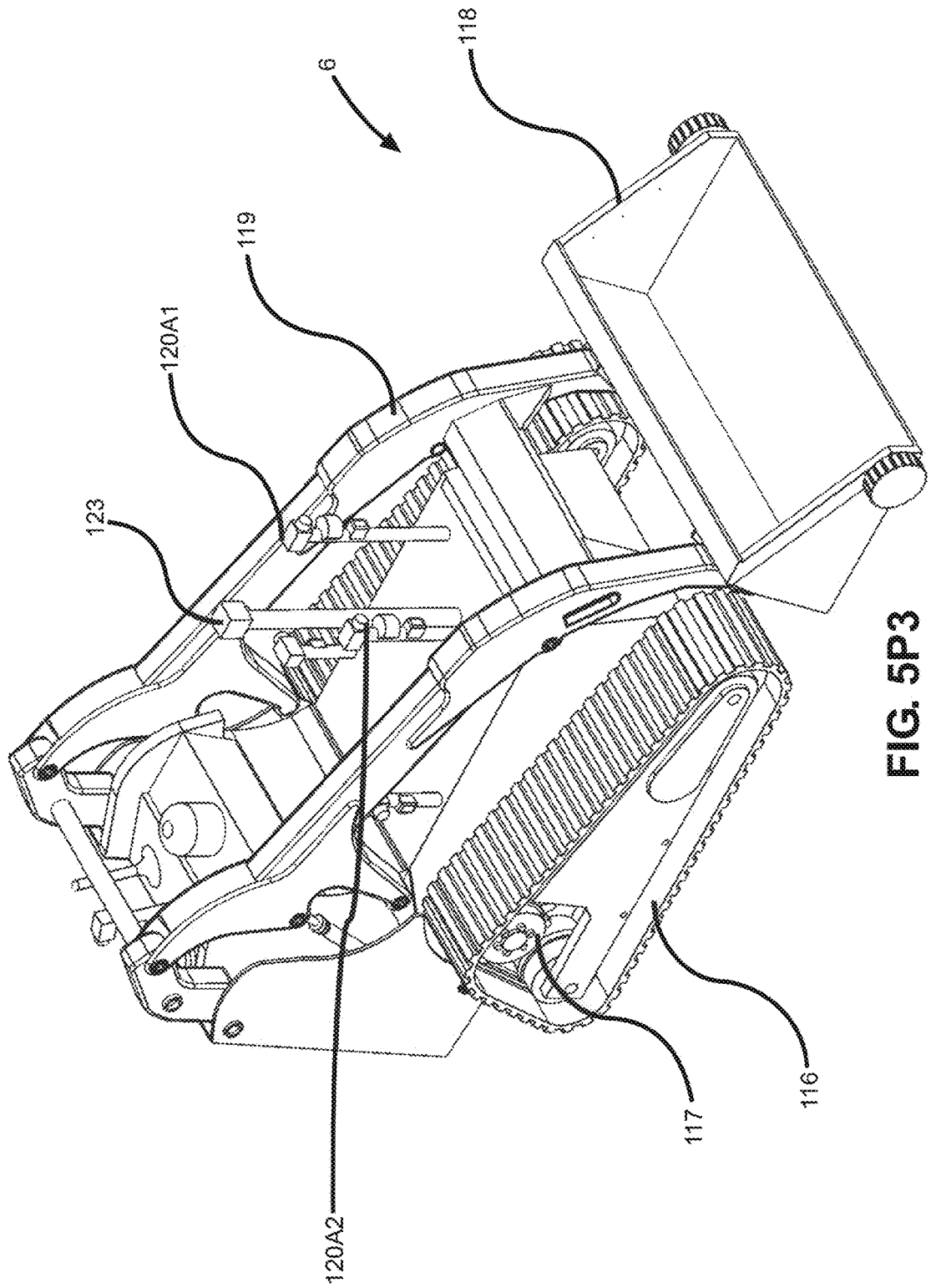
FIG. 5P3

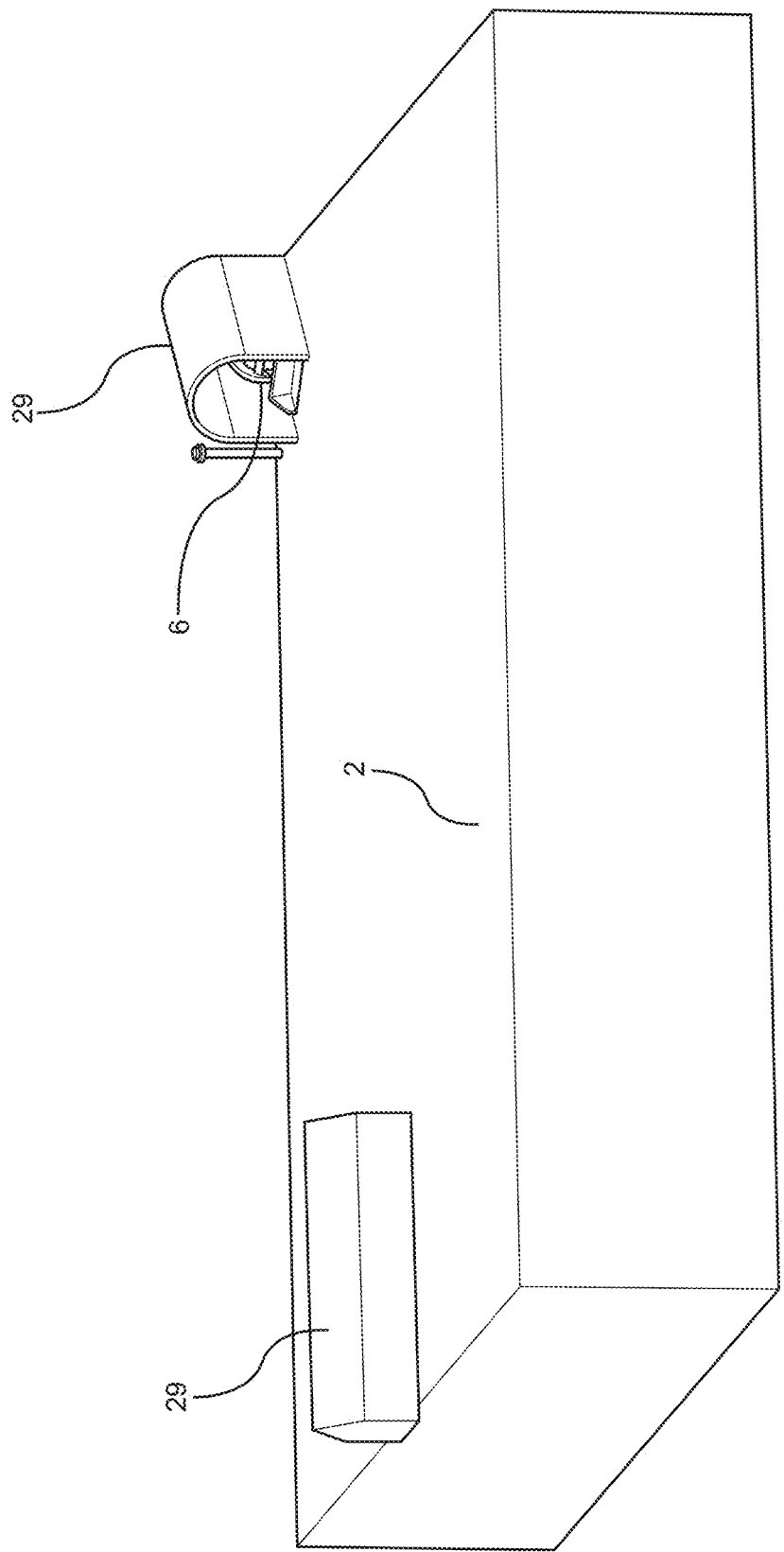
FIG. 5P4

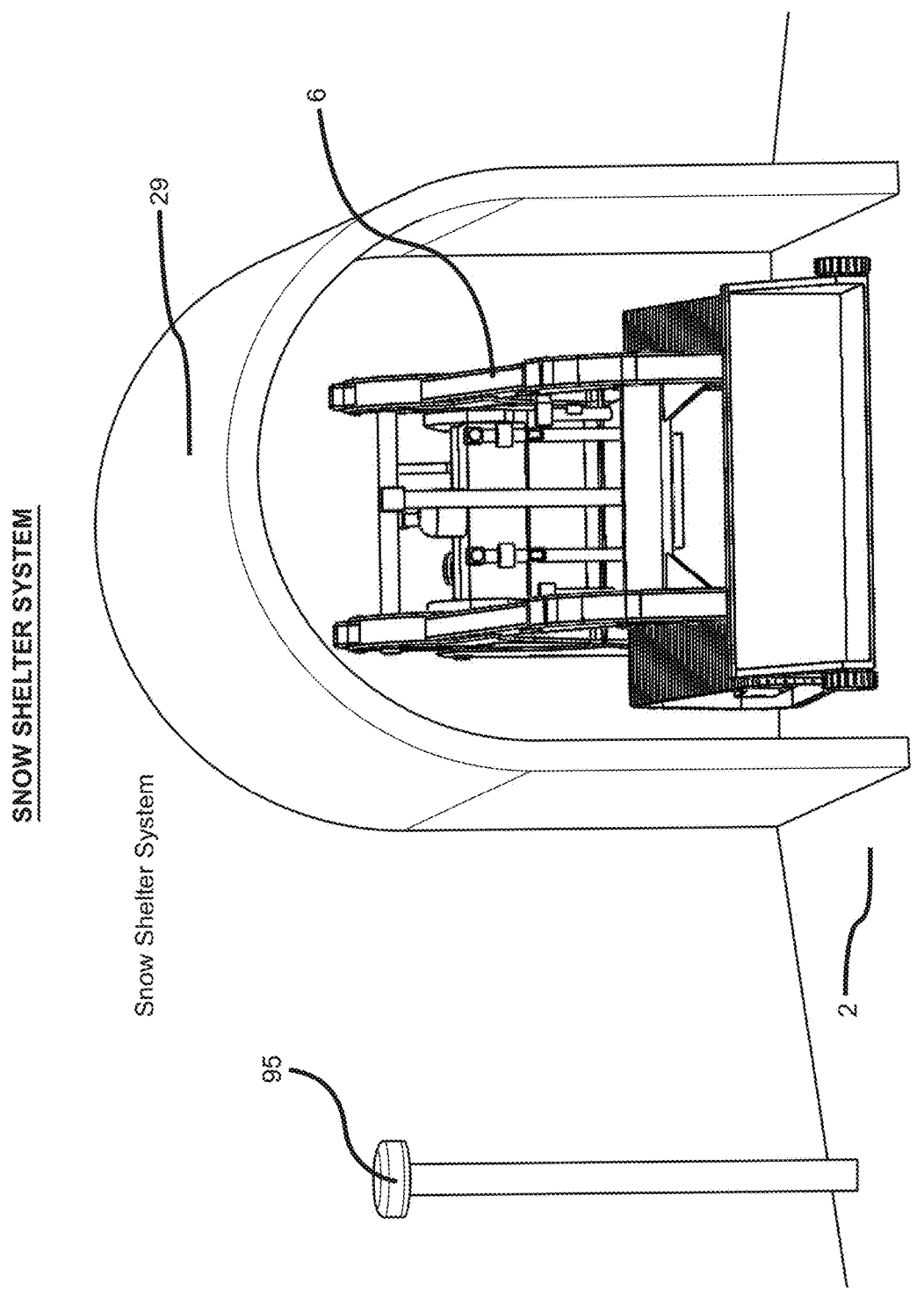
FIG. 5P5

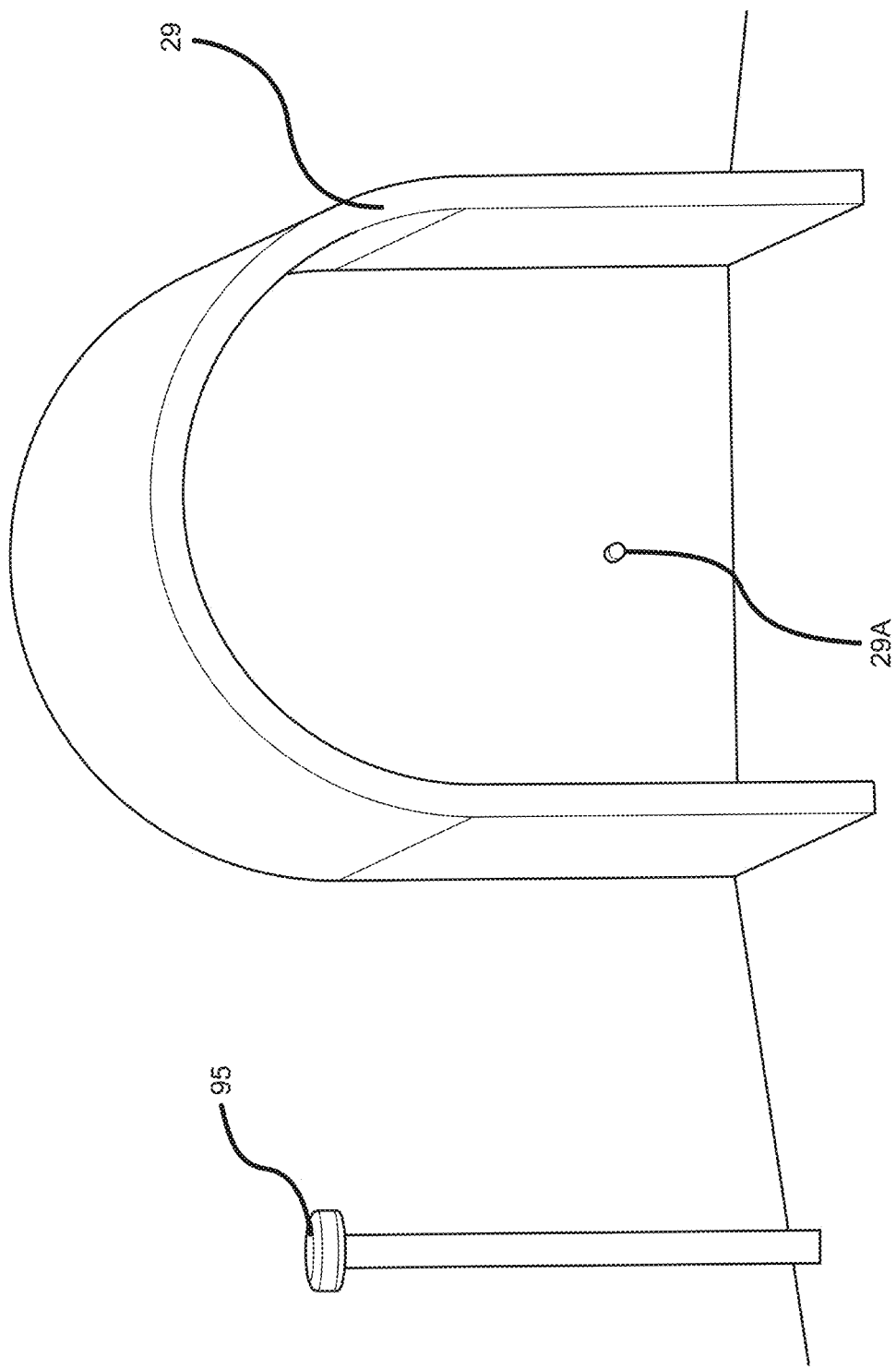
FIG. 5P6

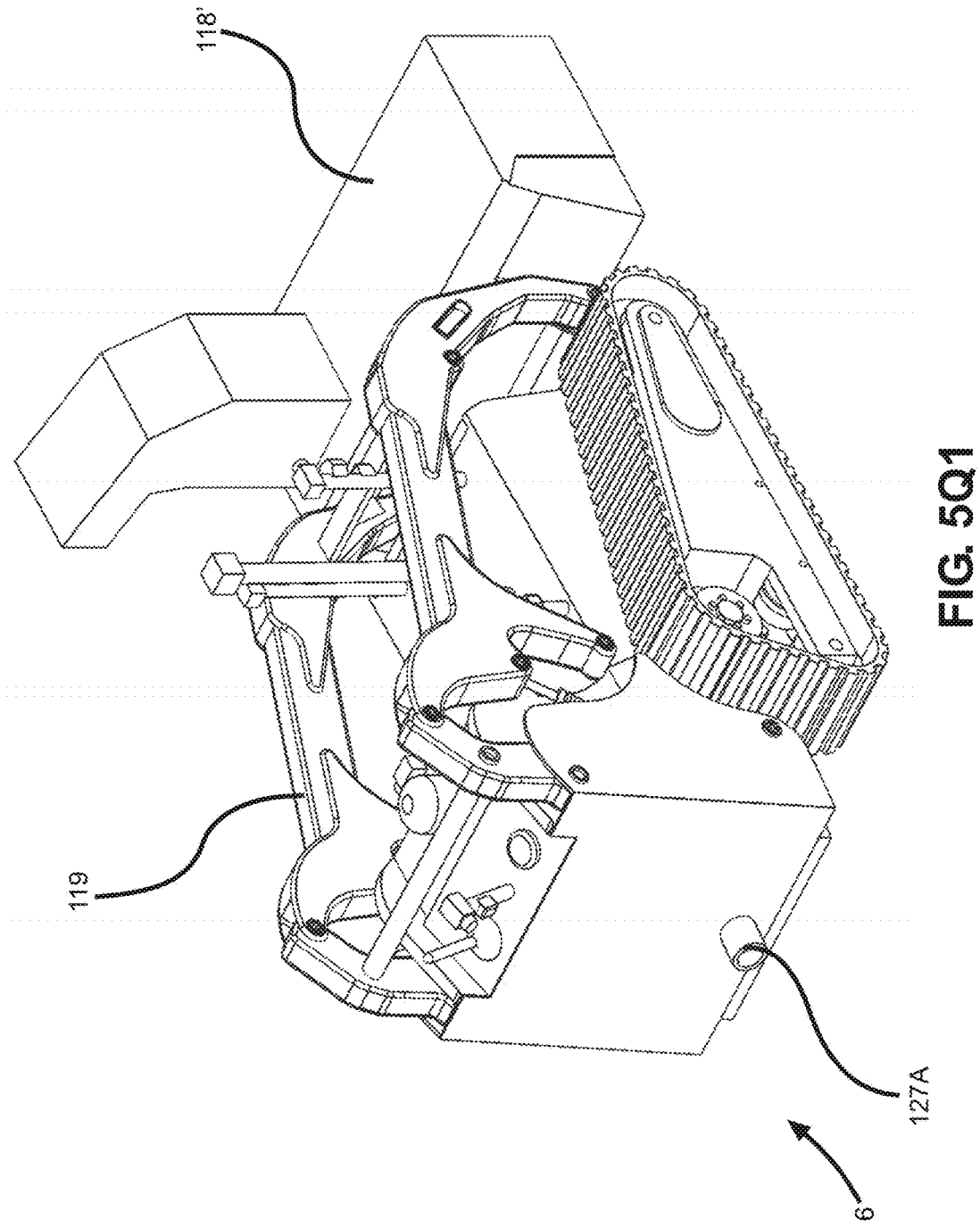
FIG. 5Q1

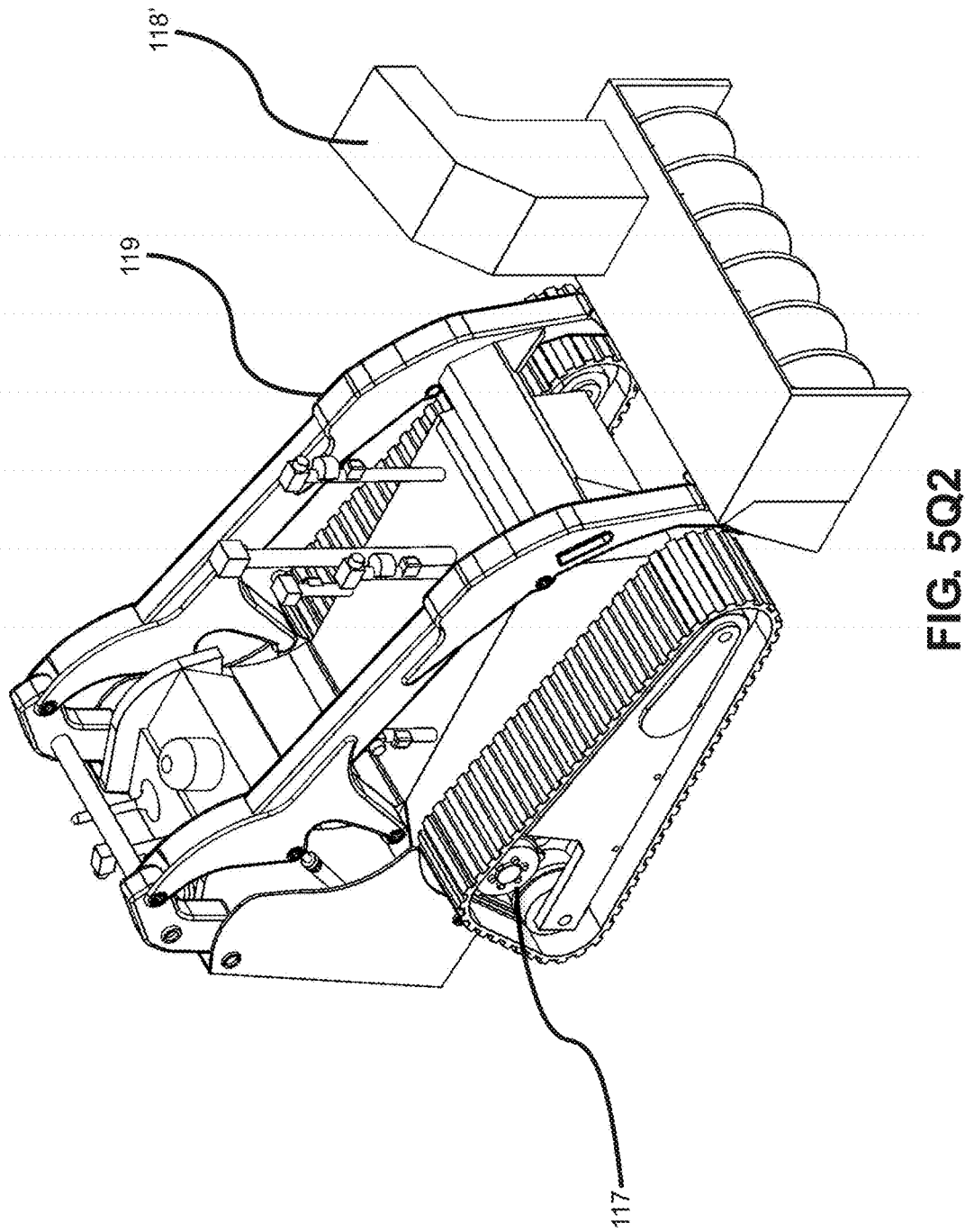
FIG. 5Q2

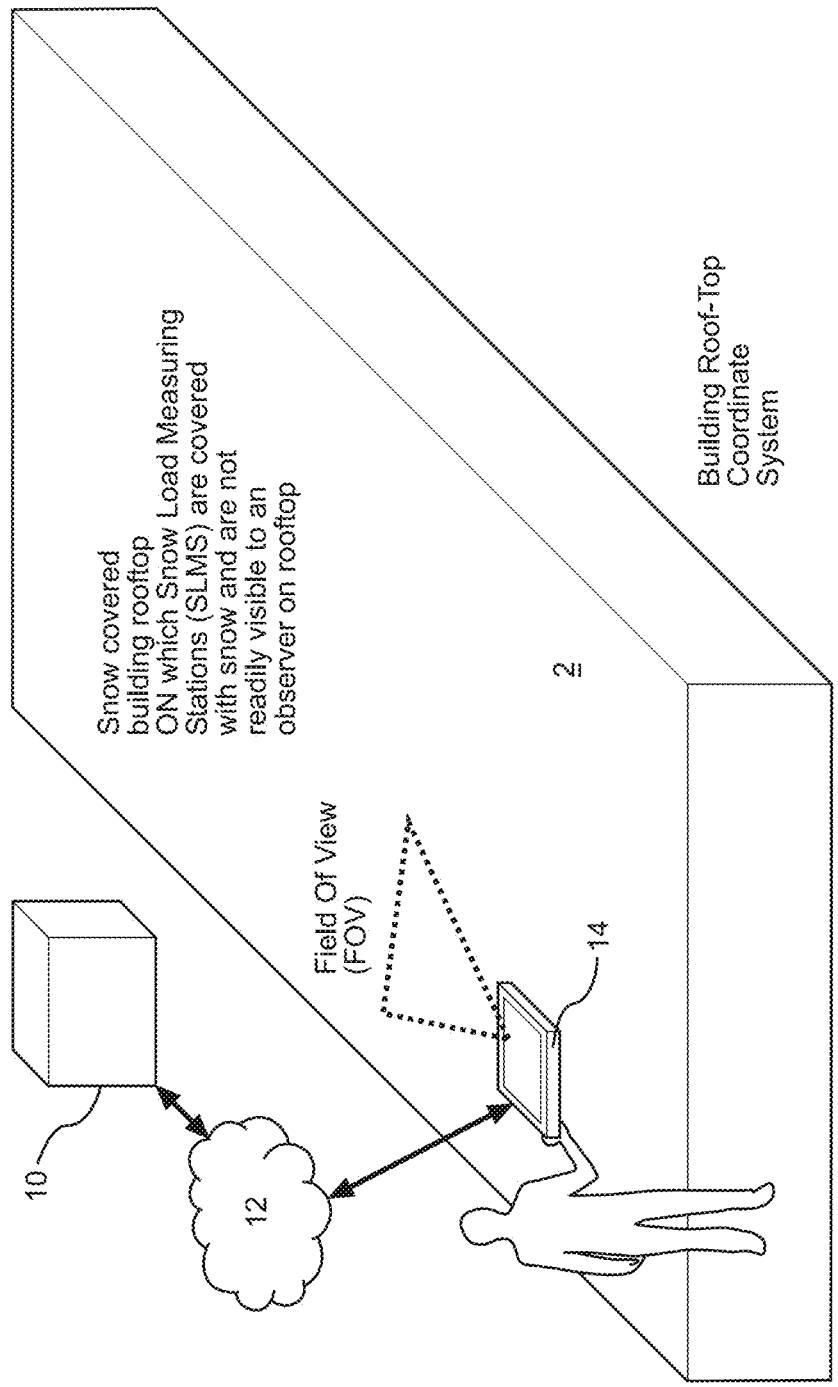

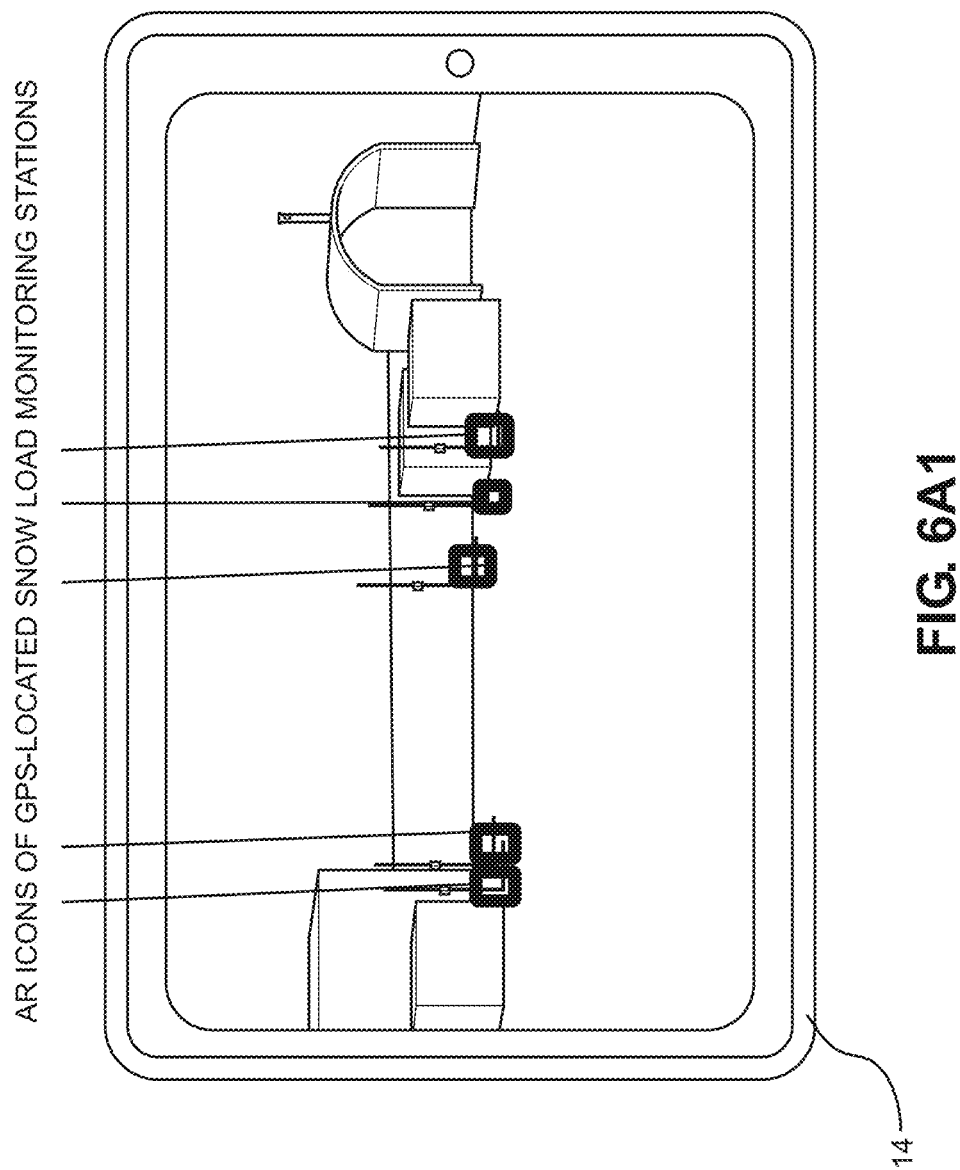
FIG. 6A1

AR BASED METHOD OF INSPECTING SNOW LOADS ON BUILDING ROOFTOP SURFACES USING AR-GUIDED MOBILE ROOFTOP NAVIGATOR

A: Receiving A Snow Load Alarm Notification from a BIGADS System and accessing a Hand-Held AR-Guided Rooftop Navigation and Inspection Device B: Holding The Hand-Held AR-Guided Rooftop Navigation and Inspection Device on the Operator's Hand, Viewing The Device's Field of View (FOV) While (i) Observing Augmented Reality (AR) Images of GPS-Indexed Snow Load Measuring Stations, (ii) Inspecting Rooftop Conditions, (iii) Making Audio and Video Recordings of the Rooftop, and (iv) Taking notes and linking the same to the Snow Load Alarm Event.

C: Sending the Snow Load Event Inspection Report to the Building Mangement and Maintenance Team Members, and Determine a Plan of Resolution for the Snow Load Alarm Event (i.e. execute Snow Removal Plan)

FIG. 6D

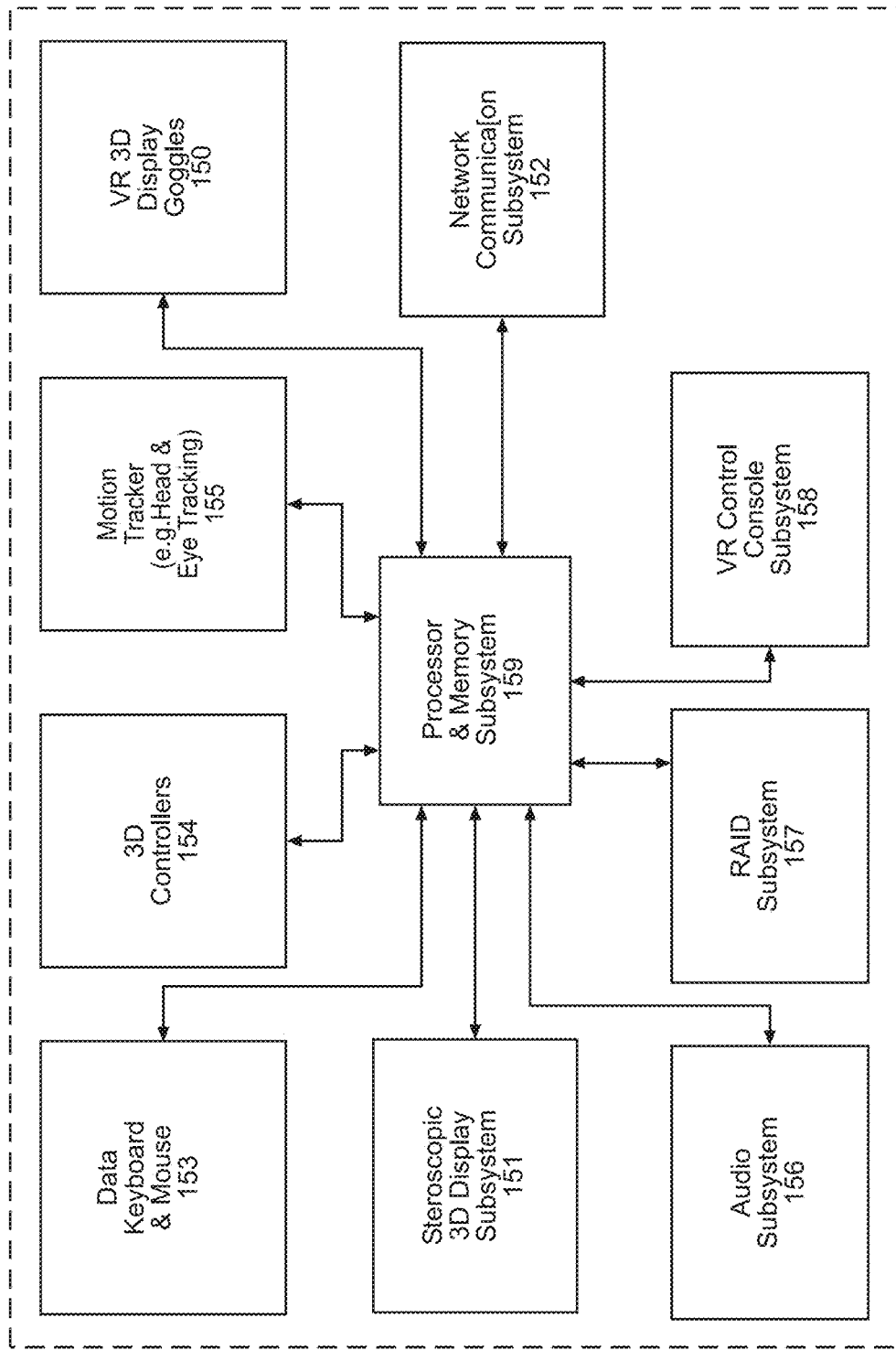
FIG. 7B1

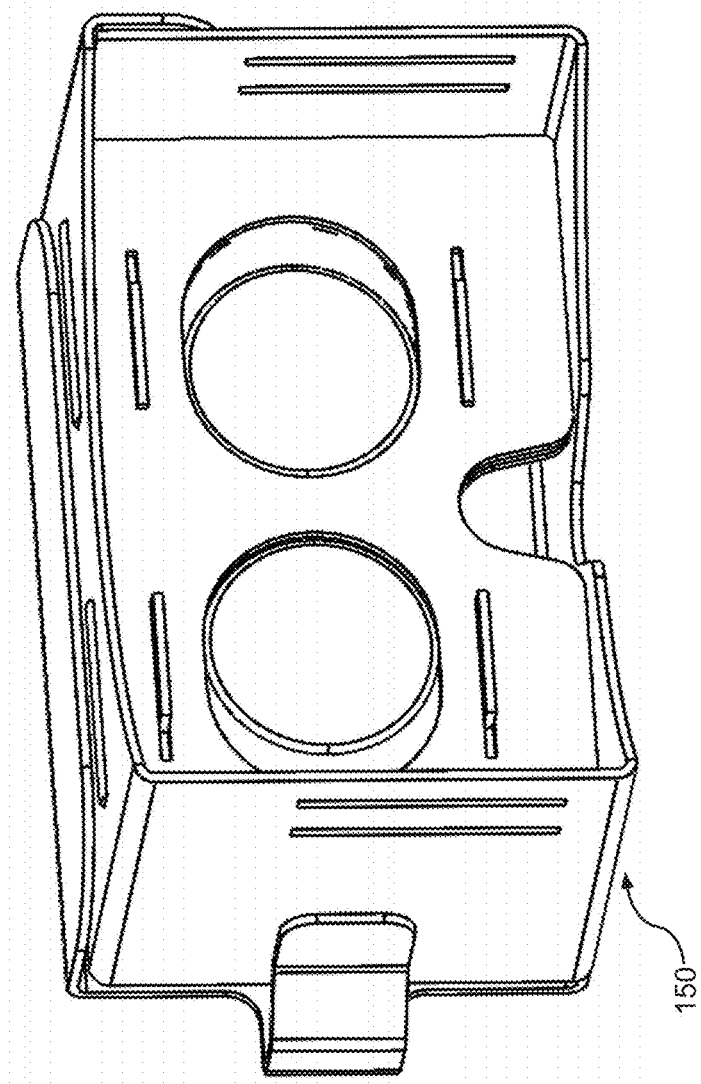
FIG. 7B2

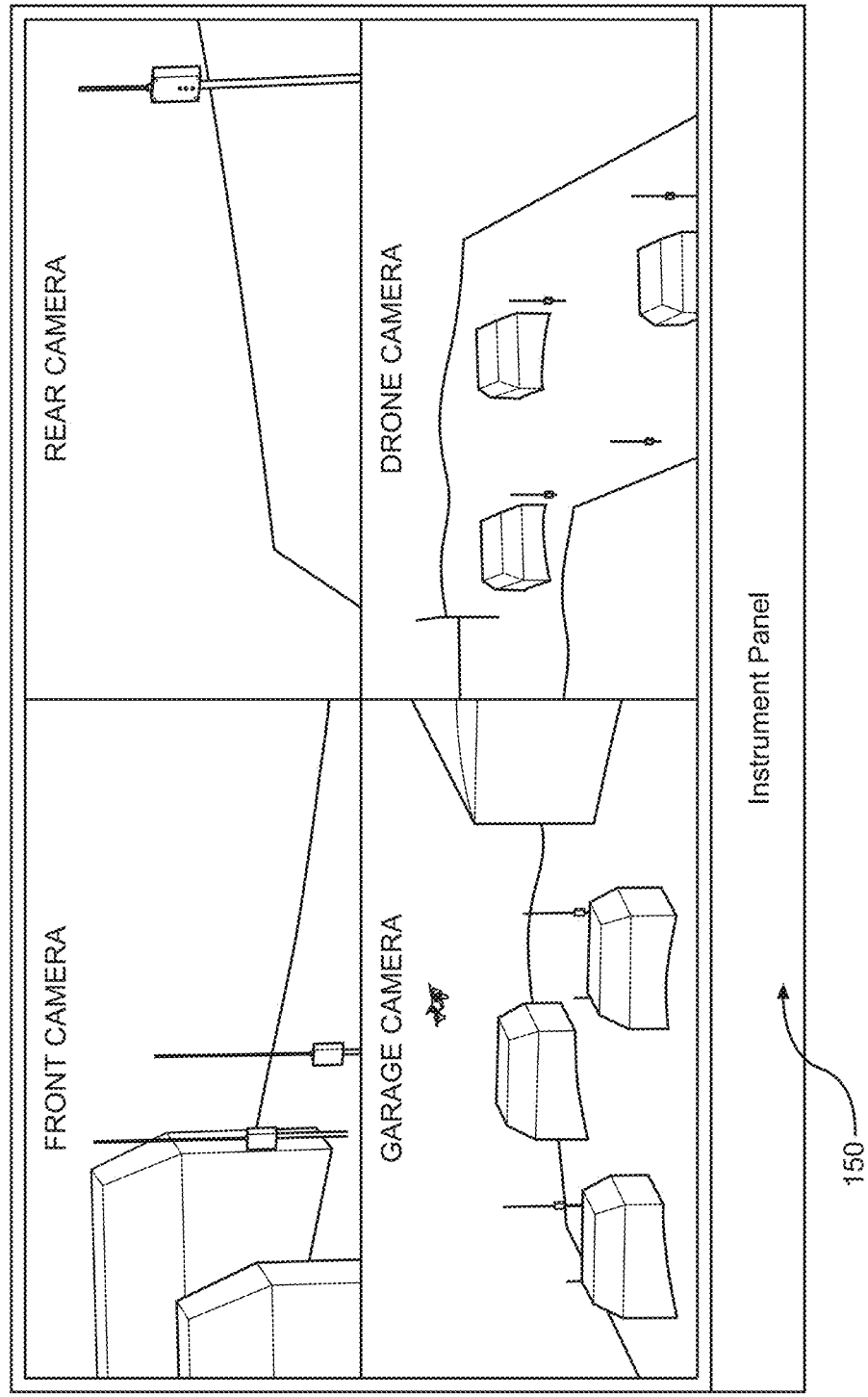

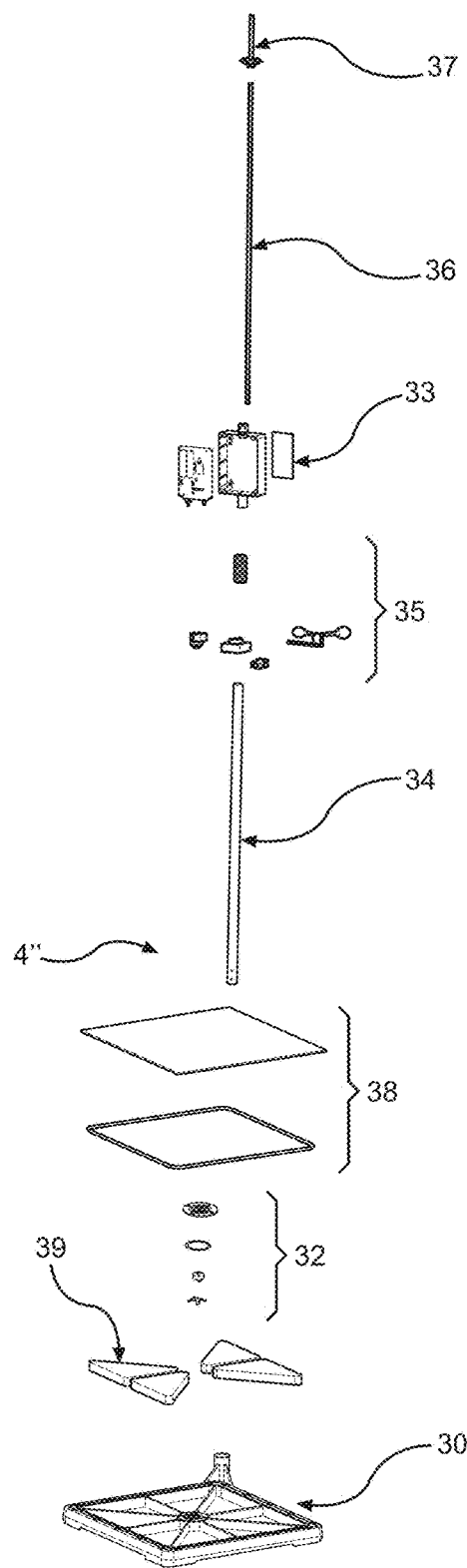
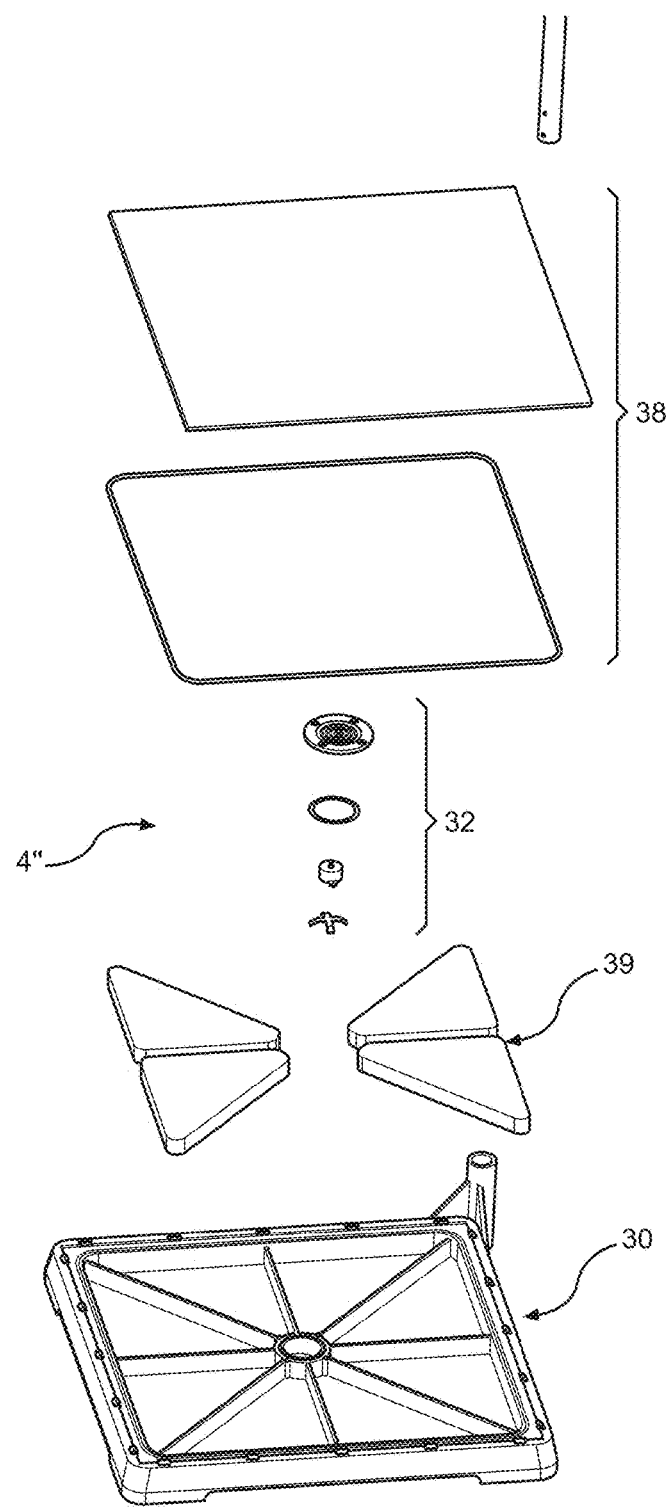
FIG. 8F
FIG. 8G

MEASURING DISTRIBUTED SNOW LOADS USING A DEFLECTION MEASUREMENT METHOD

FOLDED SHEET METAL BONDED-TOGETHER WEIGH PLATE AND BASE
USING SINGLE LOAD CELL DEFLECTION MEASUREMENT

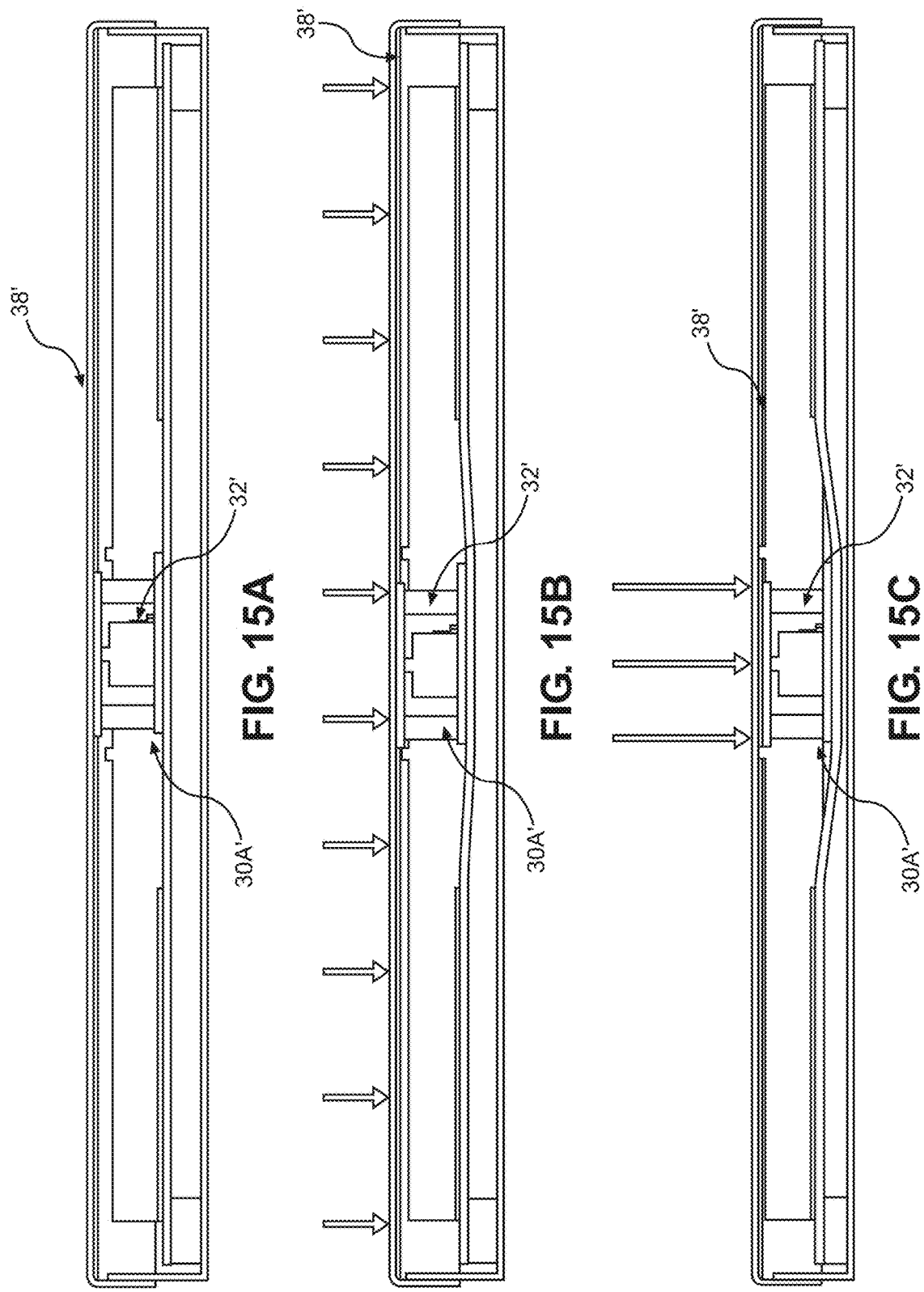

APPARATUS FOR CALIBRATING FORCE SENSOR EMPLOYED IN SNOW LOAD SENSING BASE MODULE

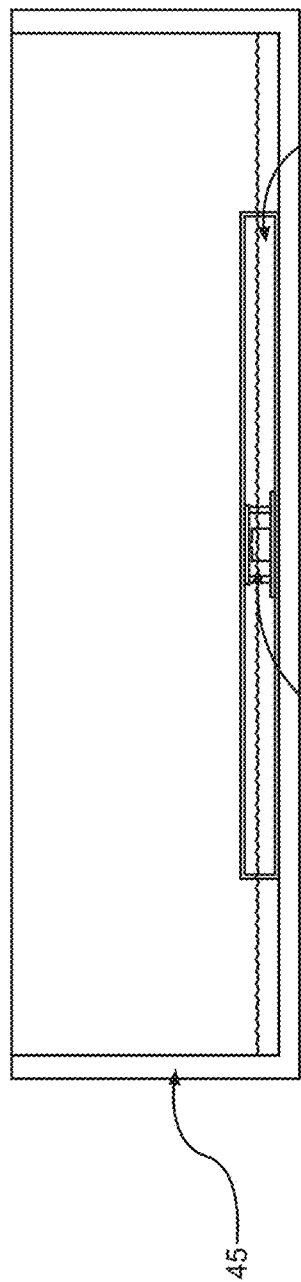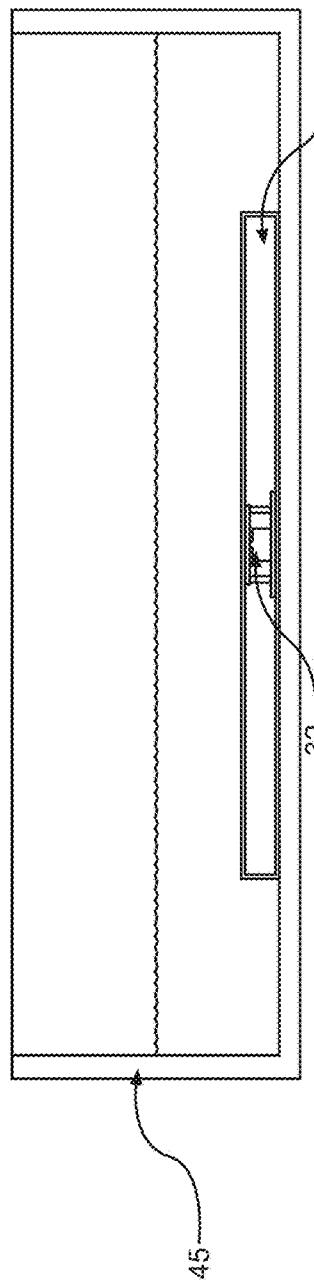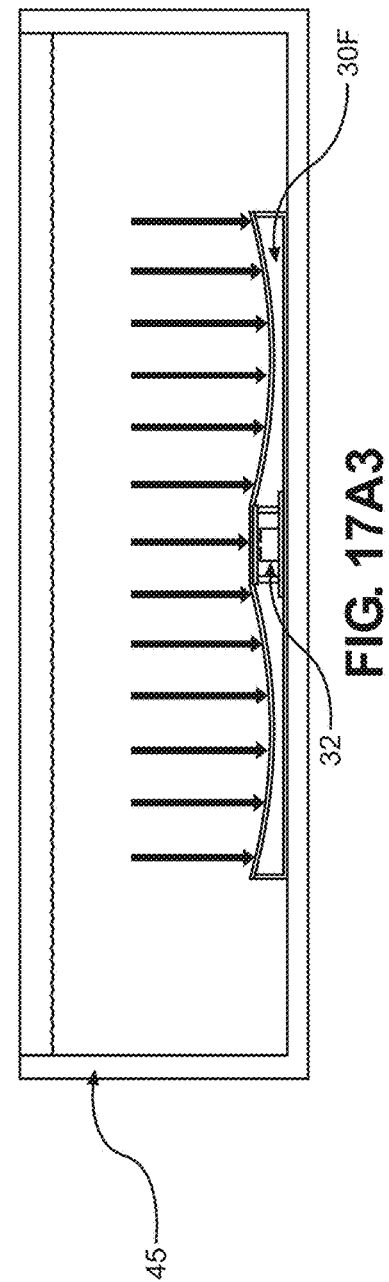

Method of Calibrating and Programming Snow Load Processing Module of the Present Invention Employing Deflection Based Measurement Principles

Step A: Mounting snow load sensing module to be tested in the bottom of a box like structure wherein the walls of the box like structure spatially correspond with the perimeter boundaries of the snow load sensing surface.

Step B: Installing flexible fluid containing membrane over the sensor inside the box like structure.

Step C: Adding quantified amounts of snow/ice loading material into the box, and measure the electrical output of the sensor in the snow load sensing module.

Step D: Correlating the depth of the snow/ice loading material with the voltage output of the sensor.

Step E: Using the depth vs. voltage data to create a mathematical formula that provides a voltage in response to snow pressure.

Step F: Loading the mathematical formula into persistent memory of the data processing module.

FIG. 17B

FIRST ILLUSTRATIVE EMBODIMENT OF THE STRAIN GAUGE FORE SENSOR (LOAD CELL) HAVING AN INJECTION MOLDING HOUSING

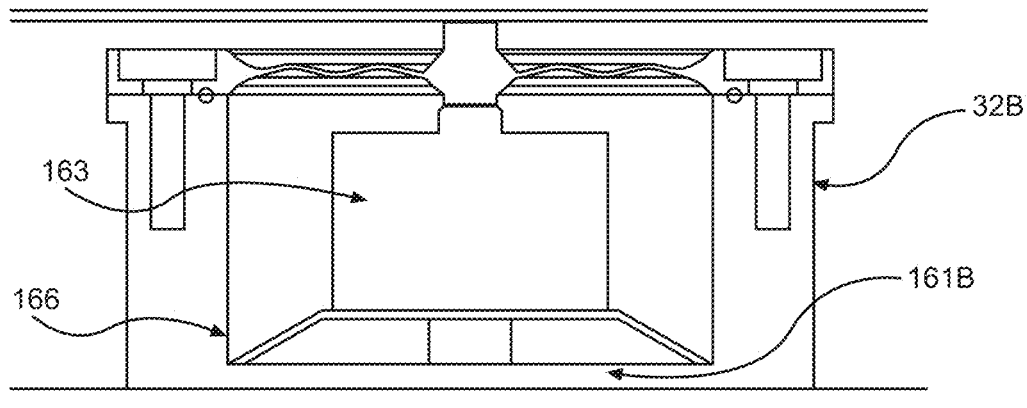
FIG. 20C1
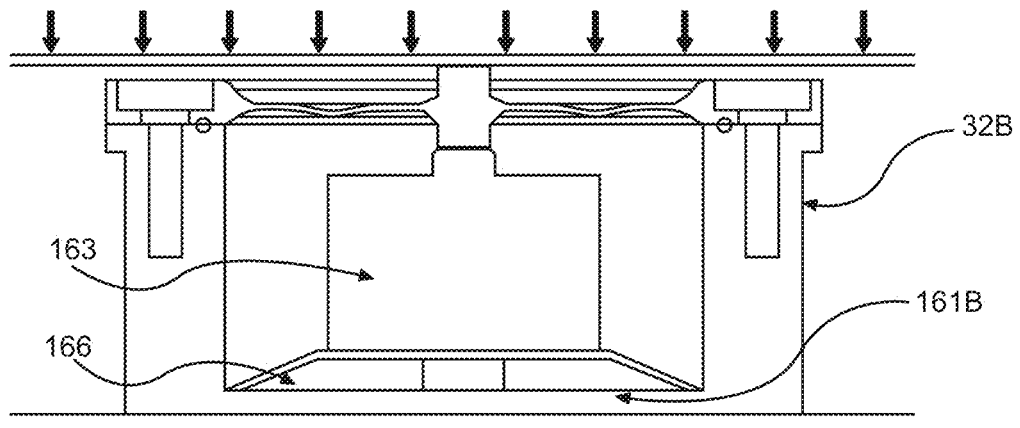
FIG. 20C2
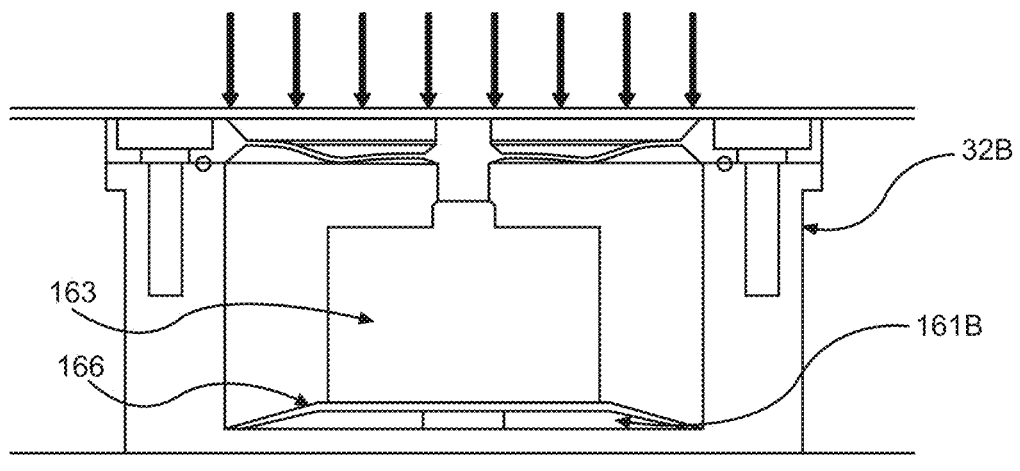
FIG. 20C3

FOURTH ILLUSTRATIVE EMBODIMENT OF THE STRAIN GAUGE FORCE SENSOR (LOAD CELL) EMPLOYING A RUBBER BELLOWS BETWEEN RIGID PLATES

FIFTH ILLUSTRATIVE EMBODIMENT OF THE PRESENT INVENTION THE FORM OF A PIEZO-BASED FORCE SENSOR EMPLOYING A TWO PIECE PLASTIC HOUSING

FIRST EMBODIMENT OF THE BASE STATION

SECOND EMBODIMENT OF THE BASE STATION

Fifth Embodiment of the Base Station

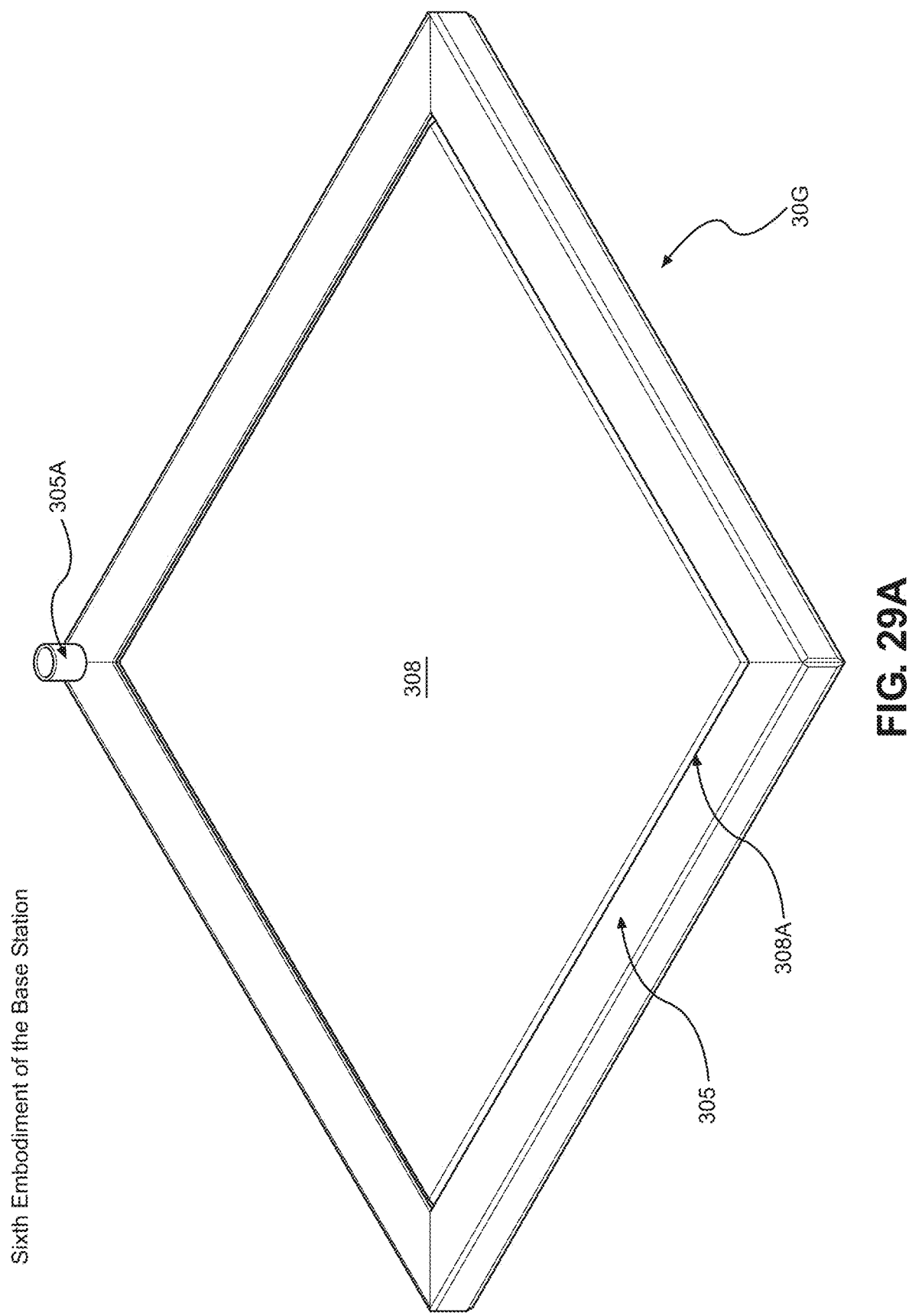

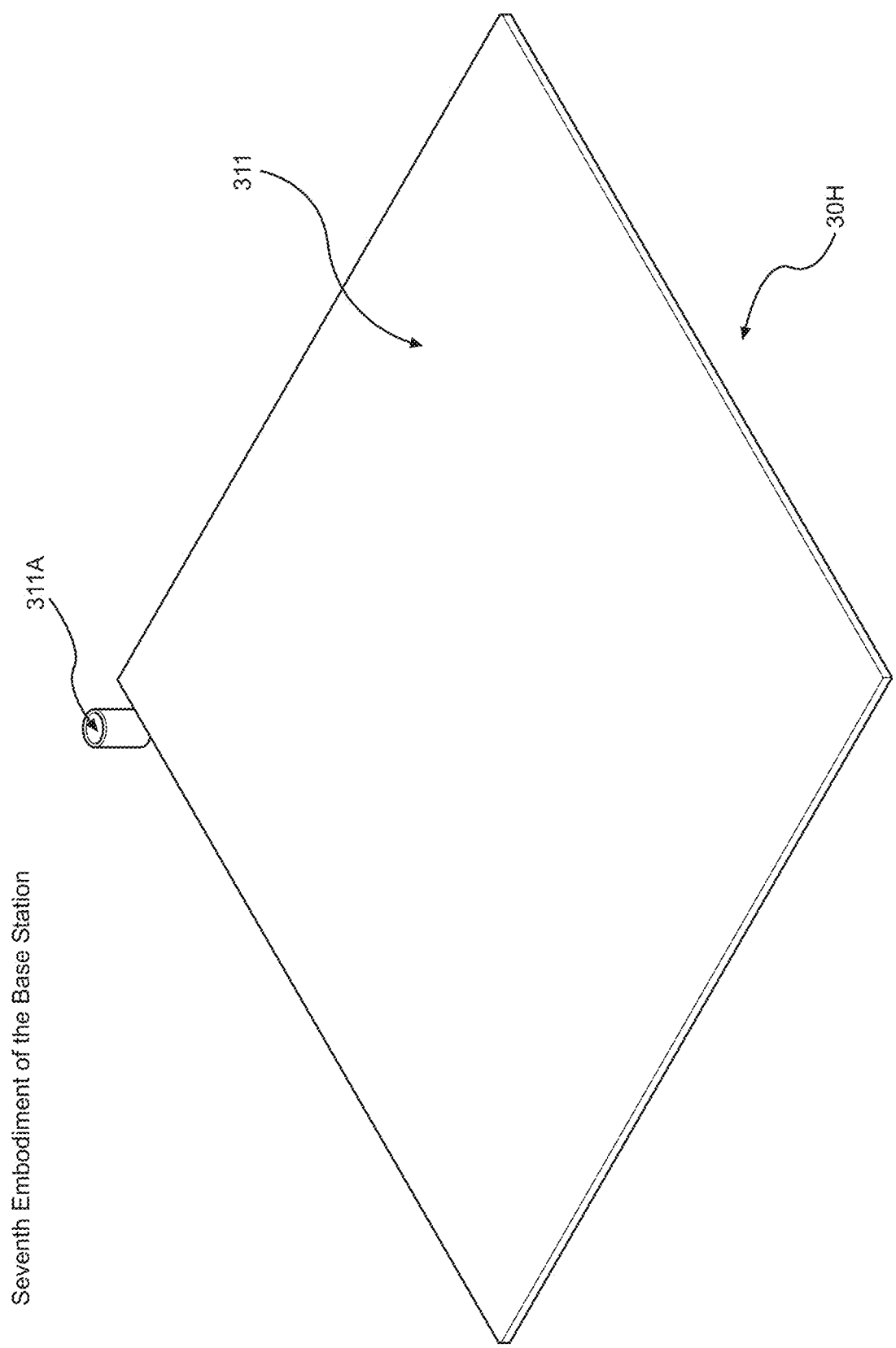

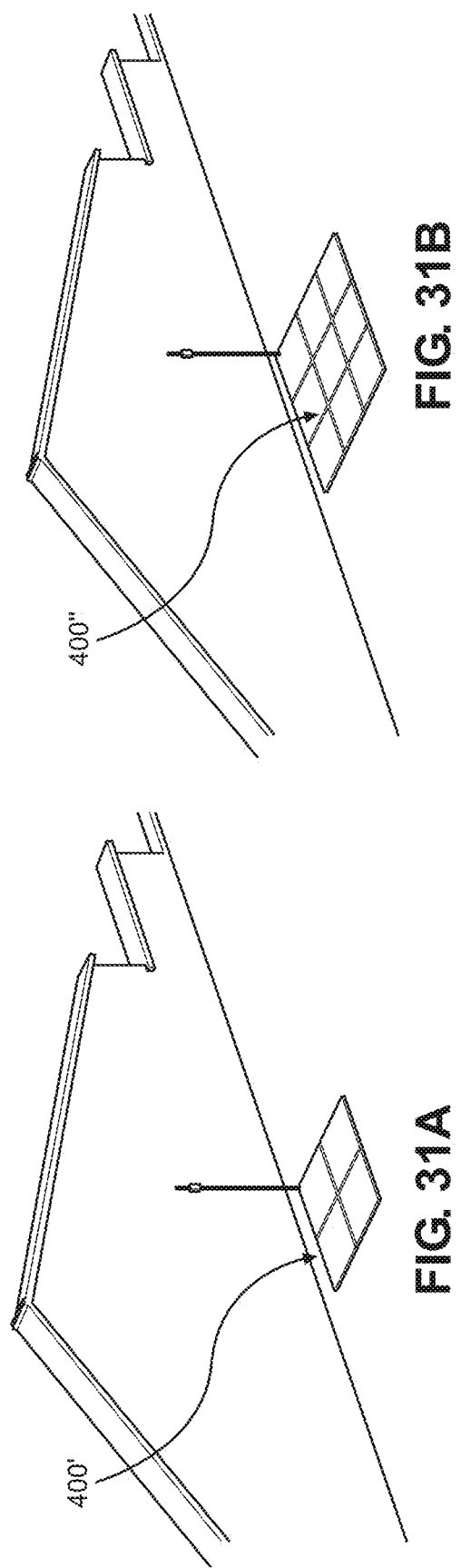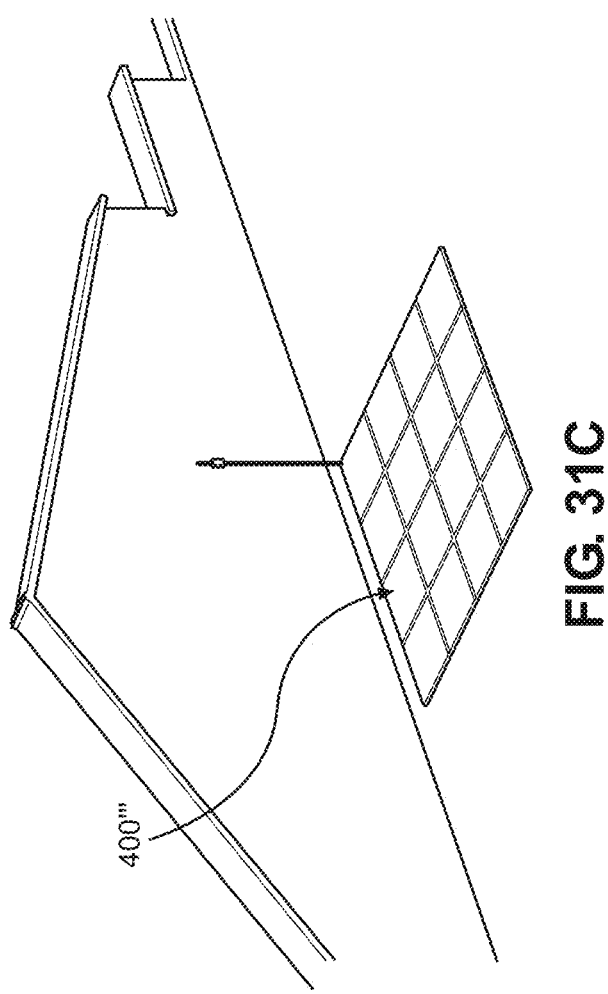

Processing Data to Determine Snow Pressure Multi-Load Cell Displacement Type Scale 1. Sampling and storing each SDCM load cell value (volts)

2. Determining snow pressure for each SDCM.

$$p = \frac{s(\sum_{1}^{n} LC_n)}{a}$$

$p$ = pressure on SDCM weighing plate
$s$ = load cell sensitivity (force/volts)
$LC_n$ = load cell value (volts)
$n$ = load cell number
$a$ = area of weighing plate

FIG. 34

Processing Data to Determine Snow Pressure
Single Load Cell Deflection on Type Scale 1. Sampling and storing each SDCM load cell value (volts)

2. Determining snow pressure for each SDCM.

$$p = LC(x^2 + x + c)$$

p = pressure on SDCM weighing plate (lbs / square foot)

x = empirically determined variable based upon load cell sensitivity and scale geometry and material properties c = empirically determined constant based upon load cell sensitivity and scale geometry and material properties LC = load cell (volts)

FIG. 35

SnowSentry

Username  Nancy
Password  ****
Show password
Sign In
Forgot Password

Sign in

*GUI presented to Admin, Manager, Operator & Viewer*

Close | Add | Edit | Delete

FIG. 37

SnowSentry — *GUI presented to Admin & Manager* — XYZ Corp.

| Users | Buildings | Snow Load | Aerial Survey | Snow Removal |

Users

| Name | User-name | Role Snow Load Station | Role Aerial Survey | Role Snow Removal | Affiliation | Email | Phone | Alerts | Message Interval |
|---|---|---|---|---|---|---|---|---|---|
| Joan Doe | Joan | Admin | Admin | Admin | XYZ Corp | joan@xyz.com | 603-555-1111 | Email & Text | 1 day |
| John Smith | John | Manager | Viewer | Viewer | XYZ Corp | john@xyz.com | 603-555-1112 | Email & Text | 3 hours |
| Nancy Black | Nancy | Manager | Manager | Manager | XYZ Corp | nancy@xyz.com | 603-555-1113 | none | 1 week |
| Paul Doe | Paul | Viewer | Viewer | Manager | Roof Services | paul@rs.com | 603-555-1114 | text | 1 day |
| Mike Black | Mike | Viewer | Viewer | Operator | Roof Services | mike@rs.com | 603-555-1115 | text | 1 day |
| Samantha Wild | Sam | Viewer | Operator | Operator | CB Corp | sam@cb.com | 603-555-1116 | text | 1 day |
| James Flower | James | Viewer | Operator | Operator | CB Corp | james@cb.com | 603-555-1117 | text | 1 day |

Close | Add | Edit | Delete

FIG. 38A

SnowSentry

| Users | Buildings | Snow Load | Aerial Survey | Snow Removal |

*GUI presented to Admin & Manager*    XYZ Corp.

New User

| | |
|---|---|
| First Name | Nancy |
| Last Name | Black |
| Username | Nancy |
| Role | |
| Snow Load Station | Manager |
| Aerial Survey | Manager |
| Snow Removal | Manager |
| Affiliation | XYZ Corp |
| Email Address | nancy@xyz.com |
| Phone | 603-555-1113 |
| Alerts | none |
| Message Interval | 1 week |

[Close] [Add] [Save] [Delete]

FIG. 38B

SnowSentry  *GUI presented to Admin, Manager & Operator*  XYZ Corp.

| Users | Buildings | Snow Load | Aerial Survey | Snow Removal |

Buildings

| Building Name | Address | City | State / Province | Zip Code | Country | Company | Status |
|---|---|---|---|---|---|---|---|
| Commercial St. Warehouse | 123 Main St. | Springfield | NH | 12345 | USA | XYZ Corp. | Active |
| NH Office | Broadway | Springfield | NH | 12345 | USA | XYZ Corp. | Active |
| MA Office | Central Ave | Midway | MA | 12345 | USA | XYZ Corp. | Active |

| Close | Add | Edit | Delete |

SnowSentry

*GUI presented to Admin, Manager, Operator & Viewer*     XYZ Corp.

| Users | Buildings | Snow Load | Aerial Survey | Snow Removal | Settings |
|---|---|---|---|---|---|
| Station Map View | Station Table | Zone Map View | Zone Table | Data | |

Station Table

| Station Name | MAC Address | Location | Firmware Ver. | Company | Zone | Building | Status |
|---|---|---|---|---|---|---|---|
| Warehouse 1 | 11:22:33:44:55:66:77:01 | GPS | 2.2 | XYZ Corp. | Warehouse, Original | Commercial St. Warehouse | Active |
| Warehouse 2 | 11:22:33:44:55:66:77:02 | GPS | 2.2 | XYZ Corp. | Warehouse, Original | Commercial St. Warehouse | Active |
| Warehouse 3 | 11:22:33:44:55:66:77:03 | GPS | 2.2 | XYZ Corp. | Warehouse, Original | Commercial St. Warehouse | Active |
| Warehouse 4 | 11:22:33:44:55:66:77:04 | GPS | 2.2 | XYZ Corp. | Warehouse Addition | Commercial St. Warehouse | Active |
| Warehouse 5 | 11:22:33:44:55:66:77:05 | GPS | 2.2 | XYZ Corp. | Warehouse Addition | Commercial St. Warehouse | Active |
| Warehouse 6 | 11:22:33:44:55:66:77:06 | GPS | 2.2 | XYZ Corp. | Warehouse Addition | Commercial St. Warehouse | Active |
| NH Office 1 | 11:22:33:44:55:66:77:07 | GPS | 2.2 | XYZ Corp. | NH Office, West | NH Office | Active |
| NH Office 2 | 11:22:33:44:55:66:77:08 | GPS | 2.2 | XYZ Corp. | NH Office, West | NH Office | Active |
| NH Office 3 | 11:22:33:44:55:66:77:09 | GPS | 2.2 | XYZ Corp. | NH Office, West | NH Office | Active |
| NH Office 4 | 11:22:33:44:55:66:77:10 | GPS | 2.2 | XYZ Corp. | NH Office, East | NH Office | Active |
| MA Office 1 | 11:22:33:44:55:66:77:11 | GPS | 2.2 | XYZ Corp. | MA Office | MA Office | Active |

| Close | Add | Edit | Delete |

FIG. 40C

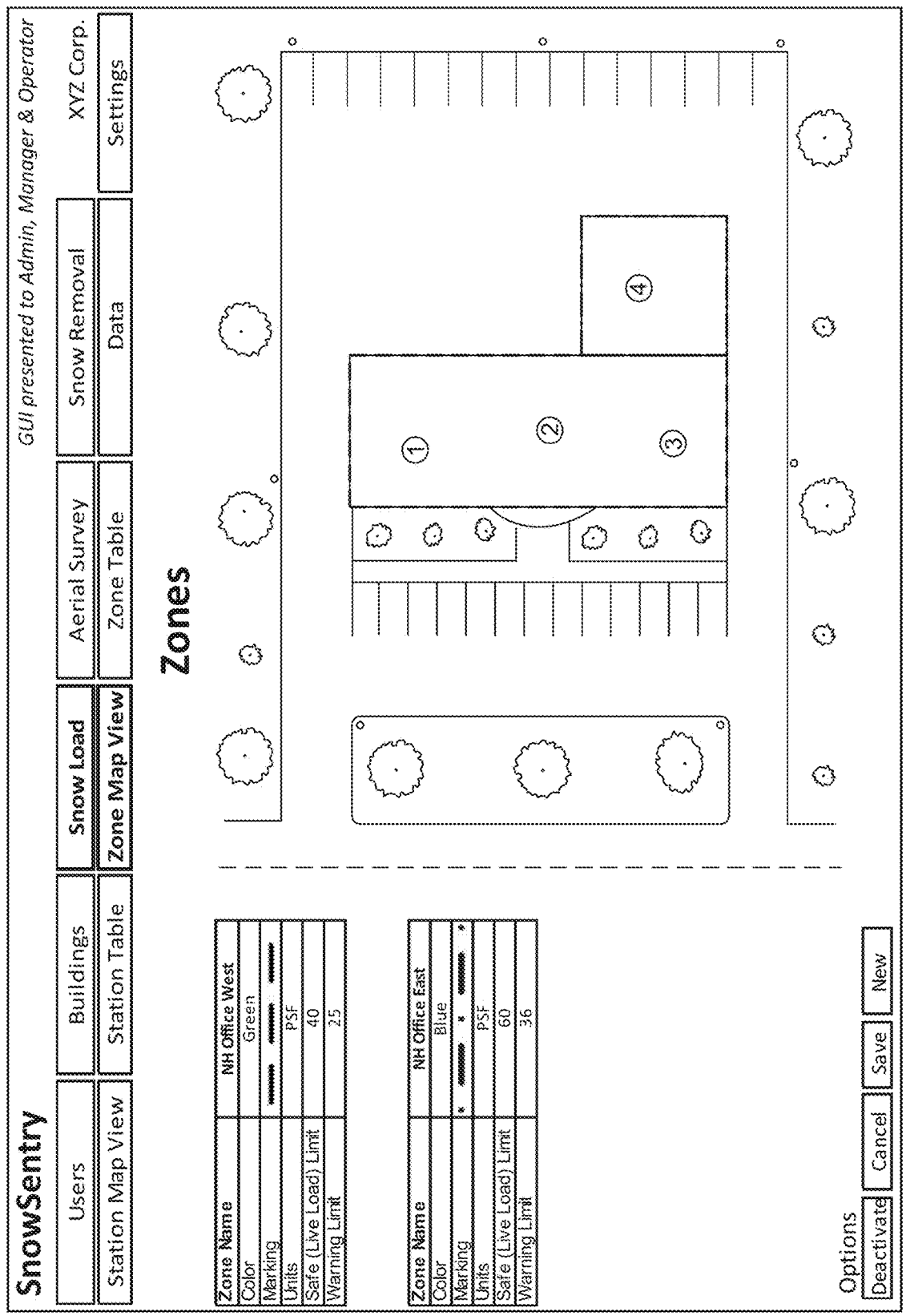
FIG. 40D1

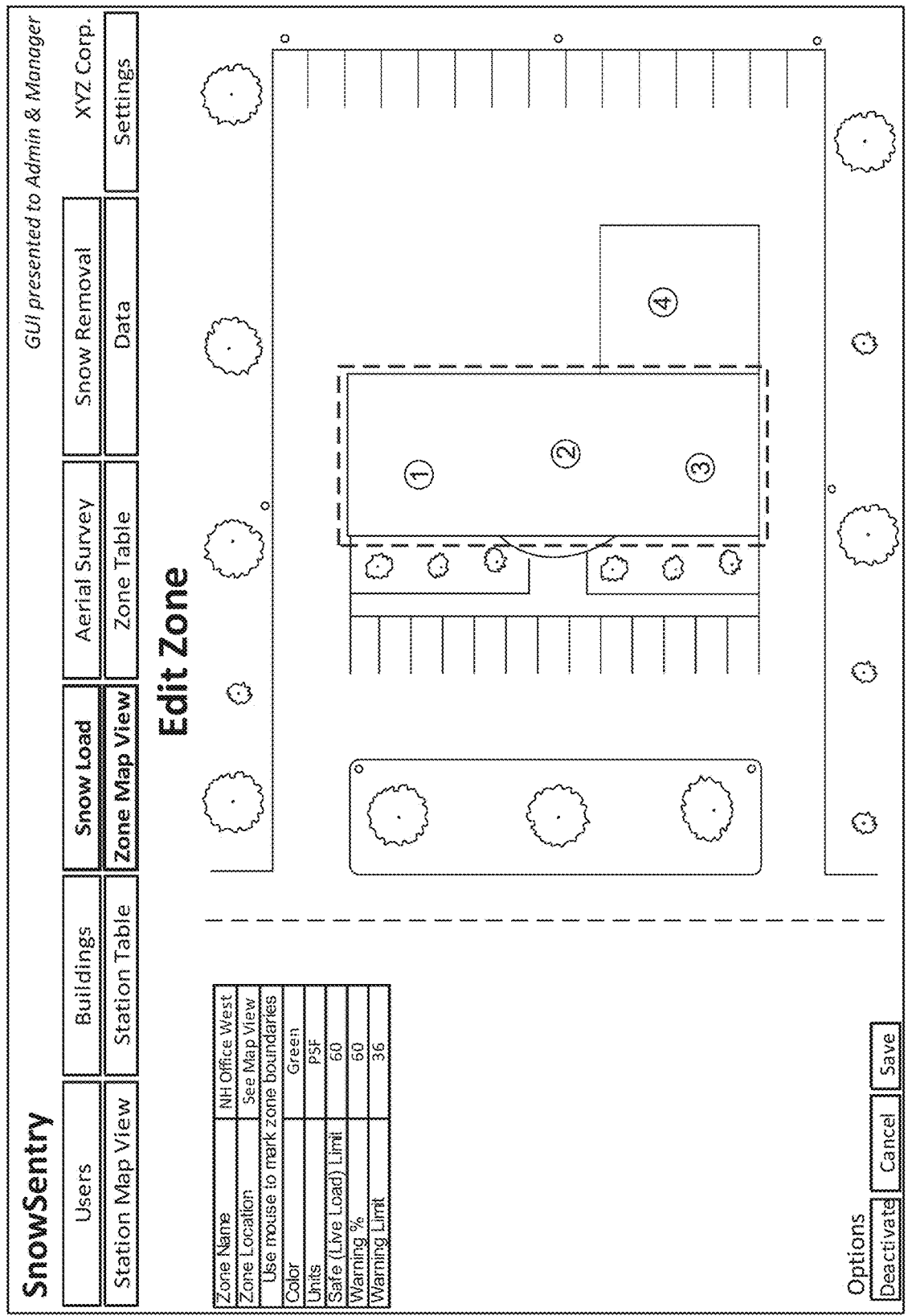
FIG. 40D2

SnowSentry

*GUI presented to Admin, Manager, Operator & Viewer*  XYZ Corp.

| Users | Buildings | Snow Load | Aerial Survey | Snow Removal | Settings |
|---|---|---|---|---|---|
| Station Map View | Station Table | Zone Map View | Zone Table | Data | |

Zone Table

| Zone Name | Safe (Live Load) Limit (PSF) | Warning Limit (PSF) | Building | Status | Color |
|---|---|---|---|---|---|
| Warehouse, Original | 30 | 18 | Commercial St. Warehouse | Active | Blue |
| Warehouse Addition | 50 | 30 | Commercial St. Warehouse | Active | Yellow |
| NH Office, West | 60 | 36 | NH Office | Active | Red |
| NH Office, East | 45 | 27 | NH Office | Active | Purple |
| MA Office | 50 | 30 | MA Office | Active | Green |

Close | Add | Edit | Delete

FIG. 40E

SnowSentry

| Users | Buildings | Snow Load | Aerial Survey | Snow Removal | XYZ Corp. |
|---|---|---|---|---|---|
| Station Map View | Station Table | Zone Map View | Zone Table | Data | Settings |

*GUI presented to Admin & Manager*

Settings

| | |
|---|---|
| Polling Interval | 60 Min |
| System Units | US/English |
| Snow Load Units | PSF |
| App URL | http://snowsentry.com |

[Close] [Cancel] [Save]

FIG. 40G

Figure 41A:
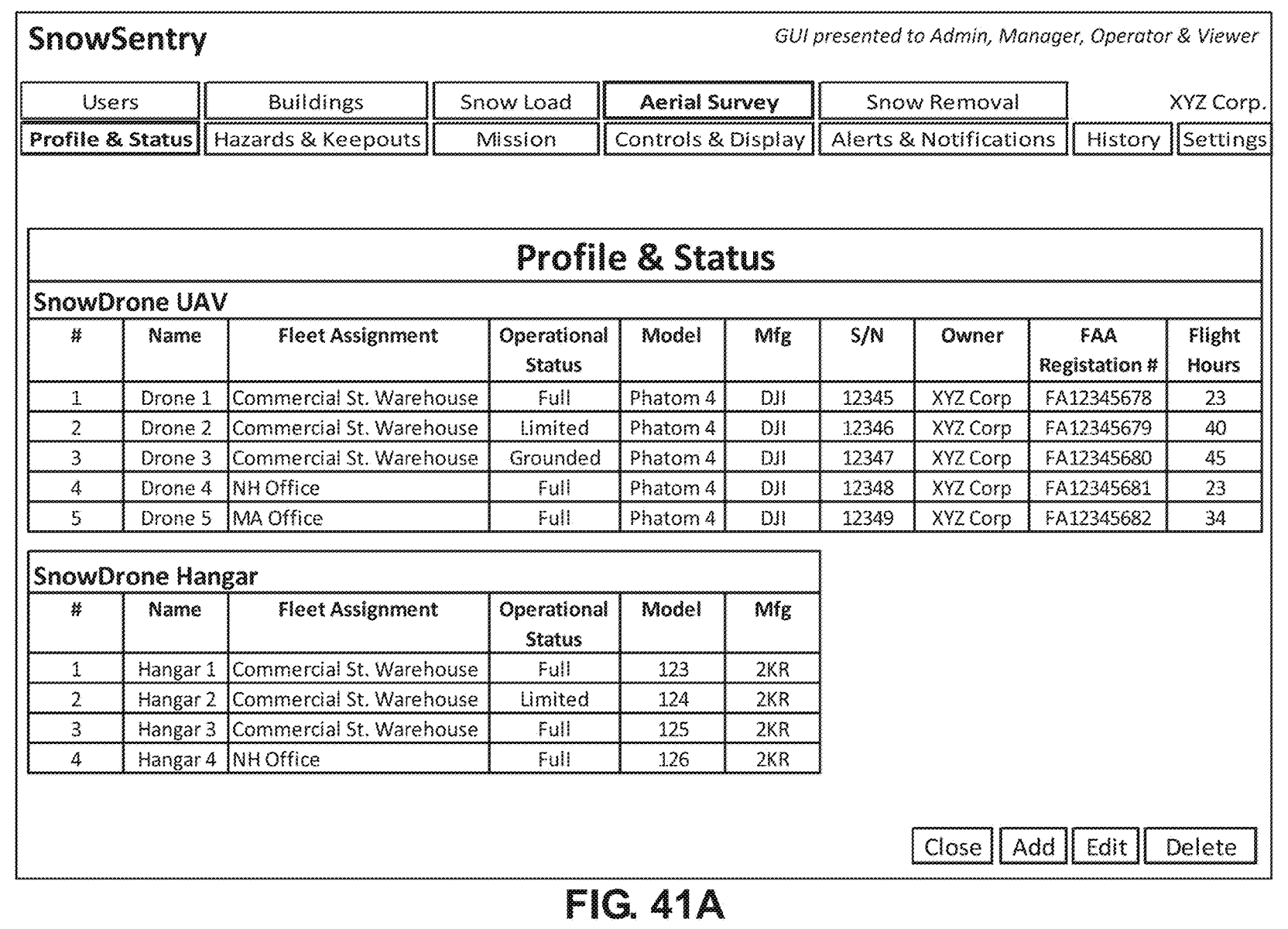

SnowSentry

*GUI presented to Admin, Manager, Operator & Viewer*  XYZ Corp.

| Users | Buildings | Snow Load | Aerial Survey | Snow Removal | History | Settings |
|---|---|---|---|---|---|---|
| Profile & Status | Hazards & Keepouts | Mission | Controls & Display | Alerts & Notifications | | |

Profile & Status

SnowDrone UAV

| # | Name | Fleet Assignment | Operational Status | Model | Mfg | S/N | Owner | FAA Registration # | Flight Hours |
|---|---|---|---|---|---|---|---|---|---|
| 1 | Drone 1 | Commercial St. Warehouse | Full | Phantom 4 | DJI | 12345 | XYZ Corp | FA12345678 | 23 |
| 2 | Drone 2 | Commercial St. Warehouse | Limited | Phantom 4 | DJI | 12346 | XYZ Corp | FA12345679 | 40 |
| 3 | Drone 3 | Commercial St. Warehouse | Grounded | Phantom 4 | DJI | 12347 | XYZ Corp | FA12345680 | 45 |
| 4 | Drone 4 | NH Office | Full | Phantom 4 | DJI | 12348 | XYZ Corp | FA12345681 | 23 |
| 5 | Drone 5 | MA Office | Full | Phantom 4 | DJI | 12349 | XYZ Corp | FA12345682 | 34 |

SnowDrone Hangar

| # | Name | Fleet Assignment | Operational Status | Model | Mfg |
|---|---|---|---|---|---|
| 1 | Hangar 1 | Commercial St. Warehouse | Full | 123 | 2KR |
| 2 | Hangar 2 | Commercial St. Warehouse | Limited | 124 | 2KR |
| 3 | Hangar 3 | Commercial St. Warehouse | Full | 125 | 2KR |
| 4 | Hangar 4 | NH Office | Full | 126 | 2KR |

[ Close ] [ Add ] [ Edit ] [ Delete ]

SnowSentry

*GUI presented to Admin, Manager & Operator* — XYZ Corp.

| Users | Buildings | Snow Load | Aerial Survey | Snow Removal | History |
|---|---|---|---|---|---|
| Profile & Status | Hazards & Keepouts | Mission | Controls & Display | Alerts & Notifications | Settings |

Alerts & Notifications

| Name | Username | Role | Affiliation | Mission | | | Cumulative Report Interval |
|---|---|---|---|---|---|---|---|
| | | | | Schedule | Status | Message Interval | |
| Joan Doe | Joan | Admin | XYZ Corp | Yes | Yes | Daily | Weekly |
| John Smith | John | Manager | XYZ Corp | No | Yes | Weekly | Monthly |
| Nancy Black | Nancy | User | XYZ Corp | Yes | Yes | Immediate | Weekly |
| Paul Doe | Paul | User | Roof Services, LLC | Yes | Yes | Weekly | Weekly |

Add | Edit | Close | Delete

FIG. 41H

SnowSentry

*GUI presented to Admin, Manager, Operator & Viewer*

XYZ Corp. | Settings

| Users | Buildings | Snow Load | Aerial Survey | Snow Removal | History |
|---|---|---|---|---|---|
| Profile & Status | Hazards & Keepouts | Mission | Controls & Display | Alerts & Notifications | |

History

| # | Date | Building | Snow Depth | Video | Photo | Thermal | Status | Initiator | Drone |
|---|---|---|---|---|---|---|---|---|---|
| 101 | 13-Jan-17 | NH Office | Yes | No | Yes | No | Complete | Auto | Drone 2 |
| 102 | 15-Jan-17 | NH Office | Yes | No | Yes | No | Complete | Auto | Drone 2 |
| 103 | 16-Jan-17 | NH Office | Yes | No | Yes | No | Complete | Auto | Drone 2 |
| 104 | 17-Jan-17 | NH Office | Yes | No | Yes | No | Complete | Auto | Drone 2 |
| 105 | 18-Jan-17 | NH Office | Yes | No | Yes | No | Aborted - High Wind | Auto | Drone 2 |
| 106 | 19-Jan-17 | NH Office | Yes | Yes | No | No | Complete | Auto | Drone 2 |
| 107 | 20-Jan-17 | NH Office | No | No | Yes | Yes | Complete | N. Smith | Drone 2 |
| 108 | 20-Jan-17 | NH Office | Yes | No | Yes | No | Complete | N. Smith | Drone 3 |
| 109 | 22-Jan-17 | NH Office | Yes | No | Yes | No | Complete | Auto | Drone 2 |

Open | Edit | Close | Delete

FIG. 41I

SnowSentry

*GUI presented to Admin, Manager, Operator & Viewer*   XYZ Corp.

| Users | Buildings | Snow Load | Aerial Survey | Snow Removal | History | Settings |
|---|---|---|---|---|---|---|
| Profile & Status | Hazards & Keepouts | Mission | Controls & Display | Alerts & Notifications | | |

History and Viewer

| # | Date | Building | Snow Depth | Video | Photo | Thermal | Status | Initiator | Drone |
|---|---|---|---|---|---|---|---|---|---|
| 101 | 13-Jan-17 | NH Office | Yes | No | Yes | No | Complete | Auto | Drone 2 |
| 102 | 15-Jan-17 | NH Office | Yes | No | Yes | No | Complete | Auto | Drone 2 |
| 103 | 16-Jan-17 | NH Office | Yes | No | Yes | No | Complete | Auto | Drone 2 |
| 104 | 17-Jan-17 | NH Office | Yes | No | Yes | No | Complete | Auto | Drone 2 |
| 105 | 18-Jan-17 | NH Office | Yes | No | Yes | No | Aborted – High Wind | Auto | Drone 2 |
| 106 | 19-Jan-17 | NH Office | Yes | No | Yes | No | Complete | Auto | Drone 2 |
| 107 | 20-Jan-17 | NH Office | Yes | Yes | No | No | Complete | N. Smith | Drone 2 |
| 108 | 20-Jan-17 | NH Office | No | No | Yes | Yes | Complete | N. Smith | Drone 3 |
| 109 | 22-Jan-17 | NH Office | Yes | No | Yes | No | Complete | Auto | Drone 2 |

Drone Video & Photo Viewer
[ Previous | Rwd | Play | Pause | Fast Fwd | Next ]

Aerial Survey Data Viewer
[ Previous | Zoom + | Zoom − | Pan | Next ]

Actual Drone Flight Path
[ Previous | Zoom + | Zoom − | Pan | Next ]

FIG. 41J

SnowSentry

*GUI presented to Admin, Manager, Operator & Viewer*      XYZ Corp.

| Users | Buildings | Snow Load | Aerial Survey | Snow Removal | History | Settings |
|---|---|---|---|---|---|---|
| Profile & Status | Hazards & Keepouts | Mission | Controls & Display | Alerts & Notifications | | |

Profile & Status

SnowBot Snow Remover

| # | Name | Fleet Assignment | Operational Status | Model | Mfg | S/N | Owner | Service Hours |
|---|---|---|---|---|---|---|---|---|
| 1 | SnowBot 1 | Commercial St. Warehouse | Full | 121 | 2KR | 12345 | XYZ Corp | 123 |
| 2 | SnowBot 2 | Commercial St. Warehouse | Limited | 122 | 2KR | 12346 | XYZ Corp | 14 |

SnowBot Garage

| # | Name | Fleet Assignment | Operational Status | Model | Mfg | S/N |
|---|---|---|---|---|---|---|
| 1 | Garage 1 | Commercial St. Warehouse | Full | 123 | 2KR | 12345 |
| 2 | Garage 2 | Commercial St. Warehouse | Limited | 124 | 2KR | 12346 |

SnowTube Conveyor

| # | Name | Fleet Assignment | Operational Status | Model | Mfg | S/N |
|---|---|---|---|---|---|---|
| 1 | Tube 1 | Commercial St. Warehouse | Full | 123 | 2KR | 12345 |
| 2 | Tube 2 | Commercial St. Warehouse | Limited | 124 | 2KR | 12346 |

FIG. 42A

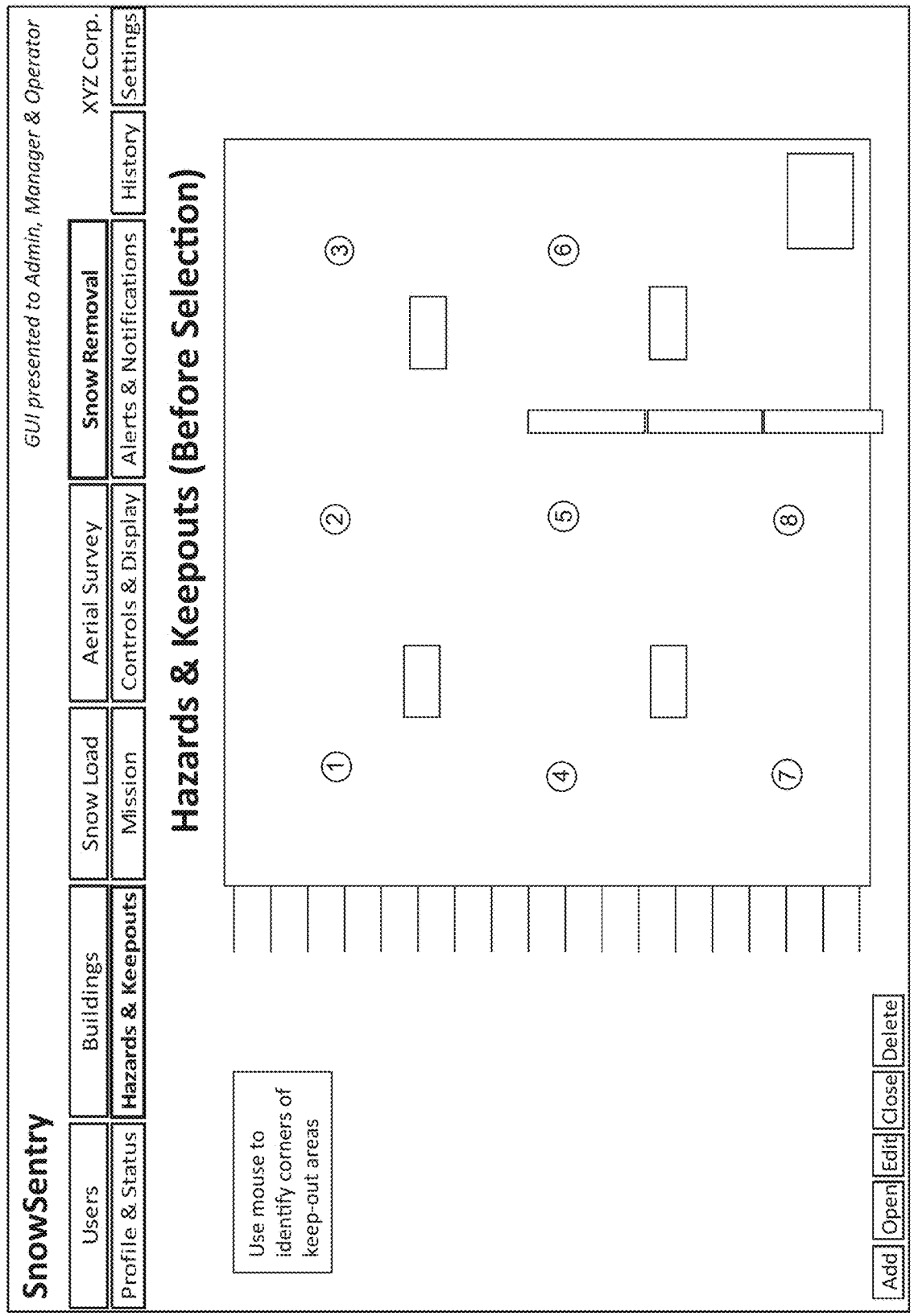
FIG. 42B1

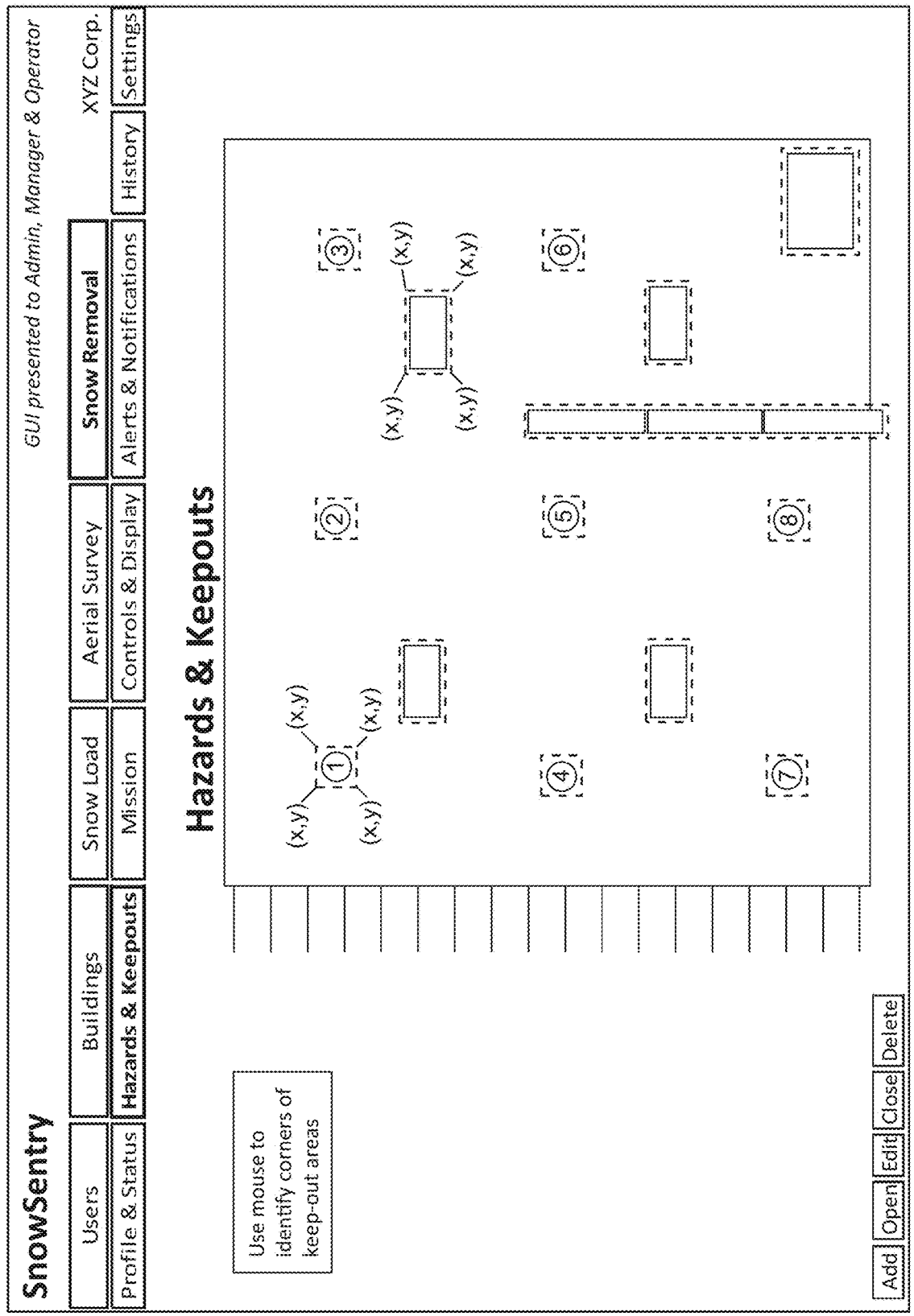
FIG. 42B2

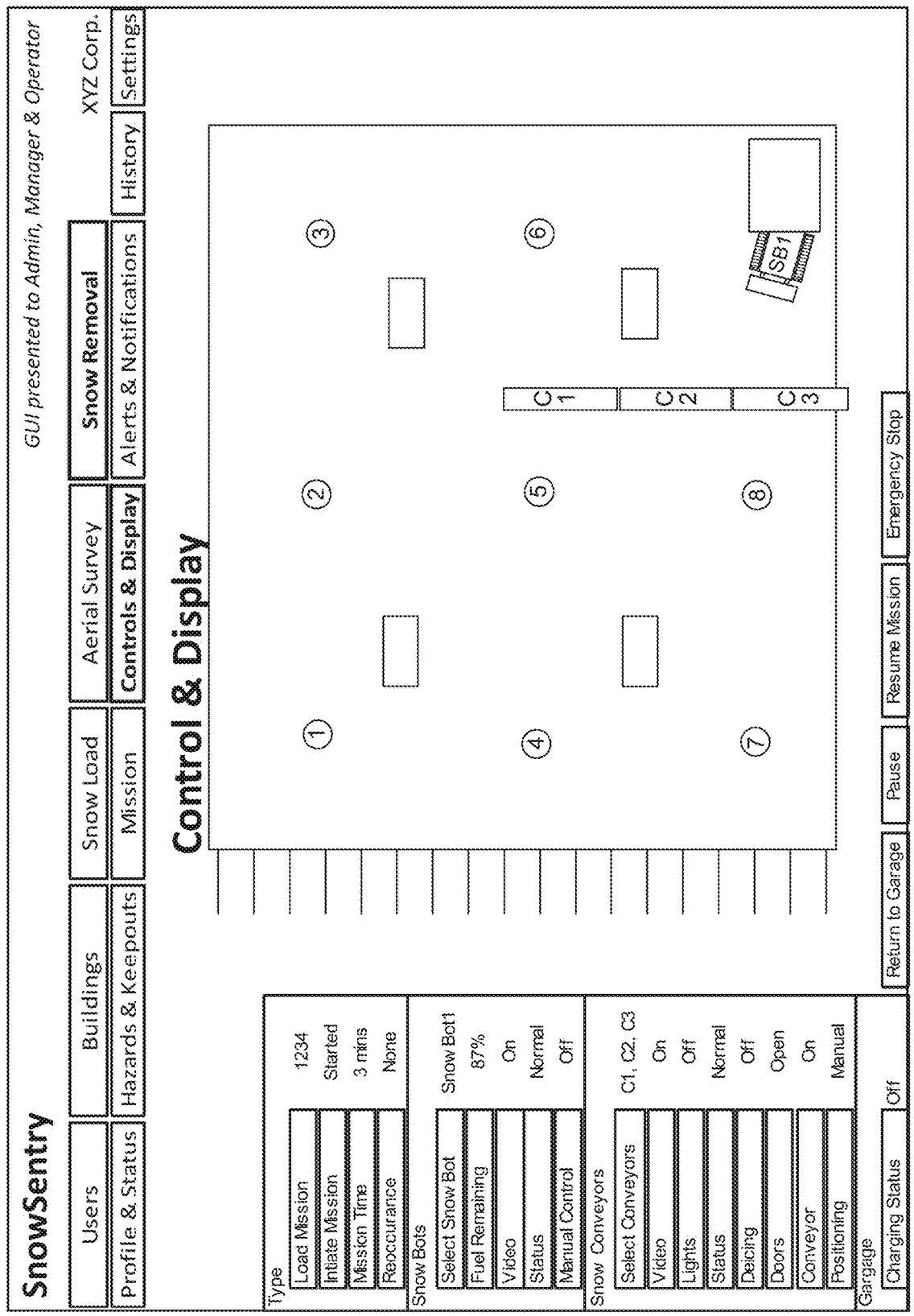
FIG. 42D1

FIG. 42D2

SnowSentry

GUI presented to Admin, Manager, Operator & Viewer    XYZ Corp.

| Users | Buildings | Snow Load | Aerial Survey | Snow Removal | History | Settings |
|---|---|---|---|---|---|---|
| Profile & Status | Hazards & Keepouts | Mission | Controls & Display | Alerts & Notifications | | |

Alerts & Notifications

| Name | Username | Role | Affiliation | Status | Mission | |
|---|---|---|---|---|---|---|
| | | | | | Message Interval | Weekly Summary |
| Joan Doe | Joan | Admin | XYZ Corp | Yes | Daily | Yes |
| John Smith | John | Manager | XYZ Corp | Yes | Weekly | Yes |
| Nancy Black | Nancy | User | XYZ Corp | Yes | Hourly | Yes |
| Paul Doe | Paul | User | Roof Services, LLC | Yes | Weekly | Yes |

FIG. 42E

SnowSentry

*GUI presented to Admin, Manager, Operator & Viewer*

XYZ Corp.

| Users | Buildings | Snow Load | Aerial Survey | Snow Removal | | History | Settings |
|---|---|---|---|---|---|---|---|
| Profile & Status | Hazards & Keepouts | Mission | Controls & Display | Alerts & Notifications | | | |

History and Viewer

| # | Date | Building | Start Time | End Time | Status | Area Cleared | Initiator | SnowBot | Conveyors |
|---|---|---|---|---|---|---|---|---|---|
| 201 | 13-Jan-17 | Warehouse | 900 | 1230 | Complete | 23,020 SF | Auto | SB1 | C1, C2, C3 |
| 205 | 18-Jan-17 | Warehouse | 1030 | 2300 | Aborted - High Wind | 20,100 SF | Auto | SB1 | C1, C2, C3 |
| 206 | 19-Jan-17 | Warehouse | 430 | 1200 | Complete | 13,055 SF | Auto | SB1 | C1, C2, C3 |
| 207 | 20-Jan-17 | Warehouse | 805 | 2030 | Complete | 22,550 SF | N. Smith | SB1 | C1, C2, C3 |
| 208 | 20-Jan-17 | Warehouse | 1030 | 2135 | Complete | 10,230 SF | N. Smith | SB1 | C1, C2, C3 |
| 209 | 22-Jan-17 | Warehouse | 710 | 1335 | Complete | 5,420 SF | Auto | SB1 | C1, C2, C3 |

SnowBot Clearing Area

Previous | Zoom + | Zoom − | Pan | Next

FIG. 42F

METHOD OF ROOFTOP SNOW DEPTH PROFILING USING UNMANNED SNOW DEPTH MEASURING AIRCRAFT SYSTEMS

A: Deploying an Unmanned Snow Depth Measuring Aircraft System registered with a Building Intelligence Gathering, Assessment & Decision-Support (BIGADS) System, to profile the snow depth of a particular building rooftop registered with the System B: Selecting and enabling a non-contact snow depth measuring method on the Unmanned Snow Depth Measuring Aircraft System C: Collecting GPS-indexed snow depth profile data from the building rooftop D: Transmitting collected GPS-indexed snow depth data to a database server at the Data Center of the BIGADS System E: Using a Web Browser to Request and Review collected Snow Depth Profile Data for the specified building rooftop

FIG. 43

METHOD OF FORECASTING THE WEATHER CONDITIONS AT THE LOCATIONS WHERE BUILDINGS ASSOCIATED WITH A USER ACCOUNT ON THE NETWORK ARE LOCATED

A: Accessing and Processing historical Weather Data recorded in Weather Databases and creating a Building Weather Database for a specified building B: Collecting and Storing Local Weather Data from Rooftop-Mounted Snow Load Measuring Stations and Adding this data to the Building Weather Database for the specified building C: Collecting GPS-indexed snow depth profile data from the building rooftop, and add this Snow Depth Profile Data to the Building Weather Database D: Analyzing the data contained in the Building Weather Database to identify patterns and trends useful for predicting and weather forecasting E: Using a Web Browser to request weather forecast reports based on data collected and processed in the Building Weather Database, and using such Reports to plan a course of action relating to expected requirements of rooftop snow load management during a particular time period

FIG. 44

METHOD OF DESIGNING, INSTALLING, DEPLOYING AND OPERATING AN AUTOMATED BUILDING ROOFTOP SNOW LOAD MONITORING AND REMOVAL SYSTEM OF THE PRESENT INVENTION

A: During a pre-design and pre-installation phase, surveying and modeling rooftop building conditions B: During a design phase, developing 3D Rooftop Geometry Model (3DRGM) specifying various rooftop building parameters such as rooftop boundary conditions, snow load measurement zones rated in pressure (i.e. 30 PSF), structures (e.g. antennas, cooling towers, walls, mechanical rooms, etc.), key areas of high snow depth, placement of SLSM stations and other sensors, placement of IP gateway (IPG) unless stations are using cellular connections at which time no IPG is required, passive depth marker placement, (i.e. stations having graduations on masts and antennas), parking locations for snow removal robot systems, placement of snow conveyor tunnel systems, hanger placement for snow depth measuring aircraft, portable rooftop navigation terminal deployment, and VR-guided snow removal robot navigation and control workstations

FIG. 46A

METHOD OF DESIGNING, INSTALLING, DEPLOYING AND OPERATING AN AUTOMATED BUILDING ROOFTOP SNOW LOAD MONITORING AND REMOVAL SYSTEM OF THE PRESENT INVENTION

C: Generating a Building Rooftop Snow-load State Model (BRSSM) using current 3DRGM (loads and asset locations at any point in time)

D: Constructing and installing an Automated Building Rooftop Snow Monitoring and Removal System (ABRSMRS) based on the BRSSM generated for the specified building rooftop placement and assemble of wireless SLSM Stations on the building rooftop, (e) deploying, testing, calibrating and adjusting the system E: Deploying, testing, calibrating and adjusting the System F: Initializing the System

FIG. 46B

METHOD OF DESIGNING, INSTALLING, DEPLOYING AND OPERATING AN AUTOMATED BUILDING ROOFTOP SNOW LOAD MONITORING AND REMOVAL SYSTEM OF THE PRESENT INVENTION

G: Maintaining and Periodic Updating the System

H: Automatically detecting Excessive Snow Load Events and generating and transmitting snow load alarm notifications/messages to all responsible members of the building management and maintenance team I: Sending Weather Forecast Snow Alerts J: Responding to snow load events by executing a Snow Load Removal Plan K: Sending Snow Load Removal Confirmations to building managers when the Snow Load Removal Plan has been completed

FIG. 46C

METHOD OF DETECTING, COMMUNICATING, RESPONDING TO, AND RESOLVING SNOW LOAD ALARM CONDITIONS ON A BUILDING ROOFTOP

A: Deploying a plurality of Snow Load Monitoring Systems (SLMS) on the Surface of a specified building rooftop and configuring these SLSMs to the system network of a Building Intelligence, Assessment and Decision-Support (BIGADS) system B: Deploying a VR-Guided Snow Moving Robot System (SMRS) on the surface of a specified building rooftop and configuring the SMRS to the system network of the BIGADS system C: Deploying a VR-enabled Control station for remotely operating the Snow Moving Robot System (SMRS) on the surface of the specified building rooftop and configuring the Control Station to the system network D: Registering a team of building management and/maintenance members With a User Account maintained on the system network

FIG. 47A

METHOD OF DETECTING, COMMUNICATING, RESPONDING TO, AND RESOLVING SNOW LOAD ALARM CONDITIONS ON A BUILDING ROOFTOP

E: In response to at least one of the SLMS automatically detecting a snow Load on a specified region of the rooftop to exceed a preset threshold, generating and transmitting a Snow Load Alarm Notification to all building management and maintenance team members F: At least one team member responding to the Snow Load Alarm Notification by creating a Snow Removal Plan requiring the use of the VR-Guided SMRS to remove the snow load alarm condition on the rooftop Under the remote control of a specified VR-enabled Control Station G: After completing the snow removal plan and removing the snow load Alarm condition, generating and transmitting a snow load removal confirmation to all building management team members

FIG. 47B

METHOD OF RESPONDING TO SNOW LOAD ALARM NOTIFICATION – BY PHYSICAL ROOFTOP INSPECTION USING THE AR-GUIDED ROOFTOP NAVIGATOR

A: Receiving a Snow Load Alarm Notification from a Building Intelligence Gathering, Assessment and Decision-Support (BIGADS) System B: Acquiring a hand-held AR-enabled rooftop navigation and inspection system to navigate and inspect the building rooftop specified in the Snow Load Alarm Notification C: Holding The Hand-Held AR-Guided Rooftop Navigation and Inspection Device on the Operator's Hand, Viewing The Device's Field of View (FOV) While (i) Observing Augmented Reality (AR) Images of GPS-Indexed Snow Load Measuring Stations, (ii) Inspecting Rooftop Conditions, (iii) Making Audio and Video Recordings of the Rooftop, and (iv) Taking Notes and linking the same to the Snow Load Alarm Event.

FIG. 48A

METHOD OF RESPONDING TO SNOW LOAD ALARM NOTIFICATION BY PHYSICAL ROOFTOP INSPECTION USING THE AR-GUIDED ROOFTOP NAVIGATION AND INSPECTION SYSTEM

D: Transmitting the video recording to a database server maintained at the data center of a Building Intelligence Gathering, Assessment and Decision-Support (BIGADS) System E: Others on the building management and maintenance team using a Web browser to access the database server and review the annotated recording of the Building rooftop inspection report made by the inspector using the AR-enabled rooftop navigation and inspection system F: Using the Snow Load Event Inspection Report to Determine a Plan of Resolution for the Snow Load Alarm Event (i.e. execute Snow Removal Plan)

FIG. 48B

METHOD OF RESPONDING TO SNOW LOAD ALARM NOTIFICATION – BY AERIAL RECONNAISSANCE CARRIED OUT USING UNMANNED SNOW DEPTH MEASURING AIRCRAFT SYSTEMS

A: A building management team member receiving a Snow Load Alarm Notification from a Building Intelligence Gathering, Assessment and Decision-Support (BIGADS) System B: Deploying an Unmanned Snow Depth Measuring Aircraft System registered with the Building, to navigate and inspect the building rooftop specified in the Snow Load Alarm Notification and compare snow depth measurements against measured snow load conditions at the specified rooftop location C: Capturing a digital video recording and snow depth measurements around and about the Snow Load Alarm Region, and transmitting the recording to a database server maintained at the data center of the BIGADS System D: Others on the building management and maintenance team using a Web browser to access the database server and review the recording of the aerial building rooftop inspection made by the flying Unmanned Snow Depth Measuring Aircraft System over the specified building rooftop

FIG. 49

VR-GUIDED METHOD OF MONITORING AND REMOVING SNOW LOADS FROM BUILDING ROOFTOP SURFACES

A: Installing VR-guided Snow Removing Robot System on building rooftop, and configuring at least one VR-Guided Robot Navigation and Control Workstation with the Building Intelligence Gathering, Assessment and Decision-Support (BIGADS) System B: Receiving a Rooftop Snow Load Condition Message from the Building Intelligence Gathering, Assessment and Decision-Support (BIGADS) System C: Using the VR-Guided Robot Navigation and Control Station to remotely control the VR-guided Snow Removing Robot System on building rooftop and remove the identified rooftop snow load condition specified in the Rooftop Snow Load Condition Message

FIG. 50A

VR-GUIDED METHOD OF MONITORING AND REMOVING SNOW LOADS FROM BUILDING ROOFTOP SURFACES

D: Sending A Rooftop Snow load Condition Removal Notification from the VR-Guided Robot Navigation and Control Workstation to a Building Intelligence Gathering, Assessment and Decision-Support (BIGADS) System E: The Building Intelligence Collection, Processing and Information System transmitting the Rooftop Snow load Condition Removal Notification to members of the Building Management Team F: The Building Management Team members updating the System Database upon receiving Rooftop Snow load Condition Removal Notification

FIG. 50B

METHOD OF MONITORING AND REMOVING SNOW LOADS FROM BUILDING ROOFTOP SURFACES

A: Installing an AI-Guided Snow Removing Robot System (and optionally one or more Mobile Automated Snow Conveying Structures) on building rooftop, and configuring a AI-Based Navigation and Control Server on the system network of a Building Intelligence Gathering, Assessment and Decision-Support System B: Receiving a Rooftop Snow Load Condition Message from the Building Building Intelligence Gathering, Assessment and Decision-Support System C: Using the AI-Based NCS to remotely control the AI-Guided Snow Removing Robot System (and Mobile Snow Conveying Structures) on building rooftop and remove the identified rooftop snow load condition specified in the Rooftop Snow Load Condition Message

FIG. 51A

METHOD OF MONITORING AND REMOVING SNOW LOADS FROM BUILDING ROOFTOP SURFACES

D: Sending A Rooftop Snow load Condition Removal Notification from the AI-Based Navigation Control Server supported on a Building Intelligence Gathering, Assessment and Decision-Support System E: The Building Intelligence Gathering, Assessment and Decision-Support System transmitting the Rooftop Snow load Condition Removal Notification to members of the Building Management Team F: The Building Management Team members updating the System Database upon receiving Rooftop Snow load Condition Removal Notification

FIG. 51B

BUILDING ROOFTOP INTELLIGENCE GATHERING AND DECISION-SUPPORT SYSTEM AND METHODS OF AUGMENTED-REALITY SUPPORTED BUILDING INSPECTION

RELATED CASES

This is a Continuation of co-pending patent application Ser. No. 15/794,263 filed Oct. 26, 2017, wherein said Patent Application is commonly owned by 2KR Systems, LLC, and incorporated herein by reference and is fully set forth herein.

BACKGROUND OF INVENTION

Field of Invention

The present invention relates to improvements in methods of and apparatus for collecting intelligence and various forms of information relating to building conditions, including rooftop snow load conditions, to assist building managers in making intelligent decisions that ensure the protection of human life and property during building management operations.

Brief Description of the State of Knowledge in the Art

Today, excessive snow loads building up on building rooftops during the winter season are causing more and more structural damage to buildings, lost revenues from business interruption, and risk to human life during building failure.

In some geographical locations, snow loads can grow progressively larger as snow accumulations build up over the winter months, so that a major snowstorm can cause snow loads to exceed building rooftop limits (e.g. exceed 30 psf), resulting in rooftop failure and damage to equipment and danger to people in spaces below.

Currently, several vendors offer wireless rooftop load sensors for measuring the gravitational loads caused by snow accumulations piling up on rooftops during the winter season. While prior art wireless rooftop snow load sensors and networking technology has helped in predicting the occurrence present of excessive rooftop snow loads, such prior art efforts when taken as a whole have been complex, difficult to install, and expensive to deploy under many circumstances. Moreover, prior art systems and technologies have generally failed in helping building owners and managers reduce the risk of (i) worker safety during rooftop snow removal operations, (ii) unexpected costs associated with rooftop snow removal, (iii) property damage and worker injury caused by excessive rooftop snow load conditions, and (iv) the disruption of business, including rental and operating income, caused by rooftop and other forms of building damage resulting from excessive snow loads and related conditions.

Furthermore, prior art rooftop snow management systems have not been optimally integrated into conventional building management systems, and police and fire department emergency response networks, further resulting in a decrease in a building owner's return on investment (ROI) in snow load monitoring solutions.

In view of the above shortcomings and drawbacks, significant improvements are needed in the performance of building rooftop safety systems, while advancing the state of the art in this technical field, including better ways of collecting, processing and sharing rooftop-related information with building managers, maintenance workers, property owners and insurance companies, without abandoning the many benefits that conventional technologies seek to offer, while overcoming the shortcomings and drawbacks of prior art apparatus and methodologies.

OBJECTS AND SUMMARY OF THE PRESENT INVENTION

Accordingly, a primary object of the present disclosure is to provide new and improved methods of and apparatus for gathering intelligence and various forms of information relating to building conditions, including rooftop snow load conditions, to assist building managers in making more timely and intelligent decisions and protecting human life and real property during building management operations, while avoiding the shortcomings and drawbacks of prior art systems, apparatus and methodologies.

Another object of the present invention is to provide a novel system for helping building management team members in significant ways, namely: (i) predicting and forecasting when excessive snow load conditions present serious risks to a building's structure; (ii) receiving automatic notifications when snow load conditions are developing at specific regions on a building rooftop to warrant intervention and automated mitigation through the use of VR-guided snow removing robot systems; (iii) collecting various forms of intelligence about conditions developing on and about a building rooftop and storing such information with annotations for use in supporting intelligent decision making processes; (iv) quickly, efficiently and safely removing dangerous risk-presenting snow load conditions on a building rooftop while minimizing risk to human workers and increasing building operating efficiency; and (v) automatically removing excessive snow load conditions at specified regions on a building's rooftop.

Another object of the present invention is to provide a novel system for helping building owners and insurers in significant ways, namely: (i) improving building maintenance worker safety conditions; (ii) reducing the cost of maintaining a building in response to snow accumulation conditions; (iii) reducing the risk of property damage and worker injury; and (iv) reducing the risk of disruption of business and rental and/or operating income as a result of rooftop and other forms of structural damage caused by excessive snow loads and conditions caused thereby.

Another object of the present invention is to provide a novel building intelligence collection, processing and information management system for use by members of building management and maintenance teams so that they can make more intelligent decisions while protecting buildings from excessive snow load conditions that can present great risk to real property, and human safety and life.

Another object of the present invention is to provide a novel system for helping building owners, occupants, property managers and maintenance personnel align their activities and interests while reducing risks of property damage and human injury.

Another object of the present invention is to provide a novel building intelligence collection, processing and information management system that can be readily integrated with (i) conventional building management systems, (ii) police and fire department emergency response networks, and (iii) elsewhere in various ways, to support the goals and objectives of the system.

Another object of the present invention is to provide a novel building intelligence gathering, assessment and decision-support (BIGADS) system for deployment across a portfolio of buildings, on the rooftops of which a network of snow load monitoring systems (SLMS) are installed.

Another object of the present invention is to provide a novel building intelligence gathering, assessment and decision-support system comprising a virtual reality (VR) multi-modal operator interface station that displays a realistic virtual reality depiction of a compact building-rooftop snow removing robot system, performing snow removal operations on a building rooftop, in conjunction with other VR-controlled equipment such as automated snow conveying tunnels, and rooftop-roving snow-melt pellet distributing systems.

Another object of the present invention is to provide a novel building intelligence gathering, assessment and decision-support system, wherein the Virtual Reality (VR) multi-modal operator interface station includes engine audio feedback and a near life-size operator display attached to a full-size cab, wherein snow removing dynamics are determined by models of the hydraulic system, the linkage system, and the snow moving forces.

Another object of the present invention is to provide a novel building intelligence gathering, assessment and decision-support system, for close integration with a novel automated building rooftop snow removal system comprising (i) VR-guided snow removing robot systems, (ii) automated snow conveying systems, (iii) VR/AR-enabled control stations for remotely controlling the operation of VR-guided snow removing robot systems during rooftop snow removal operations, (iv) flying unmanned snow depth measuring aircraft systems with video image capturing capabilities, and (v) VR/AR-enabled control stations for remotely controlling the operation of VR-guided snow depth measuring aircraft systems during rooftop snow depth measuring, profiling and surveying operations, wherein all such subsystems being integrated with and in communication with the data center and internet (TCP/IP) infrastructure of the building intelligence collection, processing and information management system of the present invention, and are tracked in real-time using a GPS system.

Another object of the present invention is to provide a novel building intelligence gathering, assessment and decision-support system comprising (i) a plurality of rooftop-based wireless solar/battery-powered snow load monitoring systems installed on a building rooftop for automatically detecting GPS-indexed rooftop conditions exceeding pre-defined snow load thresholds, (ii) a hand-held VR-enabled rooftop navigation and inspection device for navigating snow covered rooftops and inspecting such excessive snow load conditions, (iii) VR-guided snow depth measuring aircraft systems for measuring snow depth profiles at rooftop regions linked to excessive snow load conditions, and capturing video recordings of the same, for storage and playback on system servers, and (iii) AR/VR-enabled control stations for remotely controlling VR-navigated and controlled snow removing robot systems deployed on the building rooftop, for removing such excessive snow load conditions, and advising building management team members of the completion of snow load removal plans.

Another object of the present invention is to provide such a novel building intelligence gathering, assessment and decision-support system, wherein (i) Web-enabled client machines (e.g. mobile computers, smartphones, laptop computers, workstation computers, etc.) are provided for remotely accessing snow load inspection reports stored in the system database, (ii) hand-held VR/AR-enabled rooftop navigation and inspection devices are provided to assist human operators during physical rooftop navigation and inspection as well as intelligence collection, storage and sharing operations, (iii) AR/VR-enabled control stations are provided for remotely controlling VR-navigated and controlled snow removing robot systems deployed on building rooftops, (iv) AR/VR-enabled control stations are provided for remotely controlling VR-navigated and controlled snow depth measuring aircraft systems deployed at specified building rooftops, and (v) web, application and database servers are provided for building management team members to access information sources related to, for example, weather forecasting, social media, financial markets, and the like.

Another object of the present invention is to provide such a building intelligence gathering, assessment and decision-support system, wherein a first illustrative embodiment of the snow load monitoring system (i.e. station) comprise a gravitational force (GF) load sensing base station containing load sensors, and a communication and control (i.e. data processing) module mounted on a vertical support post, supporting a digital wind speed and direction and direction instrument (i.e. digital anemometer) connected to the communication and control module, and with a whip-type antenna extending from the communication and control (i.e. data processing) module and terminating in a stroboscopic LED-based illumination module to help human inspectors and workers visibly see the snow load measuring system mounted on the rooftop during deep snow accumulations, blustery snow conditions and at night.

Another object of the present invention is to provide such a building intelligence gathering, assessment and decision-support system, wherein the first illustrative embodiment of the snow load monitoring system (i.e. station) comprises various subsystems including a snow load sensing and measurement subsystem, a temperature measurement subsystem, a wind speed and direction measurement subsystem, a digital image and video capture and processing subsystem, a snow drone docking and battery charging subsystem, a data communication subsystem, a solar-powered battery storage recharging subsystem, a collision avoidance signaling subsystem for communication with snow removing and drone-based snow depth measuring subsystems, stroboscopic visual signaling subsystem for human rooftop inspectors, and a GPS-based referencing subsystem, all of which are integrated about a subsystem control subsystem, as shown, for controlling and managing the operations of the subsystems during system operation.

Another object of the present invention is to provide such a building intelligence gathering, assessment and decision-support system, wherein the snow load monitoring system comprises various components arranged and configured about a microprocessor and flash memory (i.e. control subsystem), including load cells, a GPS antenna, a GPS signal receiver, voltage regulator, an Xbee antenna, an Xbee radio transceiver, a voltage regulator, a photo-voltaic (PV) panel, an external power connector, a charge controller, a battery, thermistors, a power switch, a voltage regulator, external and internal temperature sensors, power and status indicator LEDs, programming ports, a wind speed and direction sensor, a digital/video camera, and other sensors.

Another object of the present invention is to provide such a building intelligence gathering, assessment and decision-support system, wherein the unmanned snow depth measuring drone subsystem comprises an aircraft body housing four vertically-mounted symmetrically arranged propeller-type rotors, supporting vertical takeoff (VTO) and pitched flight over building rooftops while (i) measuring the depth profile of snow loads on rooftops, using any one of a number of supported non-contact type methods and modules, and (ii) capturing digital video images within the field of view (FOV) of its onboard camera subsystem during its course of travel, thereby collecting information for processing and generation of GPS-indexed time-stamped snow depth profile maps of building rooftops including before, during and after snow storms, in accordance with the principles and teachings of the present invention.

Another object of the present invention is to provide such a building intelligence gathering, assessment and decision-support system, wherein the unmanned snow depth measuring drone subsystem measures the depth profile of snow loads on rooftops, using an energy-beam based method of non-contact snow depth measurement.

Another object of the present invention is to provide such a building intelligence gathering, assessment and decision-support system, wherein the unmanned snow depth measuring drone subsystem carries out a LIDAR based snow depth measurement method, wherein an amplitude modulated (AM) laser beam is generated and transmitted into a layer of snow, while the return laser signal is detected and processed to determine the time of flight of the laser beam to the snow, and thereby computing a measured depth of the snow on the building rooftop.

Another object of the present invention is to provide such a building intelligence gathering, assessment and decision-support system, wherein the unmanned snow depth measuring drone subsystem carries out a scanning LIDAR based snow depth measurement method, wherein an amplitude modulated (AM) laser beam is generated and scanned across a layer of snow, while the return laser signal is detected and processed to determine the time of flight of the laser beam through the snow, and thereby compute a measured depth of the snow on the building rooftop.

Another object of the present invention is to provide such a building intelligence gathering, assessment and decision-support system, wherein the unmanned snow depth measuring drone subsystem carries out an optical range finding based snow depth measurement method, wherein an LED-generated amplitude modulated light beam is generated and transmitted into a layer of snow, and the return light signal is detected and processed to determine the time of flight of the light beam through the snow, and thereby computing a measured depth of the snow on the building rooftop.

Another object of the present invention is to provide such a building intelligence gathering, assessment and decision-support system, wherein the unmanned snow depth measuring drone subsystem carries out a RADAR based snow depth measurement method, wherein an microwave energy beam is generated and transmitted into a layer of snow, and the return microwave signal is detected and processed to determine the time of flight of the beam through the snow, and thereby computing a measured depth of the snow on the building rooftop.

Another object of the present invention is to provide such a building intelligence gathering, assessment and decision-support system, wherein the unmanned snow depth measuring drone subsystem carries out a SONAR based snow depth measurement method, wherein an acoustic energy beam is generated and transmitted into a layer of snow, and the return acoustic signal is detected and processed to determine the time of flight of the beam through the snow, and thereby computing a measured depth of the snow on the building rooftop.

Another object of the present invention is to provide such a building intelligence gathering, assessment and decision-support system, wherein the unmanned snow depth measuring drone subsystem carries out a multi-element optical range finding method of snow depth measurement of the present invention, wherein optical energy beam is generated and transmitted into a layer of snow, and the return optical signal is detected and processed along different optical channels, to determine a measured depth of the snow at particular locations on the building rooftop.

Another object of the present invention is to provide such a building intelligence gathering, assessment and decision-support system, which further comprises a dome-type shelter system supported on a building rooftop for sheltering a remotely-controlled unmanned snow depth measuring aircraft, wherein the shelter system has a closed configuration adapted for storing a unmanned snow depth measuring aircraft system, while its battery packs are reconditioned and recharged and diagnostic analysis is carried out during periodic maintenance operations.

Another object of the present invention is to provide such a building intelligence gathering, assessment and decision-support system, wherein the snow sheltering dome system comprises a support post, a semi-spherical base portion supporting a planar landing platform on which a unmanned snow depth measuring aircraft system can land and be supported, and a pair of hinged quarter-spherical housing portions for enclosing the aircraft system during its closed configuration and revealing the same when configured in its open configuration.

Another object of the present invention is to provide such a building intelligence gathering, assessment and decision-support system, wherein the snow sheltering dome system is arrangeable in a closed mode, with its hinged housing portions closed about its unmanned snow depth measuring aircraft supported on its landing support platform;

Another object of the present invention is to provide such a building intelligence gathering, assessment and decision-support system, wherein the snow drone sheltering dome system can be arranged in an open mode, with its hinged housing portions opened and removed away from the unmanned snow depth measuring aircraft supported on its landing support platform.

Another object of the present invention is to provide such a building intelligence gathering, assessment and decision-support system, wherein the unmanned snow depth measuring aircraft system comprises a snow depth measurement subsystem, a flight/propulsion subsystem enabling vertical take off (VTO) flight using multi-rotor systems, a collision avoidance subsystem, an inertial navigation & guidance subsystem, a digital video imaging subsystem, a data communication subsystem, altitude measurement and control subsystem, snow depth profiling subsystems, auto-pilot subsystem, GPS navigation subsystem, and a subsystem control subsystem for controlling and/or managing the other subsystems during system operation.

Another object of the present invention is to provide such a building intelligence gathering, assessment and decision-support system, wherein the unmanned snow depth measuring aircraft system profiles GPS-specified regions of the building rooftop using laser/light beam methods when no snow accumulations are present, and transferring digital information about such collected rooftop intelligence to the remote data center of system.

Another object of the present invention is to provide such a building intelligence gathering, assessment and decision-support system, wherein the unmanned snow depth measuring aircraft system profiles GPS-specified regions of the building rooftop using laser/light beam methods when snow accumulations are present on the rooftop, and transferring digital information about such collected rooftop intelligence to the remote data center of the system.

Another object of the present invention is to provide such a building intelligence gathering, assessment and decision-support system, wherein the unmanned snow depth measuring aircraft system profiles GPS-specified regions of the building rooftop using sonar/acoustic-based methods and real time kinematic (RTK) GPS referencing techniques (to enhance the precision of positioning) when snow accumulations are and are not present on the rooftop, and (ii) transferring digital information about such collected rooftop intelligence to the remote data center of the system, for subsequent processing to computer snow depth profile maps.

Another object of the present invention is to provide such a building intelligence gathering, assessment and decision-support system, which further comprises an automated snow conveying tunnel system mounted on the building rooftop and having an open configuration exposing a motorized snow conveyor belt during snow loading and conveying operations.

Another object of the present invention is to provide such a building intelligence gathering, assessment and decision-support system, wherein the automated snow conveying tunnel system comprises a conveyor belt subsystem, driven by electric and/or gas driven motors, with hydraulically-controlled tunnel sections surrounding the conveyer belt and arrangeable in a close, half-open and wide-open configurations.

Another object of the present invention is to provide such a building intelligence gathering, assessment and decision-support system, wherein the automated snow conveying tunnel system comprises a hydraulically-powered conveyor (belt) covering subsystem, a conveyor snow belt transport subsystem, conveyor belt de-icing subsystem, digital camera subsystems providing various fields of view (FOV), LED-based illumination subsystems for illuminating these FOVs, a data communication subsystem, a temperature sensing subsystem, a conveyor belt lubrication subsystem, a VR-guided control subsystem, a GPS navigation subsystem, and a subsystem control subsystem for controlling and/or managing the operation of these subsystems during system operation.

Another object of the present invention is to provide such a building intelligence gathering, assessment and decision-support system, wherein a first illustrative embodiment of the VR-guided (i.e. VR-navigated) snow removing robot system comprises a compact lightweight body, with a traction-type drive system powered by an electric motor (and/or fossil-fuel engine), and having a snow moving tool (e.g. snow shovel, snow blower, or the like) movable under hydraulic control, along with weatherized digital video camera systems providing field of views (FOVs) in the front and rear of the robotic vehicle, and having multi-band wireless radio control and communications, GPS-supported navigation and collision avoidance capabilities, allowing the vehicle to be safely operated by a human operator remotely situated in front a VR-guided control station, wearing VR display goggles or viewing a stereoscopic-display panel.

Another object of the present invention is to provide such a building intelligence gathering, assessment and decision-support system, wherein the VR-guided snow removing robot system comprises a snow shovel tool mounted to its front end, as well as being fully equipped with side, front and rear navigational camera systems, side, front and rear ranging sensors, a GPS, a RTK antenna, a 900 MHZ antenna, and a refuel/recharging port mounted in the rear of the vehicular system.

Another object of the present invention is to provide such a building intelligence gathering, assessment and decision-support system, wherein the VR-guided snow removing robot system comprises side, front and rear navigational camera systems, side, front and rear ranging sensors, a GPS receiver, an RTK antenna, a 900 MHZ wireless communication antenna, and a refuel/recharging port mounted in the rear of the vehicular system.

Another object of the present invention is to provide such a building intelligence gathering, assessment and decision-support system, further comprising a snow shelter system installed on a building rooftop, and adapted for protecting a snow removing robot system, from snow and other forms of harsh outdoor weather, while refueling and recharging the robot system as required to satisfy its energy/power requirements.

Another object of the present invention is to provide such a building intelligence gathering, assessment and decision-support system, wherein a second illustrative embodiment of the VR-guided snow removing robot system comprises a snow blowing tool mounted to its front end, as well as being fully equipped with side, front and rear navigational camera systems, side, front and rear ranging sensors, a GPS receiver, an RTK antenna, a 900 MHZ antenna, and a refuel/recharging port mounted in the rear of the snow removing robot system.

Another object of the present invention is to provide such a building intelligence gathering, assessment and decision-support system, wherein the VR-guided snow removing robot system comprises side, front and rear navigational camera systems, side, front and rear ranging sensors, a GPS receiver, an RTK antenna, a 900 MHZ antenna, and a refuel/recharging port mounted in the rear of the snow removing robot system.

Another object of the present invention is to provide such a building intelligence gathering, assessment and decision-support system, wherein the VR-navigated snow removing robot system comprises a snow-depth measurement subsystem, a propulsion/drive subsystem, collision avoidance subsystem, digital camera subsystems providing various (i.e. front, rear and side fields of views (FOVs), LED-based illumination subsystems for illuminating these FOVs, a data communication subsystem, a temperature & moisture measurement subsystem, snow-depth profiling subsystem, a VR-guided and auto-pilot subsystem, a GPS navigation subsystem, and a subsystem control subsystem for controlling and/or managing the operation of these subsystems during system operation.

Another object of the present invention is to provide such a building intelligence gathering, assessment and decision-support system, wherein a human operator/inspector carries a hand-held mobile augmented-reality (AR) based rooftop navigation and inspection device while standing on a building rooftop, while viewing the rooftop through the field of view (FOV) of the digital video camera aboard the hand-held rooftop navigation and inspection device, while GPS-indexed icons of rooftop-mounted snow load measuring systems/stations are displayed on the LCD display panel to assist the operator while navigating the rooftop, inspecting the situation, and identifying where snow load monitoring stations have been installed and where excessive snow loads have been automatically detected and reported to building management and maintenance team members by the system.

Another object of the present invention is to provide such a building intelligence gathering, assessment and decision-support system, wherein the hand-held augmented-reality (AR) based rooftop navigation and inspection device displays graphical AR icons within the field of view of the digital camera system, and wherein the AR icons indicating the GPS location of snow load monitoring systems mounted on the rooftop, and possibly buried in snow cover.

Another object of the present invention is to provide a novel method of monitoring rooftop snow loads using a mobile augmented-reality (AR)-enabled rooftop navigation and inspection system, comprising the steps of: (a) receiving a snow load alarm notification from a building intelligence gathering, assessment and decision-support system, and accessing the mobile AR-enabled rooftop navigation and inspection system, (b) holding the mobile AR-enabled rooftop navigation and inspection system in the operator's hand or as part of an VR helmet with clear projection visor, viewing the system's Field of View (FOV) while (i) observing augmented-reality (AR) images (or icons) of GPS-indexed snow load measuring stations installed on the rooftop, (ii) inspecting rooftop conditions (and showing a geo-referenced overlayed heat map image corresponding to (a) snowload, (b) load status at each SLMS or (c) snowdepth as acquired by the drone vehicle), (iii) making audio and video recordings of the rooftop, and (iv) taking notes and linking the same to the snow load alarm event, and (iv) sending the operator's snow load event inspection report to building management and maintenance team members, and determine a plan of resolution for the snow load alarm event (e.g. make and execute a snow removal plan).

Another object of the present invention is to provide an automated system for monitoring, detecting and removing excessive snow loads from building rooftop surfaces using the VR-guided snow removing robot system, guided and controlled by an remotely-situated human operator working before a snow removing robot navigation and control station supporting virtual reality (VR) and augmented-reality (AR) viewing experiences.

Another object of the present invention is to provide such a building intelligence gathering, assessment and decision-support system, comprising a virtual and augmented-reality supported snow robot navigation and control station including a stereoscopic display subsystem, a network communication subsystem, a data keyboard and mouse, a printer, an audio subsystem, a 3D controller subsystem, and a processor and memory subsystem.

Another object of the present invention is to provide such a building intelligence gathering, assessment and decision-support system, wherein a virtual and augmented-reality supported snow robot navigation and control station displays split screens containing (i) the front and rear field of views (FOVs) of the digital video cameras aboard the VR-guided snow removing robot system, and (ii) the videos and images captured by the unmanned snow depth measuring aircraft system of the present invention, to help the operator safely navigate on the snow-covered rooftop during rooftop snow removal operations.

Another object of the present invention is to provide such a building intelligence gathering, assessment and decision-support system, wherein a first illustrative embodiment of the automated snow conveying tunnel system of the present invention is shown mounted on the building rooftop and arranged in its closed configuration sheltering its motorized snow conveyor belt from weather conditions that might otherwise cause snow piling, icing and other conditions adversely effecting the operation of snow conveying operations;

Another object of the present invention is to provide such a building intelligence gathering, assessment and decision-support system, wherein a snow conveying tunnel system is mounted on the building rooftop and arranged in its wide-open configuration allowing a VR-guided snow removing robot system to easily load snow onto the conveyor belt of the snow conveying tunnel system and transport it off the rooftop onto the ground surface below for subsequent handling and/or processing.

Another object of the present invention is to provide such a building intelligence gathering, assessment and decision-support system, wherein a snow load monitoring system is provided, comprising: (i) an injection-molded plastic base station designed for measuring snow load on its surface using a single load cell configured in a deflection method of measurement; (ii) a control, data processing and communication module supported on a vertical mast/post mounted to the base station; and (iii) a whip antenna terminated with a stroboscopic illumination module and flexible photo-voltaic (PV) panel wrapped about the vertical mast.

Another object of the present invention is to provide such a building intelligence gathering, assessment and decision-support system, wherein the snow load monitoring system is provided, comprising (i) an injection-molded plastic base station designed for measuring snow load on its surface using a single load cell configured in a deflection method of measurement; (ii) a control, data processing and communication module supported on a vertical mast/post mounted to the base station; and (iii) a whip antenna terminated with a stroboscopic illumination module and flexible photo-voltaic (PV) panel wrapped about the vertical mast.

Another object of the present invention is to provide such a building intelligence gathering, assessment and decision-support system, wherein a snow load monitoring system is provided, comprising: the base station supporting a wind speed and direction instrument mounted on a mast, about which a thin-film photo-voltaic (PV) panel is wrapped for solar energy collection while offering minimal wind resistance to the rooftop-mounted system, and a stroboscopic illumination module mounted on the top of the instrument.

Another object of the present invention is to provide such a building intelligence gathering, assessment and decision-support system, wherein a snow load monitoring system is provided, comprising a PCB-based control and communication module mounted inside a base station, and a thin-film photo-voltaic panel mounted on the top surface of a weigh panel, while a wind speed and direction instrument and stroboscopic illumination module are mounted at the distal portion of its vertically supported mast structure, wherein during a deflection method of measuring distributed snow loads, the flexible weigh panel deflects in response to the application of a spatially-distributed snow load, and the single load mounted in the center of the base station responds to the applied snow load, and deflection of the flexible weigh panel generates electrical signals corresponding to the intensity of the distributed snow load.

Another object of the present invention is to provide a novel method of calibrating a load sensor and programming a snow load data processing module (i.e. control, data processing and communication module) based on deflection-based measurement principles of physics, comprising the steps of (a) mounting a snow load sensing module to be tested in the bottom of a box like structure wherein the walls of the box like structure spatially correspond with the perimeter boundaries of the snow load sensing surface, (b) installing a flexible fluid containing membrane over the sensor inside the box like structure, (c) adding quantified amounts of snow/ice loading material into the box, and measuring the electrical output of the sensor in the snow load sensing module, (d) correlating the depth of the snow/ice loading material with the voltage output of the sensor, (e) using the depth vs. voltage data to create a mathematical formula that provides a voltage in response to snow pressure, and (f) loading the mathematical formula into persistent (i.e. flash) memory associated with the data processing module.

Another object of the present invention is to provide such a building intelligence gathering, assessment and decision-support system, wherein an integrated spring mechanism provided in a snow load monitoring system mounted on a building rooftop surface, allows the mast to elastically deform and bend in response to wind forces applied to the snow load monitoring system.

Another object of the present invention is to provide such a building intelligence gathering, assessment and decision-support system, wherein a snow load monitoring system is provided, comprising: a base plate constructed from a folded sheet metal bonded together, and a base station constructed from sheet metal using a single load cell configured using the deflection measurement method, wherein a set of disc-like weights are mounted about the load cell to provide stability in the presence of wind, and a base weigh plate supported over the base frame.

Another object of the present invention is to provide such a building intelligence gathering, assessment and decision-support system, wherein a snow load monitoring system is provided, comprising: a PCB-based control, data processing and communication module mounted above a base station by a set of four corner-mounted fiberglass legs which designed to elastically distort and prevent overturning against high winds.

Another object of the present invention is to provide a novel strain gauge force sensor (i.e. load cell) for use in a snow load monitoring system, comprising: an injection-molded base housing having a cylindrical load cell mounting recess; a strain-gauge sensor mounted in a mounting recess of a base housing component; co-molded cover housing portion having an elastic load sensing region disposed above in close contact with the load sensor; and a rubber gasket for insertion between the cover housing portion and the base housing portion.

Another object of the present invention is to provide a novel strain gauge force sensor (i.e. load cell) for use in a snow load monitoring system, comprising: an injection-molded base housing having a cylindrical load cell mounting recess; a strain-gauge sensor mounted in mounting recess of the base housing component; a co-molded cover housing portion having an elastic load sensing region disposed above in close contact with the load sensor; a rubber gasket for insertion between the cover housing portion and the base housing portion; and a base-mounted force-overload protection spring mounted between the load sensor and bottom surface of the base housing and adapted to reduce the magnitude of force that the load cell sensor experiences when excessive force overloads are applied to the elastic load sensing region of the strain gauge force sensing device.

Another object of the present invention is to provide a novel strain gauge force sensor (i.e. load cell) for use in a snow load monitoring system, comprising: an injection-molded base housing having a cylindrical load cell mounting recess; a strain-gauge sensor mounted in mounting cup having a pair of support flanges; a co-molded cover housing portion having an elastic load sensing region disposed above in close contact with the load sensor; a rubber gasket for insertion between the cover housing portion and the base housing portion; and a set of force-overload protection springs mounted between the support flanges and the bottom surface of the base housing and adapted to reduce the magnitude of force that the load cell sensor experiences when excessive force overloads are applied to the elastic load sensing region of the strain gauge force sensing device.

Another object of the present invention is to provide a novel strain gauge force sensor (i.e. load cell) for use in a snow load monitoring system, comprising load sensor supported within a mounting cup and between a pair of force-overload protection springs mounted between support flanges and the bottom of a base housing portion, to reduce the magnitude of force that the load cell sensor experiences when excessive force overloads are applied to the elastic load sensing region.

Another object of the present invention is to provide a novel strain gauge force sensor (i.e. load cell) for use in a snow load monitoring system, comprising a strain-gauge sensor mounted within a foam ring or rubber bellows structure between a pair of rigid plates.

Another object of the present invention is to provide a novel strain gauge force sensor (i.e. load cell) for use in a snow load monitoring system, comprising a piezo-gauge sensor mounted between two injection-molded plastic housing components.

Another object of the present invention is to provide a novel strain gauge force sensor (i.e. load cell) for use in a snow load monitoring system, comprising: a piezo-gauge sensor; a first injection-molded plastic housing component having a recess for receiving the piezo-gauge sensor, a second co-molded plastic housing component having a rubber load force region that establishes contact with the piezo-gauge sensor; and rubber gasket seal that sits in a seats formed within the first and second housing components; and a set of screws for fastening together the first and second housing components.

Another object of the present invention is to provide a novel snow load monitoring system comprising a base station having a force sensor recess (i.e. mounting well) stamped into a piece of sheet metal, and a weigh plate bonded or welded to the sheet metal.

Another object of the present invention is to provide a novel snow load monitoring system comprising a base station having an extruded frame having flat top and bottom plates that slide into the extruded frame, and a force sensor is mounted in a support frame fixed to the bottom plate.

Another object of the present invention is to provide a novel snow load monitoring system comprising an injection-molded plastic weight plate and base housing containing a single load sensor configured according to the deflection measurement method, and the mast is mounted on the side of the base station.

Another object of the present invention is to provide a novel snow load monitoring system comprising an injection-molded plastic weight plate and base housing containing four load sensors configured according to a deflection measurement method, and a mast mounted on the center of the base station.

Another object of the present invention is to provide a novel snow load monitoring system comprising a base station having a weight plate affixed and sealed to the base housing framework containing four load sensors configured according to a translational measurement method, and a mast mounted on the side of the base station.

Another object of the present invention is to provide a novel snow load monitoring system comprising a base station having a flexible gasket disposed between a flat weight and base plates with four load sensors mounted on the base plate and configured according to a translational measurement method, and a mast mounted on the side of the base station.

Another object of the present invention is to provide a novel snow load monitoring system comprising a base station having a weight plate supported on a single load sensor configured according to a bathroom-scale measurement method and a cantilever support structure mounted on the load sensor and a base plate on a base framework, with a mast mounted on the side of the base station.

Another object of the present invention is to provide a novel snow load monitoring system comprising a base station comprising a weight plate, a load sensor, bathroom-scale cantilever load distribution structures and a base framework with a bottom base plate.

Another object of the present invention is to provide a novel snow load monitoring system comprising a base station having a plurality of piezo-type load sensors molded into a rubber-like casing disposed between flat weigh and base plates.

Another object of the present invention is to provide a novel snow load monitoring system comprising a base station having a Bluetooth® data communication link for wireless communication with a mobile smart phone running an application designed for programming and monitoring the snow load monitoring system.

Another object of the present invention is to provide a building intelligence gathering, assessment and decision-support system, supporting various enterprise-level services on the system network including, for example, managing (i) users registered on a user account, (ii) buildings registered on a user account, (iii) zones registered on buildings on a user account, (iv) gateways registered with buildings on a user account, (v) snow load monitoring stations registered within zones of a building on a user account, (vi) VR-guided snow removing robot systems registered with Buildings on a user account, (vii) unmanned snow depth measuring aircraft systems registered with a building on a user account, and (viii) AR-based mobile rooftop navigation and inspection systems registered with a building on a user account.

Another object of the present invention is to provide a building intelligence gathering, assessment and decision-support system, supporting various enterprise-level services (i.e. actions) on the system network including, for example, (i) poll all stations to monitor parameter settings and detected conditions, (ii) simulate snow accumulation conditions at a snow load monitoring station on a building rooftop in response to selected input conditions, (iii) visualize data collected at a particular snow load monitoring station, and (iv) review weather forecasts at particular building rooftops.

Another object of the present invention is to provide a building intelligence gathering, assessment and decision-support system, supporting the polling of all snow load monitoring stations to monitor parameter settings and detected conditions at each polled snow load monitoring station.

Another object of the present invention is to provide a building intelligence gathering, assessment and decision-support system, supporting various enterprise-level services on the system network including (i) building rooftop snow depth profiling using an unmanned snow depth measuring aircraft system, (ii) reviewing building rooftop snow depth profile models maintained and periodically updated by the system, and (iii) forecasting weather conditions for a specified building.

Another object of the present invention is to provide a novel method of rooftop snow depth profiling using unmanned snow depth measuring aircraft systems deployed within a building intelligence gathering and decision-support system, comprising the steps of: (a) deploying a unmanned snow depth measuring aircraft system registered with the BIGADS system, to profile the snow depth of a particular building rooftop, (b) selecting and enabling a non-contact unmanned snow depth measuring method on the unmanned snow depth measuring aircraft system, (c) collecting GPS-indexed snow depth profile data from the building rooftop, (d) transmitting collected GPS-indexed snow depth to the database server of the data center of the BIGADS system, and (d) using a Web browser to request and review snow depth profile data for a specified building rooftop.

Another object of the present invention is to provide a building intelligence gathering, assessment and decision-support system, supporting method of forecasting the weather conditions at locations of specific buildings registered on a user account on the system network, comprising the steps of: (a) accessing and processing historical weather data recorded in weather databases and creating a building weather database for a particular building being managed by the BIGADS system; (b) collecting and storing local weather data from rooftop-mounted snow load measuring stations and adding this data to the building weather database for the specified building registered in the BIGADS system; (c) collecting GPS-indexed snow depth profile data from the building rooftop, and add this snow depth profile data to the building weather database; (d) analyzing the data contained in the building weather database to identify patterns and trends useful for predicting and weather forecasting; and (e) using a web browser to request weather forecast reports based on data collected and processed in the building weather database, and using such reports to plan a course of action relating to expected requirements of rooftop snow load management during a particular time period.

Another object of the present invention is to provide a method of designing, installing, deploying and operating an automated building rooftop snow load monitoring and removal system, comprising the steps of comprising: (a) during a pre-design and pre-installation phase, surveying and modeling rooftop building conditions; (b) during a design phase, developing 3D Rooftop Geometry Model (3DRGM) specifying various rooftop building parameters (i.e. rooftop boundary conditions, snow load measurement zones rated in pressure (i.e. 30 PSF), structures (e.g. antennas, cooling towers, walls, mechanical rooms, etc.), key areas of high snow depth, placement of snow load monitoring stations (SLMS) and other sensors, placement of IP gateway (IPG) unless stations are using cellular connections at which time no IPG is required, passive depth marker placement, (i.e. stations having graduations on masts and antennas), parking locations for snow removal robot systems, placement of snow conveyor tunnel systems, hangar placement for unmanned snow depth measuring aircraft, portable rooftop navigation terminal deployment, and VR-guided snow removal robot navigation and control stations; (c) generating a Building Rooftop Snow-load State Model (BRSSM) using current 3DRGM (loads and asset locations at any point in time); (d) constructing and installing an automated building rooftop snow monitoring and removal system based on the BRSSM generated for the specified building rooftop placement and assemble of wireless SLMS on the building rooftop; (e) deploying, testing, calibrating and adjusting the system; (f) initializing the system; (g) maintaining and updating the system; (h) sending weather forecast snow alerts; (i) automatically detecting excessive snow load events and generating and transmitting snow load alarm notifications/messages to all responsible member of the building management/maintenance team; (j) responding to snow load events by executing a snow load removal plan; and (k) sending snow load removal confirmations to building managers when the snow load removal plan has been completed.

Another object of the present invention is to provide a method of detecting, communicating, responding to, and resolving snow load alarm conditions on a building associated with a user account on the system network of a building intelligence gathering, assessment and decision-support system, comprising the steps: of (a) deploying a plurality of snow load monitoring systems on the surface of a specified building rooftop and configuring these SLMSs to the system network of the system; (b) deploying a VR-guided snow removing robot system on the surface of a specified building rooftop and configuring the snow removing robot system to the system network of the system; (c) deploying a VR-enabled control station for remotely operating the snow removing robot system on the surface of the specified building rooftop and configuring the VR-enabled control station to system network of the system; (d) registering a team of building management and/maintenance members with a User Account maintained on the system network of the system; (e) in response to at least one of the snow load monitoring system automatically detecting a snow load at a specified region of the rooftop that exceeds a preset threshold, generating and transmitting a snow load alarm notification to all team members; (f) at least one team member responding to the snow load alarm notification by creating a snow removal plan requiring the use of the VR-guided snow removal robot system to remove the snow load alarm condition on the rooftop under the remote control of a specified VR-enabled control station; and (g) after completing the snow removal plan and removing the snow load alarm condition, generating and transmitting a snow load removal confirmation to all team members.

Another object of the present invention is to provide method of responding to snow load alarm notifications by making physical rooftop inspections using the hand-held AR-guided rooftop navigation and inspection systems of the present invention, comprising the steps of: (a) receiving a snow load alarm notification from the building intelligence gathering, assessment processing and decision-support system; (b) using a hand-held AR-enabled rooftop navigation and inspection system to navigate and inspect the building rooftop specified in the snow load alarm notification; (c) recording the navigation and inspection of the building rooftop, including recorded annotations by the human operator/building inspector, and transmitting the annotated video recording to a database server maintained at the data center of the system; and (d) others on the building management and maintenance team using a Web browser to access the database server and review the annotated recording of the building rooftop inspection report made by the inspector using the AR-enabled rooftop navigation and inspection system.

Another object of the present invention is to provide a method of responding to snow load alarm notifications by deploying a snow load measuring aircraft system to the building for remote aerial inspection and rooftop intelligence collection operations for review by remotely situated building managers, comprising the steps of: (a) a building management team member receiving a snow load alarm notification from a building intelligence gathering, assessment processing and decision-support system; (b) deploying an unmanned snow depth measuring aircraft system registered with the building, to navigate and inspect the building rooftop specified in the snow load alarm notification and compare snow depth measurements against measured snow load conditions at the specified rooftop location; (c) capturing a digital video recording and snow depth measurements around and about the snow load alarm region, and transmitting the recording to a database server maintained at the data center of the system; and (d) others on the building management and maintenance team using a Web browser to access the database server and review the recording of the aerial building rooftop inspection made by the flying unmanned snow depth measuring aircraft system over the specified building rooftop.

Another object of the present invention is to provide a method of removing specified snow loads on a rooftop using VR-guided robotically-controlled snow collection and removal systems (i.e. machines) remotely controlled and operated by a human operator using a remotely-located VR/AR-enabled control station configured for remotely controlling the operation of the snow collecting and removing robot system on the building rooftop, comprising the steps of: (a) installing VR-guided snow removing robot system on building rooftop, and configuring at least one VR-Guided robot navigation and control station with the building intelligence gathering, assessment and decision-support system of the present invention; (b) receiving a rooftop snow load condition message from the building intelligence gathering, assessment and decision-support system; (c) using the VR-guided robot navigation and control station to remotely control the VR-guided snow removing robot system on the building rooftop and remove the identified rooftop snow load condition specified in the rooftop snow load condition message; (d) sending a rooftop snow load condition removal notification from the VR-guided robot navigation and control station to the building intelligence gathering, assessment and decision-support system; (e) the building intelligence gathering, assessment and decision-support system transmitting the rooftop snow load condition removal notification to members of the building management team; and (f) the building management team members updating the system database upon receiving rooftop snow load condition removal notification.

Another object of the present invention is to provide a method of removing specified snow loads on a rooftop using AI-guided robotically controlled snow collection and removal systems (i.e. machines) remotely controlled and operated by an artificial intelligence (AI) based navigational control server comprising the steps of: (a) installing at least one AI-guided snow removing robot system on building rooftop, and configuring an AI-based navigation control server within the system network of the building intelligence gathering, assessment and decision-support system of the present invention; (b) receiving a rooftop snow load condition message from the building intelligence gathering, assessment and decision-support system; (c) using the AI-based navigation control server to remotely control the AI-guided snow removing robot system on building rooftop and remove the identified rooftop snow load condition specified in the rooftop snow load condition message; (d)

sending a rooftop snow load condition removal notification from the AI-based navigation control server supported within the building intelligence gathering, assessment and decision-support system; (e) the building intelligence gathering, assessment and decision-support system transmitting the rooftop snow load condition removal notification to members of the building management team; and (f) the building management team members updating the system database upon receiving rooftop snow load condition removal notification.

Another object of the present invention is to provide a new and improved system of reconfigurable rooftop-based snow conveying machines which can be quickly and remotely reconfigured so as to optimally support the automated and/or semi-automated removal of rooftop snow loads, using other machinery such as remotely control snow removing robots equipped with various types of snow-removal tools such as, snow pushers, snow scoopers, snow blowers, and the like.

Another object of the present invention is to provide such a novel Internet-based method of and system for gathering, assessing and sharing information and media relating to building rooftop conditions for supporting building managers, maintenance workers and others in their effort to maintain building property and the security of those who live and work in building spaces.

Another object of the present invention is to provide a novel Internet-based system network that comprises client application software for mobile devices, tablets and desktops, and supports a communication and message processing infrastructure that allows conventional mobile phones supporting SMS and/or email to share captured snow depth profiles with building management team members and property managers using the client application software on their smart phone devices.

Another object of the present invention is to provide a novel Internet-based system network enabling geographically, distributed building management team members to actively and meaningfully contribute to the decisions required to support building property management operations.

Another object of the present invention is to provide a novel Internet-based system network enabling remote-situated building management team members to share insights and make suggestions during emergency decisions created by excessive snow load conditions on building rooftops presenting great risk to property damage, business disruption, and human safety.

Another object of the present invention is to provide a novel Internet-based system network that is realized using desktop, tablet and mobile HTML5 applications that allow system network users to easily collect, store and share building rooftop intelligence, including rooftop snow depth, GPS-indexed snow load measurements, and related video media with building management team members, however distributed, to help support them in their daily decision making operations.

These and other objects will become apparent hereinafter and in the Claims to Invention appended hereto.

BRIEF DESCRIPTION OF THE DRAWINGS

In order to more fully understand the Objects, the following Detailed Description of the illustrative embodiments should be read in conjunction with the accompanying Drawings, wherein:

FIG. 1B is a high-level network diagram showing the primary components of system network supporting the BIGADS system of the present invention reflected in FIG. 1A including building networks with client and server systems interconnected therewith via TCP/IP, the data center of the system network of the present invention, cellular phone and SMS messaging systems deployed on the Internet, Web-enabled client machines (e.g. mobile computers, smartphones, laptop computers, workstation computers, etc.), email server systems, hand-held VR-enabled rooftop navigation and inspection devices, AR/VR-enabled control stations for remotely controlling VR-navigated and controlled snow removing robot systems deployed on building rooftops, and web, application and database servers of information sources such as weather forecasting, social media, financial markets, and the like;

FIG. 1C is a high-level network diagram showing the various client systems and users thereof connected to the system network supporting the BIGADS system of the present invention reflected in FIG. 1A including, for example, (i) Web-enabled client machines (e.g. mobile computers, smartphones, laptop computers, workstation computers, etc.), (ii) hand-held VR/AR-enabled rooftop navigation and inspection devices for rooftop navigation, inspection and intelligence collection, storage and sharing, (iii) AR/VR-enabled control stations for remotely controlling VR-navigated and controlled snow removing robot systems deployed on building rooftops, (iv) AR/VR-enabled control stations for remotely controlling VR-navigated and controlled snow depth measuring aircraft systems deployed at specified building rooftops, and web, application and database servers of information sources such as weather forecasting, social media, financial markets, and the like;

FIG. 4A1 is a perspective view of an airborne/flying unmanned snow depth measuring (SDM) drone subsystem illustrated in FIGS. 1A and 2A, shown comprising an aircraft body housing four vertically-mounted symmetrically arranged propeller-type rotors, supporting vertical takeoff (VTO) and pitched flight over building rooftops while (i) measuring the depth profile of snow loads on rooftops, using any one of the non-contact type methods and modules illustrated in FIG. 4A1, and (ii) capturing digital video images within the field of view (FOV) of its onboard camera subsystem during its course of travel, thereby collecting information for processing and generation of GPS-indexed time-stamped snow depth profile maps of building rooftops including before, during and after snow storms, in accordance with the principles and teachings of the present invention;

FIG. 4A2 is a schematic representation illustrating six different types of energy-beam based methods of non-contact snow depth measurement that are supportable within the flying unmanned snow depth measuring aircraft subsystem (i.e. drone) illustrated in FIGS. 1A, 2A and 4A1, either alone or in combination with each other, as illustrated in FIGS. 5B1 through 5B6;

FIG. 4B1 is a subsystem block diagram showing the primary functional blocks employed in the module used to carry out the LIDAR based snow depth measurement method of the present invention, wherein an amplitude modulated (AM) laser beam is generated and transmitted into a layer of snow, while the return laser signal is detected and processed to determine the time of flight of the laser beam through the snow, and thereby computing a measured depth of the snow on the building rooftop;

FIG. 4B2 is a subsystem block diagram showing the primary functional blocks employed in the module used to carry out the scanning LIDAR based snow depth measurement method of the present invention, wherein an amplitude modulated (AM) laser beam is generated and scanned across a layer of snow, while the return laser signal is detected and processed to determine the time of flight of the laser beam through the snow, and thereby compute a measured depth of the snow on the building rooftop;

FIG. 4B3 is a subsystem block diagram showing the primary functional blocks employed in the module used to carry out the optical range finding based snow depth measurement method of the present invention, wherein an LED-generated amplitude modulated light beam is generated and transmitted into a layer of snow, and the return light signal is detected and processed to determine the time of flight of the light beam through the snow, and thereby computing a measured depth of the snow on the building rooftop;

FIG. 4B4 is a subsystem block diagram showing the primary functional blocks employed in the module used to carry out the RADAR based snow depth measurement method of the present invention, wherein an microwave energy beam is generated and transmitted into a layer of snow, and the return microwave signal is detected and processed to determine the time of flight of the beam through the snow, and thereby computing a measured depth of the snow on the building rooftop;

FIG. 4B5 is a subsystem block diagram showing the primary functional blocks employed in the module used to carry out the SONAR based snow depth measurement method of the present invention, wherein an acoustic energy beam is generated and transmitted into a layer of snow, and the return acoustic signal is detected and processed to determine the time of flight of the beam through the snow, and thereby computing a measured depth of the snow on the building rooftop;

FIG. 4B6 is a subsystem block diagram showing the primary functional blocks employed in the module used to carry out the multi-element optical range finding method of snow depth measurement of the present invention, wherein an optical energy beam is generated and transmitted into a layer of snow, and the return optical signal is detected and processed along different optical channels, to determine a measured depth of the snow at particular locations on the building rooftop;

FIG. 4D1 is a perspective view of a building in which the BIGADS system of the present invention has been deployed, and showing dome-type shelter system supported on the building rooftop for sheltering a remotely-controlled unmanned snow depth measuring aircraft, wherein the shelter system is shown arranged in its closed configuration and adapted for storing a unmanned snow depth measuring aircraft (drone) system (SDMAS) of the present invention, while its battery packs are reconditioned and recharged and diagnostic analysis is carried out during periodic maintenance operations;

FIG. 4D2 is an exploded view of the snow sheltering dome system of the present invention comprising a support post, a semi-spherical base portion supporting a planar landing platform on which a unmanned snow depth measuring aircraft system can land and be supported, and a pair of hinged quarter-spherical housing portions for enclosing the aircraft system during its closed configuration and revealing the same when configured in its open configuration;

FIG. 4D3 is a perspective enlarged view of the building shown in FIG. 4D1, showing the snow drone sheltering dome system of the present invention arranged in its closed mode, with its hinged housing portions closed about its unmanned snow depth measuring aircraft supported on its landing support platform;

FIG. 4D4 is a perspective enlarged view of the building shown in FIG. 4D1, showing the snow drone sheltering dome system of the present invention arranged in its open mode, with its hinged housing portions opened and removed away from the unmanned snow depth measuring aircraft supported on its landing support platform;

FIGS. 4F1, 4F2 and 4F3 show a perspective view of a building being monitored by the BIGADS system of the present invention, wherein the unmanned snow depth measuring aircraft system of the present invention illustrated in FIGS. 4A1 and 4A2 is profiling GPS-specified regions of the building rooftop using laser/light beam methods when no snow accumulations are present, and transferring digital information about such collected rooftop intelligence to the communication, application and database servers maintained at the remote data center of the BIGADS system illustrated in FIGS. 1, 1A and 1B;

FIGS. 4G1 and 4G2 show a perspective view of a building being monitored by the BIGADS system of the present invention, wherein the unmanned snow depth measuring aircraft system illustrated in FIGS. 4A1 and 4A2 is shown profiling GPS-specified regions of the building rooftop using laser/light beam methods when snow accumulations are present on the rooftop, and transferring digital information about such collected rooftop intelligence to the communication, application and database servers maintained at the remote data center of the BIGADS system illustrated in FIGS. 1, 1A and 1B;

FIG. 4H1 shows a perspective view of a building being monitored by the BIGADS system of the present invention, wherein the unmanned snow depth measuring aircraft system illustrated in FIGS. 4A1 and 4A2 is shown (i) profiling GPS-specified regions of the building rooftop using sonar/acoustic-based methods and real time kinematic (RTK) GPS referencing techniques (to enhance the precision of positioning) when snow accumulations are not present on the rooftop, and (ii) transferring digital information about such collected rooftop intelligence to the remote data center of BIGADS system;

FIG. 4H2 shows a perspective view of a building being monitored by the BIGADS system of the present invention, wherein the unmanned snow depth measuring aircraft system illustrated in FIGS. 4A1 and 4A2 is shown profiling GPS-specified regions of the building rooftop using sonar/acoustic-based methods and real time kinematic (RTK) GPS referencing techniques when snow accumulations are present on the rooftop, and transferring digital information about such collected rooftop intelligence to the remote data center of BIGADS system;

FIG. 5B is a block subsystem diagram for the automated snow conveying tunnel systems of the present invention illustrated in FIG. 5A, shown comprising an optional hydraulically-powered conveyor belt covering subsystem, a conveyor snowbelt (snow-tractor-based) transport subsystem, conveyor belt de-icing subsystem, a plurality of digital camera subsystems providing various fields of view (FOV), a plurality of LED-based illumination subsystems for illuminating these FOVs, a data communication subsystem, a temperature sensing subsystem, a conveyor belt lubrication subsystem, a VR-guided control subsystem, a GPS navigation subsystem, and a subsystem control subsystem for controlling and/or managing the operation of these subsystems during system operation;

FIGS. 5C1A and 5C1B show top and bottom perspective views of the mobile automated snow conveying tunnel system (ASCTS) of FIG. 5B, showing its pair of rotatably mounted propulsion tractors mounted beneath and at opposite ends of the conveyer belt structure of the present invention;

FIGS. 5C2A and 5C2B show top and bottom side perspective views of the mobile automated snow conveying tunnel system (ASCTS) of FIG. 5B, showing its pair of rotatably mounted propulsion tractors mounted beneath and at opposite end of the conveyer belt structure of the present invention, arranged in different configurations;

FIGS. 5E1, 5E2, 5E3, 5E4, 5E5 and 5E6 shows a set of plan views of the mobile automated snow conveying tunnel system (MASCTS) of the present invention showing how during States 1 and 2, both the high and low track drives of the system are rotated about their track drive rotation axes, and then during States 4 and 5, the track drives rotate the conveyor belt structure about the central vehicle rotation axis so at State 6, the conveyor belt is arranged perpendicular to its original position/orientation shown in State 1;

FIGS. 5F1, 5F2, 5F3, 5F4, 5F5 and 5F6 shows a set of plan views of the mobile automated snow conveying tunnel system (MASCTS) of the present invention showing how during States 1, 2 and 3, only the high track drive is rotated about its track drive rotation axis, and then during States 4 and 5, the high track drive rotates the conveyor belt structure about the "low" track drive rotation axis so at State 6, the conveyor belt is arranged perpendicular to its original position/orientation shown in State 1, relative to the low track drive rotation axis;

FIGS. 5G1 and 5G2 shows a set of plan views of the mobile automated snow conveying tunnel system (MASCTS) of the present invention showing how the conveyor belt system moves in a lateral translation manner by having the low and high drive tracks arranged orthogonal to the longitudinal axis, then moving together to achieve lateral translation of the conveyor belt structure, as shown;

FIGS. 5H1 and 5H2 shows a set of plan views of the mobile automated snow conveying tunnel system (MASCTS) of the present invention showing how the conveyor belt system moves in a longitudinal translation manner by having the low and high drive tracks arranged in a co-axial manner to the longitudinal axis, then moving together to achieve longitudinal translation of the conveyor belt structure, as shown;

FIG. 5I is a first perspective view of the mobile automated snow conveying tunnel system (MASCTS) of the present invention showing on a building rooftop, with snow being loaded on the conveyor belt using a snow moving robot system as shown in FIGS. 5N through 5Q2;

FIG. 5M1 is a perspective view of the mobile automated snow conveying tunnel system (MASCTS) of FIG. 5L shown transporting snow off the rooftop to the ground below for collection by an automated snow moving robot system of the present invention, shown in FIGS. 5N through 5Q2;

FIG. 5M2 is a perspective view of the mobile automated snow conveying tunnel system (ASCTS) of FIG. 5L shown transporting snow off the rooftop and into snow collection/dump truck on the ground below, used during semi-automated rooftop snow removal operations;

FIG. 5O is a block subsystem diagram for the VR-navigated snow removing robot systems of the present inventions illustrated in FIGS. 5N, 5P1, 5P2, 5E3, 5Q1 and 5Q2, shown comprising a snow-depth measurement subsystem, a propulsion/drive subsystem, collision avoidance subsystem, digital camera subsystems providing various (i.e. front, rear and side fields of views (FOVs), LED-based illumination subsystems for illuminating these FOVs, a data communication subsystem, a temperature & moisture measurement subsystem, snow-depth profiling subsystem, a VR-guided and auto-pilot subsystem, a GPS navigation subsystem, and a control subsystem for controlling and/or managing the operation of these subsystems during system operation;

FIG. 5P1 is a first rear perspective view of the VR-guided snow removing robot system of the present invention depicted in FIG. 5N, showing its snow shovel tool mounted to its front end, as well as being fully equipped with side, front and rear navigational camera systems, side, front and rear ranging sensors, a GPS receiver, RTK antenna, a 900 MHZ antenna, and a refuel/recharging port mounted in the rear of the system;

FIG. 5P2 is a second rear perspective view of the VR-guided snow removing robot system of the present invention depicted in FIG. 5N, showing side, front and rear navigational camera systems, side, front and rear ranging sensors, a GPS receiver, RTK antenna, a 900 MHZ antenna, and refuel/recharging port mounted in the rear of the system;

FIG. 5P3 is a top perspective view of the VR-guided snow removing robot system of the present invention depicted in FIG. 5N, showing side, front and rear navigational camera systems, side, front and rear ranging sensors, a GPS receiver, a RTK antenna, a 900 MHZ antenna, and refuel/recharging port mounted in the rear of the system;

FIG. 5P4 is a perspective view of a building rooftop involved in the BIGADS system of the present invention, showing the snow shelter system of the present invention installed on the rooftop, and adapted for protecting the snow removing robot system of FIG. 5N, from snow and other forms of harsh outdoor weather, while refueling and recharging the robot system as required to satisfy its energy/power requirements;

FIG. 5P5 is a perspective view of the snow shelter system of the present invention shown installed on the rooftop in FIG. 5P4, wherein a snow removing robot system shown in FIG. 5N is parked out of the reach of snow and other forms of harsh outdoor weather, while the refueling and recharging ports of the robot system are docked with the refueling/recharging port of the snow shelter system;

FIG. 5P6 is a perspective view of the snow shelter system of the present invention shown installed on the rooftop in FIG. 5P4, wherein no snow removing robot system is parked, revealing the refueling/recharging port of the snow shelter system;

FIG. 5Q1 is a rear perspective view of a second illustrative embodiment of the VR-guided snow removing robot system of the present invention, showing a snow blowing tool mounted to its front end, as well as being fully equipped with side, front and rear navigational camera systems, side, front and rear ranging sensors, a GPS receiver, a RTK antenna, a 900 MHZ antenna, and a refuel/recharging port mounted in the rear of the vehicular system;

FIG. 5Q2 is a front perspective view of the VR-guided snow removing robot system of the present invention depicted in FIG. 5Q1, showing side, front and rear navigational camera systems, side, front and rear ranging sensors, a GPS receiver, a RTK antenna, a 900 MHZ antenna, and a refuel/recharging port mounted in the rear of the vehicular system;

FIG. 6A is a schematic representation of a building rooftop registered in the BIGADS system of the present invention, and on which a human operator/inspector, carrying a hand-held mobile augmented-reality (AR) based rooftop navigation and inspection system shown in FIG. 6C, is standing and viewing the rooftop through the field of view (FOV) of the digital video camera aboard the hand-held rooftop navigation and inspection system, while GPS-indexed icons of rooftop-mounted snow load measuring stations are displayed on the LCD display panel to assist the operator while navigating the rooftop, inspecting the situation, and identifying where snow load monitoring stations (SLMS) have been installed and where excessive snow loads have been automatically detected and reported to building management and maintenance team members by the BIGADS system;

FIG. 6A1 is a perspective view of the hand-held augmented-reality (AR) based rooftop navigation and inspection system of the present invention, shown in FIG. 6A;

FIG. 6D is a flow chart describing the primary steps involved when carrying out the method monitoring rooftop snow loads using the mobile augmented-reality (AR) based rooftop navigation and inspection system illustrated in FIGS. 6A and 6A1, comprising the steps of (a) receiving a snow load alarm notification from the BIGADS system, and accessing a hand-held AR-guided rooftop navigation and inspection device of the present invention, (b) holding the hand-held AR-guided rooftop navigation and inspection device on the operator's hand, viewing the device's Field of View (FOV) while (i) observing augmented reality (AR) icons of GPS-indexed snow load measuring stations, (ii) inspecting rooftop conditions, (iii) making audio and video recordings of the rooftop, and (iv) taking notes and linking the same to the snow load alarm event, and (c) sending the operator's snow load event inspection report to the building management and maintenance team members, and determine a plan of resolution for the snow load alarm event (e.g. make and execute a snow removal plan);

FIG. 7B1 is a block subsystem diagram of the virtual and augmented reality supported snow robot navigation and control station of the present invention illustrated in FIGS. 7B1 and 7B2, comprising a stereoscopic 3D display subsystem, a network communication subsystem, data keyboard and mouse, 3D controllers, motion trackers (e.g. head tracker, eye tracker, face-tracker, and 3D gloves), an audio subsystem, VR control console subsystem, a RAID subsystem for local storage, and processor and memory subsystem;

FIG. 7B2 is a perspective view of a pair of stereoscopic VR-enabled viewing goggles (e.g. or VR equipped helmet) that can be used with the AR/VR-enabled control station illustrated in FIGS. 7A and 7B1; FIG. 7B3 is a schematic representation of the display screen supported on the Virtual and augmented-reality supported snow robot navigation and control station of the present invention illustrated in FIGS. 7B1 and 7B2, showing split screens displaying (i) the front and rear field of views (FOVs) of the digital video cameras aboard the VR-guided snow removing robot system of the present invention, and (ii) the videos and images captured by the unmanned snow depth measuring aircraft system of the present invention, to help the operator safely navigate on the snow-covered rooftop during rooftop snow removal operations;

FIG. 8F is an exploded view of the second illustrative embodiment of the snow load monitoring system of the present invention, shown comprising (i) an injection-molded plastic base station designed for measuring snow load on its surface using a single load cell configured in a deflection method of measurement, (ii) a control, data processing and communication module supported on a vertical mast/post mounted to the base station, and (iii) a whip antenna terminated with a stroboscopic illumination module and flexible photo-voltaic (PV) panel wrapped about the vertical mast;

FIG. 8G is an exploded view of plastic base portion component of the second illustrative embodiment of the snow load monitoring system of the present invention, showing the base station and its single load cell and trapezoidal-shaped lead weights for providing stability to the snow load measurement system on windy building rooftop surfaces;

FIG. 13H is an perspective view of the mast mounted control module employed in the apparatus illustrated in FIGS. 13A and 13B, shown with its cover panel removed to reveal its internal printed circuit board (PCB) on which the data processing module used to compute snow loads measured by the base station is realized, along with wireless communication circuits and the like;

FIGS. 15A, 15B and 15C set forth a series of cross-sectional views of the base station of the fourth illustrative embodiment of the snow load monitoring system of the present invention illustrating automatic load cell protection, wherein the single load cell automatically protected from force overloads applied to the base weigh plate by virtue of the fact that the load cell support deflects in response to excessive loads and protects the load cell sensor from such excessive forces;

FIGS. 17A1, 17A2 and 17A3 set forth a series of cross-sectional views of the fourth illustrative embodiment of the base station during the load cell calibration procedure of the present invention, wherein a single load cell configured according to a deflection method is gradually exposed to the load of water added to the test container box, and the flexible weigh panel progressively deflects in response to the application of a spatially-distributed water load, and the single load center mounted in the center of the base station responds to the applied snow load, and deflection of the flexible weigh panel, and generates electrical signals corresponding to the intensity of the distributed snow load;

FIG. 17B is a flow chart describing the primary steps carried out while practicing the method of calibrating the load sensor and programming the snow load data processing module (i.e. control, data processing and communication module) based on deflection-based measurement principles of physics, comprising the steps of (a) mounting snow load sensing module to be tested in the bottom of a box like structure wherein the walls of the box like structure spatially correspond with the perimeter boundaries of the snow load sensing surface, (b) installing a flexible fluid containing membrane over the sensor inside the box like structure, (c) adding quantified amounts of snow/ice loading material into the box, and measuring the electrical output of the sensor in the snow load sensing module, (d) correlating the depth of the snow/ice loading material with the voltage output of the sensor, (e) using the depth vs. voltage data to create a mathematical formula that provides a voltage in response to snow pressure, and (f) loading the mathematical formula into persistent (i.e. flash) memory associated with the data processing module;

FIGS. 20C1, 20C2 and 20C3 are a set of cross-sectional views showing the strain gauge force sensor according to second illustrative embodiment illustrated in FIG. 19A, being exposed to excessive loads (e.g. a heavy person stepping over the load sensor) and how the base-mounted force-overload protection spring mounted between the load sensor and bottom surface of the base housing adapts its size and geometry to reduce the magnitude of force that the load cell sensor experiences when excessive force overloads are applied to the elastic load sensing region;

FIG. 26C is a second exploded view of the third illustrative embodiment of the base station shown in FIG. 26A comprising an injection-molded plastic weight plate and base housing containing a single load sensor;

FIG. 26D is an elevated cross-sectional view of the third illustrative embodiment of the base station shown in FIG. 26A, showing the force sensor mounted between the plastic weight plate and the bottom surface of the base housing;

Figure 1A:
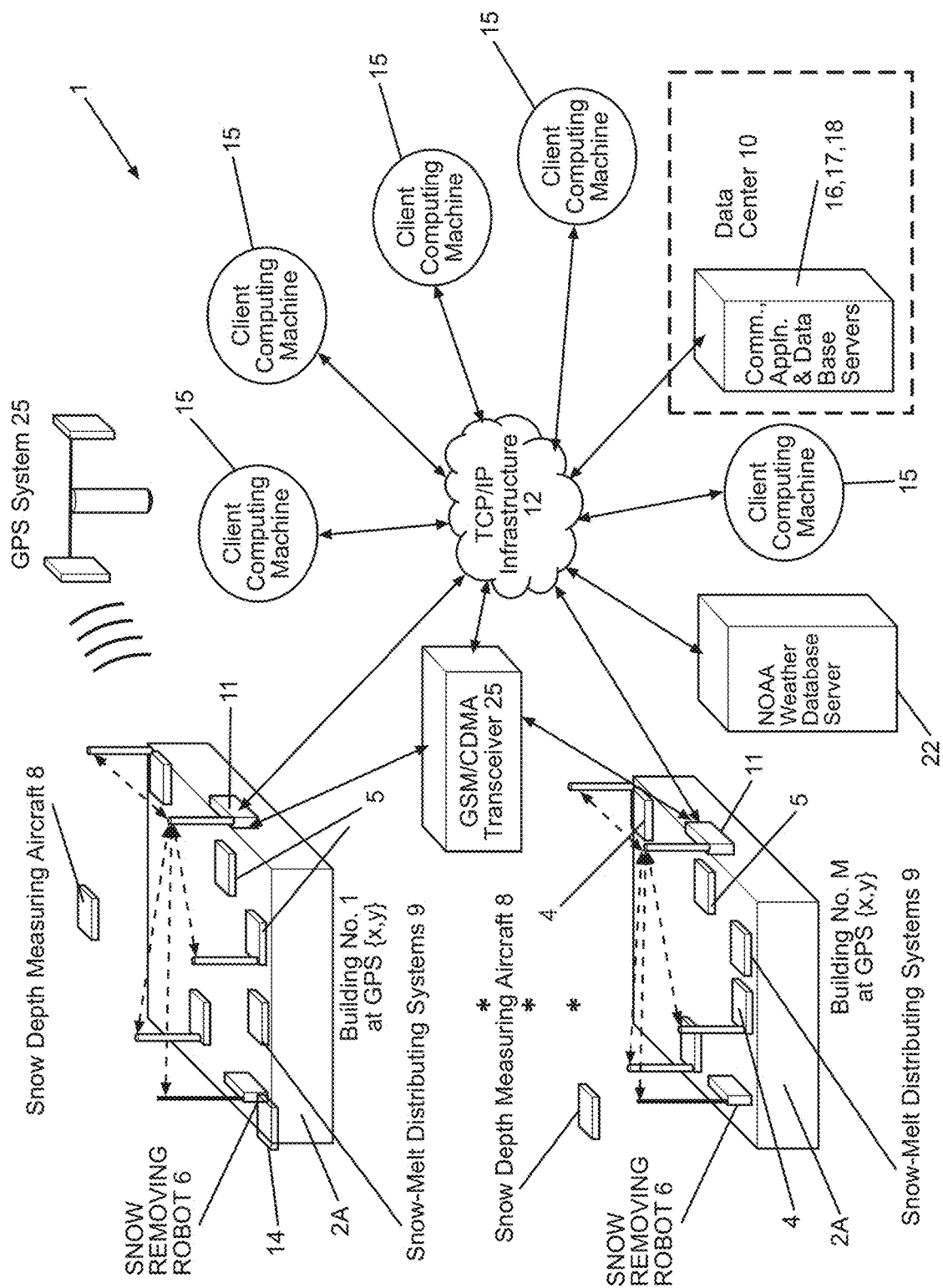
FIG. 1A shows the building intelligence gathering, assessment and decision-support (BIGADS) system of the present invention deployed across a portfolio of buildings, on the rooftops of which an automated building rooftop snow removal system (ABRSRS) is configured and deployed, comprising (i) a wireless network of snow load monitoring stations (SLMS), (ii) VR-guided snow removing robot systems, (iii) automated snow conveying tunnel systems, (iv) VR/AR-enabled control stations for remotely controlling the operation of VR-guided snow removing robot systems during rooftop snow removal operations, (v) unmanned flying snow depth measuring aircraft systems (i.e. drones) having high-resolution digital video image capturing and transmission capabilities, and (vi) VR/AR-enabled control stations for remotely controlling the operation of VR-guided snow depth measuring aircraft systems during rooftop snow depth measuring, profiling and surveying operations, including digital video image capturing operations, wherein all such subsystems being integrated with and in communication with the data center and internet (TCP/IP) infrastructure of the building intelligence collection, processing and information management system of the present invention, and are tracked in real-time using a GPS referencing system.
Figure 2A:
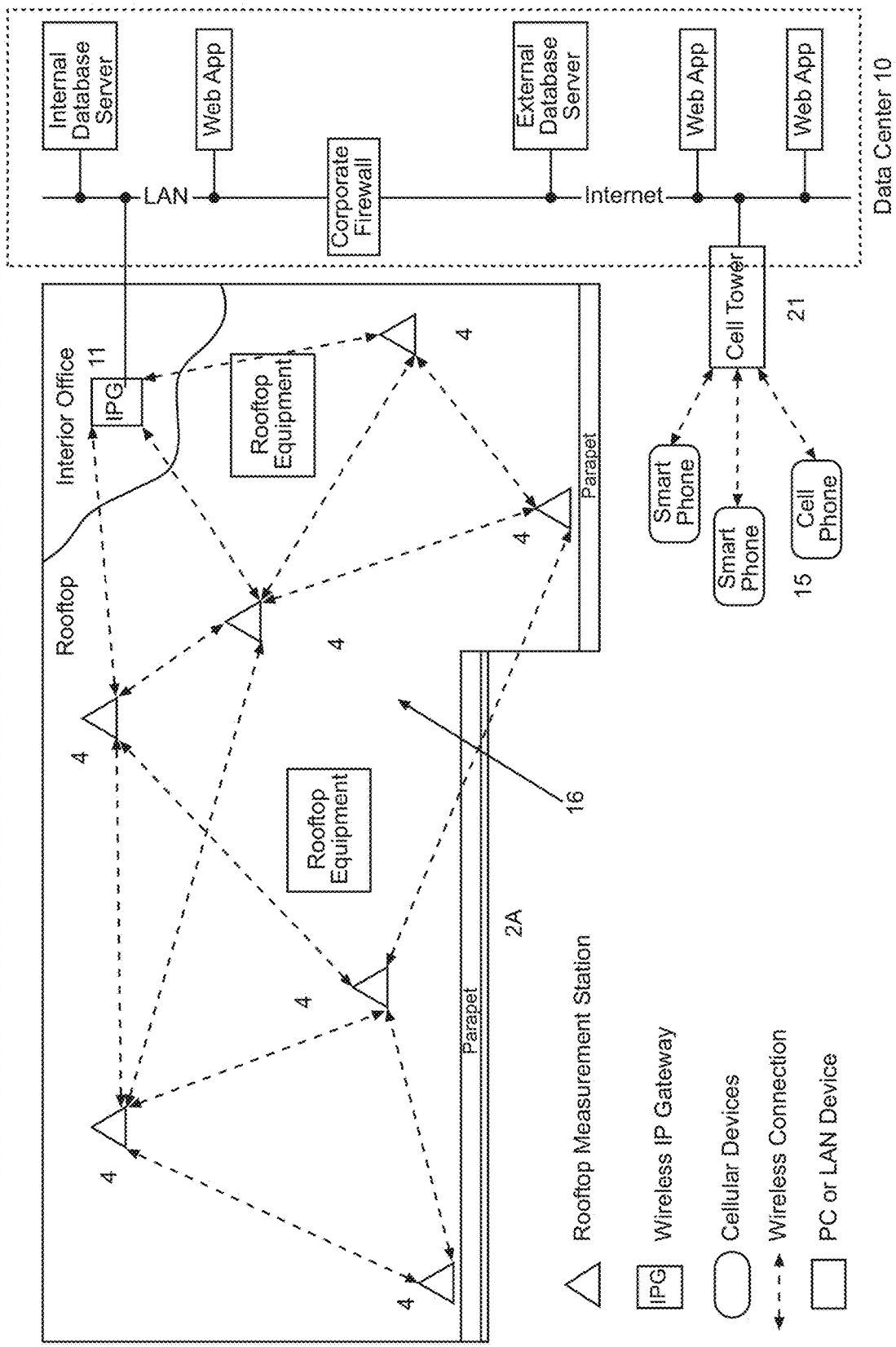
FIG. 2A is a schematic network diagram illustrating in greater detail a network of snow load monitoring systems (SLMS) deployed on a building rooftop as shown in FIG. 1A, illustrating the use of conventional networking technologies to interconnect these wireless subsystems into subnetworks and connect these subnetworks to the internet infrastructure of the BIGADS system of the present invention.
Figure 4C:
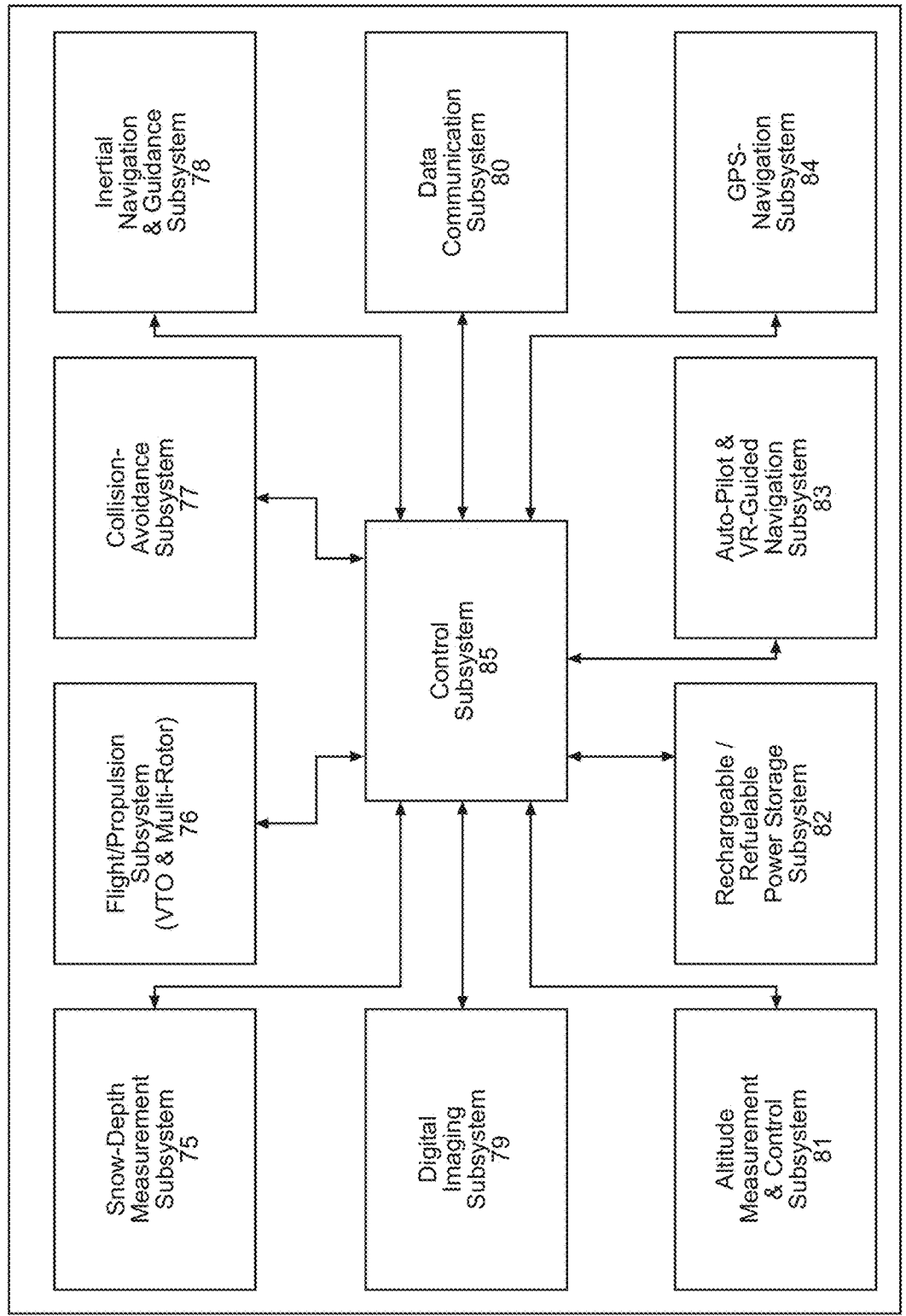
FIG. 4C is a system block diagram for the unmanned snow depth measuring aircraft system of the present invention illustrated in FIGS. 4A1 and 4A2, comprising a number of subsystems including a snow depth measurement subsystem, a flight/propulsion subsystem enabling vertical takeoff (VTO) flight using multi-rotor systems, a collision avoidance subsystem, an inertial navigation & guidance subsystem, a digital imaging (i.e. video camera) subsystem, a data communication subsystem, an altitude measurement and control subsystem, snow depth profiling subsystems, an auto-pilot subsystem, a GPS navigation subsystem, and a control subsystem for controlling and/or managing the other subsystems during system operation.
Figure 4E:
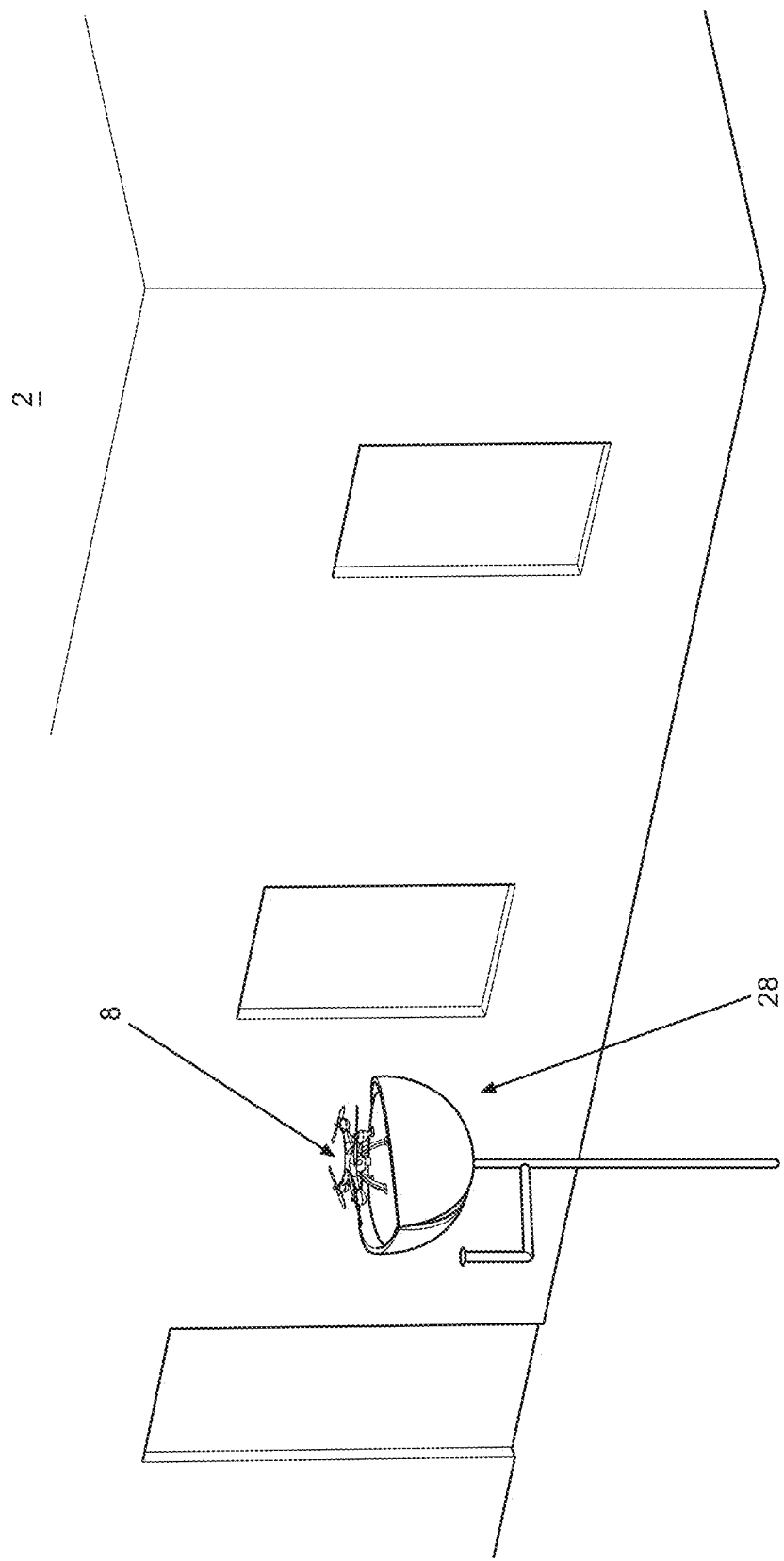
FIG. 4E is a perspective enlarged view of the snow drone sheltering dome system of the present invention arranged in its open mode and supported on the ground alongside a building being monitored by the BIGADS system of the present invention.
Figure 51:
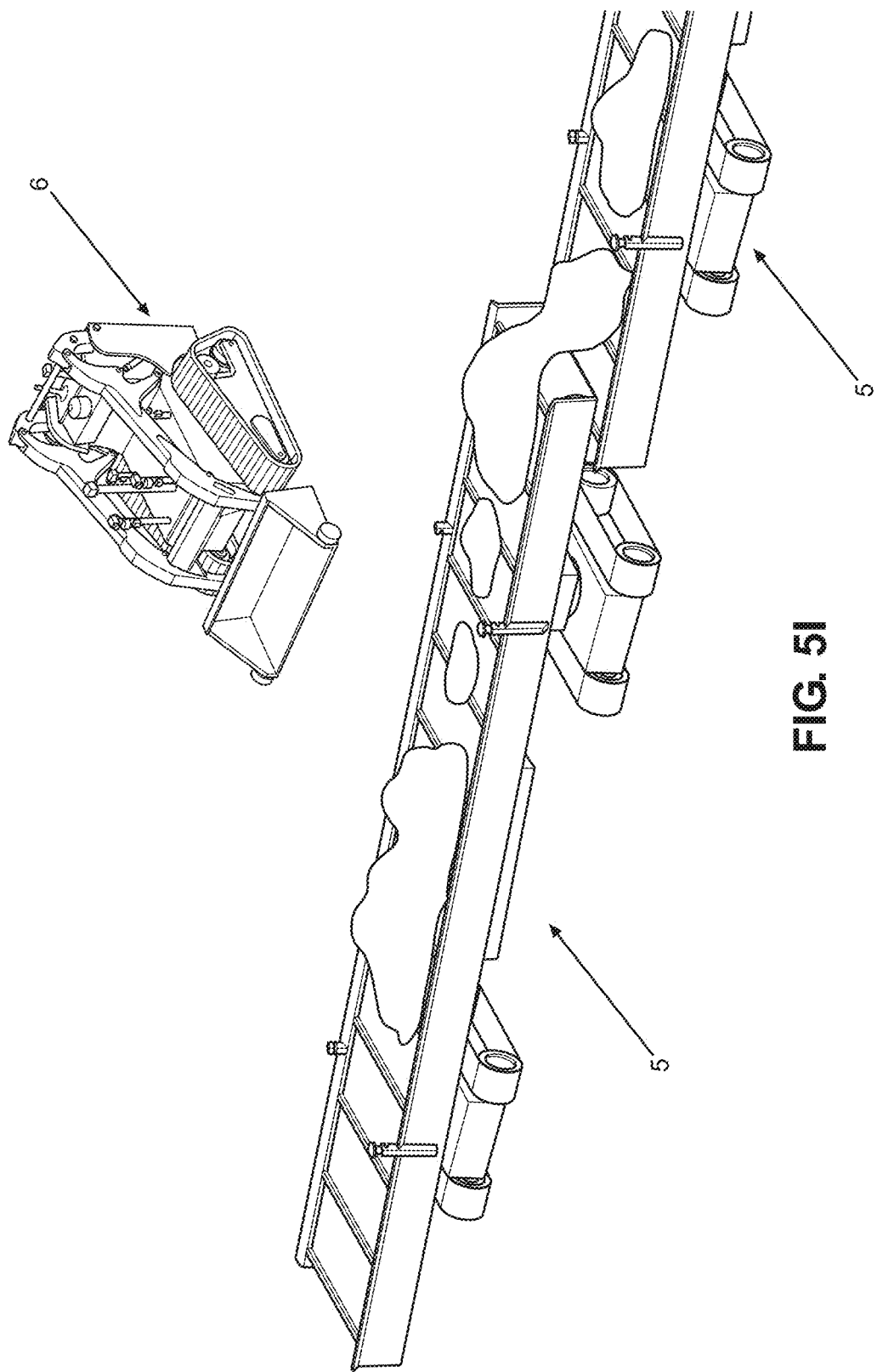
Figure 50:
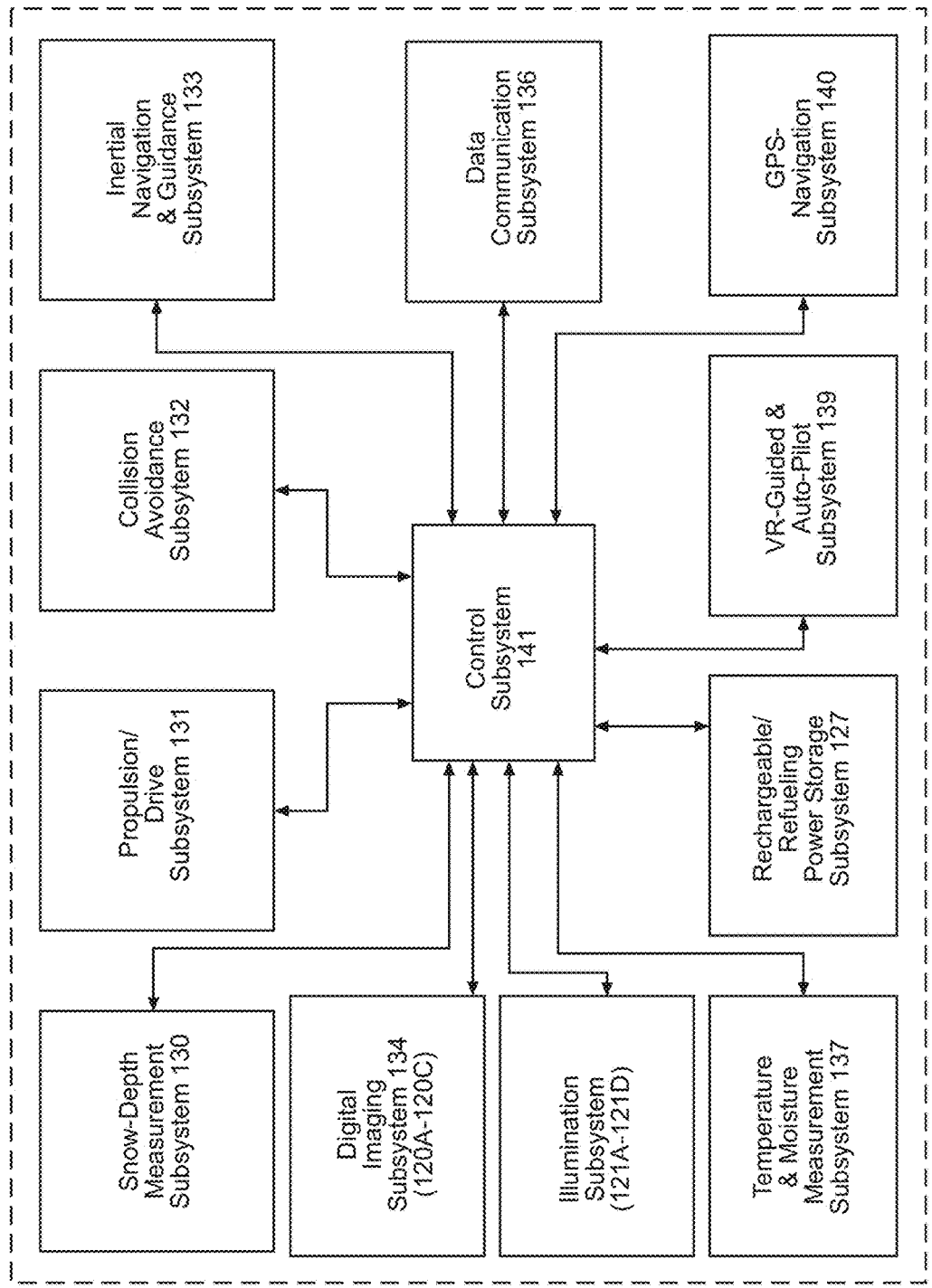
Figure 27A:
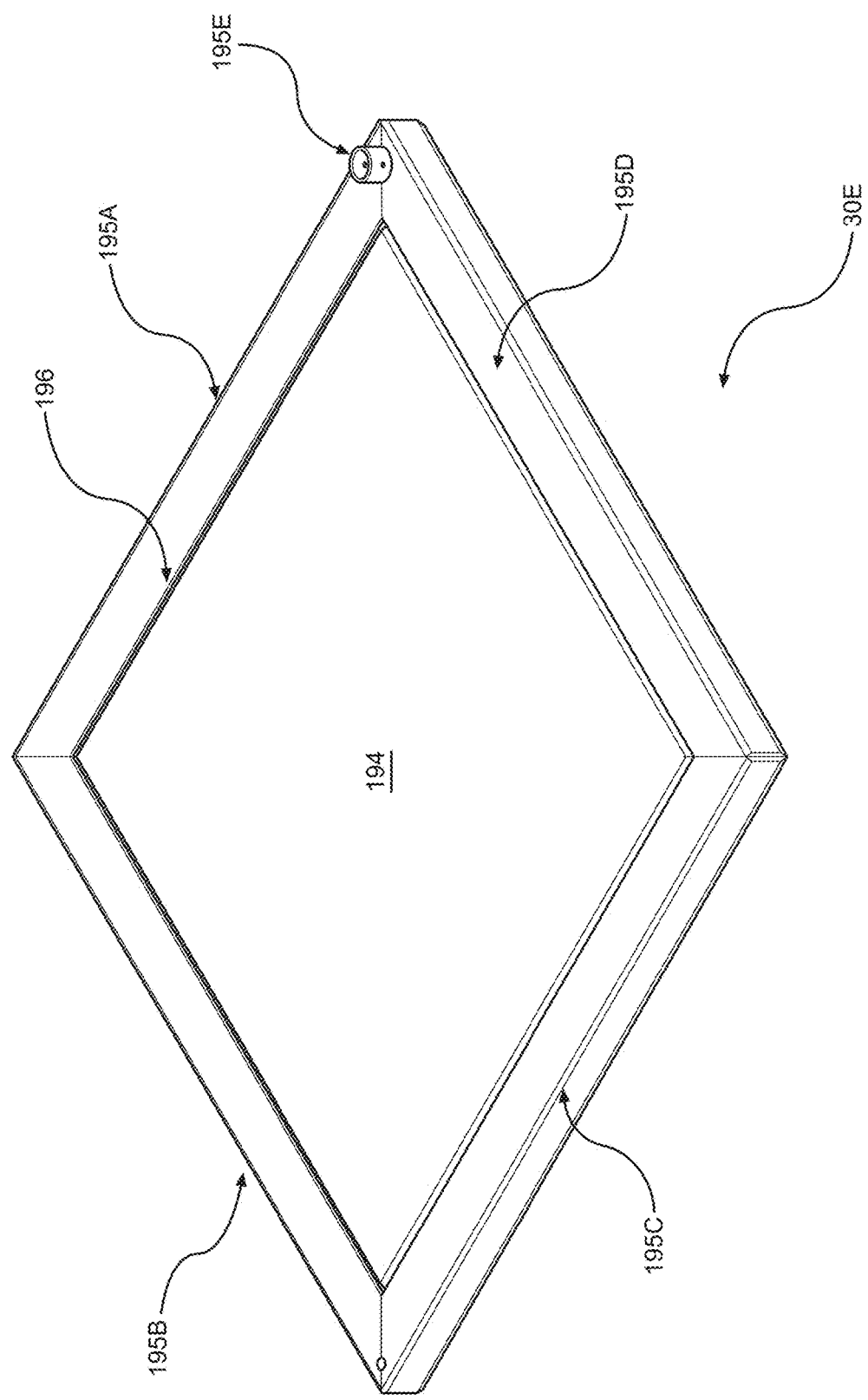
Figure 27B:
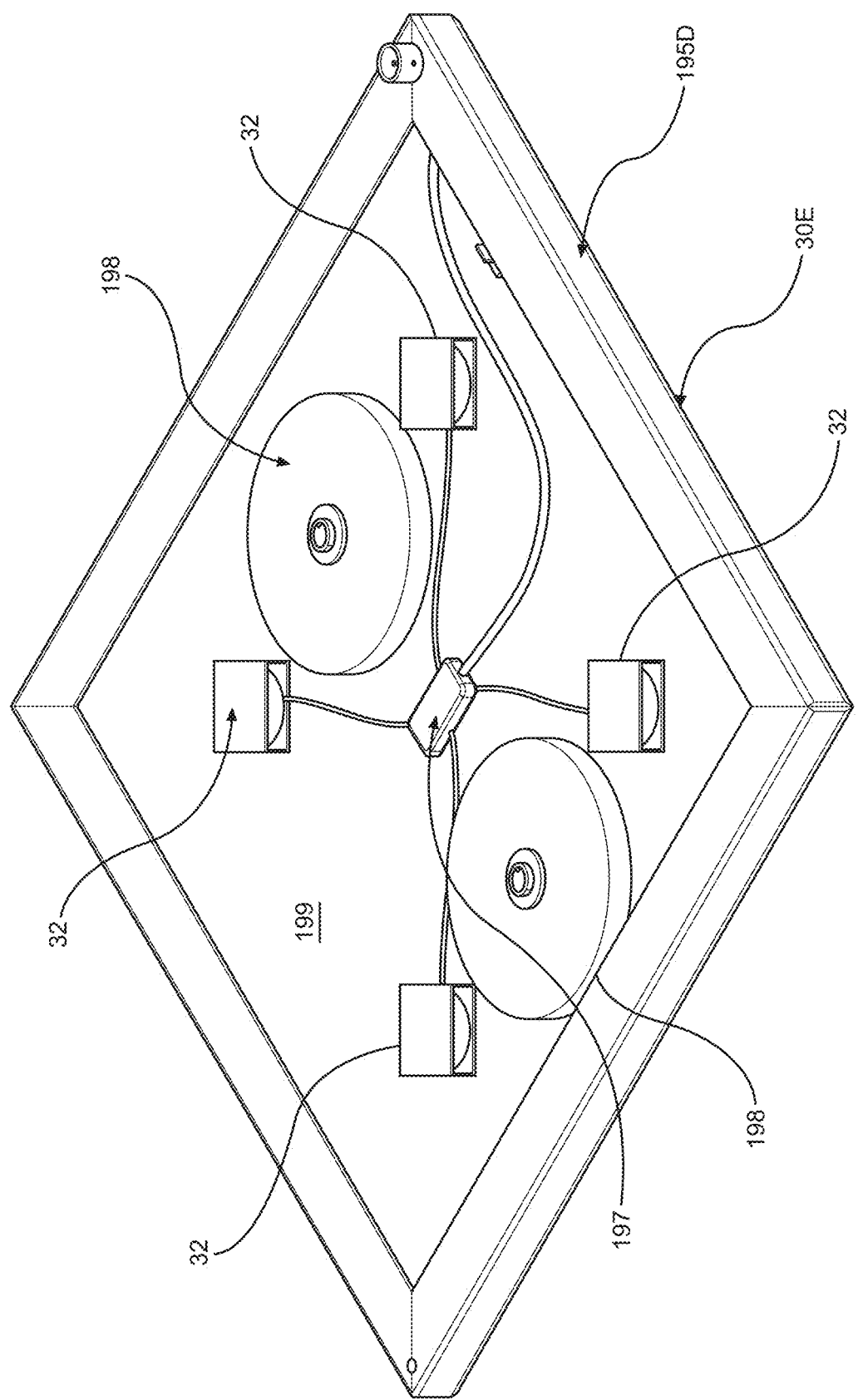
Figure 27C:
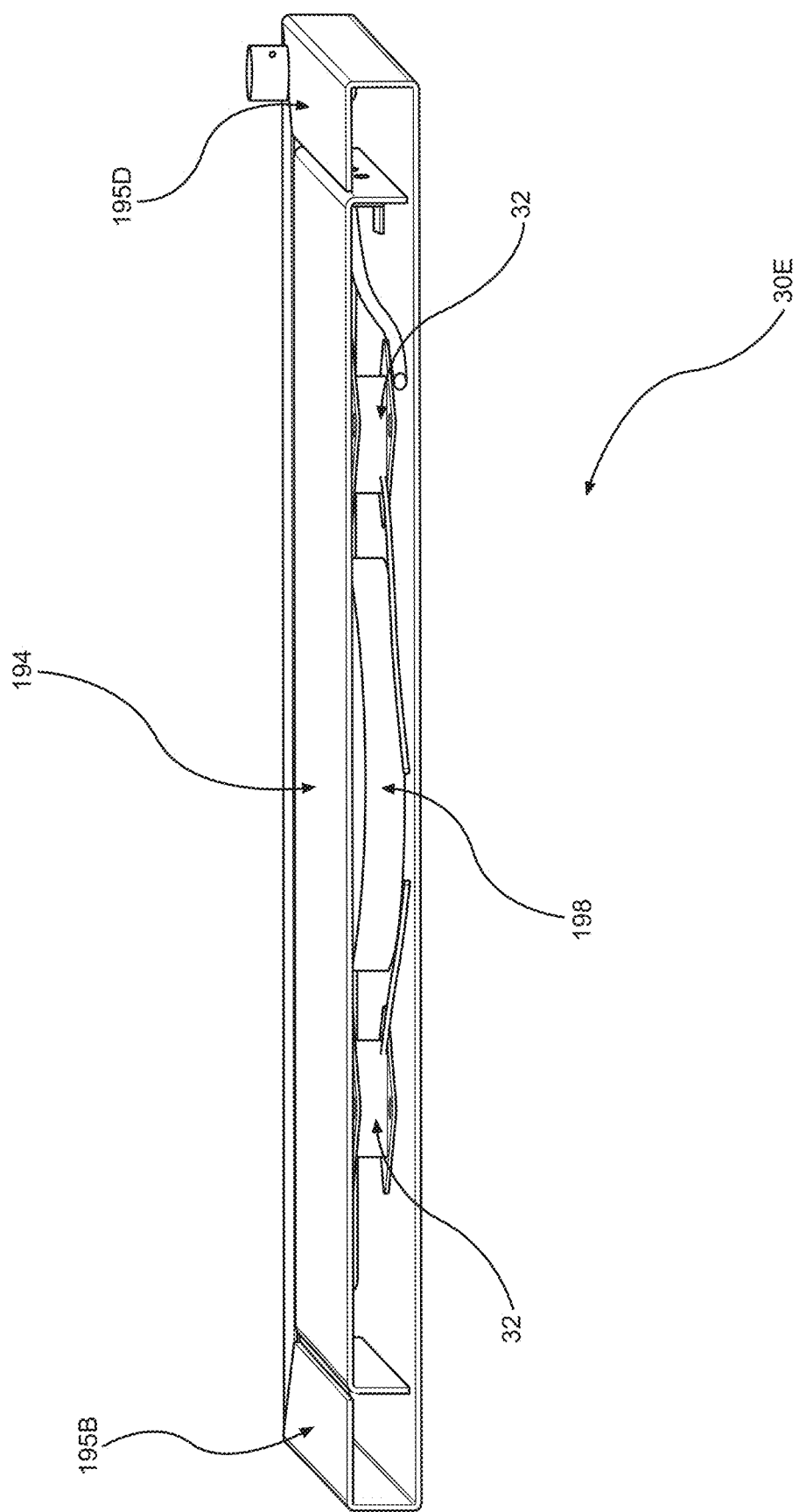
Figure 28A:
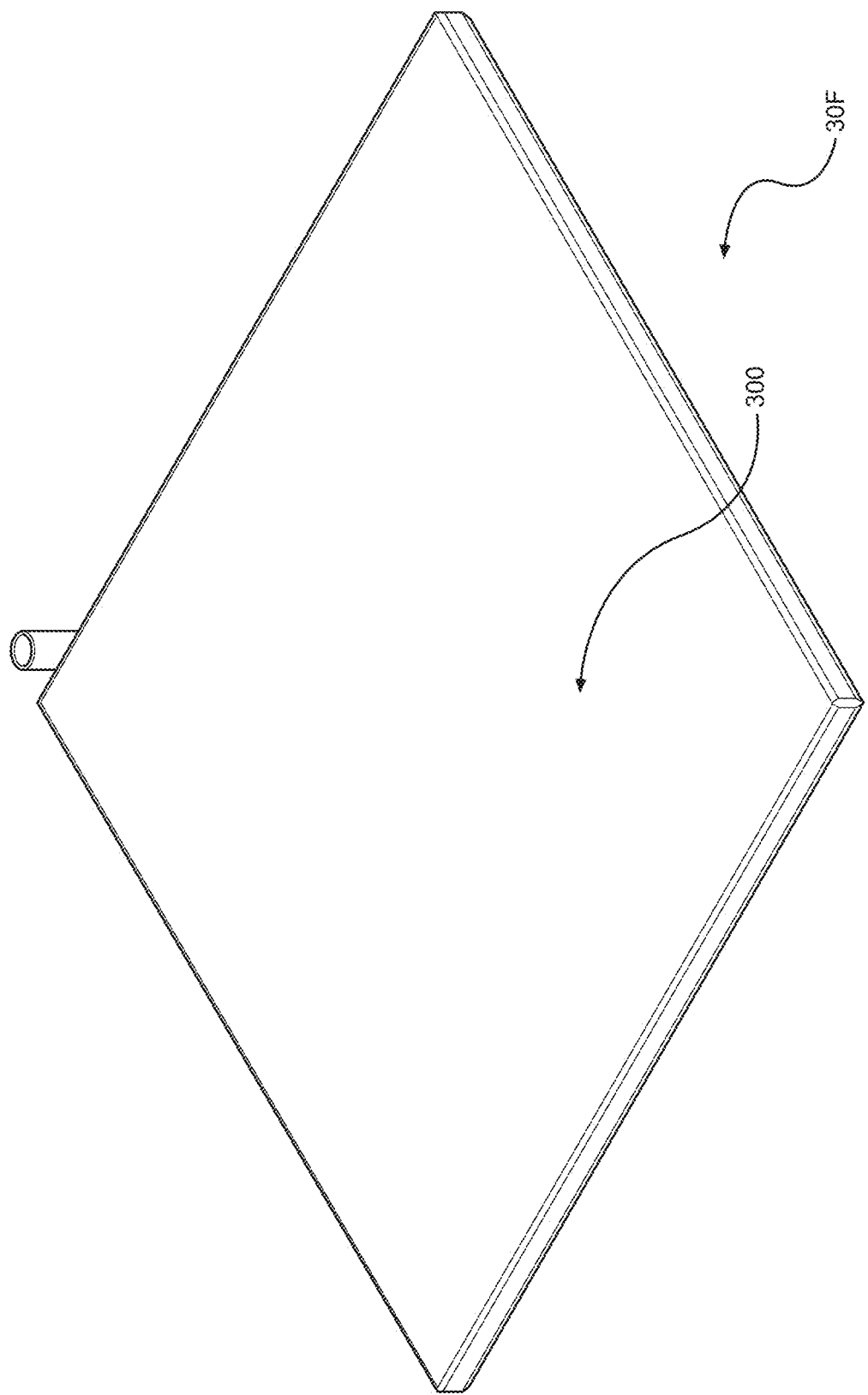
Figure 28B:
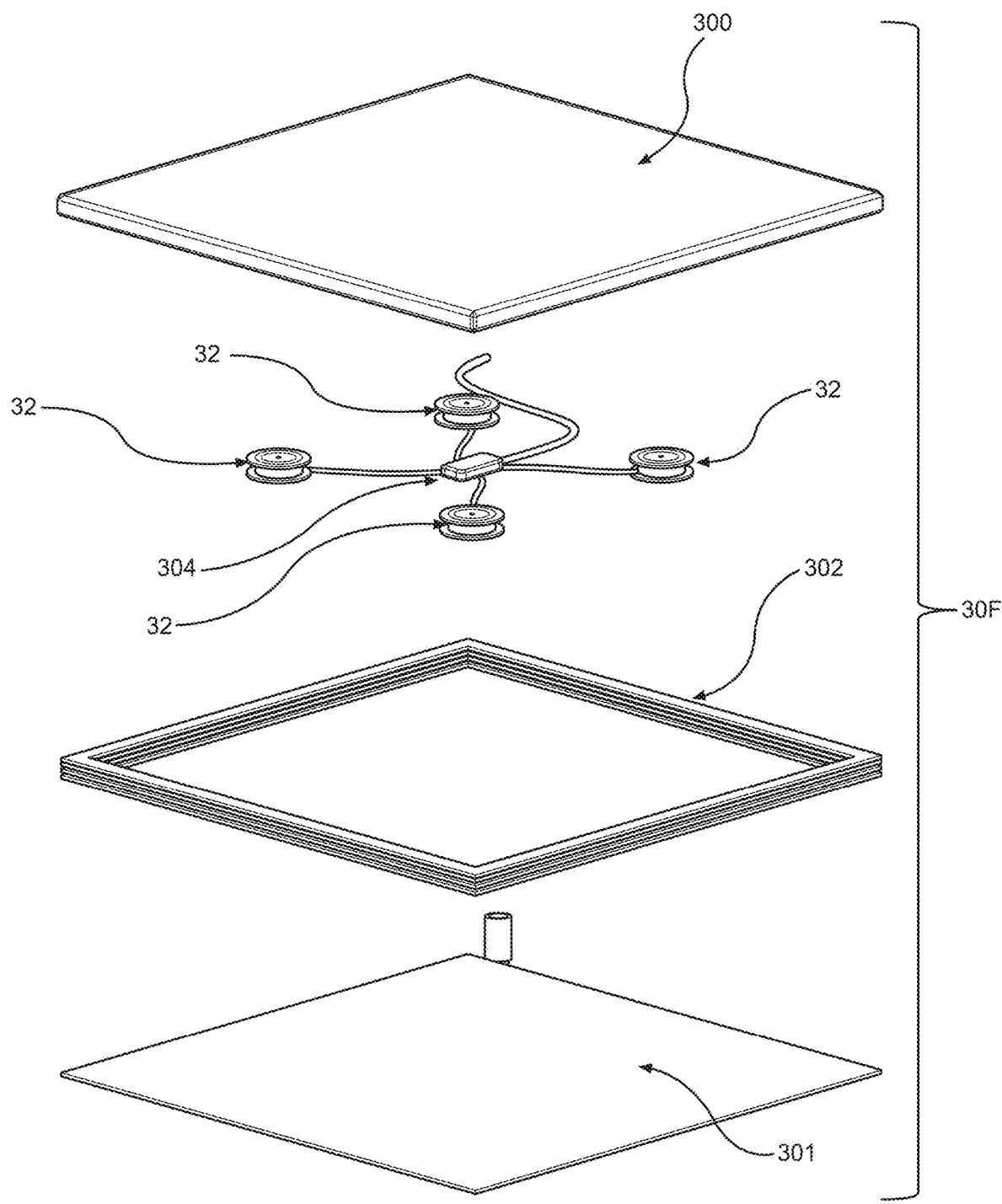
Figure 28C:
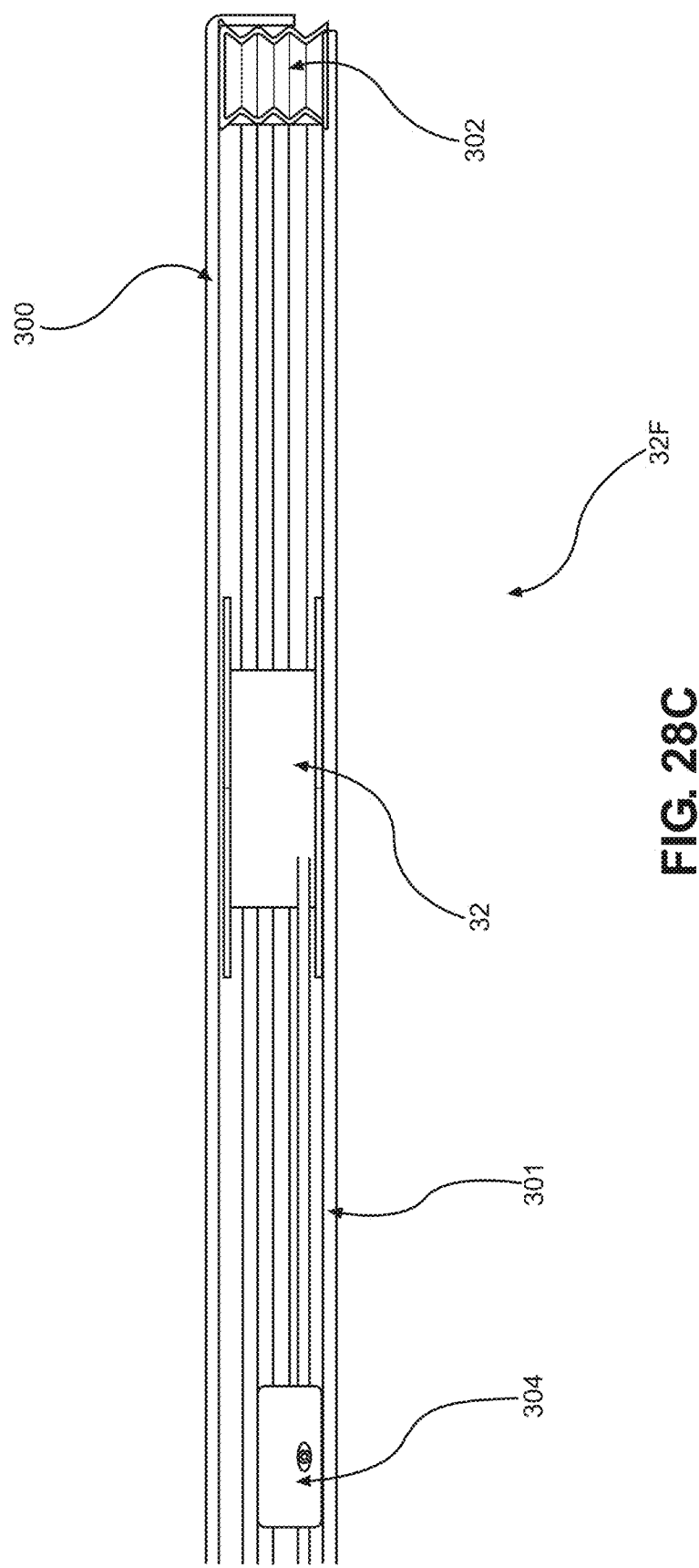
Figure 29B:
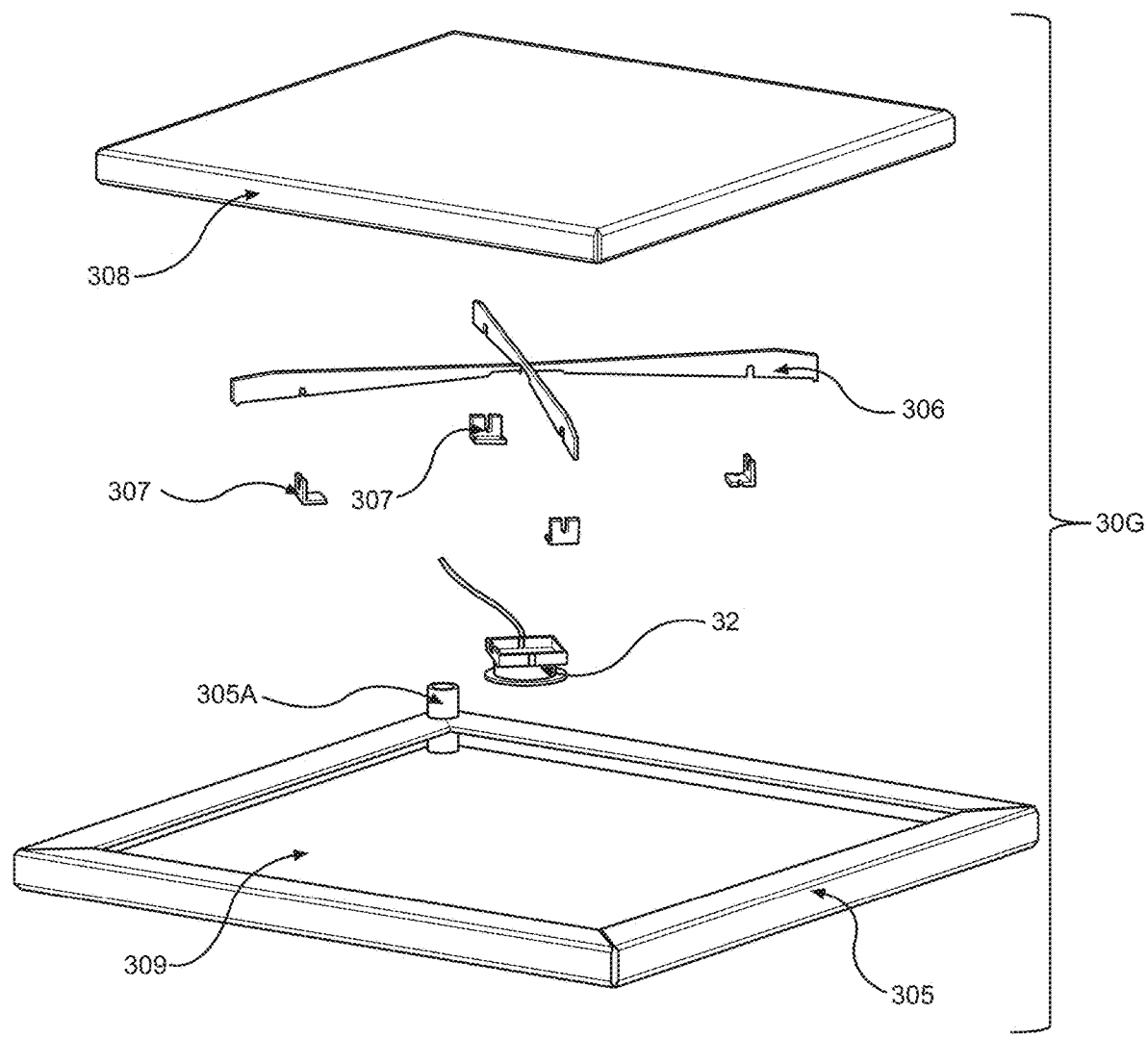
Figure 29C:
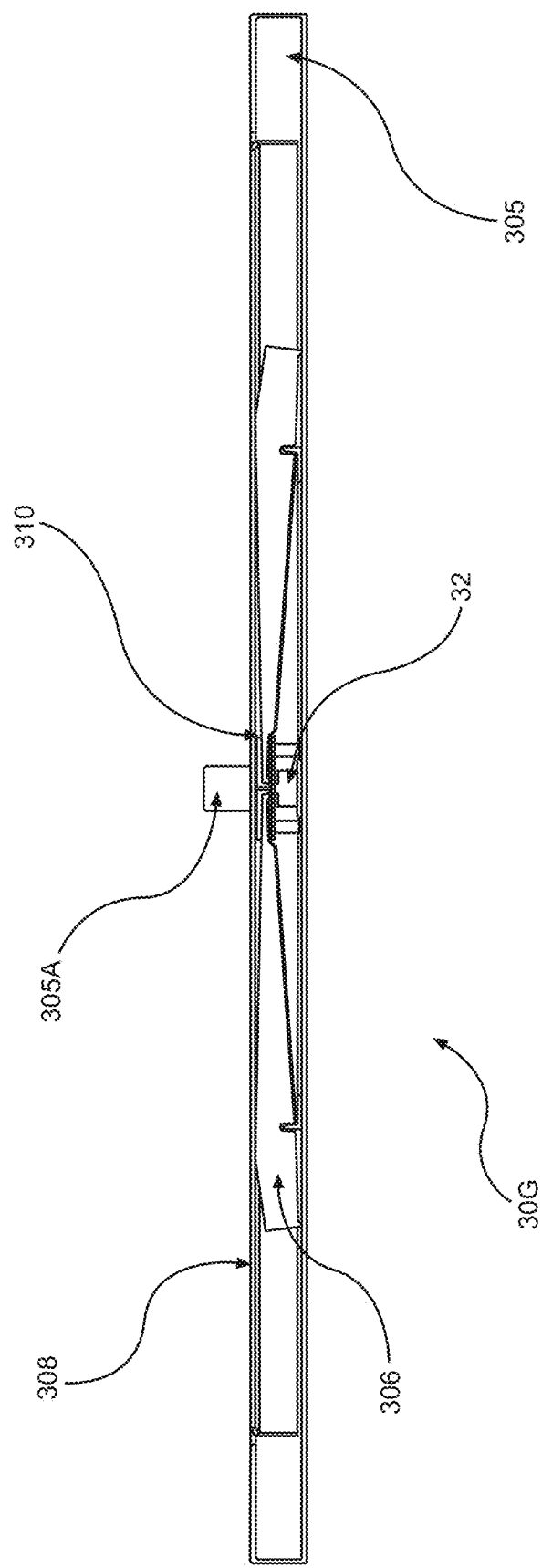
Figure 29D:
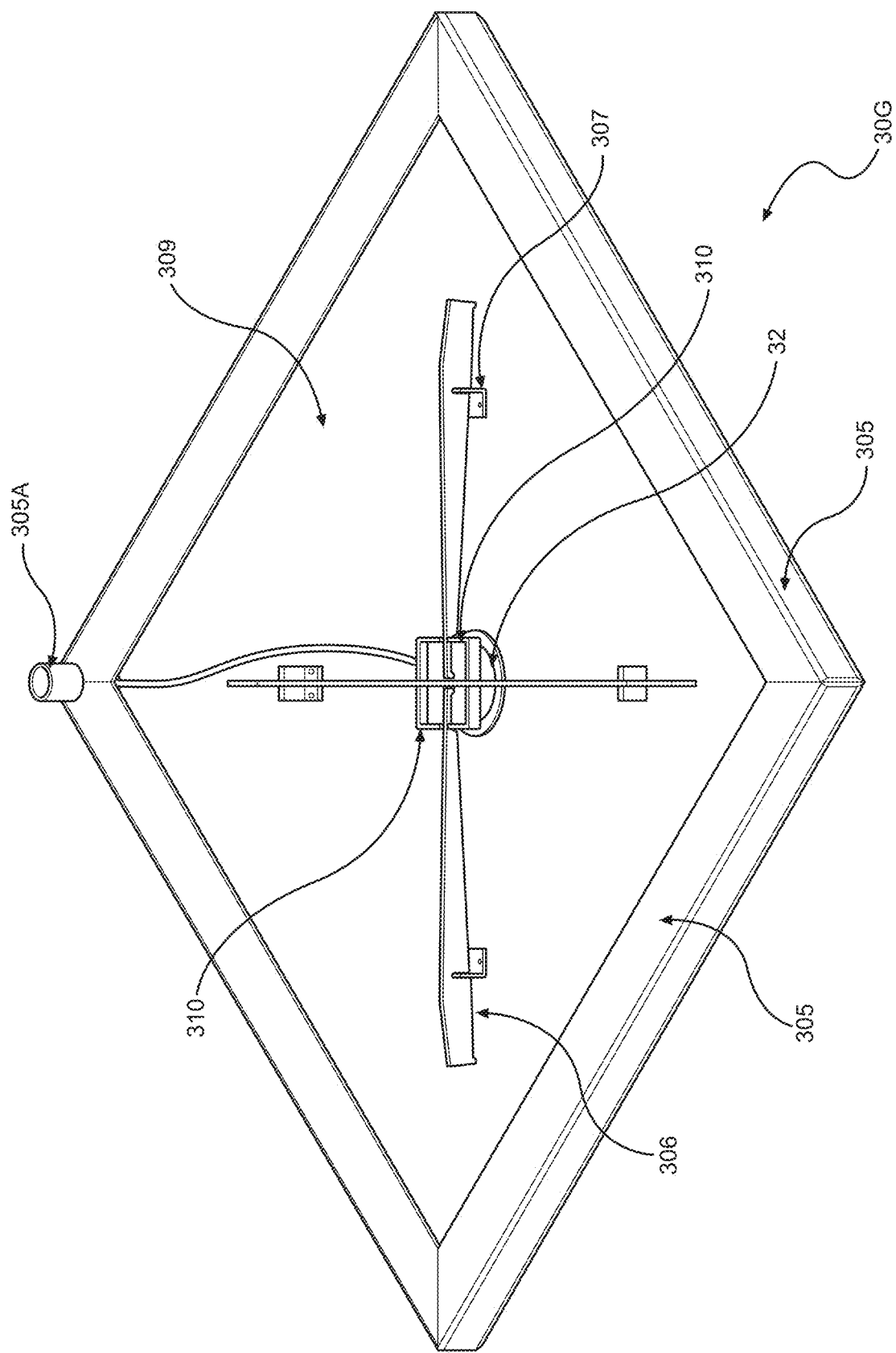
Figure 29E:
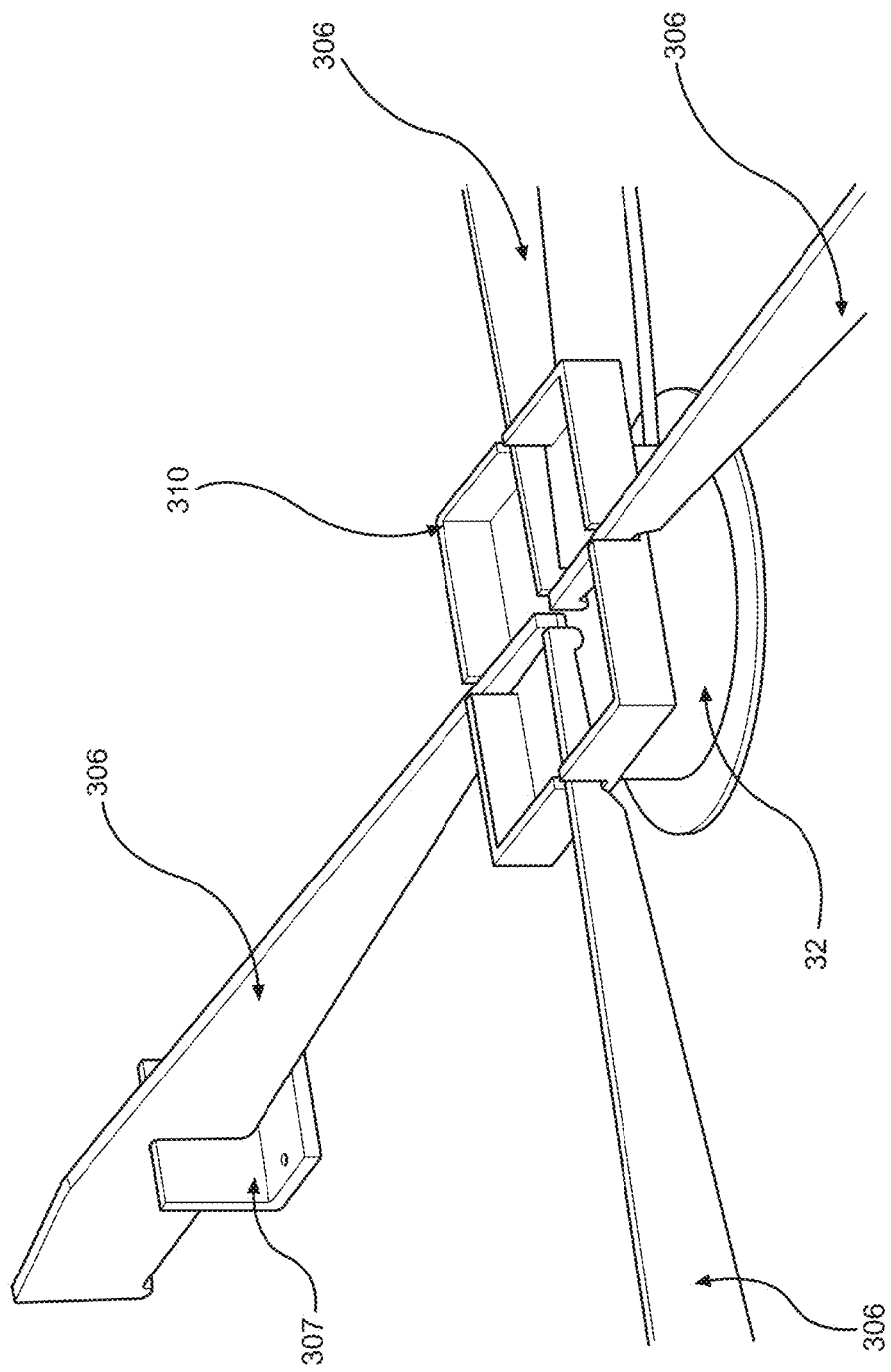
Figure 30B:
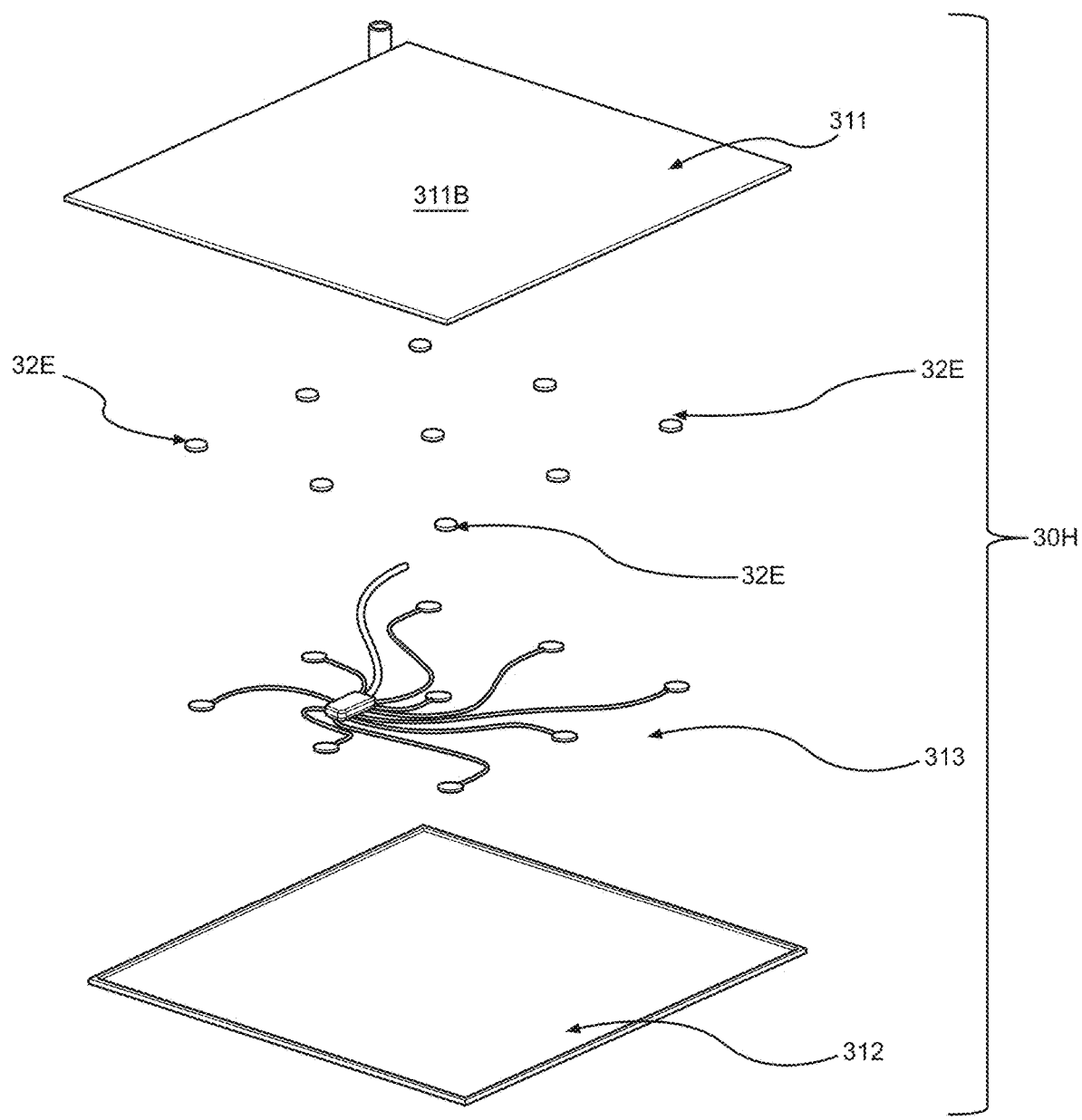
Figure 30C:
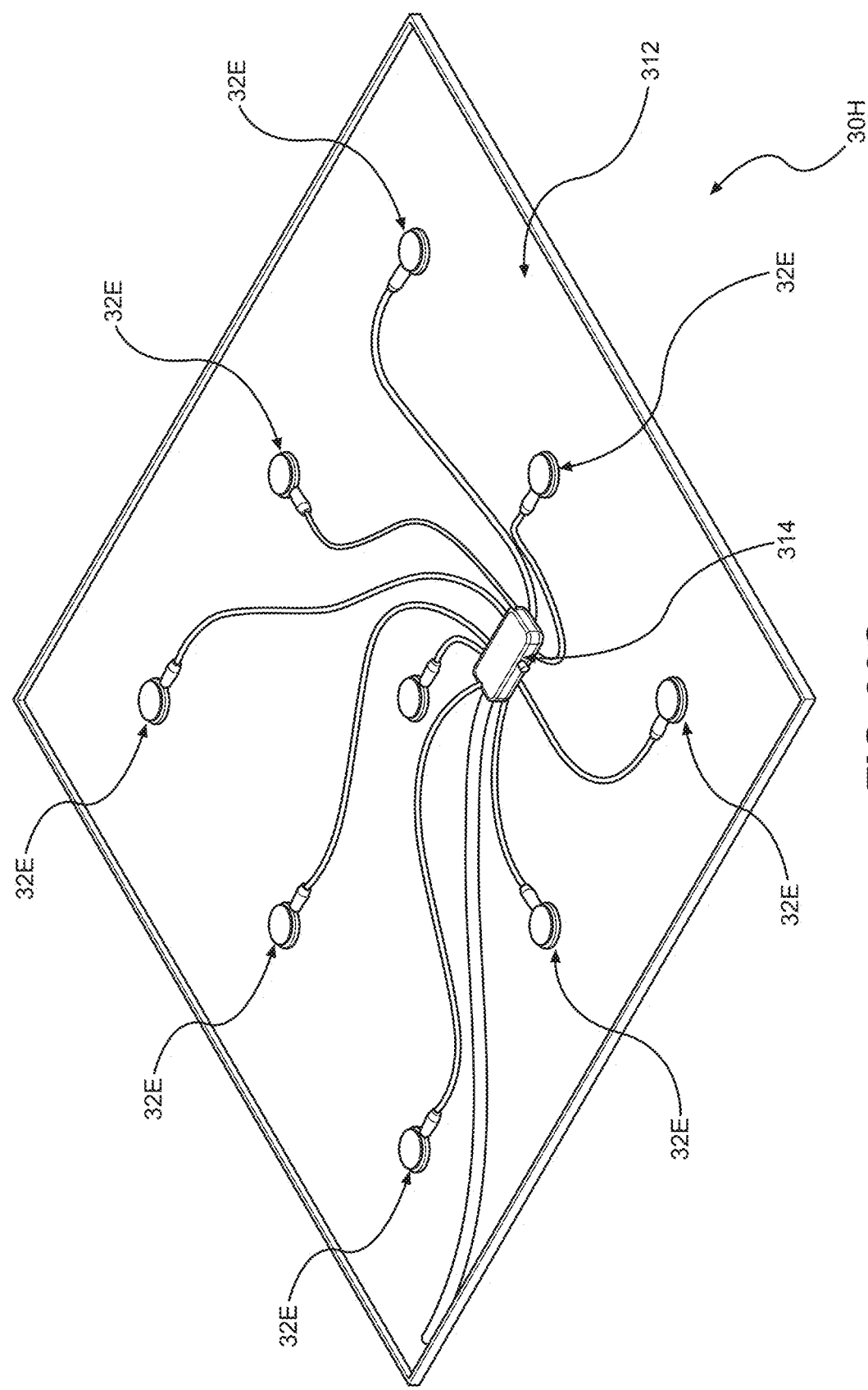
Figure 30D:
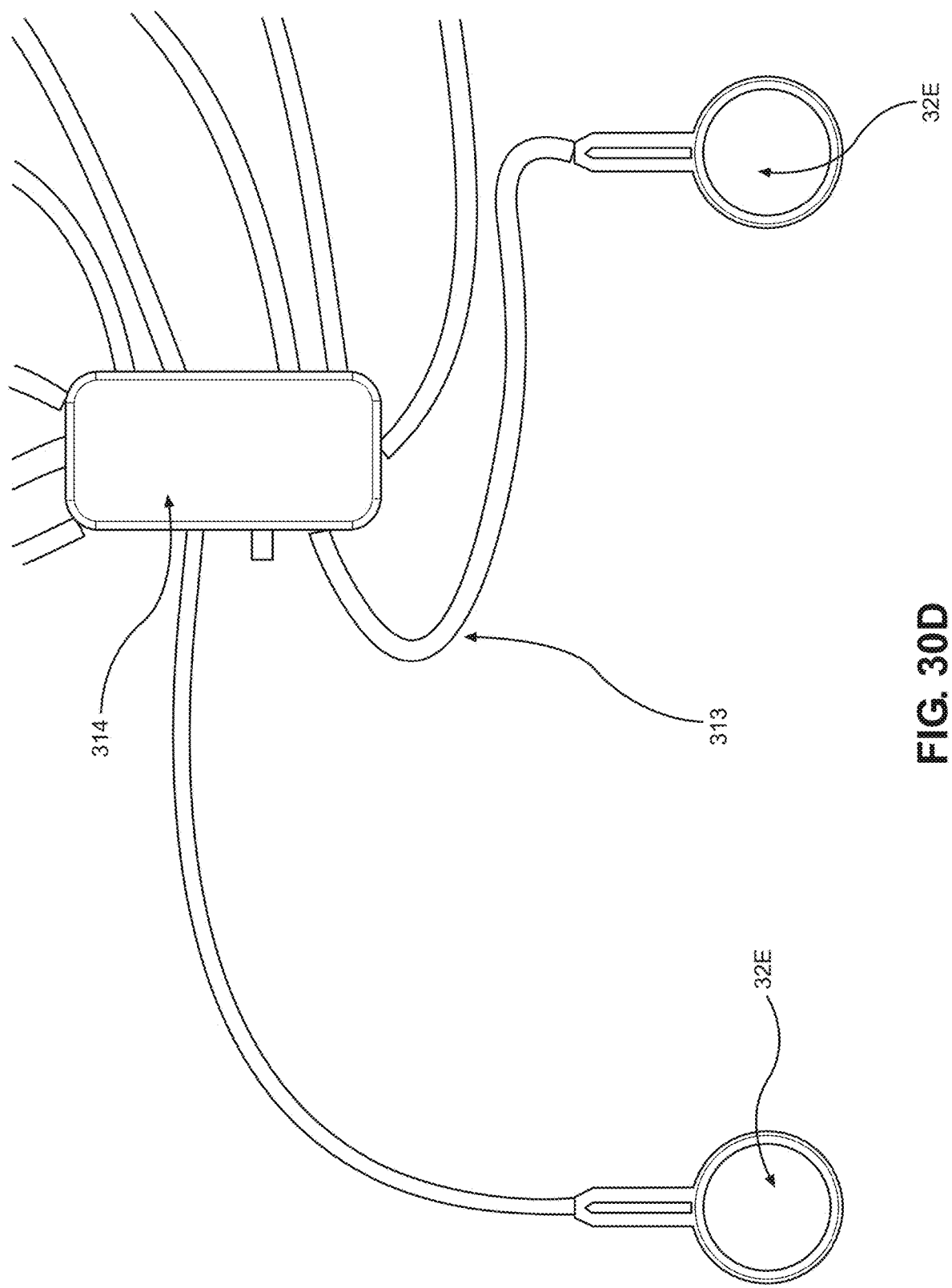
Figure 30E:
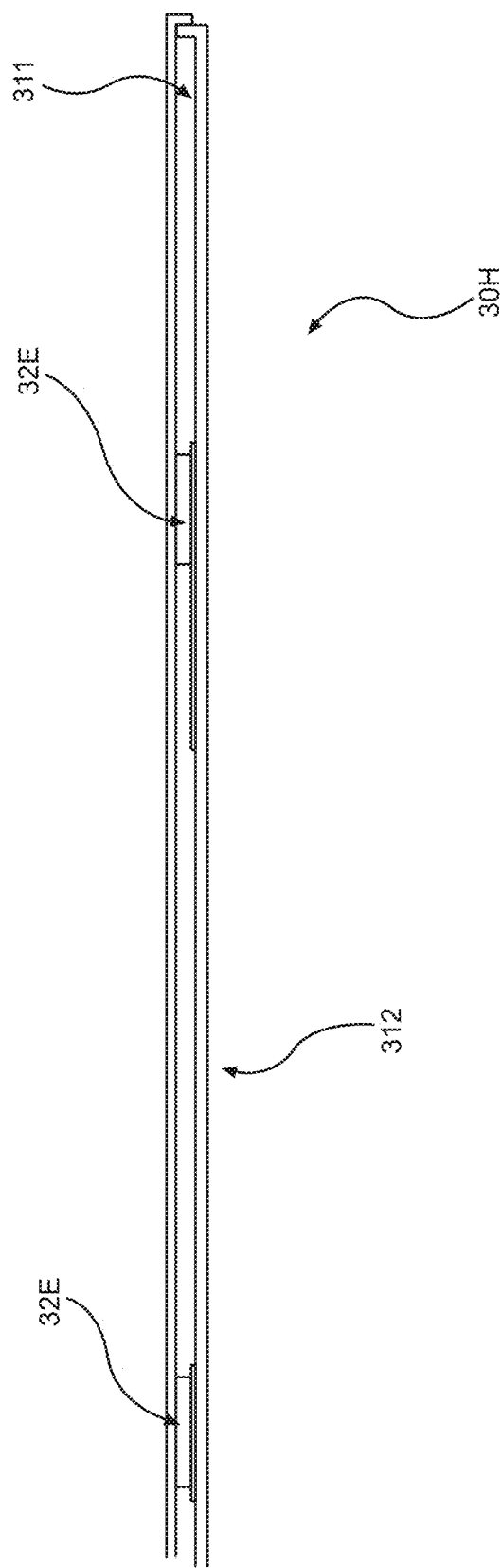
Figure 31:
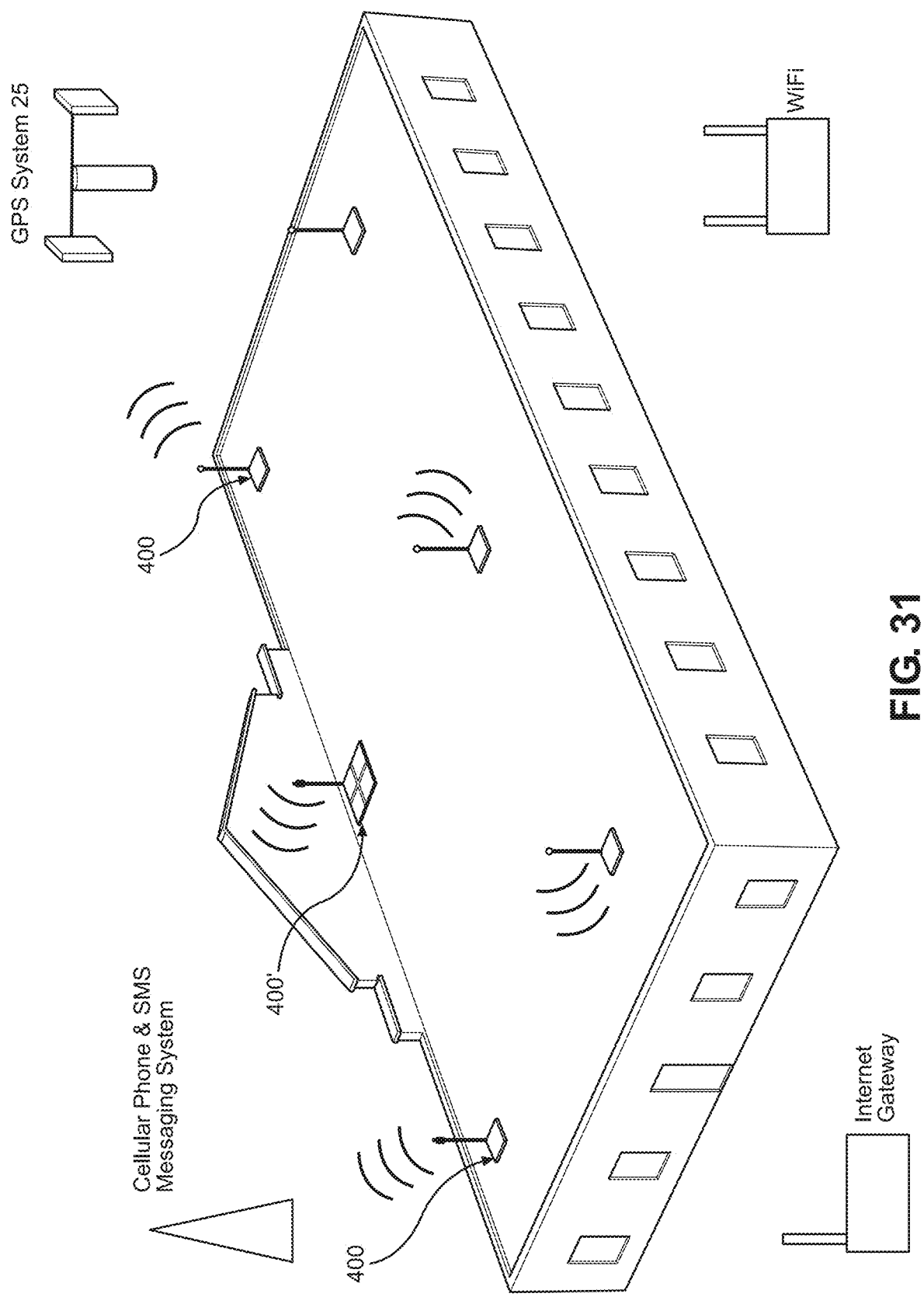
Figure 32:
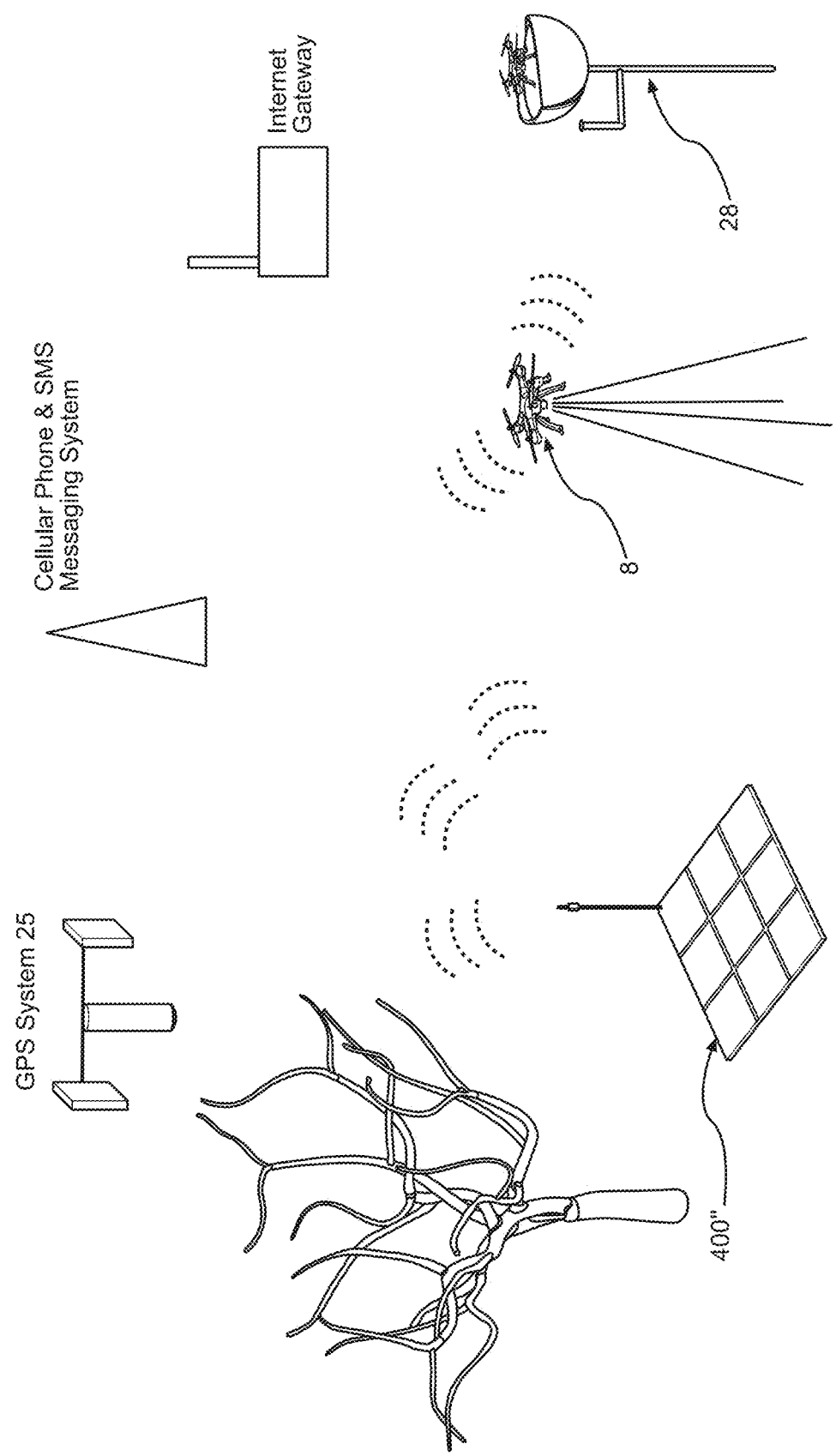
Figure 33:
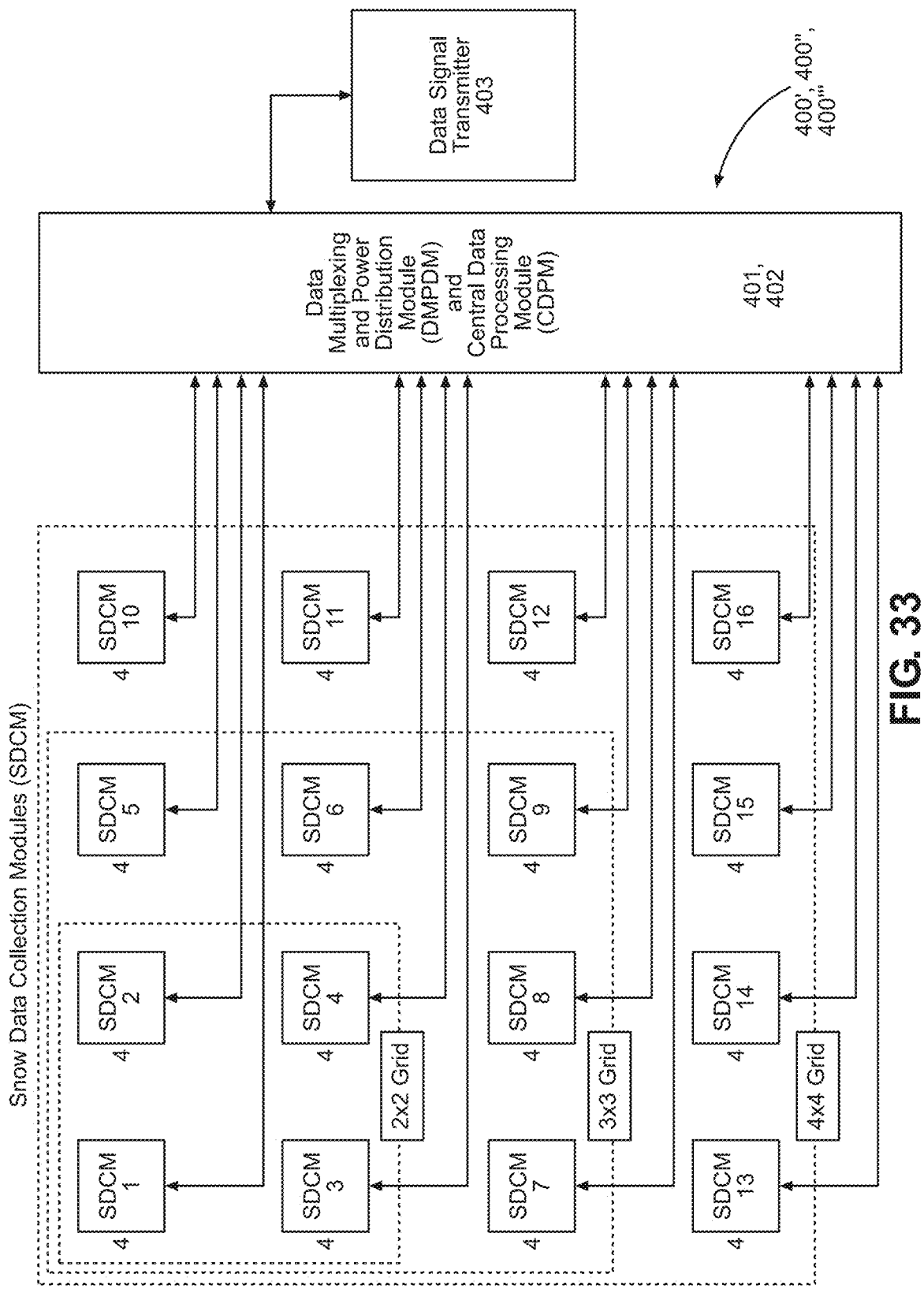
Figure 36:
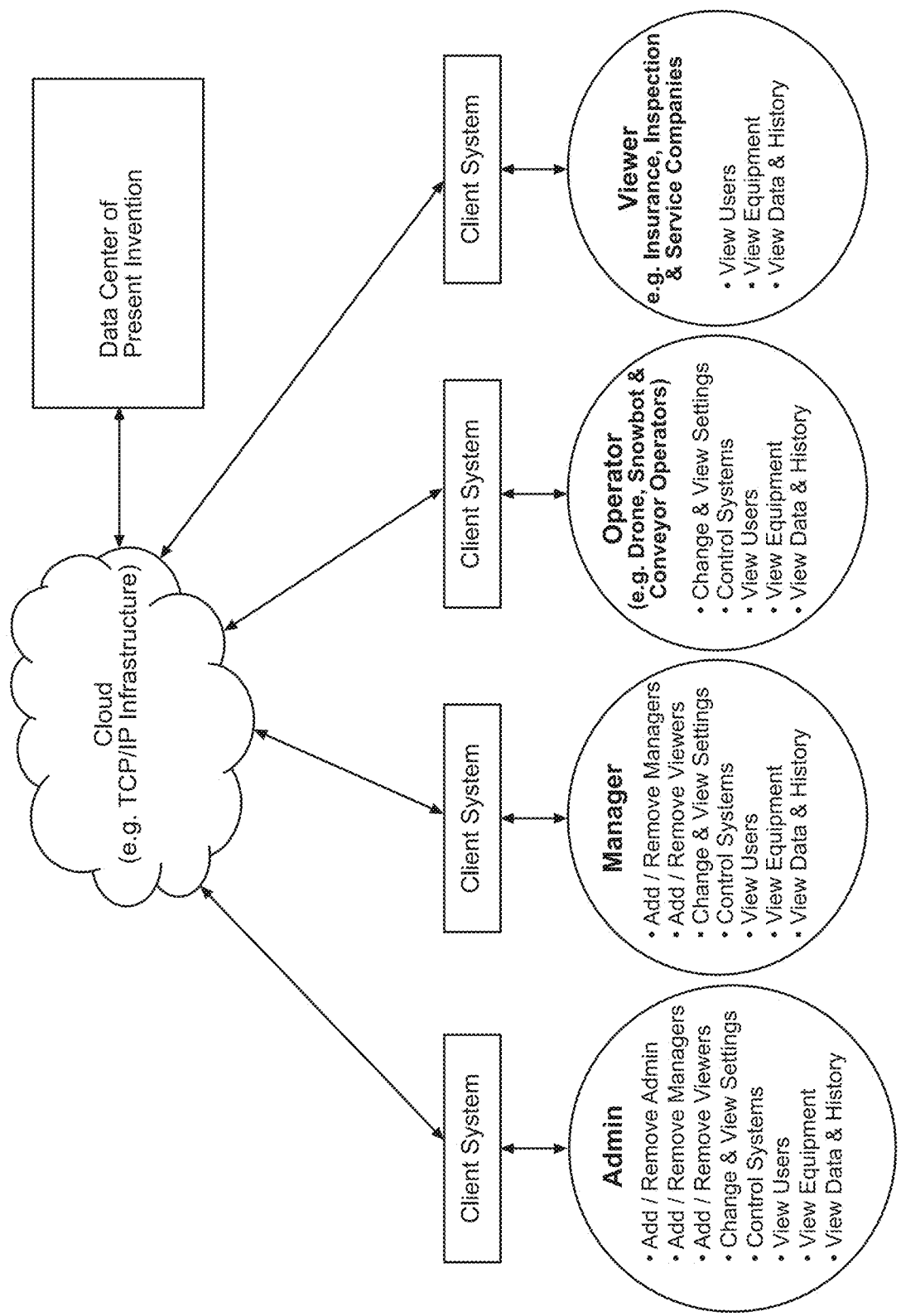
Figure 40A:
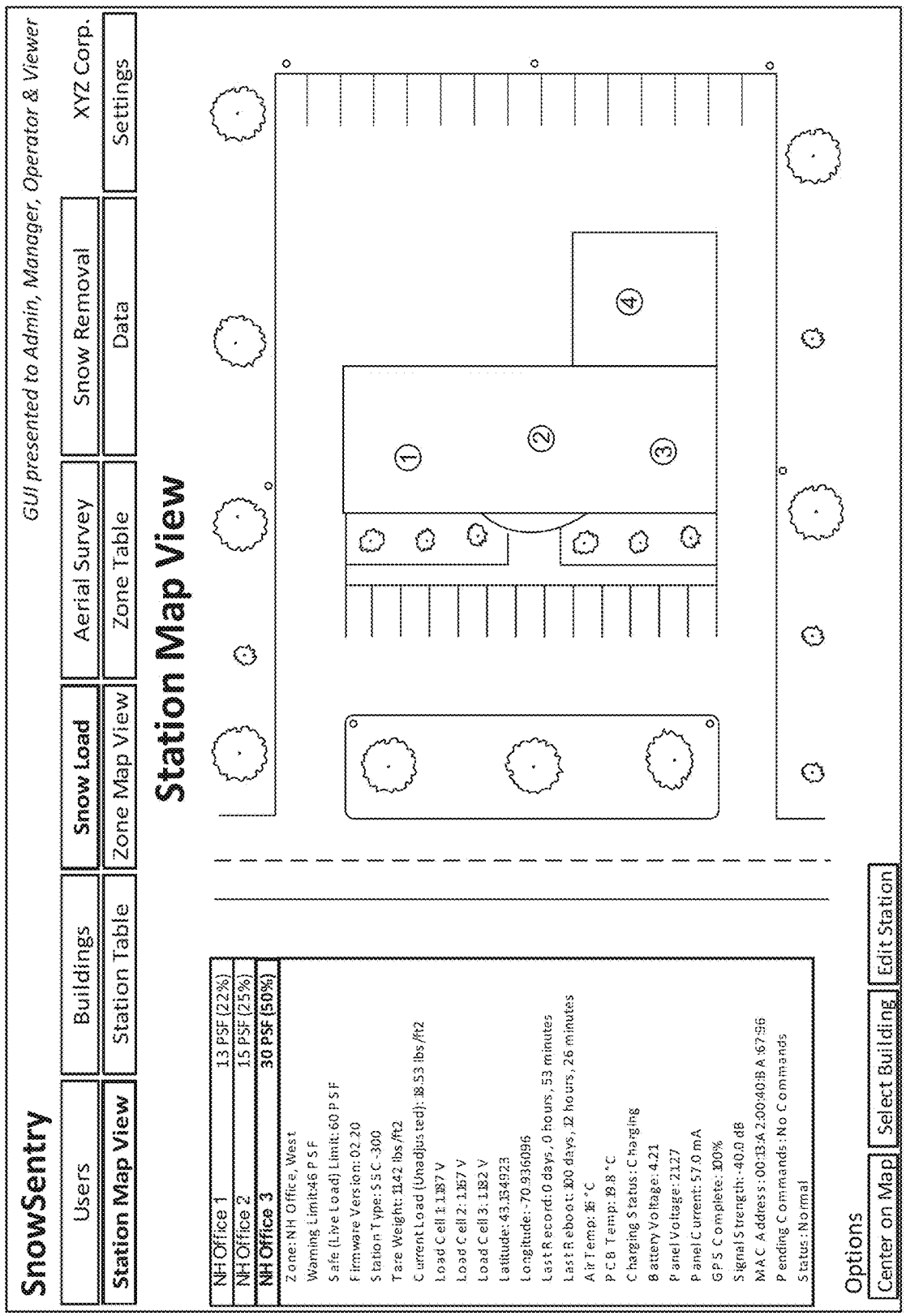
Figure 40F:
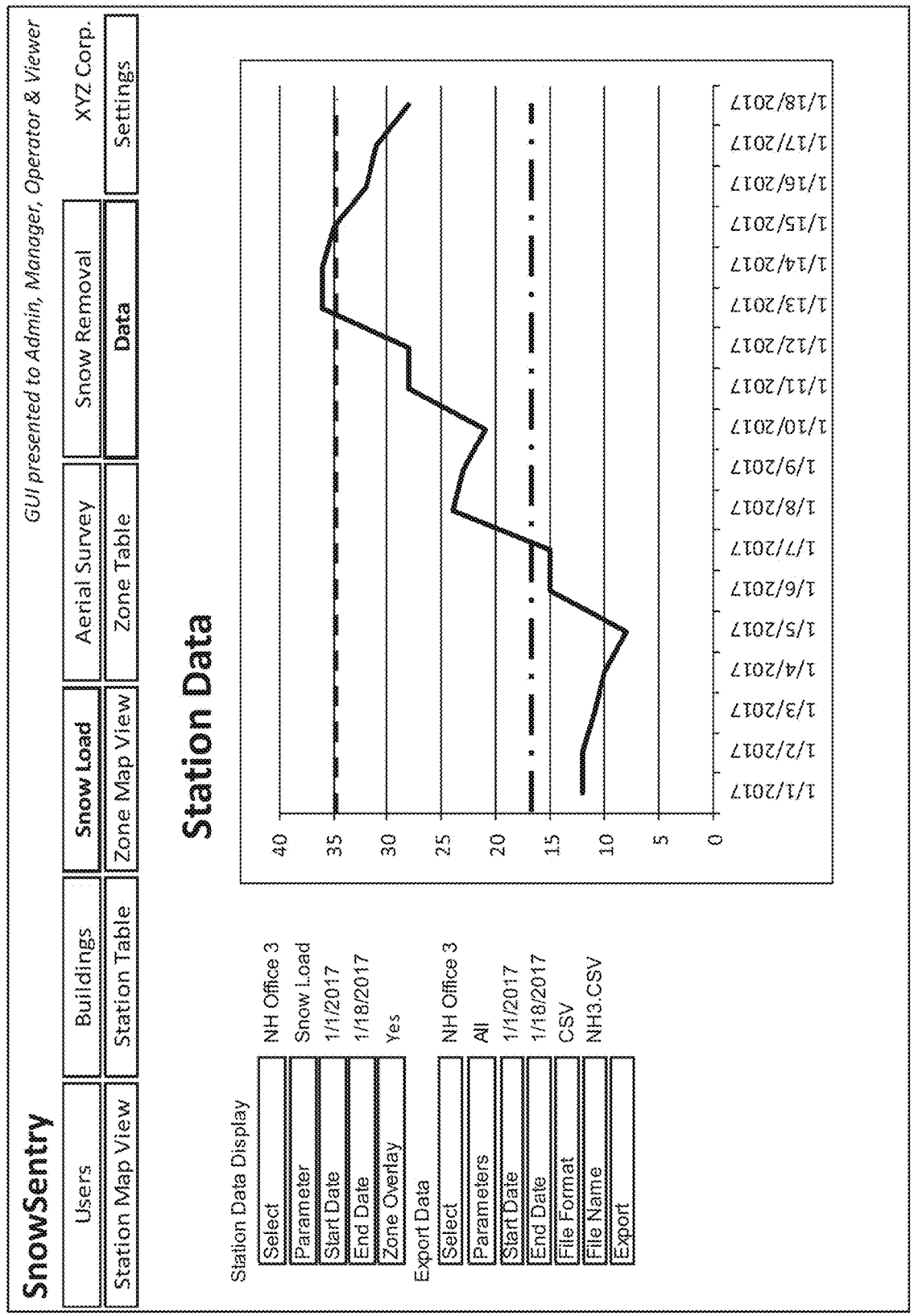
Figure 41B:
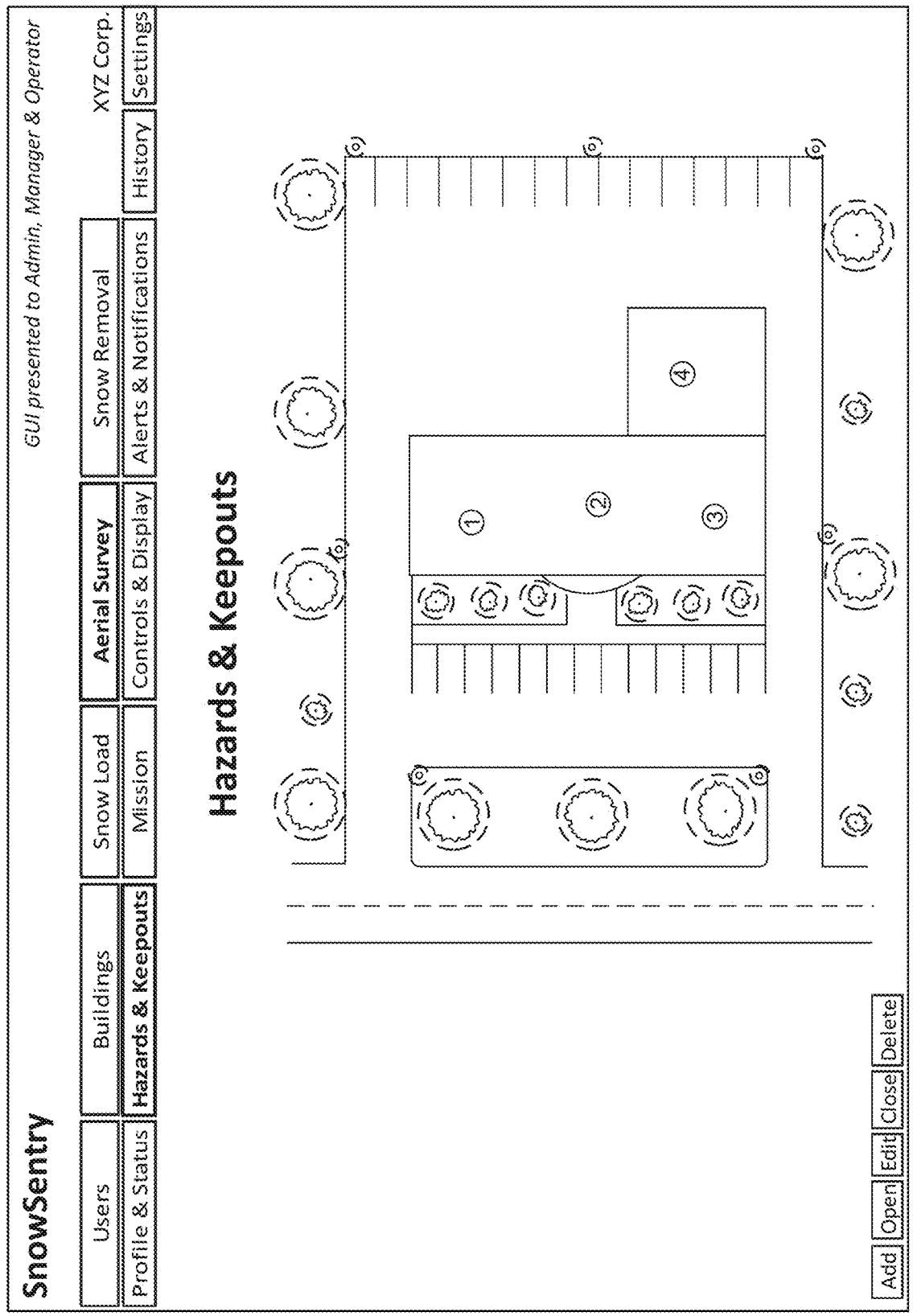
Figure 41C:
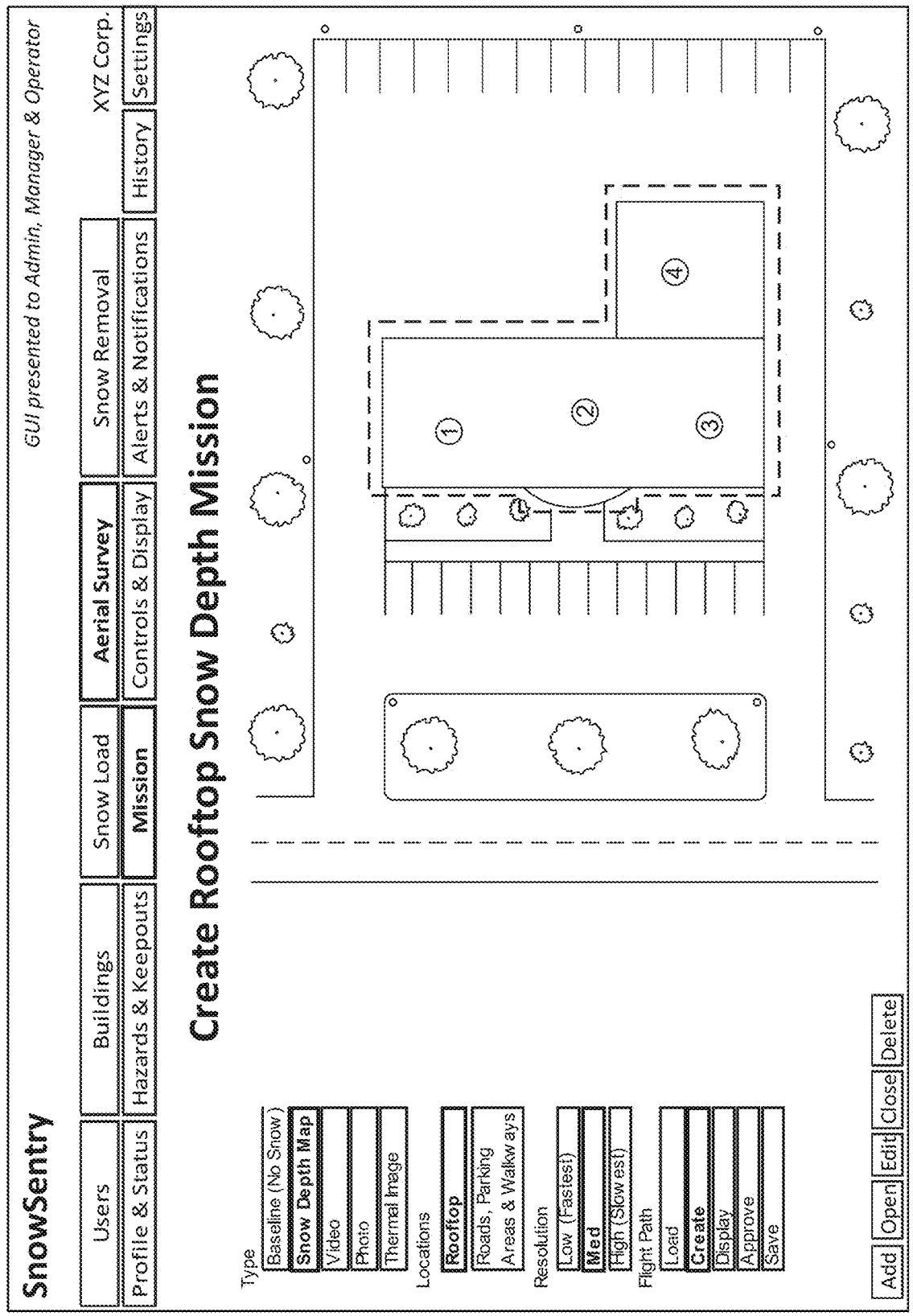
Figure 41D:
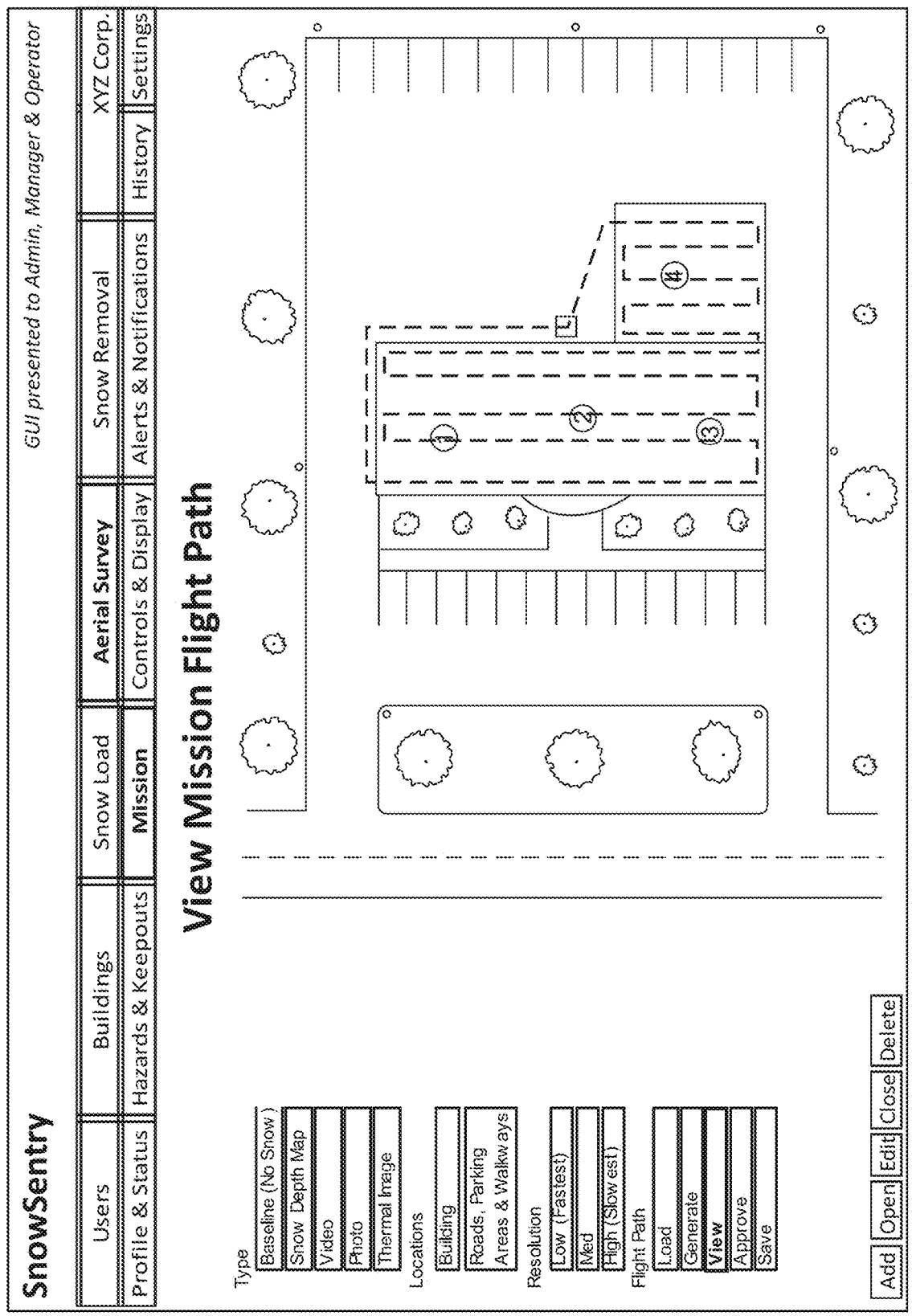
Figure 41E:
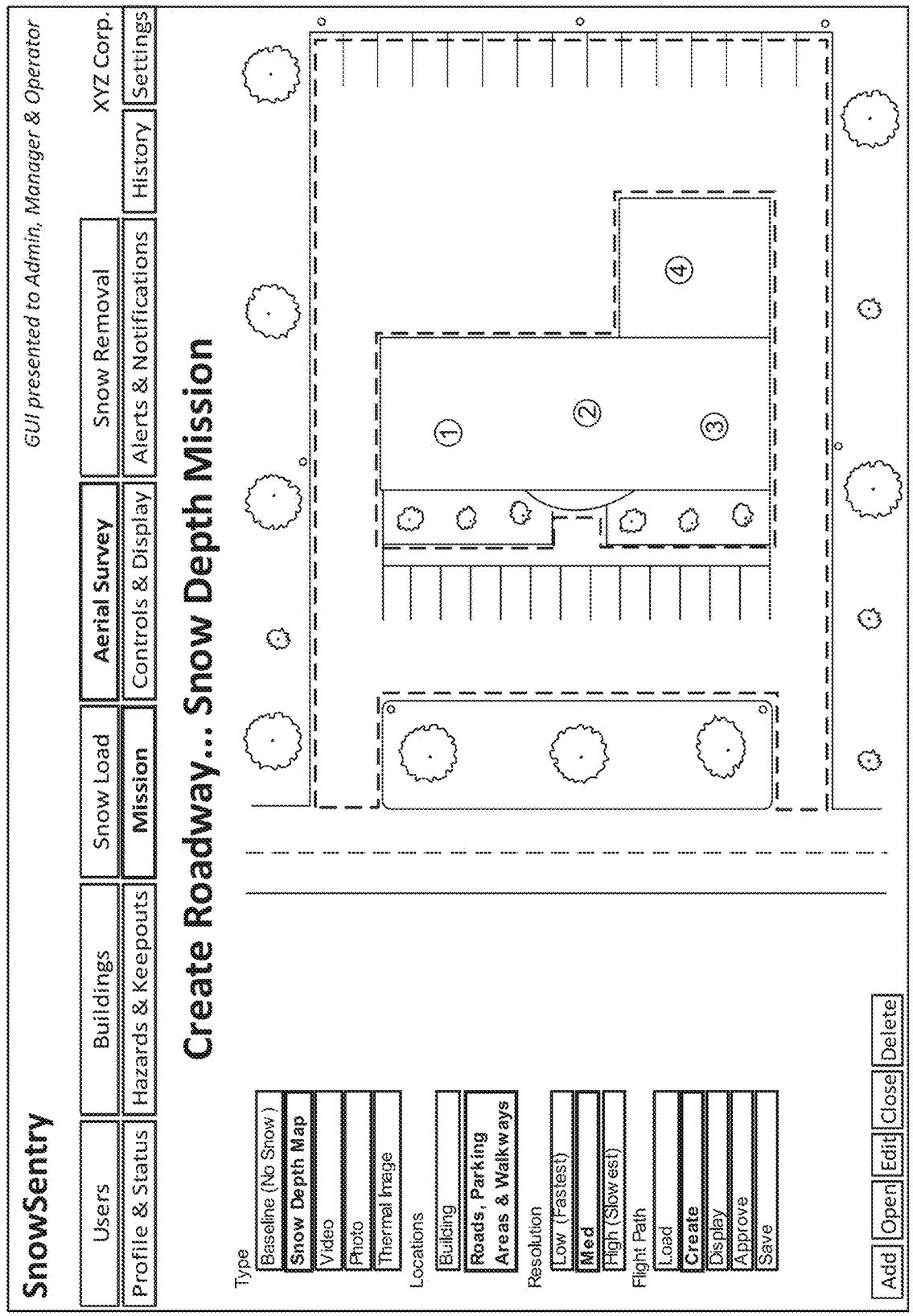
Figure 41F:
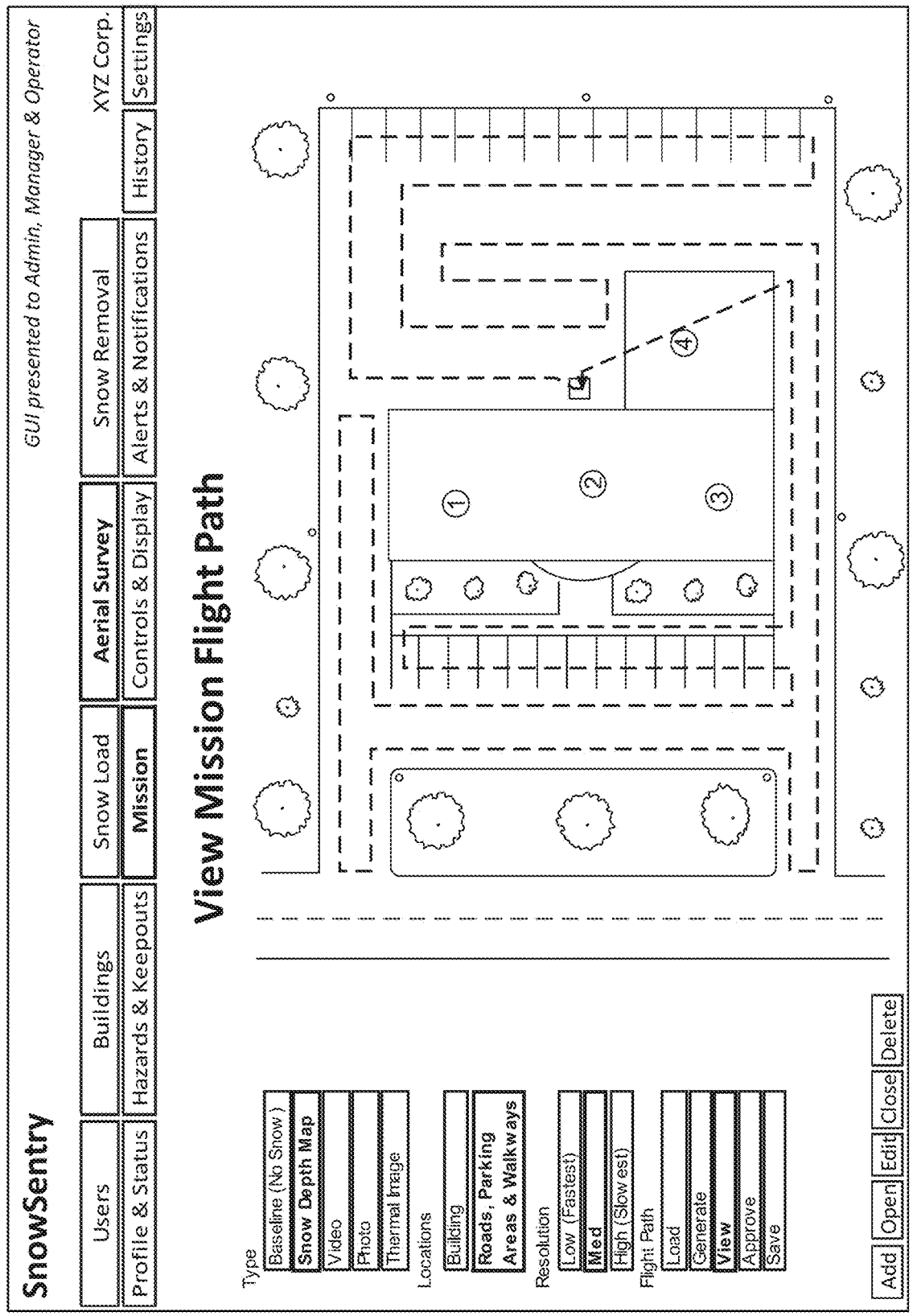
Figure 41K:
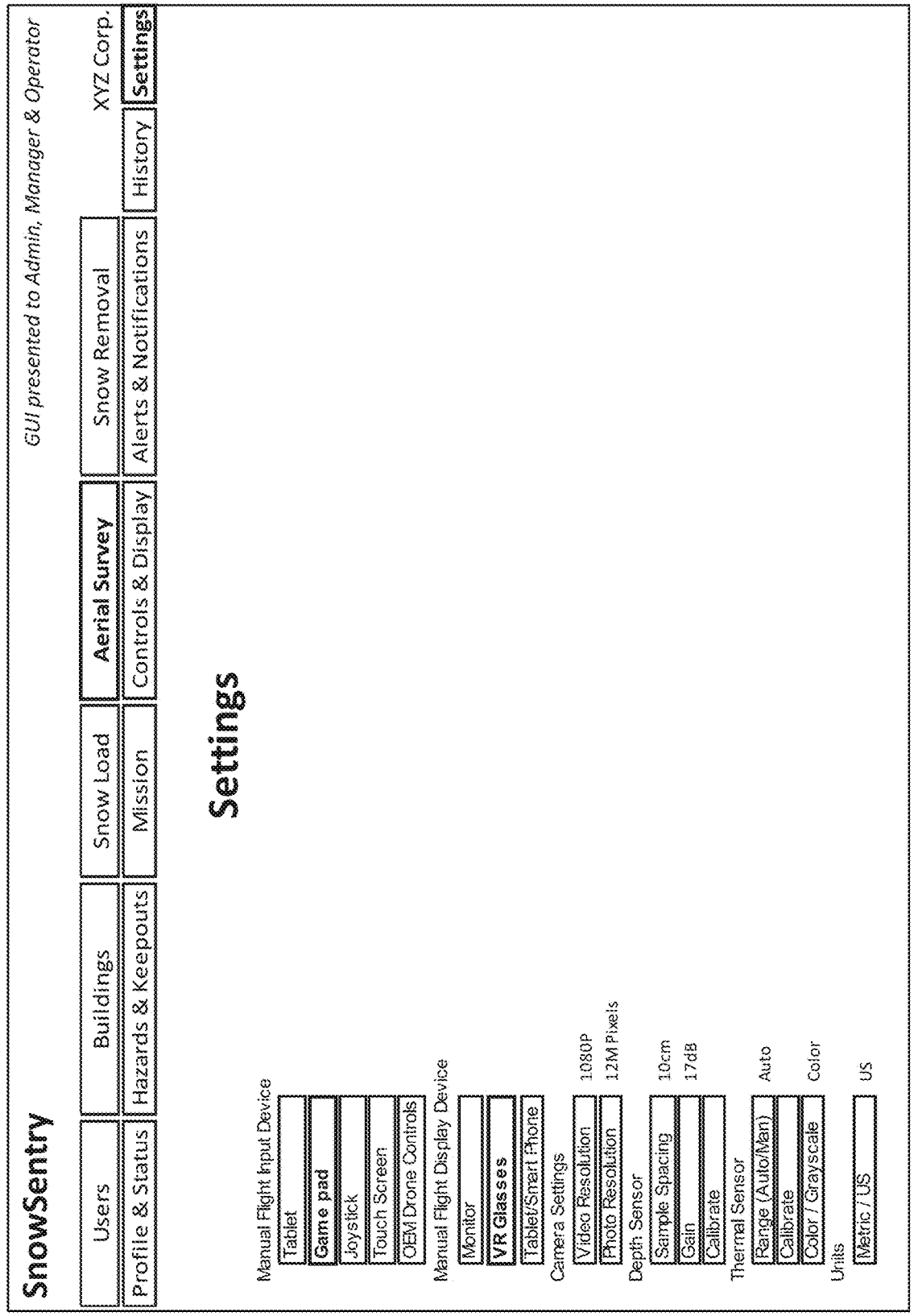
Figure 42C:
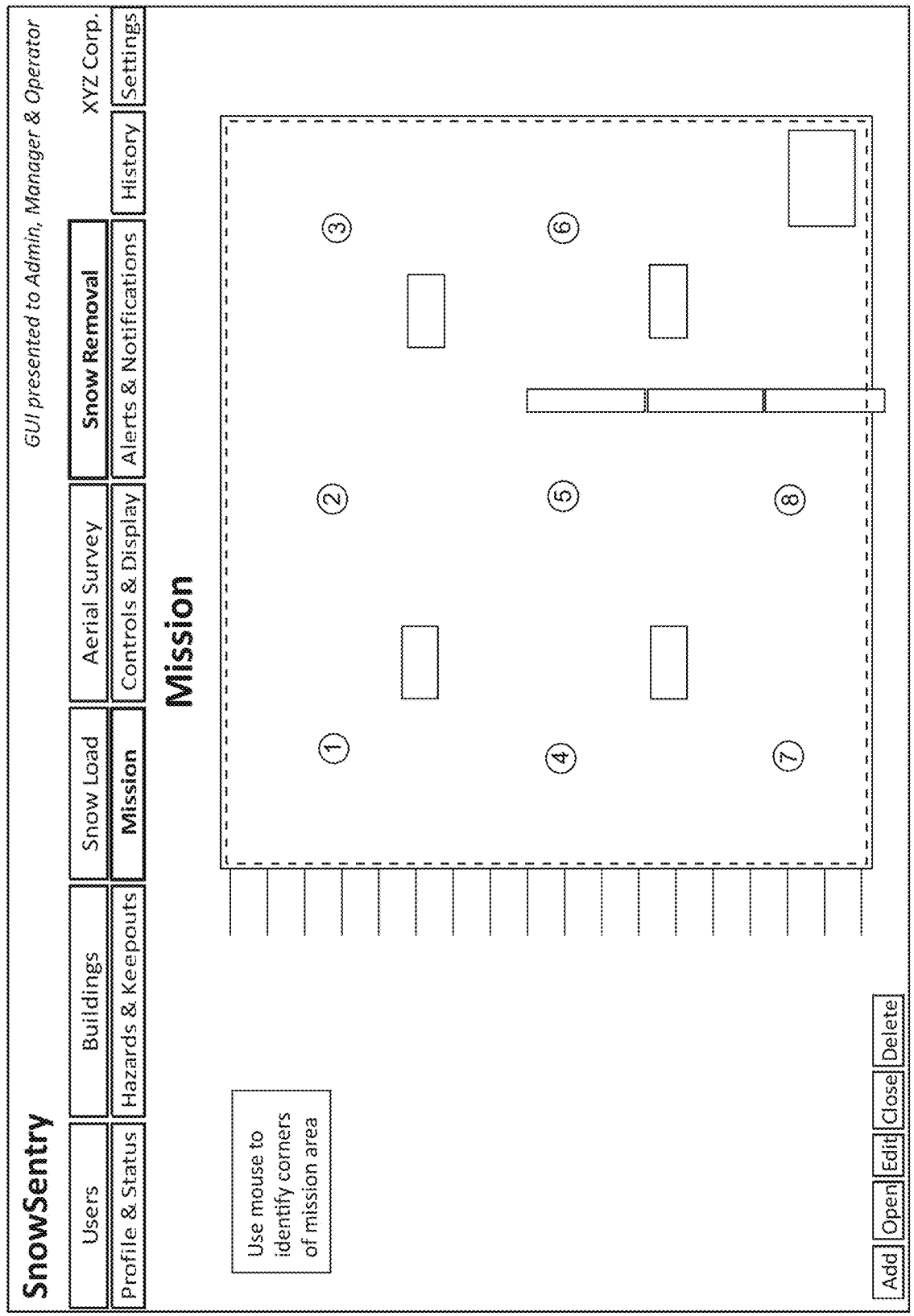
Figure 42G:
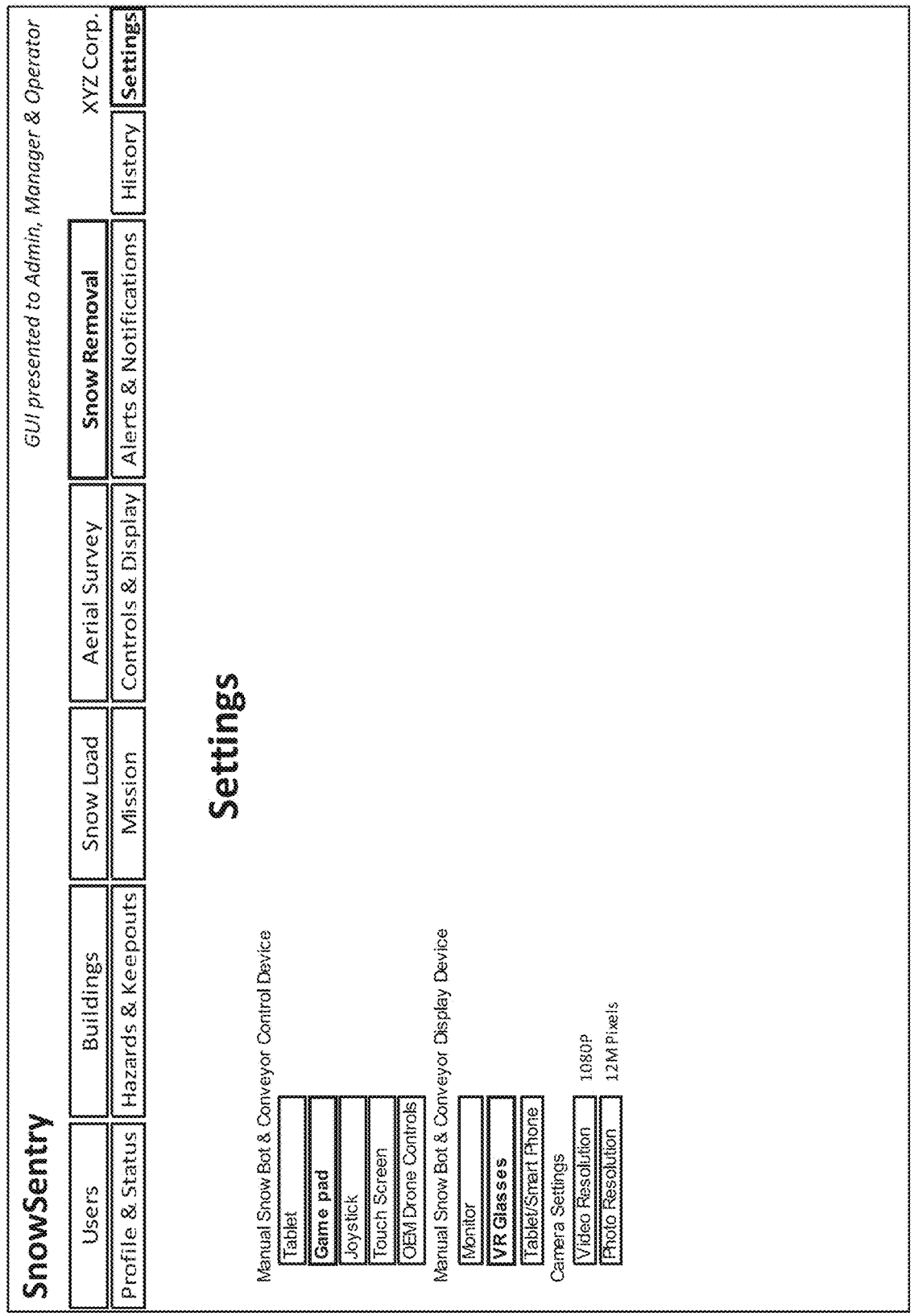
Figure 45:
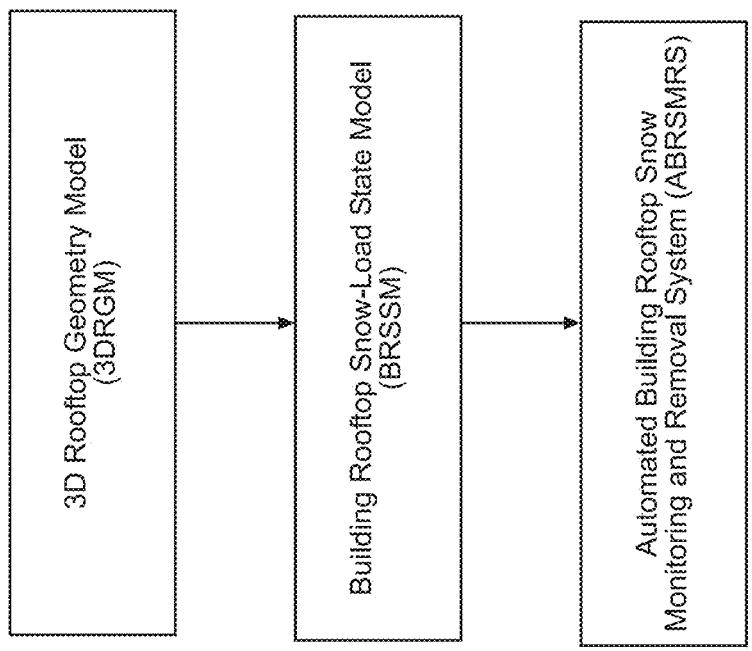

FIG. 27A is a perspective view of the fourth illustrative embodiment of the base station that can be used to construct a snow load monitoring system in accordance with the principles of the present invention, wherein a weight plate is affixed and sealed to the base housing framework containing four load sensors configured according to a translational measurement method, and the mast is mounted on the side of the base station;

FIG. 27B is an exploded view of the fourth illustrative embodiment of the base station shown in FIG. 27A, with the weigh plate removed from the base housing framework to reveal four load sensors and two weight discs to provide stability during strong winds;

FIG. 27C is a cross-sectional view of the fourth illustrative embodiment of the base station shown in FIG. 27A, showing the force sensors mounted between the weigh plate and the bottom surface of the frame structure;

FIG. 28A is a perspective view of the fifth illustrative embodiment of the base station that can be used to construct a snow load monitoring system in accordance with the principles of the present invention, wherein a flexible gasket is disposed between a flat weight and base plates with four load sensors mounted on the base plate and configured according to a translational measurement method, and the mast mounted on the side of the base station;

FIG. 28B is an exploded view of the sixth illustrative embodiment of the base station shown in FIG. 28A, shown comprising a flexible gasket disposed between a flat weight and base plates with four load sensors mounted on the base plate and configured according to a translational measurement method, and the mast is mounted on the side of the base station;

FIG. 28C is an elevated cross-sectional view of the sixth illustrative embodiment of the base station shown in FIG. 28A, showing the force sensors mounted between the weigh and base plates;

FIG. 29A is a perspective view of the sixth illustrative embodiment of the base station that can be used to construct a snow load monitoring system in accordance with the principles of the present invention, wherein a weight plate supported on a single load sensors configured according to a bathroom-scale measurement method and cantilever support structures mounted on the base plate of the base framework, with its mast being mounted on the side of the base station;

FIG. 29B is an exploded view of the sixth illustrative embodiment of the base station shown in FIG. 29A, comprising a weight plate, a load sensor, bathroom-scale cantilever load distribution structures and a base framework with a bottom base plate;

FIG. 29C is a cross-sectional view of the sixth illustrative embodiment of the base station shown in FIG. 29A, showing the force sensor mounted between the weigh plate and the cantilever load distribution structures;

FIG. 29D is a perspective view of the sixth illustrative embodiment of the base station, with its weigh plate removed to reveal the single load sensor and the load distribution cantilever structure mounted thereon;

FIG. 29E is a perspective view of a cantilever-type load distribution structure that contacts the load sensor and rest upon supports spaced away from the load sensor;

FIG. 30A is a perspective view of the seventh illustrative embodiment of the base station that can be used to construct a snow load monitoring system in accordance with the principles of the present invention, wherein a plurality of piezo-type load sensors molded into a compliant (rubber-like) casing position between flat weigh and base plates;

FIG. 30B is an exploded view of the seventh illustrative embodiment of the base station shown in FIG. 30A, comprising flat weight and base plates, a plurality of piezo-type load sensors, and rubber-like casing into which the piezo-type load sensors are molded;

FIG. 30C is perspective view of the seventh illustrative embodiment of the base station shown in FIG. 30A, is shown with its weigh plate remove revealing the piezo-type load sensors molded into the rubber-like casing;

FIG. 30D is a perspective view of a pair of piezo-type load sensors employed in the seventh illustrative embodiment of the base station shown in FIG. 30A;

FIG. 30E is an elevated side view of the seventh illustrative embodiment of the base station shown in FIG. 30A, showing plurality of piezo-type load sensors molded in the rubber-like casing disposed between the flat weight and base plates;

FIG. 31 is a perspective view of a building having a rooftop, on which is mounted a group of snow load sensing subsystems (SLSS), each employing one or more snow load sensing base units, whose output measurements are collected and processed by a data processing hub and transferred to a digital signal transmitter transmission to a remote data center, for remote snow load monitoring and snow weight equivalent (SWE) monitoring;

FIG. 31A is a perspective view of the roof-top mounted snow load measurement system constructed from four (4) interfaced snow load sensing base units;

FIG. 31B is a perspective view of the roof-top mounted snow load measurement system constructed from nine (9) interfaced snow load sensing base units;

FIG. 31C is a perspective view of the roof-top mounted snow load measurement system constructed from sixteen (16) interfaced snow load sensing base units;

FIG. 32 is a perspective view of the ground-supported snow load measurement system constructed from nine (9) snow load sensing base units, in communication with a GPS system, a cellular phone and SMS messaging system, and an Internet gateway;

FIG. 33 is a schematic diagram of the ground-supported multi-unit snow load sensing system of the present invention constructed from sixteen (16) snow load sensing base units;

FIG. 34 is a flow chart describing the primary steps involved when carrying out a first method processing load data collected from multiple spatially-distributed snow load sensing base units, each using multiple load sensor for snow load measurement;

FIG. 35 is a flow chart describing the primary steps involved when carrying out a method processing load data collected from multiple snow load sensing base units, each using a single load sensor for snow load measurement;

FIG. 36 is a network diagram showing a plurality of client systems operably connected to the cloud (i.e. TCP/IP infrastructure) and the data center of the present invention, being used by various system stakeholders being served by the network, including administrators, managers, operators (e.g. drones, snow moving robots, conveyors and operators), and viewers (e.g. insurance, inspection and service companies);

FIG. 37 is schematic representation of an exemplary graphical user interface (GUI) presented to Admin, Manager, Operator and Viewer Users, showing the primary interface objects available for selection and when authorized users are logging into their user account maintained on the system network of the illustrative embodiment of the present invention;

FIG. 38A is schematic representation of an exemplary graphical user interface (GUI) presented to Admin and Manager Users, showing the primary interface objects (i.e. pull-down menus) for managing Users, Buildings, Snow Load, Ariel Survey and Snow Removal, wherein the Users pull-down menu has been selected to show the Users GUI listing all "Users" assigned to a specific Client User Account maintained and supported on the system network of the present invention;

FIG. 38B is schematic representation of an exemplary graphical user interface (GUI) showing the primary interface objects showing pull-down menus for managing Users, Buildings, Snow Load, Ariel Survey and Snow Removal, wherein the Users pull-down menu was selected to show the Users GUI for adding a New User to be assigned to a specific client user account maintained and supported on the system network of the present invention;

FIG. 39 is schematic representation of an exemplary graphical user interface (GUI) showing the primary interface objects showing pull-down menus for managing Users, Buildings, Snow Load, Ariel Survey and Snow Removal, wherein the Buildings pull-down menu was selected to show the Buildings GUI listing "Buildings" assigned to a specific client user account maintained and supported on the system network of the present invention;

Figure 40B:
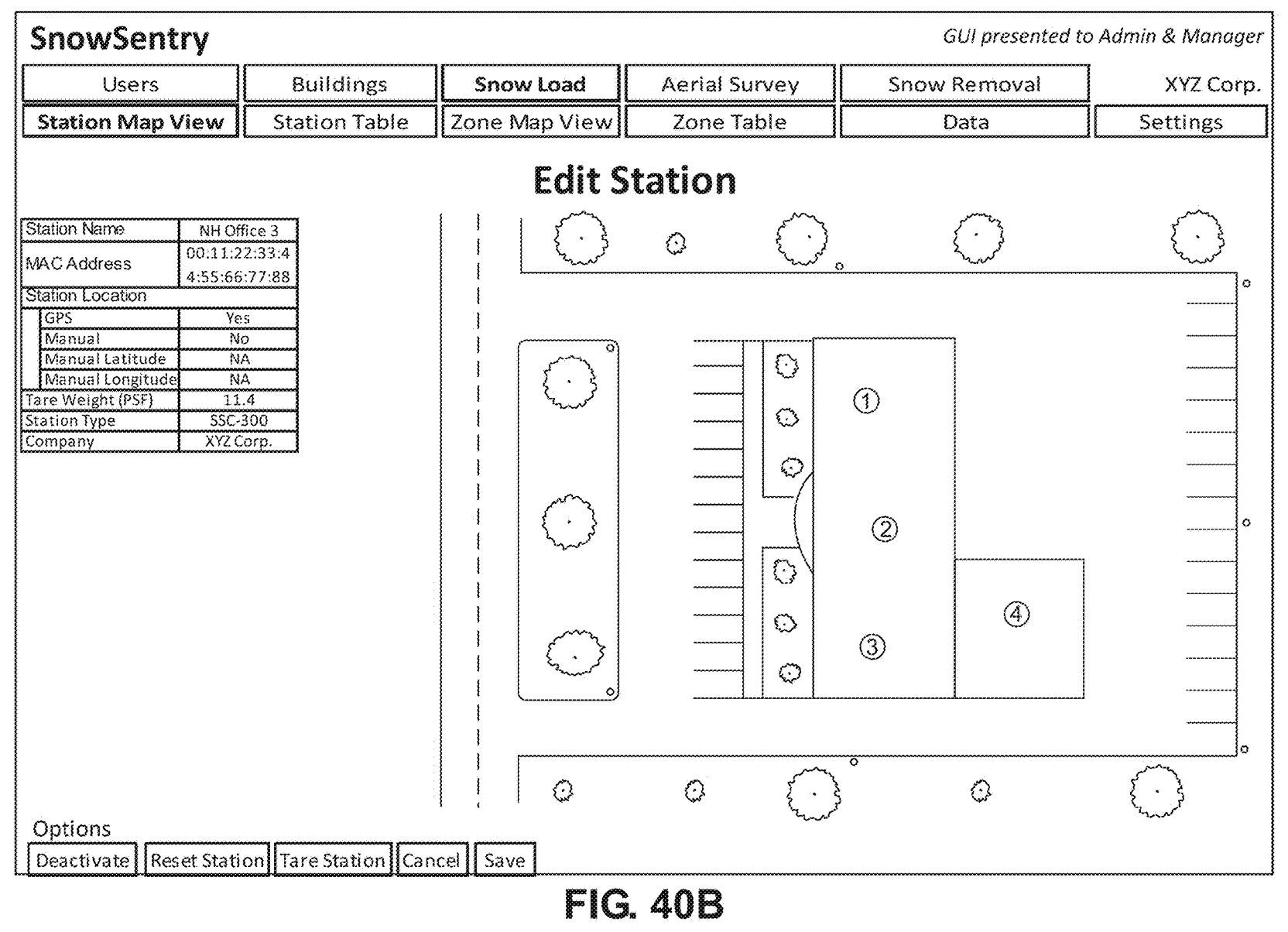

FIG. 40A is schematic representation of an exemplary graphical user interface (GUI) showing the primary interface objects showing pull-down menus for managing Users, Buildings, Snow Load, Ariel Survey and Snow Removal, wherein the Snow Load pull-down menu was selected to show the Station Map View GUI for viewing a Map of a selected Station (i.e. NH Office 3) assigned to a specific client user account maintained and supported on the system network of the present invention;

FIG. 40B is schematic representation of an exemplary graphical user interface (GUI) showing the primary interface objects showing pull-down menus for managing Users, Buildings, Snow Load, Ariel Survey and Snow Removal, wherein the Snow Load pull-down menu was selected to show the Station Map View GUI for viewing and editing settings associated with a selected Station (i.e. NH Office 3) assigned to a specific client user account maintained and supported on the system network of the present invention;

FIG. 40C is schematic representation of an exemplary graphical user interface (GUI) showing the primary interface objects showing pull-down menus for managing Users, Buildings, Snow Load, Ariel Survey and Snow Removal, wherein the Snow Load pull-down menu was selected to show the Station Table GUI for viewing a Station Table listing all of the snow load sensing stations (mounted on Buildings) assigned to a specific client user account maintained and supported on the system network of the present invention;

FIG. 40D1 is schematic representation of an exemplary graphical user interface (GUI) showing the primary interface objects showing pull-down menus for managing Users, Buildings, Snow Load, Ariel Survey and Snow Removal, wherein the Snow Load pull-down menu was selected to show the Zone Map View GUI for viewing Zones on Buildings assigned to a specific client user account maintained and supported on the system network of the present invention;

FIG. 40D2 is schematic representation of an exemplary graphical user interface (GUI) showing the primary interface objects showing pull-down menus for managing Users, Buildings, Snow Load, Ariel Survey and Snow Removal, wherein the Snow Load pull-down menu was selected to show the Zone Map View GUI for viewing and editing Zones on Buildings assigned to a specific client user account maintained and supported on the system network of the present invention;

FIG. 40E is schematic representation of an exemplary graphical user interface (GUI) showing the primary interface objects showing pull-down menus for managing Users, Buildings, Snow Load, Ariel Survey and Snow Removal, wherein the Snow Load pull-down menu was selected to show the Zone Table GUI for viewing the Zone Table assigned to a specific client user account maintained and supported on the system network of the present invention;

FIG. 40F is schematic representation of an exemplary graphical user interface (GUI) showing the primary interface objects showing pull-down menus for managing Users, Buildings, Snow Load, Ariel Survey and Snow Removal, wherein the Snow Load pull-down menu was selected to show the Data GUI for viewing the Station Data produced from each Station assigned to a specific client user account maintained and supported on the system network of the present invention;

FIG. 40G is schematic representation of an exemplary graphical user interface (GUI) showing the primary interface objects showing pull-down menus for managing Users, Buildings, Snow Load, Ariel Survey and Snow Removal, wherein the Snow Load pull-down menu was selected to show the Settings GUI for viewing the Settings associated with the specific client user account maintained and supported on the system network of the present invention;

Figure 41G:
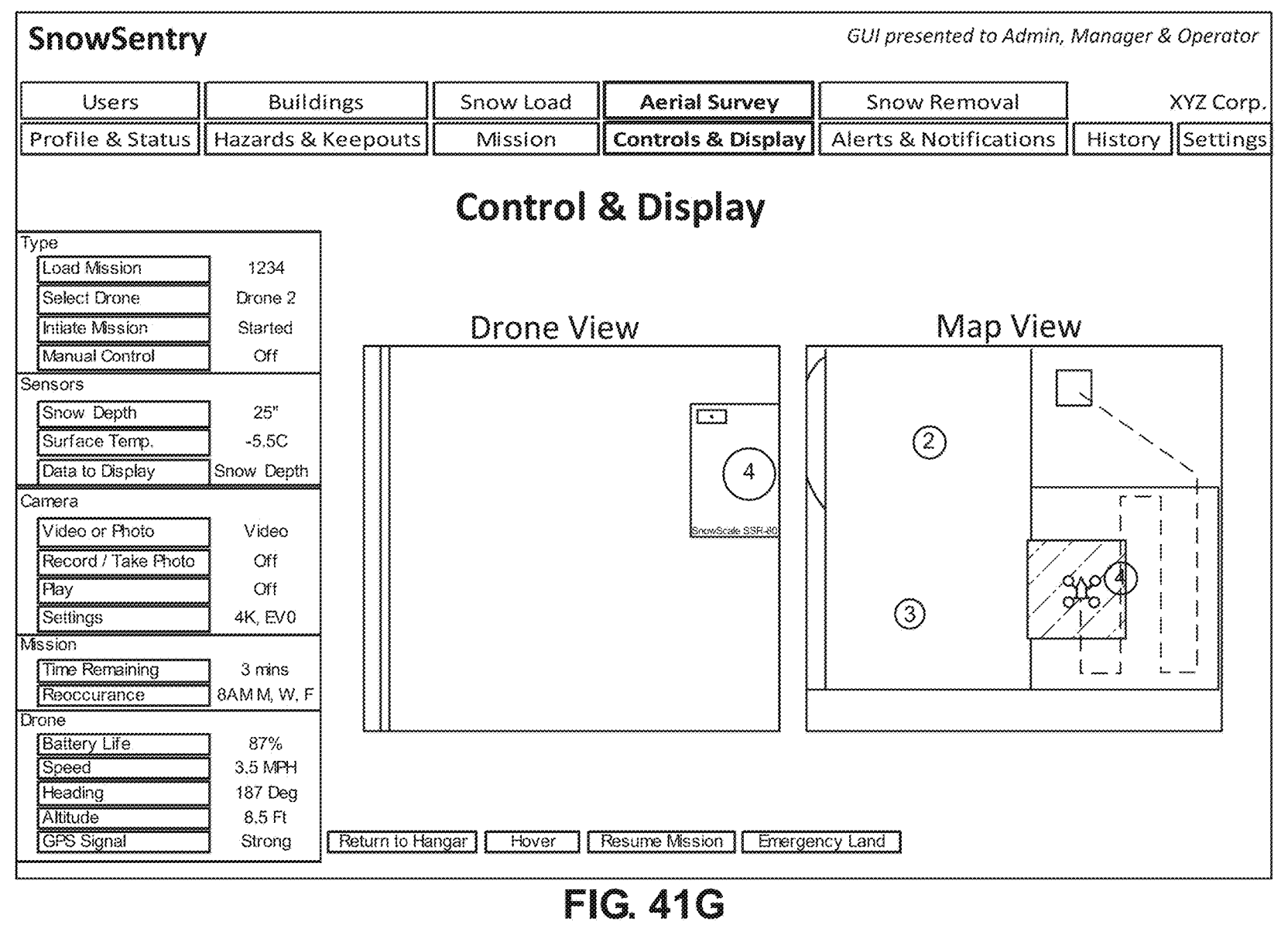

FIG. 41A is schematic representation of an exemplary graphical user interface (GUI) showing the primary interface objects showing pull-down menus for managing Users, Buildings, Snow Load, Ariel Survey and Snow Removal, wherein the Aerial Survey pull-down menu was selected to show the Profile & Status GUI for viewing the Profile & Status assigned to a specific client user account maintained and supported on the system network of the present invention;

FIG. 41B is schematic representation of an exemplary graphical user interface (GUI) showing the primary interface objects showing pull-down menus for managing Users, Buildings, Snow Load, Ariel Survey and Snow Removal, wherein the Aerial Survey pull-down menu was selected to show the Hazards & Keepouts GUI for viewing Hazards & Keepouts assigned to a specific client user account maintained and supported on the system network of the present invention;

FIG. 41C is schematic representation of an exemplary graphical user interface (GUI) showing the primary interface objects showing pull-down menus for managing Users, Buildings, Snow Load, Ariel Survey and Snow Removal, wherein the Aerial Survey pull-down menu was selected to show the Mission GUI for Creating the Rooftop Snow Depth Mission associated with a particular Building assigned to a specific client user account maintained and supported on the system network of the present invention;

FIG. 41D is schematic representation of an exemplary graphical user interface (GUI) showing the primary interface objects showing pull-down menus for managing Users, Buildings, Snow Load, Ariel Survey and Snow Removal, wherein the Aerial Survey pull-down menu was selected to show the Mission GUI for viewing the Mission Flight Path associated with a particular Building assigned to a specific client user account maintained and supported on the system network of the present invention;

FIG. 41E is schematic representation of an exemplary graphical user interface (GUI) showing the primary interface objects showing pull-down menus for managing Users, Buildings, Snow Load, Ariel Survey and Snow Removal, wherein the Aerial Survey pull-down menu was selected to show the Mission GUI for Creating the Roadway for a Snow Depth Mission associated with a particular Building assigned to a specific client user account maintained and supported on the system network of the present invention;

FIG. 41F is schematic representation of an exemplary graphical user interface (GUI) showing the primary interface objects showing pull-down menus for managing Users, Buildings, Snow Load, Ariel Survey and Snow Removal, wherein the Aerial Survey pull-down menu was selected to show the View Mission Flight GUI for Viewing the Mission Flight Path associated with a particular Building assigned to a specific client user account maintained and supported on the system network of the present invention;

FIG. 41G is schematic representation of an exemplary graphical user interface (GUI) showing the primary interface objects showing pull-down menus for managing Users, Buildings, Snow Load, Ariel Survey and Snow Removal, wherein the Aerial Survey pull-down menu was selected to show the Controls & Display GUI for controlling and displaying the viewing the Mission Flight Path from the point of view of the Drone, associated with a particular Building assigned to a specific client user account maintained and supported on the system network of the present invention;

FIG. 41H is schematic representation of an exemplary graphical user interface (GUI) showing the primary interface objects showing pull-down menus for managing Users, Buildings, Snow Load, Ariel Survey and Snow Removal, wherein the Aerial Survey pull-down menu was selected to show the Alerts & Notifications GUI for displaying Alerts & Notification associated with a particular client user account maintained and supported on the system network of the present invention;

FIG. 41I is schematic representation of an exemplary graphical user interface (GUI) showing the primary interface objects showing pull-down menus for managing Users, Buildings, Snow Load, Ariel Survey and Snow Removal, wherein the Aerial Survey pull-down menu was selected to show the History GUI for displaying the history of past aerials surveys associated with a particular Building assigned to a specific client user account maintained and supported on the system network of the present invention;

FIG. 41J is schematic representation of an exemplary graphical user interface (GUI) showing the primary interface objects showing pull-down menus for managing Users, Buildings, Snow Load, Ariel Survey and Snow Removal, wherein the Aerial Survey pull-down menu was selected to show the History and Viewer GUI for viewing the aerial survey history associated with a particular Building assigned to a specific client user account maintained and supported on the system network of the present invention;

FIG. 41K is schematic representation of an exemplary graphical user interface (GUI) showing the primary interface objects showing pull-down menus for managing Users, Buildings, Snow Load, Ariel Survey and Snow Removal, wherein the Aerial Survey pull-down menu was selected to show the Settings GUI for controlling and displaying the settings associated with a particular client user account maintained and supported on the system network of the present invention;

Figure 42D2:
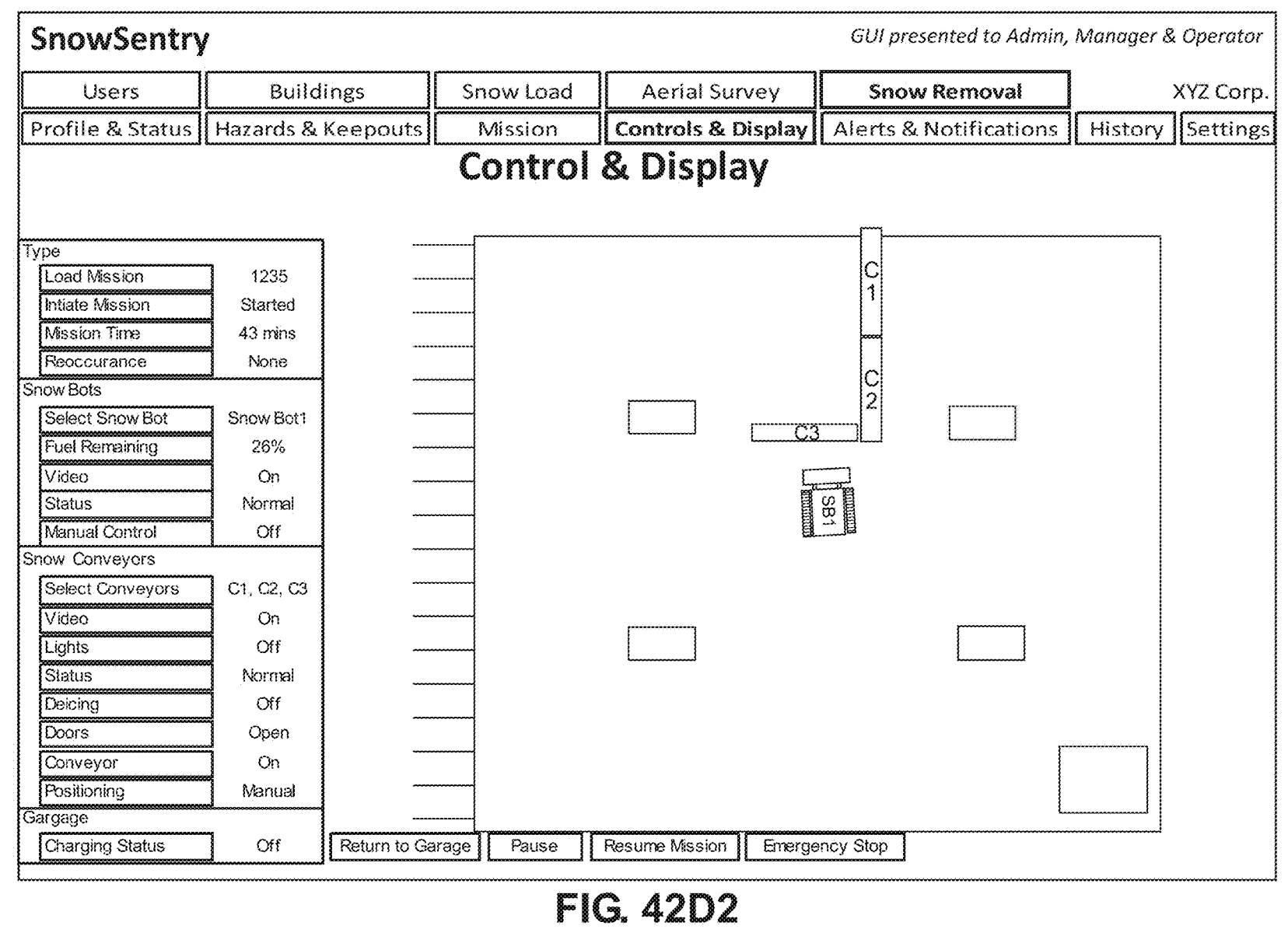

FIG. 42A is schematic representation of an exemplary graphical user interface (GUI) showing the primary interface objects showing pull-down menus for managing Users, Buildings, Snow Load, Ariel Survey and Snow Removal, wherein the Snow Removal pull-down menu was selected to show the Profile & Status GUI for displaying the Profile and Status associated with Robotic Snow Removers, Garage and Snow Conveyors associated with a Building associated with a client user account maintained and supported on the system network of the present invention;

FIG. 42B1 is schematic representation of an exemplary graphical user interface (GUI) showing the primary interface objects showing pull-down menus for managing Users, Buildings, Snow Load, Ariel Survey and Snow Removal, wherein the Snow Removal pull-down menu was selected to show the Hazards & Keepout GUI for displaying the Hazards & Keepouts (before selection) associated with a specific Building assigned to a specific client user account maintained and supported on the system network of the present invention;

FIG. 42B2 is schematic representation of an exemplary graphical user interface (GUI) showing the primary interface objects showing pull-down menus for managing Users, Buildings, Snow Load, Ariel Survey and Snow Removal, wherein the Snow Removal pull-down menu was selected to show the Hazards & Keepouts GUI for displaying the Hazards & Keepouts associated with a specific Building assigned to a client user account maintained and supported on the system network of the present invention;

FIG. 42C is schematic representation of an exemplary graphical user interface (GUI) showing the primary interface objects showing pull-down menus for managing Users, Buildings, Snow Load, Ariel Survey and Snow Removal, wherein the Snow Removal pull-down menu was selected to show the Mission GUI for displaying the Mission associated with a specific Building assigned to a client user account maintained and supported on the system network of the present invention;

FIG. 42D1 is schematic representation of an exemplary graphical user interface (GUI) showing the primary interface objects showing pull-down menus for managing Users, Buildings, Snow Load, Ariel Survey and Snow Removal, wherein the Snow Removal pull-down menu was selected to show the Controls & Display GUI for displaying the Control & Display associated with a specific client user account maintained and supported on the system network of the present invention;

FIG. 42D2 is schematic representation of an exemplary graphical user interface (GUI) showing the primary interface objects showing pull-down menus for managing Users, Buildings, Snow Load, Ariel Survey and Snow Removal, wherein the Snow Removal pull-down menu was selected to show the Controls & Display GUI for displaying the Control & Display associated with a specific client user account maintained and supported on the system network of the present invention;

FIG. 42E is schematic representation of an exemplary graphical user interface (GUI) showing the primary interface objects showing pull-down menus for managing Users, Buildings, Snow Load, Ariel Survey and Snow Removal, wherein the Snow Removal pull-down menu was selected to show the Alerts & Notifications GUI for displaying the Alerts & Notifications associated with a specific client user account maintained and supported on the system network of the present invention;

FIG. 42F is schematic representation of an exemplary graphical user interface (GUI) showing the primary interface objects showing pull-down menus for managing Users, Buildings, Snow Load, Ariel Survey and Snow Removal, wherein the Snow Removal pull-down menu was selected to show the History GUI for displaying the History and Viewer associated with a specific client user account maintained and supported on the system network of the present invention;

FIG. 42G is schematic representation of an exemplary graphical user interface (GUI) showing the primary interface objects showing pull-down menus for managing Users, Buildings, Snow Load, Ariel Survey and Snow Removal, wherein the Snow Removal pull-down menu was selected to show the Settings GUI for displaying the Settings associated with a specific client user account maintained and supported on the system network of the present invention;

FIG. 43 is a flow chart describing the high level steps carried out when practicing the method of rooftop snow depth profiling using unmanned snow depth measuring aircraft systems (i.e. Snowdrone™ Systems) deployed within the BIGADS system, comprising the steps of (a) deploying a unmanned snow depth measuring aircraft system (i.e. Snowdrone™ System) registered with the BIGADS system, to profile the snow depth of a particular building rooftop, (b) selecting and enabling a non-contact unmanned snow depth measuring method on the unmanned snow depth measuring aircraft system, (c) collecting GPS-indexed snow depth profile data from the building rooftop, (d) transmitting collected GPS-indexed snow depth to the database server of the data center of the BIGADS system of the present invention, and (d) using a Web Browser to request and review snow depth profile data for a specified building rooftop;

FIG. 44 is a flow chart describing the high-level steps carried out when practicing the method of forecasting the weather conditions at locations of specific buildings registered on a user account on the system network, comprising the steps of (a) accessing and processing historical weather data recorded in weather databases and creating a building weather database for a particular building being managed by the BIGADS system, (b) collecting and storing local weather data from rooftop-mounted snow load measuring stations (SLMS) and adding this data to the building weather database for the specified building registered in the BIGADS system, (c) collecting GPS-indexed snow depth profile data from the building rooftop, and add this snow depth profile data to the building weather database, (d) analyzing the data contained in the building weather database to identify patterns and trends useful for predicting and weather forecasting, and (e) Using a Web browser to request weather forecast reports based on data collected and processed in the building weather database, and using such reports to plan a course of action relating to expected requirements of rooftop snow load management during a particular time period;

FIG. 45 is a schematic representation illustrating the primary models (i.e. a 3D Rooftop Geometry Model (3DRGM) and a Building Rooftop Snow-Load State Model (BRSSM)), supporting the development of the BIGADS system and other automated building rooftop snow load monitoring and removal systems of the present invention;

FIGS. 46A, 46B and 46C, taken together, set forth a flow chart describing the high-level steps carried out when practicing the method of designing, installing, deploying and operating an automated building rooftop snow load monitoring and removal system of the present invention, comprising the steps of comprising (a) during a pre-design and pre-installation phase, surveying and modeling rooftop building conditions, (b) during a design phase, developing 3D Rooftop Geometry Model (3DRGM) specifying various rooftop building parameters (i.e. rooftop boundary conditions, snow load measurement zones rated in pressure (i.e. 30 PSF), structures (e.g. antennas, cooling towers, walls, mechanical rooms, etc.), key areas of high snow depth, placement of SLMS stations and other sensors, placement of IP gateway (IPG) unless stations are using cellular connections at which time no IPG is required, passive depth marker placement, (i.e. stations having graduations on masts and antennas), parking locations for snow removal robot systems, placement of snow conveyor tunnel systems, hanger placement for unmanned snow depth measuring aircraft, portable rooftop navigation terminal deployment, and VR-guided snow removal robot navigation and control stations), (c) generating a Building Rooftop Snow-Load State Model (BRSSM) using current 3DRGM (loads and asset locations at any point in time), (d) constructing and installing an automated building rooftop snow monitoring and removal system (ABRSMRS) based on the BRSSM generated for the specified building rooftop placement and assemble of wireless SLMSs on the building rooftop, (e) deploying, testing, calibrating and adjusting the system, (f) initializing the system, (g) maintaining and updating the system, (h) sending weather forecast snow alerts, (i) automatically detecting excessive snow load events and generating and transmitting snow load alarm notifications/messages to all responsible member of the building management/maintenance team, (j) responding to snow load events by executing a snow load removal plan, and (k) sending snow load removal confirmations to building managers when the snow load removal plan has been completed;

FIGS. 47A and 47B, taken together, is a flow chart describing the high-level steps carried out when practicing the method of detecting, communicating, responding to, and resolving snow load alarm conditions on a building associated with a user account on the system network of a building intelligence gathering, assessment and decision-support (BIGADS) system, comprising the steps of (a) deploying a plurality of snow load monitoring systems (SLMS) on the surface of a specified building rooftop and configuring these SLMSs to the system network of the BIGADS system, (b) deploying a VR-guided snow removing robot system on the surface of a specified building rooftop and configuring the VR-guided snow removing robot system to the system network of the BIGADS system, (c) deploying a VR-enabled control station for remotely operating the VR-guided snow removing robot system on the surface of the specified building rooftop and configuring the VR-enabled control station to system network of the BIGADS system, (d) registering a team of building management and/maintenance members with a user account maintained on the system network of the BIGADS system, (e) in response to at least one of the VR-guided snow removing robot system automatically detecting a snow load at a specified region of the rooftop that exceeds a preset threshold, generating and transmitting a snow load alarm notification to all team members, (f) at least one team member responding to the snow load alarm notification by creating a Snow Removal Plan requiring the use of the VR-guided snow removing robot system to remove the snow load alarm condition on the rooftop under the remote control of a specified VR-enabled control station, and (g) after completing the snow removal plan and removing the snow load alarm condition, generating and transmitting a snow load removal confirmation to all team members;

FIGS. 48A and 48B, taken together, show a flow chart describing the high-level steps carried out when practicing the method of responding to snow load alarm notifications by making physical rooftop inspections using the hand-held AR-guided rooftop navigation and inspection systems of the present invention, comprising the steps of (a) receiving a snow load alarm notification from the building intelligence gathering, assessment and decision-support (BIGADS) system of the present invention illustrated in FIGS. 1A, 2A, et seq., (b) using a hand-held AR-enabled rooftop navigation and inspection system to navigate and inspect the building rooftop specified in the snow load alarm notification, (c) recording the navigation and inspection of the building rooftop, including recorded annotations by the human operator/building inspector, and transmitting the annotated video recording to a database server maintained at the data center of the BIGADS system, (d) others on the building management and maintenance team using a Web browser to access the database server and review the annotated recording of the building rooftop inspection report made by the inspector using the AR-enabled rooftop navigation and inspection system;

FIG. 49 is a flow chart describing the high-level steps carried out when practicing the method of responding to snow load alarm notifications by deploying a snow load measuring aircraft (i.e. Snowdrone™ Systems) to the building for remote aerial inspection and intelligence collection operations for review by remotely situated building managers, comprising the steps of (a) a building management team member receiving a snow load alarm notification from a building intelligence gathering, assessment and decision-support (BIGADS) system, (b) deploying an unmanned snow depth measuring aircraft system (SDMS) registered with the building, to navigate and inspect the building rooftop specified in the snow load alarm notification and compare snow depth measurements against measured snow load conditions at the specified rooftop location, (c) capturing a digital video recording and snow depth measurements around and about the snow load alarm region, and transmitting the recording to a database server maintained at the data center of the BIGADS system, (d) others on the building management and maintenance team using a Web browser to access the database server and review the recording of the aerial building rooftop inspection made by the flying unmanned snow depth measuring aircraft system over the specified building rooftop;

FIGS. 50A and 50B, taken together, provides a flow chart describing the high-level steps carried out when practicing the method of removing specified snow loads on a rooftop using VR-guided robotically-controlled snow collection and removal systems illustrated in FIG. 4D remotely controlled and operated by a human operator using a remotely-located VR/AR-enabled computer workstation configured for remotely controlling the operation of the snow collecting and removing robot system on the building rooftop, comprising the steps of (a) installing VR-guided snow removing robot system on building rooftop, and configuring at least one VR-guided robot navigation and control station with the building intelligence gathering, assessment and decision-support system of the present invention, (b) receiving a rooftop snow load condition message from the building intelligence gathering, assessment and decision-support system, (c) using the VR-guided robot navigation and control station to remotely control the VR-guided snow removing robot system on building rooftop and remove the identified rooftop snow load condition specified in the rooftop snow load condition message, (d) sending a rooftop snow load condition removal notification from the VR-guided robot navigation and control station to the building intelligence gathering, assessment and decision-support system, (e) the building intelligence gathering, assessment and decision-support system transmitting the Rooftop snow load condition removal notification to members of the building management team, and (f) the building management team members updating the system database upon receiving rooftop snow load condition removal notification; and FIGS. 51A and 51B, taken together, provide a flow chart describing the high-level steps carried out when practicing the method of removing specified snow loads on a rooftop using AI-guided robotically controlled snow collection and removal systems (i.e. machines) illustrated in FIG. 4E remotely controlled and operated by an AI-based navigational control server (NCS), comprising the steps of (a) installing at least one AI-guided snow removing robot system on building rooftop, and configuring an AI-based NCS within the system network of the building intelligence gathering, assessment and decision-support system of the present invention, (b) receiving a rooftop snow load condition message from the building intelligence gathering, assessment and decision-support system, (c) using the AI-based NCS to remotely control the AI-guided snow removing robot system on building rooftop and remove the identified rooftop snow load condition specified in the rooftop snow load condition message, (d) sending a rooftop snow load condition removal notification from the AI-based NCS to the building intelligence gathering, assessment and decision-support system, (e) the building intelligence gathering, assessment and decision-support system transmitting the rooftop snow load condition removal notification to members of the building management team, and (f) the building management team members updating the system database upon receiving rooftop snow load condition removal notification.

DETAILED DESCRIPTION OF THE ILLUSTRATIVE EMBODIMENTS OF THE PRESENT INVENTION

Referring to the figures in the accompanying Drawings, the illustrative embodiments of the system and will be described in great detail, wherein like elements will be indicated using like reference numerals.

Brief Overview on Intelligence Gathering, Assessment and Decision-Support Operations in Human Society The gathering or collection and assessment of intelligence (i.e. information) by groups of people represent discipline efforts in the fight for human survival and progress.

Clearly, the definition and classification of "intelligence" is constantly changing in step with advancements in human knowledge and understanding. Currently, in the USA, intelligence is classified into a large but manageable number of categories denoted by acronyms including, for example: HUMINT; GEOINT; MASINT; OSINT; SIGINT; TECHINT; CYBINT/DNINT; FININT; and OPTRINT. Insight into the scope of human knowledge and understanding can be quickly gained from a brief summary of these information classifications.

HUMINT stands for Human Intelligence gathered from a person on the ground. This classification includes means such as espionage, friendly accredited diplomats, military attaches, non-governmental organizations (NGOs), patrolling (military police, patrols, etc.) prisoners of war, (POWs or detainees), refugees, strategic reconnaissance as by special forces, and traveler debriefing (e.g. CIA Domestic Contact Service).

GEOINT stands for geospatial Intelligence gathered from satellite, aerial photography, mapping/terrain data. This classification includes Imagery Intelligence, gathered from satellite and aerial photography.

MASINT stands for Measurement and Signature Intelligence collected or gathered using electro-optical, nuclear, geophysical, radar, material, and radiofrequency intelligence gathering means.

OSINT stands for intelligence gathered from open sources which can be further segmented by source type; Internet/General, Scientific/Technical and various HUMINT specialties (e.g. trade shows, association meetings, interviews, etc.).

SIGINT stands for Signals Intelligence gathered from interception of signals, including COMINT—communications intelligence, ELINT—Electronic Intelligence: gathered from electronic signals that do not contain speech or text (which are considered COMINT), and FISINT—Foreign Instrumentation Signals Intelligence, was formerly known as TELINT or Telemetry Intelligence. TELINT entails the collection and analysis of telemetry data from the target's missile or sometimes from aircraft tests.

TECHINT stands for Technical Intelligence gathered from the analysis of weapons and equipment used by the armed forces of foreign nations, or environmental conditions. This includes MEDINT—Medical Intelligence gathered from analysis of medical records and/or actual physiological examinations to determine health and/or particular ailments/allergenic conditions for consideration.

CYBINT/DNINT stands for Cyber Intelligence/Digital Network Intelligence gathered from Cyber Space.

FININT stands for Financial Intelligence gathered from analysis of monetary transactions.

OPTRINT stands for Optronic Intelligence, an intelligence gathering discipline that collects and processes information gathered by laser and night vision equipment Notably, many of these disciplines overlap, and some subsume others. For example Meteorological Intelligence is defined as information measured, gathered, compiled, exploited, analyzed and disseminated by meteorologists, climatologists and hydrologists to characterize the current state and/or predict the future state of the atmosphere at a given location and time. Meteorological intelligence is a subset of Environmental Intelligence and is synonymous with the term Weather Intelligence.

Also, much can be learned from studying 'Military intelligence', the military discipline that uses information collection and analysis approaches to provide guidance and direction to commanders in support of their decisions. This discipline achieves its goals by providing an assessment of data from a range of sources, directed towards the commanders' mission requirements, or responding to questions as part of operational or campaign planning. In order to provide an analysis, the commander's information requirements are first identified. These information requirements are then incorporated into intelligence collection, analysis, and dissemination operations.

In view of the above, a primary object of the present invention is to provide an Internet-based system network that supports automated and semi-automated building rooftop intelligence gathering, assessment and decision-support operations so that building managers and maintenance personnel can make more informed, intelligent and timely decisions that reduce the risk of loss of property and life in connection with the management and operation of specific building properties located anywhere around the world. These goals and objectives will become more apparent hereinafter as the system and methods of the present invention are described in great technical detail hereinbelow.

Overview on the Building Intelligence Gathering, Assessment and Decision-Support (BIGADS) System of the Present Invention The building intelligence gathering, assessment and decision-support (BIGADS) system of the present invention 1 illustrated in FIGS. 1A through 46 is designed to help building management team members in five (5) unique ways: (i) predict and forecast when excessive snow load conditions present serious risks to a building's structure; (ii) receive automatic notifications when snow load conditions are developing at specific regions on a building rooftop to warrant inspection and possibly automated mitigation through the use of VR-guided snow removing robot systems, or other suitable means available at the building rooftop site; (iii) collect various forms of intelligence about conditions developing on and about a building rooftop and storing such information with annotations, for use in supporting intelligent decision making processes; (iv) quickly, safely and efficiently remove dangerous risk-presenting snow load conditions on a building rooftop while minimizing risk to human workers and increasing building operating efficiency; and (v) automatically remove excessive snow load conditions at specified regions on a building's rooftop.

The BIGADS 1 is also designed to help building owners and their investors in other significant ways, namely: (i) improve building maintenance worker safety; (ii) reduce the cost of maintaining a building in response to snow accumulation conditions, and (iii) reduce risk of property damage and worker injury; and (iv) reduce the risk of disruption of business and rental and/or operating income as a result of rooftop and other forms of structural damage caused by excessive snow loads and conditions caused thereby. When using the system network of the present invention, building owners, occupants, property managers and maintenance personnel can align their activities and interests while reducing risks of property damage and human injury.

By design, the system network can be readily integrated with (i) conventional building management systems, (ii) police and fire department emergency response networks, and (iii) other systems and networks, to support the goals and objectives of the present invention.

Figure 1B:
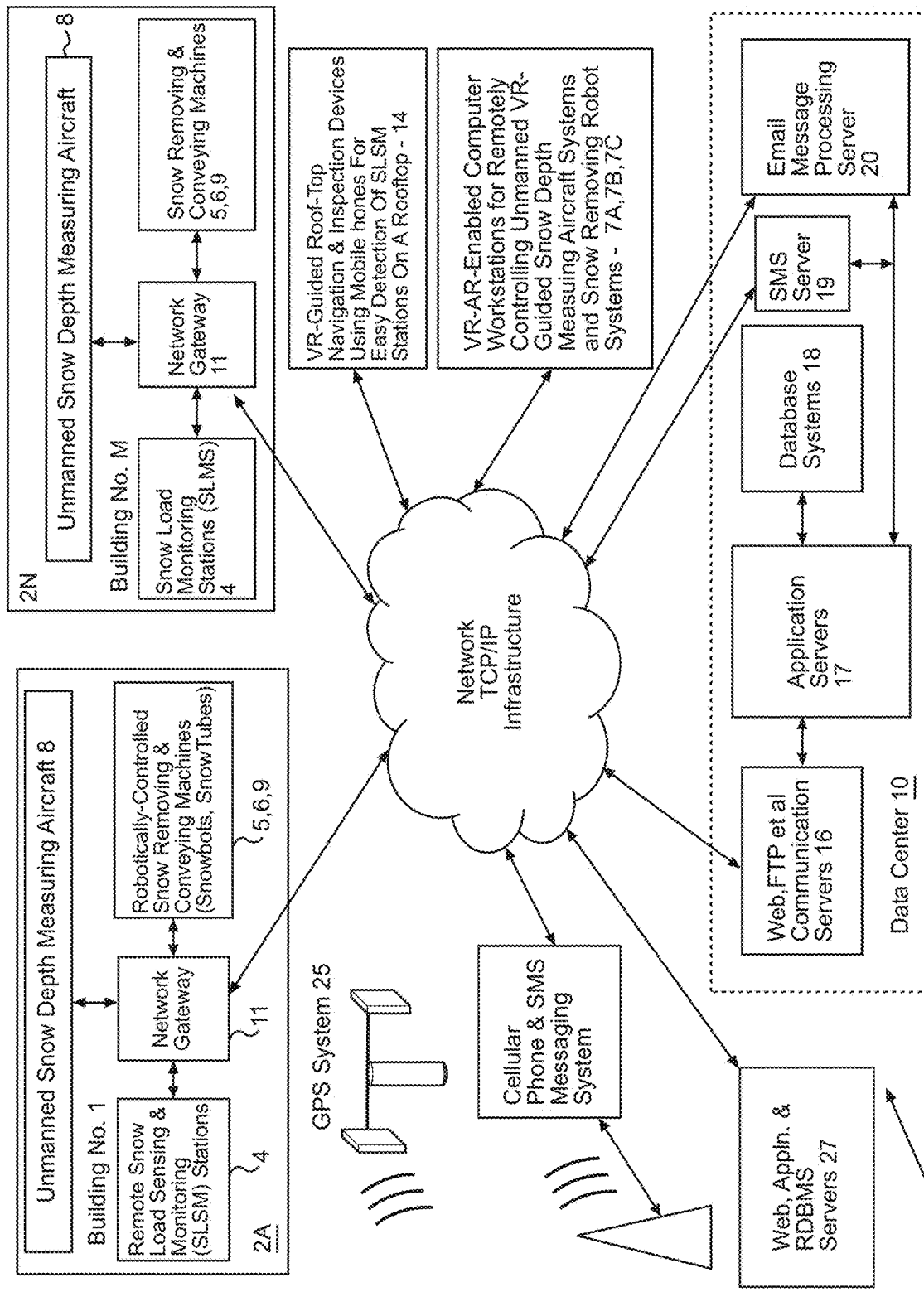
Figure 1C:
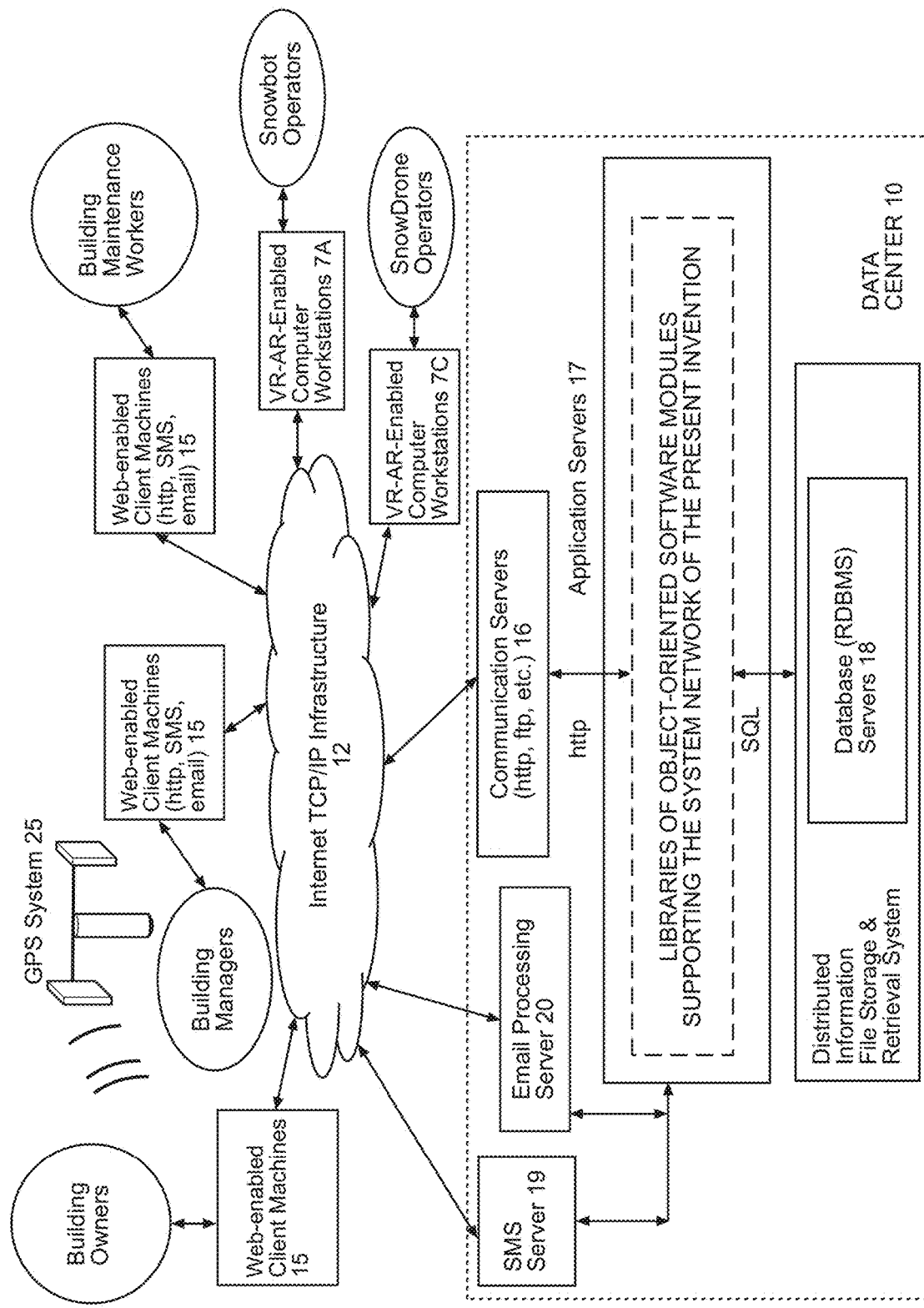

Overview of the Building Intelligence Gathering, Assessment and Decision-Support (BIGADS) System of the Present Invention FIGS. 1A, 1B and 1C, taken together, show the building intelligence gathering, assessment and decision-support (BIGADS) system 1 deployed across a portfolio of buildings 2A, 2B . . . 2N, on the rooftops of which a network of snow load monitoring systems (SLMS) 4 are deployed, along with an automated building rooftop snow removal system (ABRSRS) 3.

As will described in greater detail hereinafter, the automated building rooftop snow removal system (ABRSRS) 3 comprises a number of subsystems integrated together around the BIGADS system 1, including, for example: (i) wireless snow load monitoring systems (i.e. stations) 4, 4' through 4''''''; (ii) one or more VR-guided snow removing robot systems (SRRS) 6; (iii) one or more automated snow conveying tunnel systems 5 installed and configured together on the rooftop surface of a specified building registered with the BIGADS system 1; (iv) flying unmanned snow depth measuring aircraft systems 8 having real-time snow depth measuring and profiling and digital video image capturing capabilities; (v) one or more VR/AR-enabled computer-based navigation and operation control stations 7A situated anywhere with Internet-access, for remotely controlling the navigation and operation of VR-guided snow removing robot systems 6 during rooftop snow removal operations; (vi) one or more VR/AR-enabled computer-based control stations 7B for remotely controlling the navigation and operation of VR-guided snow conveying systems 5 during rooftop snow transport operations, supported by a professional-grade DAQRI® AR helmet by DAQRI International, LTD. https://daqri.com/products/smart-helmet; (vii) one or more VR/AR-enabled computer-based control stations 7C for remotely controlling the navigation and operation of VR-guided snow depth measuring aircraft systems 8 during rooftop snow depth measuring, profiling and surveying operations; (viii) unmanned snow-melt pellets distribution system 9 for distributing snow-melting material to the surface of a building rooftop; and (ix) VR-enabled controls station 7D for controlling the navigation and operation of the snow-melt distribution system 9; (x) hand-held VR/AR-enabled rooftop navigation and inspection system 14; and a plurality of mobile Web-based client systems 15 running web browser and native application software to establish communication with the web, application and database servers within the data center 10. As shown, all such subsystems are integrated with and in communication with the communication, application and database servers maintained at the data center 10 and Internet (TCP/IP) infrastructure 12 of the system network of system 1, and are tracked in real-time using a GPS referencing system 25, and robust state monitoring technologies provided aboard each system component in the system network.

FIGS. 1B and 1C show other components of system network supporting the BIGADS system 1 comprising: wireless and wired building networks and subnetworks 26 with client and server systems interconnected therewith via TCP/IP; cellular phone and SMS messaging systems 21 deployed on the Internet, Web-enabled client machines (e.g. mobile computers, smartphones, laptop computers, workstation computers, etc.) 15; email server systems 9 and SMS servers 20; and web, application and database servers 16, 17 and 18 providing diverse and valuable information resources such as, for example, weather forecasting, financial market forecasting, social media, financial markets, and the like. Each of these subsystems will be described in greater technical detail hereinafter.

As shown in FIG. 1C, the various client systems and users thereof are connected to the system network supporting the BIGADS system 1. Such users include building owners, building management team members, building maintenance members, including operators of VR-guided/operated snow removing robot systems 6, and VR-guided snow depth measuring aircraft (drone) systems 8, as well as human inspectors using hand-held rooftop navigation and inspection systems 14 identified above. These system network users will have access to various kinds of client systems, including, for example, (i) Web-enabled client machines (e.g. mobile computers, smartphones, laptop computers, workstation computers, etc.) 15; (ii) hand-held VR/AR-enabled rooftop navigation and inspection devices 14 for rooftop navigation, inspection and intelligence gathering, assessment and decision-support processes; (iii) AR/VR-enabled control stations 7A for remotely controlling unmanned VR-navigated and controlled snow removing robot systems 6 deployed on building rooftops; (iv) AR/VR-enabled control stations 7C for remotely controlling VR-navigated and controlled snow depth measuring aircraft systems 8 deployed at specified building rooftops; and web, application and database servers 27 of diverse kinds of information resources such as, for example, weather forecasting, social media, financial markets, and the like.

Figure 2B:
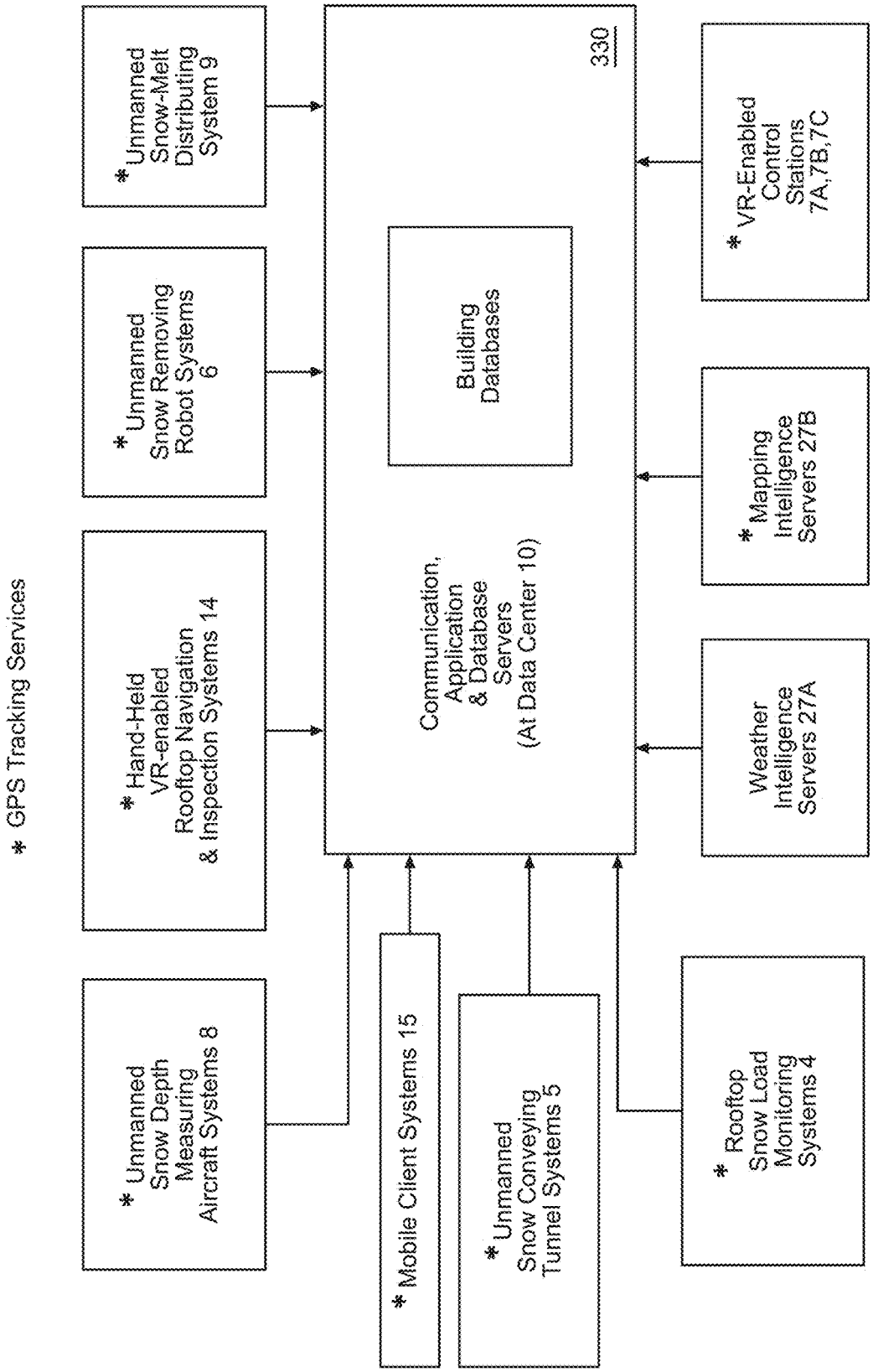
FIG. 2B is a schematic diagram illustrating the flow of various streams of intelligence (i.e. information) gathered by the communication, application and database servers in the data center of the BIGADS system, from the various subsystems that collect building rooftop intelligence, including, for example, rooftop snow load monitoring systems, unmanned snow depth measuring aircraft systems (i.e. drones), weather intelligence servers (e.g. weather reporting and forecasting services), mapping intelligence servers (e.g. map services), hand-held VR-enabled rooftop navigation and inspection systems, unmanned snow removing robot systems, unmanned snow conveying tunnel systems, and VR-enabled control stations.

FIG. 2B shows a Zigbee® wireless network deployed on a building rooftop to internetwork a set of wireless solar/battery powered snow load monitoring systems (SLMS) 4 (i.e. 4' through 4'''''') deployed as a wireless subnetwork 26 deployed on a building rooftop 2 as shown in FIG. 1A. While Zigbee® technology, using the IEEE 802.15.1 standard, is illustrated in this schematic drawing, it is understood that any variety of wireless networking protocols including Zigbee®, WIFI and other wireless protocols can be used to practice various aspects of the present invention, Zigbee® offers low-power, redundancy and low cost which will be preferred in many, but certainly not all applications of the present invention. In connection therewith, it is understood that those skilled in the art know how to make use of various conventional networking technologies to interconnect the various wireless subsystems and systems of the present invention, with the internet infrastructure employed by the BIGADS system of the present invention 1.

As shown in FIG. 2C, during operation of the BIGADS system 1, various streams of building rooftop intelligence (i.e. information) are simultaneously collected by rooftop snow load monitoring systems 4, unmanned snow depth measuring aircraft systems (i.e. drones) 8, weather intelligence servers 27A, mapping intelligence servers 27B, hand-held VR-enabled rooftop navigation and inspection systems, unmanned snow removing robot systems 6, unmanned snow conveying tunnel systems 5, snow/ice-melt pellet distributing/spreading systems 9, and VR-enabled control stations 7A through 7D, and flow into the communication and application and servers of the data center of the BIGADS system, and ultimately stored in the system database servers 18. Once stored in the database server, such information is processed by the application servers 17 in accordance with the present invention, and made accessible to system users who have user accounts with the system network. Typically, most users will download and install a Web based application, or a native client application developed their mobile phones or computing devices so they can access the various services supported on the BIGADS system 1.

In general, most streams of captured intelligence will be time and data stamped, as well as GPS-indexed by a local GPS receiver, so that the time and source of origin of each data package is recorded within the system database. The GPS referencing system 25 supporting the BIGADS system 1 transmits GPS signals from satellites to the Earth's surface, and local GPS receivers located on each networked device or machine on the system network receive the GPS signals and compute locally GPS coordinates indicating the location of the networked device within the GPS referencing system 25.

Specification of the Network Architecture of the System Network of the Present Invention Referring to FIG. 1B, illustrates the network architecture of system network of the present invention 1 for the case where the system of the present invention is implemented as a stand-alone platform designed to work independent from but alongside of one or more networks deployed on the Internet. As shown in FIG. 1B, the Internet-based system network 1 is shown comprising various system components, including an cellular phone and SMS messaging systems 19, and one or more industrial-strength data centers 10, preferably mirrored with each other and running Border Gateway Protocol (BGP) between its router gateways, and each data center 10 comprising: a cluster of communication servers 16 for supporting http and other TCP/IP based communication protocols on the Internet; cluster of application servers 17; a cluster of email processing servers 20; cluster of SMS servers 19; and a cluster of RDBMS servers 18 configured within an distributed file storage and retrieval ecosystem/system 22, and interfaced around the TCP/IP infrastructure of the Internet 12 well known in the art. As shown, the system network architecture further comprises; a plurality of video and other media servers 22 (e.g. NOAA, Google, Facebook, etc.) operably connected to the infrastructure of the Internet 12; a plurality of Web-enabled client machines 15 (e.g. desktop computers, mobile computers such as iPad, and other Internet-enabled computing devices with graphics display capabilities, etc.) running native mobile applications and mobile web browser applications supported modules supporting client-side and server-side processes on the system network of the present invention.

In general, regardless of the method of implementation employed in any particular embodiment, the system of the present invention will be in almost all instances realized as an industrial-strength, carrier-class Internet-based network of object-oriented system design. Also, the system will be deployed over a global data packet-switched communication network comprising numerous computing systems and networking components, as shown. As such, the information network of the present invention is often referred to herein as the "system" or "system network". The Internet-based system network can be implemented using any object-oriented integrated development environment (IDE) such as for example: the Java Platform, Enterprise Edition, or Java EE (formerly J2EE); Web sphere IDE by IBM; Weblogic IDE by BEA; a non-Java IDE such as Microsoft's .NET IDE; or other suitably configured development and deployment environment well known in the art. Preferably, although not necessary, the entire system of the present invention would be designed according to object-oriented systems engineering (DOSE) methods using UML-based modeling tools such as ROSE by Rational Software, Inc. using an industry-standard Rational Unified Process (RUP) or Enterprise Unified Process (EUP), both well known in the art. Implementation programming languages can include C, Objective C, C⁻, Java, PHP, Python, Google's GO, and other computer programming languages known in the art. Preferably, the system network is deployed as a three-tier server architecture with a double-firewall, and appropriate network switching and routing technologies well known in the art.

Referring to FIG. 1B, the system architecture of the present invention is shown comprising: (i) a cluster of communication servers 3 (supporting http and other TCP/IP based communication protocols on the Internet and hosting Web sites) accessed by web-enabled clients (e.g. smart phones, wireless tablet computers, desktop computers, control stations, etc.) 15 used by individuals users, brand managers and team members, and consumers, through the infrastructure of the Internet; (ii) a cluster of application servers 17 for implementing the many core and compositional object-oriented software modules supporting the system network of the present invention, (iii) a scalable, distributed computing and data storage system network, including a cluster of RDBMS servers 18; web-enabled client SMS gateway servers 19 supporting integrated email and SMS messaging, handling and processing services that enable flexible messaging across the system network; and a cluster of email processing servers 20; and other servers, processors, databases, and data centers, arranged and configured in accordance with the principles of the present invention as taught herein.

Specification of Database Schema for the Database Component Used on the System Network of the Present Invention During the design and development of the system network, a data schema will be created for the object-oriented system-engineered (DOSE) software component thereof, for execution on a client-server architecture. In general, the software component of the system network will consist of classes, and these classes can be organized into frameworks or libraries that support the generation of graphical interface objects within GUI screens, control objects within the application or middle layer of the enterprise-level application, and enterprise or database objects represented within the system database (RDBMS) 18. Preferably, the RDBMS will be structured according to a database schema comprising enterprise objects, represented within the system database (e.g. RDBMS), and including, for example: building owner; building manager; building insurer; system user ID; building ID, building location; building property value; vehicle ID for unmanned VR-guided snow removing robot system 6; vehicle ID for identifying each unmanned snow depth measuring aircraft system 8 deployed on the system network; client device ID for identifying each hand-held AV/VR-enabled rooftop navigation and inspection device 14 deployed on the system network; client workstation ID for identifying each VR-enabled computer workstation deployed on the system network for remotely controlling one or more deployed unmanned VR-guided snow load measuring aircraft systems 6; client workstation ID for identifying each VR-enabled computer workstation 7A deployed on the system network for remotely controlling one or more unmanned VR-guided snow removing robot systems 6; and many other objects used to model the many different aspects of the system being developed. These objects and the database schema will be used and reflected in a set of object-oriented software modules developed for the system. Each software module contains classes (written in an object-oriented programming language) supporting the system network of the present invention including, for example, the user registration module, unmanned VR-enabled snow removing system registration module, unmanned snow depth measuring aircraft registration module, remote VR-enabled control-station registration module, hand-held rooftop navigation/inspection system registration module, user account management module, log-in module, settings module, contacts module, search module, data synchronization module, help module, and many other modules supporting the selection, delivery and monitoring of building-related services supported on the system network of the present invention.

Different Ways of Implementing the Client Machines and Devices on the System Network of the Present Invention In one illustrative embodiment, the enterprise-level system network of the present invention is supported by a robust suite of hosted services delivered to (i) Web-based client subsystems 15 using an application service provider (ASP) model, and also to (ii) unmanned VR-guided snow depth measuring aircraft systems 8, (iii) unmanned VR-guided snow removing robotic systems 6, (iv) AR-enabled hand-held rooftop navigation and inspection systems 14, and (v) remotely-situated VR-enabled control-stations 7A, 7B, 7C for remotely controlling unmanned VR-guided snow removing robot systems 6 as well as unmanned VR-guided snow depth measuring aircraft systems 8, and snow conveying tunnel subsystems 5, described above. In this embodiment, the Web-enabled mobile clients 15 can be realized using a web-browser application running on the operating system (OS) of a computing device 15 (e.g. Linux, Application IOS, etc.), to support online modes of system operation. It is understood, however, that some or all of the services provided by the system network can be accessed using Java clients, or a native client application running on the operating system (OS) of a client computing device 6, 8, 14 and 15, to support both online and limited off-line modes of system operation.

Figure 1D:
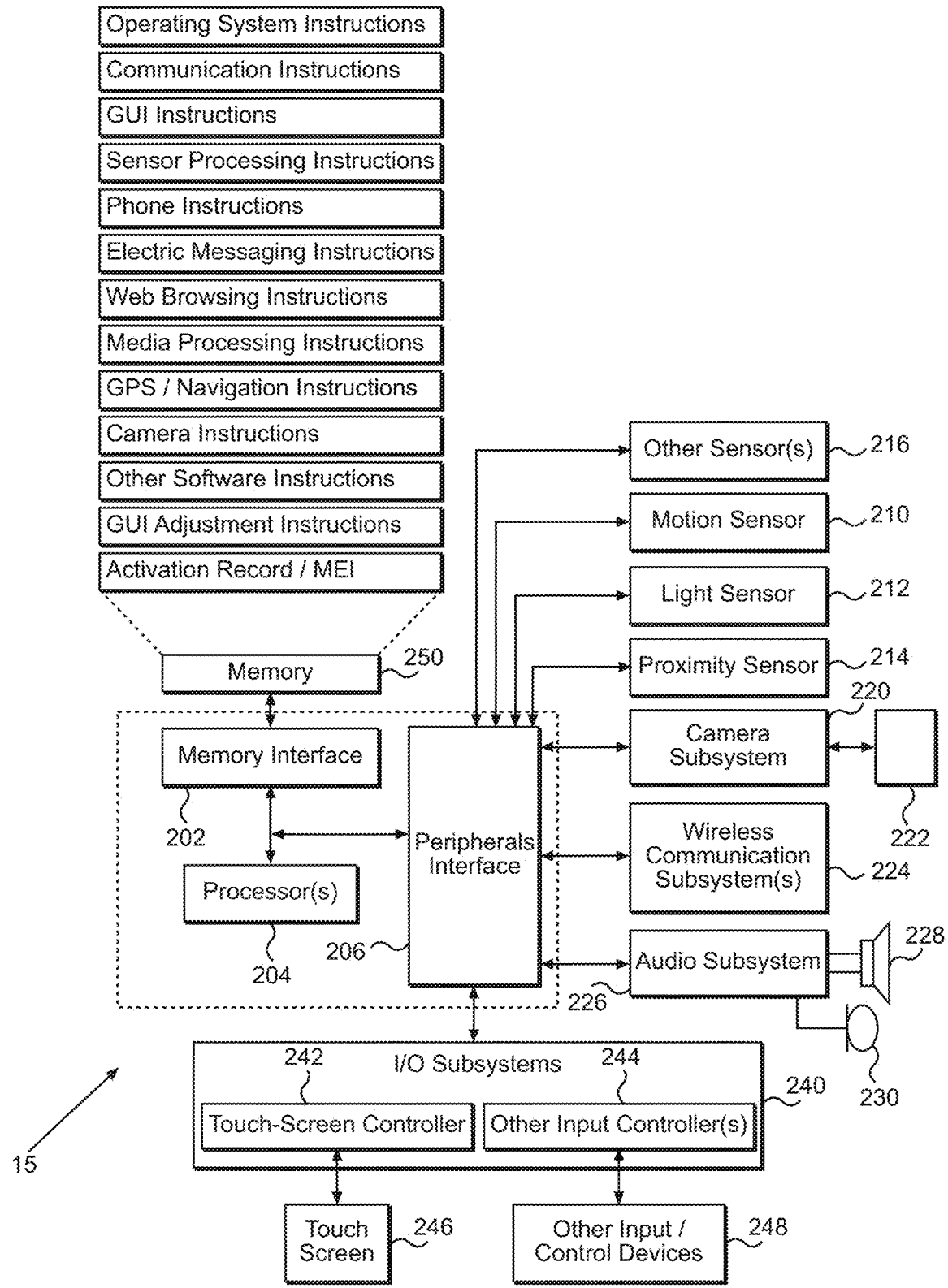
FIG. 1D illustrates the system architecture of an exemplary mobile client system (e.g. device) deployed on the system network of the present invention and supporting the many services offered by system network servers.

Specification of System Architecture of an Exemplary Mobile Client System Deployed on the System Network of the Present Invention FIG. 1D illustrates the system architecture of an exemplary mobile client system (e.g. device) 15 deployed on the system network of the present invention and supporting the many services offered by system network servers. As shown, the mobile device 15 can include a memory interface 202, one or more data processors, image processors and/or central processing units 204, and a peripherals interface 206. The memory interface 202, the one or more processors 204 and/or the peripherals interface 206 can be separate components or can be integrated in one or more integrated circuits. One or more communication buses or signal lines can couple the various components in the mobile device. Sensors, devices, and subsystems can be coupled to the peripherals interface 206 to facilitate multiple functionalities. For example, a motion sensor 210, a light sensor 212, and a proximity sensor 214 can be coupled to the peripherals interface 206 to facilitate the orientation, lighting, and proximity functions. Other sensors 216 can also be connected to the peripherals interface 206, such as a positioning system (e.g., GPS receiver), a temperature sensor, a biometric sensor, a gyroscope, or other sensing device, to facilitate related functionalities. A camera subsystem 220 and an optical sensor 222, e.g., a charged coupled device (CCD) or a complementary metal-oxide semiconductor (CMOS) optical sensor, can be utilized to facilitate camera functions, such as recording photographs and video clips. Communication functions can be facilitated through one or more wireless communication subsystems 224, which can include radio frequency receivers and transmitters and/or optical (e.g., infrared) receivers and transmitters. The specific design and implementation of the communication subsystem 224 can depend on the communication network(s) over which the mobile device 8B, 8C is intended to operate. For example, a mobile device 100 may include communication subsystems 224 designed to operate over a GSM network, a GPRS network, an EDGE network, a Wi-Fi or WiMax network, and a Bluetooth™ network. In particular, the wireless communication subsystems 224 may include hosting protocols such that the device 100 may be configured as a base station for other wireless devices. An audio subsystem 226 can be coupled to a speaker 228 and a microphone 230 to facilitate voice-enabled functions, such as voice recognition, voice replication, digital recording, and telephony functions. The I/O subsystem 240 can include a touch screen controller 242 and/or other input controller(s) 244. The touch-screen controller 242 can be coupled to a touch screen 246. The touch screen 246 and touch screen controller 242 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 246. The other input controller(s) 244 can be coupled to other input/control devices 248, such as one or more buttons, rocker switches, thumb-wheel, infrared port, USB port, and/or a pointer device such as a stylus. The one or more buttons (not shown) can include an up/down button for volume control of the speaker 228 and/or the microphone 230. Such buttons and controls can be implemented as a hardware objects, or touch-screen graphical interface objects, touched and controlled by the system user. Additional features of mobile computing device 15 can be found in U.S. Pat. No. 8,631,358 incorporated herein by reference in its entirety.

Different Degrees of Administrative Control can be Granted Over Services Supported on the System Network of the Present Invention As will be appreciated hereinafter, different degrees of administrative control can be granted over the delivery of rooftop related snow load monitoring, removal and related services supported on the system network during the various phases in the building life-cycle.

On the system network of the present invention, a building manager can open a user account and deploy custom configurations of snow load monitoring systems 4 through 4″, VR-operated or AI-operated snow removing robot systems, AR-navigated or AI-navigated snow depth measuring aircraft systems 8, remotely-controlled snow conveying tunnel/tube systems 5, AR-enabled mobile rooftop navigation and inspection systems 14, and VR-enabled control stations 7A, 7B, 7C for remotely controlling and operating VR-guided snow removing robot systems 6, snow depth measuring aircraft systems 8, and the like, for any particular building whose construction may not yet be completed and received a certificate of occupancy. During the construction phase of a building, all kinds of useful intelligence (i.e. information) can be gathered, assessed and shared among members of a building management team for use in various decision-support processes.

During the building's operational stage, the building managers can deploy under its user account, a Building Rooftop Intelligence Gathering, Assessment and Decision-Support System 1 customized for specified building whose construction has been completed, and received its certificate of occupancy. At this stage of building operation, all kinds of useful intelligence can be gathered, assessed and shared among members of a building management team for use in various decision-support processes.

The above-described methods of building administration will be supported during the registration process, and also during subsequent account administration management processes supported on the system network for each system user.

Figure 3A:
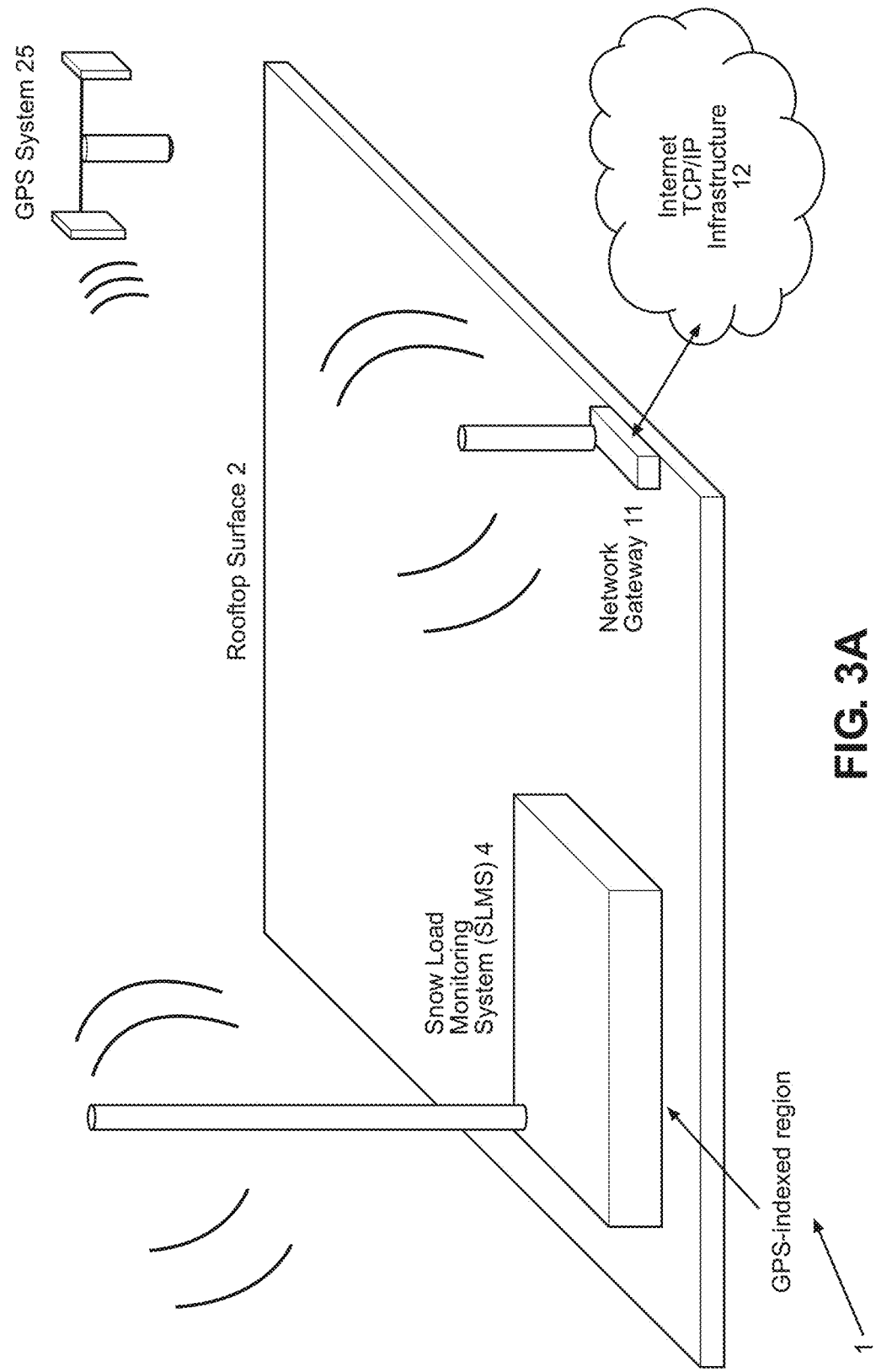
FIG. 3A is a perspective view of a generalized embodiment of the snow load monitoring system (i.e. station) of the present invention deployed on a GPS-indexed region of a building rooftop, as illustrated in FIG. 1A, while networked with the wireless communication network deployed on the rooftop.

Specification of Generalized Illustrative Embodiment of the Snow Load Monitoring System of the Present Invention FIG. 3A shows a generalized embodiment of the snow load monitoring system (i.e. station) 4 deployed on a GPS-indexed region of a building rooftop 2, as illustrated in FIG. 1, while networked with the wireless rooftop communication network having a network gateway 11, and operably connected to the TCP/IP infrastructure of the Internet. While this drawing shows only a single wireless snow load monitoring system (SLMS) 4 for purpose of illustration, it is understood that typical rooftop installations will involve a network of snow load monitoring stations 4 placed strategically on a building rooftop 2, as illustrated in FIG. 2B, to sense and measure in real-time the physical load (measured in PSF) experienced by a region of rooftop in response to snow accumulations over that region. How best to strategically place these snow load monitoring stations 4 will be discussed in greater detail hereinafter during the design phase of a system network, with reference to FIGS. 46A through 46C.

During snow load monitoring station operation, the force imposed on the weigh plate by the snow at any given moment in time is transferred through the weigh plate to the force sensor(s) so as to generate an electrical signal that is calibrated to provide an accurate representation of the magnitude of the force applied by the gravitational load on the weigh plate. At the same time, the wind speed and direction instrument measures these wind characteristics and generate electrical signal(s) encoded with such wind-related information. The temperature sensors (and barometric pressure sensors if provided) also take environmental measurements and encode such gathered information onto electrical signals. All of these electrical signals are transmitted to the microprocessor/microcontroller for processing and encoding onto the digital carrier signal generated by the communication module of the station, for wireless transmission communication, application and database servers maintained at the data center 10 of the system. Digital images are also captured periodically by onboard digital cameras and transmitted to the programmed microprocessor (i.e. subsystem controller) for storage and processing to support the various services delivered over the system network of the present invention.

Figure 3B:
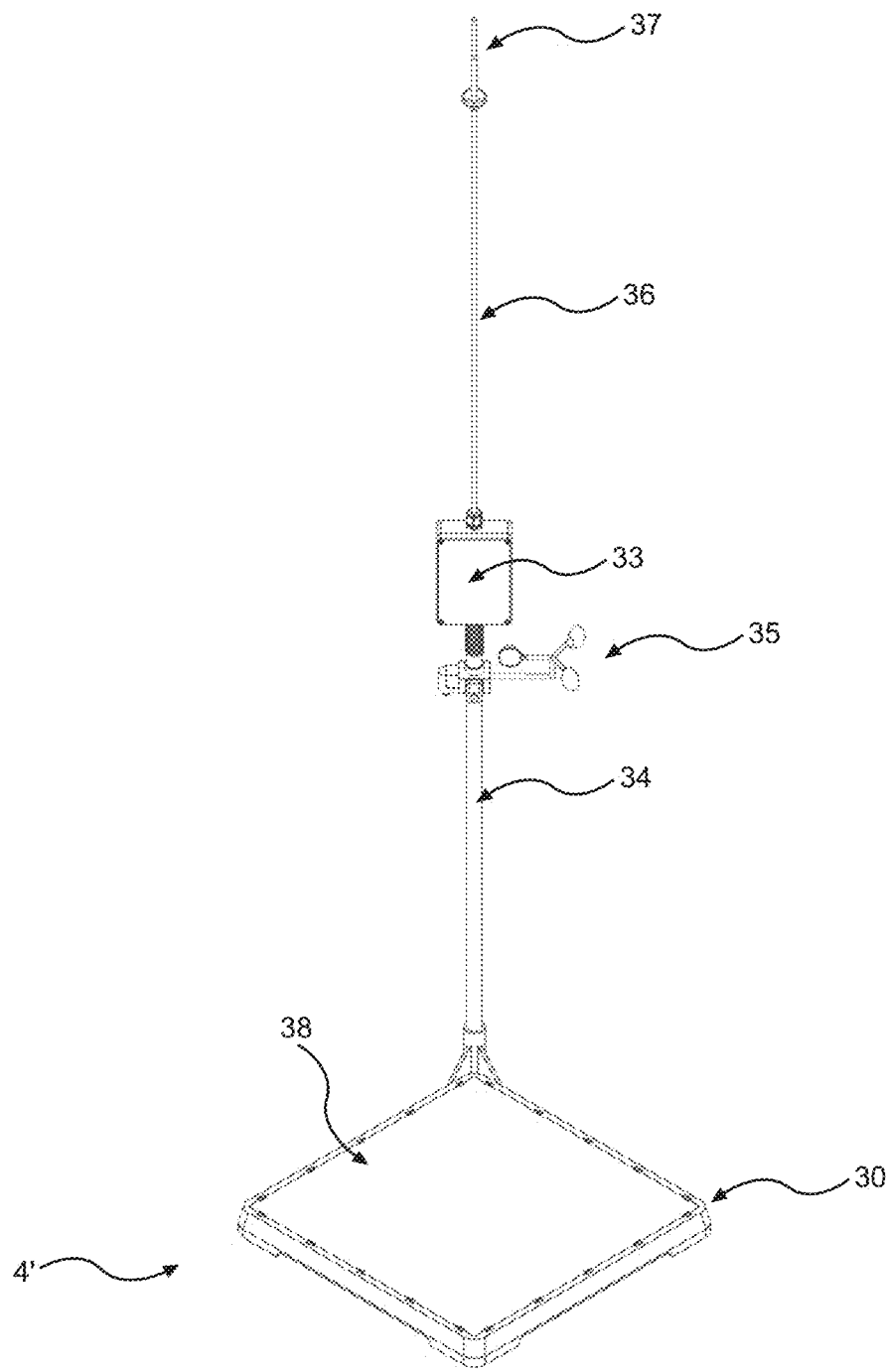
FIG. 3B is a perspective view of a first illustrative embodiment of the snow load monitoring system (i.e. station) of the present invention, shown comprising a gravitational force (GF) load sensing base station containing load sensors, and a communication and control (i.e. data processing) module mounted on a vertical support post, supporting a digital wind speed and direction and direction instrument (i.e. digital anemometer) connected to the communication and control module, and with a whip-type antenna extending from the communication and control (i.e. data processing) module and terminating in a stroboscopic LED-based illumination module to help human inspectors and workers visibly see the snow load measuring system mounted on the rooftop during deep snow accumulations and blustery snow conditions.

Specification of First Illustrative Embodiment of the Snow Load Monitoring System of the Present Invention FIG. 3B shows a first illustrative embodiment of the snow load monitoring system 4' comprising: a gravitational force (GF) load sensing base station 30 containing one or more load sensors 32 (e.g. based on strain-gauge or piezo-electrical principles of physics, in which the electrical resistance of the device is a function of strain or pressure, measured in an electrical circuit); and a control, data processing and communication module 33 mounted on a vertical support post 34, supporting a digital wind speed and direction and direction instrument (i.e. digital anemometer) 35 connected to the communication and control module 33, and with a whip-type antenna 36 extending from the communication and control (i.e. data processing) module 33 and terminating in a stroboscopic LED-based illumination module 37 to help human inspectors and workers visibly see the snow load monitoring system 4' mounted on the rooftop during deep snow accumulations and/or blustery snow conditions. A photo-voltaic (PV) solar energy collection panel 38 is mounted on the module housing 33 for collecting solar power and recharging onboard internal battery power storage modules 44.

Figure 3C:
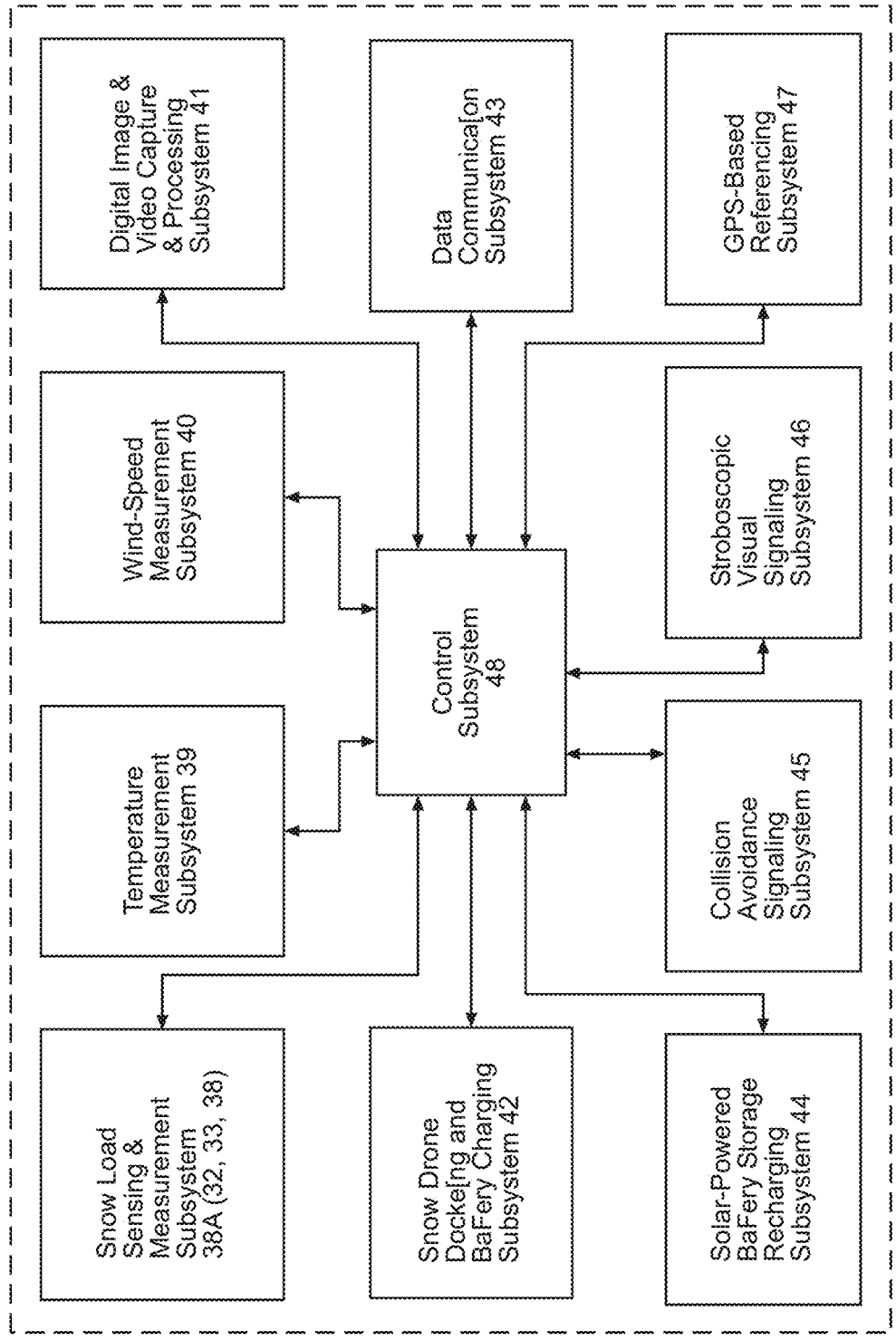
FIG. 3C is a block schematic diagram of the first illustrative embodiment of the snow load monitoring system of the present invention shown in FIG. 3B, comprising various subsystems including a snow load sensing and measurement subsystem, a temperature measurement subsystem, a wind speed and direction measurement subsystem, a digital image and video capture and processing subsystem, a snow drone docking and battery charging subsystem, a data communication subsystem, a solar-powered battery storage recharging subsystem, a collision avoidance signaling subsystem for communication with snow removing and drone-based snow depth measuring subsystems, a stroboscopic visual signaling subsystem (for human rooftop inspectors), and a GPS-based referencing subsystem, all of which are integrated about a control subsystem, as shown, for controlling and managing the operations of the subsystems during system operation.

FIG. 3C shows the subsystem architecture of the snow load monitoring system 4' as comprising: a snow load sensing and measurement subsystem 38; a temperature measurement subsystem 39; a wind speed and direction measurement subsystem 40 realized as instrument 35; a digital image and video capture and processing subsystem 41; a snow drone docking and battery charging subsystem 42; a data communication subsystem 43; a solar-powered battery storage recharging subsystem 44; a collision avoidance signaling subsystem 45 for communication with snow removing and drone-based snow depth measuring subsystems; and stroboscopic visual signaling subsystem 46 for human rooftop inspectors, realized as module 35; and a GPS-based referencing subsystem 47. As shown, all of these subsystems are integrated about a control subsystem 48 for controlling and managing the operations of the subsystems during system operation.

In the illustrative embodiment, the stroboscopic module 37 comprises an array of high-intensity light emitting diodes (LEDs) driven by a stroboscopic driving circuit that drives the LED array. The stroboscopic driving circuit is powered by a battery storage pack mounted in the control, data processing and communications module 33. The wind speed and direction instrument 35 includes a wind-responsive vane structure, mounted on two axes of rotation that allow the vane structure to spin in response to wind currents, and rotate onto the direction of the wind. During instrument operation, the instrument 35 generates an electrical signal having electrical characteristics that are encoded/modulated with the speed and direction of the wind at any moment in time. An electrical signal processing circuit is provided for processing this modulated electrical signal to obtain digital information that is provided to the digital communication modulation circuit in the module 33, in a manner well known in the communications arts.

Figure 3D:
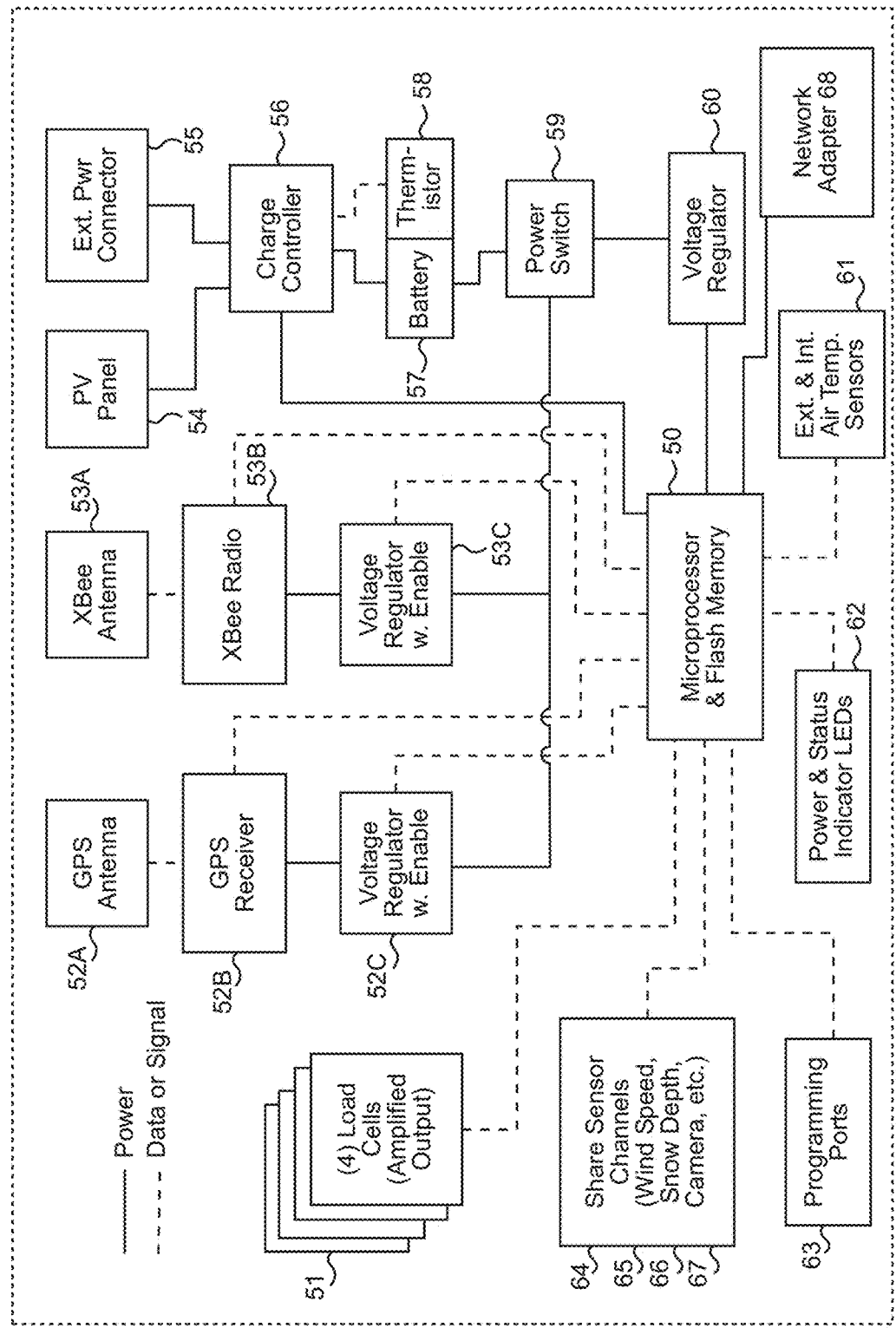
FIG. 3D is a schematic block diagram showing an illustrative embodiment or realization of the snow load monitoring system of the first illustrative embodiment shown in FIG. 3C, wherein various components are arranged and configured about a microprocessor and flash memory (i.e. control subsystem), including load cells, a GPS antenna, a GPS signal receiver, voltage regulator, an Xbee antenna, an Xbee radio transceiver, a voltage regulator, a photo-voltaic (PV) panel, an external power connector, a charge controller, a battery, thermistors, a power switch, a voltage regulator, external and internal temperature sensors, power and status indicator LEDs, programming ports, a wind speed and direction sensor, a digital/video camera, and other sensors, as shown.

FIG. 3D shows a particular implementation of the snow load monitoring system 4' generally illustrated in FIG. 3C, wherein various components are arranged and configured about a microprocessor and flash memory (i.e. control subsystem) 50, including load cells 51, a GPS antenna 52A, a GPS signal receiver 52B, voltage regulator 52C, an Xbee antenna 53A, an Xbee radio transceiver 53B, a voltage regulator 53C, a photo-voltaic (PV) panel 54, an external power connector 55, a charge controller 56, a battery 57, thermistors 58, a power switch 59, a voltage regulator 60, external and internal temperature sensors 61, power and status indicator LEDs 62, programming ports 63, a wind speed and direction sensor 64, a digital/video camera 65, a solar power density sensor 66 for measuring the power density of solar radiation incident on a specified rooftop (at specified moments in time), and other environment sensors 67 adapted for collecting and assessing building rooftop intelligence, in accordance with the spirit of the present invention. Preferably, a photocell sensor will be mounted on the module 33 for automatically detecting and determining that the snow load level about the station is not sufficient high to cover photocell sensor on the communication module 33. If the snow level covers the photocell sensor, then the module 33 will automatically activate the stroboscopic LED illumination module 37 so that its slow stroboscopic illumination signals are generated making the location of the snow load monitoring station conspicuously visible to human building managers, inspectors and workers on the building rooftop.

In the illustrative embodiment, the snow load monitoring system 4' has a computing platform 68, network-connectivity (i.e. IP Address), and is provided with native application software installed on the system as client application software designed to communicate over the system network and cooperate with application server software running on the application servers 17 of the system, thereby fully enabling the functions and services supported by the system 1, as described above.

During operation of the snow load monitoring station 4', the force imposed on the weigh plate by the snow at any given moment in time is transferred through the weigh plate to the force sensor(s) so as to generate an electrical signal that is calibrated to provide an accurate representation of the magnitude of the force applied by the gravitational load on the weigh plate. At the same time, the wind speed and direction instrument measures these wind characteristics and generate electrical signal(s) encoded with such wind-related information. The temperature sensors (and barometric pressure sensors if provided) also take environmental measurements and encode such gathered information onto electrical signals. All of these electrical signals are transmitted to the microprocessor/microcontroller for processing and encoding onto the digital carrier signal generated by the communication module of the station, for wireless transmission to the communication, application and database servers maintained at the data center 10 of the system. Digital images are also captured periodically by onboard digital cameras and transmitted to the programmed microprocessor (i.e. subsystem controller) for storage and processing to support the various services delivered over the system network of the present invention.

While excessive snow load measurements and alerts are preferably determined within the application servers of the data center 10, it is possible in some embodiments for such determinations to be computed locally within the snow load monitoring station, and for the alerts to be sent to the data center 10 for communication among building management and maintenance team members, in accordance with the spirit of the present invention. Also, the stroboscopic LED illumination module mounted on top of the radio whip antenna of the station can be operated periodically, or under the control of the data center 10 to control battery power aboard each snow load monitoring station deployed on a building rooftop. For example, after a deep snow load, the stroboscopic LED illumination module could be activated from the data center, via manager control, to assist building managers and maintenance workers while conducting rooftop inspections as well as snow removing operations. On board collision avoidance signal generation can also be activated by remote control from the data center 10 to assist in preventing collisions between snow removing robot systems 6 and snow load monitoring stations 4 buried deep beneath the snow.

Specification of First Illustrative Embodiment of the Unmanned Snow Depth Measuring Aircraft System of the Present Invention FIG. 4A1 shows an unmanned snow depth measuring aircraft (i.e. drone) system 8 illustrated in FIGS. 1A and 2A, comprising: an aircraft body 70 housing four vertically-mounted symmetrically arranged propeller-type rotors 71A through 71D, supporting vertical-takeoff (VTO) and pitched flight over building rooftops while (i) measuring the depth profile of snow loads on rooftops, using any one of the non-contact type methods and modules 72A through 72F illustrated in FIG. 4A1, and (ii) capturing digital video images within the field of view (FOV) of its onboard camera subsystem 75 during its course of travel, thereby gathering information for processing and generation of GPS-indexed time-stamped snow depth profile maps of building rooftops including before, during and after snow storms, in accordance with the principles and teachings of the present invention.

FIG. 4A2 illustrates six different types of energy-beam based methods of and modules for performing non-contact snow depth measurement that are supportable within the flying unmanned snow depth measuring aircraft (i.e. drone) subsystem illustrated in FIGS. 1A, 2A and 4A1, either alone or in combination with each other, as illustrated in FIGS. 5B1 through 5B6.

FIG. 4B1 shows the primary functional blocks employed in the module 72A used to carry out the LIDAR based snow depth measurement method of the present invention, wherein an amplitude modulated (AM) laser beam is generated and transmitted into a layer of snow, while the return laser signal is detected and processed (at different moments in time) to determine the time of flight of the laser beam from the drone 8 to the surface of the rooftop/ground and from the drone 8 to the surface of the snow on the rooftop/ground, and thereby computing a measured depth of the snow on the building rooftop, using the differential-type snow depth measurement method described above.

FIG. 4B2 shows the primary functional blocks employed in the module 72B used to carry out the scanning LIDAR based snow depth measurement method of the present invention, wherein an amplitude modulated (AM) laser beam is generated and scanned across a layer of snow, while the return laser signal is detected and processed (at different moments in time) to determine the time of flight of the laser beam from the drone 8 to the surface of the rooftop/ground and also from the drone 8 to the surface of the snow on the rooftop/ground, and thereby compute a measured depth of the snow on the building rooftop, using the differential-type snow depth measurement method described above.

FIG. 4B3 shows the primary functional blocks employed in the module 72C used to carry out the optical range finding based snow depth measurement method of the present invention, wherein an LED-generated amplitude modulated light beam is generated and transmitted from the drone 8 towards a rooftop surface or a layer of snow on the rooftop, and the return light signal is detected and processed (at different moments in time) to determine the time of flight of the light beam from the drone 8 to the surface of the snow on the rooftop/ground, and thereby computing a measured depth of the snow on the building rooftop, using the differential-type snow depth measurement method described above.

FIG. 4B4 shows the primary functional blocks employed in the module 72D used to carry out the RADAR based snow depth measurement method of the present invention, wherein an microwave energy beam is generated and transmitted into a layer of snow, and the return microwave signal is detected and processed (at different moments in time or same time when using different signaling frequencies) to determine the time of flight of the beam from the drone 8 to the surface of the rooftop/ground and also to the surface of the snow, and thereby computing a measured depth of the snow on the building rooftop, using the differential-type snow depth measurement method described above.

FIG. 4B5 shows the primary functional blocks employed in the module 72E used to carry out the SONAR based snow depth measurement method of the present invention, wherein an acoustic energy beam is generated and transmitted into a layer of snow, and the return acoustic signal is detected and processed (at different moments in time or same time when using different signaling frequencies) to determine the time of flight of the beam from the drone to the surface of the rooftop/ground and to the surface of the snow, and thereby computing a measured depth of the snow on the building rooftop using the differential-type snow depth measurement method described above.

FIG. 4B6 shows the primary functional blocks employed in the module 72F used to carry out the multi-element optical range finding method of snow depth measurement of the present invention, wherein optical energy beam is generated and transmitted towards a rooftop surface or a layer of snow on the rooftop surface, and the return optical signal is detected and processed along different optical channels, to determine different ranges from the drone 8 to the rooftop surface and from the drone 8 to surface of snow on the rooftop surface, so that the depth of the snow on the rooftop can be measured at particular locations on the building rooftop, using the differential-type snow depth measurement method described above.

FIG. 4C shows the subsystem architecture of the unmanned snow depth measuring aircraft system 8 illustrated in FIGS. 4A1 and 4A2, comprising: a snow depth measurement subsystem 75, a flight/propulsion subsystem 76 enabling vertical takeoff (VTO) flight using multi-rotor systems, a collision avoidance subsystem 77, an inertial navigation & guidance subsystem 78, a digital imaging (i.e. video camera) subsystem 79, a data communication subsystem 80, altitude measurement and control subsystem 81, snow depth profiling subsystems 82, auto-pilot navigation subsystem 83, GPS navigation subsystem 84, and a control subsystem 85 for controlling and/or managing the other subsystems during system operation.

In the illustrative embodiment, the unmanned snow depth measuring aircraft system 8 has an onboard computing platform with network-connectivity (i.e. IP Address), and is provided with native application software installed on the system as client application software designed to communicate over the system network and cooperate with application server software running on the application servers 18 of the system, thereby fully enabling the functions and services supported by the system 1, as described above.

Specification of First Illustrative Embodiment of the Snow Sheltering Dome System of the Present Invention FIG. 4D1 shows a building in which the BIGADS system 1 has been deployed, and where a dome-type shelter system 28 is supported on the building rooftop for sheltering an unmanned snow depth measuring aircraft system 8. As shown, the shelter system 28 is arranged in its closed configuration and adapted for storing an unmanned snow depth measuring aircraft system 8, while its battery packs are reconditioned and recharged and diagnostic analysis is carried out during periodic maintenance operations.

As shown in FIG. 4D2, the snow sheltering dome system 28 comprises: a support post 90, a semi-spherical base portion 91A supporting a planar landing platform 92 on which a unmanned snow depth measuring aircraft system 8 can land and be supported, and a pair of hinged quarter-spherical housing portions 93A and 93B for enclosing the aircraft system 8 during its closed configuration and revealing the same when configured in its open configuration. An RTK GPS antenna and transceiver 94 is mounted on pole 90A extending from post structure 90.

FIG. 4D3 shows the snow drone sheltering dome system 28 arranged in its closed mode, with its hinged housing portions 93A and 93B closed about its unmanned snow depth measuring aircraft system 8 supported on its landing support platform 92.

FIG. 4D4 shows the snow drone sheltering dome system 28 arranged in its open mode, with its hinged housing portions 93A and 93B opened and removed away from the unmanned snow depth measuring aircraft system 8 supported on its landing support platform 92.

FIG. 4E shows the snow drone sheltering dome system 28 arranged in its open mode and supported on the ground alongside a building being monitored by the BIGADS system of the present invention 1.

Specification of Snow Depth Profiling Operations Performed by the Unmanned Snow Depth Measuring Aircraft System of the Present Invention In all of methods of depth profiling disclosed herein, using different sources of energy as shown in FIG. 4A2 to measure the distance from the snow depth measuring aircraft drone 8 to the building or snow surf. Specifically, this differential-type snow depth measuring and profiling method will involve several steps performed over a period of time, namely: (i) a first range measurement is made between the building rooftop surface or ground surface at a first time of year when there is no snow present, and the RTK GPS is used to determine its relative XYZ position to a stationary reference point, and this XYZ and first range measurement data is stored as a snow range map in a system database; (ii) a second range measurement is made between the snow on the building rooftop surface or ground surface at a second time of year when there is snow present, and the RTK GPS is used to determine its relative XYZ position to a stationary reference point, and this XYZ and second range measurement data is stored as a snow range map in the system database; and (iii) the first and second range measurements at each corresponding position XYZ are compared to calculate the snow depth at the XYZ position on the rooftop, at a particular moment in time indexed with [date/hour/minute].

Alternatively, snow depth profile maps of ground cover and rooftops may be determined using alternative methods, particularly when using SONAR or RADAR sending/ranging methods, rather than LADAR or LIDAR, because when using different signaling frequencies, RADAR and SONAR have the capacity to penetrate and travel through an entire column of snow on a building rooftop, and therefore measure the distance from the snow depth profiling drone system 8 to the snow surface on the rooftop, as well as from the system 8 to the rooftop surface, using time of flight measurement techniques known in the art, in contrast to LADAR or LIDAR using light beams which are quickly absorbed by snow and fail to generate the necessary reflections to make accurate snow depth measurements. Using different signaling frequencies in the RADAR or SONAR field, it is possible for the sensing beam to achieve different reflection and transmission characteristics through snow media, making it possible to measure the depth of snow at any XYZ location using data signal detection and collection methods at a single moment in time, using different signally frequencies. This would the advantage of RADAR and SONAR based sensing methods, over LADAR sensing methods. For purposes of illustration, the differential-type snow depth profiling method will be described in connection with the various kinds of different snow depth sensing methods illustrated in FIG. 4A2

FIGS. 4F1, 2F2 and 2F3 show the unmanned snow depth measuring aircraft system 8 illustrated in FIGS. 4A1 and 4A2 profiling GPS-specified regions of the building rooftop 2 using energy beam methods when no snow accumulations are present, and transferring digital information about such gathered rooftop intelligence to the communication, application and database servers maintained at the remote data center 10 of the BIGADS system 1, illustrated in FIGS. 1A, 1B and 1C.

FIGS. 4G1 and 4G2 show the unmanned snow depth measuring aircraft system 8 illustrated in FIGS. 4A1 and 4A2 profiling GPS-specified regions of the building rooftop 2 using energy beam methods when snow accumulations are present on the rooftop, and transferring digital information about such gathered rooftop intelligence to the communication, application and database servers maintained at the remote data center 10 of the BIGADS system 1, illustrated in FIGS. 1A, 1B and 1C.

FIG. 4H1 shows the unmanned snow depth measuring aircraft system 8 illustrated in FIGS. 4A1 and 4A2 (*i*) profiling GPS-specified regions of the building rooftop 2 using sonar/acoustic-based methods and real time kinematic (RTK) GPS referencing techniques (to enhance the precision of positioning) when snow accumulations are not present on the rooftop, and (ii) transferring digital information about such collected rooftop intelligence to the communication, application and database servers maintained at the remote data center 10 of the BIGADS system 1, illustrated in FIGS. 1A, 1B and 1C.

FIG. 4H2 shows the unmanned snow depth measuring aircraft system 8 illustrated in FIGS. 4A1 and 4A2 profiling GPS-specified regions of the building rooftop 2 using sonar/acoustic-based methods and real time kinematic (RTK) GPS referencing station 95 when snow accumulations 96 are present on the rooftop, and transferring digital information about such collected rooftop intelligence to the communication, application and database servers maintained at the remote data center 10 of the BIGADS system 1, illustrated in FIGS. 1A, 1B and 1C.

By analyzing the snow depth profiles for the GPS-indexed region of the building rooftop 2, at these different times (i.e. when snow was and was not present on the building rooftop), application servers during computer analysis of the gathered snow depth profile data at the data center 10 will produce the actual depth of snow at a particular GPS-indexed location. This snow depth profile measure can be achieved by subtracting (i) the measured height distance of H(GPS(x,y,z),T1) at time T1 (e.g. springtime when no snow is present), at x,y,z, from (ii) measured height distance H(GPS(x,y,z),T2) measured during winter months when snow is present, wherein aircraft altitude correction is used to compute these "time of flight" distances during each measurement, in the event that the snow depth measuring aircraft is at a different altitude during each measurement. The snow depth measuring aircraft system will gather height distance measures at each GPS sample location, and the application servers back at the data center 10 will perform calculations at these different GPS coordinates, using a spatial resolution that is determined by the interspacing of snow load monitoring stations 4 deployed on the building rooftop. Ideally, computed depth samples in generated snow depth profile maps will be spaced closely apart to correspond to snow load measurements made by the snow load monitoring stations deployed on the rooftop of the building. Using relative humidity measurements, and other measurements regarding the wetness of snow being profiled, the system of the present invention can also calculate the weight density of depth-profiled snow regions, which can be compared with actual snow load measurements by rooftop snow monitoring stations, to ensure accuracy of data and corresponding decision-support operations.

Figure 7A:
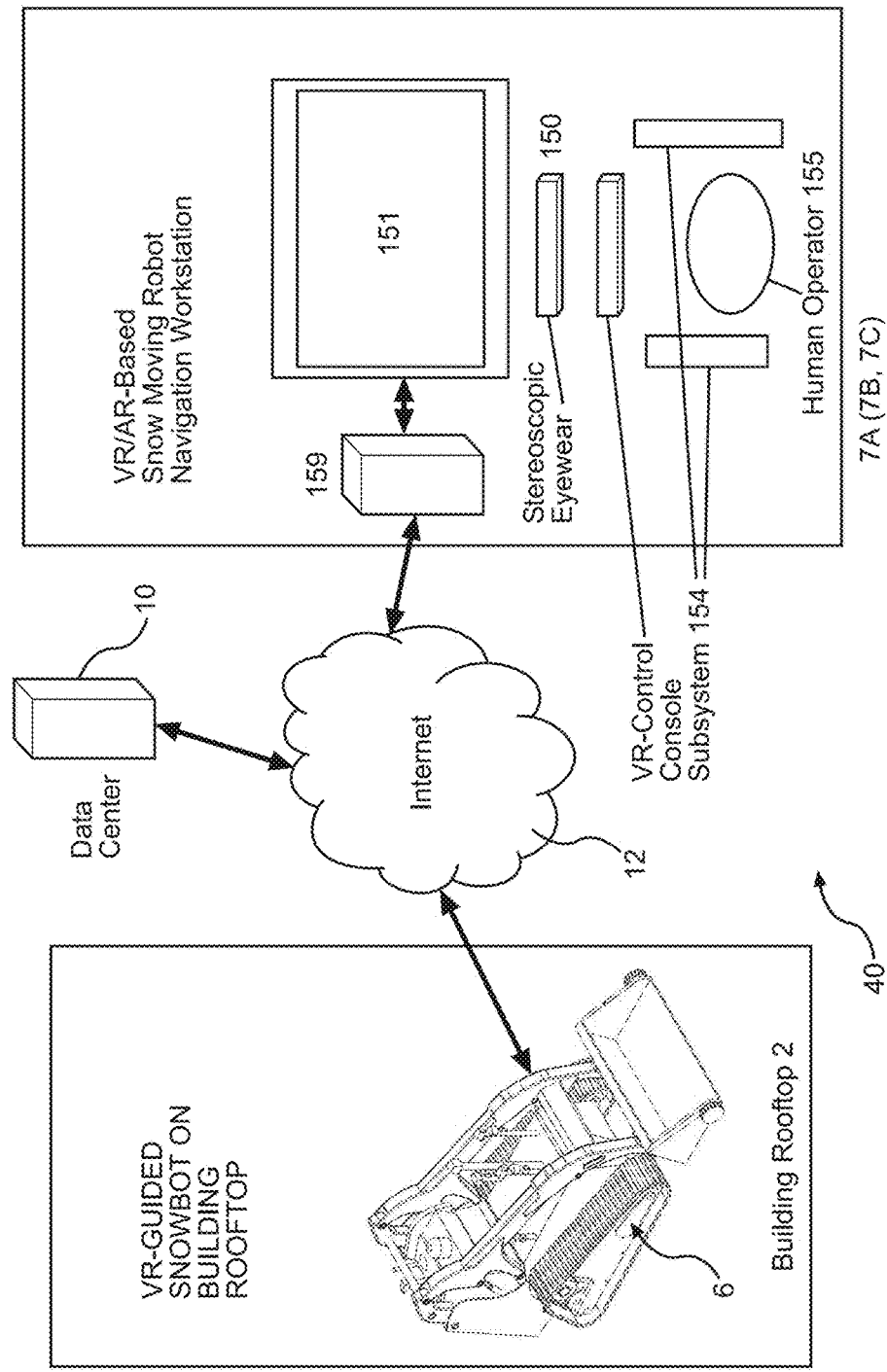
FIG. 7A is a schematic representation of an automated system for monitoring, detecting and removing excessive snow loads from building rooftop surfaces using the VR-guided snow removing robot system of the present invention, guided and controlled by an remotely-situated human operator working before an snow removing robot navigation and control station supporting virtual reality (VR) and augmented-reality (AR) viewing experiences, as illustrated in FIG. 7B3.

In the preferred embodiment, the unmanned snow depth measuring aircraft system 8 will be autonomously navigated over a predefined course above a building rooftop, designed by a flight planner, and this preprogrammed course will be followed by the unmanned aircraft system 8 under computer navigation control using an AI-based navigation control server (NCS) maintained at the data center 10 of the BIGADS system 1. In alternative embodiments, the unmanned snow depth measuring aircraft system 8 can be VR-guided/operated meaning that the its onboard cameras will capture live video feeds from its different fields of view (FOV) and display these live video feeds through video application servers to the display screen on a VR-enabled control station 7C modified slightly from the system illustrated in FIGS. 7A, 7B1, 7B2 and 7B3. At the same time, a GUI-based instrument panel 152 indicated in FIG. 7B3 will be displayed below or above the live video feeds displaying the status on the various states and modes of operation (e.g. Up, Down, Forward, Reverse, Rotate Left, Rotate Right, Stationary, Idle, Snow Depth Scanning/Profiling, etc.) supported by VR-operated/guided snow depth measuring aircraft system 8, as well as a physical VR-enabled control console subsystem 7C that emulates the motion and operational controls of a pilot operating a manned version of the aircraft system. Preferably, the VR-enabled control console subsystem 7C will be arranged about a console control box requiring the use of the operators left and right hands so that the operator is fully engaged while wearing VR-type display goggles 150 or viewing a stereoscopic display LCD panel 151 as shown in FIG. 7A or other control interface represented in FIG. 7B1. Such an VR-enabled control station 7C will also follow conventional VR communication, display and control techniques well known in the art and described in the following US Patents, incorporated herein by reference in their entirety: U.S. Pat. Nos. 9,392,920; 9,392,743, 6,011,581; and 6,108,031.

Figure 5A:
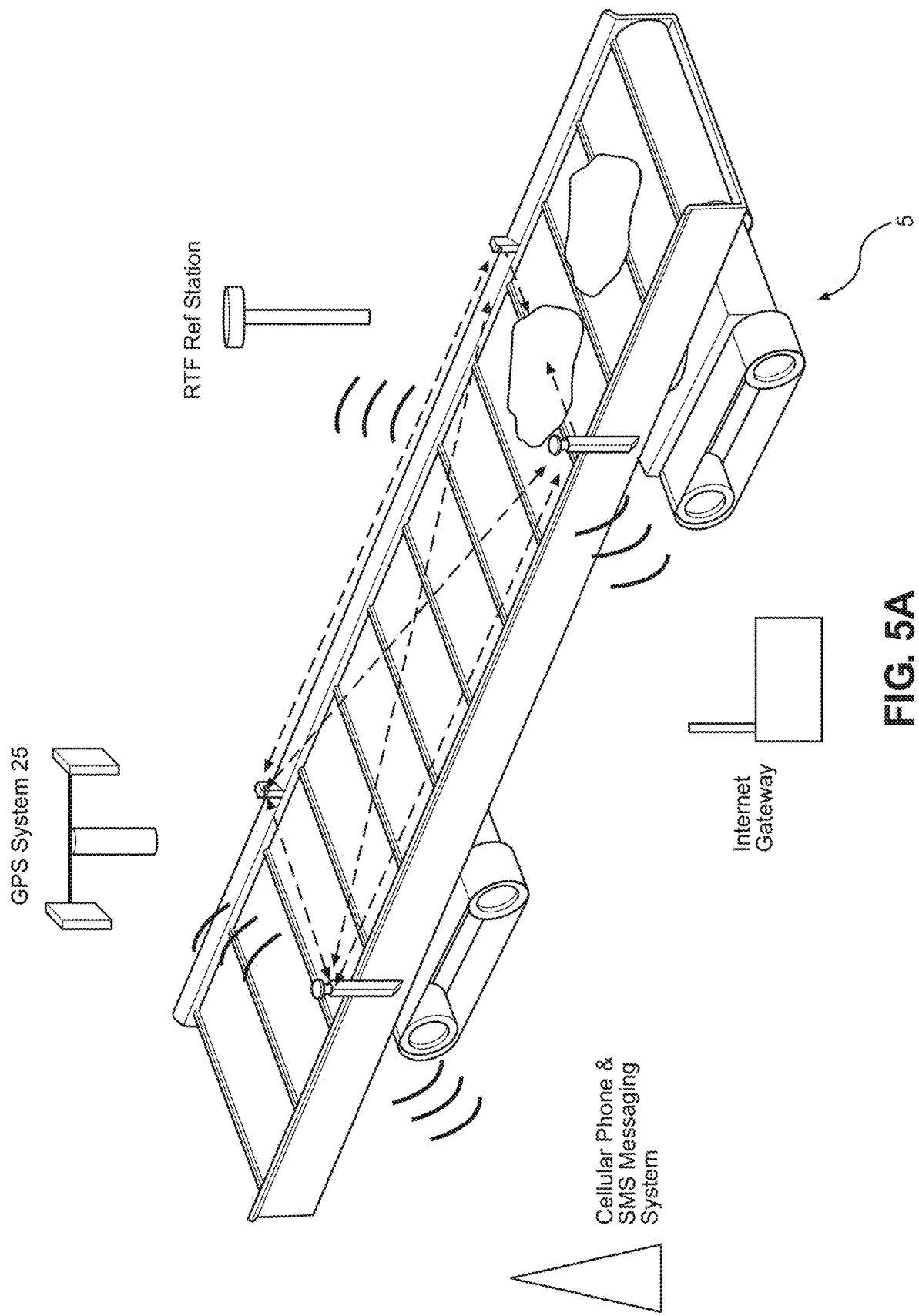
FIG. 5A is a perspective view of one mobile automated snow conveying tunnel system (ASCTS) of the present invention shown supported on the building rooftop illustrated in FIGS. 1 and 2A, in communication with a GPS system, RTK reference station, internet gateway and a cellular phone and SMS messaging system during snow loading and conveying operations, and having conveyor belt supported on snow-treading tracks propelled by its onboard propulsion subsystem, controlled by an onboard navigation and control subsystem remotely managed on the system network of the present invention.

Specification of First Illustrative Embodiment of the Automated Snow Conveying Tunnel System of the Present Invention FIG. 5A shows a mobile automated snow conveying system (ASCS) 8 of the present invention shown supported on the building rooftop illustrated in FIGS. 1A and 2A, in communication with a GPS system 25, RTK reference station, internet gateway and a cellular phone and SMS messaging system during snow loading and conveying operations, and having conveyor belt structure supported on set sets of snow-treading tracks propelled by its onboard propulsion subsystem, controlled by an onboard navigation and control subsystem remotely managed on the system network of the present invention.

FIG. 5B shows the subsystem architecture of the automated snow conveying systems of the present invention illustrated in FIG. 5A, comprising: a hydraulically-powered conveyor (belt) covering subsystem 102; a conveyor snow belt transport subsystem 100; a conveyor belt de-icing subsystem 103: digital camera subsystems 104 providing various fields of view (FOV) about the system; LED-based illumination subsystems 105 for adequately illuminating these FOVs under dark and blustery rooftop conditions when snow removal operations might be carried out; a data communication subsystem 106 for internetwork connectivity; a temperature sensing subsystem 107; a conveyor belt lubrication subsystem 108; a VR-guided control subsystem 109; a GPS-referencing subsystem 110; and a control subsystem 11 for controlling and/or managing the operation of these subsystems during system operation, including network communications with the system network.

In the illustrative embodiment, each automated mobile snow conveying system 8 has a computing platform, network-connectivity (i.e. IP address), and be provided with native application software installed on the system as client application software designed to communicate over the system network and cooperate with application server software running on the application servers 17 of the system, thereby fully enabling the functions and services supported by the system 1, as described above.

In general, each mobile snow conveying system 5 will have an assigned IP address, for establishing network connectivity and remote control. The VR-enabled control-station 7A used to navigate and operate a VR-guided snow removing robot system 6 on a building rooftop will also support remote control and operation of each automated mobile snow conveying system 8 illustrated in FIG. 5A. In a coordinated manner, a single remote operator will operate and control both the VR-guided snow removing robot system 6 and the automated snow conveying tunnel system 5, or in other situations, two or more remote operators will use two or more VR-enabled control stations 7B to safely orchestrate rooftop snow removal operations to remove dangerous snow load conditions detected by the snow load monitoring systems 4.

Specification of the Mobile Automated Snow Conveying System (ASCS) for Configuration on a Building Rooftop FIGS. 5C1A and 5C1B show top and bottom perspective views of the mobile automated snow conveying system (ASCS) 5 of FIG. 5B, showing its pair of rotatably mounted propulsion tractors mounted beneath and at opposite end of the conveyer belt structure of the present invention.

FIGS. 5C2A and 5C2B show top and bottom side perspective views of the mobile automated snow conveying system (ASCS) 5 of FIG. 5B, showing its pair of rotatably mounted propulsion tractors mounted beneath and at opposite end of the conveyer belt structure of the present invention, arranged in different configurations.

Figure 5D:
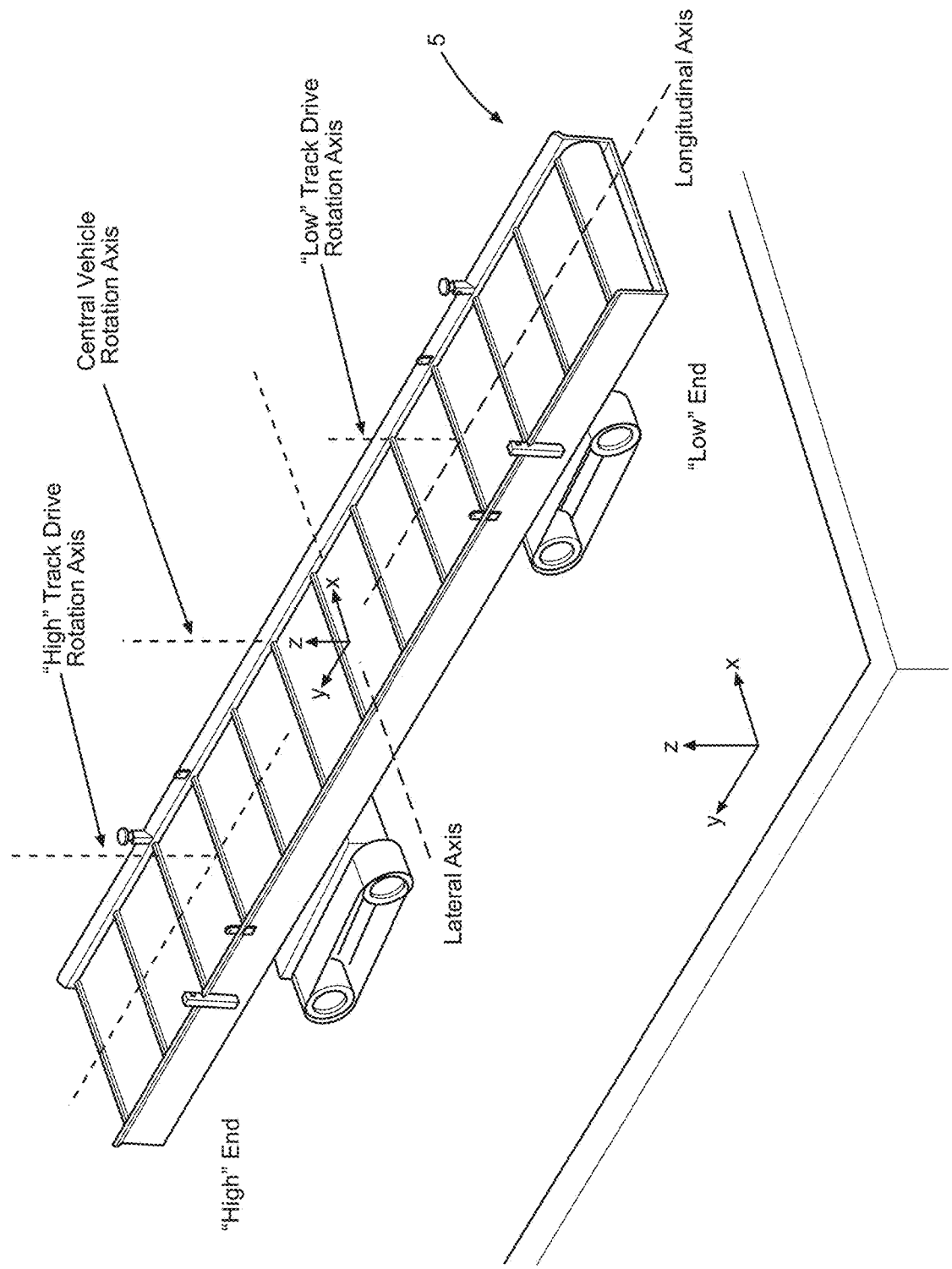
FIG. 5D is a perspective view of the mobile automated snow conveying tunnel system (MASCTS) of FIG. 5A supported on a building rooftop surface, and provided with labeled references, namely, "longitudinal axis", "lateral axis", "low track drive rotation axis", "high track drive rotation axis", "high end" and "low end"

FIG. 5D is a perspective view of the mobile automated snow conveying system (ASCS) of FIG. 5A supported on a building rooftop surface, and provided with labeled references, namely, "longitudinal axis", lateral axis", "low track drive rotation axis, "high" track drive rotation axis, "high end", and "low end".

Specification of Methods of Navigating the Mobile Automated Snow Conveying Systems (ASCS) of the Present Invention During Building Rooftop Snow Removal Operations FIGS. 5E1, 5E2, 5E3, 5E4, 5E5 and 5E6 shows a set of plan views of the mobile automated snow conveying system (ASCS) of the present invention showing how during States 1 and 2, both the high and low track drives of the system are rotated about their track drive rotation axes, and then during States 4 and 5, the track drives rotate the conveyor belt structure about the central vehicle rotation axis so at State 6, the conveyor belt is arranged perpendicular to its original position/orientation shown in State 1.

FIGS. 5F1, 5F2, 5F3, 5F4, 5F5 and 5F6 shows a set of plan views of the mobile automated snow conveying system (ASCS) of the present invention showing how during States 1, 2 and 3, only the high track drive is rotated about its track drive rotation axis, and then during States 4 and 5, the high track drive rotates the conveyor belt structure about the "low" track drive rotation axis so at State 6, the conveyor belt is arranged perpendicular to its original position/orientation shown in State 1, relative to the low track drive rotation axis.

FIGS. 5G1 and 5G2 shows a set of plan views of the mobile automated snow conveying system (ASCS) of the present invention showing how the conveyor belt system moves in a lateral translation manner by having the low and high drive tracks arranged orthogonal to the longitudinal axis, then moving together to achieve lateral translation of the conveyor belt structure, as shown.

FIGS. 5H1 and 5H2 shows a set of plan views of the mobile automated snow conveying tunnel system (ASCTS) of the present invention showing how the conveyor belt system moves in a lateral translation manner by having the low and high drive tracks arranged in a co-axial manner to the longitudinal axis, then moving together to achieve longitudinal translation of the conveyor belt structure, as shown.

Figure 5J:
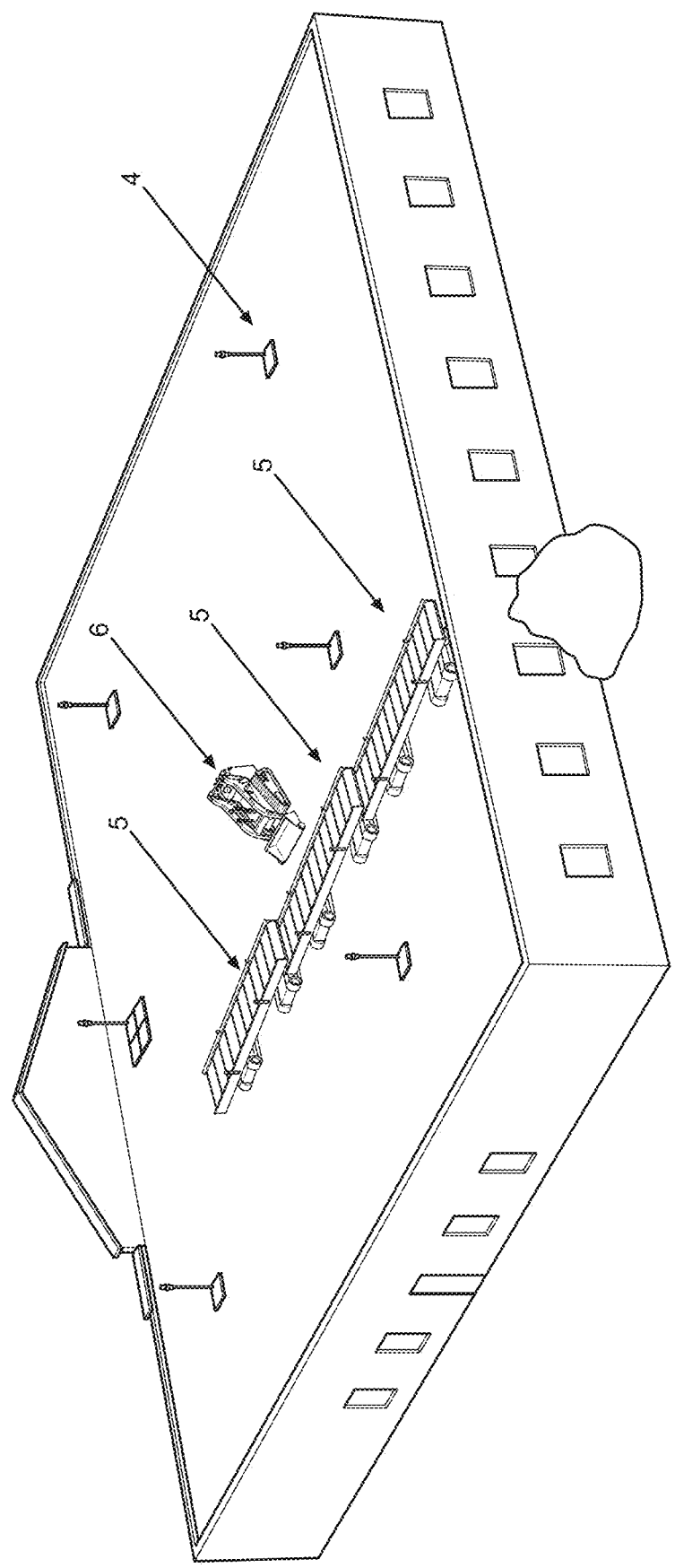
FIG. 5J is a perspective view of three (3) mobile automated snow conveying tunnel systems (MASCTS) of the present invention shown supported on the building rooftop, and arranged in a first straight-type configuration, and cooperating together to assist in removing snow from the building rooftop.
Figure 5K:
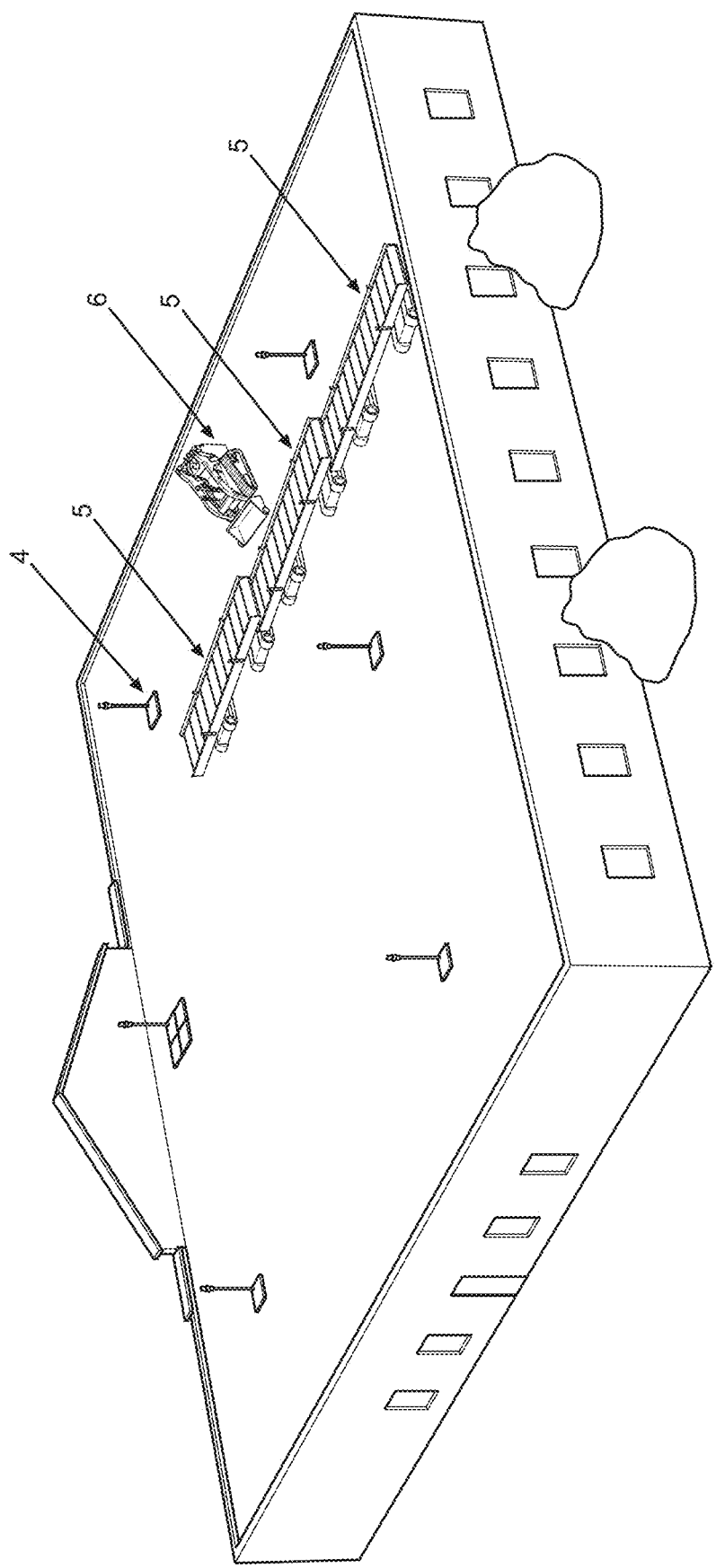
FIG. 5K is a perspective view of three (3) mobile automated snow conveying tunnel systems (ASCTS) of the present invention shown supported on the building rooftop, and arranged in a second straight-type configuration, and cooperating together to assist in removing snow from the building rooftop.
Figure 5L:
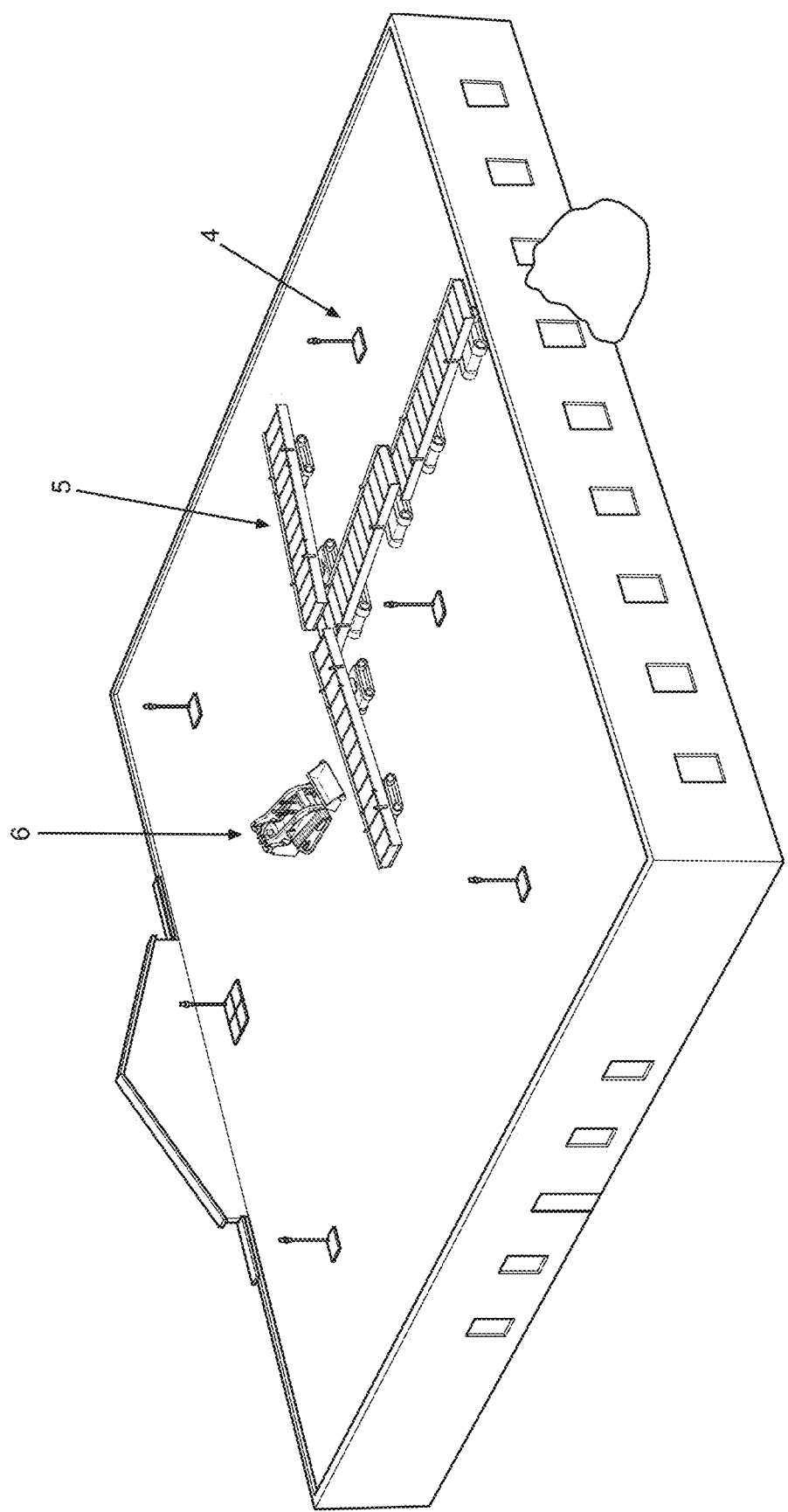
FIG. 5L is a perspective view of three (3) mobile automated snow conveying tunnel systems (MASCTS) of the present invention shown supported on the building rooftop, and arranged in a second T-type configuration, and cooperating together to assist in removing snow from the building rooftop.
Figure 5N:
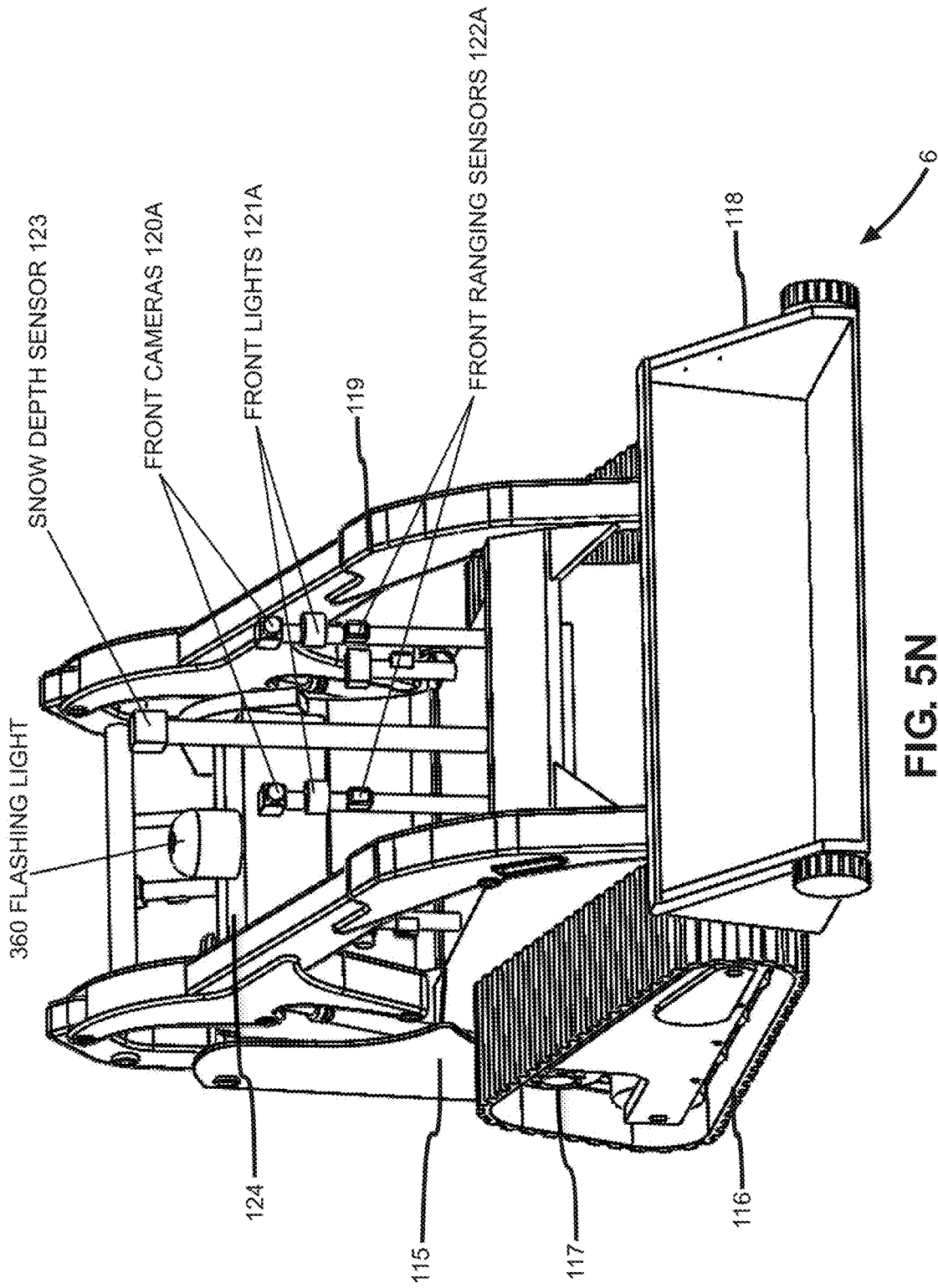
FIG. 5N is a front perspective view of a first illustrative embodiment of the VR-guided (i.e. VR-navigated) snow removing robot system of the present invention represented in FIGS. 1 and 2A, and shown comprising a compact lightweight body, with a traction-type drive system powered by an electric motor (and/or fossil-fuel engine), and having a snow moving tool (e.g. snow shovel, snow blower, or the like) movable under hydraulic control, along with weatherized digital video camera systems providing field of views (FOVS) in the front and rear of the robotic vehicle, and having multi-band wireless radio control and communications, GPS-supported navigation and collision avoidance capabilities, allowing the vehicle to be safely operated by a human operator remotely situated in front a VR-guided workstation, wearing VR display goggles or viewing a stereoscopic-display panel, as illustrated in FIG. 7A through 7B3.

Specification of Methods of Navigating the Mobile Automated Snow Conveying Systems (ASCS) of the Present Invention During Building Rooftop Snow Removal Operations FIG. 5I is a first perspective view of the mobile automated snow conveying system (ASCS) of the present invention showing on a building rooftop, with snow being loaded on the conveyor belt using a snow moving robot system as shown in FIGS. 5N through 5Q2.

FIG. 5J is a perspective view of three (3) mobile automated snow conveying systems (ASCS) of the present invention shown supported on the building rooftop, and arranged in a first straight-type configuration, and cooperating together to assist in removing snow from the building rooftop.

FIG. 5K is a perspective view of three (3) mobile automated snow conveying systems (ASCS) of the present invention shown supported on the building rooftop, and arranged in a second straight-type configuration, and cooperating together to assist in removing snow from the building rooftop.

FIG. 5L is a perspective view of three (3) mobile automated snow conveying systems (ASCS) of the present invention shown supported on the building rooftop, and arranged in a second T-type configuration, and cooperating together to assist in removing snow from the building rooftop.

FIG. 5M1 is a perspective view of the mobile automated snow conveying system (ASCS) of FIG. 5L shown transporting snow off the rooftop to the ground below for collection by an automated snow moving robot system of the present invention, shown in FIGS. 5N through 5Q2.

FIG. 5M2 is a perspective view of the mobile automated snow conveying system (ASCS) of FIG. 5L shown transporting snow off the rooftop and into snow collection/dump truck on the ground below, used during semi-automated rooftop snow removal operations.

Specification of First Illustrative Embodiment of the VR-Guided Snow Moving Robot System of the Present Invention The BIGADS system 1 comprises a Virtual Reality (VR) multi-modal operator interface control station 7A that displays a realistic virtual reality (VR) depiction of a compact building-rooftop snow removing robot system 6 performing snow removal operations on a building rooftop, in conjunction with other VR-controlled equipment such as automated snow conveying tunnels 5, rooftop-roving snow-melt pellet distributing systems 9, and the like. Preferably, the Virtual Reality (VR) multi-modal operator interface control station 7A includes engine audio feedback and a near life-size operator display 151 attached to a full-size cab simulator illustrated in FIG. 7A, wherein snow removing dynamics are determined by computer-based models of the hydraulic system, the linkage system, and the snow moving forces etc. The details of these system features will be detailed below.

FIG. 5N shows the VR-guided or navigated/operated snow removing robot system 6 represented in FIGS. 1 and 2A, and comprising: a compact lightweight body 115, transported by a traction-type drive system 116 powered by an electric motor (and/or fossil-fuel engine) 117, and having a snow moving tool (e.g. snow shovel, snow blower, or the like) 118, 118" movable under hydraulic control 119, along with weatherized digital video camera systems 120 providing field of views (FOVS) in the front and rear of the robotic vehicle with LED-based illumination modules 121A, 121B, 121C and 121D, front, rear and side ranging sensors 122A, 122B, 122C and 122D, and a snow depth sensing module 123 and having multi-band wireless radio control and communications 124, GPS-supported navigation and collision avoidance capabilities, allowing the vehicle to be safely operated by a human operator remotely situated in front a VR-guided workstation 7A, wearing VR display goggles 150 or viewing a stereoscopic-display panel 151, as illustrated in FIG. 7A through 7B3.

FIGS. 5P1, 5P2 and 5P3 show the VR-guided snow removing robot system 6 depicted in FIG. 5D, with a snow shovel tool 118 mounted to its front end, as well as being fully equipped with side, front and rear navigational camera systems 120A-120D, side, front and rear ranging sensors 122A-122D, a GPS receiver 124, an RTK antenna 125, a 900 MHZ antenna 126, and refuel/recharging port 127 mounted in the rear of the vehicular robot system 6.

FIG. 5O shows the subsystem architecture of the VR-navigated snow removing robot system 6 illustrated in FIGS. 5N, 5P1, 5P2 and 5P3. As shown, the VR-navigated snow removing robot system 6 comprises: a snow-depth measurement subsystem 130; a propulsion/drive subsystem 131; a collision avoidance subsystem 132; digital camera subsystems 134 providing various (i.e. front, rear and side fields of views (FOVs); LED-based illumination subsystems 135 for illuminating these FOVs; a data communication subsystem 136 for interfacing with and communicating over the Internet infrastructure; a temperature & moisture measurement subsystem 137; snow-depth profiling subsystem 138; a VR-guided and auto-pilot navigation subsystem 139; a GPS navigation subsystem 140; and a control subsystem 141 for controlling and/or managing the operation of these subsystems during system operation.

In the illustrative embodiment, the VR-guided snow removing robot system 6 has a computing platform with backup battery support, network-connectivity (i.e. IP Address), and is provided with native application software installed on the system as client application software designed to communicate over the system network and cooperate with application server software running on the application servers 17, thereby fully enabling the functions and services supported by the VR-guided snow removing robot system 6, as described above.

In the preferred embodiment, the snow removing robot system 6 will be VR-guided and VR-operated meaning that the its onboard cameras 134 will capture live video feeds from its different fields of view (FOV) and display these live video feeds through video application servers to the display screen 151 on a VR-enabled control station 7A illustrated in FIGS. 7A, 7B1, 7B2 and 7B3. At the same time, a GUI-based instrument panel 152 indicated in FIG. 7B3 will be displayed below or above the live video feeds displaying the status on the various states and modes of operation (e.g. Forward, Reverse, Rotate Left, Rotate Right, Stationary, Idle, Lifting Up Shovel, Setting Down Shovel, Tilting Shovel, etc.) supported by VR-operated/guided snow removal robot system 6, as well as a physical VR-enabled control console subsystem 7A that emulates the motion and operational controls of a manned version of snow removing robot system (e.g. similar to a BobCat brand tractor). Preferably, the VR-enabled control console subsystem 7A will be arranged about a stationary chair, requiring the use of the operators left and right hands, as well as his feet, so that the operator is fully engaged while wearing VR-type display goggles 150 or viewing a stereoscopic display LCD panel 151 as shown in FIG. 7A, or other control interface represented in FIG. 7B1. Such an VR-enabled control station 7A will follow conventional VR communication, display and control techniques well known in the art and described in the following US Patents, incorporated herein by reference in their entirety: U.S. Pat. Nos. 9,392,920; 9,392,743; 6,011,581; and 6,108,031.

Specification of First Illustrative Embodiment of the Snow Sheltering System of the Present Invention for the VR-Guided Snow Moving Robot System FIG. 5P5 shows a building rooftop 2 involved in the BIGADS system 1, on which the snow shelter system 29 is installed and adapted for protecting the unmanned snow removing robot system 6 of FIG. 5D, from snow and other forms of harsh outdoor weather, while refueling and recharging the robot system 6 as required to satisfy its energy/power requirements.

FIG. 5P5 shows the snow shelter system 29 installed on the rooftop in FIG. 5P4, wherein the snow removing robot system 6 of FIG. 5D is parked out of the reach of snow and other forms of harsh outdoor weather, while the refueling and recharging ports 127A of the robot system are docked with the refueling/recharging port 29A of the snow shelter system.

FIG. 5P6 shows the snow shelter system 29 installed on the rooftop in FIG. 5P4, in which no snow removing robot system 6 is parked, revealing the refueling/recharging port 27A of the snow shelter system 29.

In the illustrative embodiment, the snow shelter system 29 will have a computing platform with solar-power charged batteries, network-connectivity (i.e. IP Address), and be provided with a web-based or native application software installed on the system as client application software designed to communicate over the system network and cooperate with application server software running on the application servers 17 of the system, thereby fully enabling diagnostic and service functions supported by the shelter system 29, as described above.

Specification of Second Illustrative Embodiment of the VR-Guided Snow Moving Robot System of the Present Invention FIGS. 5Q1 and 5Q2 show a second illustrative embodiment of the VR-guided snow removing robot system 6, having a snow blowing tool 118 mounted to its front end (rather than a snow shovel tool), as well as being fully equipped with side, front and rear navigational camera systems 120A-120D, LED-based illumination modules 121A-121D, side, front and rear ranging sensors 122A-122D, a GPS receiver 124, an RTK antenna 125, a 900 MHZ antenna 126, and a refuel/recharging port 127A mounted in the rear of the vehicular system 6.

FIG. 5O shows the subsystem architecture of the VR-navigated snow removing robot system 6 illustrated in FIGS. 5Q1 through 5Q2. As shown, the VR-navigated snow removing robot system comprises: a snow-depth measurement subsystem 130; a propulsion/drive subsystem 131; a collision avoidance subsystem 132; digital camera subsystems 134 providing various (i.e. front, rear and side fields of views (FOVs); LED-based illumination subsystems 135 for illuminating these FOVs; a data communication subsystem 136 for interfacing with and communicating over the Internet infrastructure; a temperature & moisture measurement subsystem 137; snow-depth profiling subsystem 138; rechargeable/refuelable power storage subsystem 137; a VR-guided and auto-pilot navigation subsystem 139; a GPS navigation subsystem 140; and a control subsystem 141 for controlling and/or managing the operation of these subsystems during system operation.

In the illustrative embodiment, the VR-guided snow removing robot system 6 has a computing platform with backup batteries and network-connectivity (i.e. IP Address), and provided with native application software installed on the system as client application software designed to communicate over the system network and cooperate with application server software running on the application servers 17 of the system, thereby fully enabling the functions and services supported by the VR-guided snow removing robot system 6, as described above.

Except for the provision of its snow blowing tool 118', the snow removing robot system 6 is similar to snow removing robot system 6 described above.

Specification of Mobile Automated Snow Moving Robot System of the Present Invention FIG. 5N is a front perspective view of a first illustrative embodiment of the VR-guided (i.e. VR-navigated) snow removing robot system of the present invention represented in FIGS. 1 and 2A, and shown comprising a compact lightweight body, with a traction-type drive system powered by an electric motor (and/or fossil-fuel engine), and having a snow moving tool (e.g. snow shovel, snow blower, or the like) movable under hydraulic control, along with weatherized digital video camera systems providing field of views (FOVS) in the front and rear of the robotic vehicle, and having multi-band wireless radio control and communications, GPS-supported navigation and collision avoidance capabilities, allowing the vehicle to be safely operated by a human operator remotely situated in front a VR-guided workstation, wearing VR display goggles or viewing a stereoscopic-display panel, as illustrated in FIG. 7A through 7B3.

FIG. 5O is a block subsystem diagram for the VR-navigated snow removing robot systems of the present inventions illustrated in FIGS. 5N, 5P1, 5P2, 5P3, 5Q1 and 5Q2, shown comprising a snow-depth measurement subsystem, a propulsion/drive subsystem, collision avoidance subsystem, digital camera subsystems providing various (i.e. front, rear and side fields of views (FOVs), LED-based illumination subsystems for illuminating these FOVs, a data communication subsystem, a temperature & moisture measurement subsystem, snow-depth profiling subsystem, a VR-guided and auto-pilot subsystem, a GPS navigation subsystem, and a control subsystem for controlling and/or managing the operation of these subsystems during system operation.

FIG. 5P1 is a first rear perspective view of the VR-guided snow removing robot system of the present invention depicted in FIG. 5N, showing its snow shovel tool mounted to its front end, as well as being fully equipped with side, front and rear navigational camera systems, side, front and rear ranging sensors, a GPS receiver, RTK antenna, a 900 MHZ antenna, and a refuel/recharging port mounted in the rear of the system.

FIG. 5P2 is a second rear perspective view of the VR-guided snow removing robot system of the present invention depicted in FIG. 5N, showing side, front and rear navigational camera systems, side, front and rear ranging sensors, a GPS receiver, RTK antenna, a 900 MHZ antenna, and a refuel/recharging port mounted in the rear of the system.

FIG. 5P3 is a top perspective view of the VR-guided snow removing robot system of the present invention depicted in FIG. 5N, showing side, front and rear navigational camera systems, side, front and rear ranging sensors, a GPS receiver, a RTK antenna, a 900 MHZ antenna, and refuel/recharging port mounted in the rear of the system.

FIG. 5P4 is a perspective view of a building rooftop involved in the BIGADS system of the present invention, showing the snow shelter system of the present invention installed on the rooftop, and adapted for protecting the snow removing robot system of FIG. 5N, from snow and other forms of harsh outdoor weather, while refueling and recharging the robot system as required to satisfy its energy/power requirements.

FIG. 5P5 is a perspective view of the snow shelter system of the present invention shown installed on the rooftop in FIG. 5P4, wherein a snow removing robot system shown in FIG. 5N is parked out of the reach of snow and other forms of harsh outdoor weather, while the refueling and recharging ports of the robot system are docked with the refueling/recharging port of the snow shelter system.

FIG. 5P6 is a perspective view of the snow shelter system of the present invention shown installed on the rooftop in FIG. 5P2, wherein no snow removing robot system is parked, revealing the refueling/recharging port of the snow shelter system.

FIG. 5Q1 is a rear perspective view of a second illustrative embodiment of the VR-guided snow removing robot system of the present invention, showing a snow blowing tool mounted to its front end, as well as being fully equipped with side, front and rear navigational camera systems, side, front and rear ranging sensors, a GPS receiver, a RTK antenna, a 900 MHZ antenna, and a refuel/recharging port mounted in the rear of the vehicular system.

FIG. 5Q2 is a front perspective view of the VR-guided snow removing robot system of the present invention depicted in FIG. 5Q1, showing side, front and rear navigational camera systems, side, front and rear ranging sensors, a GPS receiver, a RTK antenna, a 900 MHZ antenna, and a refuel/recharging port mounted in the rear of the vehicular system.

Typically, the VR-enabled control-station 7B used to navigate and operate a VR-guided snow removing robot system 6 on a building rooftop will also support remote control and operation of the automated snow conveying tunnel system 5 illustrated in FIG. 5A. In a coordinated manner, a single remote operator will operate and control both the VR-guided snow removing robot system 6 and the automated snow conveying tunnel system 5. However, in other situations, two or more remote operators can be used to two or more VR-enabled control stations 7A, 7B to safely orchestrate rooftop snow removal operations to remove dangerous snow load conditions detected by the snow load monitoring systems 4.

Figure 6B:
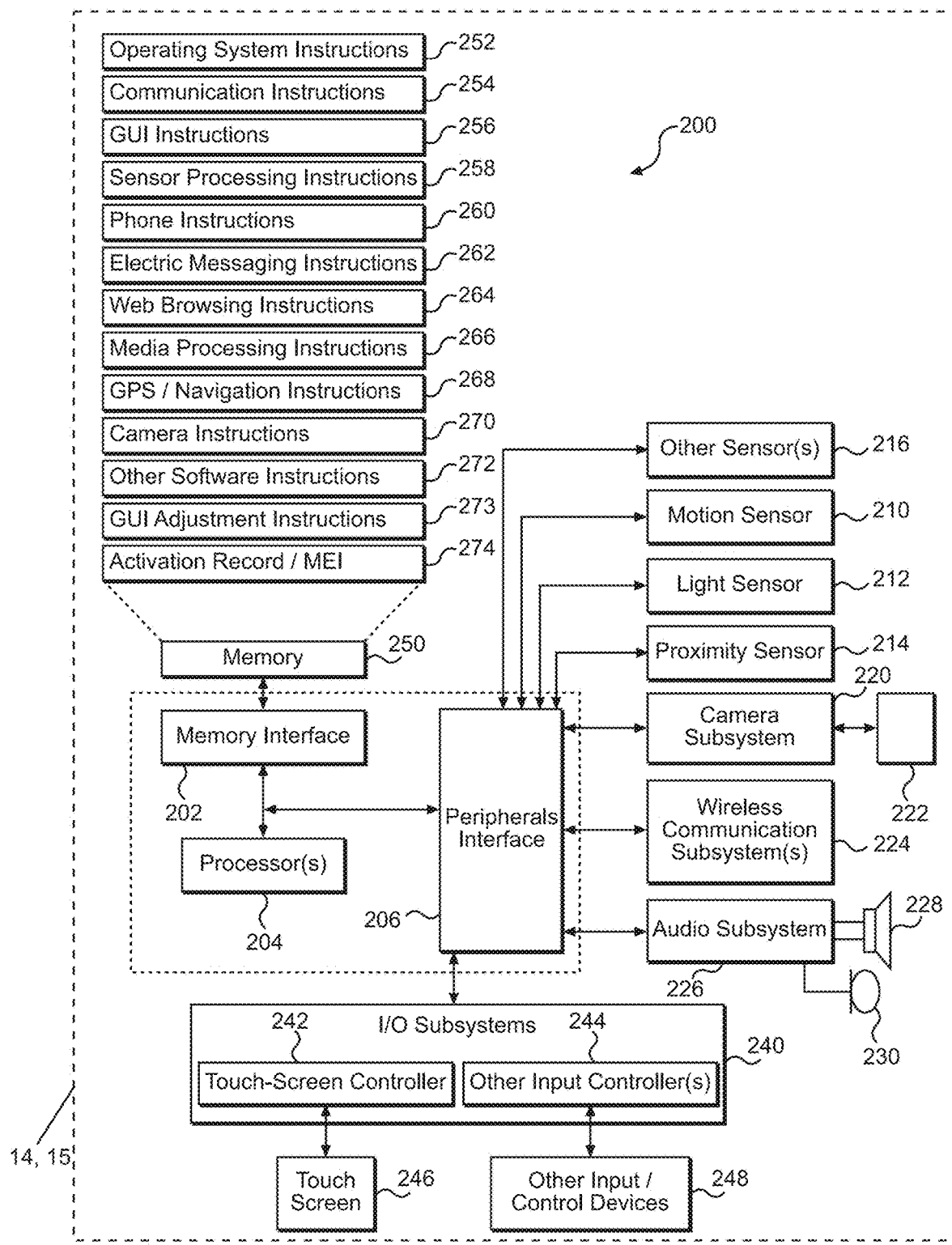
FIG. 6B is a subsystem block schematic diagram of the mobile augmented-reality (AR) based rooftop navigation and inspection system illustrated in FIGS. 6A and 6A1.
Figure 6C:
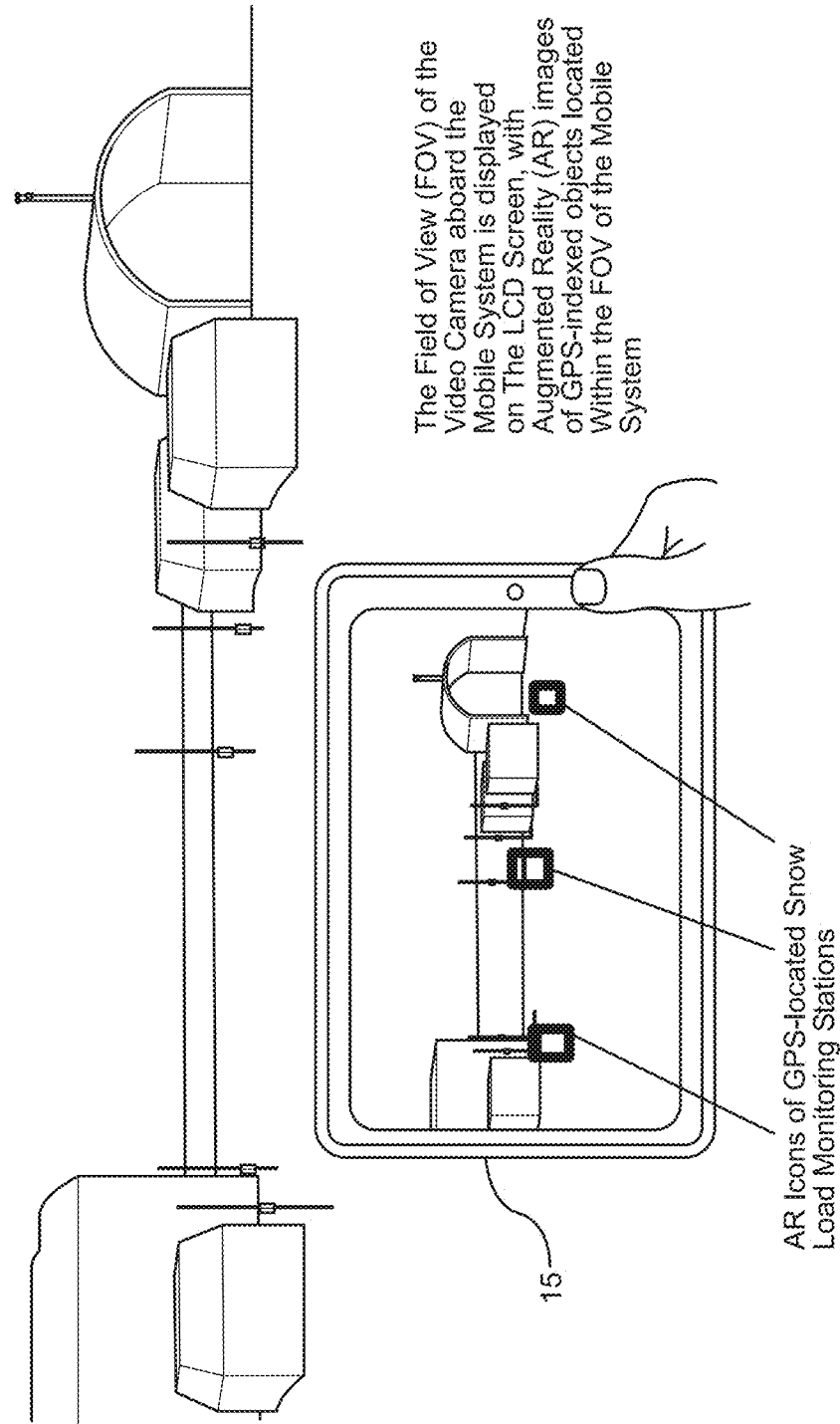
FIG. 6C is a schematic representation of an exemplary display screen of the augmented-reality (AR) based rooftop navigation and inspection system illustrated in FIGS. 6A and 6A1, showing AR images containing graphical icons indicating the GPS location of snow load monitoring systems mounted on the rooftop, and possibly buried in snow cover.

Specification of the Hand-Held AR-Enabled Rooftop Navigation and Inspection System of the Present Invention FIGS. 6A and 6A1 shows a building rooftop registered on the BIGADS system network, and on which a human operator/inspector, carrying a hand-held mobile augmented-reality (AR) based rooftop navigation and inspection system 114 shown in FIG. 6C, is standing up and viewing the rooftop 2 through the field of view (FOV) of the digital video camera 220 aboard the hand-held rooftop navigation and inspection device 114, while GPS-indexed icons of rooftop-mounted snow load measuring systems/stations 4 are displayed on the LCD display panel 246 to assist the operator while navigating the rooftop, inspecting the situation, and identifying where snow load monitoring stations (SLMS) 4 have been installed and where excessive snow loads have been automatically detected and reported to building management and maintenance team members by the BIGADS system 1.

FIG. 6B shows the subsystem architecture of the mobile AR-based rooftop navigation and inspection system 14 illustrated in FIGS. 6A and 6A1. As shown, the mobile device 114 can include a memory interface 202, one or more data processors, image processors and/or central processing units 204, and a peripherals interface 206. The memory interface 202, the one or more processors 204 and/or the peripherals interface 206 can be separate components or can be integrated in one or more integrated circuits. The various components in the mobile device can be coupled by one or more communication buses or signal lines. Sensors, devices, and subsystems can be coupled to the peripherals interface 206 to facilitate multiple functionalities. For example, a motion sensor 210, a light sensor 212, and a proximity sensor 214 can be coupled to the peripherals interface 206 to facilitate the orientation, lighting, and proximity functions. Other sensors 216 can also be connected to the peripherals interface 206, such as a positioning system (e.g., GPS receiver), a temperature sensor, a biometric sensor, a gyroscope, or other sensing device, to facilitate related functionalities. A camera subsystem 220 and an optical sensor 222, e.g., a charged coupled device (CCD) or a complementary metal-oxide semiconductor (CMOS) optical sensor, can be utilized to facilitate camera functions, such as recording photographs and video clips. Communication functions can be facilitated through one or more wireless communication subsystems 224, which can include radio frequency receivers and transmitters and/or optical (e.g., infrared) receivers and transmitters. The specific design and implementation of the communication subsystem 224 can depend on the communication network(s) over which the mobile device 8B, 8C is intended to operate. For example, a mobile device 100 may include communication subsystems 224 designed to operate over a GSM network, a GPRS network, an EDGE network, a Wi-Fi or WiMax network, and a Bluetooth™ network. In particular, the wireless communication subsystems 224 may include hosting protocols such that the device 100 may be configured as a base station for other wireless devices. An audio subsystem 226 can be coupled to a speaker 228 and a microphone 230 to facilitate voice-enabled functions, such as voice recognition, voice replication, digital recording, and telephony functions. The I/O subsystem 240 can include a touch screen controller 242 and/or other input controller(s) 244. The touch-screen controller 242 can be coupled to a touch screen 246. The touch screen 246 and touch screen controller 242 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 246. The other input controller(s) 244 can be coupled to other input/control devices 248, such as one or more buttons, rocker switches, thumb-wheel, infrared port, USB port, and/or a pointer device such as a stylus. The one or more buttons (not shown) can include an up/down button for volume control of the speaker 228 and/or the microphone 230. Such buttons and controls can be implemented as a hardware objects, or touch-screen graphical interface objects, touched and controlled by the system user. Additional features of device can be found in U.S. Pat. No. 8,631,358 incorporated herein by reference in its entirety.

In the illustrative embodiment, the mobile augmented-reality (AR) based rooftop navigation and inspection system 14 will be provided with a web-based or native application software installed on the system as client application software designed to communicate over the system network and cooperate with application server software running on the application servers 17 of the system, thereby fully enabling the functions and services supported by the AR-based rooftop navigation and inspection system 14, as described hereinbelow.

FIG. 6C shows an exemplary display screen of the augmented-reality (AR) based rooftop navigation and inspection system 14 held in the hands of a human inspector on a building rooftop, showing AR images containing graphical icons indicating the GPS location of snow load monitoring systems 4 mounted on the rooftop, and possibly buried in deep snow cover.

FIG. 6D describes a method of monitoring rooftop snow loads using the mobile augmented-reality (AR) based rooftop navigation and inspection system 14 illustrated in FIGS. 6A and 6A1, comprising the steps of: (a) receiving a snow load alarm notification from the BIGADS system 1, and accessing a hand-held AR-guided rooftop navigation and inspection system 14; (b) holding the hand-held AR-guided rooftop navigation and inspection system 14 on the operator's hand, viewing the device's field of view (FOV) while (i) observing augmented reality (AR) icons of GPS-indexed snow load measuring stations 4 on the rooftop to help find and locate these stations when buried deep in snow, (ii) inspecting rooftop conditions, (iii) making audio and video recordings of the rooftop, and (iv) taking notes and linking the same to the snow load alarm event; and (c) finally sending the operator's snow load event inspection report to the system database 18 where then the building management and maintenance team members can access and report the report, and determine a plan of resolution for the snow load alarm event (e.g. make and execute a snow removal plan).

The augmented reality (AR) capabilities of the hand-held AR-guided rooftop navigation and inspection system 14 are provided using conventional techniques known in the art and generally disclosed in U.S. Pat. Nos. 8,593,464, 9,283,483, and 9, 286, 725, incorporated herein by reference in their entirety Specification of Illustrative Embodiment of the VR-Guided System for Remotely Monitoring and Removing Excessive Snow Loads from Specified Building Rooftop Surfaces of the Present Invention FIG. 7A illustrates an automated system 40 for monitoring, detecting and removing excessive snow loads from building rooftop surfaces using the VR-guided snow removing robot system 6, guided and controlled by an remotely-situated human operator 154 working before an snow removing robot operation control station 7A supporting virtual reality (VR) and augmented-reality (AR) viewing experiences, as illustrated in FIG. 7B3.

FIG. 7B1 illustrates the subsystem architecture of the virtual and augmented reality supported snow robot operation control station 7A illustrated in FIGS. 7B1 and 7B2, comprising: a stereoscopic 3D display subsystem 151; a network communication subsystem 152; data keyboard and mouse 153; 3D controllers 154; motion trackers (e.g. head tracker, eye tracker, face-tracker, 3D gloves) 153; an audio subsystem 156 with pre-amplification, amplification and audio-speakers: VR control console subsystem 158; a RAID subsystem 157 for local storage; and processor and memory subsystem 159, configured as shown.

In the illustrative embodiment, the VR/AR-enabled control station 7A has a computing platform with backup battery support and network-connectivity (i.e. IP Address), and is provided with native application software installed on the system as client application software designed to communicate over the system network and cooperate with application server software running on the application servers 17 of the system, thereby fully enabling the functions and services supported by the VR/AR-enabled control station 7A, as described above.

FIG. 7B2 shows a pair of stereoscopic VR-enabled viewing goggles 150 adapted for with the AR/VR-enabled control station 7A illustrated in FIGS. 7A and 7B. FIG. 7B3 shows the display screen supported on the virtual and augmented-reality enabled snow robot operation control station 7A illustrated in FIGS. 7B1 and 7C, showing split screens displaying (i) the front and rear field of views (FOVs) of the digital video cameras 120A-120D aboard the VR-guided snow removing robot system 6, and (ii) the videos and images captured by the unmanned snow depth measuring aircraft system 8 to help the operator safely navigate on the snow-covered rooftop during rooftop snow removal operations.

Figure 8B:
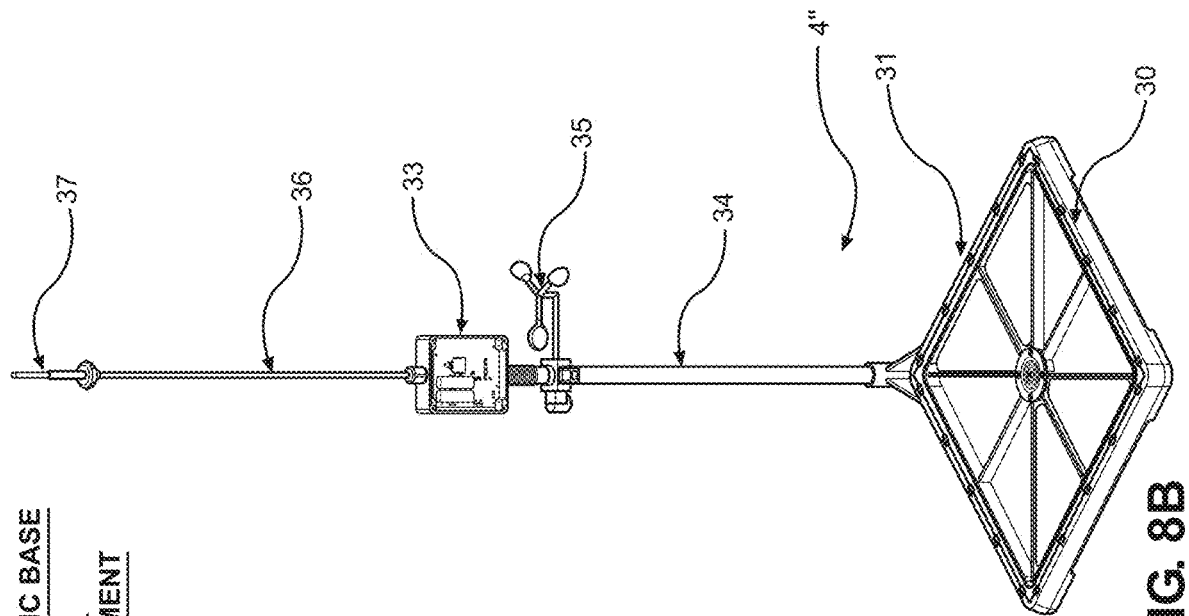
FIG. 8B is a perspective view of the second illustrative embodiment of the snow load monitoring system of the present invention illustrated in FIG. 8A, with its weigh plate (i.e. weigh panel) removed from its injection-molded plastic base station.
Figure 8A:
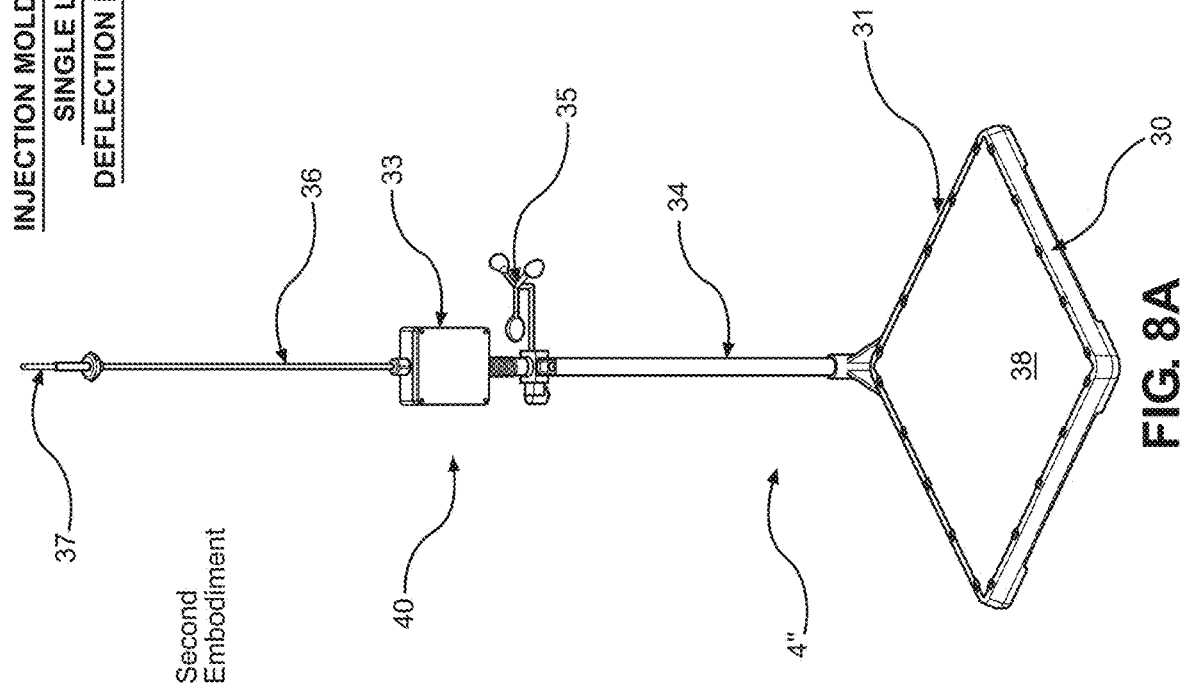
FIG. 8A is a perspective view of the second illustrative embodiment of the snow load monitoring system of the present invention, comprising (i) an injection-molded plastic base station designed for measuring snow load on its surface using a single load cell configured in a deflection method of measurement, (ii) a control, data processing and communication module supported on a vertical mast/post mounted to the base station, and (iii) a whip antenna terminated with a stroboscopic illumination module and flexible photo-voltaic (PV) panel wrapped about the vertical mast.

Specification of the Second Illustrative Embodiment of the Snow Load Monitoring System of the Present Invention FIG. 8A shows the second illustrative embodiment of the snow load monitoring system 4″ comprising: (i) an injection-molded plastic base station 30 designed for measuring snow load on its surface using a single load cell 32 configured in a deflection method of measurement; (ii) a control, data processing and communication module 33 supported on a vertical mast/post 34 mounted to the base station 31; and (iii) a whip antenna 36 terminated with a stroboscopic illumination module 37 and flexible photo-voltaic (PV) panel 40 wrapped about the vertical mast 34.

FIG. 8B shows the second illustrative embodiment of the snow load monitoring system 4″ illustrated in FIG. 8A, with its weigh plate (i.e. weigh panel) 38 removed from its injection-molded plastic base station 31.

Figure 8D:
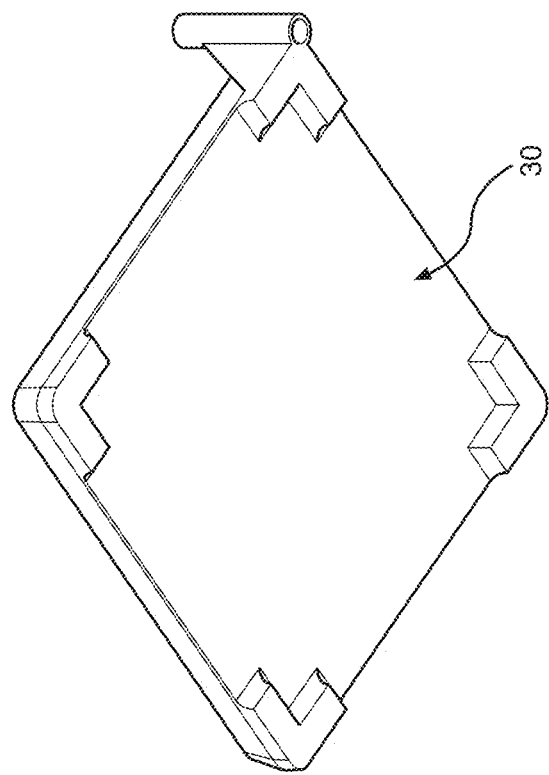
FIG. 8D is a perspective bottom view of the plastic base station component removed from the second illustrative embodiment of the snow load monitoring system of the present invention shown in FIG. 8A.
Figure 8C:
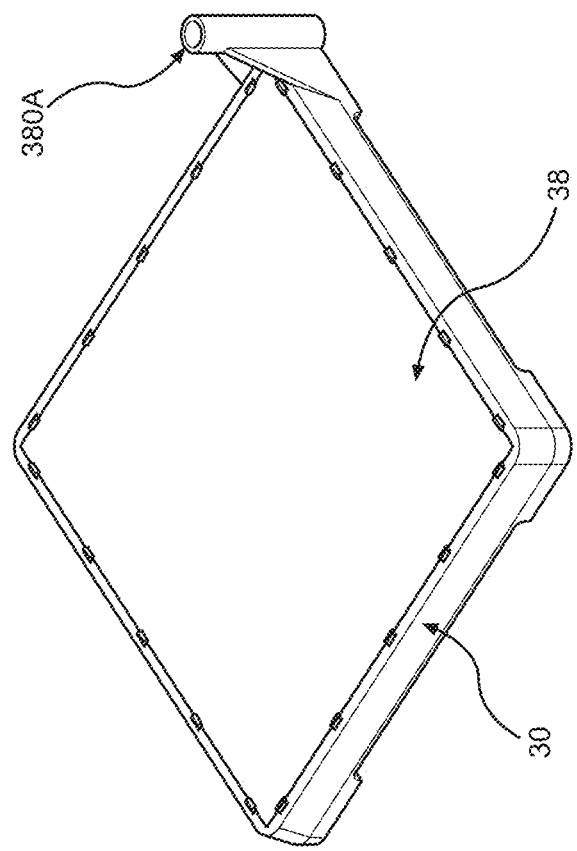
FIG. 8C is a perspective top view of the plastic base station component removed from the second illustrative embodiment of the snow load monitoring system of the present invention shown in FIG. 8A.

FIG. 8C shows the plastic base station component 31 removed from the second illustrative embodiment of the snow load monitoring system 4″ shown in FIG. 8A.

FIG. 8D shows the plastic base station component 31 removed from the second illustrative embodiment of the snow load monitoring system 4″ shown in FIG. 8A.

Figure 8E:
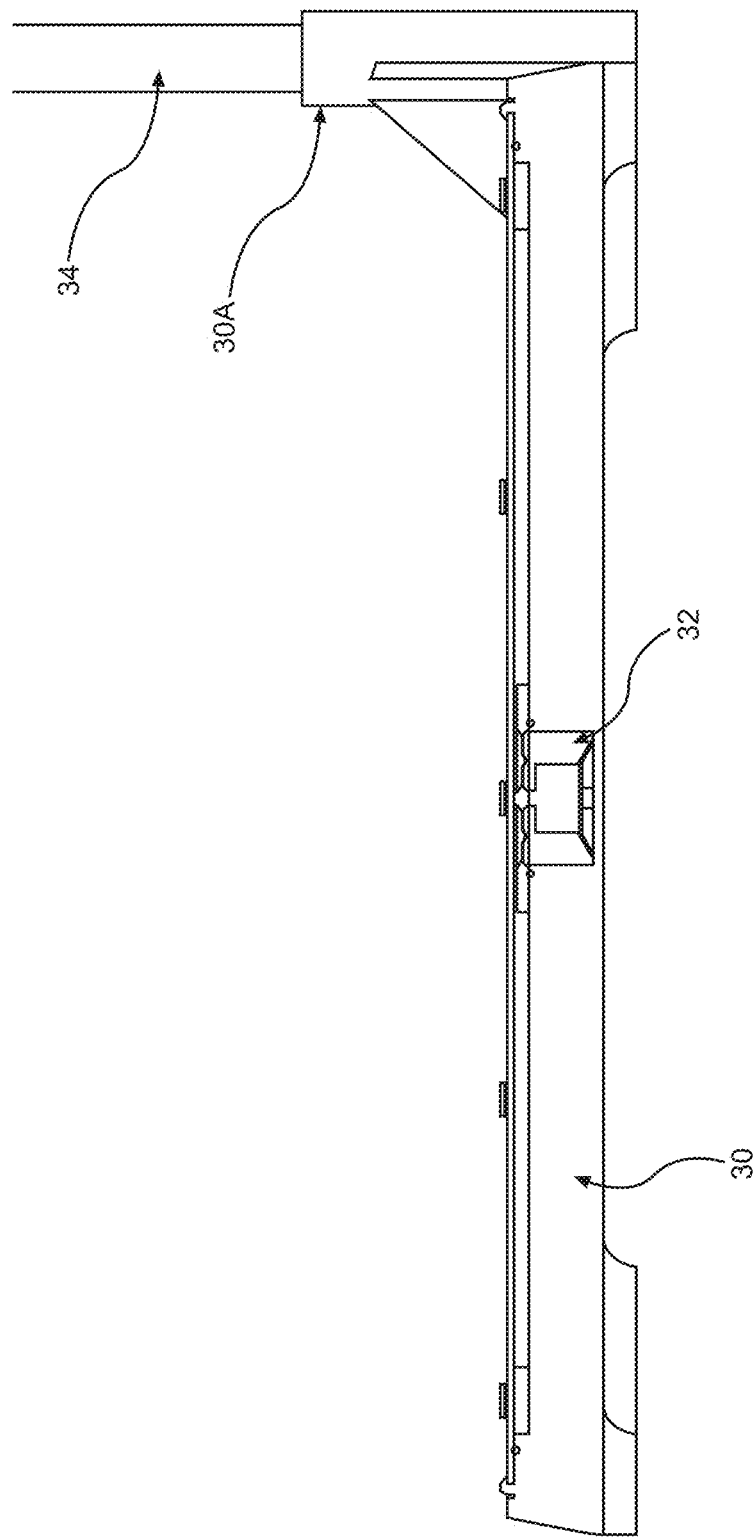
FIG. 8E is an elevated side view of the plastic base station component removed from the second illustrative embodiment of the now load monitoring system of the present invention shown in FIG. 8A.

FIG. 8E shows the plastic base station component removed from the second illustrative embodiment of the snow load monitoring system 4″ shown in FIG. 8A.

FIG. 8F shows the second illustrative embodiment of the snow load monitoring system 4″ comprising: (i) an injection-molded plastic base station 31 designed for measuring snow load on its weigh surface 38 using a single load cell 32 configured in a deflection method of measurement; (ii) a control, data processing and communication module 33 supported on a vertical mast/post 34 mounted to the base station 30; and (iii) a whip antenna 36 terminated with a stroboscopic illumination module 37 and flexible photo-voltaic (PV) panel 40 wrapped about the vertical mast 34.

FIG. 8G shows the plastic base portion component of the second illustrative embodiment of the snow load monitoring system 4″ comprising: base station 30 and its single load cell 32 and trapezoidal-shaped lead weights 39 for providing stability to the snow load measurement system 4″ on windy building rooftop surfaces 2.

During operation of the snow load monitoring station 4″, the force imposed on the weigh plate by the snow at any given moment in time is transferred through the weigh plate to the force sensor(s) so as to generate an electrical signal that is calibrated to provide an accurate representation of the magnitude of the force applied by the gravitational load on the weigh plate. At the same time, the wind speed and direction instrument measures these wind characteristics and generate electrical signal(s) encoded with such wind-related information. The temperature sensors (and barometric pressure sensors if provided) also take environmental measurements and encode such gathered information onto electrical signals. All of these electrical signals are transmitted to the microprocessor/microcontroller for processing and encoding onto the digital carrier signal generated by the communication module of the station, for wireless transmission to the communication, application and database servers maintained at the data center 10 of the system. Digital images are also captured periodically by onboard digital cameras and transmitted to the programmed microprocessor (i.e. subsystem controller) for storage and processing to support the various services delivered over the system network of the present invention.

While excessive snow load measurements and alerts are preferably determined within the application servers of the data center 10, it is possible in some embodiments for such determinations to be computed locally within the snow load monitoring station, and for the alerts to be sent to the data center 10 for communication among building management and maintenance team members, in accordance with the spirit of the present invention. Also, the stroboscopic LED illumination module mounted on top of the radio whip antenna of the station can be operated periodically, or under the control of the data center 10 to control battery power aboard each snow load monitoring station deployed on a building rooftop. For example, after a deep snow load, the stroboscopic LED illumination module could be activated from the data center, via manager control, to assist building managers and maintenance workers while conducting rooftop inspections as well as snow removing operations. On board collision avoidance signal generation can also be activated by remote control from the data center 10 to assist in preventing collisions between snow removing robot systems 6 and snow load monitoring stations 4″ buried deep beneath the snow.

Figure 9B:
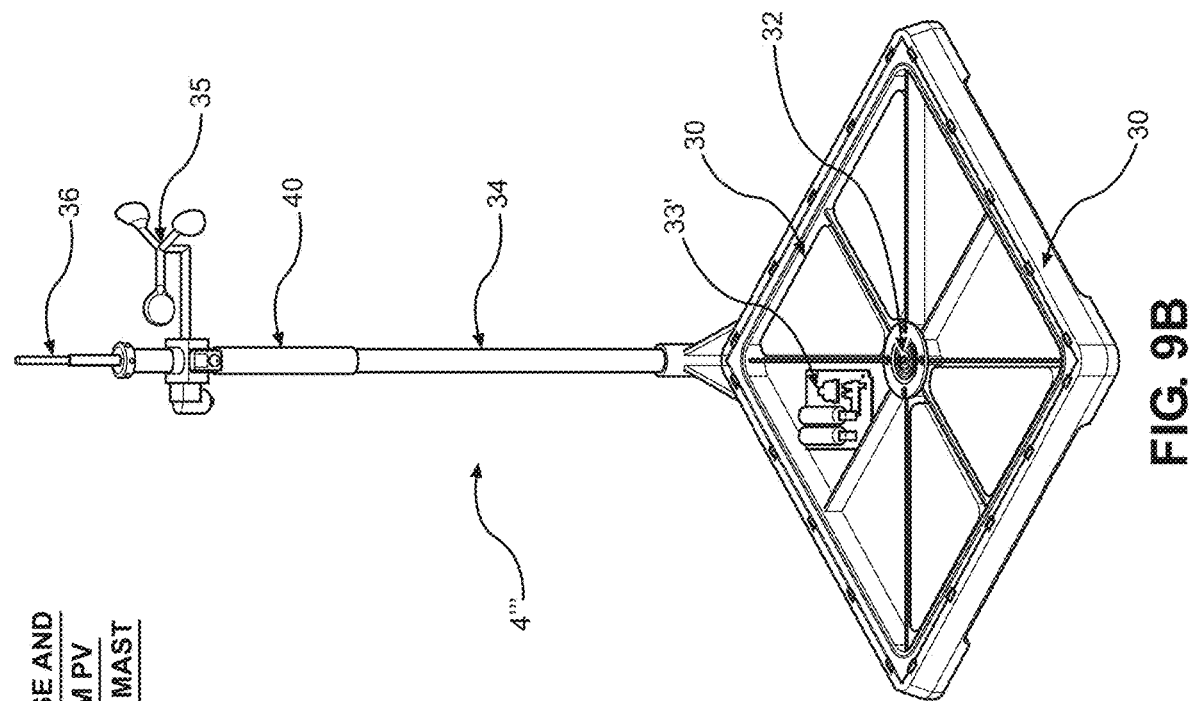
FIG. 9B is a perspective view of the third illustrative embodiment of the snow load monitoring system of the present invention, showing its weigh plate (i.e. panel) removed to reveal its PCB-based control, data processing and communication module mounted inside the base station, while its thin-film photo-voltaic (PV) panel wrapped about the mast or pole of the system.
Figure 9A:
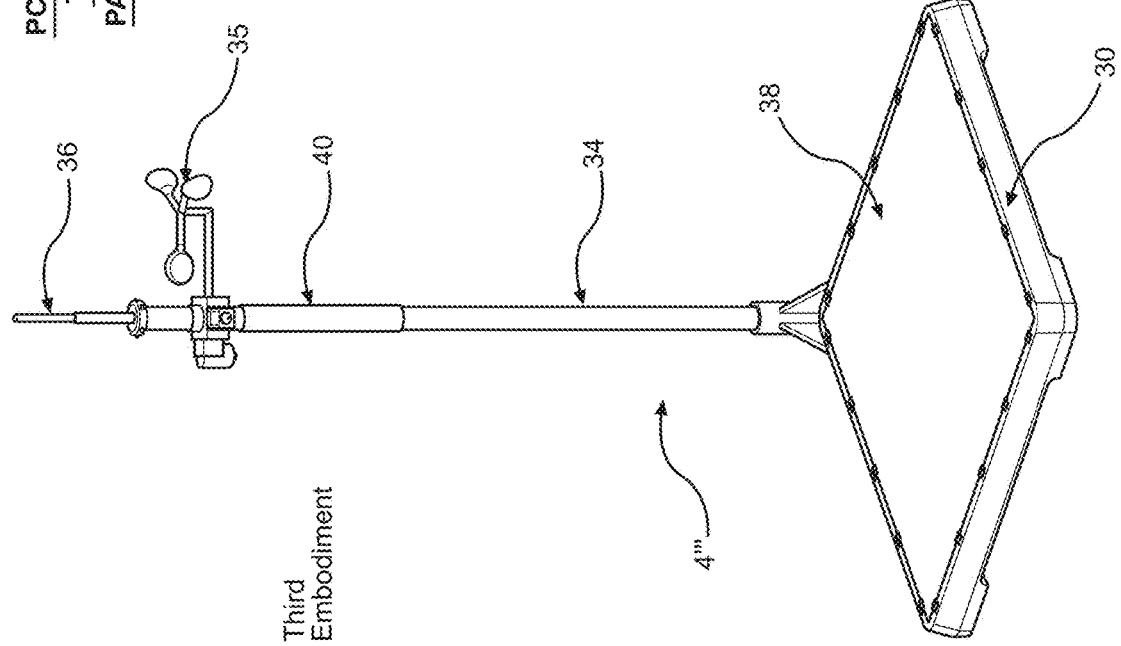
FIG. 9A is a perspective view of the third illustrative embodiment of snow load monitoring system of the present invention, showing the base station supporting a wind speed and direction instrument mounted on a mast, about which a thin-film photo-voltaic (PV) panel is wrapped for solar energy collection while offering minimal wind resistance to the rooftop-mounted system.

Specification of Third Illustrative Embodiment of the Snow Load Monitoring System of the Present Invention FIG. 9A shows the third illustrative embodiment of snow load monitoring system 4‴ comprising: a base station 30 supporting a wind speed and direction instrument 35 mounted on a vertical mast 34, about which a thin-film photo-voltaic (PV) solar energy collection panel 40 is wrapped for solar energy collection while offering minimal wind resistance to the rooftop-mounted system.

FIG. 9B shows the third illustrative embodiment of the snow load monitoring system 4‴ with its weigh plate (i.e. panel) 39 removed to reveal PCB-based control, data processing and communication module 33 mounted inside the base station 30, while its thin-film photo-voltaic (PV) panel 40 is wrapped about the mast or pole structure 34 of the system.

Figure 9C:
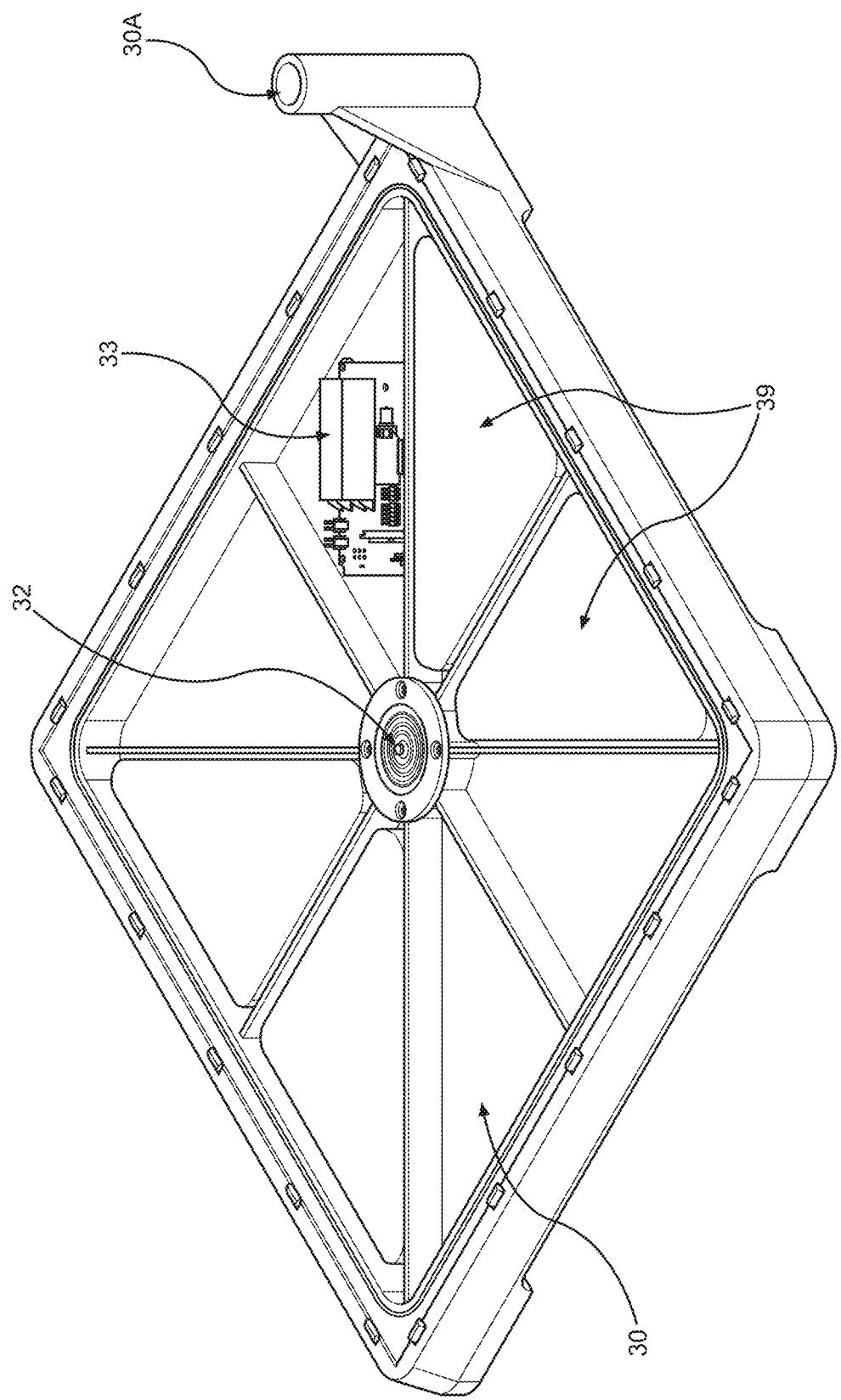
FIG. 9C is a perspective view of plastic base portion component of the third illustrative embodiment of the snow load monitoring system of the present invention, with its weigh panel removed to reveal its single load cell mounted in the center of the base station according to a deflection measurement method, and a PCB-based control/computing module mounted inside the base station.

FIG. 9C shows the weigh panel removed to reveal its single load cell 32 mounted in the center of the base station according to a deflection measurement method, and a PCB-based control, data processing and communication module 33 mounted inside the base station.

Figure 10:
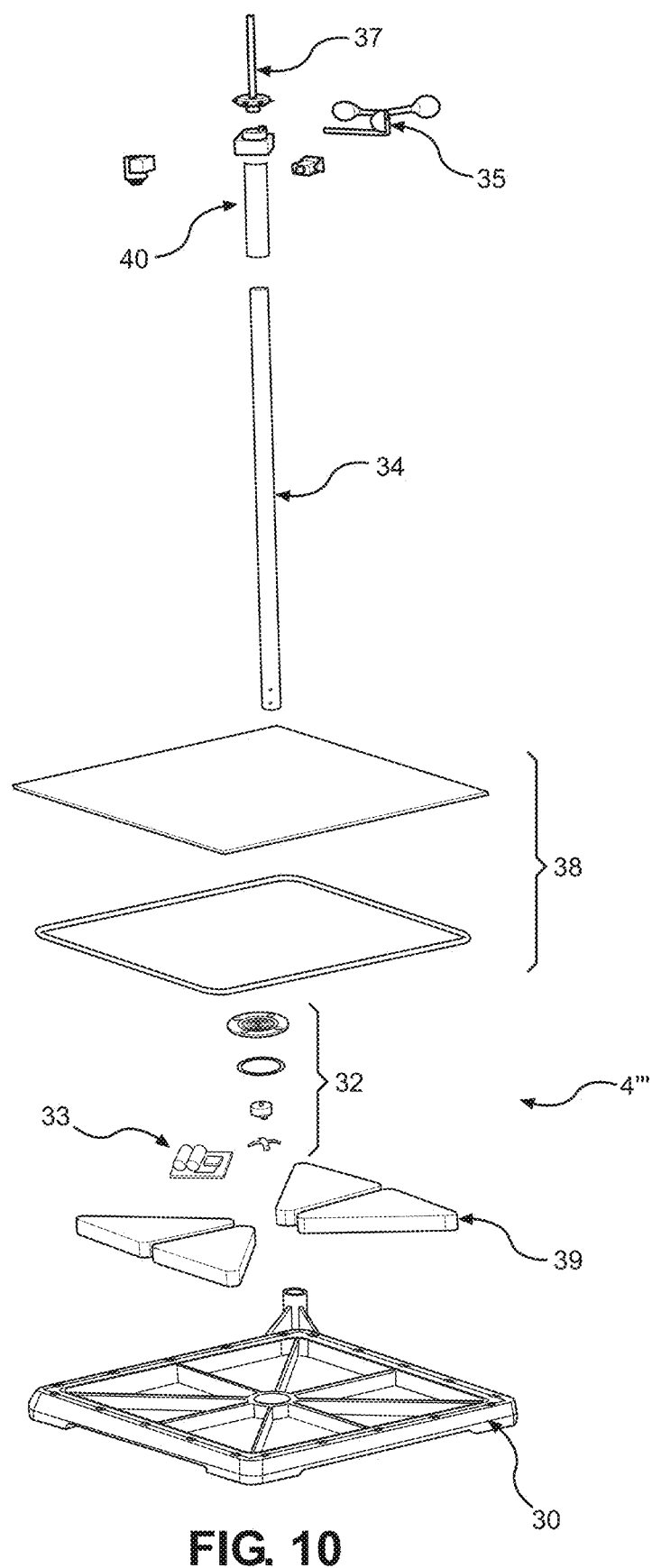
FIG. 10 is an exploded view of plastic base portion component of the third illustrative embodiment of the snow load monitoring system of the present invention, shown comprising a flexible weight panel, a single load cell mounted in the center of a base station according to a deflection measurement method, a PCB-based control/computing module mounted inside the base station, trapezoidal-shaped weights for mounting in matched recesses in the base station, a mast for mounting in a hole in the base portion, and a wind speed and direction instrument mounted on the mast with a stroboscopic illumination module mounted at the distal portion of the mast.

FIG. 10 shows the third illustrative embodiment of the snow load monitoring system 4‴ as comprising: a flexible weight panel 38; a single load cell 32 mounted in the center of a base station according to a deflection measurement method; a PCB-based control, data processing (i.e. computing) and communication module 33 mounted inside the base station; trapezoidal-shaped weights 39 for mounting in matched recesses in the base station; mast structure 34 for mounting in a hole 29A in the base portion; and a wind speed and direction instrument 35 mounted on the mast structure 34 with a stroboscopic illumination module 37 mounted at the distal portion of the mast structure 34.

Figure 11:
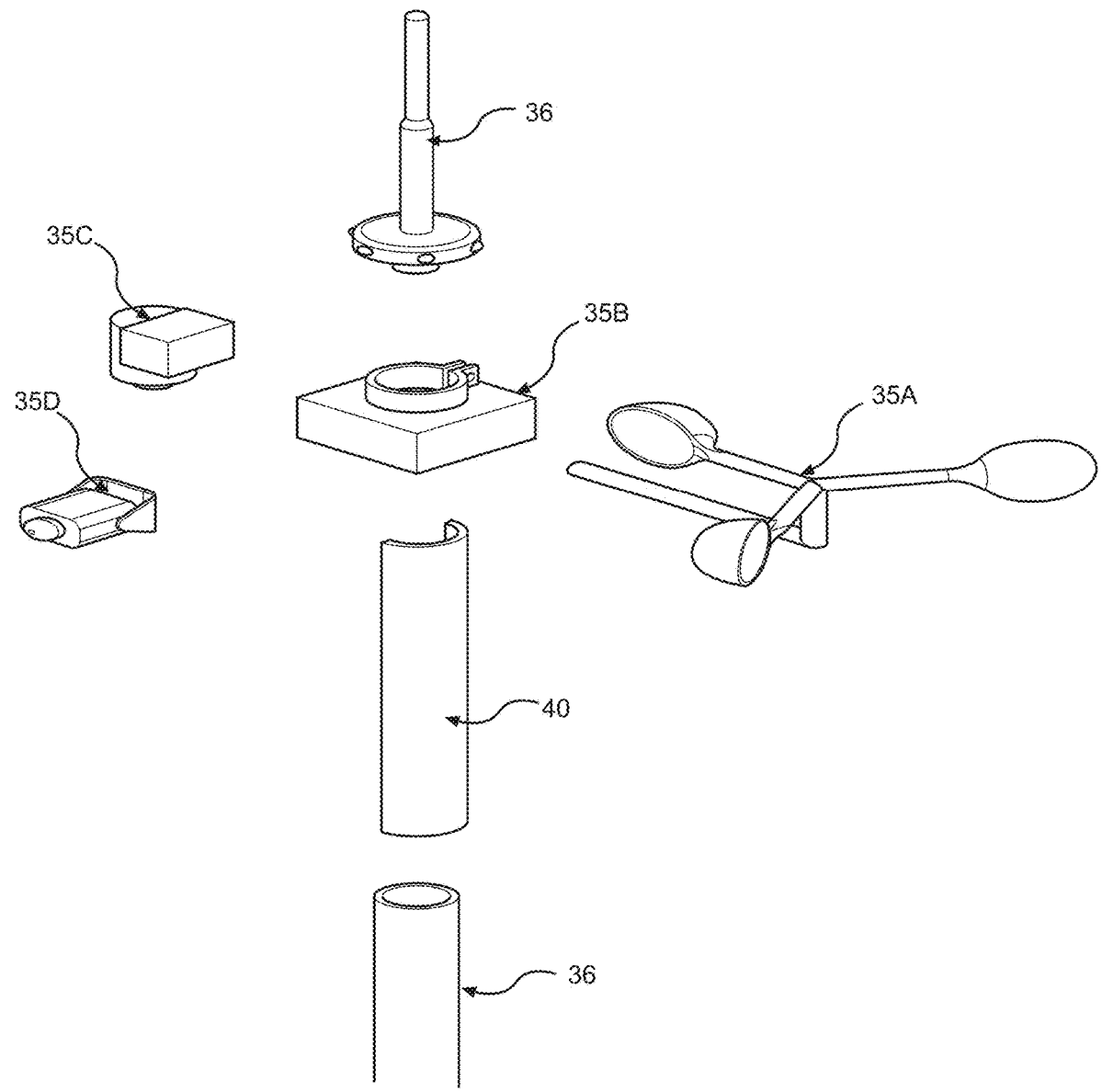
FIG. 11 is an exploded view of the wind speed and direction instrument mounted on the mast of the third illustrative embodiment of the snow load monitoring system of the present invention, comprising the wind speed and direction measuring module coupled to a stroboscopic illumination module that is mounted on the top of the instrument.

FIG. 11 shows the wind speed and direction instrument 35 mounted on the mast of the snow load monitoring system 4‴, and comprising: the wind speed and direction measuring module 35 coupled to a stroboscopic illumination module 37 that is mounted on the top of the instrument housing. During operation, digital signals generated by the wind speed and direction module 35 are provided to the data communication module 33 under the control of the subsystem controller, enabling wireless data packet transmission over the system communication network.

During operation of the snow load monitoring station 4‴, the force imposed on the weigh plate by the snow at any given moment in time is transferred through the weigh plate to the force sensor(s) so as to generate an electrical signal that is calibrated to provide an accurate representation of the magnitude of the force applied by the gravitational load on the weigh plate. At the same time, the wind speed and direction instrument measures these wind characteristics and generate electrical signal(s) encoded with such wind-related information. The temperature sensors (and barometric pressure sensors if provided) also take environmental measurements and encode such gathered information onto electrical signals. All of these electrical signals are transmitted to the microprocessor/microcontroller for processing and encoding onto the digital carrier signal generated by the communication module of the station, for wireless transmission to the communication, application and database servers maintained at the data center 10 of the system. Digital images are also captured periodically by onboard digital cameras and transmitted to the programmed microprocessor (i.e. subsystem controller) for storage and processing to support the various services delivered over the system network of the present invention.

While excessive snow load measurements and alerts are preferably determined within the application servers of the data center 10, it is possible in some embodiments for such determinations to be computed locally within the snow load monitoring station, and for the alerts to be sent to the data center 10 for communication among building management and maintenance team members, in accordance with the spirit of the present invention. Also, the stroboscopic LED illumination module mounted on top of the radio whip antenna of the station can be operated periodically, either under local automatic control, or remote control by the data center 10, thereby conserving battery power aboard each snow load monitoring station 4''' deployed on a building rooftop. For example, after a deep snow load, the stroboscopic LED illumination module could be activated from the data center, via manager control, to assist building managers and maintenance workers while conducting rooftop inspections as well as snow removing operations. On board collision avoidance signal generation can also be activated by remote control from the data center 10 to assist in preventing collisions between snow removing robot systems 6 and snow load monitoring stations 4''' buried deep beneath the snow.

Figure 12A:
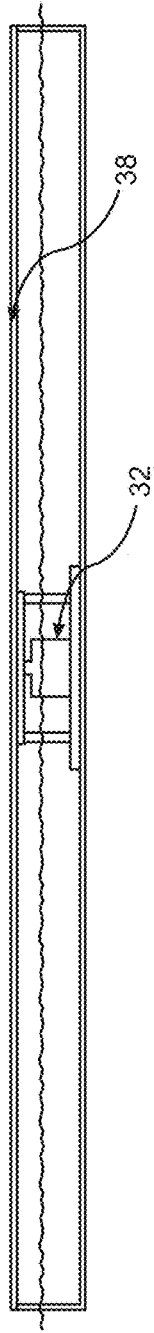
FIGS. 12A, 12B and 12C set forth a series of cross-sectional views of the fourth illustrative embodiment of the base station of the present invention, wherein a single load cell is configured according to a deflection method of measuring distributed snow loads, progressively showing from FIG. 12A to FIG. 12B to FIG. 12C, precisely how the flexible weigh panel deflects in response to the application of a spatially-distributed snow load, and the single load center mounted in the center of the base station responds to the applied snow load, and deflection of the flexible weigh panel, and generates electrical signals corresponding to the intensity of the distributed snow load.
Figure 12B:
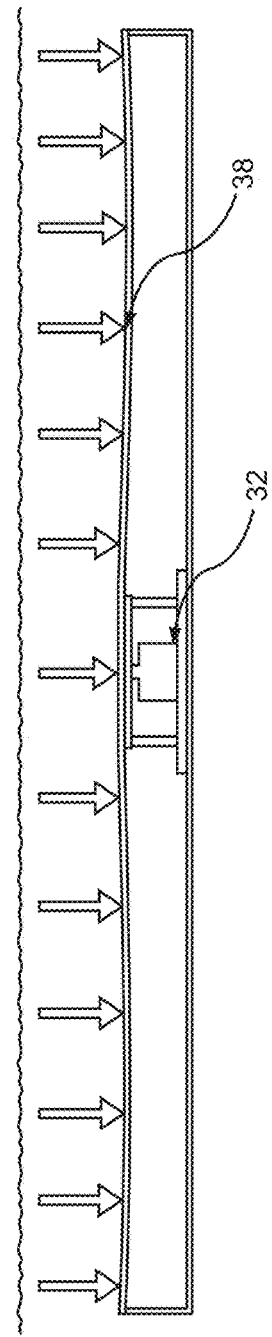

FIGS. 12A and 12B show the snow load monitoring system of the fourth illustrative embodiment 4'''', wherein the PCB-based control and communication module 4'''' is mounted inside the base station 30, while thin-film photovoltaic panel 40 is mounted on the top surface of the weigh panel 38, and the wind speed and direction module 35 and stroboscopic illumination module 37 are mounted at the distal portion of its vertically supported mast structure.

Figure 12C:
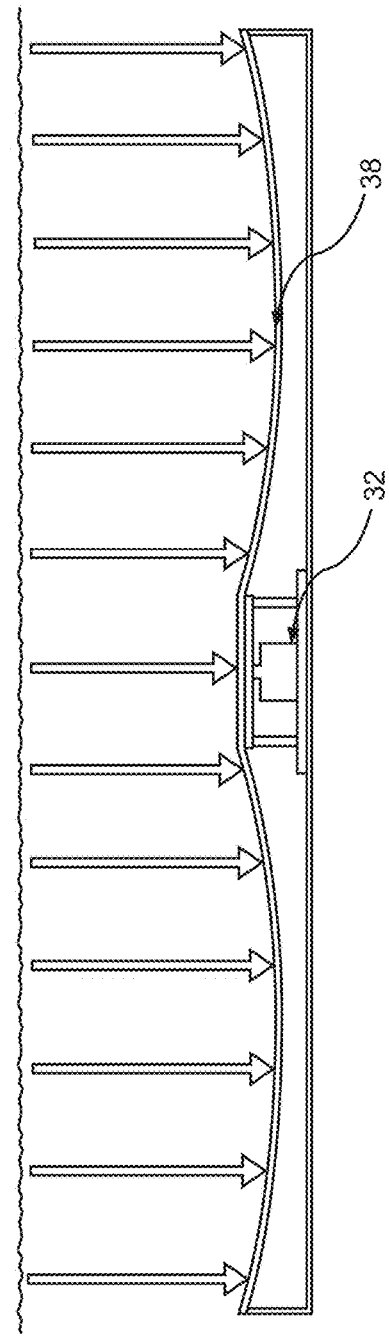
Figure 13B:
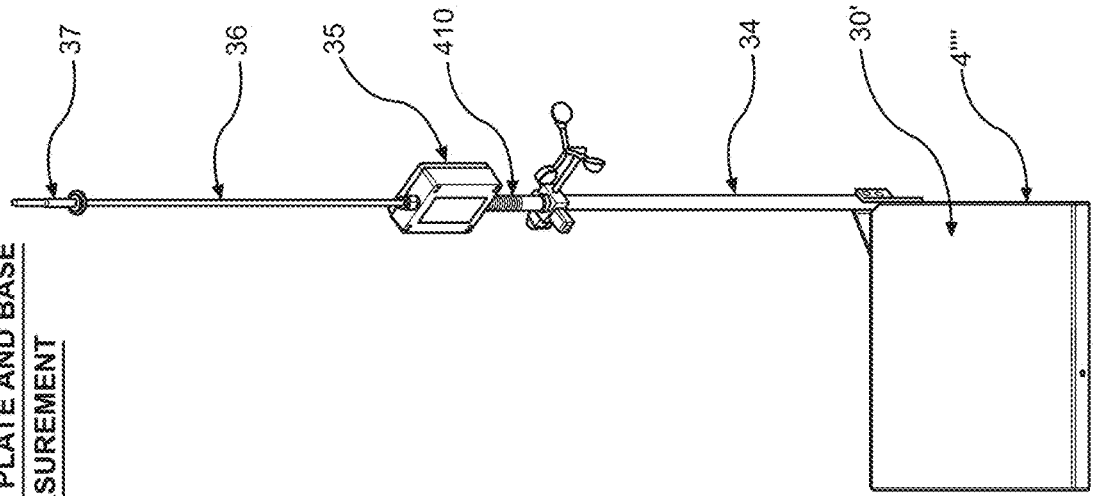
FIGS. 13A, 13B, 13C and 13D show perspective views of the upper portion of the mast-mounted control, data processing and communication module, interfaced with the wind speed and direction and direction instrument and stroboscopic illumination module assembly of the present invention employed in the second illustrative embodiment of the snow load monitoring system of the present invention.
Figure 13A:
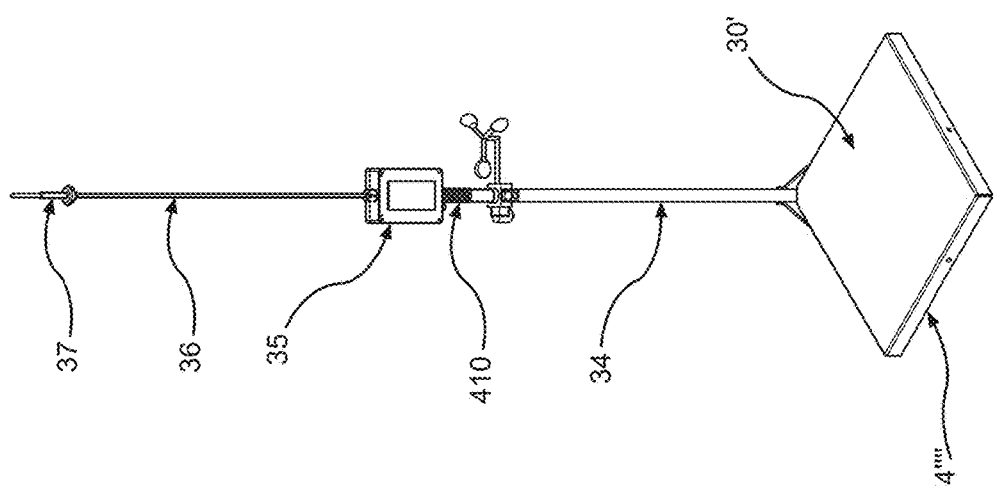
Figure 13D:
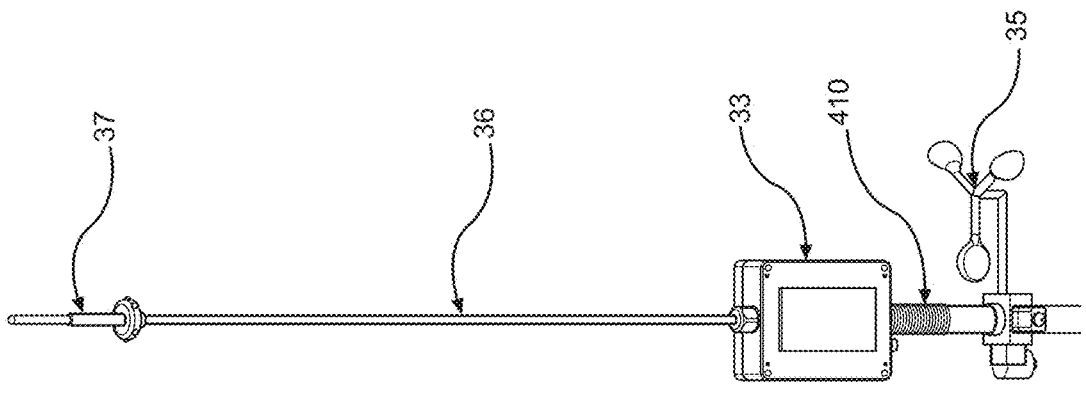
Figure 13C:
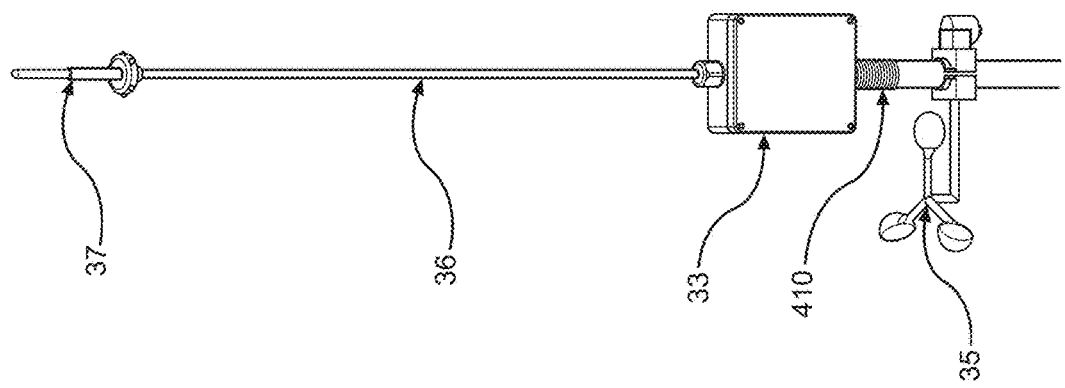
Figure 13E:
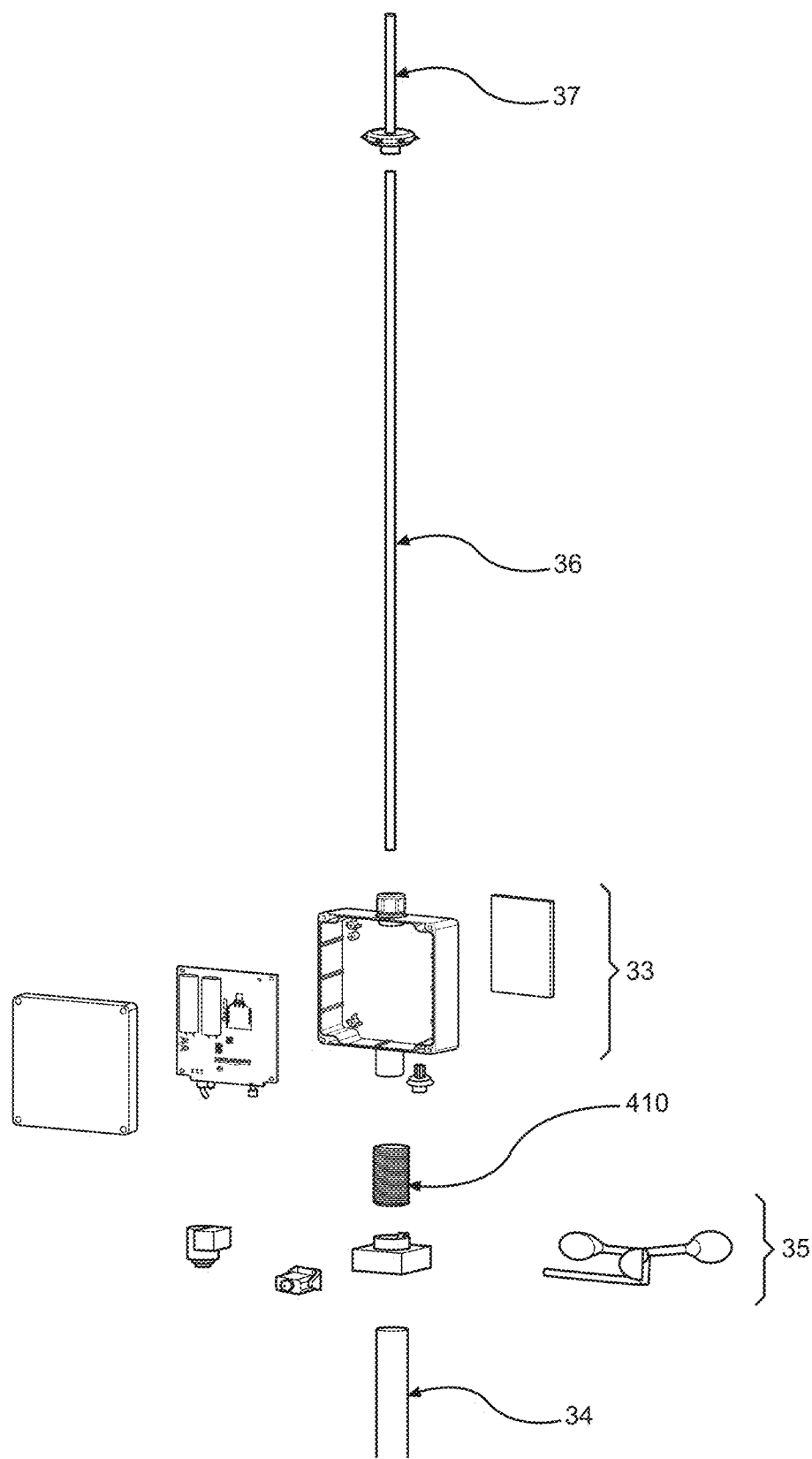
FIG. 13E shows an exploded view of the upper portion of the mast-mounted apparatus illustrated in FIGS. 13A through 13D, comprising the control, data processing and communication module, interfaced with the wind speed and direction and direction instrument and the stroboscopic illumination module assembly of the present invention.
Figure 13G:
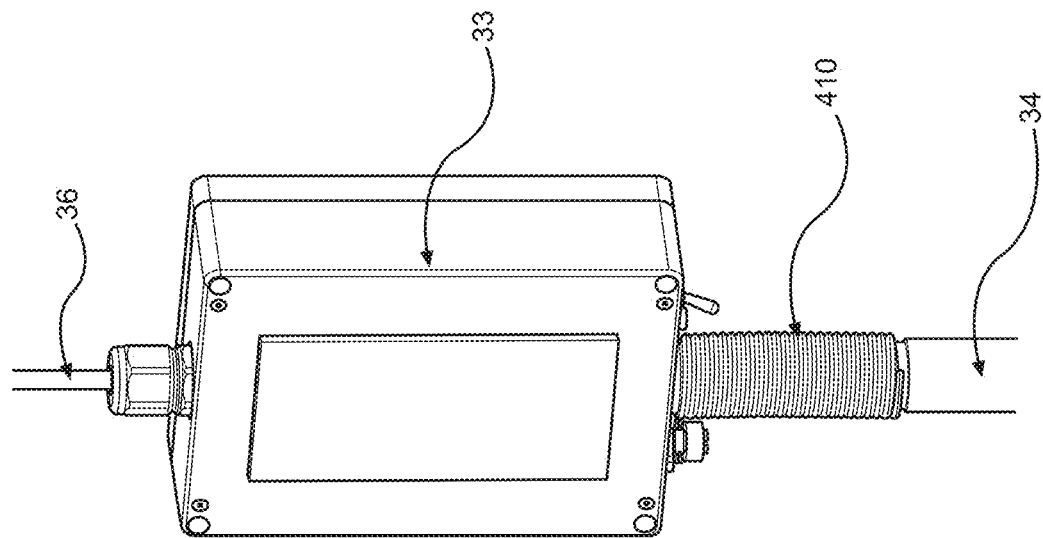
FIGS. 13F and 13G are perspective views of the mast mounted control module employed in the apparatus illustrated in FIGS. 13A and 13B, showing an integrated spring mechanism that allows the mast to elastically deform and bend in response to wind forces applied to the snow load monitoring system of the present invention mounted on a building rooftop surface.
Figure 13F:
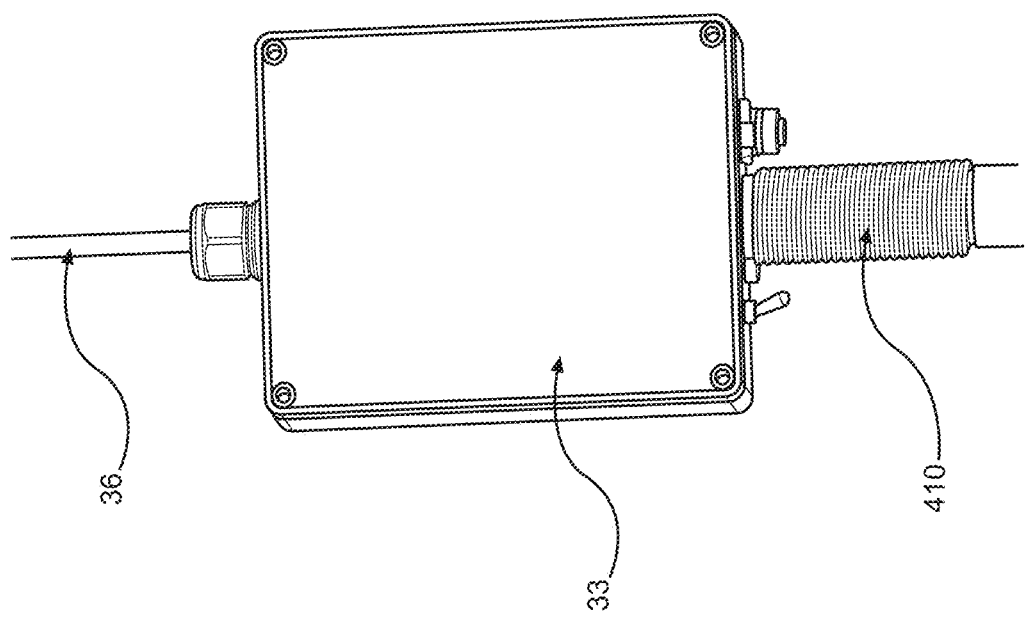
Figure 13H:
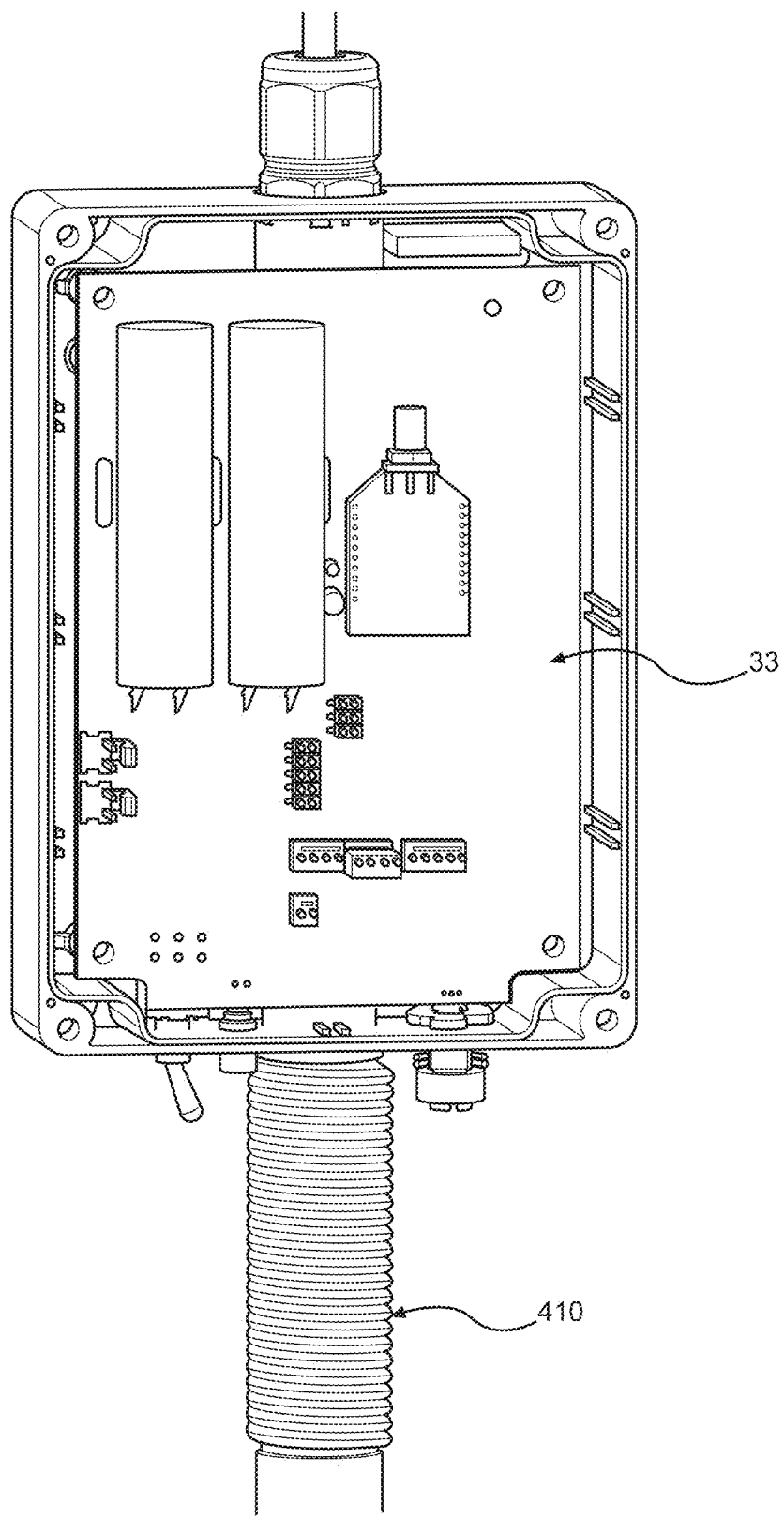

FIG. 12C shows the fourth illustrative embodiment of the snow load monitoring system 4'''' comprising: a PCB-based control, data processing and communication module 33 mounted inside a base station 30; and a thin-film photovoltaic panel 40 mounted on the top surface of the weigh panel 38; while a wind speed and direction instrument 35 and a stroboscopic illumination module 37 are mounted at the distal portion of a vertically supported mast structure 34. Specification of Fourth Illustrative Embodiment of the Snow Load Monitoring System of the Present Invention FIGS. 13A, 13B, 13C and 13D show how the flexible weigh panel 38 in the fourth illustrative embodiment of the base station 30' progressively deflects in response to the application of a spatially-distributed snow load, while its single load cell 32' mounted in the center of the base station 30' responds to the applied snow load and deflection of the flexible weigh panel 38, and generates electrical signals corresponding to the intensity of the distributed snow load.

During operation of the snow load monitoring station 4'''', the force imposed on the weigh plate by the snow at any given moment in time is transferred through the weigh plate to the force sensor(s) so as to generate an electrical signal that is calibrated to provide an accurate representation of the magnitude of the force applied by the gravitational load on the weigh plate. At the same time, the wind speed and direction instrument measures these wind characteristics and generate electrical signal(s) encoded with such wind-related information. The temperature sensors (and barometric pressure sensors if provided) also take environmental measurements and encode such gathered information onto electrical signals. All of these electrical signals are transmitted to the microprocessor/microcontroller for processing and encoding onto the digital carrier signal generated by the communication module of the station 4'''', for wireless transmission to communication, application and database servers maintained at the data center 10 of the system. Digital images are also captured periodically by onboard digital cameras and transmitted to the programmed microprocessor (i.e. subsystem controller) for storage and processing to support the various services delivered over the system network of the present invention.

While excessive snow load measurements and alerts are preferably determined within the application servers of the data center 10, it is possible in some embodiments for such determinations to be computed locally within the snow load monitoring station 4'', and for the alerts to be sent to the data center 10 for communication among building management and maintenance team members, in accordance with the spirit of the present invention. Also, the stroboscopic LED illumination module mounted on top of the radio whip antenna of the station can be operated periodically, either under local automatic control, or remote control by the data center 10, thereby conserving battery power aboard each snow load monitoring station 4'''' deployed on a building rooftop. For example, after a deep snow load, the stroboscopic LED illumination module could be activated from the data center, via manager control, to assist building managers and maintenance workers while conducting rooftop inspections as well as snow removing operations. On board collision avoidance signal generation can also be activated by remote control from the data center 10 to assist in preventing collisions between snow removing robot systems 6 and snow load monitoring stations 4'''' buried deep beneath the snow.

Figure 14A:
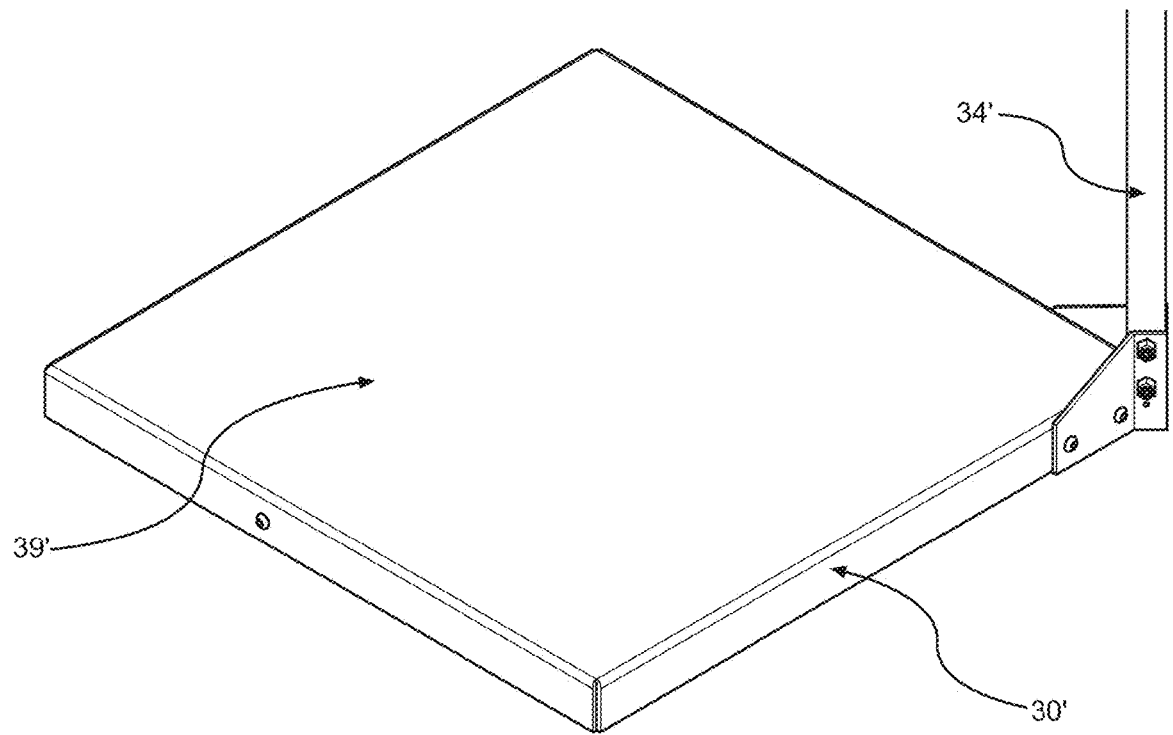
FIG. 14A is a perspective view of the base station portion of the fourth illustrative embodiment of the snow load monitoring system of the present invention, wherein the base plate is constructed from a folded sheet metal bonded together, and the base station is constructed from sheet metal using a single load cell configured using the deflection measurement method.
Figure 14B:
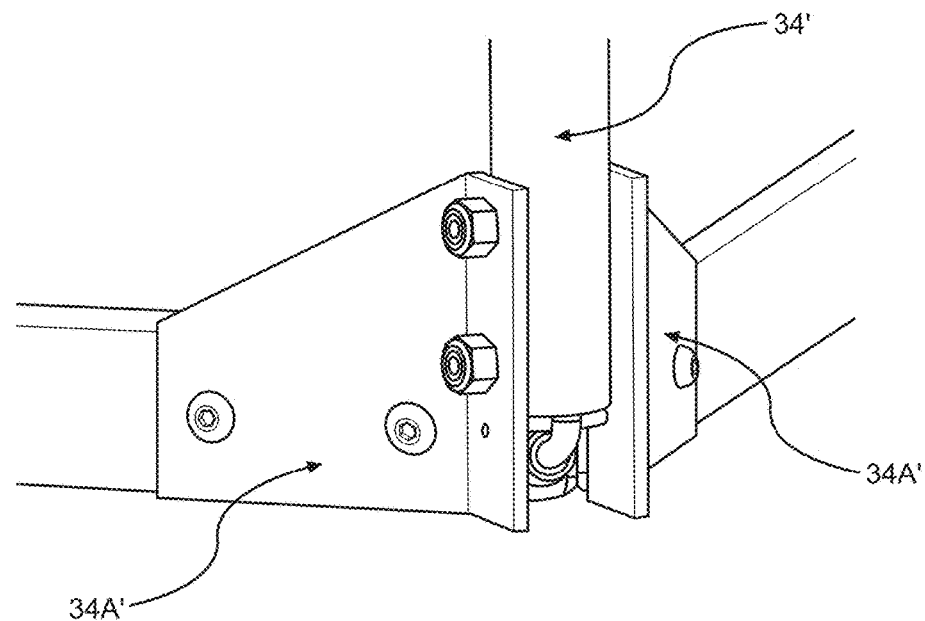
FIG. 14B is a perspective view showing how the mast is connected to the base station of FIG. 14A using a bracket and a pair of bolts and nuts.

FIGS. 14A and 14B shows the fourth illustrative embodiment of the snow load monitoring system 4'''', wherein the base plate is constructed from a folded sheet metal bonded together, and the base station is constructed from sheet metal using a single load cell configured using the deflection measurement method.

FIG. 14B shows that the mast is connected to the base station 30 using bracket and a pair of bolts and nuts.

Figure 14C:
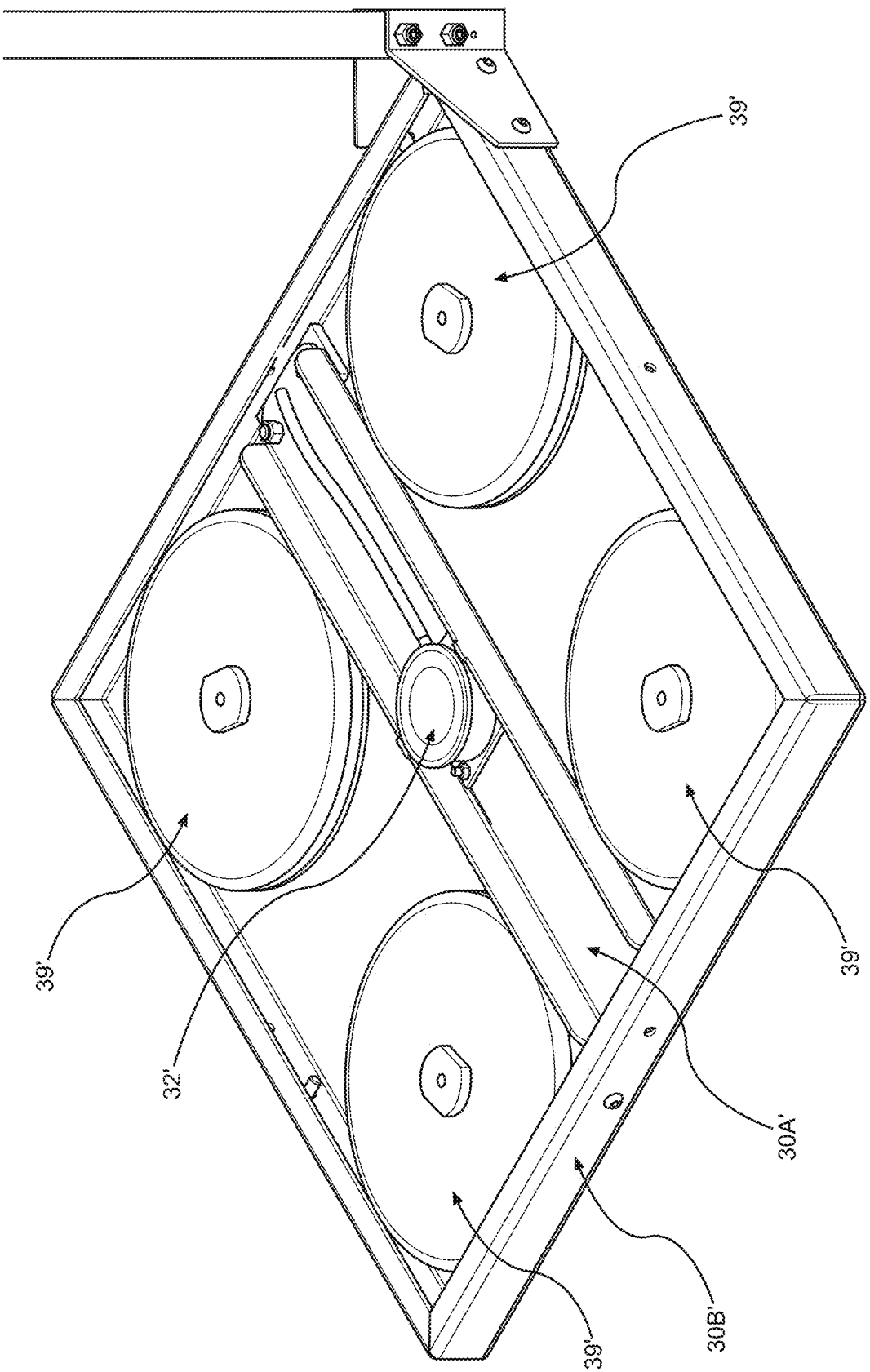
FIG. 14C is a perspective view of the base station component of the fourth illustrative embodiment of the snow load monitoring system of the present invention, shown with its base weigh plate removed to reveal the load sensor and stabilizing weigh plates.

FIG. 14C shows the base station component of the fourth illustrative embodiment of the snow load monitoring system 4'''' comprising: a single load cell 32' mounted in a load cell support bar 30B' mounted in a base frame 29B, along with a set of disc-like weights 39' mounted about the load cell to provide stability in the presence of wind, and a base weigh plate 39 supported over the base frame.

Figure 14D:
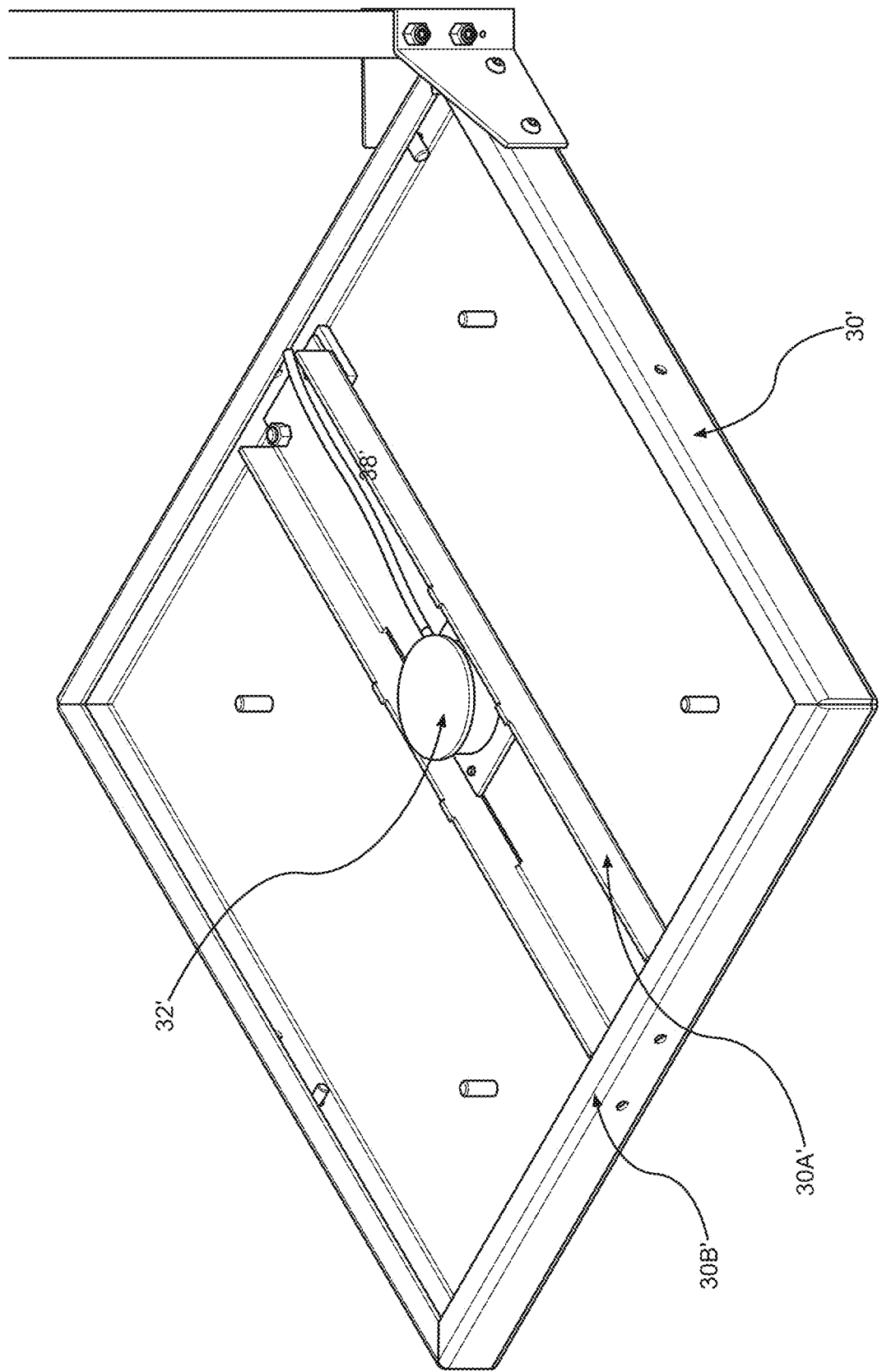
FIG. 14D is a perspective view of the base station component of the fourth illustrative embodiment of the snow load monitoring system of the present invention, shown with its base weigh plate removed to reveal the load sensor and stabilizing weigh plates removed as well.

FIG. 14D shows the base station component of the fourth illustrative embodiment of the snow load monitoring system 4'''' shown with its base weigh plate removed to reveal the load sensor 32' without stabilizing weigh plates 39.

Figure 14E:
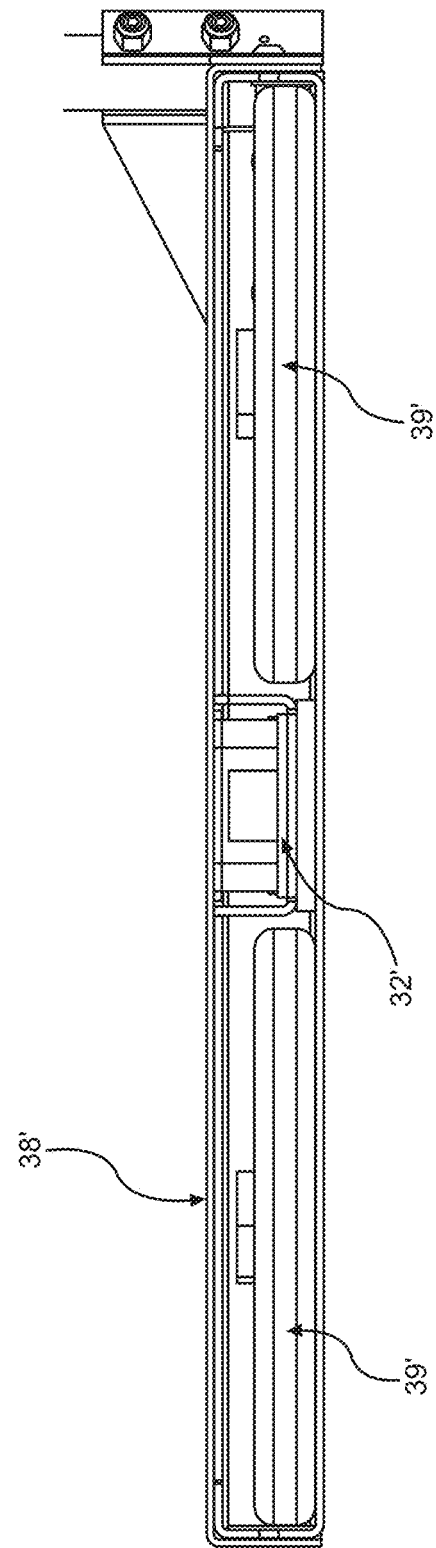
FIG. 14E is an elevated side view off the base station component of the fourth illustrative embodiment of the snow load monitoring system of the present invention, shown with its base weigh plate and stabilizing weigh plates are removed to reveal the load sensor.

FIG. 14E shows the single load cell 32' mounted in a load cell support bar 30B' mounted in a base frame 29B, along with its set of disc-like weights 39 mounted about the load cell 32' to provide stability in the presence of wind; and a base weigh plate 38' supported over the base frame.

Figure 14F:
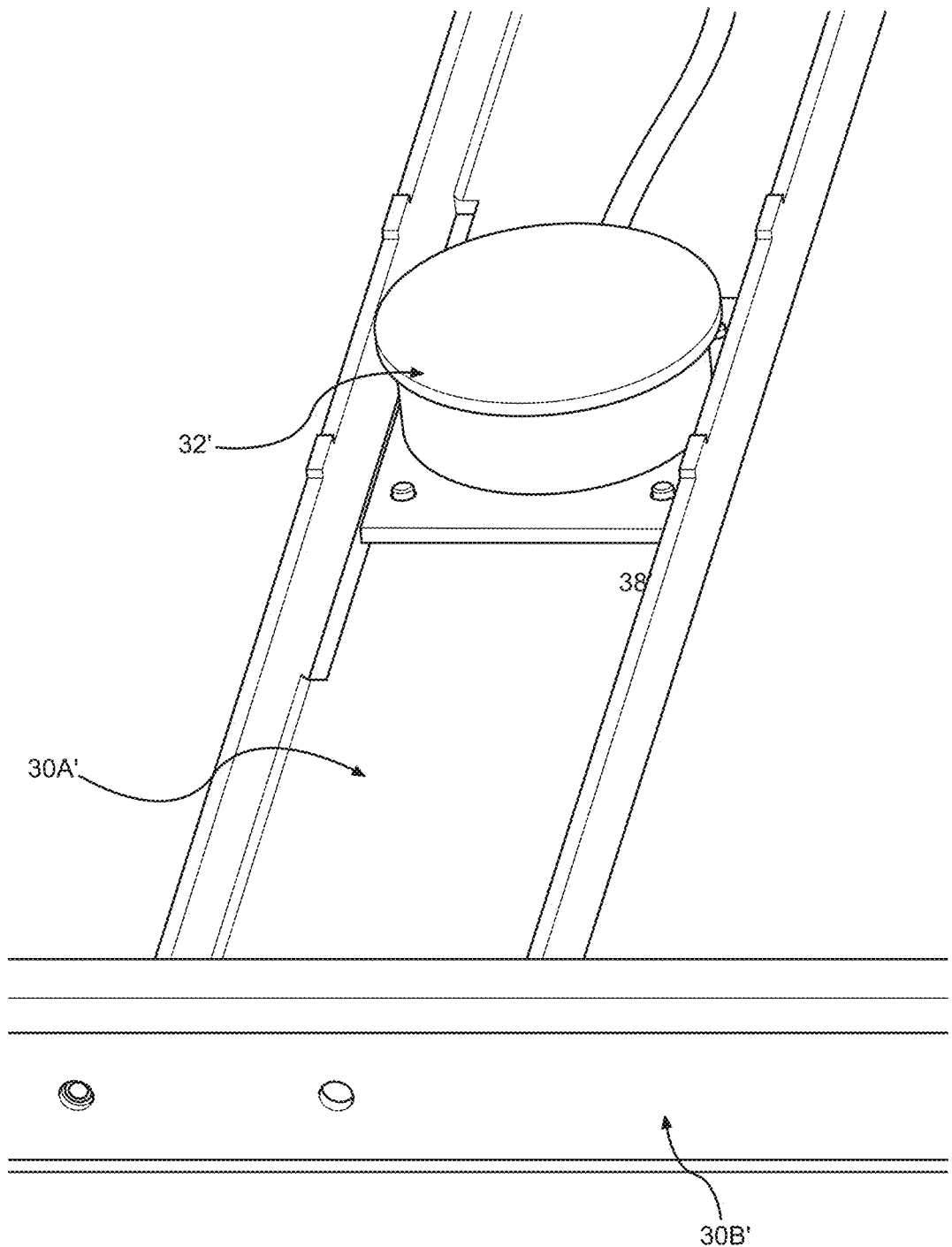
FIG. 14F is a perspective partially fragmented view of the base station component of the fourth illustrative embodiment of the snow load monitoring system of the present invention, showing the single load cell mounted in a load cell support bar mounted in a base frame, designed to provide overload protection when an excessive load is applied to the base weight plate.
Figure 14G:
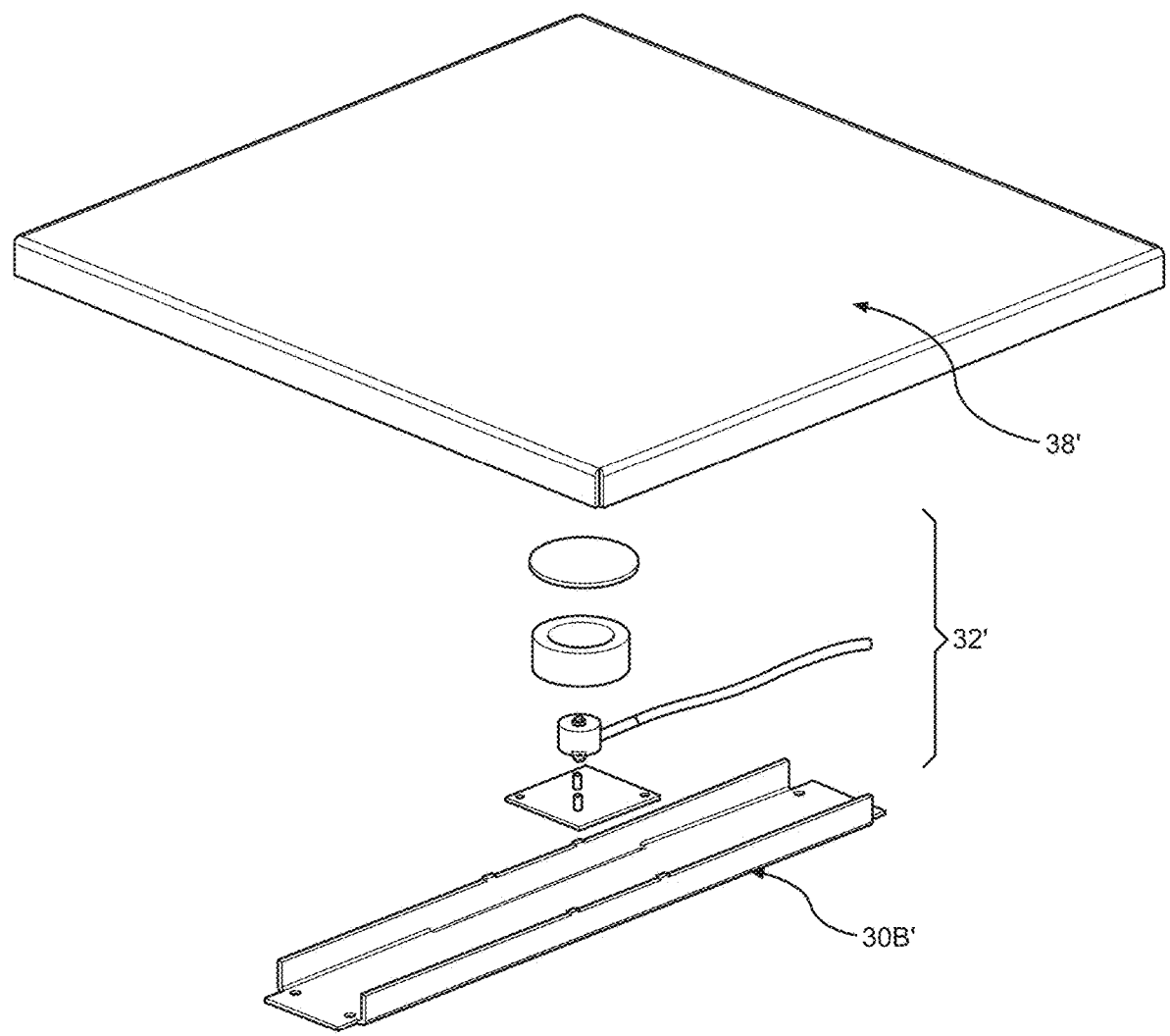
FIG. 14G is an exploded view of several primary base station components of the fourth illustrative embodiment of the snow load monitoring system of the present invention, showing the single load cell, the load cell support, and the base frame.
Figure 14H:
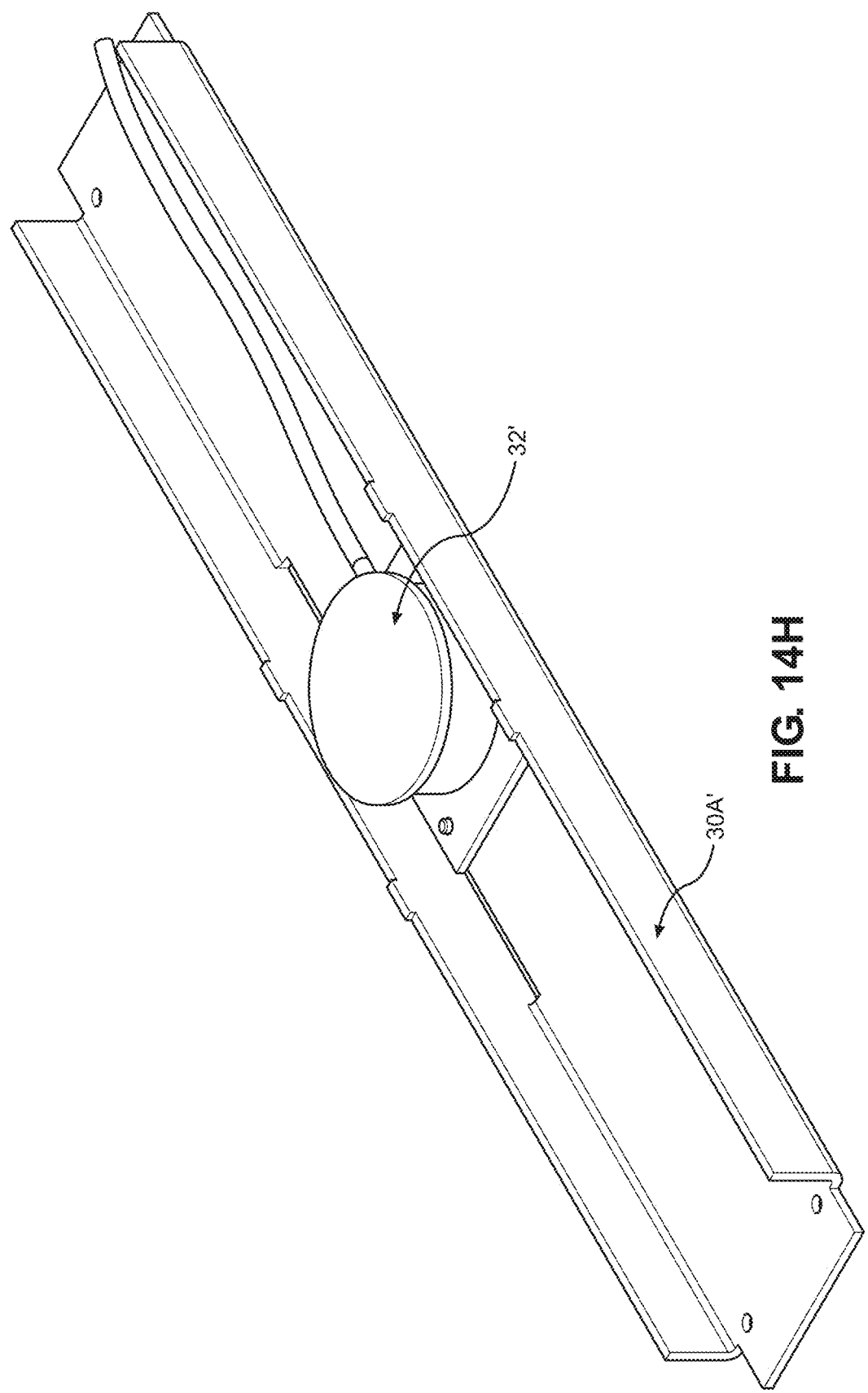
FIG. 14H is a perspective view of the single load cell supported in the load cell support employed in the base station of the fourth illustrative embodiment of the snow load monitoring system of the present invention.
Figure 14I:
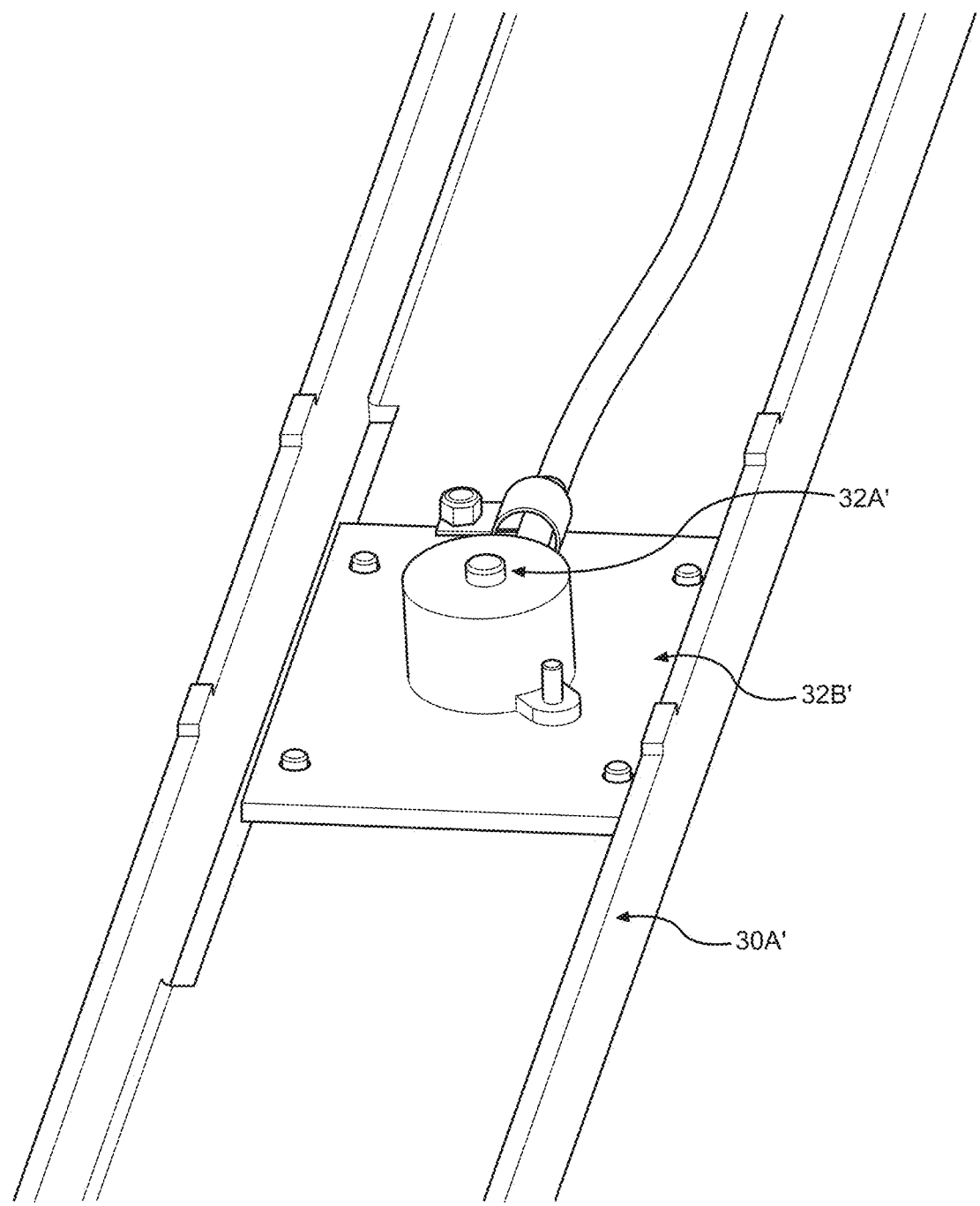
FIG. 14I is a perspective view of the single load cell supported in the load cell support employed in the base station of the fourth illustrative embodiment of the snow load monitoring system of the present invention, shown with the load cell housing removed to reveal the load sensor mounted on the load cell support.
Figure 14J:
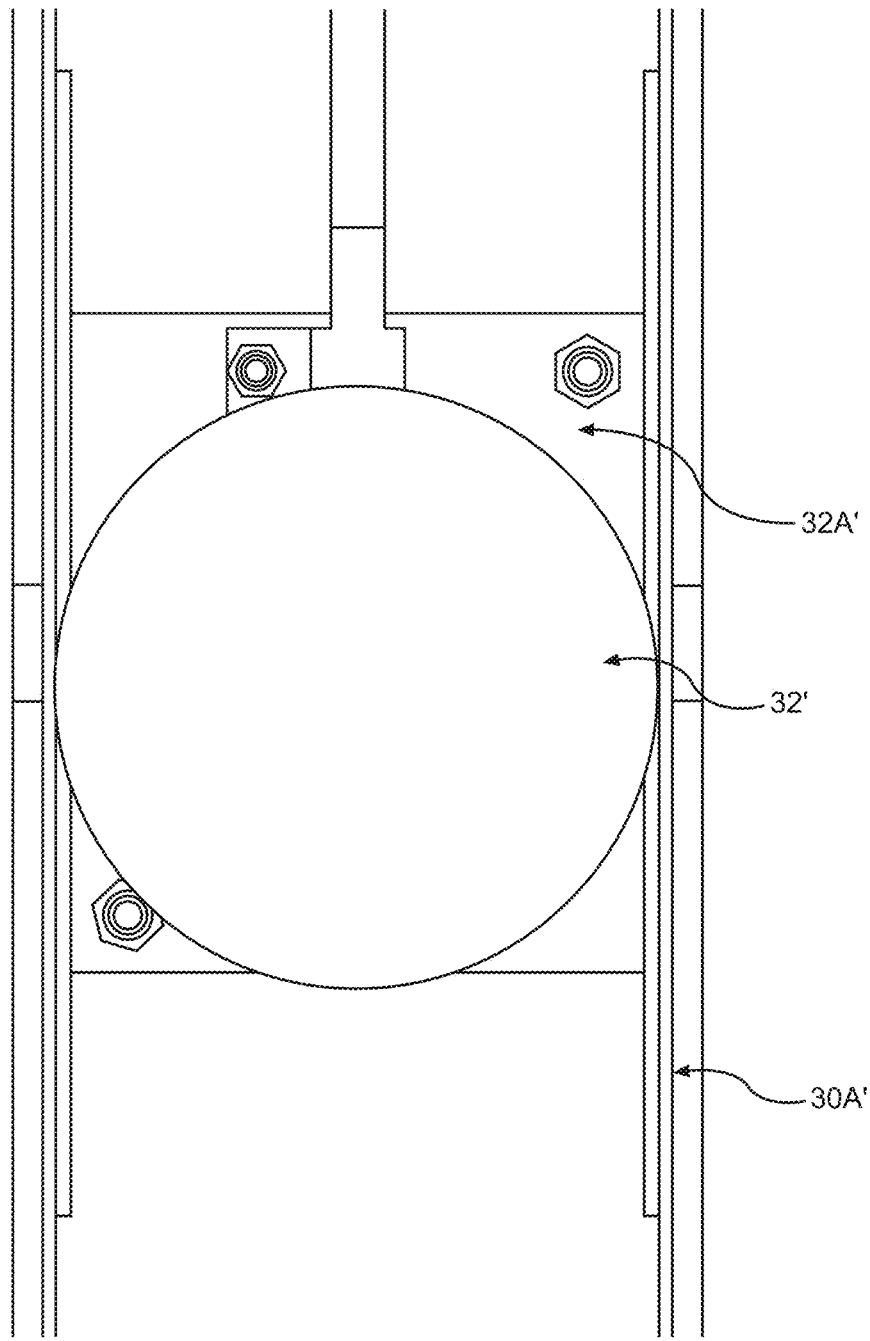
FIG. 14J is a plan view of the single load cell supported in the load cell support employed in the base station of the fourth illustrative embodiment of the snow load monitoring system of the present invention.

FIG. 14F shows the single load cell 32' mounted in a load cell support bar 30A' mounted in a base frame 30B', designed to provide overload protection when an excessive load is applied to the base weight plates 39.

FIGS. 14G, 14H, 14I and 14J shows primary base station components of the fourth illustrative embodiment of the snow load monitoring system 4'''' comprising single load cell 32', the load cell support 32A', and the base frame 30A'.

FIGS. 15A, 15B and 15C shows a series of cross-sectional views of the base station of the fourth illustrative embodiment of the snow load monitoring system 4'''' illustrating automatic load cell protection. As shown, the single load cell automatically protected from force overloads applied to the base weigh plate by virtue of the fact that the load cell support deflects in response to excessive loads and protects the load cell sensor from such excessive forces.

During operation of the snow load monitoring station 4'''', the force imposed on the weigh plate by the snow at any given moment in time is transferred through the weigh plate to the force sensor(s) so as to generate an electrical signal that is calibrated to provide an accurate representation of the magnitude of the force applied by the gravitational load on the weigh plate. At the same time, the wind speed and direction instrument measures these wind characteristics and generate electrical signal(s) encoded with such wind-related information. The temperature sensors (and barometric pressure sensors if provided) also take environmental measurements and encode such gathered information onto electrical signals. All of these electrical signals are transmitted to the microprocessor/microcontroller for processing and encoding onto the digital carrier signal generated by the communication module of the station 4'''', for wireless transmission to the communication, application and database servers maintained at the data center 10 of the system. Digital images are also captured periodically by onboard digital cameras and transmitted to the programmed microprocessor (i.e. subsystem controller) for storage and processing to support the various services delivered over the system network of the present invention.

While excessive snow load measurements and alerts are preferably determined within the application servers of the data center 10, it is possible in some embodiments for such determinations to be computed locally within the snow load monitoring station 4'''', and for the alerts to be sent to the data center 10 for communication among building management and maintenance team members, in accordance with the spirit of the present invention. Also, the stroboscopic LED illumination module mounted on top of the radio whip antenna of the station can be operated periodically, either under local automatic control, or remote control by the data center 10, thereby conserving battery power aboard each snow load monitoring station 4''' deployed on a building rooftop. For example, after a deep snow load, the stroboscopic LED illumination module could be activated from the data center, via manager control, to assist building managers and maintenance workers while conducting rooftop inspections as well as snow removing operations. On board collision avoidance signal generation can also be activated by remote control from the data center 10 to assist in preventing collisions between snow removing robot systems 6 and snow load monitoring stations 4'''' buried deep beneath the snow.

Specification of Preferred Method of Calibrating the Snow Load Monitoring System of the Present Invention A method of calibrating the load cell within a snow load station of the present invention is disclosed in FIGS. 16A through 16D based on the deflection-based method of measurement.

Figure 16A:
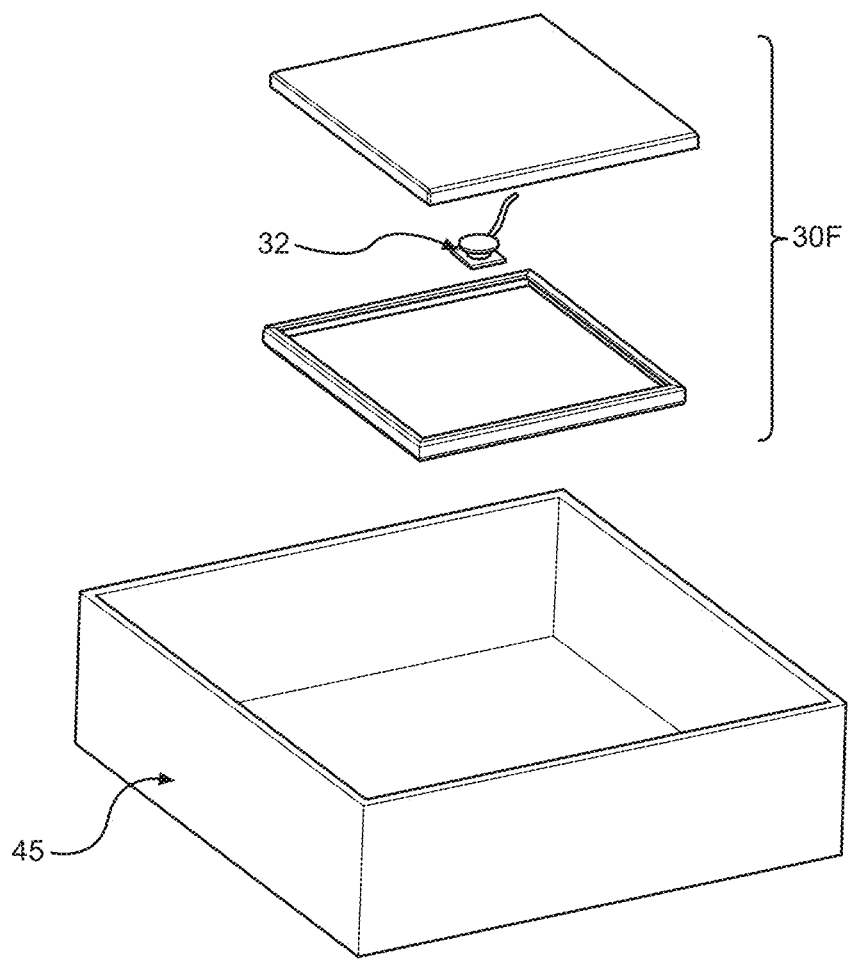
FIG. 16A is an exploded view apparatus that can be used to calibrate the force-based load sensor (load cell) used in calibrating a snow load monitoring systems of the present invention, wherein, for purposes of illustration, the fourth illustrative embodiment of the base station, is placed inside a water-sealed box or container, and then the load cell sensor to be calibrated is placed in the center of the base station and then a load-bearing flexible weigh (deflection) panel is placed over the load cell and surrounding base station.
Figure 16B:
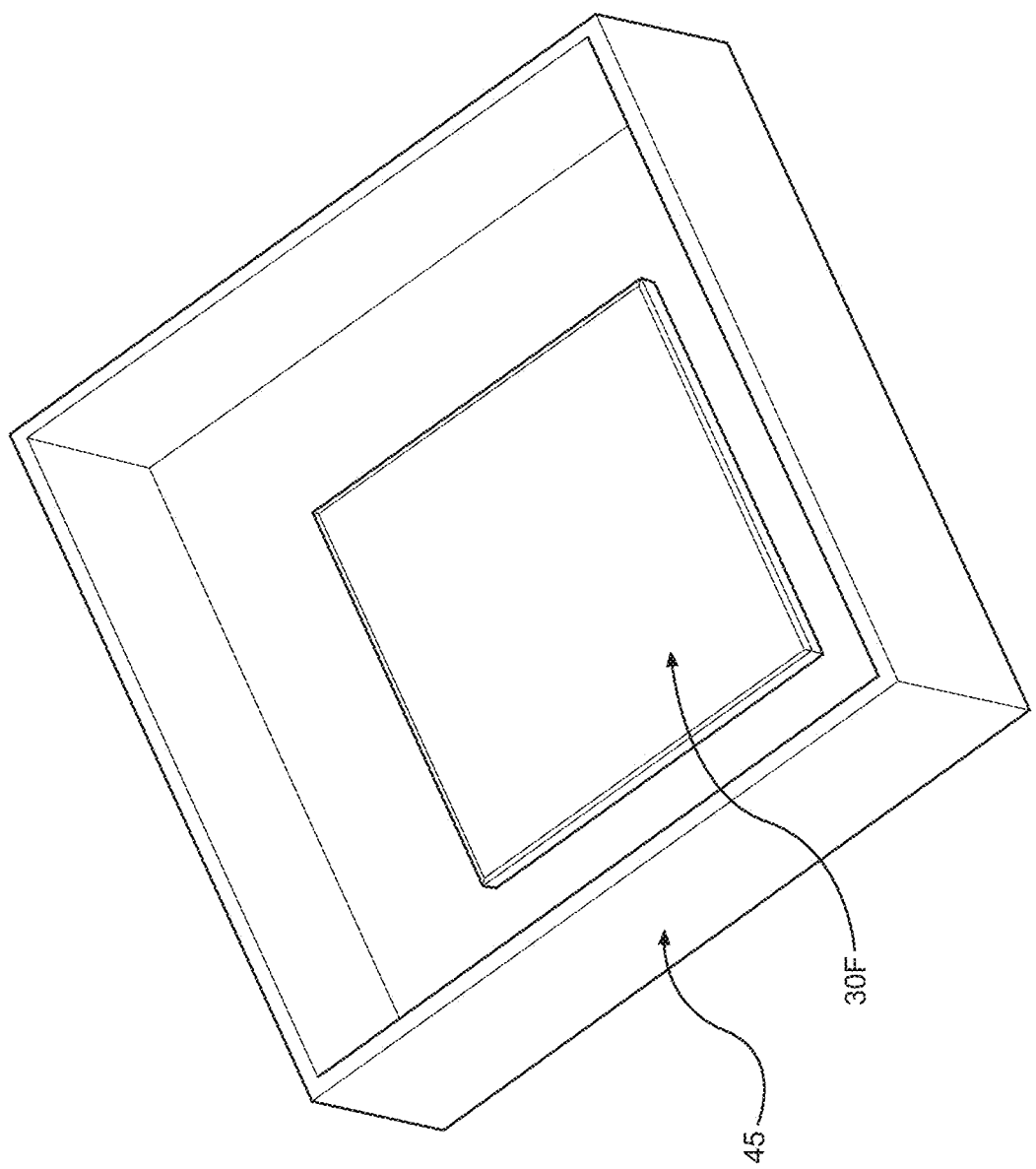
FIG. 16B is a perspective view of the apparatus shown in FIG. 16A assembled and ready for the practice of the load sensor calibration procedure used in connection with the fourth illustrative embodiment of the snow load monitoring system of the present invention.

FIG. 16A shows apparatus that can be used to calibrate the force-based load sensor (load cell) used in calibrating a snow load monitoring systems of the present invention. For purposes of illustration, the fourth illustrative embodiment of the base station 4'''' is placed inside a water-sealed box or container 45, and then the load cell sensor 32 to be calibrated is placed in the center of the base station 30, and then a load-bearing flexible weigh (deflection) panel 38 is placed over the load cell and surrounding base station. FIG. 14B shows the apparatus in FIG. 14A assembled and ready for the practice of the load sensor calibration procedure used in connection with the fourth illustrative embodiment of the snow load monitoring system 4''''.

FIGS. 17C1, 17C2 and 17C3 show the fourth illustrative embodiment of the base station during the load cell calibration procedure. As shown, a single load cell 32 configured according to a deflection method is gradually exposed to the load of water added to the test container box, and the flexible weigh panel 38 progressively deflects in response to the application of a spatially-distributed water load, and the single load cell 32 mounted in the center of the base station responds to the applied snow load and deflection of the flexible weigh panel 38 and generates electrical signals corresponding to the intensity of the distributed snow load. Typically the output of the load cell is an analog signal which can be subsequently converter to a digital signal using an A/D converter and other conventional signal processing methods well known in the art.

FIG. 17B describes the primary steps carried out while practicing the method of calibrating the load sensor and programming the snow load data processing module (i.e. control, data processing and communication module) based on deflection-based measurement principles of physics. As shown, the method comprises a series of steps. The first step (a) involves mounting a snow load sensing module 4 (with any mast and communication module removed) to be tested in the bottom of a box like structure wherein the walls of the box like structure spatially correspond with the perimeter boundaries of the snow load sensing surface. The second step (b) involves installing a flexible fluid containing membrane over the sensing module 32 inside the box like structure 45 (e.g. plastic bag opened and mounted inside the box structure 45). The third step (c) involves adding quantified amounts of snow/ice loading material into the box, and measuring the electrical output of the sensor in the snow load sensing module 32. The fourth step (d) involves correlating the depth of the snow/ice loading material with the voltage output of the sensing module 32. The fifth step (e) involves using the depth vs. voltage data to create a mathematical formula that provides a voltage in response to snow pressure. The sixth step (f) involves loading the mathematical formula into persistent (i.e. flash) memory associated with the data processing module 33.

Figure 18:
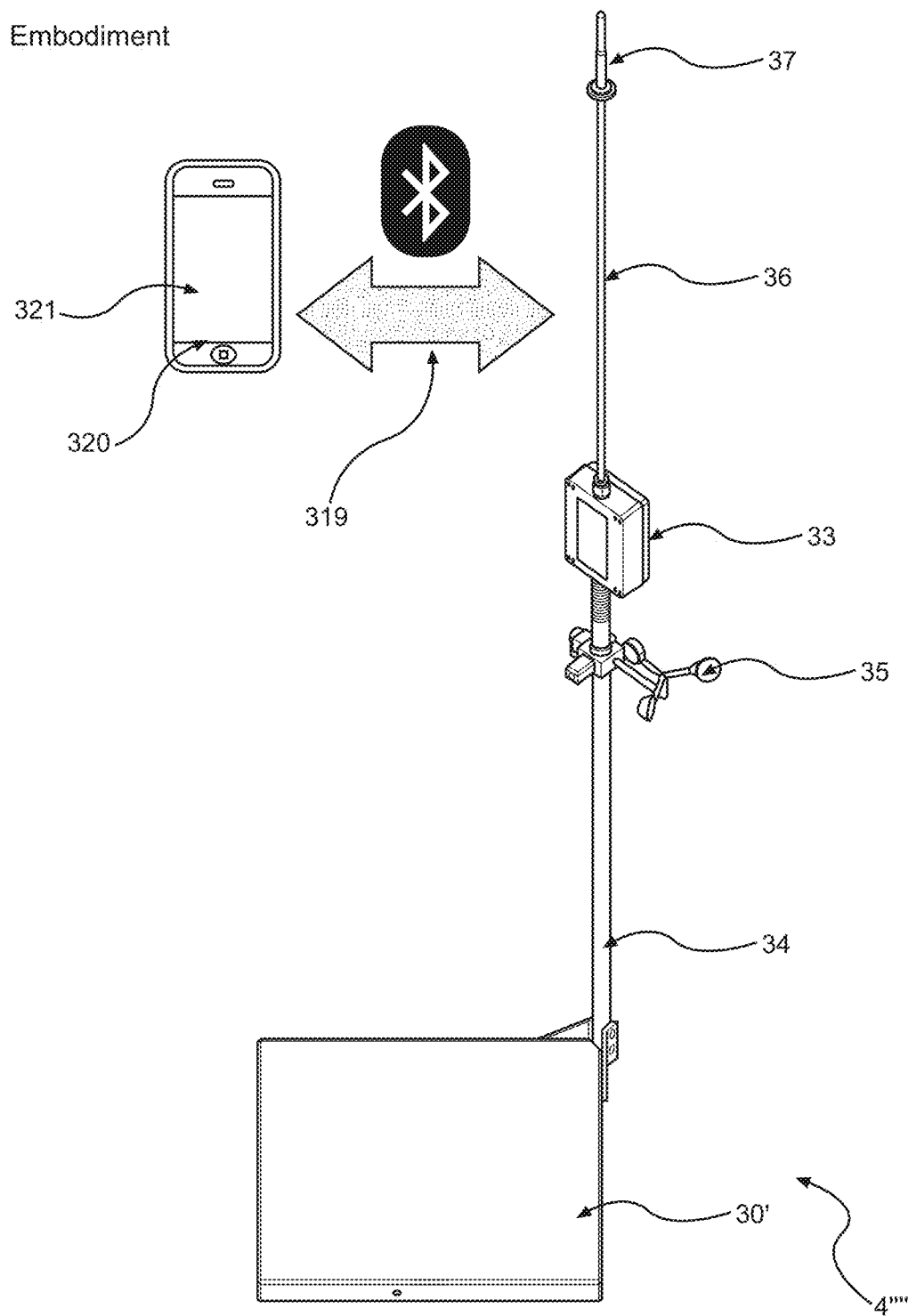
FIG. 18 is a perspective view of the fifth illustrative embodiment of the snow load monitoring system of the present invention, based on the fifth illustrative embodiment, with the added feature of having a Bluetooth® data communication link with a mobile smart phone running an application designed for programming and monitoring the snow load monitoring system/station.

Specification of Fifth Illustrative Embodiment of the Snow Load Monitoring System of the Present Invention FIG. 18 shows the fifth illustrative embodiment of the snow load monitoring system (SLMS) 4''''' of the present invention, based on the fifth illustrative embodiment, with the added feature of having a Bluetooth® data communication link 319 with a mobile smart phone 320 running an application 321 designed for programming and monitoring the snow load monitoring system 4''''' employing base station 30'. The advantage of this configuration would be that no user controls would be necessary on the control, data processing and communications module 33 of the snow load monitoring station, however realized, and that the GUI display screen on the mobile application would provide the user with touch-screen buttons and controls for modifying parameters (e.g. IP Address), enabling functions (e.g. enable solar-power recharging panel), and monitor states (e.g. battery power remaining, base station temperature, static snow load, etc.) within the snow load monitoring system 4'''' and configuring the system as desired or required for any given end-user application.

Alternatively, the system 4'''' shown in FIG. 18 can be further modified to support remote access and management over the system network, from anywhere over the system network, by an authorized client or server using suitable networking protocols that establish a communication connection with the snow load monitoring system and the remote client or server establishing remote access and management.

During operation of the snow load monitoring station 4'''', the force imposed on the weigh plate by the snow at any given moment in time is transferred through the weigh plate to the force sensor(s) so as to generate an electrical signal that is calibrated to provide an accurate representation of the magnitude of the force applied by the gravitational load on the weigh plate. At the same time, the wind speed and direction instrument measures these wind characteristics and generate electrical signal(s) encoded with such wind-related information. The temperature sensors (and barometric pressure sensors if provided) also take environmental measurements and encode such gathered information onto electrical signals. All of these electrical signals are transmitted to the microprocessor/microcontroller for processing and encoding onto the digital carrier signal generated by the communication module of the station 4'''' for wireless transmission communication, application and database servers maintained at the data center 10 of the system. Digital images are also captured periodically by onboard digital cameras and transmitted to the programmed microprocessor (i.e. subsystem controller) for storage and processing to support the various services delivered over the system network of the present invention.

While excessive snow load measurements and alerts are preferably determined within the application servers of the data center 10, it is possible in some embodiments for such determinations to be computed locally within the snow load monitoring station, and for the alerts to be sent to the data center 10 for communication among building management and maintenance team members, in accordance with the spirit of the present invention. Also, the stroboscopic LED illumination module 37 mounted on top of the radio whip antenna of the station can be operated periodically, or under the control of the data center 10 to control battery power aboard each snow load monitoring station deployed on a building rooftop. For example, after a deep snow load, the stroboscopic LED illumination module could be activated from the data center 10, via manager control, to assist building managers and maintenance workers while conducting rooftop inspections as well as snow removing operations. Alternatively, a photocell sensor can be mounted on the module 33 to automatically detect and determine that the snow load level is not covering the communication module 33, and if so, then the module 33 can activate the stroboscopic LED illumination module 37 so that its slow stroboscopic illumination signals are conspicuously visual to human building managers, inspectors and workers on the building rooftop. On board collision avoidance signal generation can also be activated by remote control from the data center 10 to assist in preventing collisions between snow removing robot systems 6 and snow load monitoring stations 4'''' buried deep beneath the snow.

Figure 19A:
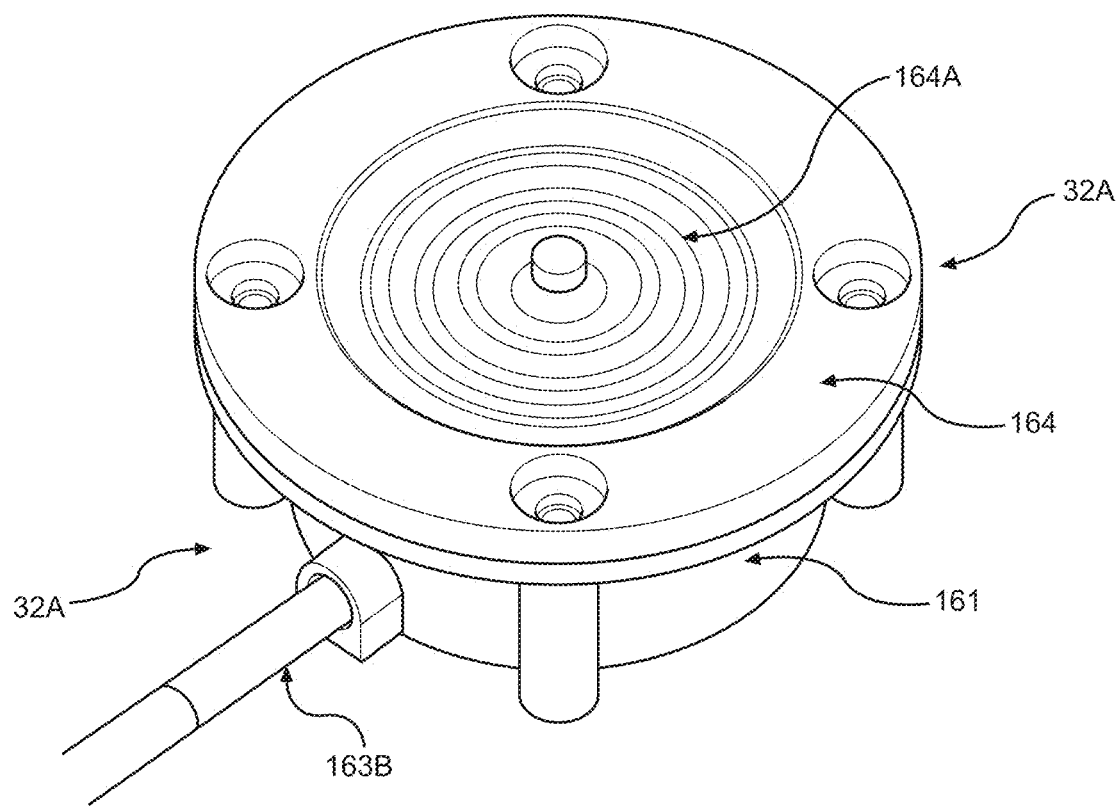
FIG. 19A is a perspective view of a strain gauge force sensor (i.e. load cell) according to first illustrative embodiment of the present invention, having an injection-molded housing and being employable in any of the illustrative embodiments of snow load monitoring systems of the present invention.

Specification of First Illustrative Embodiment of the Strain Gauge Force Sensor of the Present Invention FIG. 19A shows a strain gauge force sensor (i.e. load cell) 32A according to first illustrative embodiment having an injection-molded housing and being employable in any of the illustrative embodiments of snow load monitoring systems of the present invention.

Figure 19B:
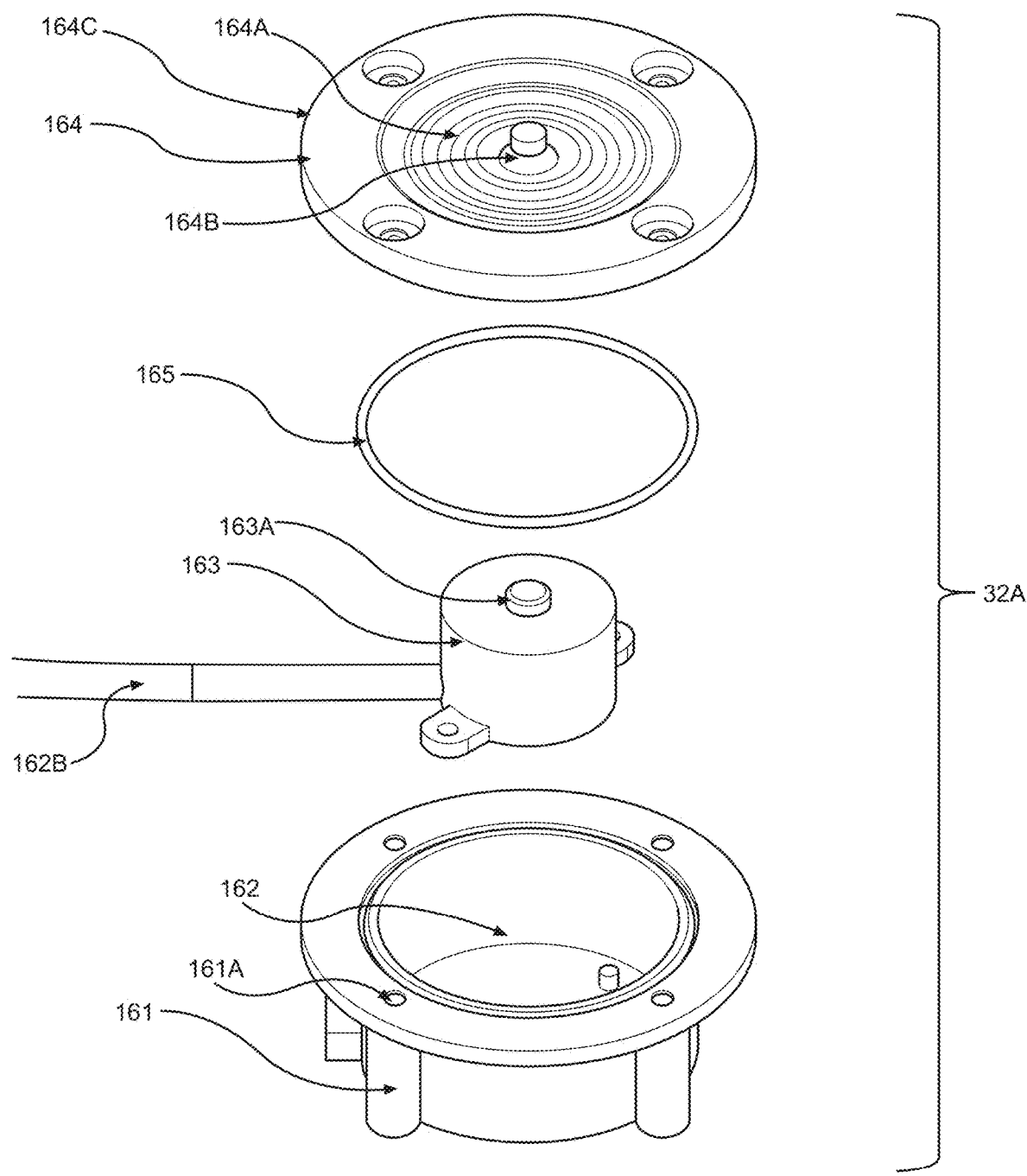
FIG. 19B is an exploded view of the strain gauge force sensor (i.e. load cell) according to first illustrative embodiment of the present invention illustrated in FIG. 19A, shown comprising an injection-molded base housing having a cylindrical load cell mounting recess, a strain-gauge sensor mounted in mounting recess of the base housing component, and co-molded cover housing portion having an elastic load sensing region disposed above in close contact with the load sensor, and a rubber gasket for insertion between the cover housing portion and the base housing portion.

FIG. 19B shows the strain gauge force sensor (i.e. load cell) 32A comprising: an injection-molded base housing 161 having a cylindrical load cell mounting recess 162; a strain-gauge sensor 163 mounted in mounting recess 162 of the base housing component 161, and co-molded cover housing portion 164 having an elastic load sensing region 164A disposed above in close contact with the load sensor 163 for applying forces transmitted to the load sensing region 164A through the central post 164B to the strain-gauge sensor 163; and a rubber gasket 165 for insertion between the cover housing portion 164 and the base housing portion 161A.

Figure 19C:
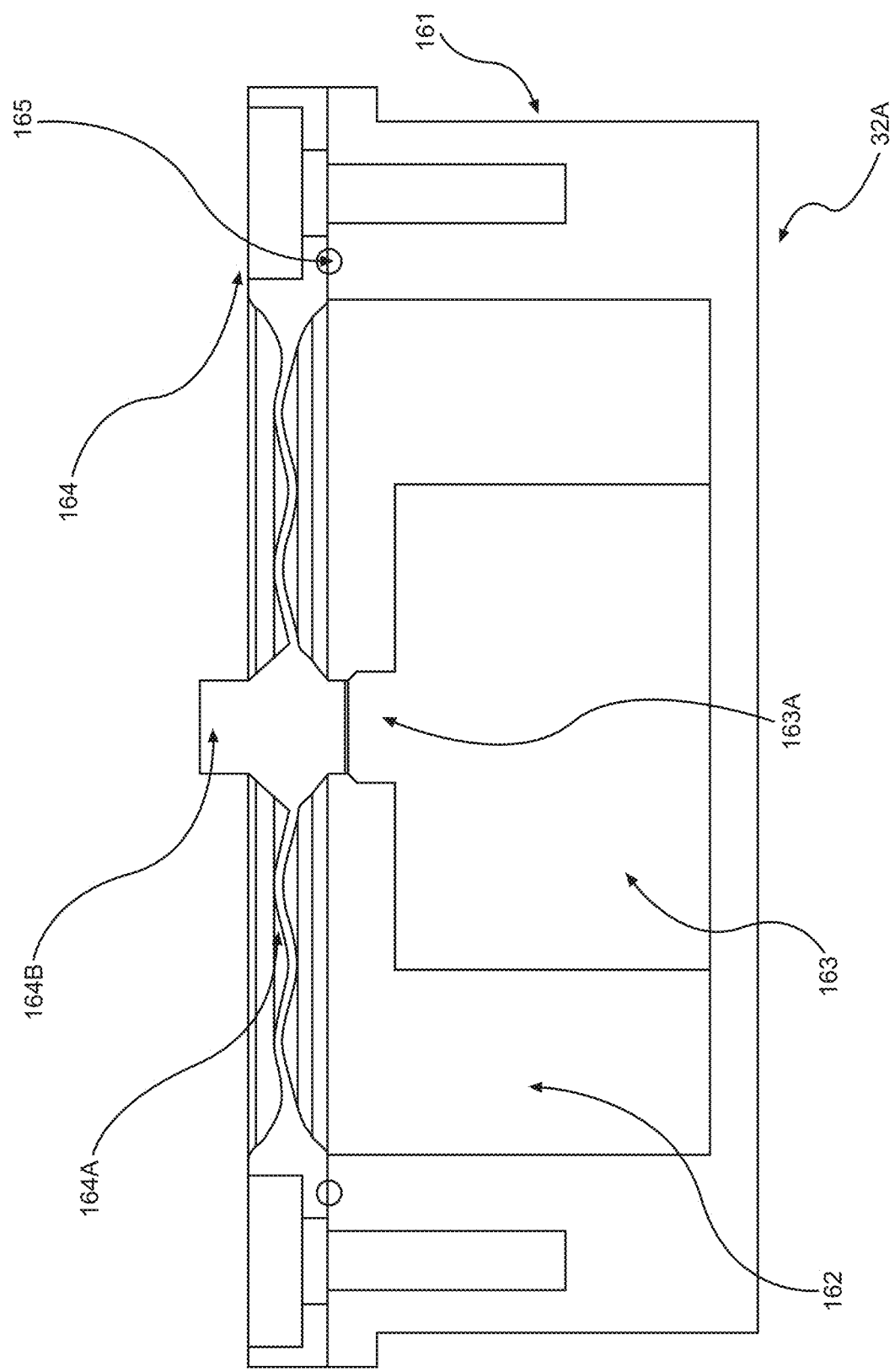
FIG. 19C is an elevated cross-sectional view of the strain gauge force sensor (i.e. load cell) according to first illustrative embodiment of the present invention illustrated in FIGS. 19A and 19B.

FIG. 19C shows the strain gauge force sensor 163 according to first illustrative embodiment illustrated in FIGS. 19A and 19B.

As shown, the strain gauge sensor 163 includes a strain-gauge element made from a specific material and arranged in an electrical circuit such as a Wheatstone bridge circuit. The electrical resistance of the strain metal element changes in response to exposure to strain-type forces acting on the metallic sensor element employed in the sensor. The electrical circuit, in which the strain-gauge metallic element is configured, produces an electrical signal that corresponds to the forces imposed on the strain gauge element and represents a measure of load that caused the material strain and change in electrical resistance of the strain metal element. Using a suitable calibration procedure as described above, the strain gauge sensor can be calibrated for use in the snow load monitoring systems of the present invention.

Figure 20A:
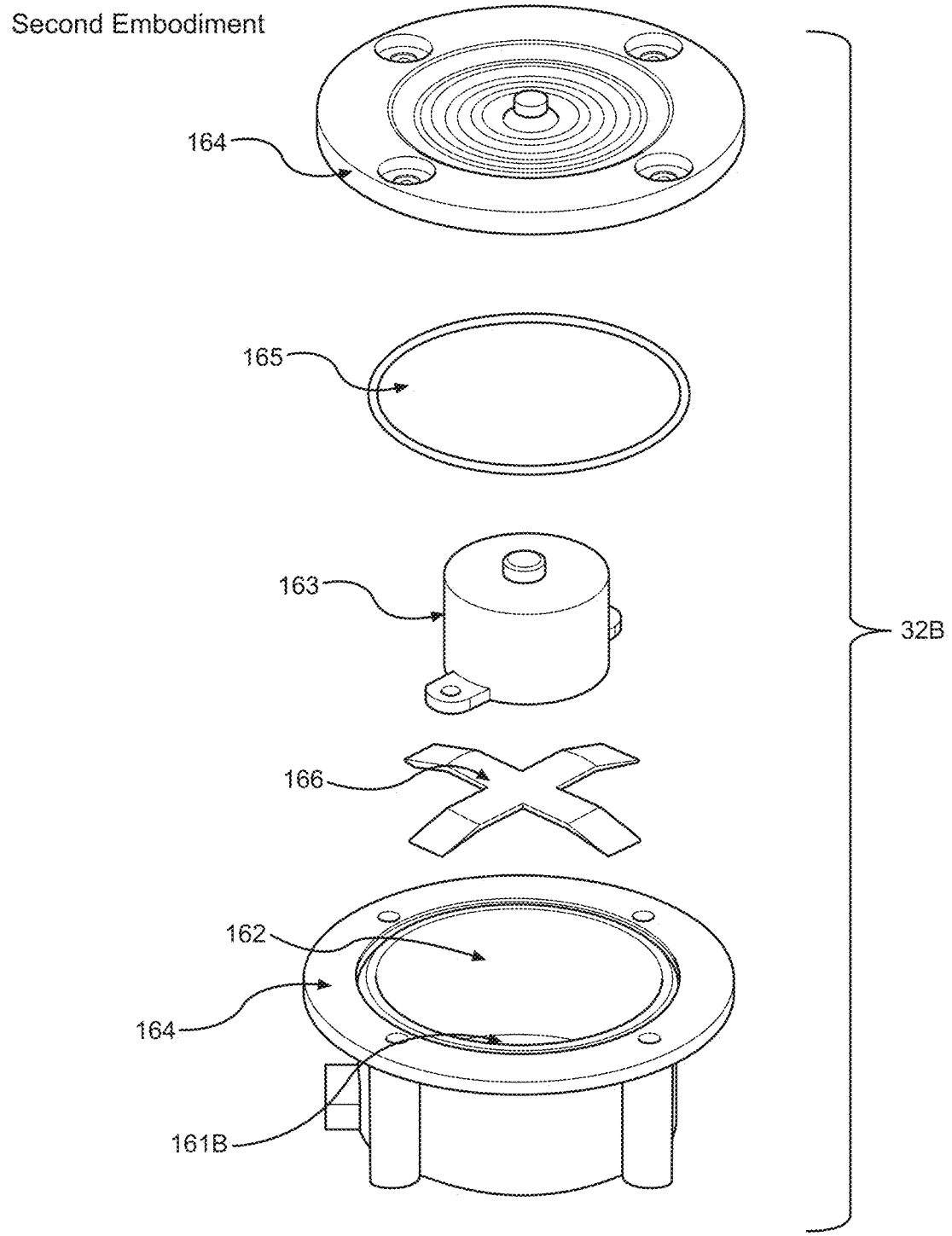
FIG. 20A is an exploded view of the strain gauge force sensor (i.e. load cell) according to second illustrative embodiment of the present invention, shown comprising an injection-molded base housing having a cylindrical load cell mounting recess, a strain-gauge sensor mounted in mounting recess of the base housing component, a co-molded cover housing portion having an elastic load sensing region disposed above in close contact with the load sensor, a rubber gasket for insertion between the cover housing portion and the base housing portion, and a base-mounted force-overload protection spring mounted between the load sensor and bottom surface of the base housing and adapted to reduce the magnitude of force that the load cell sensor experiences when excessive force overloads are applied to the elastic load sensing region of the strain gauge force sensing device.

Specification of Second Illustrative Embodiment of the Strain Gauge Force Sensor of the Present Invention FIG. 20A shows the strain gauge force sensor (i.e. load cell) according to second illustrative embodiment 32B comprising: an injection-molded base housing 161 having a cylindrical load cell mounting recess 162; a strain-gauge sensor 163 mounted in mounting recess 162 of the base housing component 161; a co-molded cover housing portion 164 having an elastic load sensing region 164A disposed above in close contact with the load sensor 163; a rubber gasket 165 for insertion between the cover housing portion 164 and the base housing portion 162; and a base-mounted force-overload protection spring 166 mounted between the load sensor 163 and bottom surface 161B of the base housing 161 and adapted to reduce the magnitude of force that the load cell sensor 163 experiences when excessive force overloads are applied to the elastic load sensing region 164A of the strain gauge force sensing device.

Figure 20B:
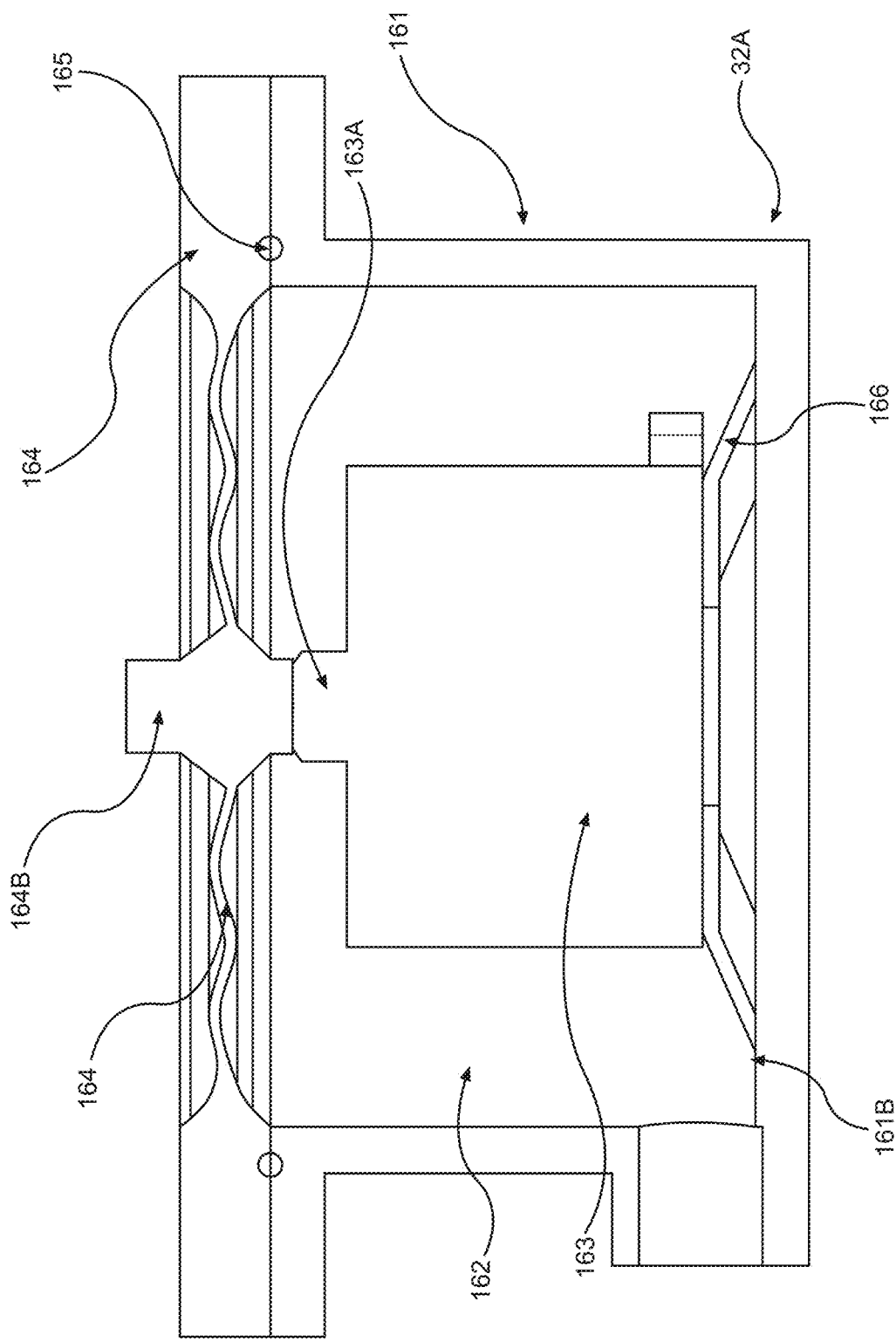
FIG. 20B is a cross-sectional view of the strain gauge force sensor (i.e. load cell) according to second illustrative embodiment of the present invention shown in FIG. 19A, where the load sensor is shown supported between the base-mounted force-overload protection spring and the elastic load sensing region of the co-molded cover housing portion.

FIG. 20B shows the load sensor 163 in strain gauge force sensor 32B of FIG. 19A, supported between the base-mounted force-overload protection spring 166 and the elastic load sensing region 164A of the co-molded cover housing portion.

FIGS. 20C1, 20C2 and 20C3 shows the strain gauge force sensor 32B of FIG. 19A, being exposed to excessive loads (e.g. a heavy person stepping over the load sensor) and how the base-mounted force-overload protection spring 166 mounted between the load sensor 163 and bottom surface 161B of the base housing adapts its size and geometry to reduce the magnitude of force that the load cell sensor 163 experiences when excessive force overloads are applied to the elastic load sensing region 164A.

Figure 21A:
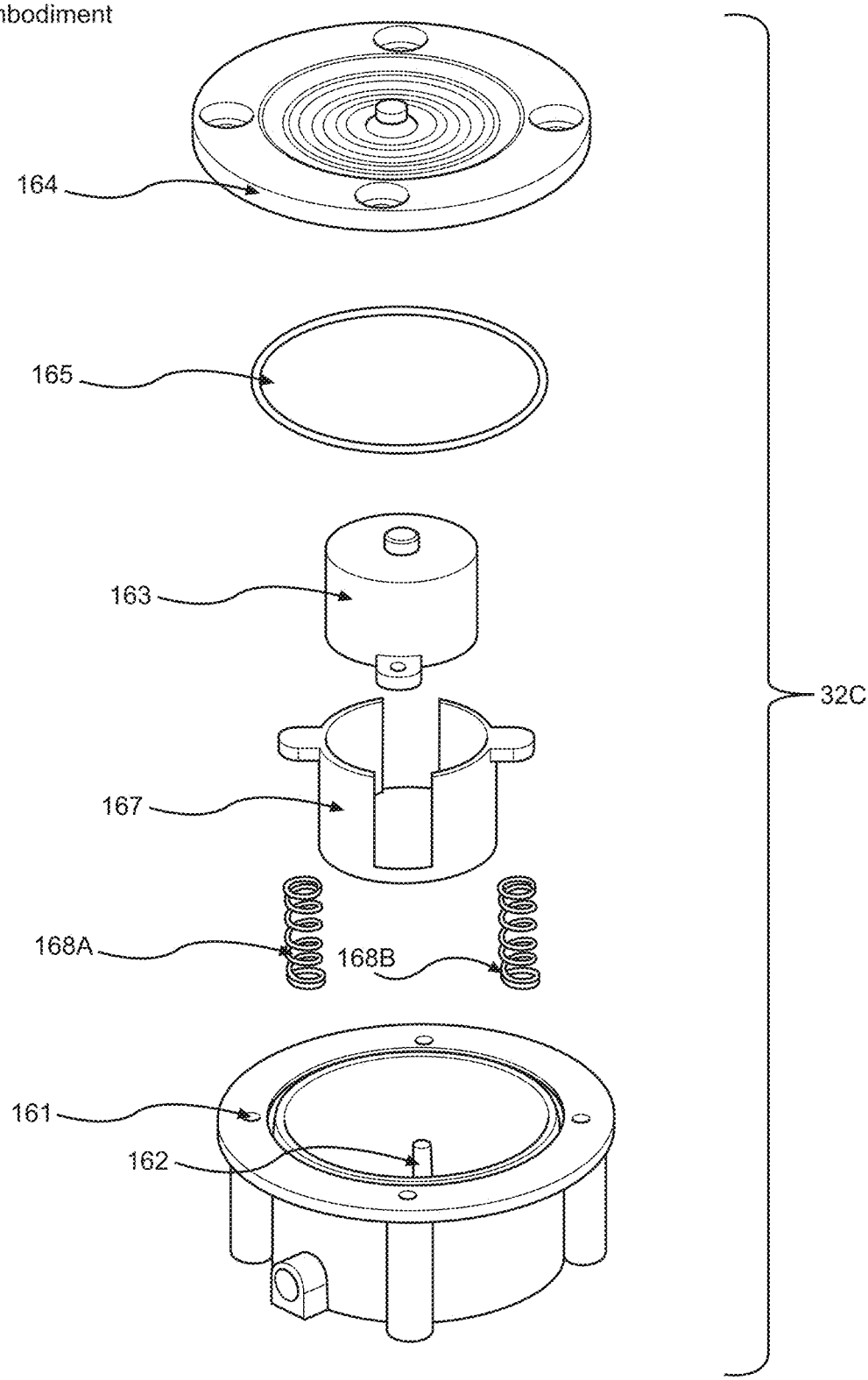
FIG. 21A is an exploded view of the strain gauge force sensor (i.e. load cell) according to third illustrative embodiment of the present invention, shown comprising an injection-molded base housing having a cylindrical load cell mounting recess, a strain-gauge sensor mounted in mounting cup having a pair of support flanges, a co-molded cover housing portion having an elastic load sensing region disposed above in close contact with the load sensor, a rubber gasket for insertion between the cover housing portion and the base housing portion, and a set of force-overload protection springs mounted between the support flanges and the bottom surface of the base housing and adapted to reduce the magnitude of force that the load cell sensor experiences when excessive force overloads are applied to the elastic load sensing region of the strain gauge force sensing device.

Specification of Third Illustrative Embodiment of the Strain Gauge Force Sensor of the Present Invention FIG. 21A shows the strain gauge force sensor 32C according to third illustrative embodiment comprising: an injection-molded base housing 161 having a cylindrical load cell mounting recess 162; a strain-gauge sensor 163 mounted in a mounting cup 167 having a pair of support flanges 167A and 167B; a co-molded cover housing portion 164 having an elastic load sensing region 164A disposed above in close contact with the load sensor 163; a rubber gasket 165 for insertion between the cover housing portion 164 and the base housing portion 161; and a set of force-overload protection springs 168A and 168 mounted between the support flanges 167A and 167B and the bottom surface 161B of the base housing and adapted to reduce the magnitude of force that the load cell sensor 163 experiences when excessive force overloads are applied to the elastic load sensing region 164A of the strain gauge force sensing device.

Figure 21B:
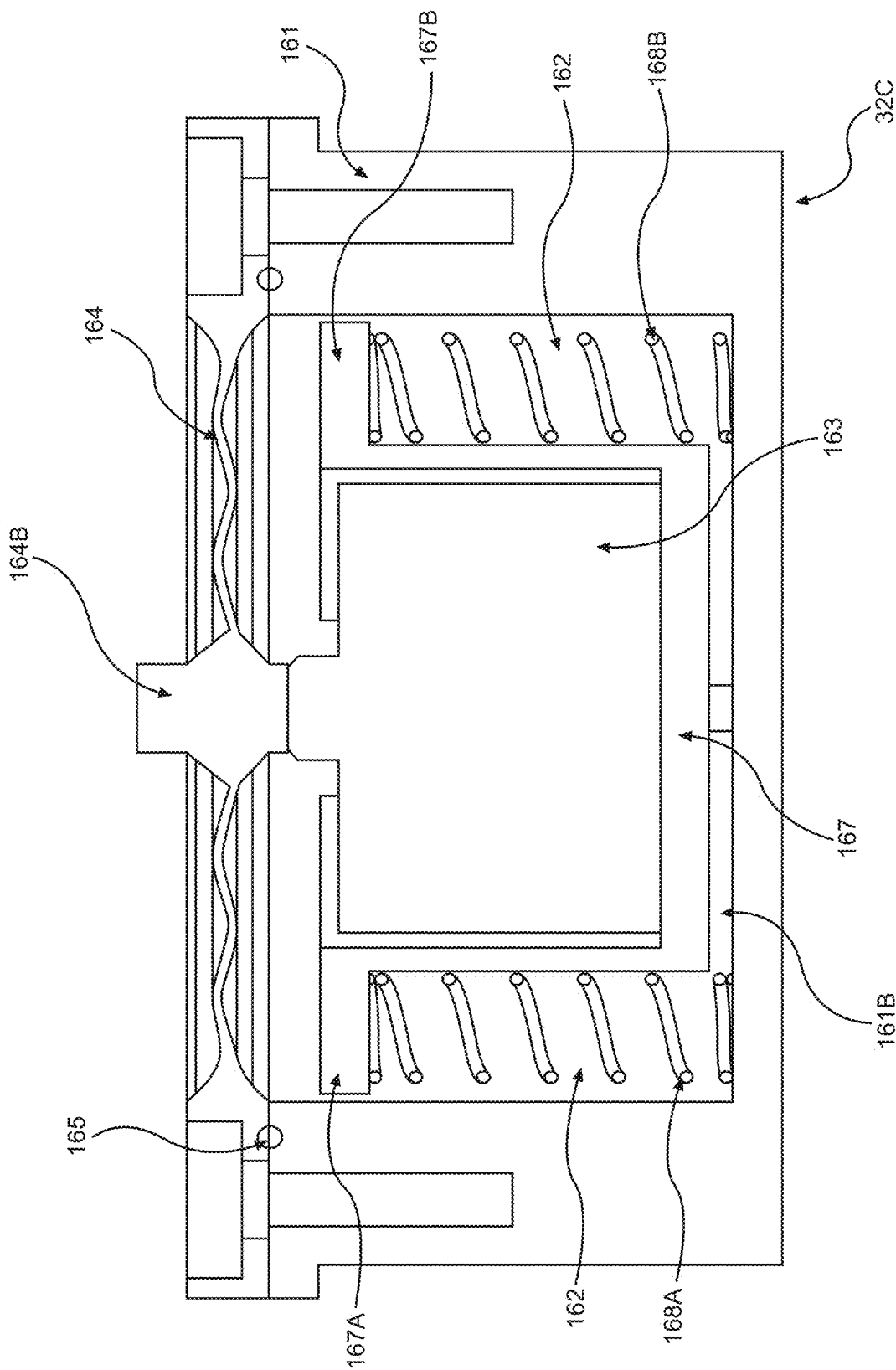
FIG. 21B is a cross-sectional view of the strain gauge force sensor (i.e. load cell) according to second illustrative embodiment of the present invention shown in FIG. 19A, where the load sensor is shown supported within the mounting cup and the between a pair of force-overload protection springs are mounted between the support flanges and the bottom of base housing portion, to reduce the magnitude of force that the load cell sensor experiences when excessive force overloads are applied to the elastic load sensing region.

FIG. 21B shows the load sensor 163 supported within the mounting cup 167 with the pair of force-overload protection springs 168A and 168B mounted between the support flanges 167A and 167B, and the bottom face 161B of base housing portion, to reduce the magnitude of force that the load cell sensor 163 experiences when excessive force overloads are applied to the elastic load sensing region.

Figure 22A:
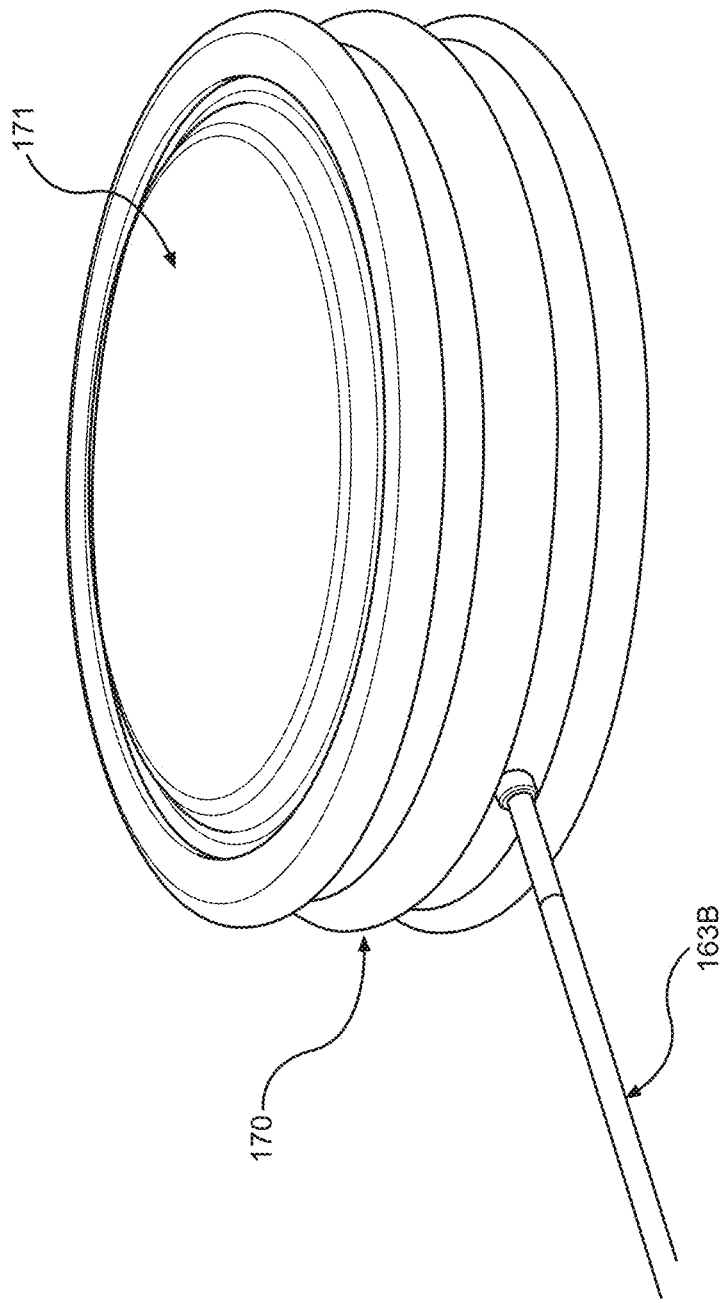
FIG. 22A is a perspective view of the strain gauge force sensor (i.e. load cell) according to fourth illustrative embodiment of the present invention, shown comprising a strain-gauge sensor mounted within a rubber bellows-like structure between rigid plates.
Figure 22B:
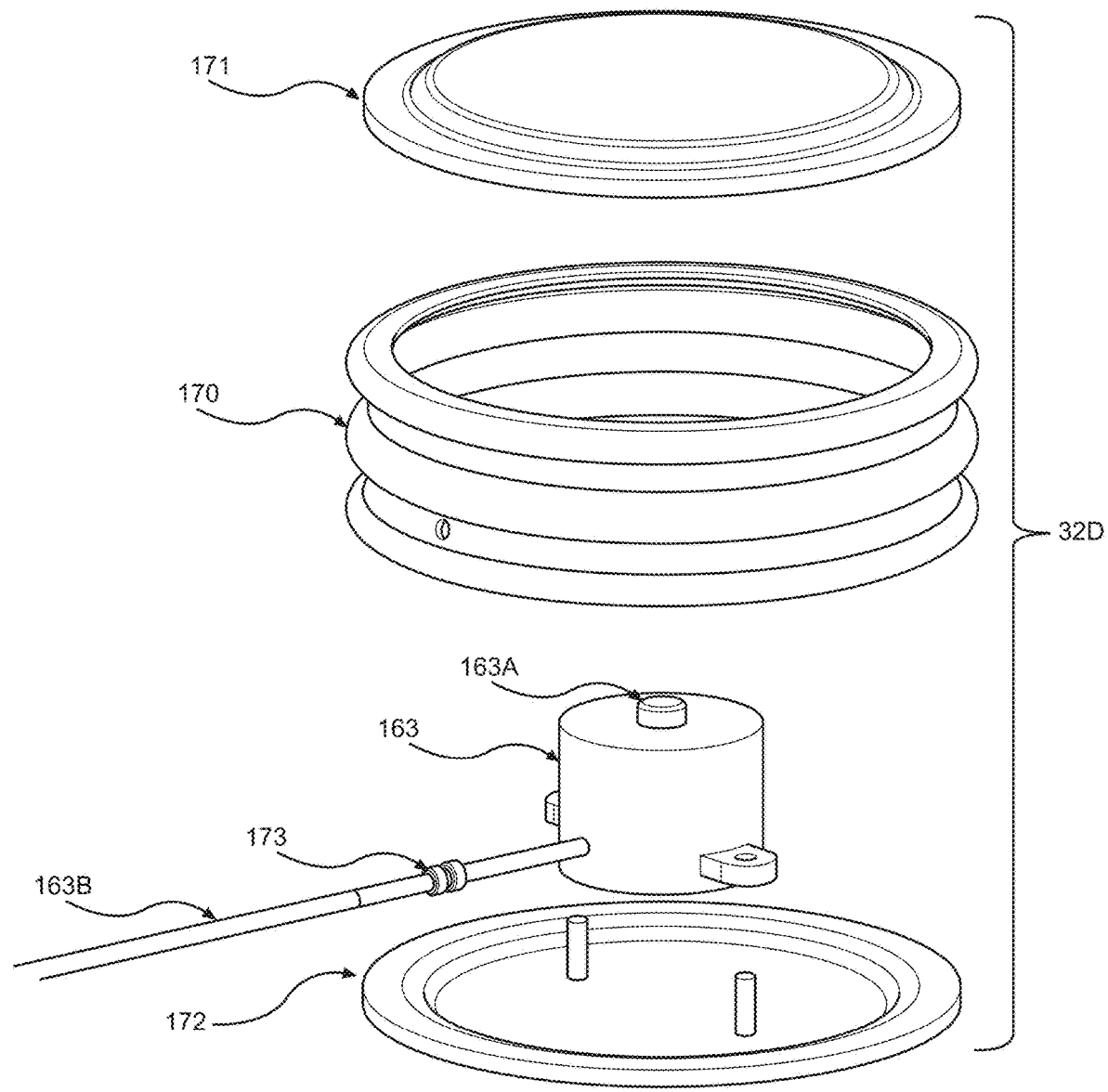
FIG. 22B is an exploded view of the strain gauge force sensor according to fourth illustrative embodiment of the present invention, shown comprising a strain-gauge sensor, a bellows-like structure and a pair of rigid plates.
Figure 22C:
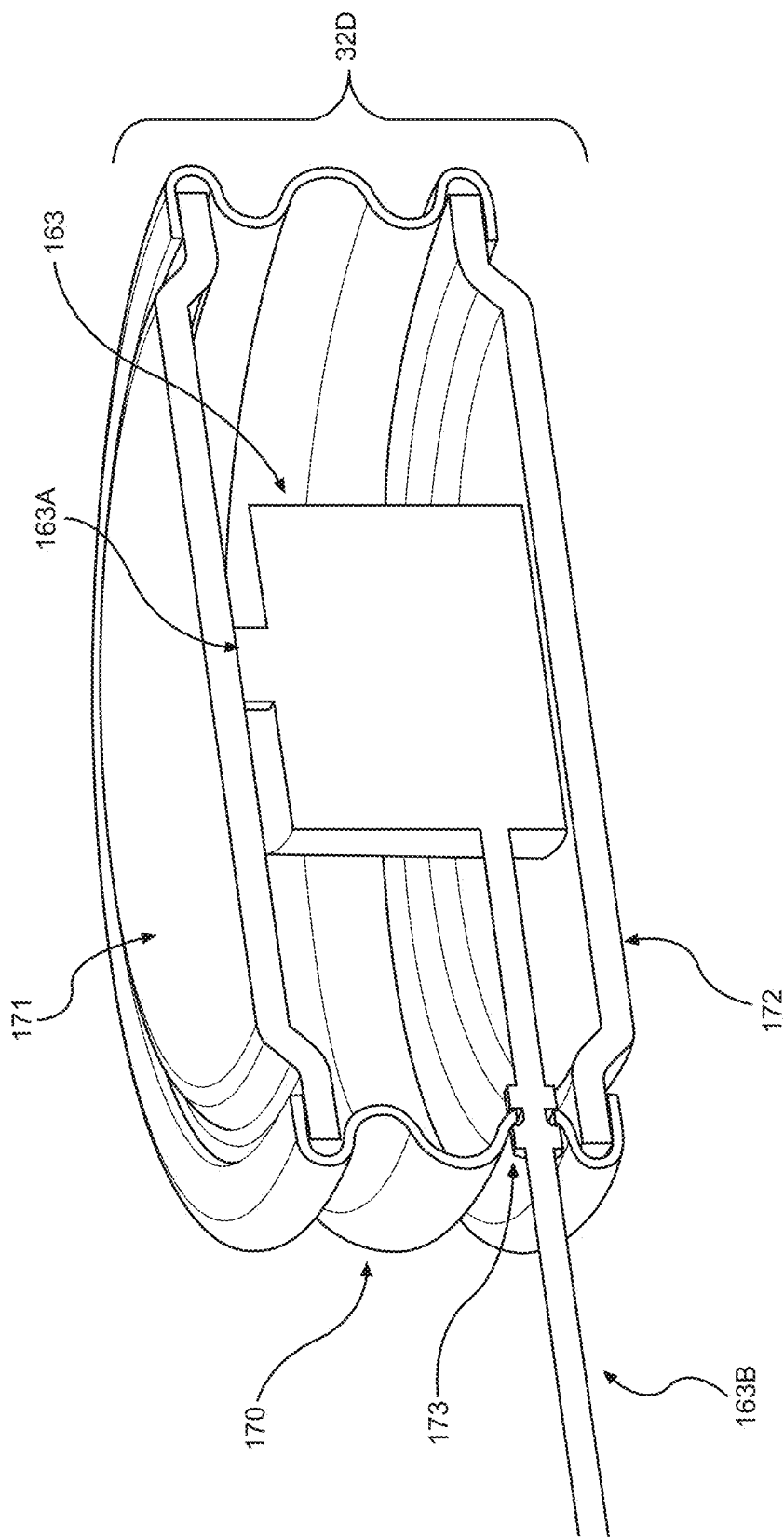
FIG. 22C is a cross-sectional view of the strain gauge force sensor according to fourth illustrative embodiment of the present invention, shown comprising a strain-gauge sensor, a bellows-like structure and a pair of rigid plates.

Specification of Fourth Illustrative Embodiment of the Strain Gauge Force Sensor of the Present Invention FIGS. 22A, 22B and 22C show the strain gauge force sensor 32D according to fourth illustrative embodiment comprising: a strain-gauge sensor 163 mounted within a foam ring structure 170 between a pair of rigid plates 171 and 172. The rubber bellows-like structure 170 can be made from elastomeric rubber material, and the plates 171 and 172 can be made of any suitable stiff material (e.g. plastic or metal material) that will remain substantially rigid during device operation so forces applied to the top plate 171 will be suitably transmitted to the strain-gauge sensor 163. Any suitable adhesive can be used to glue the plate 171 and 172 to the bellows-like structure 170, with the electrically conductive wires 163B from the sensor 163 extending outwardly, as shown. Preferably, the sensor 163 is fastened to the bottom plate 172 by a set of screws and lock nuts, and the conductive wires 163B can be fastened to the bottom plate 172 as well using a strap fastener 173 known the art.

Figure 23A:
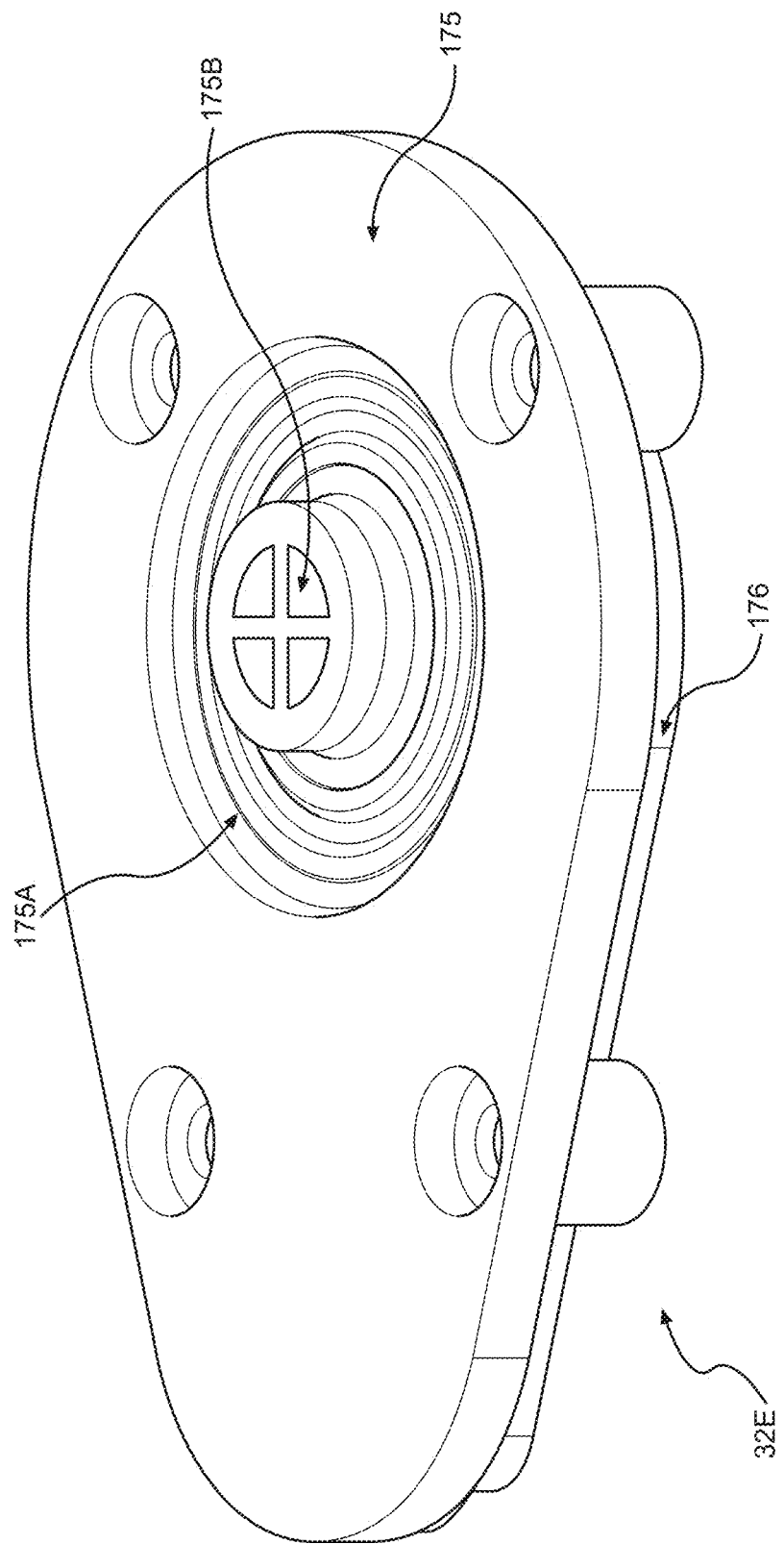
FIG. 23A is a perspective view of the strain gauge force sensor (i.e. load cell) according to fifth illustrative embodiment of the present invention, shown comprising a piezo-gauge sensor mounted between two injection-molded plastic housing components.

Specification of Fifth Illustrative Embodiment of the Strain Gauge Force Sensor of the Present Invention FIG. 23A shows the strain gauge force sensor (i.e. load cell) 32E constructed according to fifth illustrative embodiment of the present invention, comprising: a piezo-gauge sensor 174 mounted between two injection-molded plastic housing components 175 and 176 fastened together by a pair of screws 178A through 178D.

Figure 23B:
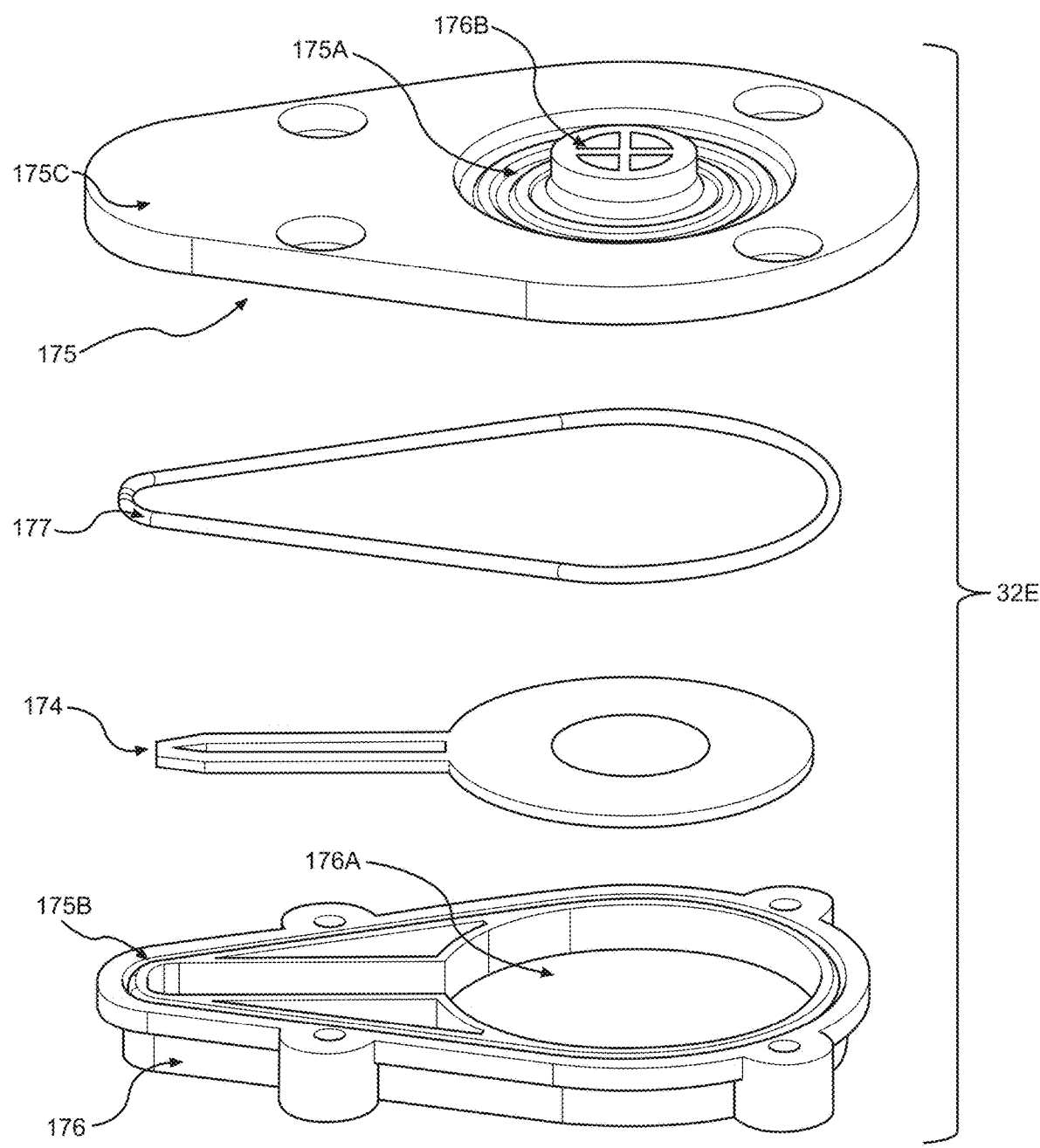
FIG. 23B is an exploded view of the strain gauge force sensor according to fifth illustrative embodiment of the present invention, shown comprising a piezo-gauge sensor, a first injection-molded plastic housing component having a recess for receiving the piezo-gauge sensor, a second co-molded plastic housing component having a rubber load force region that establishes contact with the piezo-gauge sensor, and rubber gasket seal that sits in a seats formed within the first and second housing components, and a set of screws for fastening together the first and second housing components.

FIG. 23B shows the strain gauge force sensor of FIG. 23A as comprising: a piezo-gauge sensor 174; a first injection-molded plastic housing component 176 having a recess 176A for receiving the piezo-gauge sensor 174 a second co-molded plastic housing component 175 having a rubber load force region 175A that establishes contact with the piezo-gauge sensor 174; and rubber gasket seal 177 that sits in narrow seats 176B and 175C respectively, formed in top flange of the housing component 176; and set of screws 178 for fastening together the first and second housing components 175 and 176.

Figure 23C:
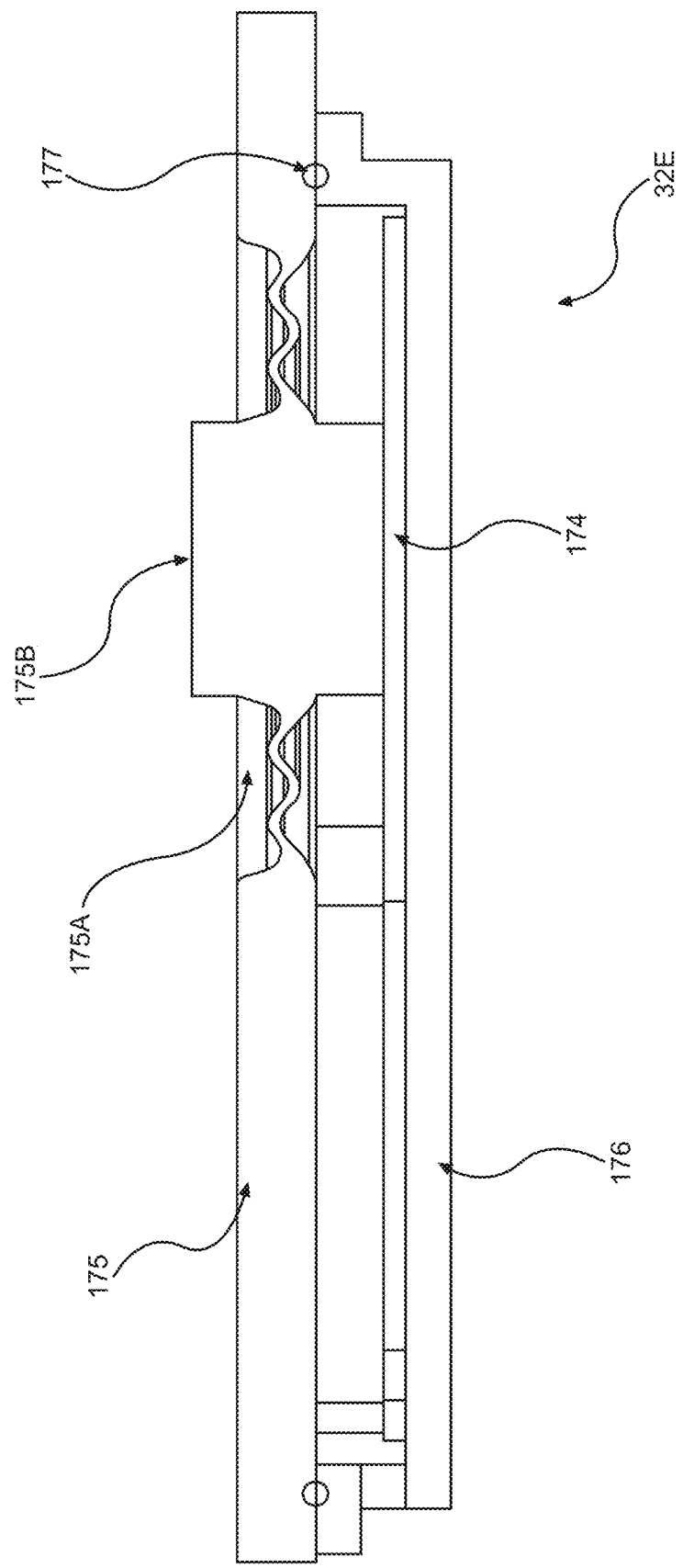
FIG. 23C is a cross-sectional view of the strain gauge force sensor according to fifth illustrative embodiment of the present invention.

FIG. 23C shows the piezo-gauge sensor 174 mounted between the first and second housing components 175 and 176, with the rubber load force load region 175B engaging closely the piezo-gauge sensor 174

Figure 23D:
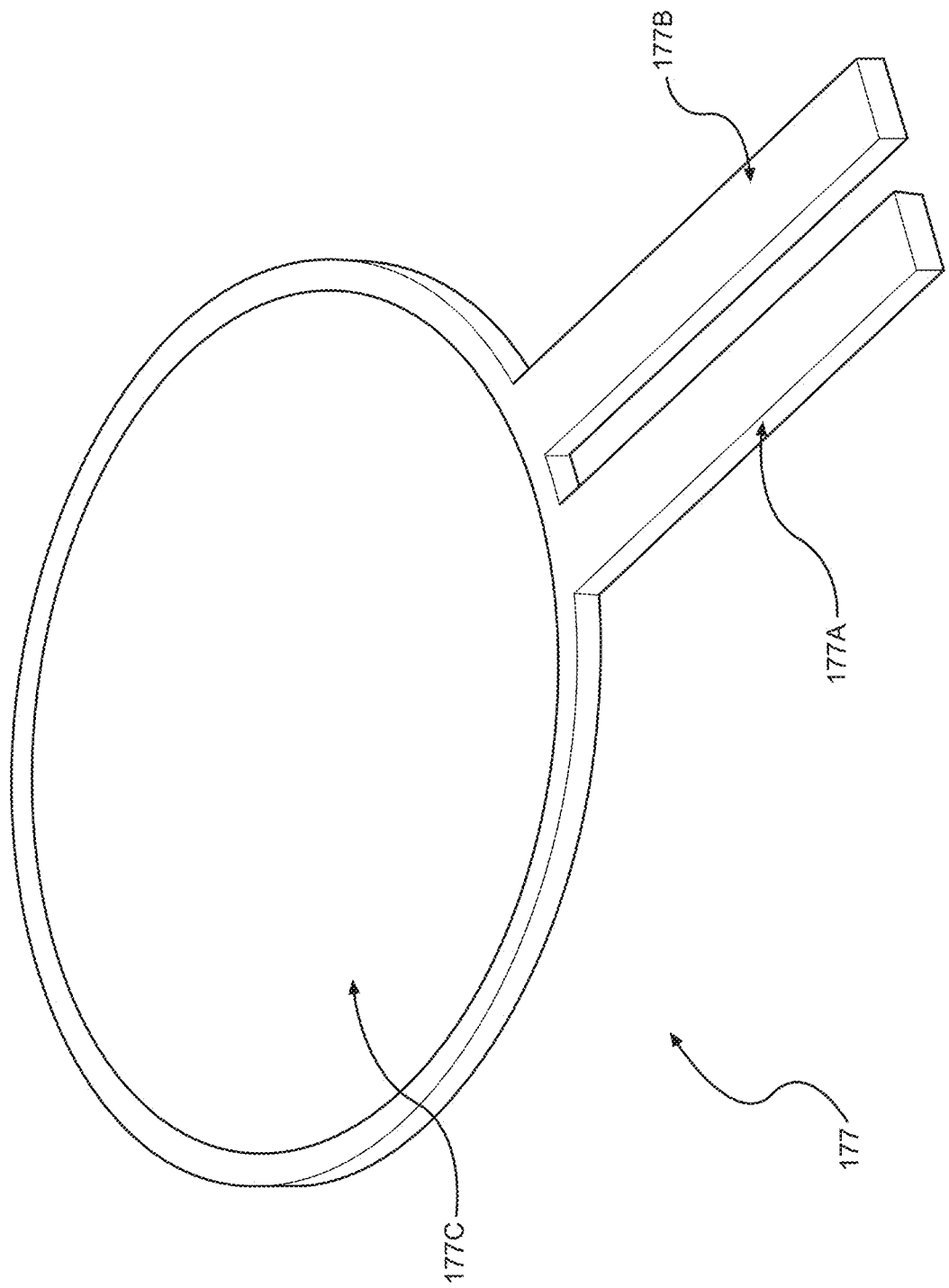
FIG. 23D is a perspective view of a strain guide sensor for use in the force sensor shown in FIGS. 23A through 23C.

FIG. 23D shows the strain-gauge sensor 177 that is used in the force sensor 32E shown in FIGS. 23A through 23C, with tunnels 177A and 177B extending away 32E from sensing region.

Figure 24A:
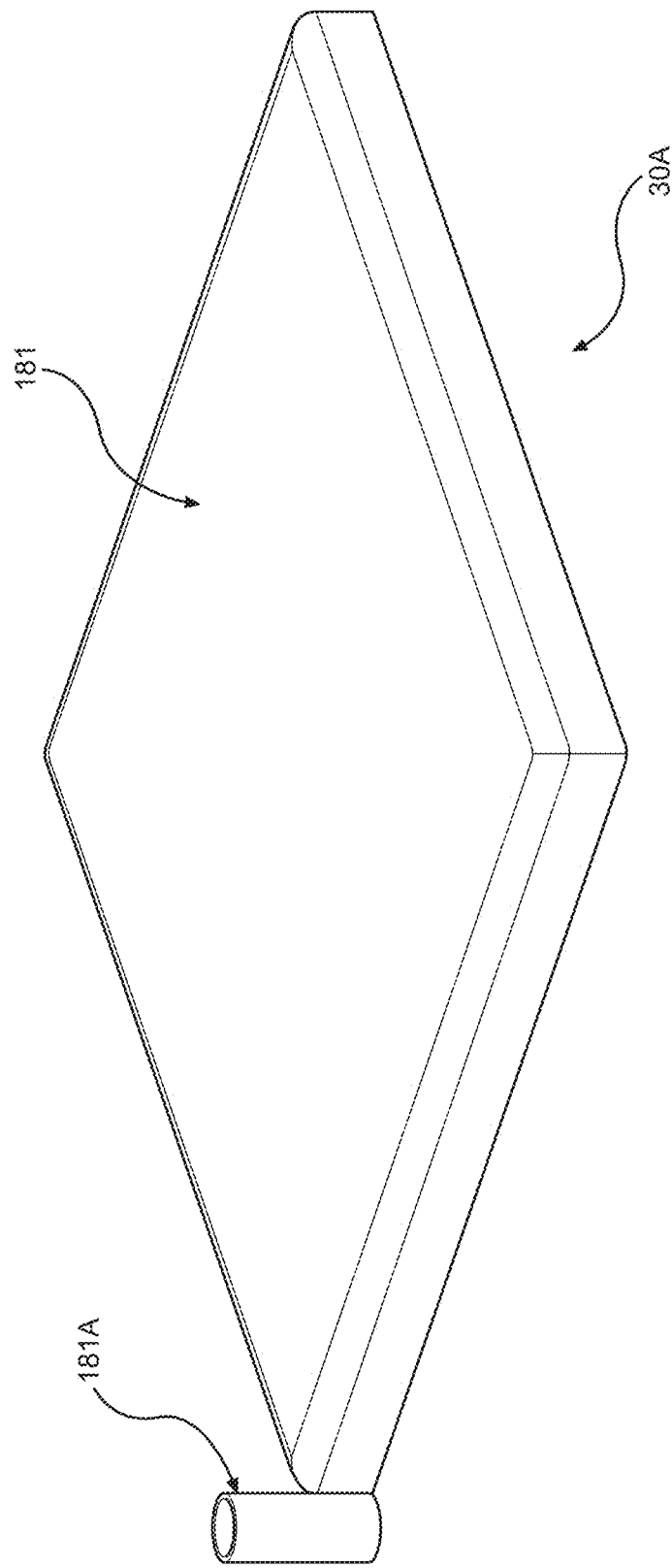
FIG. 24A is a perspective view of the first illustrative embodiment of the base station that can be used to construct a snow load monitoring system in accordance with the principles of the present invention, wherein a force sensor recess (i.e. mounting well) is stamped into a piece of sheet metal, and the weigh plate is bonded or welded to the sheet metal.

Specification of First Illustrative Embodiment of the Base Station of the Snow Load Monitoring System of the Present Invention FIG. 24A shows the first illustrative embodiment of the base station 30A that can be used to construct a snow load monitoring system in accordance with the principles of the present invention.

Figure 24B:
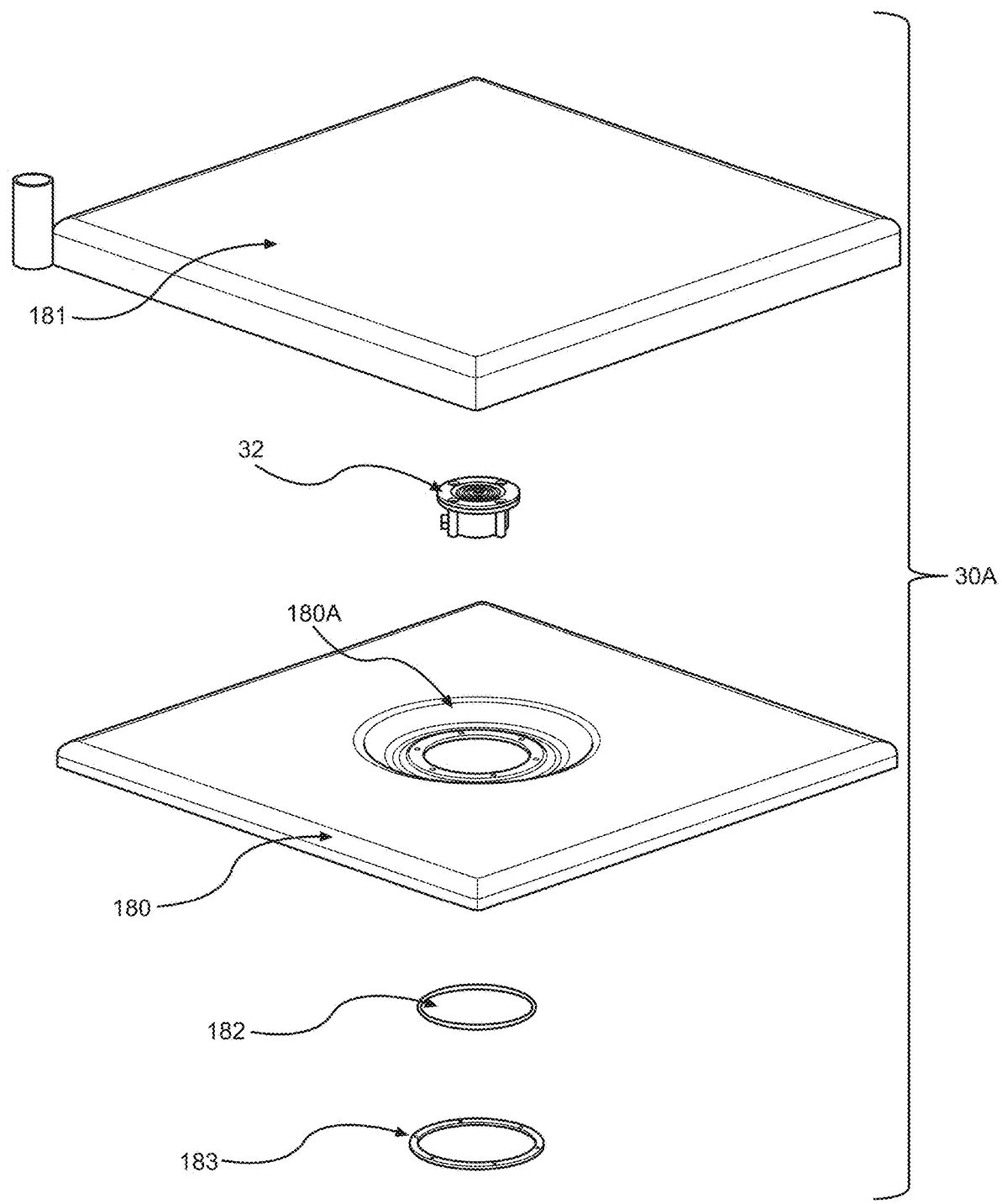
FIG. 24B is an exploded view of the first illustrative embodiment of the base station shown in FIG. 24A, comprising a force sensor mounted in a force sensor mounting recess (i.e. well) stamped into a piece of sheet metal, and a weigh plate bonded or welded to the stamped piece of sheet metal.

FIG. 24B shows the first illustrative embodiment of the base station 30A comprising: a force sensor 32 (e.g. 32A-32E) mounted in a force sensor mounting recess (i.e. well) 180A stamped into a piece of sheet metal 180 and a weigh plate 181 bonded or welded to the stamped piece of sheet metal 180. Ring washer and mounting ring 182 and 183 are mounted to sensor 32 from below the sheet metal plate 180.

Figure 24C:
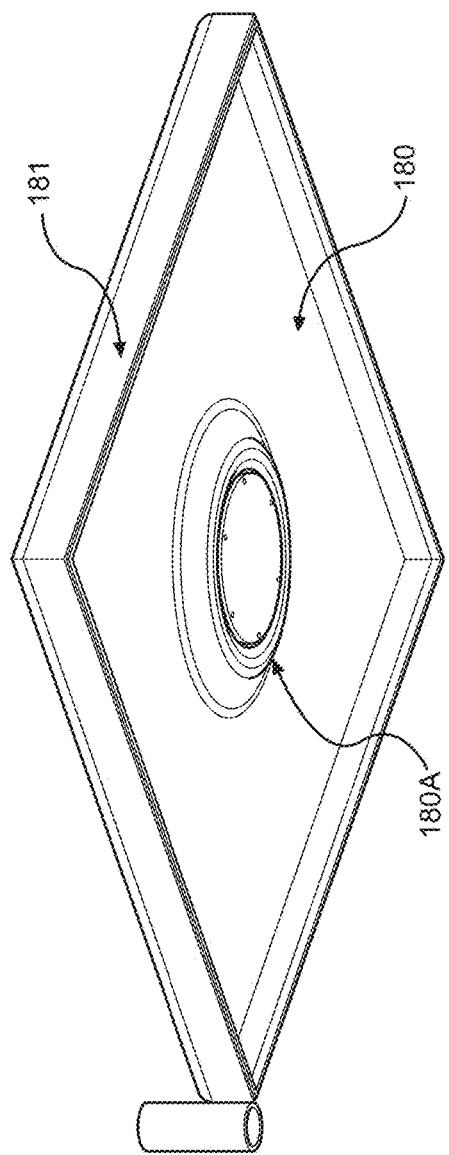
FIG. 24C is a perspective underside view of the first illustrative embodiment of the base station shown in FIG. 24A, shown comprising a force sensor mounted in a force sensor mounting well stamped into a piece of sheet metal, and a weigh plate bonded or welded to the stamped piece of sheet metal.
Figure 24D:
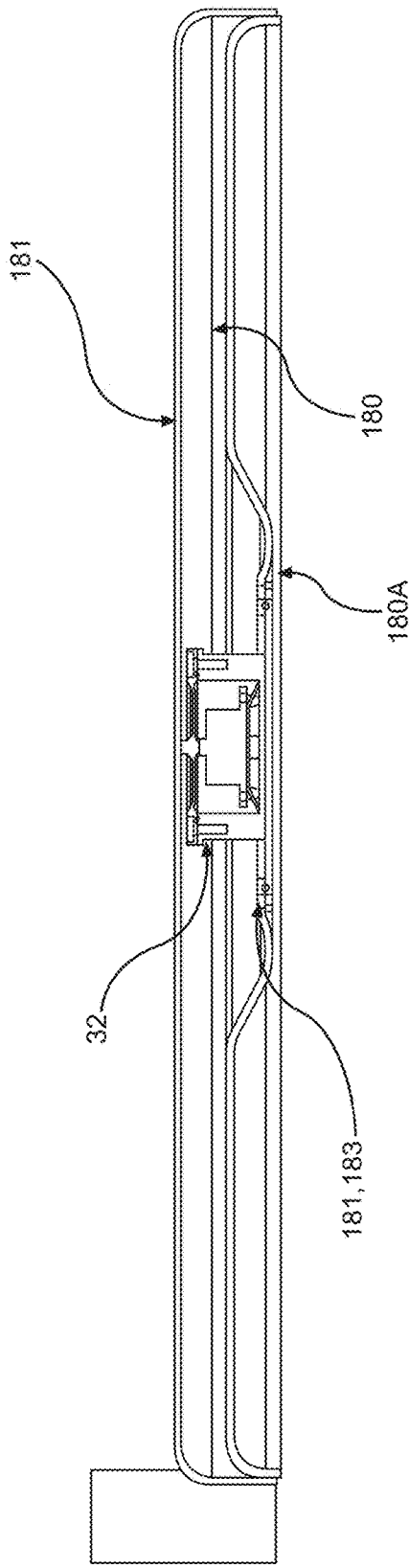
FIG. 24D is an elevated cross-sectional view of the first illustrative embodiment of the base station shown in FIG. 24A, showing the force sensor mounted in the force sensor mounting well stamped into a piece of sheet metal, with the weigh plate bonded or welded to a stamped piece of sheet metal.

FIGS. 24C and 24D show the force sensor 32 mounted in the force sensor mounting well 180A stamped into a piece of sheet metal 180; and the weigh plate 181 bonded or welded to the stamped piece of sheet metal 180.

During base station operation, the force imposed on the weigh plate 181 is transferred through the weigh plate 181 to the force sensor 32 so as to generate an electrical signal that is calibrated to provide an accurate representation of the magnitude of the force applied by the gravitational load on the weigh plate 181.

Figure 25A:
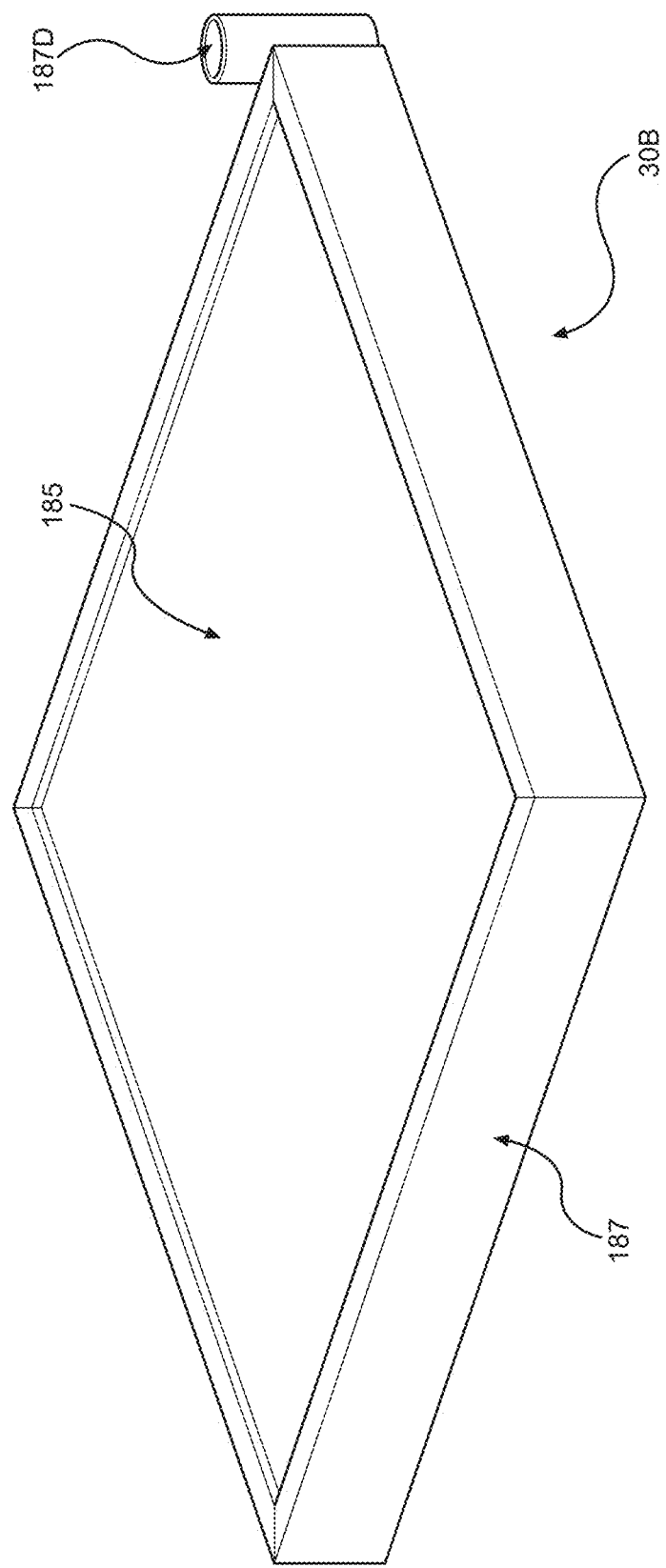
FIG. 25A is a perspective view of the second illustrative embodiment of the base station that can be used to construct a snow load monitoring system in accordance with the principles of the present invention, wherein an extruded frame is used with slide-in flat top and bottom plates, to form the base station with the force sensor mounted in a support frame fixed to the bottom plate.

Specification of Second Illustrative Embodiment of the Base Station of the Snow Load Monitoring System of the Present Invention FIG. 25A shows the second illustrative embodiment of the base station 29B that can be used to construct a snow load monitoring system in accordance with the principles of the present invention, wherein an extruded frame 187 is used with slide-in flat top and bottom plates 185 and 186, to form the base station with the force sensor 32 mounted in a support frame fixed to the bottom plate 186.

Figure 25B:
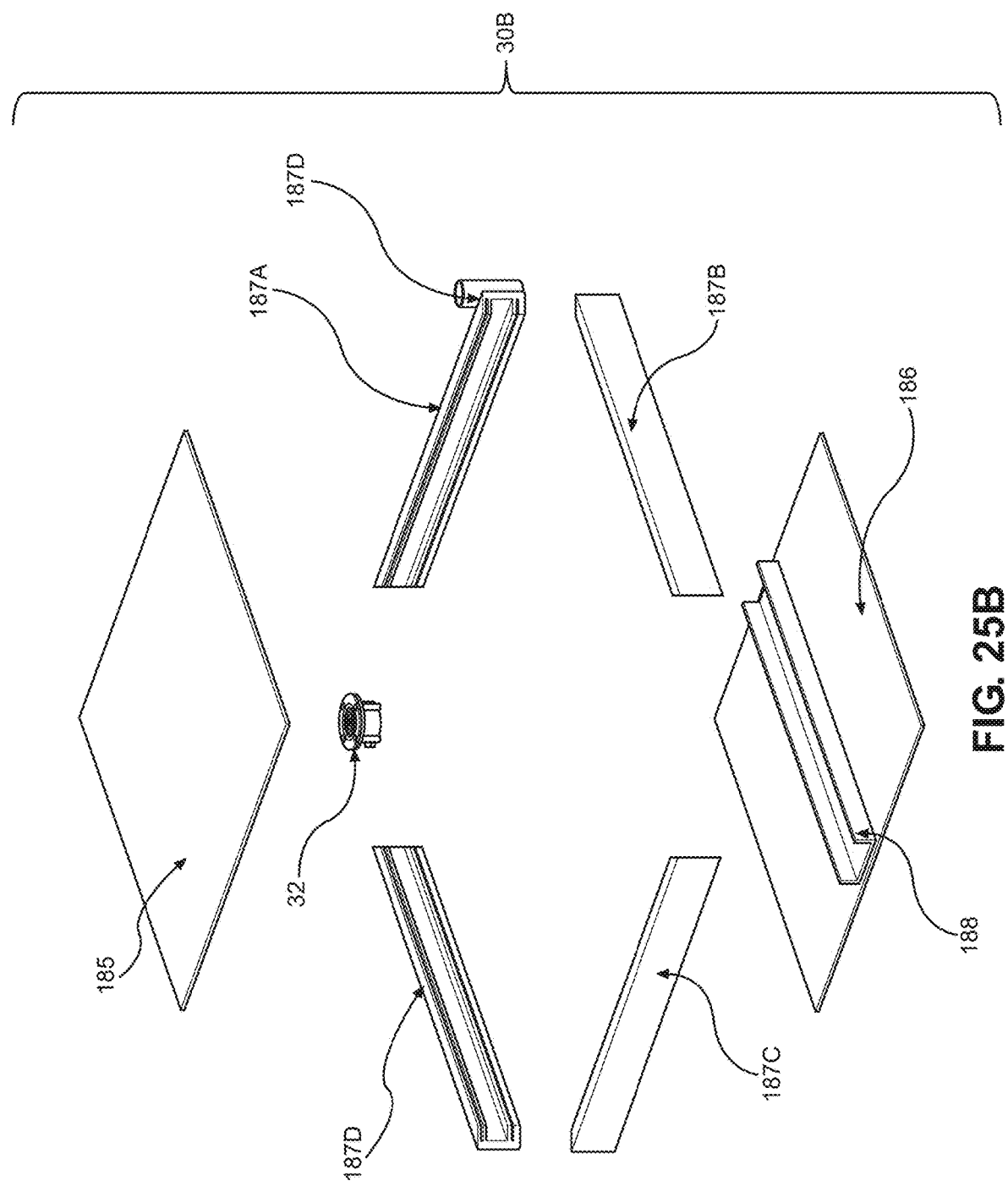
FIG. 25B is an exploded view of the second illustrative embodiment of the base station shown in FIG. 25A, comprising an extruded frame having four frame portions are assembled like a picture frame, and flat top and bottom plates are slid-into the frame like a picture frame, to form the base station with the force sensor mounted in a support frame fixed to the bottom plate.
Figure 25C:
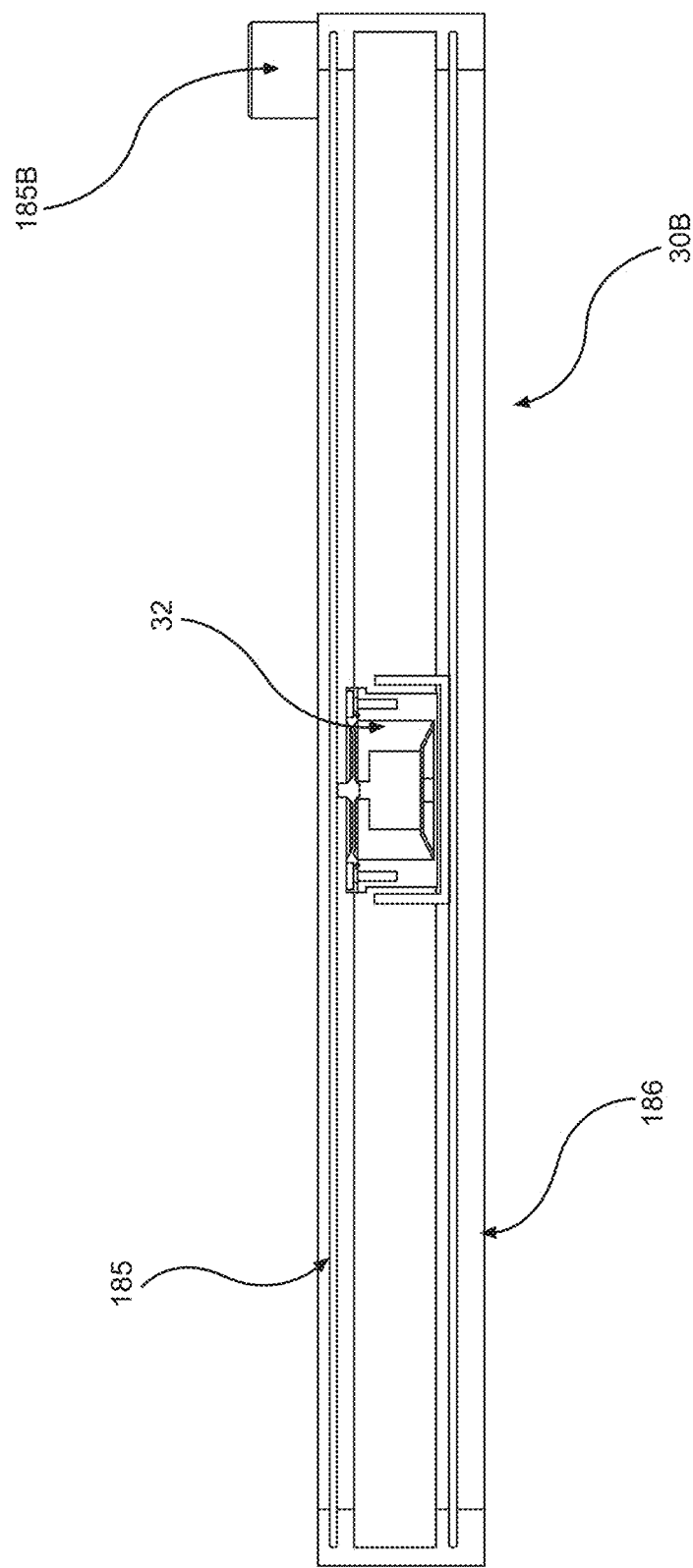
FIG. 25C is an elevated cross-sectional view of the second illustrative embodiment of the base station shown in FIG. 25A, showing the force sensor mounted between the top and bottom plates contained with the assembled frame structure.

FIG. 25B shows the base station 29B comprising: an extruded frame 187 having four frame portions 187A through 187D assembled together like a picture frame; and flat top weigh plate 185 and a flat bottom plate 186 are slid-into the extruded frame, to form the base station 187 with the force sensor 32 mounted in a support frame 187 fixed to the bottom plate 186. FIG. 25C show the force sensor 32 mounted between the top and bottom plates 185 and 186 contained with the assembled frame structure 187.

The extruded frame portions can be made from any suitable material such as metal, plastic or even wood, if necessary. Likewise, the top and bottom plates can be made from plastic, metal or wood, provided these components are sufficiently stiff to enable forces to be transmitted to the force sensor 32 mounted below the top weigh plate 185, as shown.

During base station operation, the force imposed on the weigh plate 185 is transferred through the weigh plate 185 to the force sensor 32 so as to generate an electrical signal that is calibrated to provide an accurate representation of the magnitude of the force applied by the gravitational load on the weigh plate 185.

Figure 26A:
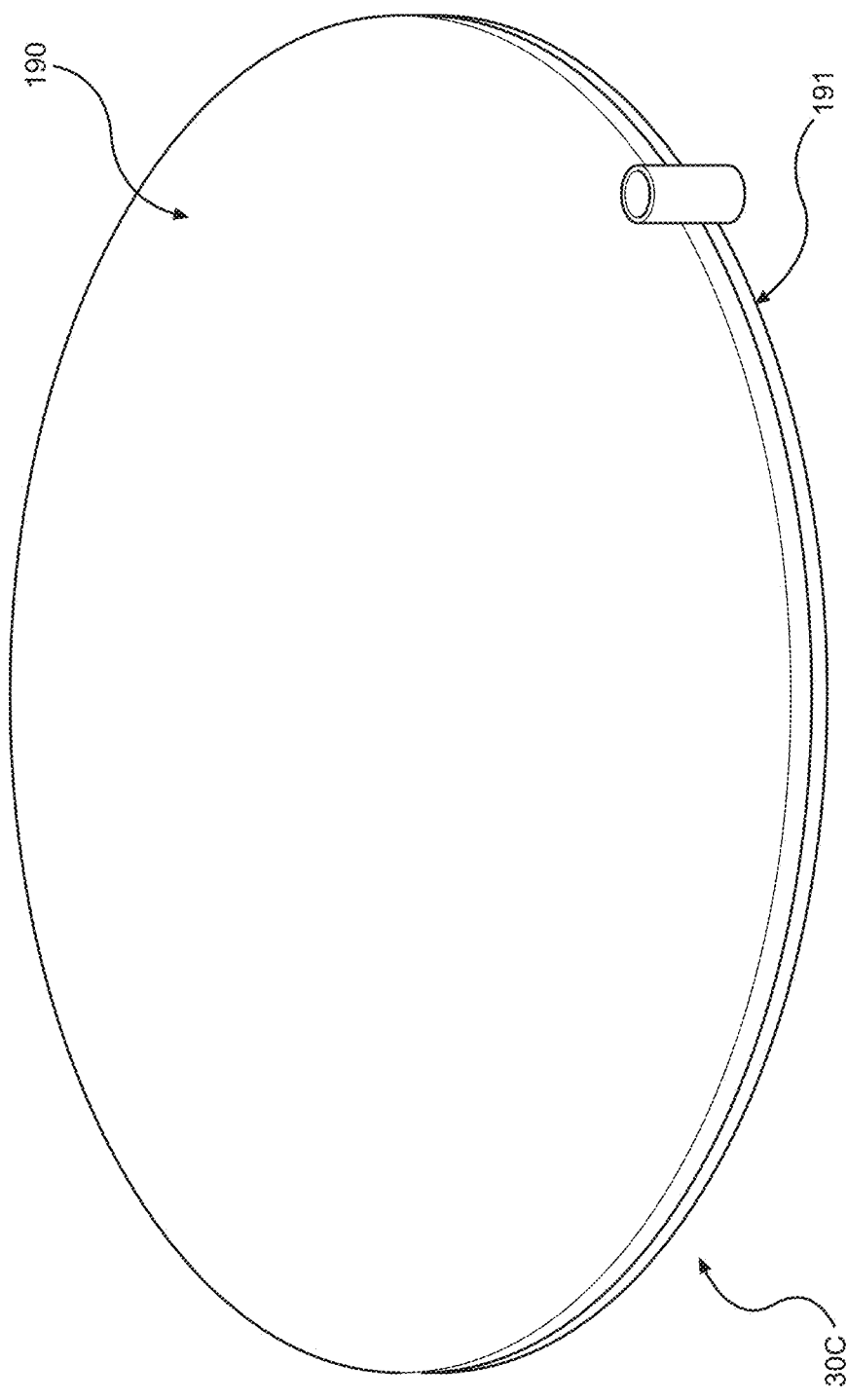
FIG. 26A is a perspective view of the third illustrative embodiment of the base station that can be used to construct a snow load monitoring system in accordance with the principles of the present invention, wherein an injection-molded plastic weight plate and base housing contain a single load sensor configured according to the deflection measurement method, and the mast is mounted on the side of the base station.

Specification of Third Illustrative Embodiment of the Base Station of the Snow Load Monitoring System of the Present Invention FIG. 26A shows the third illustrative embodiment of the base station 29C that can be used to construct a snow load monitoring system in accordance with the principles of the present invention, wherein an injection-molded plastic weight plate 190 and base housing 191 contain a single load sensor 32 configured according to the deflection measurement method, and a mast mounting structure 190A is mounted on the side of the base station 29C.

Figure 26B:
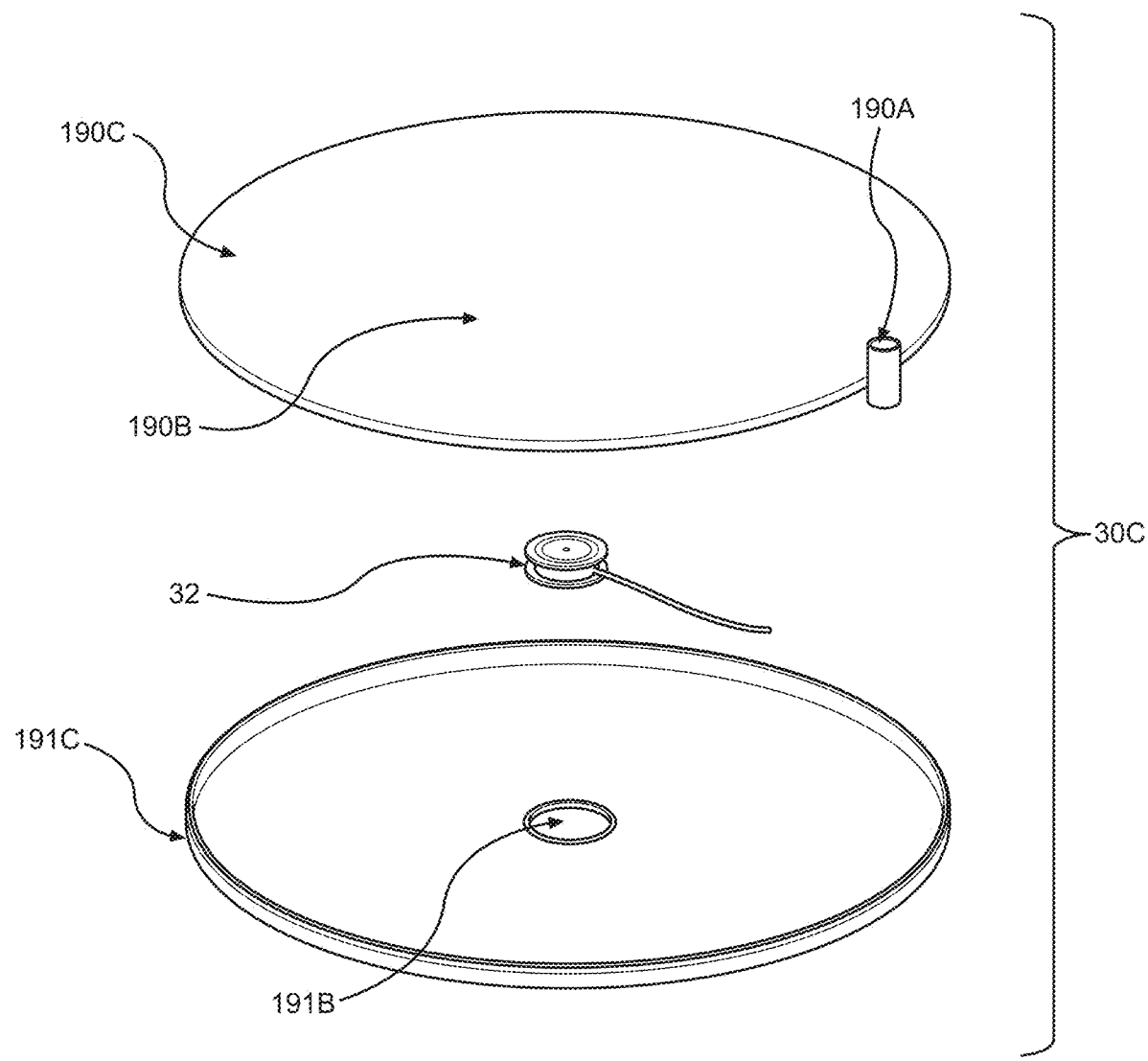
FIG. 26B is a first exploded view of the third illustrative embodiment of the base station shown in FIG. 26A comprising an injection-molded plastic weight plate and base housing containing a single load sensor.
Figure 26C:
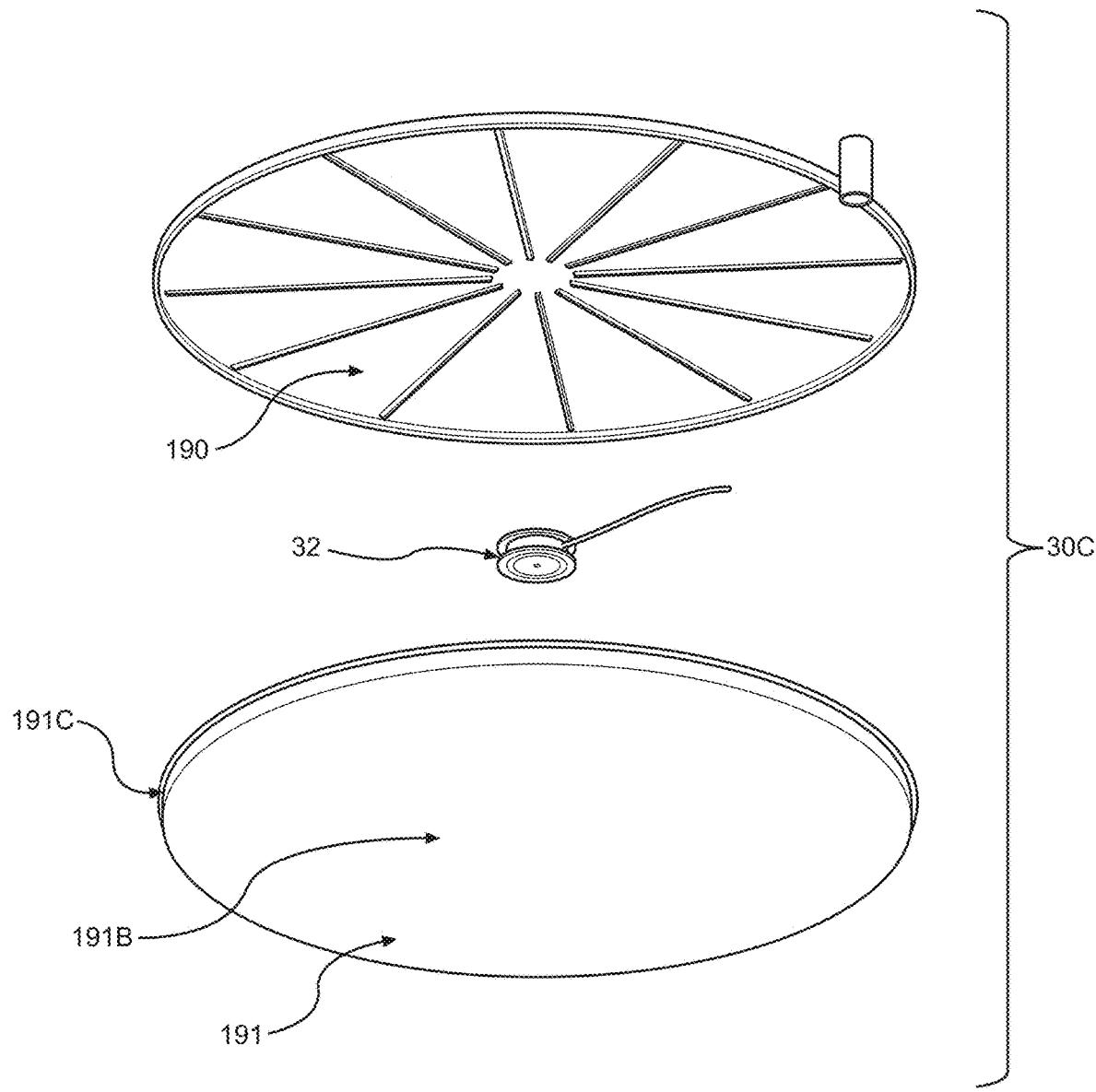

FIGS. 26B and 26C shows the third illustrative embodiment of the base station 29C comprising: an injection-molded plastic weight plate 190, and base housing 191 containing a single load sensor 32.

Figure 26D:
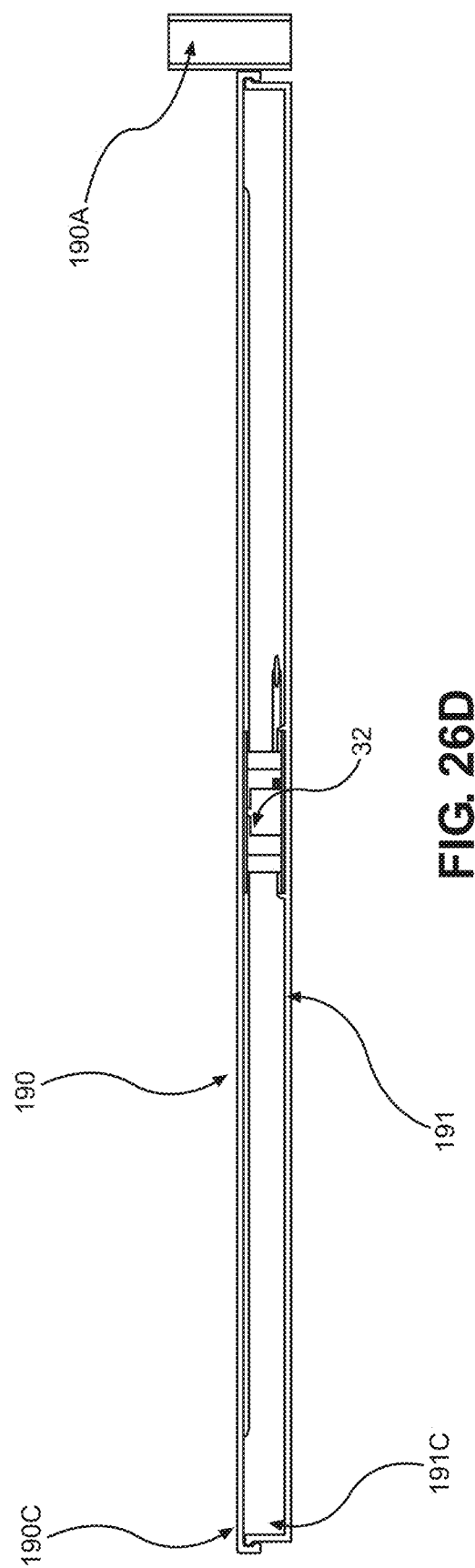

FIG. 26D shows the force sensor 32 in the base station of FIG. 26A being mounted between the weight plate 190 and the bottom surface of the base housing 191. As shown, weigh plate 190 has molded flange 190C extending about the outer perimeter of the plastic weigh plate 190, which engages with molded flange 191C about the outer perimeter of the plastic base housing 191, so as to fasten the plastic housing halves together securely, sealed off from the environment.

During base station operation, the force imposed on the weigh plate 190 is transferred through the weigh plate 190 to the single force sensor 32 so as to generate an electrical signal that is calibrated to provide an accurate representation of the magnitude of the force applied by the gravitational load on the weigh plate 190.

Specification of Fourth Illustrative Embodiment of the Base Station of the Snow Load Monitoring System of the Present Invention FIG. 27A shows the fourth illustrative embodiment of the base station 29D that can be used to construct a snow load monitoring system in with the principles of the present invention, wherein an injection-molded plastic weight plate 192 and base housing 193 containing four load sensors 32A through 32D configured according to a deflection measurement method, and the mast structure support 192A is mounted on the center of the base station.

FIGS. 27B and 27C show the base station 193 of FIG. 27A as comprising: an injection-molded plastic weight plate 192; a base housing 193 containing four load sensors 32A through 32D; and a mast support structure 192A mounted on the center of the plastic weight plate 192.

FIG. 27D show the force sensors 32A through 32D mounted between the weight plate 192 and the base housing 193, with the edge flange 192C on the weigh plate 192 engaging with the outer edge flange 193C on the base housing 193, so as to fasten the plastic housing halves together securely, sealed off from the environment.

During base station operation, the force imposed on the weigh plate 192 is transferred through the weigh plate 192 to the force sensors 32A and 32D so as to generate a composite electrical signal that is calibrated to provide an accurate representation of the magnitude of the force applied by the gravitational load on the weigh plate 192.

Specification of Fifth Illustrative Embodiment of the Base Station of the Snow Load Monitoring System of the Present Invention FIG. 28A shows the fifth illustrative embodiment of the base station 30F that can be used to construct a snow load monitoring system 30F in accordance with the principles of the present invention, wherein a flexible gasket 302 is disposed between a flat weigh plate 300 and a base plate 301 with four load sensors 32A through 32D mounted on the base plate 301 and configured according to a translational measurement method, and a vertical mast support structure 301A mounted on the side of the base station 30F.

FIGS. 28B and 28C show the base station 30F of FIG. 29A comprising: a flexible gasket 302 disposed between flat weight plate 300 and base plate 301 with four load sensors 32A through 32D mounted on the base plate 301 and configured according to a translational measurement method, with the mast support structure 301A mounted on the side of the base station. As shown, the rubber gasket 302 provides resilient support between the weight plate 301 and base plate 301, with the load sensors 32A through 32D bearing the gravitational load exerted on the weigh plate 301.

During base station operation, the force imposed on the weigh plate 301 is transferred through the weigh plate 301 to the force sensor 32 so as to generate an electrical signal that is calibrated to provide an accurate representation of the magnitude of the force applied by the gravitational load on the weigh plate 301.

Specification of Sixth Illustrative Embodiment of the Base Station of the Snow Load Monitoring System of the Present Invention FIG. 29A shows the sixth illustrative embodiment of the base station 30G that can be used to construct a snow load monitoring system in accordance with the principles of the present invention, wherein a weight plate 308 supported on a single load sensor 32 configured according to a bathroom-scale measurement method and an x-configured cantilever support structure 306, mounted on a support 310 on the load sensor 32 and four supports 307 mounted on the base plate 309 of the base framework, with a mast support structure 305A being mounted on the side of the base station.

As shown in FIG. 29B, the base station 30G comprises: weight plate 308, load sensor 32, bathroom-scale cantilever load distribution structure 306, and base framework 305 having a bottom base plate 309. As shown in FIG. 29C, the base station 30G with the force sensor 32 is mounted between the weigh plate 308 and the cantilever load distribution structures 306. FIGS. 29D and 29E show the load sensor 32 and load distribution cantilevers 306 mounted thereon.

During base station operation, the force imposed on the weigh plate 308 is transferred through the weigh plate 308 to cantilever structure 306, and then to the force sensor 32, so as to generate an electrical signal that is calibrated to provide an accurate representation of the magnitude of the force applied by the gravitational load on the weigh plate 308.

Specification of Seventh Illustrative Embodiment of the Base Station of the Snow Load Monitoring System of the Present Invention FIG. 30A shows the seventh illustrative embodiment of the base station 30H that can be used to construct a snow load monitoring system in accordance with the principles of the present invention, wherein a plurality of piezo-type load sensors 32E molded into a compliant (rubber-like) casing 313 position between a flat weigh plate 311 and a base plate 312.

As shown in FIG. 30B, the base station shown of FIG. 30A comprises: flat weight plate 311 and plate base plate 312; a plurality of piezo-type load sensors 32E; and rubber-like casing 313 into which the piezo-type load sensors 32E are molded. As shown in FIG. 30C, the weigh plate is removed to reveal the piezo-type load sensors 32E molded into the rubber-like casing 313. As shown in FIG. 30D, a pair of piezo-type load sensors 32E are employed in the base station 30H shown in FIG. 30A. An interconnector 314 is provided for interconnecting sensors 32E into a local network in communication with the data processing module 33.

FIG. 30E shows the plurality of piezo-type load sensors 32E being molded in the rubber-like casing 313 disposed between the flat weight and base plates 311 and 312.

Specification of Rooftop Snow Load Monitoring System of the Present Invention

FIG. 31 shows a building having a rooftop, on which is mounted a group of snow load sensing subsystems into an arrays 400 and 400', each employing one or more snow load sensing base units 4, described hereinabove, whose output measurements are collected and processed by a data processing hub 401, 402 and transferred to a digital signal transmitter 403 transmission to the remote data center 10, for remote now load monitoring and snow weight equivalent (SWE) monitoring using the methods described in FIGS. 34 and 35.

As shown in FIG. 31A, the rooftop mounted snow load measurement system array 400' is constructed from four (4) interfaced snow load sensing base units 4. As shown in FIG. 31B, the rooftop mounted snow load measurement system array 400" is constructed from nine (9) interfaced snow load sensing base units 4. As shown in FIG. 31C, the rooftop mounted snow load measurement system array 400''' is constructed from sixteen (16) interfaced snow load sensing base units 4. Larger arrays can be easily constructed using the snow load sensing base units 4 in accordance with the principles of the present invention.

FIG. 32 shows the ground-supported snow load measurement system array 400" constructed from nine (9) snow load sensing base units 4, in wireless communication with a GPS system 25, a cellular phone and SMS messaging system, and an Internet gateway, and drone-based system as described hereinabove.

As shown in FIG. 33, the multi-unit ground-supported snow load sensing system of the present invention comprising: a grid of sixteen (16) snow data collection modules (SDCMs) 4 operably connected to the central data processing module (CDPM) 401 by way of a data multiplexing and power distribution module (DMPDM) 402, operably connected to data signal transmittal 403. As shown, different grid-size arrays (e.g. 2×2 grid, 3×3 grid, and 4×4 grid) can be constructed by arranging different number of SDCMs 4 into an array, and cooperating with the DMDM 401 and CDPM 402.

FIG. 34 describes the primary steps involved when carrying out a first method of processing load data collected from multiple spatially-distributed snow load sensing base units 400 through 400''', each using multiple load sensor for snow load measurement. As shown, the first step of the method involves: (i) sampling and storing each SDCM load cell value (volts); and (ii) determining snow pressure for each SDCM 4 using the formula:

$$p = \frac{s\left(\sum_1^n LC_n\right)}{a}$$

wherein:
p=pressure on SDCM weighing plate
s=load cell sensitivity (force/volts)
$LC_n$=load cell value (volts)
n=load cell number
a=area of weighing plate FIG. 35 describes the primary steps involved when carrying out a method of processing load data collected from multiple snow load sensing base units 400 through 400''', each using a single load sensor for snow load measurement. As shown, the first step of the method involves: (i) sampling and storing SDCM load cell value (volts); and (ii) determining snow pressure for each SDCM 4 using the formula:

$$p = LC(x/2 + x + c),$$

wherein:
p=the pressure on the SDCM weigh plate measured in lbs/square foot;
x=the empirically determined variable, based upon the load cell sensitivity and scale geometry and material properties;
c=empirically determined constant based on upon load cell sensitivity and scale geometry and material properties; and
LC—load cell (volts).

Specification of the Building Intelligence Gathering and Processing System Network of the Present Invention FIGS. 36 through 42G presents exemplary graphical user interfaces (GUIs) supporting the deployment and management of snow load monitoring stations 4' through 4", as well as other systems deployed on the system network. As shown, these systems include, for example: (i) unmanned snow depth measuring aircraft systems 8; (ii) unmanned snow removing robot systems 6; (iii) automated snow conveying tunnel/tube systems 5; and (iv) VR-enabled rooftop navigation and inspection systems 14 assigned to specified building rooftops.

Authorized users will also have access to detailed information relating to VR-enabled control stations 7A through 7C described in detail above for use in remotely controlling and operating the above-mentioned systems deployed on the system network. The exemplary graphical user interface (GUI) also support enterprise-level services on the system network including, for example: (i) profiling buildings and generating rooftop snow depth maps using unmanned snow depth measuring aircraft systems 8; (ii) reviewing building rooftop snow depth maps and models maintained and periodically updated by the BIGADS system 1; and (iii) forecasting weather conditions for a specified building.

Specification of Exemplary Services Supported on the Illustrative Embodiment of the BIGADS System of the Present Invention, and the Exemplary GUI-Screens Employed Delivering the Same to Users of Deployed Client Systems on the System Network FIG. 36 shows a plurality of client systems operably connected to the cloud (i.e. TCP/IP infrastructure) and the data center of the present invention, being used by various system stakeholders being served by the network, including administrators, managers, operators (e.g. drones, snow moving robots, conveyors and operators), and viewers (e.g. insurance, inspection and service companies). Each client system on the system network 1 is served one or more GUI screens from the system network servers (e.g. within the data center) while the user is requesting and receiving services over the system network 1.

As shown in FIG. 36, each client user may be an Administrator, a Manager, an Operator or simply a Viewer, and can request specific services that have been programmed and configured for particular classes of users, in any given system embodiment.

For example, in the illustrative embodiment, the Administrator class of users may request at least the following services: add/remove administrators; add/remove managers; add/remove viewers; change & view settings; control systems; view users; view equipment; and view data & history.

As shown in FIG. 36, the Manager class of users may request at least the following services: ad/remove managers; add/remove viewers; change & view settings; control systems; view users; view equipment; and view data and history.

As shown in FIG. 36, the Operator class of users (e.g. SnowDrone™ Vehicle Operators, SnowBot™ Vehicle Operators, and Snow Conveyor Operators) may request at least the following services: change & view settings; control systems; view users; view equipment; and view data and history.

As shown in FIG. 36, the Viewer class of users (e.g. insurance, inspection & service companies) may request at least the following services: view users; view equipment; and view data and history.

In FIGS. 37 through 42G, there is shown exemplary sets of GUI screens that are displayed on the client systems when users are requesting particular services on the system network of the present invention. These GUI screens will be described below with reference to FIGS. 37 through 42G, illustrating the primary interface objects in the GUI screens.

FIG. 37 presents an exemplary graphical user interface (GUI) presented to Admin, Manager, Operator and Viewer Users, showing the primary interface objects available for selection and when authorized users are logging into their user account maintained on the system network of the illustrative embodiment of the present invention.

FIG. 38A presents an exemplary graphical user interface (GUI) presented to Admin and Manager Users, showing the primary interface objects (i.e. pull-down menus) for managing Users, Buildings, Snow Load, Ariel Survey and Snow Removal, wherein the Users pull-down menu has been selected to show the Users GUI listing all "Users" assigned to a specific Client User Account maintained and supported on the system network of the present invention.

FIG. 38B presents an exemplary graphical user interface (GUI) showing the primary interface objects showing pull-down menus for managing Users, Buildings, Snow Load, Ariel Survey and Snow Removal, wherein the Users pull-down menu was selected to show the Users GUI for adding a New User to be assigned to a specific client user account maintained and supported on the system network of the present invention.

FIG. 39 presents an exemplary graphical user interface (GUI) showing the primary interface objects showing pull-down menus for managing Users, Buildings, Snow Load, Ariel Survey and Snow Removal, wherein the Buildings pull-down menu was selected to show the Buildings GUI listing "Buildings" assigned to a specific client user account maintained and supported on the system network of the present invention.

FIG. 40A presents an exemplary graphical user interface (GUI) showing the primary interface objects showing pull-down menus for managing Users, Buildings, Snow Load, Ariel Survey and Snow Removal, wherein the Snow Load pull-down menu was selected to show the Station Map View GUI for viewing a Map of a selected Station (i.e. NH Office 3) assigned to a specific client user account maintained and supported on the system network of the present invention.

FIG. 40B presents an exemplary graphical user interface (GUI) showing the primary interface objects showing pull-down menus for managing Users, Buildings, Snow Load, Ariel Survey and Snow Removal, wherein the Snow Load pull-down menu was selected to show the Station Map View GUI for viewing and editing settings associated with a selected Station (i.e. NH Office 3) assigned to a specific client user account maintained and supported on the system network of the present invention.

FIG. 40C presents an exemplary graphical user interface (GUI) showing the primary interface objects showing pull-down menus for managing Users, Buildings, Snow Load, Ariel Survey and Snow Removal, wherein the Snow Load pull-down menu was selected to show the Station Table GUI for viewing a Station Table listing all of the snow load sensing stations (mounted on Buildings) assigned to a specific client user account maintained and supported on the system network of the present invention.

FIG. 40D1 presents an exemplary graphical user interface (GUI) showing the primary interface objects showing pull-down menus for managing Users, Buildings, Snow Load, Ariel Survey and Snow Removal, wherein the Snow Load pull-down menu was selected to show the Zone Map View GUI for viewing Zones on Buildings assigned to a specific client user account maintained and supported on the system network of the present invention.

FIG. 40D2 presents an exemplary graphical user interface (GUI) showing the primary interface objects showing pull-down menus for managing Users, Buildings, Snow Load, Ariel Survey and Snow Removal, wherein the Snow Load pull-down menu was selected to show the Zone Map View GUI for viewing and editing Zones on Buildings assigned to a specific client user account maintained and supported on the system network of the present invention.

FIG. 40E presents an exemplary graphical user interface (GUI) showing the primary interface objects showing pull-down menus for managing Users, Buildings, Snow Load, Ariel Survey and Snow Removal, wherein the Snow Load pull-down menu was selected to show the Zone Table GUI for viewing the Zone Table assigned to a specific client user account maintained and supported on the system network of the present invention.

FIG. 40F presents an exemplary graphical user interface (GUI) showing the primary interface objects showing pull-down menus for managing Users, Buildings, Snow Load, Ariel Survey and Snow Removal, wherein the Snow Load pull-down menu was selected to show the Data GUI for viewing the Station Data produced from each Station assigned to a specific client user account maintained and supported on the system network of the present invention.

FIG. 40G presents an exemplary graphical user interface (GUI) showing the primary interface objects showing pull-down menus for managing Users, Buildings, Snow Load, Ariel Survey and Snow Removal, wherein the Snow Load pull-down menu was selected to show the Settings GUI for viewing the Settings associated with the specific client user account maintained and supported on the system network of the present invention.

FIG. 41A presents an exemplary graphical user interface (GUI) showing the primary interface objects showing pull-down menus for managing Users, Buildings, Snow Load, Ariel Survey and Snow Removal, wherein the Aerial Survey pull-down menu was selected to show the Profile & Status GUI for viewing the Profile & Status assigned to a specific client user account maintained and supported on the system network of the present invention.

FIG. 41B presents an exemplary graphical user interface (GUI) showing the primary interface objects showing pull-down menus for managing Users, Buildings, Snow Load, Ariel Survey and Snow Removal, wherein the Aerial Survey pull-down menu was selected to show the Hazards & Keepouts GUI for viewing Hazards & Keepouts assigned to a specific client user account maintained and supported on the system network of the present invention.

FIG. 41C presents an exemplary graphical user interface (GUI) showing the primary interface objects showing pull-down menus for managing Users, Buildings, Snow Load, Ariel Survey and Snow Removal, wherein the Aerial Survey pull-down menu was selected to show the Mission GUI for Creating the Rooftop Snow Depth Mission associated with a particular Building assigned to a specific client user account maintained and supported on the system network of the present invention.

FIG. 41D presents an exemplary graphical user interface (GUI) showing the primary interface objects showing pull-down menus for managing Users, Buildings, Snow Load, Aerial Survey and Snow Removal, wherein the Aerial Survey pull-down menu was selected to show the Mission GUI for Viewing the Mission Flight Path associated with a particular Building assigned to a specific client user account maintained and supported on the system network of the present invention.

FIG. 41E presents an exemplary graphical user interface (GUI) showing the primary interface objects showing pull-down menus for managing Users, Buildings, Snow Load, Ariel Survey and Snow Removal, wherein the Aerial Survey pull-down menu was selected to show the Mission GUI for Creating the Roadway for a Snow Depth Mission associated with a particular Building assigned to a specific client user account maintained and supported on the system network of the present invention.

FIG. 41F presents an exemplary graphical user interface (GUI) showing the primary interface objects showing pull-down menus for managing Users, Buildings, Snow Load, Ariel Survey and Snow Removal, wherein the Aerial Survey pull-down menu was selected to show the View Mission Flight GUI for Viewing the Mission Flight Path associated with a particular Building assigned to a specific client user account maintained and supported on the system network of the present invention.

FIG. 41G presents an exemplary graphical user interface (GUI) showing the primary interface objects showing pull-down menus for managing Users, Buildings, Snow Load, Ariel Survey and Snow Removal, wherein the Aerial Survey pull-down menu was selected to show the Controls & Display GUI for controlling and displaying the viewing the Mission Flight Path from the point of view of the Drone, associated with a particular Building assigned to a specific client user account maintained and supported on the system network of the present invention.

FIG. 41H presents an exemplary graphical user interface (GUI) showing the primary interface objects showing pull-down menus for managing Users, Buildings, Snow Load, Ariel Survey and Snow Removal, wherein the Aerial Survey pull-down menu was selected to show the Alerts & Notifications GUI for displaying Alerts & Notification associated with a particular client user account maintained and supported on the system network of the present invention.

FIG. 41I presents an exemplary graphical user interface (GUI) showing the primary interface objects showing pull-down menus for managing Users, Buildings, Snow Load, Ariel Survey and Snow Removal, wherein the Aerial Survey pull-down menu was selected to show the History GUI for displaying the history of past aerials surveys associated with a particular Building assigned to a specific client user account maintained and supported on the system network of the present invention.

FIG. 41J presents an exemplary graphical user interface (GUI) showing the primary interface objects showing pull-down menus for managing Users, Buildings, Snow Load, Ariel Survey and Snow Removal, wherein the Aerial Survey pull-down menu was selected to show the History and Viewer GUI for viewing the aerial survey history associated with a particular Building assigned to a specific client user account maintained and supported on the system network of the present invention.

FIG. 41K presents an exemplary graphical user interface (GUI) showing the primary interface objects showing pull-down menus for managing Users, Buildings, Snow Load, Ariel Survey and Snow Removal, wherein the Aerial Survey pull-down menu was selected to show the Settings GUI for controlling and displaying the settings associated with a particular client user account maintained and supported on the system network of the present invention.

FIG. 42A presents an exemplary graphical user interface (GUI) showing the primary interface objects showing pull-down menus for managing Users, Buildings, Snow Load, Ariel Survey and Snow Removal, wherein the Snow Removal pull-down menu was selected to show the Profile & Status GUI for displaying the Profile and Status associated with Robotic Snow Removers, Snowbot Garage and Snow Conveyors associated with a Building associated with a client user account maintained and supported on the system network of the present invention.

FIG. 42B1 presents an exemplary graphical user interface (GUI) showing the primary interface objects showing pull-down menus for managing Users, Buildings, Snow Load, Ariel Survey and Snow Removal, wherein the Snow Removal pull-down menu was selected to show the Hazards & Keepout GUI for displaying the Hazards & Keepouts (before selection) associated with a specific Building assigned to a specific client user account maintained and supported on the system network of the present invention.

FIG. 42B2 presents an exemplary graphical user interface (GUI) showing the primary interface objects showing pull-down menus for managing Users, Buildings, Snow Load, Ariel Survey and Snow Removal, wherein the Snow Removal pull-down menu was selected to show the Hazards & Keepouts GUI for displaying the Hazards & Keepouts associated with a specific Building assigned to a client user account maintained and supported on the system network of the present invention.

FIG. 42C presents an exemplary graphical user interface (GUI) showing the primary interface objects showing pull-down menus for managing Users, Buildings, Snow Load, Ariel Survey and Snow Removal, wherein the Snow Removal pull-down menu was selected to show the Mission GUI for displaying the Mission associated with a specific Building assigned to a client user account maintained and supported on the system network of the present invention.

FIG. 42D1 presents an exemplary graphical user interface (GUI) showing the primary interface objects showing pull-down menus for managing Users, Buildings, Snow Load, Ariel Survey and Snow Removal, wherein the Snow Removal pull-down menu was selected to show the Controls & Display GUI for displaying the Control & Display associated with a specific client user account maintained and supported on the system network of the present invention.

FIG. 42D2 presents an exemplary graphical user interface (GUI) showing the primary interface objects showing pull-down menus for managing Users, Buildings, Snow Load, Ariel Survey and Snow Removal, wherein the Snow Removal pull-down menu was selected to show the Controls & Display GUI for displaying the Control & Display associated with a specific client user account maintained and supported on the system network of the present invention.

FIG. 42E presents an exemplary graphical user interface (GUI) showing the primary interface objects showing pull-down menus for managing Users, Buildings, Snow Load, Ariel Survey and Snow Removal, wherein the Snow Removal pull-down menu was selected to show the Alerts & Notifications GUI for displaying the Alerts & Notifications associated with a specific client user account maintained and supported on the system network of the present invention.

FIG. 42F presents an exemplary graphical user interface (GUI) showing the primary interface objects showing pull-down menus for managing Users, Buildings, Snow Load, Ariel Survey and Snow Removal, wherein the Snow Removal pull-down menu was selected to show the History GUI for displaying the History and Viewer associated with a specific client user account maintained and supported on the system network of the present invention.

FIG. 42G presents an exemplary graphical user interface (GUI) showing the primary interface objects showing pull-down menus for managing Users, Buildings, Snow Load, Ariel Survey and Snow Removal, wherein the Snow Removal pull-down menu was selected to show the Settings GUI for displaying the Settings associated with a specific client user account maintained and supported on the system network of the present invention.

Specification of Method of Rooftop Snow Depth Profiling Using Unmanned Snow Depth Measuring Aircraft Systems of the Present Invention FIG. 43 describes how to practice the method of rooftop snow depth profiling using unmanned snow depth measuring aircraft systems 8 deployed on the system network of the BIGADS system 1. As shown, the method comprises the following sequence of steps: (a) deploying a unmanned snow depth measuring aircraft system 8 registered with the BIGADS system 1, to profile (i.e. measure at periodic rooftop locations at GPS coordinates) the snow depth of a particular building rooftop and automatically generate GPS-indexed time-date stamped snow depth maps of specified building rooftops; (b) selecting and enabling a non-contact unmanned snow depth measuring method on the unmanned snow depth measuring aircraft system 8; (c) collecting GPS-indexed snow depth profile data from the building rooftop; (d) transmitting collected GPS-indexed snow depth to the database server 18 of the data center 10 of the BIGADS system 1; and (d) using a Web browser to request and review snow depth profile data for a specified building rooftop.

Using this method, an authorized system user can request rooftop snow depth profiling on any specific building using a client system supporting a web browser. Using this method of remote snow depth profiling employing drone-type aircraft vehicles 8, the system of the present invention 1 offers users a powerful alternative method of collecting intelligence regarding the conditions of snow accumulation and loading on GPS-specified building rooftops, thereby improving building safety, maintenance and management operations, in accordance with the spirit of the present invention.

Specification of a Method of Forecasting Weather Conditions at Locations where Buildings Associated with a User Account on the System Network are Located According to Principles of the Present Invention FIG. 44 describes a method of forecasting the weather conditions at locations of specific buildings registered on an user account on the system network of the BIGADS system 1, comprising the steps of (a) accessing and processing historical weather data recorded in weather databases and creating a building (weather data containing) database 330 for a particular building being managed by the BIGADS system; (b) collecting and storing local weather data from rooftop-mounted snow load measuring stations (SLMS) 4' through 4'''', and adding this data to the building database 330 for the specified building registered in the BIGADS system; (c) collecting GPS-indexed snow depth profile data from the building rooftop, and add this snow depth profile data to the building database 330; (d) analyzing the data contained in the building database 330 to identify patterns and trends useful for predicting and weather forecasting; and (e) using a Web browser to request weather forecast reports based on data collected and processed in the building database 330, and using such reports to plan a course of action relating to expected requirements of rooftop snow load management during a particular time period. Using this method, an authorized system user can request weather forecast reports on any specific building using a client system supporting a web browser.

Using this method of forecasting, the system of the present invention 1 offers users an alternative method of collecting weather forecast intelligence and how such forecasts may impact GPS-specified building rooftops, thereby improving building safety, maintenance and management operations, in accordance with the spirit of the present invention.

Specification of Primary Models (i.e. a 3D Rooftop Geometry Model (3DRGM) and a Building Rooftop Snow-Load State Model (BRSSM)), Supporting the Development of the BIGADS System FIG. 45 illustrates the primary models (i.e. a 3D Rooftop Geometry Model (3DRGM) and a Building Rooftop Snow-Load State Model (BRSSM)) supporting the development of the BIGADS system and other automated building rooftop snow load monitoring and removal systems of the present invention. The use of these models will be further explained in the method described in FIGS. 46A through 46C.

Overview of the Preferred Method of Designing, Installing, Deploying and Operating the Building Intelligence Gathering, Assessment and Decision-Support (BIGADS) System of the Present Invention in the Form of an Automated Rooftop Snow Load Monitoring and Snow Removal System FIGS. 46A, 46B and 46C describe how to practice the method of designing, installing, deploying and operating a building intelligence gathering, assessment and decision-support (BIGADS) system 1 in accordance with the principles of the present invention so as to provide an automated building rooftop snow load monitoring and removal system (ABRSMRS) for one or more specified building rooftops.

For purposes of illustration, the system name "Automated Building Rooftop Snow Load Monitoring And Removal System (ABRSMRS)" will be used in the method described in FIGS. 46A through 46C. However, it is understood that the method seeks to design, deploy and operate the BIGADS system 1 of the present invention, integrated with the automated snow removal subsystem capabilities, as described in great detail above.

As shown, the method comprises the following sequence of steps: (a) during a pre-design and pre-installation phase, surveying and modeling rooftop building conditions; (b) during a design phase, developing 3D Rooftop Geometry Model (3DRGM) specifying various rooftop building parameters (i.e. rooftop boundary conditions, snow load measurement zones rated in pressure (i.e. 30 PSF), structures (e.g. antennas, cooling towers, walls, mechanical rooms, etc.), key areas of high snow depth, placement of SLMS 4 and other sensors, placement of IP gateway (IPG) 11 unless stations are using cellular connections at which time no IPG is required, passive depth marker placement, (i.e. stations having graduations on masts and antennas), placement of shelter systems 29 for snow removal robot systems 6, placement of snow conveyor tunnel systems 5, placement of hanger dome system 28 for unmanned snow depth measuring aircraft systems 8, deployment of portable hand-held rooftop navigation and inspection terminals 14, and deployment of VR-guided snow removal robot navigation and control stations 7A); (c) generating a Building Rooftop Snow-Load State Model (BRSSM) using current 3DRGM (loads and asset locations at any point in time); (d) constructing and installing an automated building rooftop snow monitoring and removal system (ABRSMRS) based on the BRSSM generated for the specified building rooftop placement and assembly of wireless SLMSs 4 on the building rooftop 2; (e) deploying, testing, calibrating and adjusting the system; (f) initializing the system; (g) maintaining and updating the system; (h) sending weather forecast snow alerts; (i) automatically detecting excessive snow load events and generating and transmitting snow load alarm notifications/messages to all responsible member of the building management/maintenance team; (j) responding to snow load events by executing a snow load removal plan; and (k) sending snow load removal confirmations to building managers when the snow load removal plan has been completed. It is appropriate at this juncture, to describe each step in the method described above in great detail with reference to the model architecture illustrated in FIG. 45 and flow chart set forth in FIGS. 41A through 41C.

During Step (A) in FIG. 46A, the predesign phase, the system designers will have at least two different methods from which to choose when surveying rooftop-building conditions, namely, local methods, or remote methods. When using Local Methods, the following options will be typically available: Using a "Rooftop Setup" application (e.g. desktop or mobile) to determine locations for: snow load monitoring stations (SLMS) 4, IP Gateways 11, and drone hangers 28 (e.g. involving dropping pins as in Google Maps System); Using photographs, videos and other measurements captured by personnel on rooftop; Using (simple) unmanned aircraft systems 8 to capture aerial video and photography of rooftop, and mapping XYZ coordinate to photographs. When using Remote Methods, the following options are typically available: Surveying the rooftop of building of interest by reviewing aerial (e.g. satellite-based) imagery, and/or reviewing a site such as the Google Earth/Map Database System.

During Step (B) in FIG. 46A, during the design phase, system designers will need to develop a 3D Rooftop Geometry Model (3DRGM) specifying the following parameters (i.e. rooftop boundary conditions; snow load measurement zones (rated in pressure, e.g. 30 psf); structures (e.g. antennas, cooling towers, walls, mechanical rooms, etc.); key areas of high snow depth; placement of SLMS 4 and other sensors; placement of IP gateways (IPG) 11 unless SLMSs are using cellular connections at which time no IPG is required; determine passive depth marker placement (typically, each SLMS will also have graduations on its mast and antennas); parking locations for snow removing robot systems 6; placement of snow conveying tunnel and tube systems 5; placement of hangers for unmanned snow depth measuring aircraft systems; and deployment of portable rooftop navigation and inspection terminals. Special software can be created to assist in this model development process and loading the parameterized model into the system after account creation and the system design setup process has been completed.

During Step (C) in FIG. 46B, the system designers generate a Building Rooftop Snow-load State Model (BRSSM) using current 3DRGM (reflecting snow load monitoring locations and asset locations at any instant in time). This step involves defining the following Snow Load State Model Parameters: Rooftop boundary coordinates; Snow load measurement zones coordinates (graphic polygon tool); Rooftop load pressure thresholds and ratings (i.e. warning at 30 psf, Safe Limit 50 psf); Rooftop temperature and wind thresholds; Existing structural location (e.g. HVAC equipment, walls, mechanical rooms, antennas, etc.); Snow load and depth (x,y,z,t) over rooftop surface; SLMS station location (X,Y,Z,T); Determine passive depth marker (PDM) placement; state coordinates (X,Y,Z,T), operating state parameters, velocity, load, other system parameters of unmanned show removing robot systems, including snow conveying machines such as snow conveying tube systems 5 (e.g. belt speed, load, status, operating state parameters, etc.); state coordinates (X,Y,Z,T), operating state parameters of unmanned snow depth measuring aircraft systems 8; operating parameters and location of portable hand-held rooftop navigation and inspection terminals 14; Rooftop weather conditions including Current Conditions (e.g. temperature, wind speed), and Forecasted Conditions (e.g. NWS, GRIB, etc.).

During Step (D) in FIG. 46B, the Automated Building Rooftop Snow Monitoring and Removal System (ABRSMRS) is constructed and installed on the rooftop of the building(s), based on the BRSSM generated for the specified building rooftop. System installation will involve placing and assembling wireless SLMS 4 (4' through 4'''') on the building rooftop according to the BRSSM, as well as installing snow conveying tunnel systems 5, and unmanned snow measuring aircraft systems (drones) 8 on the building rooftop 2, as well as deploying hand-held AR-enabled rooftop navigation and inspection systems 14, and remotely-located VR-enabled control stations 7A, 7B and 7C for remotely controlling and operating such systems.

During Step (E) in FIG. 46B, the BIGADS system is deployed, tested, calibrated and adjusted. This steps involves each of the system components of the BIGADS system, namely: IP gateway (IPG) 11 unless the SLMS 4 use a cellular connection to establish an Internet connectivity; SLMS 4; automated snow conveying tunnel systems 5; unmanned snow removing robot systems 6; unmanned snow depth measuring aircraft systems 8; hanger dome systems 28; and shelter systems 29; and Passive Depth Markers (PDMs) installed on rooftops 2 for providing a visual snow depth reference in digital images captured by unmanned aircraft systems 8 surveying a building rooftop 2.

During Step (F) in FIG. 46B, the system is initialized which might typically involve the following tasks:

(a) creating a customer User Account;
(b) recording the IP Gateway MAC address(es) to the system database 18;
(c) launching web applications on the set up computer and follow steps to setup account including: (i) adding users; (ii) identifying structures to be monitored (using aerial imagery); (iii) identifying specific roof zones and load ratings and warning limits (using aerial imagery and polygon tool); and (iv) turning on each SLMS 4 and IP gateway 11; and
(d) using a mobile "Rooftop Setup" Application loaded on a Bluetooth-equipped mobile device 15 to
 (i) check system vitals (i.e. battery voltage and panel voltage (if sunny) and charge controller, GPS signal, communications with IP gateway, database and web app, error codes), (ii) tare scale and verify weighing functions using a test weight, and (iii) verify communications of measurement strings (data packets) to web and mobile apps.

As part of initializing the system, it will be helpful to deploy one or more unmanned snow depth measuring aircraft systems 8 to generate a "pre-season" snow depth map of the specified building rooftop 2, and store the same in the system database 18 for future access and analysis. This step will consist of performing Options (i), (ii) or (iii) described below, depending upon capabilities of the deployed unmanned snow depth measuring aircraft system 8.

When the "Video-only" Option is available, the following program is carried out by the unmanned snow depth measuring (SDM) aircraft system 8:

(a) Program inspection flight path;

(b) Run flight path collecting video and return to hanger and charging station;

(c) Upload video to a video server; and (d) Confirm suitable video capture of rooftop and passive snow depth markers (PDMs).

When the "Topmost Surface Elevation" Sensing Option is available, the following program is carried out using the unmanned snow depth measuring aircraft system 8 to (i) determine the roof surface elevation when there is no snow is present (i.e. during summer months), and (ii) compares such stored measurements against winter measurements to compute the actual snow depth at specified GPS-indexed rooftop locations:

(a) Program inspection flight path to create a pre-season XYZ terrain map of rooftop (roof deck, equipment, structures, etc. using (differential) DGPS altimeter and narrow-beam acoustic distance measurement or RADAR;

(b) Run flight path collecting XYZ data and supplemental video;

(c) Upload data to the database and supplemental video to a video server;

(d) Place simulated snow targets (e.g. using several closed cardboard boxes positioned across the rooftop) and rerun flight path;

(e) Return to hanger and charging station;

(f) Upload data to the database and supplemental video to a video server;

(g) Post flight review of 3D terrain map to confirm suitable rooftop coverage.

When the "Snow Depth" Sensing Drone Option (Preferred method) is available, the following program is carried out using a narrow acoustic or RF beam simultaneously to measure and compare distances to both the snow surface and the roof surface to determine snow depth:

(a) Program inspection flight path to create a pre-season XYZ terrain map of rooftop (roofing, equipment, structures, etc. using (differential) GPS;

(b) Return to hanger system 28 and integrated charging station;

(c) Post flight review 3D terrain map to confirm suitable rooftop coverage; and (d) Activate snow depth measuring aircraft system 8 to autonomously explore and map rooftop for snow clearing and access to snow conveyors, and review and edit rooftop map as needed.

During Step (G) in FIG. 46C, periodic updates of the state of the building rooftop are carried out using the following program:

(a) Performing snow drone flyovers with digital video capture and uploading to video server: SLMS Station Data (i.e. SLMS stations transmit load, temperature and system status measurements on regular interval typically every hour to the IP gateway 11; IP Gateway 11 passes data through the LAN to the Internet to the system database 18;

(b) using a web application to query the system database and send "snow load alerts" if any, or "system status" notifications at a regular interval to users as appropriate; and t (c) using a web app to review local weather forecasts and passing along relevant forecast alerts to the appropriate users.

During Step (H) in FIG. 46C, excessive snow load events are automatically detected by the BIGADS system 1, and snow load alarm notifications/messages are generated and transmitted to all responsible members of the building management and maintenance team. Possible initial responses to such excessive snow load events will depend on various factors.

If the web or mobile application downloaded by each team member (to provide secure access to the user account and associated building rooftop notifications), receives a snow load measurement from one or more of the SLMS stations 4 in excess of the warning or safe load threshold defined for the relevant rooftop zone, then the system automatically generates an alert notification. The alert is displayed on the web app and sent to appropriate users via email and SMS text.

In response to the alert, a drone rooftop survey might be automatically conducted by unmanned snow depth measuring aircraft system 8 deployed by the system servers. If flight conditions are favorable, then a drone survey flight will be automatically initiated to gather needed rooftop intelligence. Survey data is uploaded to the video server on the system network, and if present, XYZ maps are uploaded to the database and made available to all users linked to the building rooftop. Manager level users will acknowledge receipt of the snow load alert via mobile or desktop web application, for system accountability.

During Step (I) in FIG. 46C, the system transmits weather forecasted snow alerts to users. The Web Application will use forecast data (land version of GRIB files) to estimate changes to roof loading. Also, predicted alerts and significant changes are forwarded to appropriate users.

During Step (J) in FIG. 46C, the building management and maintenance team members will assess all intelligence gathered from the building rooftop, and then decide how best to respond to the snow load alert event by executing a snow load removal plan or course of action (i.e. manual mode). Depending upon the level of the warning and other factors, the manager level users will determine what action to take. Options include: further investigate; leave snow as is for now; or create snow remove plan for immediate execution. Manager level users log their decision into the web application, and make the decision available to appropriate users such as managers, building owners and tenants. If snow load warnings continue for a period of time, then alerts will be sent out again.

When deciding upon a snow removal plan (manual mode), manager level users will use available data from SLMS stations 4, drone surveys and human inspection using rooftop navigation and inspection system 14 to determine snow removal areas. Using Web Application tools, areas for snow clearing will be prioritized and indicated on the roof map (OSRP—optimized snow removal plans).

When executing the snow removal plan, the foreman will use the Web Application to indicate the stages of the snow removal process. Workers mobilize for snow removal operation (shovels, snow blowers, ladders, cranes, personnel, safety equipment, etc.). When using snow removing robot systems, control signals are sent to the VR-operated snow removing robot systems 6 (i) from VR-enabled control station 7A when the robot system is VR-operated by a remote operator using a VR-enabled control station 7A, or (ii) from the AI-based NCS when snow removal is carried out under AI-control. Also, the snow conveying tunnel system 5 is activated and controlled as needed and described hereinabove, to move snow off of the rooftop into designated snow drop zones on the ground to subsequent handling and processing. The foreman of the snow removal plan will use the Web App to indicate when rooftop regions are cleared of snow, and report updated snow load conditions. Notifications will be periodically sent out to users reporting on the progress of the snow removal process. Video footage capture of the entire snow removal process can be captured and made available to team members. When the snow removal plan is completed, snow removing robot systems 6 will ne parked in their designated shelter systems on the building rooftop, and undergo automated maintenance diagnostics, checkup operations, and serving, to prepare for the new snow removal plan.

During Step (K) in FIG. 46C, the system sends out snow removal confirmation when the foreman issues an appropriate command. In response to such confirmation, SLMS 4 will make updated measurements which will be automatically posted to system servers. Snow depth profile surveys of the cleared building rooftop will be performed by the unmanned snow depth measuring aircraft system 8 to gather intelligence on (i) updated snow depth data, and (ii) video footage evidencing the cleared building rooftop. The system will then generate and transmit notifications (e.g. using email, SMS, telephone, radio-communication, and/or other automated messaging techniques) to managers, building owners and tenants indicating the status of the excessive snow load alert, and also of the snow removal plan. The system will also generate a multimedia snow removal report for managers, building owners, tenants and the building's insurance company, as needed.

Specification of the Method of Detecting, Communicating, Responding to, and Resolving Snow Load Alarm Conditions on a Building Associated with a User Account on the System Network of a Building Intelligence Gathering, Assessment and Decision-Support (BIGADS) System FIGS. 47A and 47B, taken together, is a flow chart describing the high-level steps carried out when practicing the method of detecting, communicating, responding to, and resolving snow load alarm conditions on a building associated with a user account on the system network of a building intelligence gathering, assessment and decision-support (BIGADS) system 1.

As shown in the flow chart, the method comprises the steps: (a) deploying a plurality of snow load monitoring systems (SLMS) 4 on the surface of a specified building rooftop and configuring these SLMSs to the system network of the BIGADS system; (b) deploying a VR-guided snow removing robot system 6 on the surface of a specified building rooftop and configuring the SMRS to the system network of the BIGADS system; (c) deploying a VR-enabled control station 7A for remotely operating the snow removing robot system on the surface of the specified building rooftop and configuring the control station 7A to system network of the BIGADS system; (d) registering a team of building management and/maintenance members with a User Account maintained on the system network of the BIGADS system; (e) in response to at least one of the SLMS 4 automatically detecting a snow load at a specified region of the rooftop that exceeds a preset threshold, generating and transmitting a snow load alarm notification to all team members; (f) at least one team member responding to the snow load alarm notification by creating a snow removal plan requiring the use of the VR-Guided control station 7A to remove the snow load alarm condition on the rooftop under the remote control of a specified VR-enabled control station 7A; and (g) after completing the snow removal plan and removing the snow load alarm condition, generating and transmitting a snow load removal confirmation to all team members.

Specification of the Method of Responding to Snow Load Alarm Notifications by Making Physical Rooftop Inspections Using the Hand-Held AR-Guided Rooftop Navigation and Inspection Systems of the Present Invention FIGS. 48A and 48B describe the method of responding to snow load alarm notifications by making physical rooftop inspections using the hand-held AR-guided rooftop navigation and inspection systems of the present invention. As shown, the method comprises the steps of: (a) receiving a snow load alarm notification from the building intelligence gathering, assessment and decision-support (BIGADS) system of the present invention illustrated in FIGS. 1, 2A, et seq.; (b) using a hand-held AR-enabled rooftop navigation and inspection system to navigate and inspect the building rooftop specified in the snow load alarm notification; (c) recording the navigation and inspection of the building rooftop, including recorded annotations by the human operator/building inspector, and transmitting the annotated video recording to a database server maintained at the data center of the BIGADS system; (d) others on the building management and maintenance team using a Web browser to access the database server and review the annotated recording of the building rooftop inspection report made by the inspector using the AR-enabled rooftop navigation and inspection system; and (e) using the snow load event inspection report to determine a plan of resolution for the snow load alarm event (i.e. execute snow removal plan).

Specification of the Method of Responding to Snow Load Alarm Notifications by Deploying a Snow Load Measuring Aircraft to the Building for Remote Aerial Inspection and Intelligence Collection Operations FIG. 49 describes the method of responding to snow load alarm notifications by deploying a snow load measuring aircraft (i.e. Snowdrone™ Systems) to the building for remote aerial inspection and intelligence collection operations for review by remotely situated building managers. As shown in FIG. 49, the method comprises the steps of: (a) a building management team member receiving a snow load alarm notification from a building intelligence gathering, assessment and decision-support (BIGADS) system; (b) deploying an unmanned snow depth measuring aircraft system (SDMS) registered with the building, to navigate and inspect the building rooftop specified in the snow load alarm notification and compare snow depth measurements against measured snow load conditions at the specified rooftop location; (c) capturing a digital video recording and snow depth measurements around and about the snow load alarm region, and transmitting the recording to a database server maintained at the data center of the BIGADS system; and (d) others on the building management and maintenance team using a Web browser to access the database server and review the recording of the aerial building rooftop inspection made by the flying unmanned snow depth measuring aircraft system over the specified building rooftop.

Specification of the VR-Guided Method of Monitoring and Removing Snow Loads from Building Rooftop Surfaces in Accordance with the Present Invention FIGS. 50A and 50B describe how to practice the method of removing specified snow loads on a rooftop using VR-guided robotically-controlled snow collection and removal systems (i.e. machines) illustrated in FIG. 4D when remotely controlled and operated by a human operator using a remotely-located VR/AR-enabled computer workstation configured for remotely controlling the operation of the snow collecting and removing robot system on the building rooftop. As shown, the method comprises the steps of: (a) installing VR-guided snow removing robot system 6 on building rooftop 2, and configuring at least one VR-guided robot navigation and control station 7A with the building intelligence gathering, assessment and decision-support (BIGADS) system 1; (b) receiving a rooftop snow load condition message from the building intelligence gathering, assessment and decision-support system 1; (c) using the VR-guided robot navigation and control station 7A to remotely control the VR-guided snow removing robot system 6 on building rooftop and remove the identified rooftop snow load condition specified in the rooftop snow load condition message; (d) sending a rooftop snow load condition removal notification from the VR-guided robot navigation and control station 7A to the building intelligence gathering, assessment and decision-support system 1; (e) the building intelligence gathering, assessment and decision-support system 1 transmitting the rooftop snow load condition removal notification to members of the building management team; and (f) the building management team members updating the system database upon receiving rooftop snow load condition removal notification.

Specification of Method of Monitoring and Removing Snow Loads from Building Rooftop Surfaces in Accordance with the Present Invention FIGS. 51A and 51B describe how to practice the method of removing specified snow loads on a rooftop using AI-guided robotically controlled snow collection and removal systems (i.e. machines) illustrated in FIG. 4D, remotely controlled and operated by an Artificial Intelligence (AI) based navigational control server (AI-based NCS) preferably maintained at the data center 10 of the system network.

As shown in FIGS. 51A and 51B, the method comprises the steps of: (a) installing at least one AI-guided snow removing robot system 6 on building rooftop 2, and optionally one or more mobile snow conveying structures 8, and configuring an AI-based NCS within the system network of the building intelligence gathering, assessment and decision-support system 1, for managing such systems 6 and 8 as an orchestrated team of snow removing vehicles cooperating and working together on a common mission (i.e. remove rooftop snow loads before the accumulate to dangerous levels or conditions); (b) receiving a rooftop snow load condition message from the building intelligence gathering, assessment and decision-support system 1; (c) using the AI-based NCS to remotely control the AI-guided snow removing robot system 6 (and mobile automated snow conveying structures 8) on building rooftop and remove the identified rooftop snow load condition specified in the rooftop snow load condition message, (d) sending a rooftop snow load condition removal notification from the AI-Based NCS to the building intelligence gathering, assessment and decision-support system 1; (e) the building intelligence gathering, assessment and decision-support system 1 transmitting the rooftop snow load condition removal notification to members of the building management team; and (f) the building management team members updating the system database 18 upon receiving rooftop snow load condition removal notification.

Using this automated method of AI-driven snow removal from building rooftops, it is now possible for building management teams to safely maintain building rooftops all year round, without the risk of worker injury or building damage, by enabling AI-guided Modifications of the Illustrative Embodiments of the Present Invention The present invention has been described in great detail with reference to the above illustrative embodiments. It is understood, however, that numerous modifications will readily occur to those with ordinary skill in the art having had the benefit of reading the present disclosure.

For example, in alternative embodiments of the present invention described hereinabove, the system 1 can be realized as a stand-alone application, or integrated as part of a larger system network possibly offering building environmental control services to building owners and managers. Such alternative system configurations will depend on particular end-user applications and target markets for products and services using the principles and technologies of the present invention.

These and all other such modifications and variations are deemed to be within the scope and spirit of the present invention as defined by the accompanying Claims to Invention.

What is claimed is:

1. A building intelligence gathering, assessment and decision-support system comprising:
   a GPS system deployed about the Earth and supporting a plurality of GPS satellites for transmitting GPS signals to the surface of the Earth;
   a wireless data communication network deployed for supporting wireless data communications on the Earth, on which at least one building is constructed and having a rooftop surface exposed to the environment;
   a building data sensor network, including a plurality of GPS-tracked rooftop-mounted sensors, mounted on the rooftop surface of said building, and adapted for collecting GPS-indexed data specifying conditions on said rooftop surface at particular dates and times during a year, wherein said building rooftop conditions includes one or more conditions selected from the group consisting of snow load conditions, windspeed and direction, and temperature;
   a data center operably connected to said wireless data communication network, and including communication, application and database servers configured for supporting collection of GPS-indexed data collected by said sensor network, and transmission of said GPS-indexed data to said communication, application and database servers for processing and storage, and for use in supporting rooftop assessment and decision-support operations maintained within said building intelligence gathering, assessment and decision-support system; and
   one or more hand-held mobile augmented-reality (AR) based rooftop navigation and inspection systems, each configured for communication with said communication servers within said data center over said wireless data communication network, to access and display graphical indicia of GPS-tracking rooftop-mounted sensors collecting data from said rooftop surface while said hand-held mobile AR-based rooftop navigation and inspection system is moving about the rooftop surface during rooftop inspection operations;

wherein each said hand-held mobile augmented-reality (AR) based rooftop navigation and inspection system has a digital video camera with a field of view (FOV), and a display surface for displaying (i) digital images of objects and scenery captured in the field of view (FOV) while the user is moving about the rooftop surface, along with (ii) graphical indications of GPS-tracked rooftop-mounted sensors collecting data of conditions on the rooftop surface, so as to assist the user while navigating the building rooftop, inspecting rooftop situations, identifying where said GPS-tracked rooftop-mounted sensors have been installed, and observing where particular conditions have been automatically detected and displayed on the display surface of said hand-held mobile AR-based rooftop navigation and inspection system during rooftop inspections.

2. The building intelligence gathering, assessment and decision-support system of claim 1, which further comprises a real time kinematic (RTK) GPS referencing station deployed about said building for use in improving the resolution of GPS-indexed data collection operations.

3. The building intelligence gathering, assessment and decision-support system of claim 1, further comprising remote computing systems selected from the group consisting of (i) mobile computing systems including smartphone devices, tablet computers and laptop computers, and (ii) desktop computing systems including desktop workstations.

4. The building intelligence gathering, assessment and decision-support system of claim 3, wherein one or more of said GPS-tracked rooftop-mounted sensors each comprise: a digital video imaging subsystem for capturing digital video recordings along a field of view (FOV) extending above the rooftop surface, for displaying digital images of said FOV on a display surface associated with one or more of said remote computing systems.

5. The building intelligence gathering, assessment and decision-support system of claim 1, wherein said GPS-tracked rooftop-mounted sensors are realized as GPS-tracked rooftop-mounted snow load measuring stations (SLMS) installed on the rooftop surface, capable of automatically detecting where excessive snow loads may develop on the rooftop surface during the course of the year.

6. A method of building inspection using a building intelligence gathering, assessment and decision-support system, said method comprising the steps of:
(a) a human inspector carrying a hand-held mobile augmented-reality (AR) based rooftop navigation and inspection device while standing and inspecting a building rooftop surface; and
(b) while viewing the rooftop surface through the field of view (FOV) of a digital video camera aboard said hand-held mobile AR-based rooftop navigation and inspection device having a display surface for displaying digital images captured from said FOV along with graphical indications of GPS-tracked rooftop-mounted sensors capturing data about conditions on said building rooftop, so as to assist the operator while navigating the rooftop, inspecting the situation, and identifying where rooftop-mounted sensors have been installed, and where excessive conditions have been automatically detected by said building intelligence gathering, assessment and decision-support system.

7. The method of claim 6, wherein said GPS-tracked rooftop-mounted sensors are realized as rooftop-mounted snow load measuring stations (SLMS) installed on the rooftop surface, for automatically detecting where excessive snow loads that may develop during the course of a year.

8. A method of monitoring rooftop conditions using a mobile hand-held augmented-reality (AR) based rooftop navigation and inspection system, said method comprising the steps of:
(a) receiving a rooftop alarm notification from said system, and accessing a hand-held AR-guided rooftop navigation and inspection device having a digital video camera with a field of view (FOV), and a display surface for displaying (i) digital images of objects and scenery captured in the field of view (FOV) while the user is moving about the rooftop surface, along with (ii) graphical indications of GPS-tracked rooftop-mounted sensors collecting data of conditions on the rooftop surface,
(b) holding said hand-held AR-guided rooftop navigation and inspection device in the operator's hand, while viewing the field of view (FOV) of said digital camera while (i) observing graphical indications of GPS-indexed rooftop-mounted sensors displayed on said display surface, and (ii) inspecting rooftop conditions indicated on said display surface, and (iii) making audio and video recordings of the rooftop surface, so as to produce a rooftop inspection report; and
(c) sending said rooftop inspection report to building management and maintenance team members, for determining a plan of resolution for the rooftop alarm event indicated by said rooftop alarm notification.

9. The method of claim 8, wherein said GPS-tracked rooftop-mounted sensors are realized as rooftop-mounted snow load measuring stations (SLMS) installed on the rooftop surface, for automatically detecting where excessive snow loads that may develop during the course of a year.

10. A building intelligence gathering, assessment and decision-support system comprising:
a GPS system deployed about the Earth and supporting a plurality of GPS satellites for transmitting GPS signals to the surface of the Earth;
a wireless data communication network deployed for supporting wireless data communications on the Earth, on which at least one building is constructed and having a rooftop surface exposed to the environment;
a building data sensor network, including a plurality of GPS-tracked rooftop-supported sensors, supported on the rooftop surface of said building, and adapted for collecting GPS-indexed data specifying conditions on said rooftop surface at particular dates and times during a year, wherein said building rooftop conditions includes one or more conditions selected from the group consisting of snow load conditions, windspeed and direction, moisture level and temperature level;
a data center operably connected to said wireless data communication network, and including communication, application and database servers configured for supporting collection of GPS-indexed data collected by said building data sensor network, and transmission of said GPS-indexed data to said communication, application and database servers for processing and storage, and for use in supporting rooftop assessment and decision-support operations maintained within said building intelligence gathering, assessment and decision-support system; and
one or more hand-held mobile augmented-reality (AR) based rooftop navigation and inspection device, each configured for communication with said communication servers within said data center over said wireless data communication network, to access and display graphical indicia of GPS-tracking rooftop-supported sensors collecting data from said rooftop surface while said hand-held mobile AR-based rooftop navigation and inspection device is moving about said building during rooftop inspection operations;

wherein each said hand-held mobile augmented-reality (AR) based rooftop navigation and inspection device has a display surface for displaying graphical indications of said GPS-tracked rooftop-supported sensors collecting data of conditions on the rooftop surface, so as to assist a user while navigating the building, inspecting building situations including rooftop conditions, identifying where said GPS-tracked rooftop-supported sensors have been installed, and observing where particular conditions have been automatically detected and displayed on said display surface of said hand-held mobile AR-based rooftop navigation and inspection device during building inspections.

11. The building intelligence gathering, assessment and decision-support system of claim 10, which further comprises a real time kinematic (RTK) GPS referencing station deployed about said building for use in improving the resolution of GPS-indexed data collection operations.

12. The building intelligence gathering, assessment and decision-support system of claim 10, further comprising remote computing systems selected from the group consisting of (i) mobile computing systems including smartphone devices, tablet computers and laptop computers, and (ii) desktop computing systems including desktop workstations.

13. The building intelligence gathering, assessment and decision-support system of claim 12, wherein one or more of said GPS-tracked rooftop-supported sensors each comprise: a digital video imaging subsystem for capturing digital video recordings along a field of view (FOV) extending above the rooftop surface, for displaying digital images of said FOV on a display surface associated with one or more of said remote computing systems.

14. The building intelligence gathering, assessment and decision-support system of claim 10, wherein said GPS-tracked rooftop-supported sensors are realized as GPS-tracked rooftop-mounted snow load measuring stations (SLMS) mounted on the rooftop surface, capable of automatically detecting where excessive snow loads may develop during the course of a year.

15. The building intelligence gathering, assessment and decision-support system of claim 10, wherein each said hand-held mobile augmented-reality (AR) based rooftop navigation and inspection device further comprises a digital video camera with a field of view (FOV), for capturing (i) digital images of objects and scenery in the field of view (FOV) while the user is moving about said building.

16. The building intelligence gathering, assessment and decision-support system of claim 10, wherein said plurality of GPS-tracked rooftop-supported sensors further comprises a VR-navigated snow removing robot system including one or more subsystems selected from the group consisting of a snow-depth measurement subsystem, a temperature and moisture measurement subsystem, and snow-depth profiling subsystem.

17. A method of building inspection using a building intelligence gathering, assessment and decision-support system supporting a plurality of GPS-tracked rooftop-mounted sensors mounted on a rooftop surface of a building, said method comprising the steps of:

(a) a human inspector carrying a hand-held mobile augmented-reality (AR) based rooftop navigation and inspection device with a display surface for displaying digital images while inspecting a building and one or more rooftop surfaces on said building; and (b) while inspecting the building and said one or more rooftop surfaces, viewing on said display surface, graphical indications of GPS-tracked rooftop-support sensors capturing data about conditions on said building rooftop, so as to assist a user while navigating the building, inspecting situations on said building rooftop, and where excessive conditions have been automatically detected by said building intelligence gathering, assessment and decision-support system.

18. The method of claim 17, wherein said GPS-tracked rooftop-supported sensors are realized as rooftop-mounted snow load measuring stations (SLMS) mounted on the rooftop surface, for automatically detecting where excessive snow loads that may develop during the course of a year.

19. The method of claim 17, wherein said hand-held mobile augmented-reality (AR) based rooftop navigation and inspection device further comprises a digital video camera having a field of view (FOV) for capturing digital video images along said FOV, while said display surface displays said digital video images along with graphical indications of GPS-tracked rooftop-mounted sensors capturing data about conditions on said building rooftop, so as to assist the user while navigating the building, inspecting situations on said building rooftop, and where excessive conditions have been automatically detected by said building intelligence gathering, assessment and decision-support system.

20. A method of monitoring rooftop conditions using a building intelligence gathering, assessment and decision-support system supporting a plurality of GPS-tracked rooftop-supported sensors mounted on a rooftop surface of a building, said method comprising the steps of:

(a) receiving a rooftop alarm notification from said building intelligence gathering, assessment and decision-support system, and accessing a hand-held AR-guided rooftop navigation and inspection device having a display surface for displaying graphical indications of GPS-tracked rooftop-supported sensors collecting data of conditions on the rooftop surface;

(b) holding said hand-held AR-guided rooftop navigation and inspection device in a user's hand, while viewing said display surface and observing graphical indications of data from the GPS-indexed rooftop-supported sensors displayed on said display surface, while inspecting building conditions on said rooftop surface and about said building; and (c) sending a building inspection report to building management and maintenance team members, for determining a plan of resolution for a building alarm event indicated by a building alarm notification generated by said building intelligence gathering, assessment and decision-support system.

21. The method of claim 20, wherein said hand-held AR-guided rooftop navigation and inspection device further comprises a digital video camera having a field of view (FOV) and capable of capturing digital video images of objects and scenery captured in the field of view (FOV) while the user is moving around said building and on said rooftop surface, and displaying said digital video images on said display surface, along with said graphical indications of data captured by said GPS-tracked rooftop-supported sensors collecting data of conditions on the rooftop surface.

22. The method of claim 21, wherein said hand-held AR-guided rooftop navigation and inspection device further comprises said digital video camera making audio and video recordings of said building conditions, for use in producing said building inspection report for said building management and maintenance team members.

23. The method of claim 20, wherein said GPS-tracked rooftop-supported sensors are realized as rooftop-mounted snow load measuring stations (SLMS) mounted on the rooftop surface, for automatically detecting where excessive snow loads that may develop during the course of a year.

* * * * *